(12) United States Patent
Meetin

(10) Patent No.: US 10,300,336 B2
(45) Date of Patent: May 28, 2019

(54) INFORMATION-PRESENTATION STRUCTURE WITH CELL ARRANGEMENT FOR IMPACT-SENSING COLOR CHANGE

(71) Applicant: Ronald J. Meetin, Mountain View, CA (US)

(72) Inventor: Ronald J. Meetin, Mountain View, CA (US)

(*) Notice: Subject to any disclaimer, the term of this patent is extended or adjusted under 35 U.S.C. 154(b) by 180 days.

(21) Appl. No.: 15/343,127

(22) Filed: Nov. 3, 2016

(65) Prior Publication Data

US 2018/0117406 A1 May 3, 2018

(51) Int. Cl.
*A63C 19/00* (2006.01)
*A63B 24/00* (2006.01)
(Continued)

(52) U.S. Cl.
CPC ...... *A63B 24/0062* (2013.01); *A63B 24/0003* (2013.01); *A63B 24/0021* (2013.01); *A63B 71/02* (2013.01); *A63B 71/0605* (2013.01); *A63B 71/0622* (2013.01); *G02F 1/13338* (2013.01); *A63B 71/0608* (2013.01); *A63B 2024/0025* (2013.01); *A63B 2024/0028* (2013.01); *A63B 2024/0037* (2013.01); *A63B 2024/0043* (2013.01); *A63B 2024/0056* (2013.01); *A63B 2071/0611* (2013.01);
(Continued)

(58) Field of Classification Search
CPC ...... A63C 19/00; A63C 19/06; A63C 19/0065
See application file for complete search history.

(56) References Cited

U.S. PATENT DOCUMENTS 3,415,517 A 12/1968 Krist
3,512,876 A 5/1970 Marks
(Continued)

FOREIGN PATENT DOCUMENTS

EP  2 537 666 A1  12/2012
WO  WO 94/14122  6/1994
WO  WO 2011/123515  10/2011

OTHER PUBLICATIONS

Asaoka et al, "Polarizer-free Reflective LCD Combined with Ultra Low-power Driving Technology", Sharp Microelectronics of the Americas, www.sharpmemorylcd.com/resources/polarizer-free_reflective_lcd_white_paper.pdf, Oct. 2010, 11 pp.
(Continued)

*Primary Examiner* — James S. McClellan
(74) *Attorney, Agent, or Firm* — Ronald J. Meetin

(57) ABSTRACT

A variable-color region (106) of an information-presentation structure extends to an exposed surface (102) at a surface zone (112) and contains multiple variable-color cells (404), each extending to a part (406) of the zone. The cells normally appear along their parts of the zone as a principal color. Each cell that meets cellular threshold impact criteria in response to an object (104) impacting the zone at an object-contact area (116) temporarily becomes a criteria-meeting cell that temporarily appears along its part of the zone as changed color materially different from the principal color. A group of less than all the cells usually constitute criteria-meeting cells. The surface parts of the criteria-meeting cells form a print area (118) that closely matches the object-contact area in size, shape, and location. The color-change capability helps in making in/out calls in sports such as tennis.

29 Claims, 53 Drawing Sheets

(51) Int. Cl.
    *A63B 71/02* (2006.01)
    *A63B 71/06* (2006.01)
    *G02F 1/1333* (2006.01)
    *G02F 1/155* (2006.01)

(52) U.S. Cl.
    CPC ............... *A63B 2071/0625* (2013.01); *A63B 2071/0694* (2013.01); *A63B 2207/02* (2013.01); *A63B 2220/13* (2013.01); *A63B 2220/80* (2013.01); *A63B 2220/801* (2013.01); *A63B 2220/806* (2013.01); *A63B 2220/807* (2013.01); *A63B 2225/20* (2013.01); *A63B 2243/0037* (2013.01); *G02F 1/155* (2013.01)

(56) References Cited

U.S. PATENT DOCUMENTS

| | | |
|---|---|---|
| 3,883,860 A | 5/1975 | Von Kohorn |
| 3,982,759 A | 9/1976 | Grant |
| 4,062,008 A | 12/1977 | Carlsson et al. |
| 4,109,911 A | 8/1978 | Van Auken |
| 4,126,854 A | 11/1978 | Sheridon |
| 4,328,441 A | 5/1982 | Kroeger et al. |
| 4,365,805 A | 12/1982 | Levine |
| 4,516,112 A | 5/1985 | Chen |
| 4,521,712 A | 6/1985 | Braun et al. |
| 4,538,811 A | 9/1985 | Wigoda |
| 4,855,711 A | 8/1989 | Harrop et al. |
| 4,859,986 A | 8/1989 | Van Auken et al. |
| 5,394,824 A | 3/1995 | Johnson et al. |
| 5,446,334 A | 8/1995 | Gaffney |
| 5,672,128 A | 9/1997 | Conn |
| 5,800,292 A | 9/1998 | Brace |
| 5,908,361 A | 6/1999 | Fisher et al. |
| 5,930,026 A | 7/1999 | Jacobson et al. |
| 5,954,599 A | 9/1999 | Lin |
| 5,961,804 A | 10/1999 | Jacobson et al. |
| 6,017,584 A | 1/2000 | Albert et al. |
| 6,130,773 A | 10/2000 | Jacobson et al. |
| 6,233,007 B1 | 5/2001 | Carlbom et al. |
| 6,300,932 B1 | 10/2001 | Albert |
| 6,917,456 B2 | 7/2005 | Reboa et al. |
| 7,038,655 B2 | 5/2006 | Herb et al. |
| 7,042,288 B2 | 5/2006 | Matsui et al. |
| 7,083,105 B2 | 8/2006 | Maruyama et al. |
| 7,364,673 B2 | 4/2008 | Arsenault et al. |
| 7,369,038 B1 | 5/2008 | Thompson |
| 7,420,549 B2 | 9/2008 | Jacobson et al. |
| 7,463,398 B2 | 12/2008 | Feenstra et al. |
| 7,508,566 B2 | 3/2009 | Feenstra et al. |
| 7,632,197 B2 | 12/2009 | Rodengen et al. |
| 7,826,131 B2 | 11/2010 | Arsenault et al. |
| 7,920,129 B2 | 4/2011 | Hotelling et al. |
| 8,072,437 B2 | 12/2011 | Miller et al. |
| 8,092,315 B2 | 1/2012 | Swartz et al. |
| 8,199,199 B1 | 6/2012 | Shlyak et al. |
| 8,421,483 B2 | 4/2013 | Klinghult et al. |
| 8,552,989 B2 | 10/2013 | Hotelling et al. |
| 8,599,150 B2 | 12/2013 | Philipp |
| 8,982,087 B2 | 3/2015 | Hotelling et al. |
| 2003/0154903 A1 | 8/2003 | Rakowski |
| 2006/0287140 A1 | 12/2006 | Brandt et al. |
| 2007/0113358 A1 | 5/2007 | Rabolt et al. |
| 2010/0150511 A1 | 6/2010 | Arsenault et al. |
| 2010/0253604 A1 | 10/2010 | Peters et al. |
| 2010/0275676 A1 | 11/2010 | King et al. |
| 2011/0239790 A1 | 10/2011 | Kuczynski et al. |
| 2012/0293450 A1 | 11/2012 | Dietz et al. |
| 2013/0025647 A1 | 1/2013 | Bouten et al. |
| 2013/0187900 A1 | 7/2013 | Tsai et al. |

OTHER PUBLICATIONS

Bradley, "Interview with Williams James Griffiths", *Reactive Reports*, Jun. 2006, 3 pp.

Brody et al., *The Physics and Technology of Tennis* (Racquet Tech Pub.), 2002, pp. 343-357.

Castañeda, "Present Status of the Development and Application of Transparent Conductors Oxide Thin Solid Films", *Mats. Scis. and Apps.*, vol. 2, 2011, pp. 1233-1242.

Cross et al., *Technical Tennis* (Racquet Tech Pub.), 2005, pp. 90-108.

Distler, "How to Make a Simple Drawing App with UIKit and Swift", RayWenderlich, Tutorials for Developers & Gamers, Mar. 11, 2015, 10 pp.

Ferrara et al., "Intelligent design with chromogenic materials", *J. Int'l Colour Ass'n*, vol. 13, 2014, pp. 54-66.

Fukuda, *Inorganic Chromotropism: Basic Concepts and Applications of Colored Materials* (Springer), 2007, pp. 28-32, 34-38, 199-238, and 291-336.

Geiger, "How Tennis Can Save Soccer: Hawk-Eye Crossing Sports", *Illumin*, Mar. 25, 2013, 3 pp.

Green, "Compare/Contrast of Thin Film EL (TFEL) to EL Backlighting, LED, and OLED Technologies", Planar Systems, www.planarembedded.com/whitepapers/assets/TFEL-Comparison_12-07.pdf, Dec. 13, 2007, 7 pp.

Hoffmann, "CIELab Color Space", docs-hoffmann.de/cielab03022003.pdf, Feb. 10, 2013, 63 pp.

Hoober, "Common Misconceptions About Touch", *UXmatters*, Mar. 18, 3013, 12 pp.

Jia et al., "Novel Mechano-Luminescent Sensors Based on Piezoelectric/Electroluminescent Composites", *Sensors*, vol. 11, 2011, pp. 3962-3969.

Kulwanoski et al., "The Principles of Piezoelectric Accelerometers", *Sensors*, Feb. 1, 2004, 8 pp.

Lindsey, "Follow the Bouncing Ball", Racquet Sports Industry, Apr. 2004, pp. 39-43.

Mikhailov, *Physics and Applications of Graphene—Experiments*, InTech, chap 7, Eigler, "Transparent and Electrically Conductive Films from Chemically Derived Graphene", 2011, pp. 109-134.

Minoura et al., "Making a Mobile Display Using Polarizer-Free Reflective LCDs and Ultra-Low-Power Driving Technology", *Info. Display*, Oct. 2009, pp. 12-16.

Pallis, "Follow the Bouncing Ball Ball/Court Interaction", *The Tennis Server*, Tennis Set, Part I, www.tennisserver.com/set/set_02_09.html, Sep. 2002, 8 pp.

Pallis, "Follow the Bouncing Ball Ball/Court Interaction", *The Tennis Server*, Tennis Set, Part II, www.tennisserver.com/set/set_02_10.html, Oct. 2002, 21 pp.

Pallis, "Follow the Bouncing Ball Ball/Court Interaction", *The Tennis Server*, Tennis Set, Part III, www.tennisserver.com/set/set_02_11.html, Nov. 2002, 20 pp.

Payne et al., "Pixtronix DMS™ MEMS Technology for Broad Spectrum of Display System Applications", Microtech Conf. and Expo 2011, MEMS-Based Systems Solutions and Integration Approaches, Jun. 16, 2011, 15 pp.

Qi et al., "Remarkable Turn-On and Color-Tuned Piezochromic Luminescence: Mechanically Switching Intramolecular Charge Transfer in Molecular Crystals", *Adv. Funct. Mater.*, vol. 25, 2015, pp. 4005-4010.

Sampsell, "MEMS-Based Display Technology Drives Next-Generation FPDs for Mobile Applications", *Info. Display*, Jun. 2006, pp. 24-28.

Smith, "Android SDK: Create a Drawing App—Interface Creation", code.tutsplus.com/tutorials/android-sdk-create-a-drawing-app-interface-creation--mobile-19021, Aug. 19, 2013, 14 pp.

Smith, "Android SDK: Create a Drawing App—Touch Interaction", code.tutsplus.com/tutorials/android-sdk-create-a-drawing-app-touch-interaction--mobile-19202, Aug. 22, 2013, 10 pp.

Smith, "Android SDK: Create a Drawing App—Essential Functionality", code.tutsplus.com/tutorials/android-sdk-create-a-drawing-app-essential-functionality--mobile-19328, Aug. 26, 2013, 22 pp.

Stadler, "Transparent Conducting Oxides—An Up-To-Date Overview", *Materials*, vol. 5, Apr. 19, 2012, pp. 661-683.

Tannas, *Flat-Panel Displays and CRTs* (Van Nostrand Reinhold), 1985, pp. 247-281, 290-327, and 415-451.

Walker, "Flexible Touch-Panels for Flexible Displays", slide show, www.walkermobile.com/PublishedMaterial.htm, 2015, 15 pp.

(56) References Cited

OTHER PUBLICATIONS

Wroblewski, "Touch Target Sizes", LukeW Ideation + Design, May 4, 2010, 2 pp.
"Active-matrix liquid-crystal display", *Wikipedia,* en.wikipedia.org/wiki/Active-matrix_liquid-crystal_display, Mar. 28, 2013, 2 pp.
"AMOLED", *Wikipedia,* en.wikipedia.org/wiki/AMOLED, Apr. 12, 2013, 9 pp.
"AVIC-8100NEX", Pioneer Electronics, www.pioneerelectronics.com/PUSA/Car/NEX/AVIC-8100NEX, undated, 21 pp.
"Color blindness", *Wikipedia,* en.wikipedia.org/wiki/Color_blindness, Aug. 5, 2015, 22 pp.
"Color difference", *Wikipedia,* en.wikipedia.org/wiki/Color_difference, Aug. 8, 2014, 7 pp.
"Digital Light Processing", *Wikipedia,* en.wikipedia.org/wiki/Digital_Light_Processing, Apr. 4, 2013, 7 pp.
"Electrochromism", *Wikipedia,* en.wikipedia.org/wiki/Electrochromism, Feb. 26, 2013, 2 pp.
"Electroluminescence", *Wikipedia,* en.wikipedia.org/wiki/Electroluminescence, Mar. 11, 2013, 4 pp.
"Electroluminescent (EL) Display Technology FAQ", www.planarembedded.com/electroluminescent-display/el/assets/Electroluminescent-Displays-FAQ.pdf, Apr. 2008, 10 pp.
"Electronic line judge", *Wikipedia,* en.wikipedia.org/wiki/Electronic_line_judge_(tennis), Jun. 19, 2012, 3 pp.
"Electronic paper", *Wikipedia,* en.wikipedia.org/wiki/Electronic_paper, Mar. 10, 2013, 10 pp.
"Field emission display", *Wikipedia,* en.wikipedia.org/wiki/Field_emission_display, Mar. 4, 2013, 5 pp.
"Hawk-Eye", *Wikipedia,* en.wikipedia.org/wiki/Hawk-Eye, Jul. 18, 2013, 8 pp.
"Ink Technology, Electrophoretic Ink, explained.", E Ink, www.eink.com/technology.html, 2012, 2 pp.
"Interferometric modulator display", *Wikipedia,* en.wikipedia.org/wiki/Interferometric_modulator_display, Feb. 26, 2013, 3 pp.
"ITF Approved Tennis Balls, Classified Surfaces & Recognised Courts, a Guide to Products & Test Methods", part B, sect. 4, 2014, pp. 37-40.
"Laser Phosphor Display", *Wikipedia,* en.wikipedia.org/wiki/Laser_Phosphor_Display, Mar. 22, 2013, 2 pp.
"Light-emitting diode", *Wikipedia,* en.wikipedia.org/wiki/Light-emitting_diode#Power_sources, Mar. 23, 2013, 21 pp.
"Light-emitting electrochemical cell", *Wikipedia,* en.wikipedia.org/wiki/Light-emitting_electrochemical_cell, Dec. 2, 2012, 2 pp.
"Liquid crystal on silicon", *Wikipedia,* en.wikipedia.org/wiki/Liquid_crystal_on_silicon, Feb. 13, 2013, 3 pp.
"Liquid-crystal display", *Wikipedia,* en.wikipedia.org/wiki/Liquid-crystal_display, Apr. 9, 2013, 18 pp.
"OLED", *Wikipedia,* en.wikipedia.org/wiki/Organic_light-emitting_diode, Mar. 14, 2013, 17 pp.
"Organic light-emitting transistor",*Wikipedia,* en.wikipedia.org/wiki/Organic_light-emitting_transistor, Sep. 16, 2011, 1 p.
"Photoluminescence", *Wikipedia,* en.wikipedia.org/wiki/Photoluminescence, Nov. 23, 2013, 6 pp.
"Piezoelectric references", www.piezomaterials.com/references.htm, Jul. 21, 2006, 1 p.
"Piezoelectricity", *Wikipedia,* en.wikipedia.org/wiki/Piezoelectricity, Feb. 28, 2013, 11 pp.
"Piezoluminescence", *Wikipedia,* en.wikipedia.org/wiki/Piezoluminescence, Mar. 16, 2013, 1 p.
"Plasma display",*Wikipedia,* en.wikipedia.org/wiki/Plasma_display, Mar. 18, 2013, 11 pp.
"Quantum dot display", *Wikipedia,* en.wikipedia.org/wiki/Quantum_dot_display, Mar. 13, 2013, 5 pp.
"Surface-conduction electron-emitter display", *Wikipedia,* en.wikipedia.org/wiki/Surface-conduction_electron-emitter_display, Apr. 13, 2013, 7 pp.
"Technology", Gamma Dynamics, gammadynamics.net/technology, 2010, 1 p.
"Telescopic pixel display", *Wikipedia,* en.wikipedia.org/wiki/Telescopic_pixel_display, Jan. 13, 2012, 3 pp.
"Touchscreen", *Wikipedia,* en.wikipedia.org/wiki/Touchscreen, Jan. 12, 2016, 14 pp.
"Vacuum fluorescent display", *Wikipedia,* en.wikipedia.org/wiki/Vacuum_fluorescent_display, Feb. 28, 2013, 5 pp.

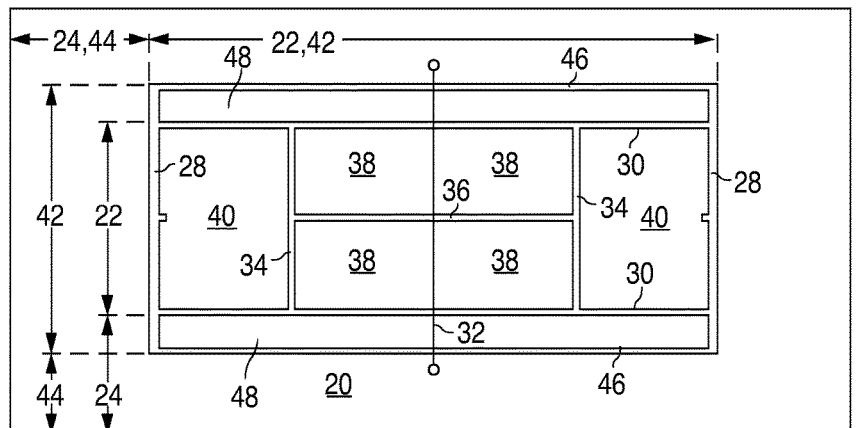
Fig. 1
PRIOR ART
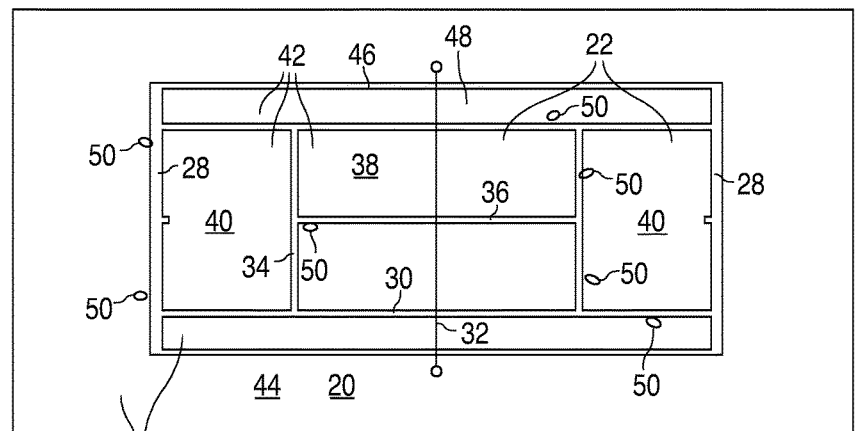
Fig. 2
PRIOR ART
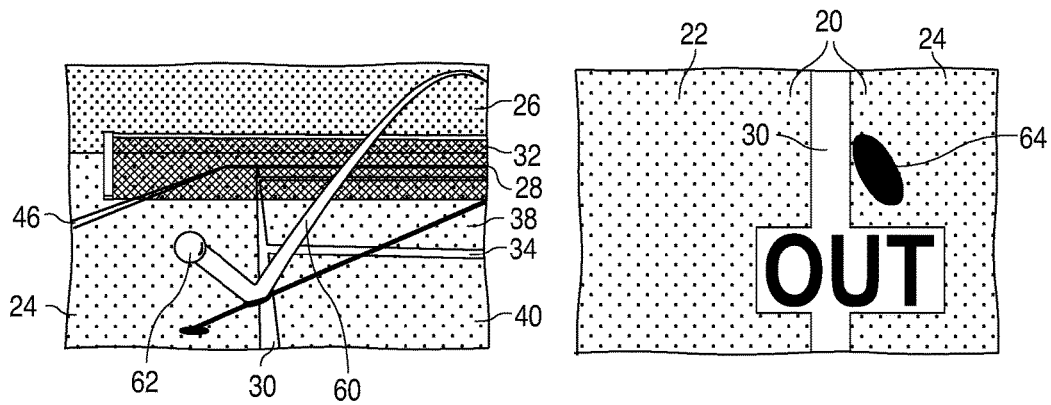
Fig. 3
PRIOR ART
Fig. 4
PRIOR ART

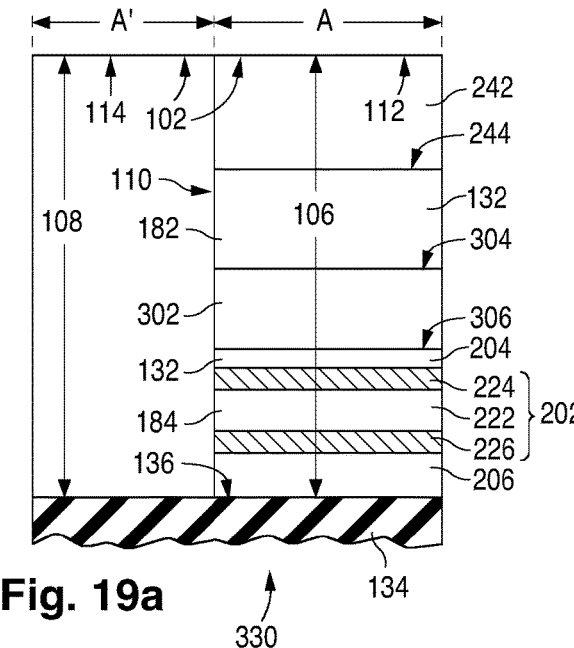
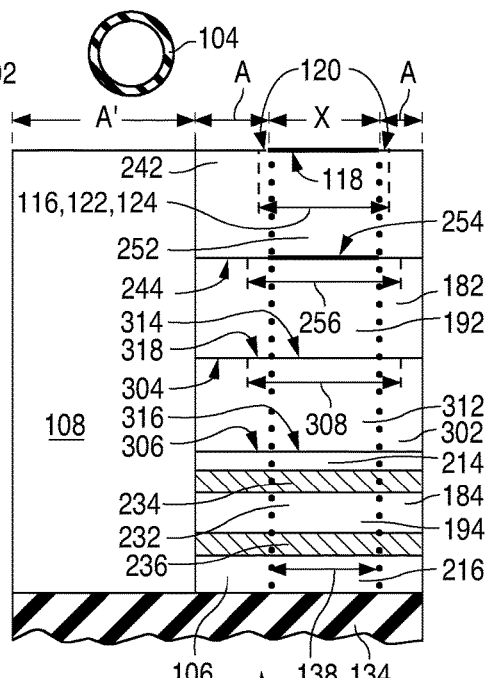
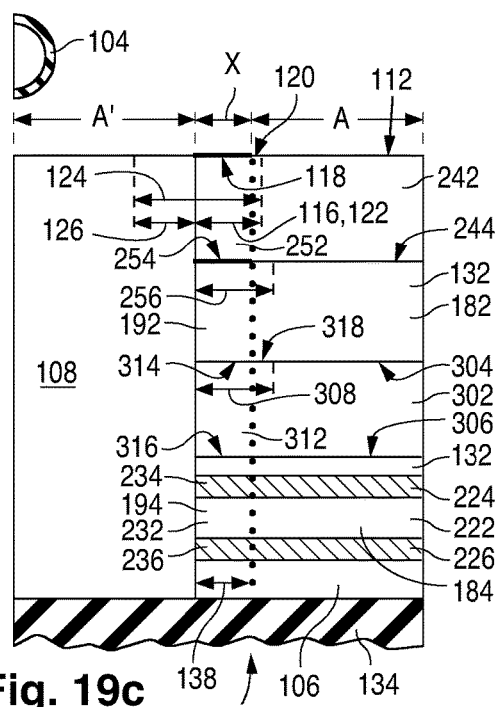
Fig. 19a
Fig. 19b
Fig. 19c

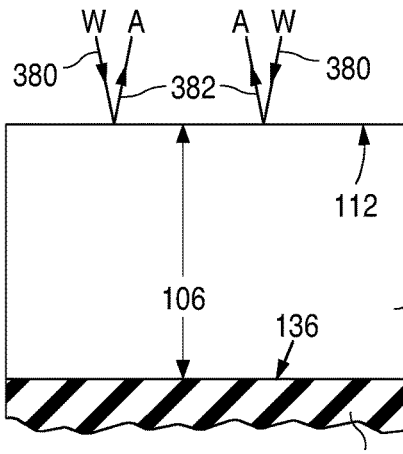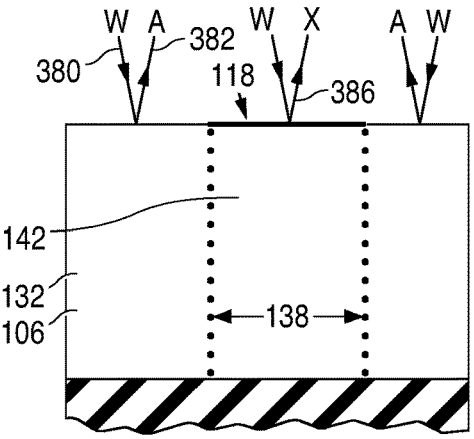
Fig. 26a  Fig. 26b
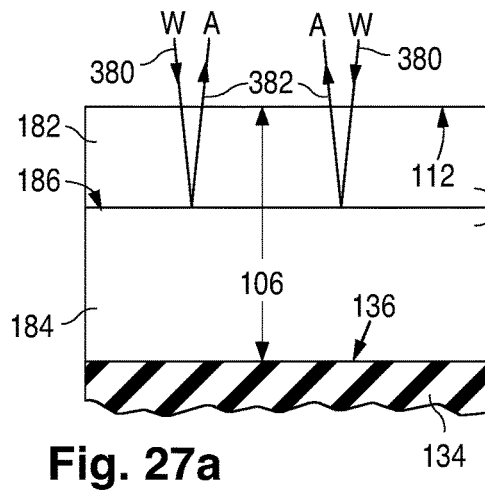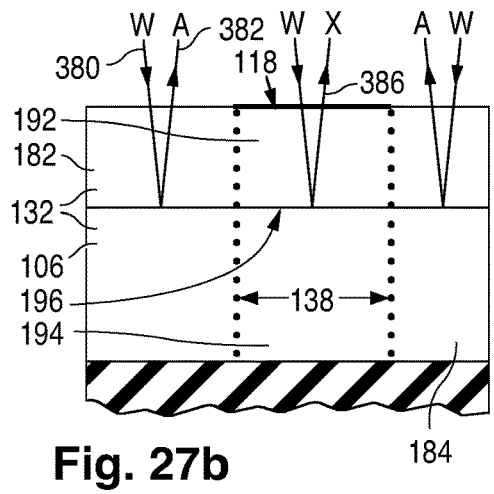
Fig. 27a  Fig. 27b
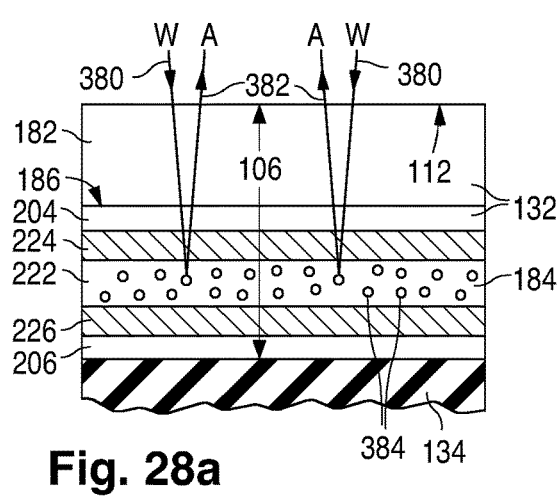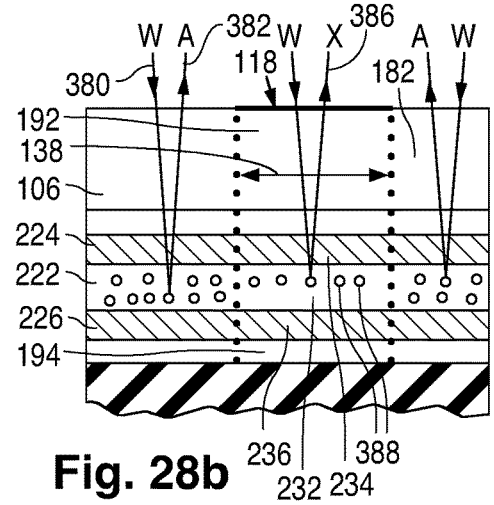
Fig. 28a  Fig. 28b

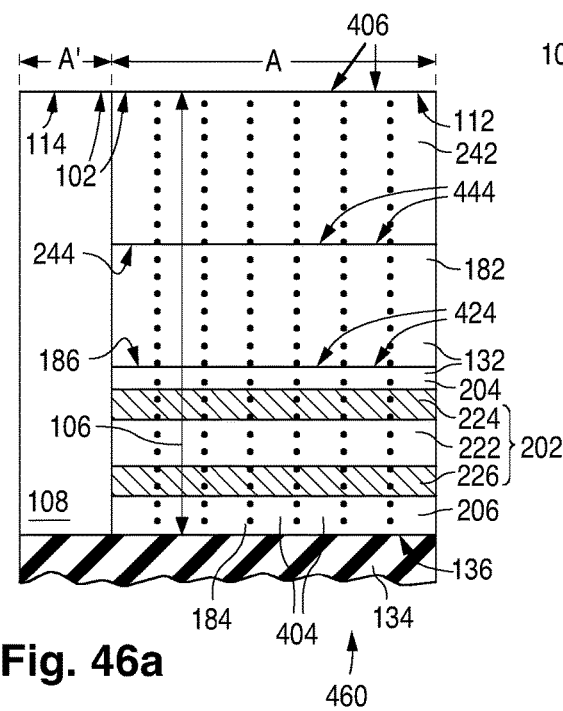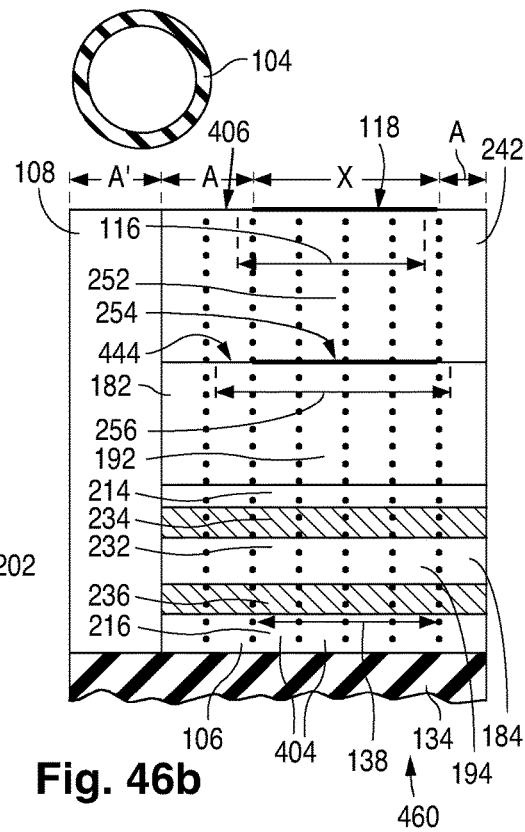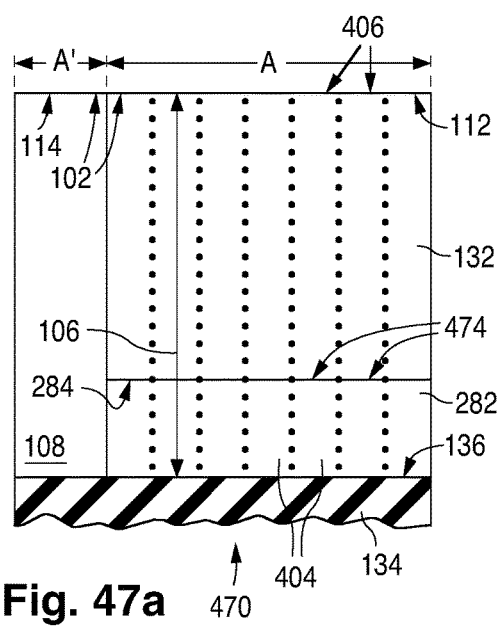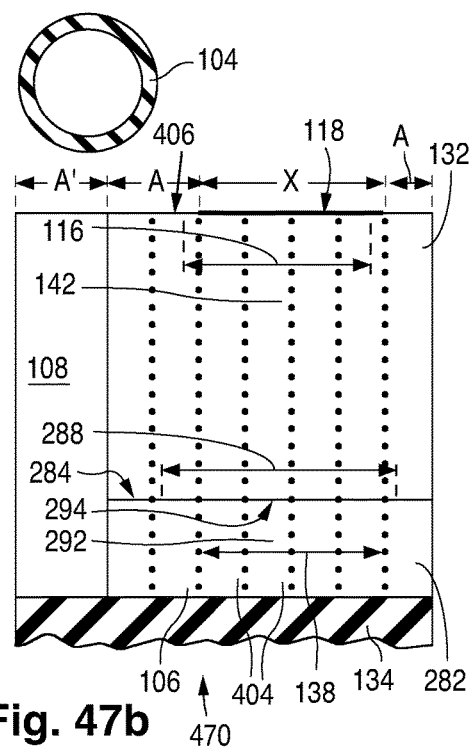
Fig. 46a
Fig. 46b
Fig. 47a
Fig. 47b

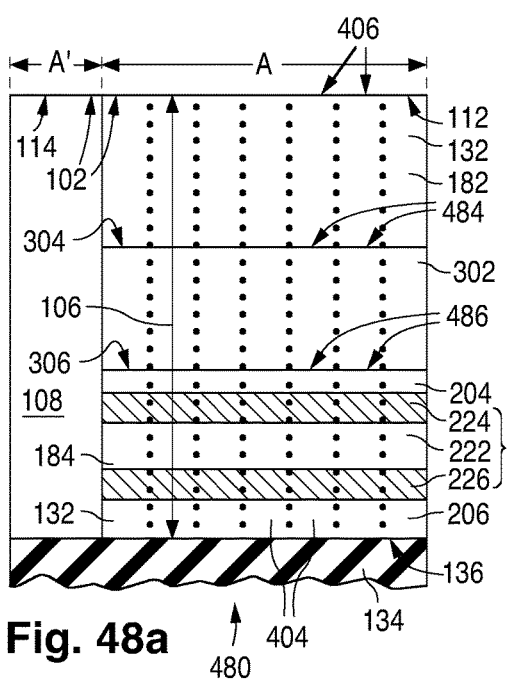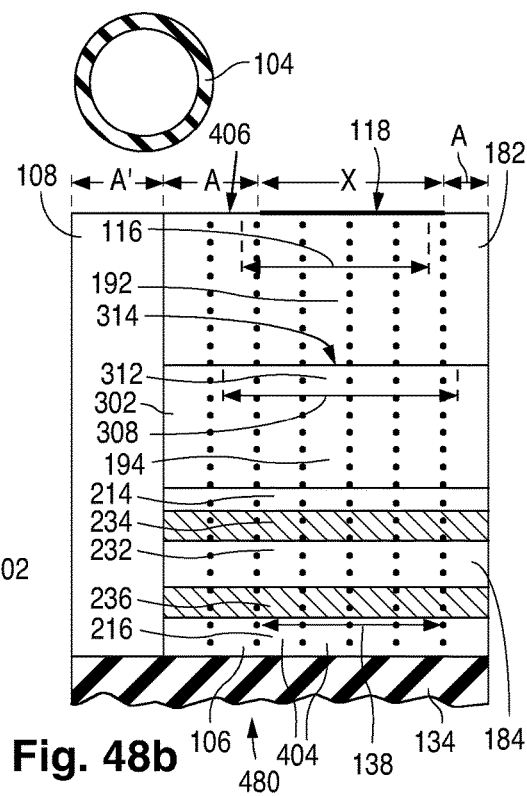
Fig. 48a  Fig. 48b
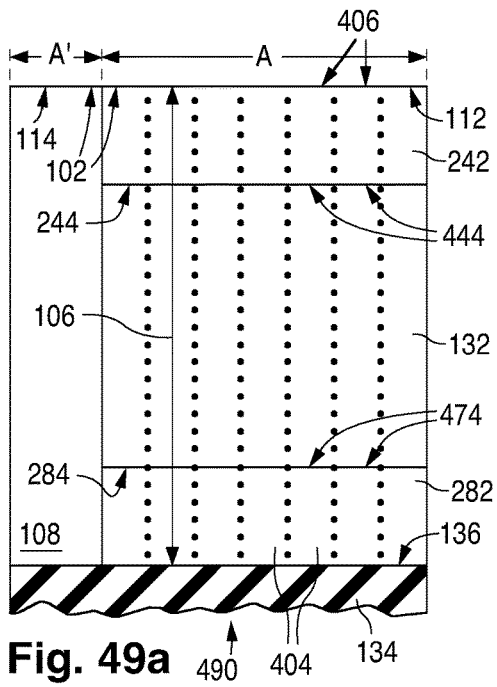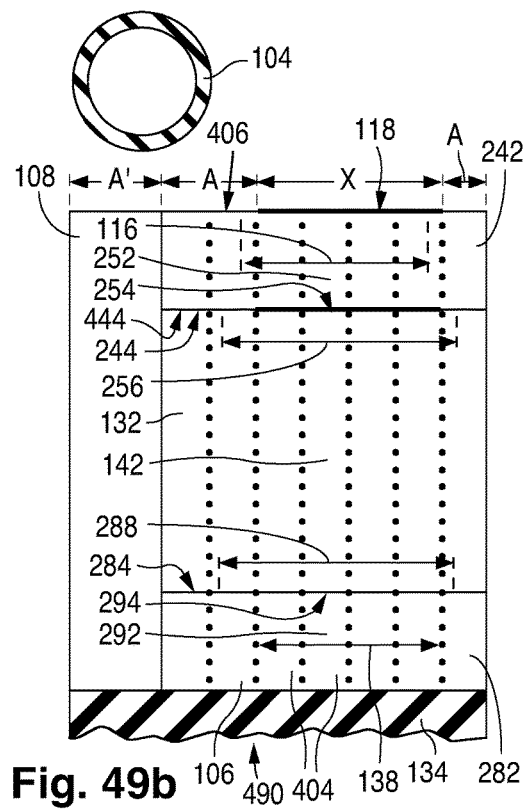
Fig. 49a  Fig. 49b

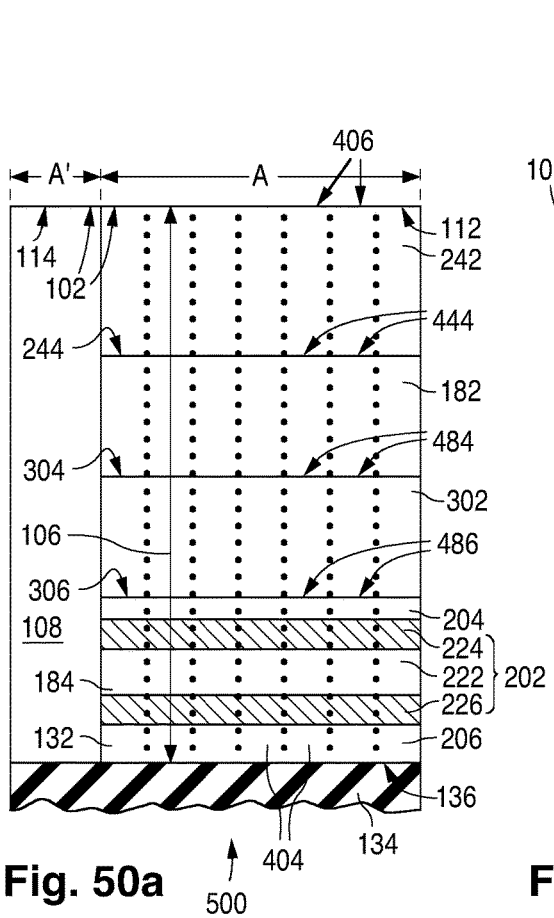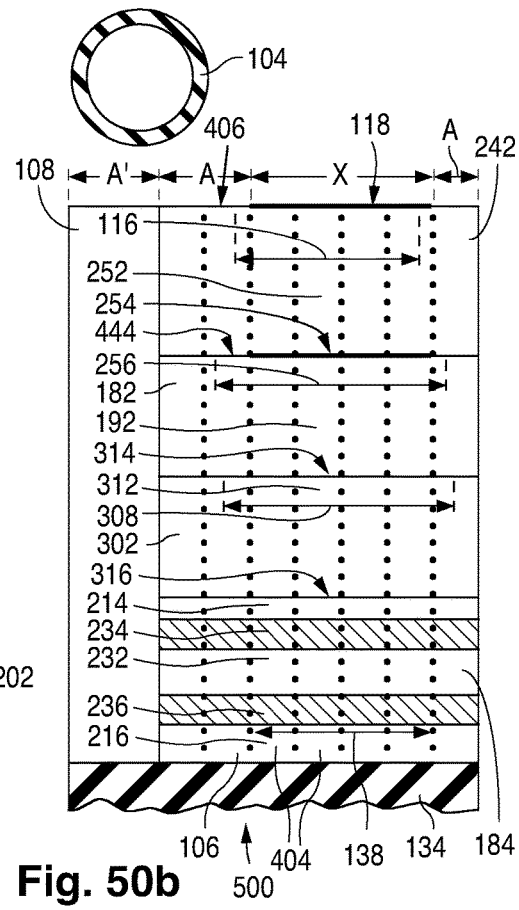
Fig. 50a
Fig. 50b
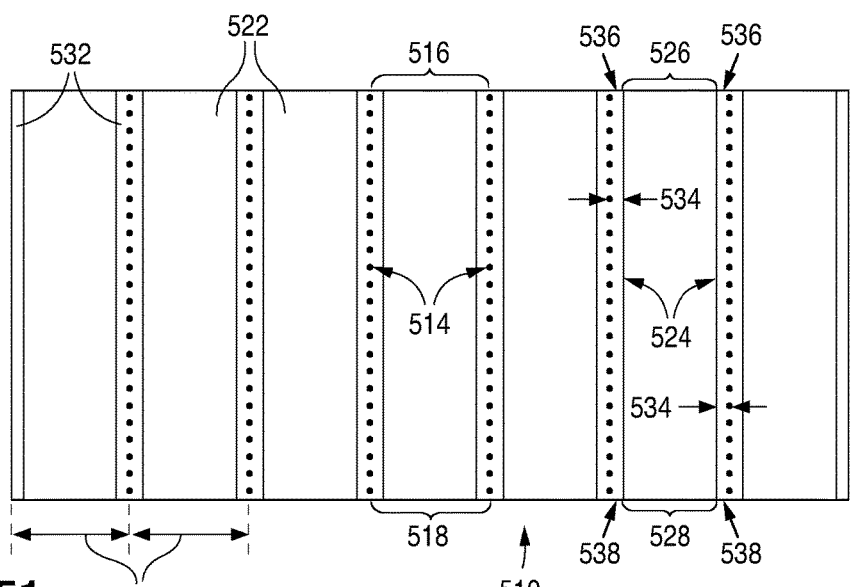
Fig. 51

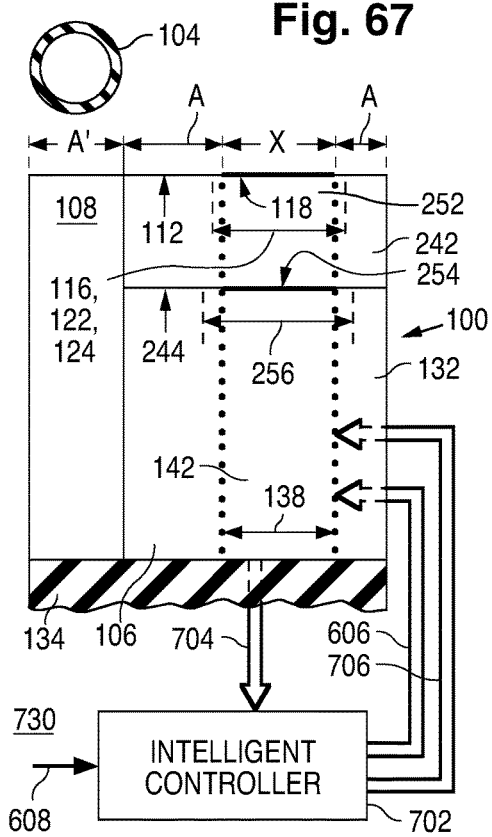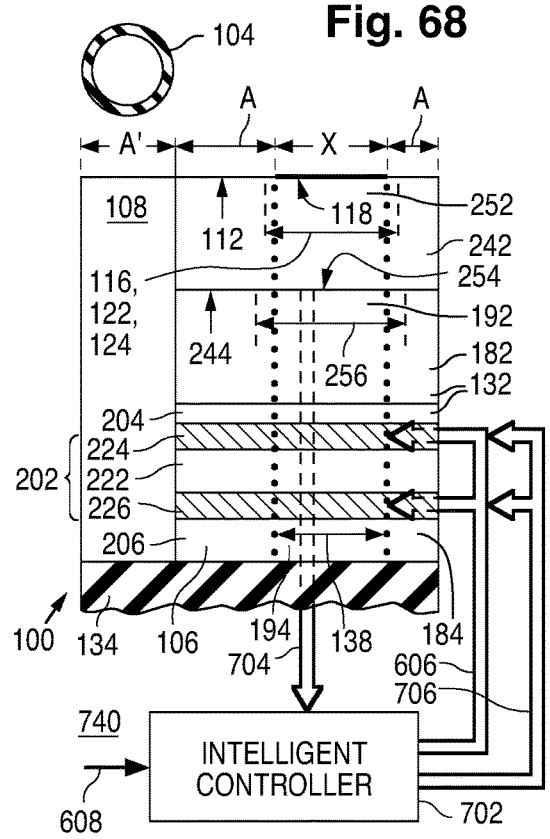
Fig. 67    Fig. 68
Fig. 69a    Fig. 69b

INFORMATION-PRESENTATION STRUCTURE WITH CELL ARRANGEMENT FOR IMPACT-SENSING COLOR CHANGE

CROSS-REFERENCES TO RELATED APPLICATIONS

This application is related to the following U.S. patent applications all filed the same date as this application and inventions of Ronald J. Meetin: U.S. patent application ("USPA") Ser. Nos. 15/343,101; 15/343,113; 15/343,115; 15/343,118; 15/343,121, now U.S. Pat. No. 9,789,381 B1; U.S. patent application Ser. Nos. 15/343,123; 15/343,125; 15/343,130; 15/343,131, now U.S. Pat. No. 9,855,485 B1; U.S. patent application Ser. Nos. 15/343,132; 15/343,133; 15/343,134, now U.S. Pat. No. 9,764,216 B1; U.S. patent application Ser. Nos. 15/343,136; 15/343,137; 15/343,140, now allowed; U.S. patent application Ser. Nos. 15/343,143; 15/343,148; 15/343,149; and 15/343,153, now U.S. Pat. No. 9,744,429 B1. To the extent not repeated herein, the contents of these other applications are incorporated by reference herein.

FIELD OF USE

This invention relates to information presentation, especially for sports such as tennis.

BACKGROUND

Two sides, each consisting of at least one player, compete against each other in a typical sport played with an object, such as a ball, which moves above a playing surface and often impacts the surface. Exemplary sports include tennis and basketball. The playing surface, referred to as a court, consists of an inbounds ("IB") playing area and an out-of-bounds ("OB") playing area demarcated by boundary lines. When the object impacts the OB area, the side that caused the object to go out of bounds is typically penalized. In tennis, a point is awarded to the other side. In basketball, possession of the basketball is awarded to the other side. Decisions as to whether the object impacts the playing surface in or out of bounds are often difficult to make for impacts close to the boundary lines.

Additionally, the IB area typically contains internal lines that place certain requirements on the sport. For instance, a tennis court contains three internal lines which, together with the tennis net and a pair of the boundary lines, define four servicecourts into which a tennis ball must be appropriately served to avoid a penalty against the server. It is often difficult to determine whether a served tennis ball impacting the playing surface close to one of these lines is "in" or "out". Each half of a basketball court usually has a three-point line. At least one shoe of a player shooting the basketball must contact the court behind the three-point line immediately prior to the shot with neither of the shooter's shoes touching the court on or inside the three-point line as the shot is taken for it to be eligible for three points. It is likewise difficult to determine whether this requirement is met when the shoes are close to the three-point line.

Returning to tennis, FIG. 1 illustrates the layout of playing surface 20 of a standard tennis court with line width somewhat exaggerated. For singles, playing surface 20 consists of rectangular IB playing area 22 and OB playing area 24 edgewise surrounding IB playing area 22 and extending to court boundary 26. Singles IB playing area 22 is defined inwardly by two opposite equal-width parallel straight baselines 28 and two opposite equal-width parallel straight singles sidelines 30 extending between baselines 28. Tennis net 32 is situated above a straight net line, usually imaginary but potentially real, extending parallel to baselines 28 substantially midway between them and extending lengthwise between and beyond singles sidelines 30 for dividing singles IB area 22 into two singles half courts.

Singles IB area 22 contains (i) two opposite equal-width parallel straight servicelines 34 situated between baselines 28 and extending lengthwise between singles sidelines 30 at equal distances from the imaginary or real net line and (ii) straight centerline 36 extending lengthwise between servicelines 34 at equal distances from singles sidelines 30. Lines 30, 34, and 36 in combination with the imaginary/real net line, and thus effectively net 32, define inwardly four equal-size rectangular services courts 38. Lines 28, 30, and 34 define two equal-size rectangular backcourts 40.

Playing surface 20 for doubles consists of IB playing area 42 and OB playing area 44 edgewise surrounding IB playing area 42 and extending to court boundary 26. Doubles IB playing area 42 is defined inwardly by baselines 28 and opposite equal-width straight doubles sidelines 46 located outside singles IB area 22. The imaginary/real net line situated below net 32 extends lengthwise between and beyond doubles sidelines 46 for dividing doubles IB area 42 into two doubles half courts. Net 32 extends fully across IB area 42 and into OB area 44. Rectangular doubles alleys 48 extend along doubles sidelines 46 outside singles sidelines 30. FIG. 2 is a less-labeled version of FIG. 1 in which roughly elliptical items 50, of somewhat exaggerated size, represent examples of areas where tennis balls, including just-served tennis balls, contact playing surface 20 and which are variously so close to the tennis lines that it may be difficult to make decisions, referred to as "line calls", on whether the balls are "in" or "out".

Players and tennis officials variously make line calls in tennis depending on the availability of officials. Numerous devices, including camera-based devices, have been investigated to assist in making line calls. One notable camera-based device is the Hawk-Eye system in which a group of video cameras in conjunction with a computer track moving tennis balls to provide simulations of their trajectories and predictions of their court contact areas. See Geiger, "How Tennis Can Save Soccer: Hawk-Eye Crossing Sports", *Illumin*, 25 Mar. 2013, 3 pp. FIG. 3 illustrates an example of simulated trajectory 60 of tennis ball 62 tracked with Hawk-Eye on one stroke. FIG. 4 depicts simulated contact area 64 of ball 62 near a sideline 30 on another stroke. As FIG. 4 indicates, Hawk-Eye provides a visual notification specifying whether ball 62 is in or out.

The Hawk-Eye simulations are displayed on a screen at which players (and officials) look to see the line calls. This disrupts play. As a result, Hawk-Eye is used for only certain line calls. In particular, officials initially make all line calls with each side allocated a small number of opportunities to challenge official-made calls per set provided that a challenge opportunity is retained if an official-made call is reversed. The use of challenges is distracting to the players. Hawk-Eye's accuracy depends on the accuracy of the predictive data analysis for the simulations and on Hawk-Eye's alignment to the tennis lines, assumed to be perfectly straight even though they are not perfectly straight. Hawk-Eye appears to occasionally make erroneous calls as discussed, e.g., in "Hawk-Eye", Wikipedia, en.wikipedia.org/wiki/Hawk-Eye, 18 Jul. 2013, 8 pp. While Hawk-Eye has gained high recognition among the camera-based devices, it is desirable to have a better device than Hawk-Eye or any other camera-based device for making line calls.

Line-calling systems utilizing tennis balls with special electrical or chemical treatments have been proposed as, e.g., disclosed in U.S. Pat. Nos. 4,109,911 and 7,632,197 B2. However, such systems are disadvantageous for various reasons. Erosion along the outside of a specially treated tennis ball as it contacts the tennis court and racquets may detrimentally affect the ball's ability to provide the information needed to appropriately communicate with the line-calling system. The electrical or chemical treatments may so affect the bounce characteristics that some tennis players are averse to using specially treated balls. Players and officials are generally unable to rapidly verify the accuracy of the calls.

The possibility of using piezochromic material in making line calls has been raised. A piezochromic material changes color upon applying suitable pressure and returns to the original color upon releasing the pressure. In Bradley, "Interview with William James Griffiths", *Reactive Reports*, June 2006, 3 pp., Griffiths proposes a thin device to be laid on a tennis court and to contain piezochromic material that changes color upon being impacted by a tennis ball. Griffiths mentions that (i) the piezochromic material would have to be shielded from ultraviolet radiation because piezochromic materials are ultraviolet sensitive and most tennis courts are outdoors and (ii) piezochromic materials generally undergo reverse color change too quickly for a person to check an impact location. Ferrara et al., "Intelligent design with chromogenic materials", *J. Int'l Colour Ass'n*, vol. 13, 2014, pp. 54-66, similarly proposes that electrochromic paint be applied at and near the lines of a tennis court for assistance in making line calls and that the same paint could be used for basketball, volleyball, and squash courts.

Tennis players are usually close to baselines 28 during much of a tennis match. The players' shoes would likely cause color changes near baselines 28 in a tennis court using the piezochromic material of Griffith or Ferrara et al. Shoe-caused color changes would sometimes partially or fully overlap ball-caused color changes and thereby degrade the ability of using ball-caused color changes in making line calls.

Charlson et al., International Patent Publication WO 2011/123515, discloses a "piezochromic" device, perhaps better described as an electrowetting device, which changes color in response to a force. One embodiment is a sports tape for determining whether a tennis ball is in or out. Other devices using pressure/force sensing have been investigated for assistance in making line calls as disclosed in, e.g., U.S. Pat. Nos. 3,415,517, 3,982,759, 4,365,805, 4,855,711, and 4,859,986. Line-calling devices using other technologies have also been investigated as, e.g., described in "Electronic line judge", Wikipedia, en.wikipedia.org/wiki/Electronic_line_judge_(tennis), 19 Jun. 2012, 3 pp. These other line-calling devices are impractical for one reason or another. It is desirable for tennis and other sports needing fast line calls to have a practical line-calling device or system which overcomes the disadvantages of prior art line-calling systems.

GENERAL DISCLOSURE OF THE INVENTION

The present invention furnishes an information-presentation structure in which suitable impact of an object on an exposed surface of an object-impact ("OI") structure during an activity such as a sport causes the surface to temporarily change color largely at the impact area. Specifically, a variable-color ("VC") region of the OI structure extends to the surface at a surface zone. In accordance with the invention, the VC region contains multiple VC cells arranged laterally in a layer, each cell extending to a corresponding part of the surface zone. The cells normally appear along their parts of the surface zone as a principal color. Each cell that meets threshold impact criteria in response to the object impacting the surface zone at an impact-dependent ("ID") object-contact ("OC") area, whose shape is capable of being arbitrary, temporarily becomes a criteria-meeting ("CM") cell that temporarily appears along its part of the surface zone as changed color materially different from the principal color.

An ID group of the cells temporarily constitute CM cells, the ID group being a plurality of less than all the cells. The surface parts of the CM cells form an ID print area of the surface zone. The print area closely matches the OC area in size, shape, and location. Color change can be achieved by changes in light reflected or emitted by the CM cells. The changes in reflection or emission can be achieved in various ways.

The cell architecture is highly advantageous. The boundary of the print area defined by the cell surface parts is clear. The color changes along the surface part of each CM cell without the color changing along the surface part of any neighboring cell not intended to undergo color change. The ambit of materials suitable for implementing the OI structure is increased because there is no need to limit the VC region to materials for which the effect of the impact does not laterally spread significantly beyond the OC area. Essentially any desired print accuracy can be achieved by adjusting the cell density. If the threshold impact criteria are to vary along the surface zone, neighboring cells can readily be provided with different threshold impact criteria.

Each cell preferably includes an impact-sensitive ("IS") part and a color-change ("CC") part. The IS part of each CM cell responds to the impact by providing a cellular impact effect. The CC part of each CM cell responds to its impact effect by causing that cell to temporarily appear along its part of the surface zone as the changed color. Use of separate IS and CC parts in each cell provides many benefits. More materials are capable of separately performing the impact-sensing and color-changing operations than of jointly performing them. The ambit of colors for implementing the principal and changed colors is increased. The two colors can be created in different shades by varying the reflection characteristics of the IS parts, usually largely transparent, without changing the CC parts. The ruggedness for withstanding object impacts is enhanced thereby enabling the lifetime to be increased. The ability to select and control the CC timing is improved.

Instead of having cells that meet the threshold impact criteria change color directly in response to the impact, each cell meeting the threshold impact criteria in response to the impact can temporarily become a threshold CM cell that provides a characteristics-identifying impact signal identifying cellular supplemental impact information of the object impacting the OC area as experienced at that threshold CM cell. Responsive to the impact signal of each threshold CM cell, a CC controller combines the cellular supplemental information of that threshold CM cell with the cellular supplemental information of any other threshold CM cell to form general supplemental impact information. The CC controller then determines whether the general supplemental impact information meets supplemental impact criteria, and, if so, provides a cellular CC initiation signal to each threshold CM cell for causing it to become a full CM cell and temporarily appear as the changed color. The supplemental impact criteria are typically used for distinguishing between impacts for which color change is desired and impacts, e.g., of bodies other than the object, for which color change is not desired.

The activity can be tennis in which the object is a tennis ball. If so, the OI structure is incorporated into a tennis court for which the exposed surface has two baselines, two sidelines, two servicelines, and a centerline arranged conventionally. Each baseline, the sidelines, and the serviceline nearest that baseline define a backcourt so as to establish two backcourts. The present CC capability can be incorporated into various parts of the tennis court. For instance, the surface zone can be constituted with two VC backcourt area portions which partly occupy the backcourts and respectively adjoin the servicelines along largely their entire lengths. The CC capability is then used in determining whether served tennis balls are "in" or "out".

The present CC capability enables a viewer to readily visually determine where the object impacted the exposed surface. The accuracy in determining the location of the print area is very high. A tennis player playing on a tennis court having the CC capability can, in the vast majority of instances, visually see whether a tennis ball impacting the court near a tennis line is "in" or "out". Both the need to use challenges for reviewing line calls and the delay for line-call review are greatly reduced. The present CC capability can be used in other sports, e.g., basketball, volleyball, football, and baseball/softball. While often a ball, the object can be implemented in other form such as a shoe of a person. The CC capability can also be used in activities other than sports. In brief, the invention provides a very large advance over the prior art.

BRIEF DESCRIPTION OF THE DRAWINGS

FIGS. 1 and 2 are layout view of a standard tennis court with examples of areas where tennis balls contact the court's playing surface near the tennis lines indicated in FIG. 2.

FIGS. 3 and 4 are schematic diagrams of simulations of a tennis ball impacting a tennis court as determined by the Hawk-Eye system.

FIGS. 11a-11c, 12a-12c, 13a-13c, 14a-14c, 15a-15c, 16a-16c, 17a-17c, 18a-18c, and 19a-19c are cross-sectional side views of nine respective further embodiments of the OI structure of FIGS. 5a-5c according to the invention.

FIGS. 26a and 26b, 27a and 27b, 28a and 28b, 29a and 29b, 30a and 30b, and 31a and 31b are cross-sectional side views showing how color changing occurs by light reflection in VC regions. FIGS. 26a and 26b apply to the VC region in FIGS. 6a-6c or 20a and 20b. FIGS. 27a and 27b apply to the VC region in FIGS. 11a-11c. FIGS. 28a and 28b apply to some embodiments of the VC region in FIGS. 12a-12c or 21a and 21b. FIGS. 29a and 29b apply to the VC region in FIGS. 13a-13c. FIGS. 30a and 30b apply to the VC region in FIGS. 14a-14c. FIGS. 31a and 31b apply to some embodiments of the VC region in FIGS. 15a-15c.

FIGS. 32a and 32b apply to the VC region in FIGS. 6a-6c or 20a and 20b. FIGS. 33a and 33b apply to the VC region in FIGS. 11a-11c. FIGS. 34a and 34b apply to the VC region in FIGS. 12a-12c or 21a and 21b. FIGS. 35a and 35b apply to the VC region in FIGS. 13a-13c. FIGS. 36a and 36b apply to the VC region in FIGS. 14a-14c. FIGS. 37a and 37b apply to the VC region in FIGS. 15a-15c.

FIGS. 41a and 41b, 42a and 42b, 43a and 43b, 44a and 44b, 45a and 45b, 46a and 46b, 47a and 47b, 48a and 48b, 49a and 49b, and 50a and 50b are cross-sectional side views of ten respective embodiments of the OI structure of FIGS. 38a and 38b.

FIG. 51 is an expanded cross-sectional view of an embodiment of the cellular ISCC structure in the OI structure of FIGS. 41a and 41b, 44a and 44b, 47a and 47b, or 49a and 49b.

FIGS. 65-68 are composite block diagrams/side cross-sectional views of four respective embodiments of the IP structure of FIGS. 64*a* and 64*b* according to the invention. The cross section of the layout portion of each of FIGS. 65-68 is taken through plane b6-b6 in FIG. 64*b*.

FIGS. 69*a* and 69*b* are composite block diagrams/layout views of an IP structure containing an OI structure having a surface for being impacted by an object at an ID area and for changing color along a corresponding print area of a cellular VC region under control of an intelligent controller according to the invention.

Like reference symbols are employed in the drawings and in the description of the preferred embodiments to represent the same, or very similar, item or items.

DESCRIPTION OF THE PREFERRED EMBODIMENTS

Figure 5A:
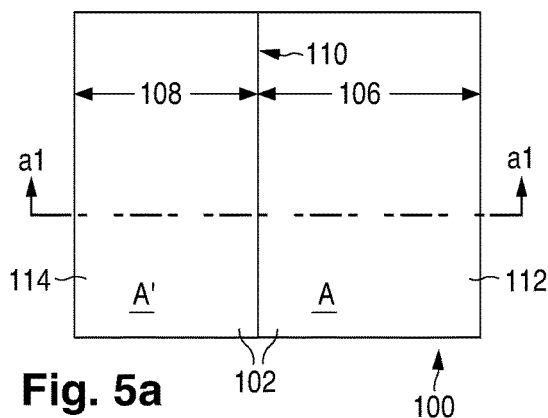
FIGS. 5a-5c are layout views of an object-impact ("OI") structure of an information-presentation ("IP") structure embodiable or/and extendable according to the invention, the OI structure having a surface for being impacted by an object at an impact-dependent ("ID") area and for changing color along a corresponding print area of a variable-color ("VC") region. The cross section of each of FIGS. 6a, 11a, 12a, 13a, 14a, 15a, 16a, 17a, 18a, and 19a described below is taken through plane a1-a1 in FIG. 5a. The cross section of each of FIGS. 6b, 11b, 12b, 13b, 14b, 15b, 16b, 17b, 18b, and 19b described below is taken through plane b1-b1 in FIG. 5b. The cross section of each of FIGS. 6c, 11c, 12c, 13c, 14c, 15c, 16c, 17c, 18c, and 19c described below is taken through plane c1-c1 in FIG. 5c.

Table of Contents
 Preliminary Material
 Basic Object-impact Structure Having Variable-color Region
 Timing and Color-difference Parameters
 Object-impact Structure Having Variable-color Region Formed with Impact-sensitive Changeably Reflective or Changeably Emissive Material
 Object-impact Structure Having Separate Impact-sensitive Component and Changeable Reflective or Changeably Emissive Color-change Component
 Object-impact Structure Having Impact-sensitive Component and Color-change Component that Utilizes Electrode Assembly
 Configuration and General Operation of Electrode Assembly
 Electrode Layers and their Characteristics and Compositions
 Reflection-based Embodiments of Color-change Component with Electrode Assembly
 Emission-based Embodiments of Color-change Component with Electrode Assembly
 Object-impact Structure Having Surface Structure for Protection, Pressure Spreading, and/or Velocity Restitution Matching
 Object-impact Structure Having Deformation-controlled Extended Color-change Duration
 Equation-form Summary of Light Relationships
 Transmissivity Specifications
 Manufacture of Object-impact Structure
 Object-impact Structure with Print Area at Least Partly around Unchanged Area
 Configurations of Impact-sensitive Color-change Structure
 Pictorial Views of Color Changing by Light Reflection and Emission
 Object-impact Structure with Cellular Arrangement
 Adjustment of Changed-state Duration
 Intelligent Color-change Control
 Image Generation and Object Tracking
 Multiple Variable-color Regions
 Curve Smoothening
 Color Change Dependent on Location in Variable-color Region of Single Normal Color
 Sound Generation
 Accommodation of Color Vision Deficiency
 Tennis Implementations
 Other Sports Implementations
 Velocity Restitution Matching
 Variations
Preliminary Material The visible light spectrum extends across a wavelength range specified as being as narrow as 400-700 nm to as wide as 380-780 nm. Light in the visible wavelength range produces a continuous variation in spectral color from violet to red. A visible color is black, any spectral color, and any color creatable from any combination of spectral colors. For instance, visible color includes white, gray, brown, and magenta because each of them is creatable from spectral colors even though none of them is itself in the visible spectrum. Further recitations of color or light herein mean visible color or visible light. Radiation in the ultraviolet and infrared spectra are respectively hereafter termed ultraviolet ("UV") and infrared ("IR") radiation.

Various wavelength ranges are reported for the main spectral colors. Although indigo or/and cyan are sometimes identified as main spectral colors, the main spectral colors are here considered to be violet, blue, green, yellow, orange, and red having the wavelength ranges presented in Table 1 and determined as the averages of the ranges reported in ten references rounded off to the nearest 5 nm using the maximum specified range of 380-780 nm for the visible spectrum.

TABLE 1

| Color | Wavelength Range (nm) |
|---|---|
| Violet | 380-445 |
| Blue | 445-490 |
| Green | 490-570 |
| Yellow | 570-590 |
| Orange | 590-630 |
| Red | 630-780 |

Recitations of light striking, or incident on, a surface of a body mean that the light strikes, or is incident on, the surface from outside the body. The color of the surface is determined by the wavelengths of light leaving the surface and traveling away from the body. Such light variously consists of incident light reflected by the body so as to leave it along the surface, light emitted by the body so as to leave it along the surface, and light leaving the body along the surface after entering the body along one or more other surfaces and passing through the body. Even if the characteristics that define the color of the surface are fixed, its color can differ if it is struck by light of different wavelength characteristics. For instance, the surface appears as one color when struck by white light but as another color when struck by non-white light.

If a person directly views the body, the color of the surface is directly determined by the wavelengths of the light traveling from the surface to the person's eye(s) and the brain's interpretation of those wavelengths. If an image of the surface is captured by a color camera whose captured image is later viewed by a person, the surface's color is initially established by the wavelengths of the light traveling from the surface to the camera. The surface's color as presented in the image is then determined by the wavelengths of the light traveling from the image to the person's eye(s) and the brain's interpretation of those wavelengths. In either case, the wavelengths of light leaving the surface define its color subject, for the camera, to any color distortion introduced by the camera.

The radiosity, sometimes termed intensity, of light of a particular color is the total power per unit area of that light leaving a body along a surface. The spectral radiosity of light of a particular color is the total power per unit area per unit wavelength at each wavelength of light leaving a body along a surface. The spectral radiosity constituency (or spectral radiosity profile) of light of a particular color is the variation (or distribution) of spectral radiosity as a function of wavelength and defines the wavelength constituency of that light. Inasmuch as the spectral radiosity of light is zero outside the visible spectrum, the radiosity of light of a particular color is the integral of the spectral radiosity constituency across the visible spectrum.

Two colors differ when their spectral radiosity constituencies differ. The spectrum-integrated absolute spectral radiosity difference between light of two different colors is the integral of the absolute value of the difference between the spectral radiosities of the two colors across the visible spectrum. For light passing through a body, the spectral radiosity of light leaving it may differ from that of light entering it due to phenomena such as light absorption in the body. For instance, if light appears as a shade of a color upon entering a body and if the light's radiosity decreases in passing through the body, the light appears as a lighter shade of that color upon leaving the body. When light leaving a body along a surface of the body has multiple reflected components, each reflected component differs from each other reflected component because the light reflected by each reflected component causes its spectral radiosity constituency to differ from the spectral radiosity constituency of each other reflected component.

The normalized spectral radiosity of light of a particular color is its spectral radiosity divided by its radiosity. The normalized spectral radiosity constituency of light of a particular color is the variation of its normalized spectral radiosity as a function of wavelength. The integral of the normalized spectral radiosity constituency across the visible spectrum is one. For light passing through a body, use of the same reference nomenclature to identify the light leaving the body as used to identify the light entering it means that the normalized spectral radiosity constituency remains essentially the same during passage through the body even though the spectral radiosity constituency may change during the passage. This convention is used below for light undergoing plane polarization in passing through a body.

Rods and cones in the human eye are sensitive to incoming light. Rods are generally sensitive to the radiosity of the light. Cones are generally sensitive to its spectral radiosity and thus to its wavelength constituency. Cones consist of (a) short-wavelength, or "blue", cones sensitive to light typically in the wavelength range of 380-520 nm with a typical peak sensitivity at 420-440 nm, (b) medium-wavelength, or "green", cones sensitive to light typically in the wavelength range of 440-650 nm with a typical peak sensitivity at 535-555 nm, and (c) long-wavelength, or "red", cones sensitive to light typically in the wavelength range of 480-780 nm with a typical peak sensitivity at 565-580 nm. As this data indicates, the sensitivity ranges overlap considerably, especially for green and red cones. Electrical impulses indicative of the stimulation of rods and cones by light are supplied to the brain which interprets the impulses to assign an appropriate color pattern to the light.

Light entering the human eye at a wavelength in the medium-wavelength range commonly stimulates at least two of the three types of cones and often all three types. An example clarifies this. Light in the yellow range, largely 570-590 nm, stimulates red and green cones so that the brain interprets the impulses from the rods and red and green cones as yellow. Assume that the eye receives equal intensities of light in the green range, largely 490-570 nm, and the red range, largely 630-780 nm, for stimulating red and green cones the same as the light in the yellow range. The brain interprets the electrical impulses from the rods and red and green cones as yellow. Except for the colors at the ends of the visible spectrum, there is normally a continuous regime of suitable combinations for creating any color dependent on wavelength and radiosity.

A recitation that two or more colors materially differ herein means that the colors differ materially as viewed by a person of standard (or average) eyesight/brain-processing capability. The verb "appear", including grammatical variations such as "appearing", as used herein for the chromatic characteristics of light means its apparent color as perceived by the standard human eye/brain. A recitation that a body appears along a surface of the body as a specified color means that the body appears along the surface "largely" as that color. In particular, the spectral radiosity constituency of light of the specified color may so vary across the surface that the specified color is a composite of different colors. The surface portions from where light of wavelengths suitable for the different colors leave the body are usually so microscopically distributed among one another or/and occupy area sufficiently small that the standard human eye/brain interprets that light as essentially a single color.

A "species" of light means light having a particular spectral radiosity constituency. Although a light species produces a color when only light of that species leaves a surface of a body, only some of the below-described light species are described as being of wavelength suitable for forming colors. A recitation that multiple species of the total light leaving a body along a surface area form light of wavelength suitable for a particular color also means that the body appears along the area as that color. A recitation that light leaves a body along an adjoining body means that the light leaves the first body along the interface between the two bodies and vice versa. When all the light leaving a body along an internal interface with another body is of wavelength suitable for a selected color, the first body would visually appear as the selected color along the interface if it were an exposed surface.

Each color identified below by notation beginning with a letter, e.g., "A" or "X", means a selected color. Each such selected color may be a single color or a combination of colors appearing as a single color due to suitable mixture of light of wavelengths of those colors. The expression "light of wavelength" means one or more subranges of the wavelength range of the visible spectrum. When a particular color is identified by reference notation, the terminology consisting of that reference notation followed by the word "light" means a species of light of wavelength of that color, i.e., suitable for forming that color. For instance, "V light" means a species of light of wavelength suitable for forming color V. A recitation that two or more colors differ means that light of those colors differs. If the colors are indicated as differing in a particular way, e.g., usually or materially, the light of those colors differ in the same way.

Instances occur in which a body is described as reflecting or emitting light of wavelength of a selected color. Letting that light be termed the "selected color light", the reflection or emission of the selected color light may occur generally along a surface of the body, i.e., directly at the surface or/and at locations internal to the body within short distances of the surface such that the reflected or emitted light does not undergo significant attenuation in traveling those short distances. The body may be sufficiently transmissive of the selected color light that it is alternatively or additionally reflected or emitted inside the body at substantial distances away from the surface and undergoes significant attenuation before exiting the body via the surface. Light striking a body and not reflected by it is absorbed or/and transmitted by it.

The term "encompasses" means is common to (or includes), usually along a surface. For instance, a first item partly encompasses a second item when part of the area of the second item along a suitable surface is common to the first item. A description of an essentially two-dimensional first item as "outwardly conforming" to an essentially two-dimensional second item means that the perimeter of the first item, or the outer perimeter of the first item if it is shaped, e.g., as an annulus, to have outer and inner perimeters relative to its center, conforms to the perimeter of the second item, or to the outer perimeter of the second item if it is likewise shaped to have outer and inner perimeters relative to its center.

A "thickness location" of a body means a location extending largely fully through the body's thickness. There are instances in which the transmissivity of a body at one or more thickness locations to light perpendicularly incident on the body at at least wavelength suitable for one or more selected colors is presented as a group of transmissivity specifications. These transmissivity specifications include a usual minimum value for the body's transmissivity to light perpendicularly incident on a surface of the body at wavelength suitable for a selected color where the body normally visually appears along the surface as a principal color and where an impact-dependent print area of the surface changes color in response to an object impacting the surface at an object-contact area generally outwardly conforming to the print area so that it temporarily appears as changed color materially different from the principal color.

The body may have thickness locations where the transmissivity of the perpendicularly incident light is less than the usual minimum. If so, the corresponding locations along the surface still normally appear as the principal color due to phenomena such as light scattering and non-perpendicular light reflection and by arranging for such thickness locations to be sufficiently laterally small that their actual colors are not significantly perceivable by the standard human eye/brain. Any such corresponding locations along the print area similarly temporarily appear as the changed color. The body meets the requisite color appearances along the surface, including the print area, even though the body's transmissivity to the incident light is less than the usual minimum at one or more thickness locations.

Material is transparent if the shape of a body separated from the material only by air or vacuum can be clearly and accurately seen through the material. The material is transparent even if the body's shape is magnified or shrunk as seen through the material. Transparent material is clear transparent if the color(s) of the body as seen through the material are the same as the body's actual color(s). Transparent material is tinted transparent if the color(s) of the body as seen through the material differ from the body's actual color(s) due to tinting light reflection by the material.

Various instances are described below in which light incident on the first region of a body containing first and second regions is partly reflected and partly transmitted by the first region so as to be incident on the second region which at least partly reflects the transmitted light. The light reflected by the first region is of wavelength suitable for a first color. The light reflected by the second region is of wavelength suitable for a second color. Even if not explicitly stated, the two colors necessarily differ because light reflection by the first region causes the spectral radiosity constituency of the second color to lack at least part of the spectral radiosity constituency of the first color and thus to differ from the spectral radiosity constituency of the first color. If the two regions have identical reflection characteristics, the second color is black because the first region reflects the light needed for the second color to be non-black.

The term "impact-dependent" as used in describing a three-dimensional region or a surface area means that the lateral extent of the region or area depends on the lateral extent of the location where an object impacts the region or area. Impact-dependent segments of auxiliary layers, electrode assemblies, electrode structures, and core layers are often respectively described below as auxiliary segments, assembly segments, electrode segments, and core segments.

An "arbitrary" shape means any shape and includes shapes not significantly restricted to a largely fixed characteristic, such as a largely fixed dimension, along the shape. An arbitrary shape is not limited to one or more predefined shapes such as polygons, regular closed curves, and finite-width lines, straight or curved. Recitations of an action occurring "along" a body or along a surface of a body mean that the action occurs within a short distance of the surface, often inside the body, and not necessarily at the surface. The expressions "situated fully along", "lying fully along", "extending fully along", and grammatical variations mean adjoining along substantially the entire length (of).

The words "overlying" and "underlying" used below in describing structures apply to the orientations of those structures as shown in the drawings. The same applies to "over", "above", "under", and "below" as used in a directional sense in describing such structures. These six words are to be interpreted to mean corresponding other directional-sense words for structures configured identical to, but oriented differently than, those shown in the drawings.

A majority component of a multi-component item is a component constituting more than 50% of the item according to a suitable measurement. An N % majority component of a multi-component item is a component constituting at least N % of the item where N is a number greater than 50. Each provision that light of a first species is a (or the) majority component of light of a second species means that the light of the first species is radiositywise, i.e., in terms of radiosity, a (or the) majority component of light of the second species. A majority component of a color means radiositywise a majority component of light forming that color. The percentage difference between two values of a parameter means the quotient, converted to percent, of their difference and average.

The term "normally" refers to actions occurring during the normal state, explained below, in the object-impact structures of the invention, e.g., the expression "normally appears" means visually appears during the normal state. Other time-related terms, such as "usually" and "typically", are used to describe actions occurring during the normal state but not limited to occurring during the normal state. The term "temporarily" refers to actions occurring during the changed state, defined below, in the object-impact structures, e.g., the expression "temporarily appears" means visually appears during the changed state. Force acting on a body normal, i.e., perpendicular, to a surface where it is contacted by the body, is termed "orthogonal" force herein to avoid confusion with the meaning of "normal" otherwise used herein.

The term "or/and" or "and/or" between a pair of items means either or both items. Similarly, "or/and" or "and/or" before the next-to-last item of three or more items means any one or more, up to all, of the items. Use of multiple groups of items in a sentence where each group of items has an or before the last item in that group means, except as the context otherwise indicates, that the first items in the groups are associated with each other, that the second items in the groups are associated with each other, and so on. For instance, a recitation of the form "Item J1, J2, or J3 is connected to item K1, K2, or K3" means that item J1 is connected to item K1, item J2 is connected to item K2, and item J3 is connected to item K3. The plural term "criteria" is generally used below to describe the various types of standards used in the invention because each type of standards is generally capable of consisting of multiple standards.

All recitations of the same, uniform, identical, a single, singly, full, only, constant, fixed, all, the entire, straight, flat, planar, parallel, perpendicular, conform, continuous, adjacent, adjoin, opposite, symmetrical, mirror image, simultaneous, independent, transparent, block, absorb, non-emissive, passive, prevent, absent, and grammatical variations ending in "ly" respectively mean largely the same, largely uniform, largely identical, largely a single, largely singly, largely fully, largely only, largely constant, largely fixed, largely all, largely the entire, largely straight, largely flat, largely planar, largely parallel, largely perpendicular, largely conform, largely continuous, largely adjacent, largely adjoin, largely opposite, largely symmetrical, largely mirror image, largely simultaneous, largely independent, largely transparent, largely block, largely absorb, largely non-emissive, largely passive, largely prevent, largely absent, and "largely" followed by the variations ending in "ly" except as otherwise indicated. A recitation that multiple light species form a further light species includes the meaning that the multiple species largely form the further light species. Each recitation providing that later textual material is the same as earlier textual material means that the earlier material is incorporated by reference into the later material.

Each signal described below as being transmitted via a communication path, e.g., in a network of communication paths, is transmitted wirelessly or via one or more electrical wires of that communication path. A recitation that a body undergoes a change in response to a signal means that that the change occurs due to a change in a variable, e.g., current and voltage, in which the signal exists. Light provided from a particular source or in a particular way such as emission or reflection may be viewed as a light beam. Light provided from multiple sources or in multiple ways may be viewed as multiple light beams.

The terms "conductive", "resistive", and "insulating" respectively mean electrically conductive, electrically resistive, and electrically insulating except as otherwise indicated. A material having a resistivity less than 10 ohm-cm at 300° K (approximately usual room temperature) is deemed to be conductive. A material having a resistivity greater than $10^{10}$ ohm-cm at 300° K is deemed to be insulating (or dielectric). A material having a resistivity from 10 ohm-cm to $10^{10}$ ohm-cm at 300° K is deemed to be resistive. Resistive materials conduct current with the conduction capability progressively increasing as the resistivity decreases from $10^{10}$ ohm-cm to 10 ohm-cm at 300° K. Inasmuch as conductivity is the inverse of resistivity, conductivity-based criteria are numerically the inverse of resistivity-based criteria.

The order in which the elements of an inorganic chemical compound appear below in the compound's chemical name or/and chemical formula generally follows the standards of the International Union of Pure and Applied Chemistry ("IUPAC"). That is, a more electronegative element follows a less electronegative element in the name and formula of an inorganic compound. In some situations, use of the IUPAC element-ordering convention for inorganic compounds results in element orderings different from that generally or sometimes used. Such situations are accommodated herein by presenting other orderings of the chemical formulas in brackets following the IUPAC chemical formulas.

The following acronyms are used as adjectives below to shorten the description. "AB" means assembly. "ALA" means attack-line-adjoining. "ALV" means attack-line-vicinity. "BC" means backcourt. "BLA" means baseline-adjoining. "BP" means beyond-path. "By" means boundary-vicinity. "CC" means color-change. "CE" means changeably emissive. "CI" means characteristics-identifying. "CLA" means centerline-adjoining. "CM" means criteria-meeting. "COM" means communication. "CR" means changeably reflective. "DE" means duration-extension. "DF" means deformation. "DP" means distributed-pressure. "ELA" means endline-adjoining or end-line-adjoining. "EM" means electromagnetic. "FA" means far auxiliary. "FC" means fixed-color. "FE" means far electrode. "FLT" means foul-territory. "FLV" means foul-line-vicinity. "FRT" means fair-territory. "GAB" means general assembly. "GFA" means general far auxiliary. "HA" means half-alley. "IB" means inbounds. "ID" means "impact-dependent". "IDVC" means impact-dependent variable-color. "IF" means interface. "IG" means image-generating. "IP" means information-presentation. "IS" means impact-sensitive. "ISCC" means impact-sensitive color-change. "LA" means line-adjoining. "LC" means liquid-crystal. "LE" means light-emissive. "LI" means location-identifying. "NA" means near auxiliary. "NE" means near electrode. "OB" means out-of-bounds. "OC" means object-contact. "OI" means object-impact. "OS" means object-separation. "OT" means object-tracking. "PA" means print-area. "PAV" means print-area vicinity. "PS" means pressure-spreading. "PSCC" means pressure-sensitive color-change. "PZ" means polarization. "RA" means reflection-adjusting. "QC" means quartercourt. "SC" means servicecourt. "SF" means surface. "SLA" means sideline-adjoining or side-line-adjoining. "SS" means surface-structure. "SVLA" means serviceline-adjoining. "TH" means threshold. "VA" means voltage-application. "VC" means variable-color. "WI" means wavelength-independent. "XN" means transition. "3P" means three-point. "3PL" means three-point-line. "3PLV" means three-point-line-vicinity.

Basic Object-impact Structure having Variable-color Region

Figure 5B:
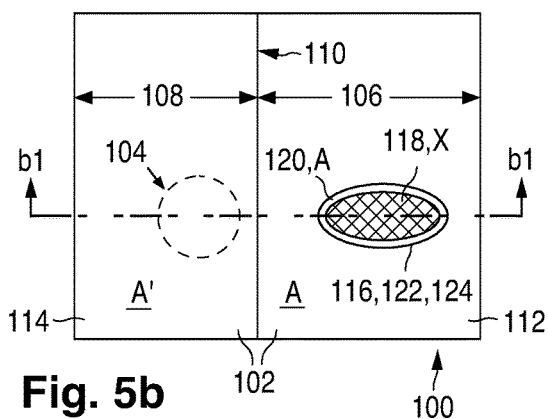
Figure 5C:
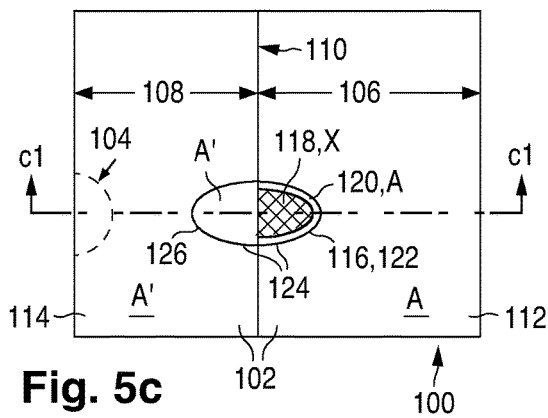

FIGS. 5*a*-5*c* (collectively "FIG. 5") illustrate the layout of a basic object-impact structure 100 which undergoes reversible color changes along an externally exposed surface 102 according to the invention when exposed surface 102 is impacted by an object 104 during an activity such as a sport. "OI" hereafter means object-impact. "Impact" hereafter means impact of object 104 on surface 102. FIG. 5*a* presents the general layout of OI structure 100. FIGS. 5*b* and 5*c* depict exemplary color changes that occur along surface 102 due to the impact. Object 104 leaves surface 102 subsequent to impact and is indicated in dashed line in FIGS. 5*b* and 5*c* at locations shortly after impact. Although object 104 is often directed toward particular locations on surface 102, object 104 can generally impact anywhere on surface 102.

Object 104 is typically airborne and separated from other solid matter prior to impact. For a sports activity, object 104 is typically a sports instrument such as a spherical ball, e.g., a tennis ball, basketball, or volleyball when the activity is tennis, basketball, or volleyball. Object 104 can, however, be part of a larger body that may not be airborne prior to impact. For instance, object 104 can be a shoe on a foot of a person such as a tennis, basketball, or volleyball player. Different embodiments of OI structure 100 can be employed, usually in different parts of surface 102, so that the embodiments of object 104 differ from OI embodiment to OI embodiment.

OI structure 100, which serves as or in an information-presentation structure, is used in determining whether object 104 impacts a specified zone of surface 102. In this regard, structure 100 contains a principal variable-color region 106 and a secondary fixed-color region 108 which meet at a region-region interface 110. "VC" and "FC" hereafter respectively mean variable-color and fixed-color. Although interface 110 appears straight in FIG. 5, VC region 106 and FC region 108 can be variously geometrically configured along interface 110, e.g., curved, or flat and curved. They can meet at corners. FC region 108 can extend partly or fully laterally around VC region 106 and vice versa. For instance, region 108 can adjoin region 106 along two or more sides of region 106 if it is shaped laterally like a polygon and vice versa.

VC region 106 extends to surface 102 at a principal VC surface zone 112 and normally appears along it as a principal surface color A during the activity. See FIG. 5a. "SF" hereafter means surface. This occurs because only A light normally leaves region 106 along SF zone 112. Region 106 is then in a state termed the "normal state". Recitations hereafter of (a) region 106 normally appearing as principal SF color A mean that region 106 normally appears along zone 112 as color A, (b) A light leaving region 106 mean that A light leaves it via zone 112, and (c) colors and color changes respectively mean colors present, and color changes occurring, during the activity. Region 106 contains principal impact-sensitive color-change structure along or below all of zone 112. "ISCC" hereafter means impact-sensitive color-change. Examples of the ISCC structure, not separately indicated in FIG. 5, are described below and shown in later drawings. Region 106 may contain other structure described below.

FC region 108, which extends to surface 102 at a secondary FC SF zone 114, fixedly appears along FC SF zone 114 as a secondary SF color A'. Secondary SF color A' is often the same as, but can differ significantly from, principal color A. Region 108 can consist of multiple secondary FC subregions extending to zone 114 so that consecutive ones appear along zone 114 as different secondary colors A'. Except as indicated below, region 108 is hereafter treated as appearing along zone 114 as only one color A'. SF zones 112 and 114 meet at an SF edge of interface 110.

An impact-dependent portion of VC region 106 responds to object 104 impacting SF zone 112 at a principal impact-dependent object-contact area 116 (laterally) spanning where object 104 contacts (or contacted) zone 112 by temporarily appearing along a corresponding principal impact-dependent print area 118 of zone 112 as a generic changed SF color X (a) in some general OI embodiments if the impact meets (or satisfies) principal basic threshold impact criteria or (b) in other general OI embodiments if region 106, specifically the impact-dependent portion, is provided with a principal general color-change control signal generated in response to the impact meeting the principal basic threshold impact criteria sometimes (conditionally) dependent on other impact criteria also being met in those other embodiments. See FIGS. 5b and 5c. "ID", "OC", "TH", and "CC" hereafter respectively mean impact-dependent, object-contact, threshold, and color-change. The ID portion of region 106 is hereafter termed the principal IDVC portion where "IDVC" hereafter means impact-dependent variable-color. Instances in which the principal IDVC portion, often simply the IDVC portion, changes to appear as generic changed SF color X along ID print area 118 in response to the principal general CC control signal are described below, particularly beginning with the structure of FIGS. 64a and 64b.

ID OC area 116 is capable of being of substantially arbitrary shape. Print area 118 constitutes part of zone 112, all of which is capable of temporarily appearing as generic changed SF color X. Print area 118 closely matches OC area 116 in size, shape, and location. In particular, print area 118 at least partly encompasses OC area 116, at least mostly, usually fully, outwardly conforms to it, and is largely concentric with it. The principal basic TH impact criteria can vary with where print area 118 occurs in zone 112.

When VC region 106 includes structure besides the ISCC structure, an ID segment of the ISCC structure specifically responds to object 104 impacting OC area 116 by causing the IDVC portion to temporarily appear along print area 118 as changed color X (a) in some general OI embodiments if the impact meets the basic TH impact criteria or (b) in other general OI embodiments if the ID ISCC segment is provided with the general CC control signal generated in response to the impact meeting the basic TH impact criteria again sometimes dependent on other impact criteria also being met in those other embodiments. In any event, the appearance of the IDVC portion along area 118 as changed SF color X occurs because only X light temporarily leaves the IDVC portion along area 118. Color X differs materially from color A and usually from color A'. Hence, X light differs materially from A light. Recitations hereafter of (a) the IDVC portion temporarily appearing as color X mean that the IDVC portion temporarily appears along area 118 as color X and (b) X light leaving the IDVC portion mean that X light leaves it via area 118.

Importantly, the impact usually leads to color change along surface 102 only at print area 118 closely matching OC area 116 in size, shape, and location. Although other impacts of object 104 may cause color change at other locations along surface 102, a particular impact of object 104 usually does not lead to, and is usually incapable of leading to, color change at any location along surface 102 other than print area 118 for that impact. Persons viewing surface 102 therefore need essentially not be concerned about a false color change along surface 102, i.e., a color change not accurately representing area 116.

The spectral radiosity constituency of A light may vary across SF zone 112. That is, principal color A may be a composite of different colors such as primary colors red, green, and blue. The parts of zone 112 from where light of wavelengths for the different colors leaves zone 112 are usually so microscopically distributed among one another that the standard human eye/brain interprets that light as essentially a single color.

The spectral radiosity constituency of X light may similarly vary across print area 118 so that changed color X is also a composite of different colors. One color in such a color X composite may be color A or, if it is a composite of different colors, one or more colors in the color X composite may be the same as one or more colors in the color A composite. If so, the parts of area 118 from where light of wavelengths for the different colors in the color X composite leaves area 118 are so microscopically distributed among one another that, across area 118, the standard human eye/brain does not separately distinguish color A or any color identical to a color in the color A composite. Color X, specifically the color X composite, still differs materially from color A despite the color X composite containing color A or a color identical to a color in the color A composite.

The principal basic TH impact criteria consist of one or more TH impact characteristics which the impact must meet for the IDVC portion to temporarily appear as color X. There are two primary locations for assessing the impact's effects to determine whether the TH impact criteria are met: (i) directly at SF zone 112 and (ii) along a plane, termed the internal plane, extending laterally through VC region 106 generally parallel to, and spaced apart from, zone 112. In either case, the impact is typically characterized by an impact parameter P that varies between a perimeter (first)

value $P_{pr}$ and an interior (second) value $P_{in}$. For zone 112, perimeter value $P_{pr}$ exists along the perimeter of OC area 116 while interior value $P_{in}$ exists at one or more points inside area 116. For the internal plane, perimeter value $P_{pr}$ exists along the perimeter of a projection of area 116 onto the internal plane while interior value $P_{in}$ exists at one or more points inside that projection. Area 116 and the projection can differ in size as long as a line extending perpendicular to area 116 through its center also extends perpendicular to the projection through its center. The difference $\Delta P_{max}$ between values $P_{pr}$ and $P_{in}$ is the absolute value of the maximum difference between any two values of impact parameter P across area 116 or the projection.

For the situation in which the IDVC portion temporarily appears as changed color X if the impact meets the basic TH impact criteria and thus momentarily putting aside the situation dealt with further below in which the IDVC portion temporarily appears as color X if the ID ISCC segment is provided with the general CC control signal generated in response to both the TH impact criteria and other impact criteria being met, the TH impact criteria are met at each point, termed a criteria-meeting point, inside OC area 116 or the projection of area 116 where the absolute value $\Delta P$ of the difference between impact parameter P and perimeter value $P_{pr}$ equals or exceeds a local TH value $\Delta P_{thl}$ of parameter difference $\Delta P$. "CM" hereafter means criteria-meeting. Local TH parameter difference value $\Delta P_{thl}$ lies between zero and maximum parameter difference $\Delta P_{max}$. For each CM point, a corresponding point along SF zone 112 temporarily appears along zone 112 as color X. These changed-color points form print area 118.

If the impact's effects are assessed along SF zone 112, each changed-color point along zone 112 is usually the same as the corresponding CM point. Print area 118 is smaller than OC area 116 because a band 120 not containing any CM point lies between the perimeters of areas 116 and 118. Perimeter band 120 appears as color A as indicated in FIGS. 5b and 5c. If the impact's effects are assessed along the internal plane, each changed-color point along zone 112 is usually located opposite, or nearly opposite, the corresponding CM point. Print area 118 can be smaller or larger than OC area 116 depending on the size of area 116 relative to that of the projection. Print area 118 is usually smaller than OC area 116 when the projection is of the same size as, or smaller than, area 116. Depending on how well print area 118 outwardly conforms to OC area 116, area 118 can be partly inside and partly outside area 116 in the projection case.

Local TH parameter difference value $\Delta P_{thl}$ is preferably the same at every point subject to the TH impact criteria. If so, local difference value $\Delta P_{thl}$ is replaced with a fixed global TH value $\Delta P_{thg}$ of parameter difference $\Delta P$. Local TH value $\Delta P_{thl}$ can, however, differ from point to point subject to the TH impact criteria. In that case, the $\Delta P_{thl}$ values for the points subject to the TH impact criteria form a local TH parameter difference function dependent on the location of each point subject to the TH impact criteria.

Impact parameter P can be implemented in various ways. In one implementation, parameter P is pressure resulting from object 104 impacting SF zone 112, specifically OC area 116. In the following material, normal pressure at any point in VC region 106 means pressure existent at that point when it is not significantly subjected to any effect of the impact. Normal SF pressure along zone 112 means normal external pressure, usually atmospheric pressure nominally 1 atm, along zone 112. Normal internal pressure at any point inside region 106 means internal pressure existent at that point when it is not significantly subjected to any effect of the impact. Excess pressure at any point of region 106 means pressure in excess of normal pressure at that point. Excess SF pressure along zone 112 then means pressure in excess of normal SF pressure along zone 112. Excess internal pressure at any point inside region 106 means internal pressure in excess of normal internal pressure at that point.

Object 104 exerts force on OC area 116 during the impact. This force is expressible as excess SF pressure across area 116. The excess SF pressure reaches a maximum value at one or more points inside area 116 and drops largely to zero along its perimeter. With the excess SF pressure across SF zone 112 embodying impact parameter difference $\Delta P$, the TH impact criteria become principal basic excess SF pressure criteria requiring that the excess pressure at a point along zone 112 equal or exceed a local TH value for that point in order for it to be a TH CM point and temporarily appear as color X. Each local TH excess SF pressure value, which can embody local TH parameter difference value $\Delta P_{thl}$ depending on the internal configuration of OI structure 100, lies between zero and the maximum excess SF pressure value.

Reducing the TH values of excess SF pressure causes the size of A-colored perimeter band 120 to be reduced and print area 118 to more closely match OC area 116. However, this also causes SF zone 112 to be susceptible to undesired color changes due to bodies other than object 104 impacting zone 112 with less force than object 104 usually impacts zone 112. The TH excess SF pressure values are chosen to be sufficiently low as to make band 120 quite small while limiting the likelihood of such undesired color changes as much as reasonably feasible.

The excess SF pressure causes excess internal pressure to be produced inside VC region 106. The excess internal pressure is localized mostly to material along OC area 116. Similar to the excess SF pressure, the excess internal pressure along the projection of area 116 onto the internal plane reaches a maximum value at one or more points inside the projection and drops largely to zero along its perimeter. The excess internal pressure along the internal plane can embody impact parameter difference $\Delta P$. The TH impact criteria along the internal plane become principal basic excess internal pressure criteria requiring that the excess internal pressure at a point along the internal plane equal or exceed a local TH value for that point in order for the corresponding point along SF zone 112 to temporarily appear as color X. Each local TH excess internal pressure value, which can embody local TH parameter difference value $\Delta P_{thl}$, lies between zero and the maximum excess internal pressure value.

The impact usually causes VC region 106 to significantly deform along OC area 116. If so, impact parameter P can be a measure of the deformation. For this purpose, item 122 in FIG. 5b or 5c indicates the ID area where the impact causes SF zone 112 to deform. Area 122, termed the principal SF deformation area, outwardly conforms to OC area 116 and encompasses at least part of, usually most of, area 116. "DF" hereafter means deformation. Although ID SF DF area 122 is sometimes slightly smaller than OC area 116, area 116 is also labeled as area 122 in FIGS. 5b and 5c and in later drawings to simplify the representation. Item 124 in FIG. 5b or 5c indicates the total ID area where object 104 contacts surface 102 and, as shown in FIG. 5c, can extend into FC SF zone 114.

The deformation reaches a maximum value at one or more points inside SF DF area 122 and drops largely to zero along its perimeter. With the deformation along SF zone 112 embodying impact parameter difference $\Delta P$, the TH impact criteria become principal basic SF DF criteria requiring that the deformation at a point along zone 112 equal or exceed a local TH value for that point in order for it to temporarily appear as color X. Each local TH SF DF value lies between zero and the maximum SF DF value. Inasmuch as reducing the TH SF DF values for causing print area 118 to more closely match OC area 116 also causes zone 112 to be susceptible to undesired color changes due to bodies other than object 104 impacting zone 112 with less force than object 104 usually impacts zone 112, the TH SF DF values are chosen to be sufficiently low as to achieve good matching between areas 116 and 118 while limiting the likelihood of such undesired color changes as much as reasonably feasible.

The deformation along SF zone 112 may go into a vibrating mode in which the IDVC portion contracts and expands at an amplitude that rapidly dies out. Such vibrational deformation may sometimes be needed for the IDVC portion to temporarily appear as color X. If vibrational deformation occurs, the associated range of frequencies arising from the impact can be incorporated into the principal SF DF criteria to further reduce the likelihood of undesired color changes.

Local TH value $\Delta P_{thl}$ of impact parameter difference $\Delta P$ has been described above as essentially a fixed value so that the color along the perimeter of print area 118 changes abruptly from color A to color X in moving from outside area 118 to inside it. However, the temporary color change along the perimeter of area 118 often occurs in a narrow transition band (not shown) which extends along the perimeter of area 118 and in which the color progressively changes from color A to color X in crossing from outside the perimeter transition band to inside it. This arises because the transition from color A to color X largely starts to occur as parameter difference $\Delta P$ passes a low local TH value $\Delta P_{thll}$ for each point subject to the TH impact criteria and largely completes the color change as difference $\Delta P$ passes, for that point, a high local TH value $\Delta P_{thlh}$ greater than low value $\Delta P_{thll}$. Local TH value $\Delta P_{thl}$ for each point subject to the TH impact criteria is typically that point's high TH value $\Delta P_{thlh}$ but can be a value between, e.g., halfway between, that point's TH values $\Delta P_{thll}$ and $\Delta P_{thln}$. For implementations of difference $\Delta P$ with excess pressure or deformation, the transition from color A to color X largely starts to occur as excess pressure or deformation passes a low local TH excess pressure or DF value for each point subject to the TH impact criteria and largely completes the color change as excess pressure or deformation passes a high local TH excess pressure or DF value for that point.

OI structure 100 is usually arranged and operated so that generic changed color X is capable of being only a single (actual) color. However, the principal basic TH impact criteria can consist of multiple sets of fully different, i.e., nonoverlapping, principal basic TH impact criteria respectively corresponding to multiple specific (or specified) changed colors materially different from principal color A. More than one, typically all, of the specific changed colors differ, usually materially. The impact on OC area 116 of SF zone 112 is potentially capable of meeting (or satisfying) any of the principal basic TH impact criteria sets. If the impact meets the basic TH impact criteria, generic changed color X is the specific changed color for the basic TH impact criteria set actually met by the impact sometimes dependent on other criteria also being met. The basic TH impact criteria sets usually form a continuous chain in which consecutive criteria sets meet each other without overlapping.

The basic TH impact criteria sets can sometimes be mathematically described as follows in terms of impact parameter difference $\Delta P$. Letting n be an integer greater than 1, n principal basic TH impact criteria sets $S_1, S_2, \ldots S_n$ are respectively associated with n specific changed colors $X_1, X_2, \ldots X_n$ materially different from principal color A and with n progressively increasing local TH parameter difference values $\Delta P_{thl,1}, \Delta P_{thl,2}, \ldots \Delta P_{thl,n}$ lying between zero and maximum parameter difference $\Delta P_{max}$. Each local TH parameter difference value $\Delta P_{thl,1}$, except lowest-numbered value $\Delta P_{thl,1}$, thereby exceeds next-lowest-numbered value $\Delta P_{thl,i-1}$ where integer i varies from 1 to n.

Each basic TH impact criteria set $S_i$, except highest-numbered criteria set $S_n$, is defined by the requirement that parameter difference $\Delta P$ equal or exceed local TH parameter difference value $\Delta P_{thl,i}$ but be no greater than an infinitesimal amount below a higher local parameter difference value $\Delta P_{thh,i}$ less than or equal to next higher local TH parameter difference value $\Delta P_{thl,i+1}$. Each criteria set $S_i$, except set $S_n$, is a $\Delta P$ range $R_i$ extending between a low limit equal to TH difference value $\Delta P_{thl,i}$ and a high limit an infinitesimal amount below high difference value $\Delta P_{thh,i}$. Highest-numbered criteria set $S_n$ is defined by the requirement that difference $\Delta P$ equal or exceed local TH parameter difference value $\Delta P_{thl,n}$ but not exceed a higher local parameter difference value $\Delta P_{thh,n}$ less than or equal to maximum parameter difference $\Delta P_{max}$. Hence, highest-numbered set $S_n$ is a $\Delta P$ range $R_n$ extending between a low limit equal to TH difference value $\Delta P_{thl,n}$ and a high limit equal to high difference value $\Delta P_{thh,n}$.

High-limit difference value $\Delta P_{thh,i}$ for each range $R_i$, except highest range $R_n$, usually equals low-limit difference value $\Delta P_{thl,i+1}$ for next higher range $R_{n+1}$, and high-limit difference value $\Delta P_{thh,n}$ for highest range $R_n$ usually equals maximum difference $\Delta P_{max}$. In that case, criteria sets $S_1$-$S_n$ substantially fully cover a total $\Delta P$ range extending continuously from lowest difference value $\Delta P_{thl,1}$ to maximum difference $\Delta P_{max}$. Impact parameter difference $\Delta P$ c potentially capable of meeting any of criteria sets $S_1$-$S_n$. If the impact meets the TH impact criteria so that difference $\Delta P$ meets the TH impact criteria, changed color X is specific changed color $X_i$ for criteria set $S_i$ actually met by difference $\Delta P$. Should each local TH difference value $\Delta P_{thl,i}$ be the same at every point subject to the TH impact criteria, each local TH difference value $\Delta P_{thl,i}$ is replaced with a fixed global TH value $\Delta P_{thg,i}$ of difference $\Delta P$.

The TH impact criteria sets can, for example, consist of fully different ranges of excess SF pressure across OC area 116 or excess internal pressure along the projection of area 116 onto the internal plane. Each range of excess SF or internal pressure is associated with a different one of the specific changed colors. Changed color X is then specific changed color $X_i$ for the range of excess SF or internal pressure met by the impact. The low limit of each pressure range is the minimum value of excess SF or internal pressure for causing color X to be specific changed color $X_i$ for that pressure range. The high limit of each pressure range, except the highest pressure range, is preferably an infinitesimal amount below the low limit of the next highest range so that the TH impact criteria sets occupy a continuous total pressure range beginning at the low limit of the lowest range. All the specific changed colors $X_1$-$X_n$ preferably differ materially from one another.

Use of TH impact criteria sets provides a capability to distinguish between certain different types of impacts. For instance, if the maximum excess SF pressure usually exerted by one embodiment of object 104 exceeds the minimum excess SF pressure usually exerted by another embodiment of object 104, appropriate choice of the TH impact criteria sets enables OI structure 100 to distinguish between impacts of the two object embodiments. In tennis, suitable choice of the TH impact criteria sets enables structure 100 to distinguish between impacts of a tennis ball and impacts of other bodies which usually impact SF zone 112 harder or softer than a tennis ball. Color X is generally dealt with below as a single color even though it can be provided as one of multiple changed colors dependent on the TH impact criteria sets.

The change, or switch, from color A to color X along print area 118 places VC region 106 in a state, termed the "changed" state, in which X light temporarily leaves the IDVC portion along area 118. In the changed state, region 106 continues to appear as color A along the remainder of SF zone 112 except possibly at any location where another temporary change to color X occurs during the current temporary color change due to object 104 also impacting zone 112 so as to meet the TH impact criteria. The IDVC portion later returns to appearing as color A. If another change to color X occurs during the current temporary color change at any location along zone 112 due to another impact, any other such location along zone 112 likewise later returns to appearing as color A. Region 106 later returns to appearing as color A along all of zone 112 so as to return, or switch back, to the normal state. The impacts can be by the same or different embodiments of object 104.

An occurrence of the changed state herein means only the temporary color change due to the impact causing that changed-state occurrence. If, during a changed-state occurrence, object 104 of the same or a different embodiment again impacts SF zone 112 sufficient to meet the TH impact criteria, any temporary color change which that further impact causes along zone 112 during the current changed-state occurrence constitutes another changed-state occurrence. Multiple changed-state occurrences can thus overlap in time. Print area 118 of one of multiple time-overlapping changed-state occurrences can also overlap with area 118 of at least one other one of those changed-state occurrences. The situation of multiple time-overlapping changed-state occurrences is not expressly mentioned further below in order to shorten this description. However, any recitation below specifying that a VC region, such as VC region 106, returns to the normal state after the changed state means that, if there are multiple time-overlapping changed-state occurrences, the VC region returns to the normal state after the last of those occurrences without (fully) returning to the normal state directly after any earlier one of those occurrences.

VC region 106 is in the changed state for a CC duration (or time period) $\Delta t_{dr}$ generally defined as the interval from the time at which print area 118 first fully appears as changed color X to the time at which area 118 starts returning to color A, i.e., the interval during which area 118 temporarily appears as color X. CC duration $\Delta t_{dr}$ is usually at least 2 s in order to allow persons using OI structure 100 sufficient time to clearly determine that area 118 exists and where it exists along SF zone 112. Duration $\Delta t_{dr}$ is often at least 4 s, sometimes at least 6 s, and is usually no more than 60 s but can be 120 s or more.

In particular, the $\Delta t_{dr}$ length depends considerably on the type of activity for which OI structure 100 is being used. If the activity is a ball-based sport such as tennis, basketball, volleyball, or baseball/softball, CC duration $\Delta t_{dr}$ is desirably long enough for players and observers, including any sports official(s), to clearly determine the location of print area 118 on SF zone 112 but not so long as to significantly interrupt play. The $\Delta t_{dr}$ length for such a sport is usually at least 2, 4, 6, 8, 10, or 12 s, can be at least 15, 20, or 30 s, and is usually no more than 60 s but can be longer, e.g., up to 90 or 120 s or more, or shorter, e.g., no more than 30, 20, 15, 10, 8, or 6 s. For such a ball-based sport in which the ball embodying object 104 bounces off surface 102, duration $\Delta t_{dr}$ is usually much longer than the time duration (or contact time) $\Delta t_{oc}$, almost always less than 25 ms, during which the ball contacts zone 112 during the impact.

CC duration $\Delta t_{dr}$ may be at an automatic (or natural) value $\Delta t_{drau}$ that includes a base portion $\Delta t_{drbs}$ passively determined by the (physical/chemical) properties of the material(s) in the ISCC structure. Base duration $\Delta t_{drbs}$ is fixed (constant) for a given set of environmental conditions, including a given external temperature and a given external pressure, nominally 1 atm, at identical impact conditions. VC region 106 may contain componentry, described below, which automatically extends duration $\Delta t_{dr}$ by an amount $\Delta t_{drext}$ beyond base duration $\Delta t_{drbs}$. Automatic duration value $\Delta t_{drau}$ consists of base duration $\Delta t_{drbs}$ and potentially extension duration $\Delta t_{drext}$. Automatic value $\Delta t_{drau}$ is usually at least 2 s, often at least 4 s, sometimes at least 6 s, and usually no more than 60 s, often no more than 30 s, sometimes no more than 15 s. Absent externally caused adjustment, the changed state automatically terminates at the end of value $\Delta t_{drau}$.

Automatic duration value $\Delta t_{drau}$ is usually in a principal pre-established CC time duration range, i.e., an impact-to-impact $\Delta t_{dr}$ range established prior to impact. The length of the pre-established CC duration range, i.e., the time period between its low and high ends from impact to impact, is relatively small, usually no more than 2 s, preferably no more than 1 s, more preferably no more than 0.5 s, so that the impact-to-impact variation in automatic value $\Delta t_{drau}$ is quite small.

The appearance of VC region 106 as color A during the normal state occurs while OI structure 100 is in operation. The production of color A during structure operation often occurs passively, i.e., only by light reflection. Region 106 thus appears as color A when structure 100 is inactive. However, color A can be produced actively, e.g., by an action involving light emission from region 106. If so, the light emission is usually terminated to save power when structure 100 is inactive. In that case, region 106 appears as another color, termed passive color P, along SF zone 112 while structure 100 is inactive. Passive color P, which can be the same as secondary color A', necessarily differs from color A and usually from color X.

Figure 22A:
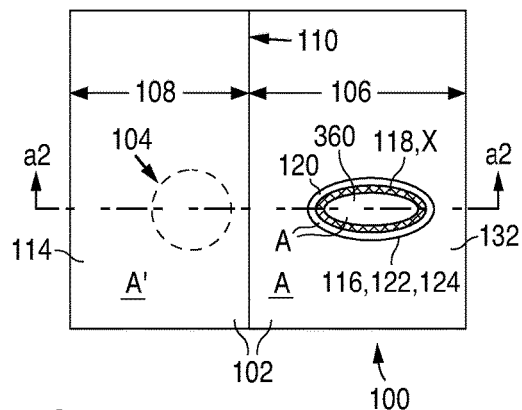
FIGS. 22a and 22b are additional layout views of the OI structure of FIGS. 5a-5c for different impact conditions than represented in FIGS. 5b and 5c.

FIG. 5b presents an example in which object 104 contacts surface 102 fully within SF zone 112. Total ID OC area 124 here is the same as OC area 116. Print area 118 encompasses most of, and fully conforms to, OC area 116 so that areas 116 and 118 are largely concentric. Hence, print area 118 fully outwardly conforms to OC area 116. FIG. 22a below presents an example, similar to that of FIG. 5b, in which print area 118 fully outwardly conforms to OC area 116 and does not fully inwardly conform to area 116.

Figure 22B:
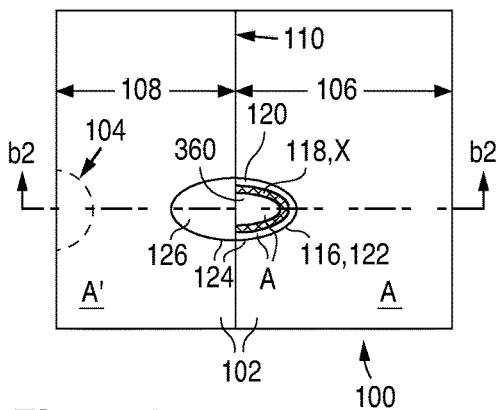

FIG. 5c presents an example in which object 104 contacts surface 102 within both of SF zones 112 and 114 in the same impact. Total OC area 124 here consists of OC area 116 and an adjoining secondary ID OC area 126 of zone 114. The impact on secondary ID OC area 126 does not cause it to change color significantly. Hence, area 126 largely remains secondary color A'. Print area 118 at least partly encompasses OC area 116 and may, or may not, encompass most of it depending on the sizes of OC areas 116 and 126 and perimeter band 120 relative to one another. Print area 118 fully outwardly conforms to OC area 116 so as to be largely concentric with it. FIG. 22b below presents an example, similar to that of FIG. 5c, in which print area 118 outwardly conforms mostly, but not fully, to OC area 116 and does not inwardly conform mostly to it.

The impact on both of OC areas 116 and 126 is sometimes insufficient to meet the principal TH impact criteria for principal area 116 even though the TH impact criteria would be met if total OC area 124 were in SF zone 112. If so, area 116 may continue to appear as color A. Alternatively, FC region 108 contains impact-sensitive material extending along interface 110 to a distance approximately equal to the maximum lateral dimension of print area 118 during impacts. Although secondary OC area 126 remains color A' after the impact, the combination of the impact-sensitive material in region 108 and the ISCC material in VC region 106 causes print area 118 to temporarily appear as color X if the impact meets composite basic TH impact criteria usually numerically the same as the principal basic TH impact criteria.

FIGS. 6a-6c, 11a-11c, 12a-12c, 13a-13c, 14a-14c, 15a-15c, 16a-16c, 17a-17c, 18a-18c, and 19a-19c present side cross sections of ten embodiments of OI structure 100 where each triad of Figs. ja-jc for integer j being 6 and then varying from 11 to 19 depicts a different embodiment. The basic side cross sections, and thus how the embodiments appear in the normal state, are respectively shown in FIGS. 6a, 11a, 12a, 13a, 14a, 15a, 16a, 17a, 18a, and 19a corresponding to FIG. 5a. FIGS. 6b, 11b, 12b, 13b, 14b, 15b, 16b, 17b, 18b, and 19b corresponding to FIG. 5b present examples of changes that occur during the changed state when object 104 impacts fully within SF zone 112. FIGS. 6c, 11c, 12c, 13c, 14c, 15c, 16c, 17c, 18c, and 19c present examples of changes that occur during the changed state when object 104 simultaneously impacts both of SF zones 112 and 114.

Figure 6A:
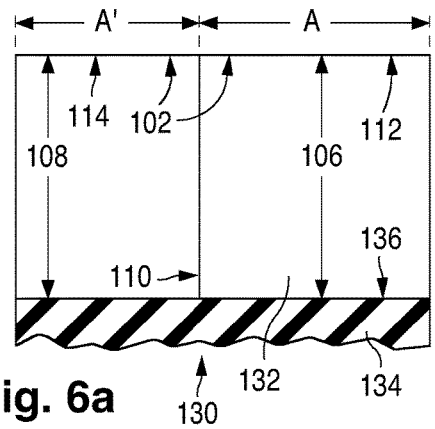
FIGS. 6a-6c are cross-sectional side views of an embodiment of the OI structure of FIGS. 5a-5c.
Figure 6B:
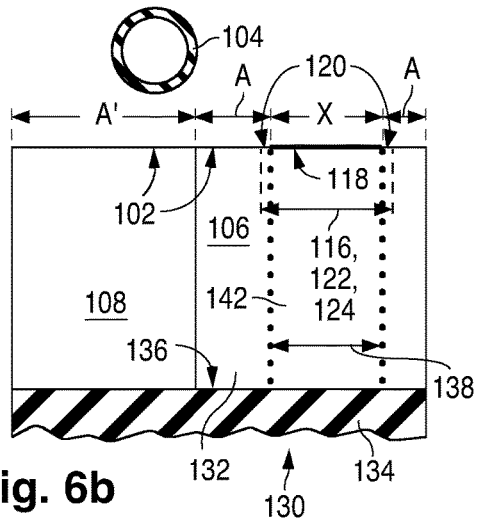
Figure 6C:
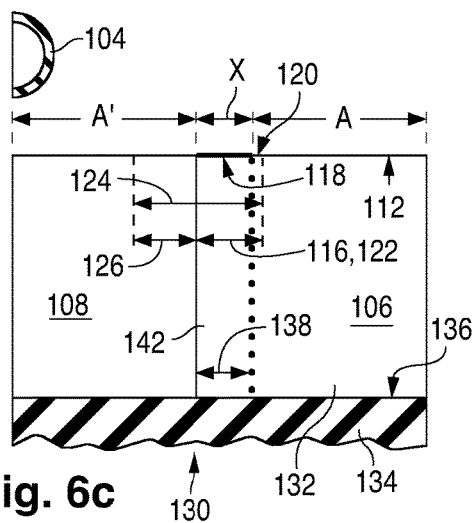

Referring to FIGS. 6a-6c (collectively "FIG. 6"), they illustrate a general embodiment 130 of OI structure 100 for which duration $\Delta t_{dr}$ of the changed state is automatic value $\Delta t_{drau}$ absent externally caused adjustment. VC region 106 here consists only of the ISCC structure indicated here and later as item 132. In FIG. 6, surface 102 is flat and extends parallel to a plane generally tangent to Earth's surface. However, surface 102 can be significantly curved. Even when surface 102 is flat, it can extend at a significant angle to a plane generally tangent to Earth's surface as exemplified below in FIGS. 102a and 102b. Interface 110 between color regions 106 and 108 extends perpendicular to surface 102. See FIG. 6a. Interface 110 can be a flat surface or a curved surface which appears straight along a plane extending through regions 106 and 108 perpendicular to surface 102. Regions 106 and 108 lie on a substructure (or substrate) 134 usually consisting of insulating material at least where they meet substructure 134 along a flat region-substructure interface 136 extending parallel to surface 102.

Largely no light is usually transmitted or emitted by substructure 134 so as to cross interface 136 and exit VC region 106 via SF zone 112. Nor does largely any light usually enter region 106 along interface 110 or any other side surface of region 106 so as to exit it via zone 112. In short, light usually enters region 106 only along zone 112. Changes in the visual appearance of region 106 largely depend only on (a) incident light reflected by region 106 so as to exit it via zone 112, (b) any light emitted by region 106 and exiting it via zone 112, and (c) any light entering region 106 along zone 112, passing through region 106, reflected by substructure 134, passing back through region 106, and exiting it along zone 112.

Light (if any) reflected by substructure 134 so as to leave it along VC region 106 during the normal state is termed ARsb light. Preferably, no ARsb light is present. All light striking SF zone 112 is preferably absorbed by region 106 or/and reflected by it so as to leave it via zone 112, interface 110, or another such side surface. Region 106, potentially in combination with FC region 108, may be manufactured as a separate unit and later installed on substructure 134. If so, absence of ARsb light enables the color characteristics, including CC characteristics, of region 106 to be independent of the color characteristics of substructure 134.

Light, termed ADic light, normally leaving ISCC structure 132 via SF zone 112 after being reflected or/and emitted by structure 132, and thus excluding any substructure-reflected ARsb light, consists of (a) light, termed ARic light, normally reflected by structure 132 so as to leave it via zone 112 after striking zone 112 and (b) light (if any), termed AEic light, normally emitted by structure 132 so as to leave it via zone 112. Reflected ARic light is invariably always present. Emitted AEic light may or may not be present. A substantial part of any ARsb light passes through structure 132. ARic light, any AEic light, and any ARsb light normally leaving structure 132, and thus VC region 106, via zone 112 form A light. Region 106 thereby normally appears as color A. Each of ADic light and either ARic or AEic light is usually a majority component, preferably a 75% majority component, more preferably a 90% majority component, of A light.

Referring to FIGS. 6b and 6c, item 138 is the IDVC portion of VC region 106, i.e., the changed portion which appears along print area 118 as color X during the changed state. Area 118 is then the upper surface of IDVC portion 138, basically a cylinder whose cross-sectional area is that of area 118. The lateral boundary of portion 138 extends perpendicular to SF zone 112. Object 104 in FIGS. 6b and 6c appears above surface 102 at locations corresponding respectively to those in FIGS. 5b and 5c and therefore at locations subsequent to impacting OC area 116.

Print area 118 is shown in FIGS. 6b and 6c and in analogous later side cross-sectional drawings with extra thick line to clearly identify the print-area location along SF zone 112. IDVC portion 138 is laterally demarcated in FIG. 6b and in analogous later side cross-sectional drawings with dotted lines because its location in VC region 106 depends on where object 104 contacts zone 112. Portion 138 is laterally demarcated in FIG. 6c and in analogous later side cross-sectional drawings with a dotted line and the solid line of interface 110 because portion 138 terminates along interface 110 in those drawings. Item 142 in FIGS. 6b and 6c is the principal ID segment of ISCC structure 132 in portion 138 and is identical to it here. However, ID ISCC segment 142 is a part of portion 138 in later embodiments of OI structure 100 where region 106 contains structure besides ISCC structure 132.

Light (if any) reflected by substructure 134 so as to leave it along IDVC portion 138 during the changed state is termed XRsb light. XRsb light can be the same as, or significantly differ from, ARsb light depending on how the light processing in portion 138 during the changed state differs from the light processing in VC region 106 during the normal state. XRsb light is absent when ARsb light is absent.

Light, termed XDic light, temporarily leaving ISCC segment 142 via print area 118 after being reflected or/and emitted by segment 142, and thus excluding any substructure-reflected XRsb light, consists of (a) light, termed XRic light, temporarily reflected by segment 142 so as to leave it via area 118 after striking area 118 and (b) light (if any), termed XEic light, temporarily emitted by segment 142 so as to leave it via area 118. Reflected XRic light is invariably always present. Emitted XEic light may or may not be present. XDic light differs materially from A and ADic light. A substantial part of any XRsb light passes through segment 142. XRic light, any XEic light, and any XRsb light temporarily leaving segment 142, and thus IDVC portion 138, via area 118 form X light so that portion 138 temporarily appears as color X. Each of XDic light and either XRic or XEic light is usually a majority component, preferably a 75% majority component, more preferably a 90% majority component, of X light.

Timing and Color-difference Parameters

VC region 106 of OI structure 130 starts the forward transition from the normal state to the changed state before or after object 104 leaves SF zone 112 depending on the length of duration $\Delta t_{oc}$ during which object 104 contacts OC area 116. Region 106 can even enter the changed state before object 104 leaves zone 112. However, a person cannot generally see print area 118 until object 104 leaves zone 112. One important timing parameter is thus the full forward transition delay (response time) $\Delta t_f$, if any, extending from the instant, termed object-separation time $t_{os}$, at which object 104 just fully separates from area 116 to the instant, termed approximate forward transition end time $t_{fe}$, at which region 106 approximately completes the forward transition and IDVC portion 138 approximately first appears as changed color X. "OS" and "XN" hereafter respectively mean object-separation and transition. Determination of full forward XN delay $\Delta t_f$ is complex because it depends on changes in spectral radiosity $J_\lambda$ and thus on wavelength changes rather than on changes in radiosity J itself.

Another important timing parameter is the immediately following time duration $\Delta t_{dr}$, discussed above, in which VC region 106 is in the changed state. CC duration $\Delta t_{dr}$ extends from forward XN end time $t_{fe}$ to the instant, termed approximate return XN start time $t_{rs}$, at which region 106 approximately starts the return transition from the changed state back to the normal state and IDVC portion 138 approximately starts changing from appearing as color X to returning to appear as color A. Although usually less important than forward XN delay $\Delta t_f$, a final important timing parameter is the full return XN delay (relaxation time) $\Delta t_r$, extending from approximate return XN start time $t_{rs}$ to the instant, termed approximate return XN end time $t_{re}$, at which region 106 approximately completes the return transition and portion 138 approximately first returns to appearing as color A.

Figure 7:
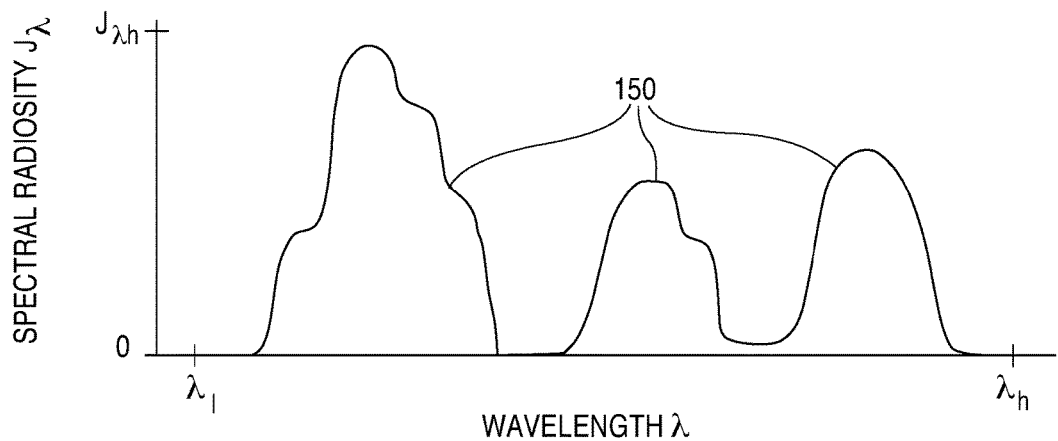
FIGS. 7-9 are graphs of spectral radiosity as a function of wavelength.

The spectral radiosity constituency, i.e., the variation of spectral radiosity $J_\lambda$ with wavelength $\lambda$, for a color consists of one or wavelength bands in the visible light spectrum. Each wavelength band may reach one or more peak values of spectral radiosity depending on what is considered to be a wavelength band. Referring to FIG. 7, it illustrates an exemplary spectral radiosity constituency 150 for color light such as A or X light where $J_{\lambda h}$ is the top of the illustrated $J_\lambda$ range. In this example, $J_\lambda$ constituency 150 may be viewed as consisting of three wavelength bands or two wavelength bands with the right-most band having two peaks. In any event, the wavelengths encompassed by constituency 150 lie between the low end $\lambda_l$ and high end $\lambda_h$ of the visible spectrum where low-end wavelength $\lambda_l$ is nominally 380-400 nm and high-end wavelength $\lambda_h$ is nominally 700-780 nm. For a spectral color, constituency 150 degenerates into a single vertical line at the wavelength of that color.

Figure 8:
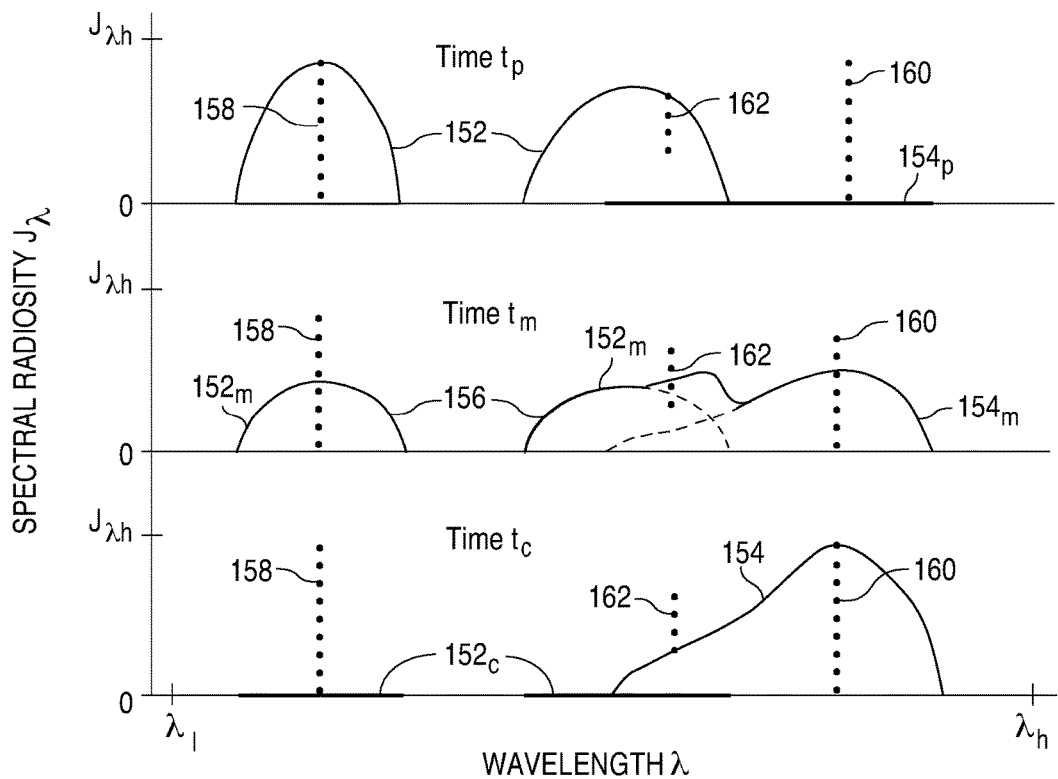

FIG. 8 shows how an exemplary spectral radiosity constituency 152, two bands, for A light changes with time into an exemplary spectral radiosity constituency 154, one band, for X light during the forward transition from the normal state to the changed state. The top portion of FIG. 8 illustrates the appearance of color-A $J_\lambda$ constituency 152 at a time $t_p$ during the normal state and thus prior to the forward transition. Although color-X $J_\lambda$ constituency 154 does not exist at pre-transition time $t_p$, thick-line item 154$_p$ along the wavelength axis in the top portion of FIG. 8 indicates the expected wavelength extent of color-X constituency 154.

The middle portion of FIG. 8 depicts an exemplary intermediate spectral radiosity constituency 156 at a time $t_m$ during the forward transition. Intermediate $J_\lambda$ constituency 156 is a combination, largely additive, of a partial version 152$_m$ of color-A constituency 152 and a partial version 154$_m$ of-color X constituency 154. The right-most band of reduced color-A $J_\lambda$ constituency 152$_m$ combined with the dashed line extending from that band to the right indicates how it would appear if color A were being converted into black. Partial color-X $J_\lambda$ constituency 154$_m$ combined with the dashed line extending from constituency 154$_m$ to the left indicates how constituency 154$_m$ would appear if color X were being converted from black. The bottom portion of FIG. 8 illustrates the appearance of color-X constituency 154 at a time $t_c$ during the changed state and thus after the forward transition. Although color-A constituency 152 does not exist at post-transition time $t_c$, the two parts of thick-line item 152$_c$ along the wavelength axis in the bottom portion of FIG. 8 indicate the exemplary wavelength extent of constituency 152.

Forward XN delay $\Delta t_f$ can be determined by changes in various spectral radiosity parameters as a function of time. Using spectral radiosity $J_\lambda$ itself, forward delay $\Delta t_f$ is the time for spectral radiosity $J_\lambda$ to decrease from (i) a high value $J_{\lambda fi}$ equal to or slightly less than the magnitude $\Delta J_{\lambda,max}$ of the difference between the maximum $J_\lambda$ values for the color-A and color-X $J_\lambda$ constituencies at a wavelength present in one or both of them, i.e., at any wavelength for which spectral radiosity $J_\lambda$ is greater than zero in at least one of the color A and color-X $J_\lambda$ constituencies, to (ii) a low value $J_{\lambda fl}$ equal or slightly greater than zero.

This $\Delta t_f$ determination technique is most easily applied at a wavelength present in one of the color-A and color-X $J_\lambda$ constituencies but not in the other. Due to noise in experimental $J_\lambda$ data, the accuracy of the $\Delta t_f$ determination is usually increased by choosing a wavelength at which spectral radiosity $J_\lambda$ reaches a peak value. Dotted lines 158 and 160 in each of the three portions of FIG. 8 indicate such wavelengths for $J_\lambda$ constituencies 152 and 154. $J_\lambda$ maximum difference magnitude $\Delta J_{\lambda,max}$ is then simply the maximum $J_\lambda$ value for color-A $J_\lambda$ constituency 152 along dotted line 158 in the top portion of FIG. 8 or the maximum $J_\lambda$ value for color-X $J_\lambda$ constituency 154 along dotted line 160 in the bottom portion of FIG. 8. The length of line 158 or 160 represents difference magnitude $\Delta J_{\lambda,max}$.

Spectral radiosity $J_\lambda$ can nonetheless be used to determine forward XN delay $\Delta t_f$ at a wavelength, indicated by dotted line 162 in each of the three portions of FIG. 8, common to both the color-A and color-X $J_\lambda$ constituencies. The length of dotted line 162 represents difference magnitude $\Delta J_{\lambda,max}$. As examination of FIG. 8 indicates, difference magnitude $\Delta J_{\lambda,max}$ for the common-wavelength situation is usually less than magnitude $\Delta J_{\lambda,max}$ when the color-A $J_\lambda$ constituency has a wavelength not in the color-X $J_\lambda$ constituency and vice versa.

High value $J_{\lambda fh}$ and low value $J_{\lambda fl}$ are respectively slightly less than difference magnitude $\Delta J_{\lambda max}$ and slightly greater than zero if OS time $t_{os}$ occurs after the instant, termed actual forward XN start time $t_{f0}$, at which VC region 106 actually starts the forward transition to the changed state and IDVC portion 138 actually starts changing to appear as color X or/and if forward XN end time $t_{fe}$ occurs before the instant, termed actual forward XN end time $t_{f100}$, at which region 106 actually completes the forward transition to the changed state and portion 138 actually first appears as color X. In particular, high value $J_{\lambda fh}$ equals difference magnitude $\Delta J_{\lambda max}$ minus (a) an amount, usually small, corresponding to the difference between times $t_{os}$ and $t_{f0}$ if OS time $t_{os}$ occurs after actual forward XN start time $t_{f0}$ and (b) an amount, usually small, corresponding to the difference between times $t_{f100}$ and $t_{fe}$ if actual forward XN end time $t_{f100}$ ends, as usually occurs, after approximate forward XN end time $t_{fe}$. Value $J_{\lambda fh}$ otherwise equals magnitude $\Delta J_{\lambda max}$.

Low value $J_{\lambda fl}$ similarly equals (a) an amount, usually small, corresponding to the difference between times $t_{os}$ and $t_{f0}$ if OS time $t_{os}$ occurs after actual forward XN start time $t_{f0}$ and (b) an amount, usually small, corresponding to the difference between times $t_{f100}$ and $t_{fe}$ if actual forward XN end time $t_{f100}$ ends after approximate forward XN end time $t_{fe}$. Value $J_{\lambda fl}$ otherwise is zero. The modifications to values $J_{\lambda fh}$ and $J_{\lambda fl}$ may be so small as to not significantly affect the $\Delta t_f$ determination and, if so, need not be performed. If actual forward XN start time $t_{f0}$ occurs after OS time $t_{os}$, the difference between times $t_{f0}$ and $t_{os}$ should be added to the $J_\lambda$-determined value to obtain actual forward delay $\Delta t_f$. This modification may likewise be so small as to not significantly affect the $\Delta t_f$ determination and, if so, need not be performed. Forward XN delay $\Delta t_f$ can also be determined as an average of the summation of $\Delta t_f$ values determined at two or more suitable wavelengths using this $\Delta t_f$ determination technique.

Another spectral radiosity parameter suitable for use in determining forward XN delay $\Delta t_f$ is the spectrum-integrated absolute spectral radiosity difference $\Delta J_{AM}$, basically an integrated version of the spectral radiosity summation $\Delta t_f$ technique. Let $J_{\lambda A}(\lambda)$ and $J_{\lambda X}(\lambda)$ respectively represent the spectral radiosities for A and X light as a function of wavelength $\lambda$ for which $J_\lambda$ constituencies 152 and 154 are respective examples. Let $J_{\lambda M}(\lambda)$ represent the spectral radiosity for light of wavelength of a variable color, termed variable color M, as a function of wavelength $\lambda$ such that IDVC portion 138 appears along print area 118 as color M. Each $J_\lambda$ constituency 152, 154, or 156 is an example of color-M spectral radiosity $J_{\lambda M}(\lambda)$. Spectrum-integrated absolute spectral radiosity difference $\lambda J_{AM}$, often simply radiosity difference $\Delta J_{AM}$, is given by the integral:

$$\Delta J_{AM} = \int_{VS} |J_{\lambda A}(\lambda) - J_{\lambda M}(\lambda)| d\lambda \quad (A1)$$

where VS indicates that the integration is performed across the visible spectrum.

Figure 9:
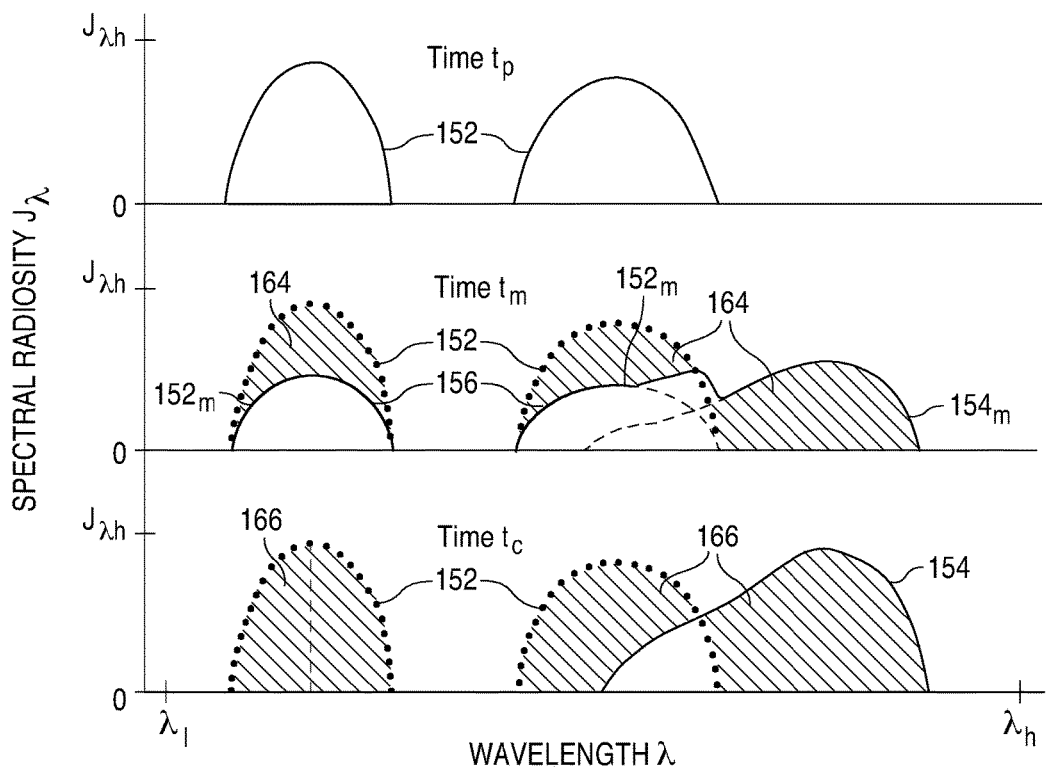

An understanding of radiosity difference $\Delta J_{AM}$ is facilitated with the assistance of FIG. 9 which, similar to FIG. 8, illustrates how example 152 of color-A spectral radiosity $J_{\lambda A}(\lambda)$ changes into example 154 of color-X spectral radiosity $J_{\lambda X}(\lambda)$ during the forward transition. Example 152 of color-A spectral radiosity $J_{\lambda A}(\lambda)$ occurs at time $t_p$ during the normal state as represented in the top portion of FIG. 9 and is repeated in the middle and bottom portions of FIG. 9 in dotted form because spectral radiosity $J_{\lambda A}(\lambda)$ appears in the integrand $|J_{\lambda A}(\lambda) - J_{\lambda M}(\lambda)|$ of radiosity difference $\Delta J_{AM}$. At time $t_p$, variable color M is color A so that color M-spectral radiosity $J_{\lambda M}(\lambda)$ equals color A-spectral radiosity $J_{\lambda A}(\lambda)$. Radiosity difference $\Delta J_{AM}$ is zero at time $t_p$.

Variable color M is an intermediate color between colors A and X at time $t_m$ during the forward transition. Color-M spectral radiosity $J_{\lambda M}(\lambda)$ then has a wavelength variation between the wavelength variations of spectral radiosities $J_{\lambda A}(\lambda)$ and $J_{\lambda X}(\lambda)$. Radiosity difference $\Delta J_{\lambda M}$ at time $t_m$ is thus at some finite value represented by slanted-line area 164 between color-A $J_\lambda$ constituency 152 and intermediate $J_\lambda$ constituency 156 in FIG. 9. At time $t_c$ during the changed state, variable color M is color X so that color-M spectral radiosity $J_{\lambda M}(\lambda)$ equals color-X spectral radiosity $J_{\lambda X}(\lambda)$. Radiosity difference $\Delta J_{AM}$ at time $t_c$ is also at some finite value represented by slanted-line area 166 between color-A constituency 152 and color-X $J_\lambda$ constituency 154 in FIG. 9. The value of radiosity difference $\Delta J_{AM}$ at time $t_c$ is usually a maximum. The variation of radiosity difference $\Delta J_{AM}$ with time thereby characterizes the forward transition.

Let $\Delta J_{\lambda X}$ represent the spectrum-integrated absolute spectral radiosity difference $\int_{VS} |J_{\lambda A}(\lambda) - J_{\lambda X}(\lambda)| d\lambda$ between A and X light. Using radiosity difference $\Delta J_{AM}$, forward XN delay $\Delta t_f$ is the time period for radiosity difference $\Delta J_{AM}$ to change from a low value equal or slightly greater than zero to a high value equal to or slightly less than $\Delta J_{AX}$. If OS time $t_{os}$ occurs after actual forward XN start time $t_{f0}$, the low $\Delta J_{AM}$ value is an amount corresponding to the difference between times $t_{os}$ and $t_{f0}$. The low $\Delta J_{\lambda M}$ value can often be taken as zero without significantly affecting the $\Delta t_f$ determination. If actual forward XN start time $t_{f0}$ occurs after OS time $t_{os}$, the difference between times $t_{f0}$ and $t_{os}$ should be added to the $J_\lambda$-determined $\Delta t_f$ value to obtain actual forward delay $\Delta t_f$. This modification is sometimes so small as to not significantly affect the $\Delta t_f$ determination and, if so, need not be performed. For the usual situation in which approximate forward XN end time $t_{fe}$ occurs before actual forward XN end time $t_{f100}$, the high $\Delta J_{AM}$ value equals $\Delta J_{AX}$ minus an amount corresponding to the difference between times $t_{f100}$ and $t_{fe}$. The high $\Delta J_{\lambda M}$ value can often be taken as $\Delta J_{AX}$ without significantly affecting the $\Delta t_f$ determination.

Figure 10:
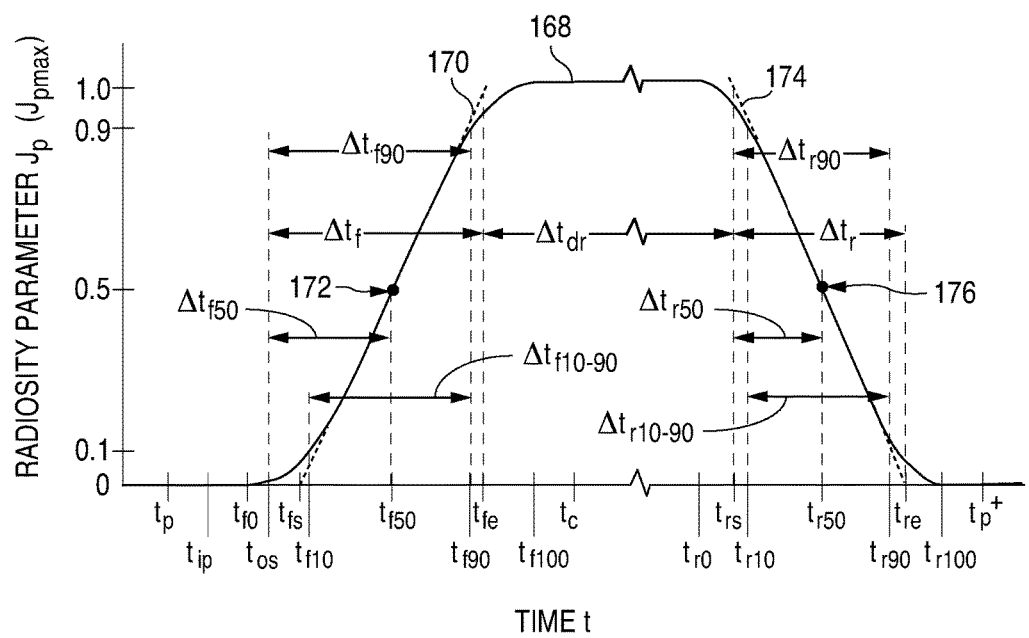
FIG. 10 is a graph of a radiosity parameter as a function of time.

FIG. 10 depicts how a general spectral radiosity parameter $J_p$ varies with time t during a full operational cycle in which VC region 106 goes from the normal state to the changed state and then back to the normal state. General radiosity parameter $J_p$ can be spectral radiosity $J_\lambda$ or spectrum-integrated absolute spectral radiosity difference $\Delta J_{AM}$. Radiosity parameter $J_p$ varies between zero and a maximum value $J_{pmax}$ formed with difference $\Delta J_{\lambda max}$ or the high $\Delta J_{AM}$ value when parameter $J_p$ is spectral radiosity $J_\lambda$ or radiosity difference $\Delta J_{AM}$. Curve 168 represents the $J_p$ variation with time t.

In addition to times mentioned above, the following times appear along the time axis in FIG. 10: time $t_{ip}$ at which object 104 impacts OC area 116, approximate forward XN start time $t_{fs}$ at which VC region 106 approximately starts the forward transition from the normal state to the changed state and IDVC portion 138 approximately starts changing from appearing as color A to appearing as color X, 10%, 50%, and 90% forward XN times $t_{f10}$, $t_{f50}$, and $t_{f90}$ at which portion 138 has respectively changed 10%, 50%, and 90% from actually appearing as color A to actually appearing as color X during the forward transition, actual return XN start time $t_{r0}$ at which region 106 actually starts the return transition back to the normal state and portion 138 actually starts changing from appearing as color X to returning to appear as color A, 10%, 50%, and 90% return XN times $t_{r10}$, $t_{r50}$, and $t_{r90}$ at which region 106 has respectively changed 10%, 50%, and 90% from actually appearing as color X to actually appearing as color A during the return transition, actual return XN end time $t_{r100}$ at which region 106 actually completes the return transition and portion 138 actually first returns to appearing as color A, and time $t_p^+$ during the normal state following the return transition.

Using radiosity parameter $J_p$, 10%, 50%, and 90% forward XN times $t_{f10}$, $t_{f50}$, and $t_{f90}$ are instants at which parameter $J_p$ actually respectively reaches 10%, 50%, and 90% of maximum value $J_{pmax}$ during the forward transition. 10%, 50%, and 90% return XN times $t_{r10}$, $t_{r50}$, and $t_{r90}$ are instants at which parameter $J_p$ actually has respectively decreased 10%, 50%, and 90% below value $J_{pmax}$ during the return transition. Item $\Delta t_{f50}$ is the 50% forward XN time delay from OS time $t_{os}$ to 50% forward XN time $t_{f50}$ during the forward transition. Item $\Delta t_{f90}$ is the 90% forward XN time delay from time $t_{os}$ to 90% forward XN time $t_{f90}$ during the forward transition. Item $\Delta t_{f10-90}$ is the 10%-to-90% forward XN time delay from 10% forward XN time $t_{f10}$ to time $t_{f90}$ during the forward transition. Item $\Delta t_{r50}$ is the 50% return XN time delay from approximate return XN start time $t_{rs}$ to 50% return XN time $t_{r50}$ during the return transition. Item $\Delta t_{r90}$ is the 90% return XN time delay from time $t_{rs}$ to 90% return XN time $t_{r90}$ during the return transition. Item $\Delta t_{r10-90}$ is the 10%-to-90% return XN time delay from 10% return XN time $t_{r10}$ to time $t_{r90}$ during the return transition.

Percentage times $t_{f10}$, $t_{f50}$, $t_{f90}$, $t_{r10}$, $t_{r50}$, and $t_{r90}$ can usually be ascertained relatively precisely because $dJ_p/dt$, the time rate of change of radiosity parameter $J_p$, is relatively high in the vicinities of those six times, especially times $t_{f50}$ and $t_{r50}$. Conversely, times $t_{r0}$ and $t_{r100}$ at which the forward transition actually respectively starts and ends are often difficult to determine precisely because rate $dJ_p/dt$ is relatively low in their vicinities. Times $t_{r0}$ and $t_{r100}$ at which the return transition actually respectively starts and ends are likewise often difficult to determine precisely for the same reason. In view of this, the start and end of the forward transition are respectively approximated by times $t_{fs}$ and $t_{fe}$ which are relatively precisely determinable utilizing time $t_{f50}$. Similarly, the start and end of the return transition are respectively approximated by times $t_{rs}$ and $t_{re}$ which are relatively precisely determinable utilizing time $t_{r50}$.

In particular, a dotted line 170 having a slope $S_f$ is tangent to curve 168 at point 172 at 50% forward XN time $t_{f50}$ where radiosity parameter $J_p$ has risen to 50% of value $J_{pmax}$. Slope $S_f$ equals rate $dJ_p/dt$ at time $t_{f50}$ and can be determined relatively precisely. Time differences $t_{f50}-t_{fs}$ and $t_{fe}-t_{f50}$ each equal $(J_{pmax}/2)/S_f$. Forward XN start time $t_{fs}$ and forward XN end time $t_{fe}$ are:

$$t_{fs} = t_{f50} - J_{pmax}/2S_f \quad (A2)$$

$$t_{fe} = t_{f50} + J_{pmax}/2S_f \quad (A3)$$

which can be determined relatively precisely because time $t_{f50}$ can be determined relatively precisely.

Similarly, a dotted line 174 having a slope $S_r$ is tangent to curve 168 at point 176 at 50% return XN time $t_{r50}$ where parameter $J_p$ has dropped to 50% of value $J_{pmax}$. Slope $S_r$ equals rate $dJ_p/dt$ at time $t_{r50}$ and can be determined relatively precisely. Time differences $t_{r50}-t_{rs}$ and $t_{re}-t_{r50}$ each equal $(J_{pmax}/2)/S_r$. Return XN start time $t_{rs}$ and return XN end time $t_{re}$ are:

$$t_{rs} = t_{r50} - J_{pmax}/2S_r \quad (A4)$$

$$t_{re} = t_{r50} + J_{pmax}/2S_r \quad (A5)$$

which can be determined relatively precisely because time 450 can be determined relatively precisely.

Approximate full forward XN delay $\Delta t_f$ is usually no more than 2 s, preferably no more than 1 s, more preferably no more than 0.5 s, even more preferably no more than 0.25 s. 50% forward XN delay $\Delta t_{f50}$ is usually no more than 1 s, preferably no more than 0.5 s, more preferably no more than 0.25 s, even more preferably no more than 0.125 s. 90% forward XN delay $\Delta t_{f90}$ is usually less than 2 s, preferably less than 1 s, more preferably less than 0.5 s, even more preferably less than 0.25 s. The same applies to 10%-to-90% forward XN delay $\Delta t_{f10-90}$.

The maximum values for full return XN delay $\Delta t_r$, 10% return XN delay $\Delta t_{r10}$, 50% return XN delay $\Delta t_{r50}$, and 90% return XN delay $\Delta t_{r90}$ fall into (a) a short-delay category in which they are relatively short to avoid impeding the activity in which object 104 is being used and (b) a long-delay category in which they can be relatively long without significantly impeding that activity and in which their greater lengths can sometimes lead to reduction in the cost of manufacturing OI structure 130. For the short-delay category, return XN delays $\Delta t_r$, $\Delta t_{r10}$, $\Delta t_{r50}$, and $\Delta t_{r90}$ have the same usual and preferred maximum values respectively as forward XN delays $\Delta t_f$, $\Delta t_{f10}$, $\Delta t_{f50}$, and $\Delta t_{f90}$. Return XN delays $\Delta t_r$, $\Delta t_{r10}$, $\Delta t_{r50}$, and $\Delta t_{r90}$ have the following maximum values for the long-delay category. Delay $\Delta t_r$ is usually no more than 10 s, preferably no more than 5 s. Delay $\Delta t_{r50}$ is usually no more than 5 s, preferably no more than 2.5 s. Delay $\Delta t_{r90}$ is usually less than 10 s, preferably less than 5 s. The same applies to delay $\Delta t_{r10-90}$.

CC duration $\Delta t_{dr}$, the difference between return XN start time $t_{rs}$ and forward XN end time $t_{fe}$, is:

$$\Delta t_{dr} = t_{rs} - t_{fe} = \left(t_{r50} - \frac{J_{pmax}}{2S_r}\right) - \left(t_{f50} - \frac{J_{pmax}}{2S_f}\right) = t_{r50} - t_{f50} + \left(\frac{J_{pmax}}{2}\right)\left(\frac{1}{S_f} - \frac{1}{S_r}\right) \quad (A6)$$

which likewise can be determined relatively precisely because times $t_{f50}$ and $t_{r50}$ can both be determined relatively precisely.

FIG. 10 depicts the preferred situation in which OS time $t_{os}$ occurs after actual forward XN start time $t_{f0}$. Forward XN start time $t_{f0}$ can, however, occur after OS time $t_{os}$. If so, between times $t_{os}$ and $t_{f0}$, there is a delay in which radiosity parameter $J_p$ is zero. FIG. 10 depicts the situation in which approximate forward XN start time $t_{fs}$ occurs after OS time $t_{os}$. Forward XN start time $t_{fs}$ preferably occurs before OS time $t_{os}$.

The actual total time period $\Delta t_{totact}$ (not indicated in FIG. 10) from actual forward XN start time $t_{f0}$ to actual return XN end time $t_{r100}$ is difficult to determine precisely because times $t_{f0}$ and $t_{r100}$ are difficult to determine precisely. Additionally, OS time $t_{os}$ may as mentioned above occur after forward XN start time $t_{f0}$. If so, the short interval between times $t_{f0}$ and $t_{os}$ is insignificant practically because object 104 blocks print area 118 from then being visible. Approximate return XN end time $t_{re}$ is highly representative of when area 118 returns to appearing as principal color A. A useful parameter for dealing with the time period needed to switch from the normal state to the changed state and back to the normal state is the effective total time period $\Delta t_{toteff}$ (also not indicated in FIG. 10) from OS time $t_{os}$ to return XN end time $t_{re}$.

The time period between points in high-level tennis is seldom less than 15 s. If print area 118 generated during a point due to impact of a tennis ball embodying object 104 is desirably not present during the immediately subsequent point, effective total time period $\Delta t_{toteff}$ can be chosen to be no more than 15 s. Area 118 caused by a tennis ball during a point will then automatically not be present during the immediately subsequent point in the vast majority of consecutive-point instances. With full forward XN delay $\Delta t_f$ and full return XN delay $\Delta t_r$ each being no more than 1 s, automatic value $\Delta t_{drau}$ of CC duration $\Delta t_{dr}$ is chosen to be close to, but less than, 15 s, e.g., usually at least 10 s, preferably at least 12 s. These $\Delta t_{drau}$ values should almost always provide sufficient time to examine area 118 and either immediately determine whether the ball is "in" or "out" or, if possible, extend duration $\Delta t_{dr}$ to examine area 118 more closely.

Non-lobbed groundstrokes hit by highly skilled tennis players typically take roughly 2 s to travel from one baseline to the other baseline and back to the initial baseline. The presence of two or more print areas 118 created during a point is not expected to be significantly distracting to the players. Also, the likelihood of two such areas 118 at least partly overlapping is very low. Nonetheless, if only one area 118 is desirably present at any time during a point, effective total time period $\Delta t_{toteff}$ can be chosen to be approximately 2 s. By arranging for each XN delay $\Delta t_f$ or $\Delta t_r$ to be no more than 0.25 s, automatic duration value $\Delta t_{drau}$ is at least 1.5 s. This should usually give the players and any associated tennis official(s) enough time to make an immediate in/out determination or, if possible, extend CC duration $\Delta t_{dr}$ for more closely examining area 118. In addition, automatic value $\Delta t_{drau}$ can more closely approach 2 s by configuring VC region 106 as described below for FIGS. 11a-11c.

Two colors differ materially if the standard human eyes/brain can essentially instantaneously clearly distinguish the two colors when one of them rapidly replaces the other or when they appear adjacent to each other. Hence, colors A and X differ materially if the standard human eye/brain can essentially instantaneously identify print area 118 when it changes from principal color A to changed color X. If object 104 simultaneously impacts both VC SF zone 112 and FC SF zone 114 in an embodiment of OI structure 100 where secondary color A' of zone 114 is the same as color A, colors A and X also differ materially if the standard human eye/brain can essentially instantaneously determine that object 104 has impacted both of zones 112 and 114 due to the difference in color between area 118 and zone 114.

What constitutes a material difference between colors A and X can sometimes be numerically quantified. In this regard, colors A and X occur in the all-color CIE L*a*b* color space in which a color is characterized by a dimensionless lightness L*, a dimensionless green/red hue parameter a*, and a dimensionless blue/yellow hue parameter b*. Lightness L* varies from 0 to 100 where a low number indicates dark and a high number indicates light. L* values of 0 and 100 respectively indicate black and white regardless of the a* and b* values. Hue parameters a* and b* have no numerical limits but typically range from a negative value as low as −128 to a positive value as high as 127. For green/red parameter a*, a negative number indicates green and a positive number indicates red. A negative number for blue/yellow parameter indicates blue while a positive number indicates yellow. Colors of particular hues determined by hue parameters a* and b* become lighter as lightness L* increases so that the colors contain more white and darker as lighter as lightness L* decreases so that they contain more black.

Hoffmann, "CIE Lab Color Space", docs-hoffmann.de/cielab03022003.pdf, 10 Feb. 2013, 63 pp., contents incorporated by reference herein, presents the sRGB and AdobeRGB, subspaces of the CIE L*a*b* color space for L* values of 10, 20, 30, 40, 50, 60, 70, 80, and 90. For the same L* value, the sRGB and AdobeRGB color subspaces are identical where they overlap. The following material for numerically quantifying how color X differs materially from color A uses the sRGB or AdobeRGB subspace as a baseline for applying the numerical quantification to the full CIE L*a*b* space.

Colors A and X have respective lightnesses $L_A^*$ and $L_X^*$, respective green/red parameters $a_A^*$ and $a_X^*$, and respective blue/yellow parameters $b_A^*$ and $b_X^*$ whose values are restricted so that color X differs materially from color A. In a first general L*a*b* restriction embodiment, suitable minimum and maximum limits are placed on one or more of lightness pair $L_A^*$ and $L_X^*$, red/green parameter pair $a_A^*$ and $a_X^*$, and blue/yellow parameter pair $b_A^*$ and $b_X^*$ to define one or more pairs of mutually exclusive (non-overlapping) color regions for which any color in one of a pair of the color regions differs materially from any color in the other of that pair of color regions. Any color in one of each pair of the color regions embodies color A while any color in the other of that pair of color regions embodies color X and vice versa.

The color regions in one such pair of mutually exclusive color regions consist of a light region containing a selected one of colors A and X and a dark region containing the remaining one of colors A and X. Lightness $L_A^*$ or $L_X^*$ of selected color A or X in the light region is at least 60 greater than lightness $L_X^*$ or $L_A^*$ of remaining color X or A in the dark region. Selected-color lightness $L_A^*$ or $L_X^*$ ranges from a minimum of 60 up to 100 while remaining-color lightness $L_X^*$ or $L_A^*$ ranges from 0 to a maximum of 40 provided that lightnesses $L_A^*$ and $L_X^*$ differ by at least 60. Selected color A or X is a light color while remaining color X or A is a dark color. Each color A or X can be at any values of parameters $a_A^*$ and $b_A^*$ or $a_X^*$ and $b_X^*$. Lightness difference $\Delta L^*$, i.e., the magnitude $|L_X^*-L_A^*|$ of the difference between lightnesses $L_X^*$ and $L_A^*$, is at least 60, preferably at least 70, often at least 80, sometimes at least 90.

Let $\Delta a^*$ represent the magnitude $|a_X^*-a_A^*|$ of the difference between green/red parameters $a_X^*$ and $a_A^*$, $\Delta b^*$ represent the magnitude $|b_X^*-b_A^*|$ of the difference between blue/yellow parameters $b_X^*$ and $b_A^*$, and $\Delta W^*$ represent the weighted color difference $(C_L\Delta L^{*2}+C_a\Delta a^{*2}+C_b\Delta b^{*2})^{1/2}$ where $C_L$, $C_a$, and $C_b$ are non-negative weighting constants usually ranging from 0 to 1 but potentially as high as 9. Limits, almost invariably minimum limits, are placed on one or more of differences $\Delta L^*$, $\Delta a^*$, $\Delta b^*$, and $\Delta W^*$ in a second general L*a*b* restriction embodiment such that color X differs materially from color A. In one example, each difference $\Delta L^*$ or $\Delta a^*$ is at least 50. Each parameter $b_A^*$ or $b_X^*$ can be at any value. Hence, no minimum limit is placed on difference $\Delta b^*$. Weighted color difference $\Delta W^*$ is not used in this example.

Weighted color difference $\Delta W^*$ can, in other examples, be used (i) alone since differences $\Delta L^*$, $\Delta a^*$, and $\Delta b^*$ appear in the $\Delta W^*$ formula $(C_L\Delta L^{*2}+C_a\Delta a^{*2}+C_b\Delta b^{*2})^{1/2}$ or (ii) in combination with one or more of differences $\Delta L^*$, $\Delta a^*$, and $\Delta b^*$. In either case, color difference $\Delta W^*$ is greater than or equal to a threshold weighted difference value $\Delta W_{th}^*$. When used alone, threshold weighted difference value $\Delta W_{th}^*$ is sufficiently high that colors A and X materially differ for all pairs of $L_A^*$ and $L_X^*$ values, $a_A^*$ and $a_X^*$ values, and $b_A^*$ and $b_X^*$ values. Examination of the sRGB or AdobeRGB L* examples in Hoffmann indicates that color differences are more pronounced in green/red parameter a* than in blue/ yellow parameter b*. In view of this, one of constants $C_L$ and $C_a$ in the ΔW* formula is sometimes greater than constant $C_b$ while the other of constants $C_L$ and $C_a$ in the ΔW* formula is greater than or equal to constant $C_b$. Constants $C_L$ and $C_a$ for this situation are typically 1 with constant $C_b$ being 0.

A third general L*a*b* restriction embodiment combines placing limits on one or more of lightnesses $L_A^*$ and $L_X^*$, red/green parameters $a_A^*$ and $a_X^*$, and blue/yellow parameters $b_A^*$ and $b_X^*$ with placing limits on one or more of differences ΔL*, Δa*, Δb*, and ΔW* such that color X differs materially from color A. In one example, lightness $L_A^*$ or $L_X^*$ of each color A or X is at least 50 while red/green parameter difference Δa* is at least 70. No limitation is placed on parameter $a_A^*$, $a_X^*$, $b_A^*$, or $b_X^*$, lightness difference ΔL*, or blue/yellow parameter difference Δb* in this example.

Specific examples of pairs of materially different colors suitable for colors A and X, including some pairs covered in the three general L*a*b* restriction embodiments, include: (a) white and a non-white color having an L* value of no more than 80, preferably no more than 70; (b) an off-white color having an L* value of at least 95 and a darker color having an L* value of no more than 75, preferably no more than 65; (c) a reddish color having an a* value of at least 20, preferably at least 30, and a greenish color having an a* value of no more than −20, preferably no more than −30, each color having an L* value of at least 30, preferably at least 40; and (d) a reddish color having a b* value of at least 75 plus 1.6 times its a* value and a bluish color having a b* value of −10 minus 1.0 times its a* value, each color having an L* value of at least 30, preferably at least 40. Numerous other pairs of materially different colors, including numerous pairs of light and dark colors, are suitable for colors A and X.

Colors A and X often have different average wavelengths $\lambda_{avg}$. In terms of spectral radiosity $J_\lambda$, the average wavelength $\lambda_{avg}$ of light of a particular color is:

$$\lambda_{avg} = \frac{\int_{VS} \lambda J_\lambda(\lambda) d\lambda}{\int_{VS} J_\lambda(\lambda) d\lambda} \quad (A7)$$

Average wavelength $\lambda_{avg}$ is zero for black and approximately 550 nm for white. The ratio $R_{\lambda_{avg}}$ of the difference between the average wavelengths of X and A light to the average of their average wavelengths is:

$$R_{\lambda_{avg}} = \frac{2|\lambda_{avgX} - \lambda_{avgA}|}{\lambda_{avgX} + \lambda_{avgA}} \quad (A8)$$

where $\lambda_{avg}X$ and $\lambda_{avg}A$ respectively are the average wavelengths of X and A light as determined from the $\lambda_{avg}$ relationship. In some embodiments of OI structure 100, wavelength difference-to-average ratio $R_{\lambda_{avg}}$ is at least 0.06, preferably at least 0.08, more preferably at least 0.10, even more preferably at least 0.12.

Object-impact Structure having Variable-color Region Formed with Impact-sensitive Changeably Reflective or Changeably Emissive Material ISCC structure 132 can be embodied in many ways. Structure 132 is sometimes basically a single material consisting of impact-sensitive changeably reflective or changeably emissive material where "changeably reflective" means that color change occurs primarily due to change in light reflection (and associated light absorption) and where "changeably emissive" means that color change occurs primarily due to change in light emission. "CR" and "CE" hereafter respectively mean changeably reflective and changeably emissive.

First consider ISCC structure 132 consisting solely of impact-sensitive CR material. "IS" hereafter means impact-sensitive. During the normal state, CR ISCC structure 132 reflects ARic light striking SF zone 112. No significant amount of light is normally emitted by structure 132. Including any ARsb light passing through structure 132, A light is formed with ARic light and any ARsb light normally leaving structure 132, and thus VC region 106, via zone 112.

The IS CR material forming ISCC segment 142 temporarily reflects XRic light striking print area 118 in response to object 104 impacting OC area 116 so as to meet the TH impact criteria. As in the normal state, CR ISCC segment 142 does not emit any significant amount of light during the changed state. Including any XRsb light passing through segment 142, X light is formed with XRic light and any XRsb light temporarily leaving segment 142, and thus IDVC portion 138, via area 118.

The mechanism causing CR ISCC segment 142 to temporarily reflect XRic light is pressure or/and deformation at OC area 116 or/and SF DF area 122 due to the impact. The IS CR material is typically piezochromic material which temporarily changes color when subjected to a change in pressure, here at print area 118. Examples of piezochromic material are described in Fukuda, *Inorganic Chromotropism: Basic Concepts and Applications of Colored Materials* (Springer), 2007, pp. 28-32, 37, 38, and 199-238, and the references cited on those pages, contents incorporated by reference herein.

When ISCC structure 132 consists solely of impact-sensitive CE material, CE ISCC structure 132 may or may not significantly emit AEic light during the normal state. Structure 132 normally reflects ARic light striking SF zone 112. Including any ARsb light passing through structure 132, A light is formed with ARic light and any AEic and ARsb light normally leaving structure 132, and thus VC region 106, via zone 112.

The IS CE material forming ISCC segment 142 temporarily emits XEic light in response to the impact so as to meet the TH impact criteria. During the changed state, CE ISCC segment 142 usually reflects ARic light striking print area 118. Including any XRsb light passing through segment 142, X light is formed with XEic and ARic light and any XRsb light temporarily leaving segment 142, and thus IDVC portion 138, via area 118. Alternatively, the temporary emission of XEic light may so affect segment 142 that it temporarily largely ceases to reflect ARic light striking area 118 and, instead, temporarily reflects XRic light materially different from ARic light. X light is now formed with XEic and XRic light and any XRsb light temporarily leaving segment 142, and therefore portion 138, via area 118.

The mechanism causing CE ISCC segment 142 to temporarily emit XEic light is pressure or/and deformation at SF DF area 122 due to the impact. If there normally is no significant AEic light, the IS CE material is typically piezoluminescent material which temporarily emits light (luminesces) upon being subjected to a change in pressure, here at print area 118. Examples of piezoluminescent material are presented in "Piezoluminescence", Wikipedia, en.wikipedia.org/wiki/Piezoluminescence, 16 Mar. 2013, 1 p., and the references cited therein, contents incorporated by reference herein. If there normally is significant AEic light, the IS CE material is typically piezochromic luminescent material which continuously emits light whose color changes when subjected to a change in pressure, again here at area 118.

CC duration $\Delta t_{dr}$ is usually automatic value $\Delta t_{drau}$ formed by base portion $\Delta t_{drbs}$ passively determined by the properties of the IS CR or CE material. VC region 106 may contain componentry, described below, which excites the CR or CE material so as to automatically extend automatic value $\Delta t_{drau}$ by amount $\Delta t_{drext}$ beyond base duration $\Delta t_{drbs}$.

Object-impact Structure having Separate Impact-sensitive and Color-change Components VC region 106 often contains multiple subregions stacked one over another up to SF zone 112. A recitation that light of a particular species, i.e., light identified by one or more alphabetic or alphanumeric characters, leaves a specified one of these subregions mean that the light leaves the specified subregion along zone 112 if the specified subregion extends to zone 112 or, if the specified subregion adjoins another subregion lying between the specified subregion and zone 112, along the adjoining subregion, i.e., via the interface between the two subregions. A recitation that light of a particular species leaves a segment or part of the specified subregion similarly mean that the light leaves that segment or subregion part along the corresponding segment or part of zone 112 if the specified subregion extends to zone 112 or, if the specified subregion adjoins another subregion lying between the specified subregion and zone 112, along the corresponding segment or part of the adjoining subregion, i.e., via the corresponding segment or part of the interface between the two subregions.

Figure 11A:
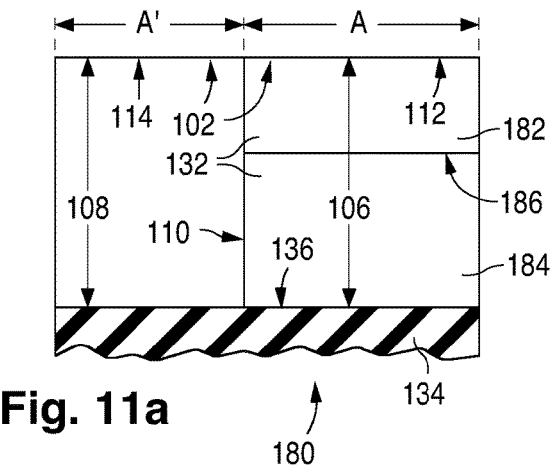
Figure 11B:
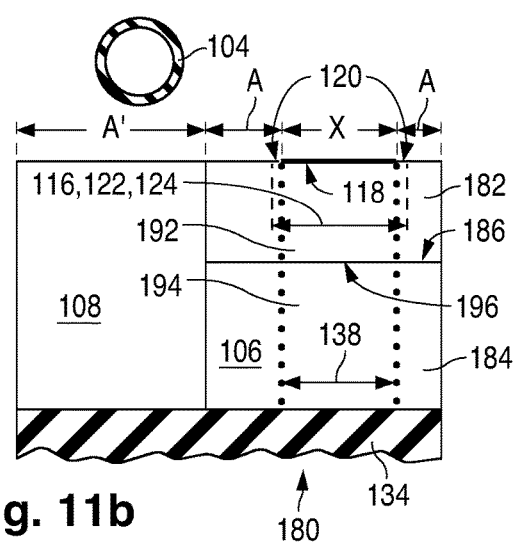
Figure 11C:
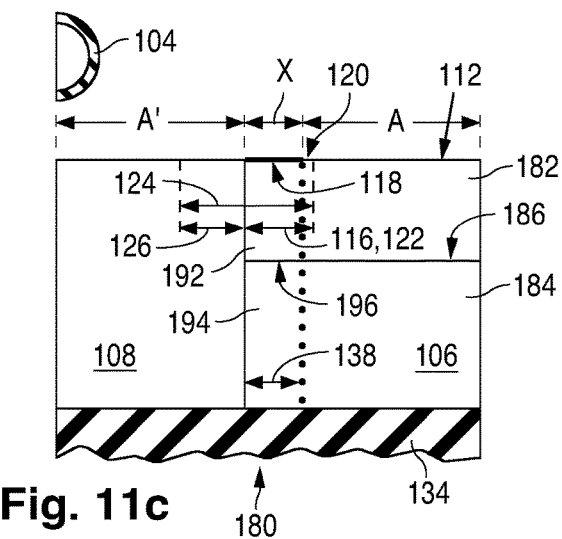

FIGS. 11a-11c (collectively "FIG. 11") illustrate an embodiment 180 of OI structure 130 in which VC region 106 is again formed solely with ISCC structure 132. Region 106, and thus structure 132, here consists of a principal IS component 182 and a principal CC component 184 that meet at a flat principal light-transmission interface 186 extending parallel to SF zone 112 and interface 136. See FIG. 11a. IS component 182 extends between zone 112 and interface 186. CC component 184 extends between interfaces 186 and 136 and therefore between IS component 182 and substructure 134.

Light travels through IS component 182, usually transparent, from SF zone 112 to interface 186 and vice versa. Preferably, largely no light striking CC component 184 along interface 186 passes fully through component 184 to interface 136. All light striking component 184 along interface 186 is preferably absorbed and/or reflected by component 184 so that there is no substructure-reflected ARsb or XRsb light.

Light, termed ADcc light, normally leaves CC component 184 after being reflected or/and emitted by it during. ADcc light, which excludes any ARsb light, consists of (a) light, termed ARcc light, normally reflected by component 184 so as to leave it via interface 186 after striking SF zone 112 and passing through IS component 182 and (b) light (if any), termed AEcc light, normally emitted by component 184 so as to leave it via interface 186. Reflected ARcc light which is of wavelength for a normal reflected main color ARcc is invariably always present. Emitted AEcc light which is of wavelength for a normal emitted main color AEcc may or may not be present.

Any ARsb light passes in substantial part through CC component 184. The total light, termed ATcc light, normally leaving component 184 (along IS component 182) consists of ARcc light, any AEcc light, and any ARsb light leaving component 184. Substantial parts of the ARcc light, any AEcc light, and any ARsb light pass through IS component 182. In addition, component 182 may normally reflect light, termed ARis light, which leaves it via SF zone 112 after striking zone 112. A light is formed with ARcc light, any AEcc light, and any ARis and ARsb light normally leaving component 182 and thus VC region 106. Each of ADcc light and either ARcc or AEcc light is usually a majority component, preferably a 75% majority component, more preferably a 90% majority component, of each of A and ADic light.

Referring to FIGS. 11b and 11c, item 192 is the ID segment of IS component 182 present in IDVC portion 138. Print area 118 is the upper surface of ID segment 192. Item 194 is the underlying ID segment of CC component 184 present in portion 138. Item 196 is the ID segment of interface 186 present in portion 138. "IF" hereafter means interface. Component segments 192 and 194, respectively termed IS and CC segments, meet along segment 196 of interface 186.

Responsive to object 104 impacting OC area 116 so as to meet the TH impact criteria, ID IS segment 192 provides a principal general ID impact effect usually resulting from the pressure of the impact on area 116 or from deformation that object 104 causes along SF DF area 122. The general ID impact effect is typically an electrical effect consisting of one or more electrical signals but can be in other form depending on the configuration and operation of IS component 182. IS segment 192 can generate the impact effect piezoelectrically as described below for FIGS. 24a, 24b, 25a, and 25b or using a resistive touchscreen technique.

The general impact effect is furnished directly to CC component 184, specifically to ID CC segment 194, in some general OI embodiments. If so or if component 184, likewise specifically segment 194, in other general OI embodiments is provided with the general CC control signal generated in response to the impact effect for the impact meeting the basic TH impact criteria sometimes dependent on other impact criteria also being met in those other embodiments as described below, CC segment 194 responds to the effect or to the control signal by changing in such a way that light, termed XDcc light, temporarily leaves segment 194 after being reflected or/and emitted by it as VC region 106 goes to the changed state. XDcc light, which excludes any XRsb light, consists of (a) light, termed XRcc light, temporarily reflected by segment 194 so as to leave it via ID IF segment 196 after striking print area 118 and passing through IS segment 192 and (b) light (if any), termed XEcc light, temporarily emitted by CC segment 194 so as to leave it via IF segment 196. Reflected XRcc light which is of wavelength for a temporary reflected main color XRcc is invariably always present. Emitted XEcc light which is of wavelength for a temporary emitted main color XEcc may or may not be present.

Any XRsb light passes in substantial part through CC segment 194. The total light, termed XTcc light, temporarily leaving segment 194 (along IS segment 192) consists of XRcc light, any XEcc light, and any XRsb light leaving segment 194. Substantial parts of the XRcc light, any XEcc light, and any XRsb light pass through IS segment 192. Since IS component 182 may reflect ARis light during the normal state, segment 192 may reflect ARis light which leaves it via print area 118 during the changed state. X light is formed with XRcc light, any XEcc light, and any ARis and XRsb light leaving segment 192 and thus IDVC portion 138. XDcc light differs materially from A, ADic, and ADcc light. Each of XDcc light and either XRcc or XEcc light is usually a majority component, preferably a 75% majority component, more preferably a 90% majority component, of each of X and XDic light.

If the basic TH impact criteria consist of multiple sets ($S_1$-$S_n$) of different principal basic TH impact criteria respectively associated with multiple specific changed colors ($X_i$-$X_n$) materially different from principal color A, the principal general impact effect consists of one of multiple different principal specific impact effects respectively corresponding to the specific changed colors. IS component 182, specifically IS segment 192, provides the general impact effect as the specific impact effect for the basic TH criteria set ($S_i$) met by the impact. CC component 184, specifically CC segment 194, responds (a) in some general OI embodiments to that specific impact effect or (b) in other general OI embodiments to the general CC control signal then generated in response to that specific effect sometimes dependent on the above-mentioned other impact criteria also being met in those other embodiments, by causing IDVC portion 138 to appear as the specific changed color ($X_i$) for that criteria set. The control signal may, for example, be generatable at multiple control conditions respectively associated with the criteria sets. The control signal is then actually generated at the control condition for the criteria set met by the impact.

X light advantageously generally becomes more distinct from A light as the ratio $R_{ARis/ADcc}$ of the radiosity of ARis light leaving IS component 182 during the normal state to the radiosity of ADcc light leaving component 182 during the normal state decreases and as the ratio $R_{ARis/XDcc}$ of the radiosity of ARis light leaving IS segment 192 during the changed state to the radiosity of XDcc light leaving segment 192 during the changed state likewise decreases. The radiosity of ARis light during the normal and changed states is usually made as small as reasonably feasible. The sum of radiosity ratios $R_{ARis/ADcc}$ and $R_{ARis/XDcc}$ is usually no more than 0.4, preferably no more than 0.3, more preferably no more than 0.2, even more preferably no more than 0.1.

Performing the impact-sensing and color-changing operations with separate components 182 and 184 provides many benefits. More materials are capable of separately performing the impact-sensing and color-changing operations than of jointly performing those operations. As a result, the ambit of colors for embodying colors A and X is increased. Different shades of the embodiments of colors A and X existent in the absence of ARis light can be created by varying the reflection characteristics of IS component 182, specifically the wavelength and intensity characteristics of ARis light, without changing CC component 184. Print area 118 can be even better matched to OC area 116. The ruggedness, especially the ability to successfully withstand impacts, is enhanced. Consequently, the lifetime can be increased.

The ability to select and control the CC timing, both CC duration $\Delta t_{dr}$ and the XN delays, is improved. Full forward XN delay $\Delta t_f$ can be as high as 0.4 s, sometimes as high as 0.6, 0.8, or 1.0 s but is usually reduced to no more than 0.2 s, preferably no more than 0.1 s, more preferably no more than 0.05 s, even more preferably no more than 0.025 s. 50% forward XN delay $\Delta t_{f50}$ correspondingly can be as high as 0.2 s, sometimes as high as 0.3, 0.4, or 0.5 s but is usually reduced to no more than 0.1 s, preferably no more than 0.05 s, more preferably no more than 0.025 s, even more preferably no more than 0.0125 s. These low maximum usual and preferred values for delays $\Delta t_f$ and $\Delta t_{f50}$ are highly advantageous when the activity is a sport such as tennis in which players and any official(s) need to make quick decisions on the impact locations of a tennis ball embodying object 104.

The last 10% of the actual print-area transition from color A to color X is comparatively long in some embodiments of OI structure 180. As a result, the time period from OS time $t_{os}$ to actual forward XN end time $t_{f100}$ is considerably greater than approximate full forward delay $\Delta t_f$. See FIG. 10. In such embodiments, the comparatively long duration of the last 10% of the A-to-X transition is generally not significant because a person viewing surface 102 can usually readily identify print area 118 when it is close to, but not exactly, color X. In view of these considerations, 90% forward XN delay $\Delta t_{f90}$ and 10%-to-90% forward XN delay $\Delta t_{f10-90}$ are important timing parameters. Since 90% forward delay $\Delta t_{f90}$ starts at OS time $t_{os}$ whereas 10%-to-90% forward delay $\Delta t_{f10-90}$ starts at 10% forward XN time $t_{f10}$, delay $\Delta t_{f90}$ can be greater than or less than delay $\Delta t_{f10-90}$ depending on whether OS time $t_{os}$ occurs before or after 10% forward XN time $t_{f10}$. By forming ISCC structure 132 with components 182 and 184, especially when CC component 184 is configured as described below for FIGS. 12a-12c, each delay $\Delta t_{f90}$ or $\Delta t_{f10-90}$ can be as high as 0.4 s, sometimes as high as 0.6, 0.8, or 1.0 s but is usually less than 0.2 s, preferably less than 0.1 s, more preferably less than 0.05 s, even more preferably less than 0.025 s. This is likewise particularly advantageous when the activity is a sport such as tennis in which quick decisions are needed on tennis-ball impact locations.

OC duration $\Delta t_{oc}$, although usually quite small, can be long enough that 90% forward XN time $t_{f90}$ occurs before OS time $t_{os}$ when ISCC structure 132 is formed with components 182 and 184. If so, 90% forward XN delay $\Delta t_{f90}$ and 10%-to-90% forward XN delay $\Delta t_{f10-90}$ become zero. Also, approximate forward XN end time $t_{fe}$ may occur before OS time $t_{os}$. If so, full forward delay $\Delta t_f$ drops to zero. 50% forward XN delay $\Delta t_{f50}$ also drops to zero and, in fact, becomes zero whenever time $t_{f50}$ occurs before OS time $t_{os}$.

A consequence of the reduced maximum $\Delta t_f$, $\Delta t_{f50}$, $\Delta t_{f90}$, and $\Delta t_{f10-90}$ values arising from forming ISCC structure 132 with components 182 and 184 is that return XN delays $\Delta t_r$, $\Delta t_{r50}$, $\Delta t_{r90}$, and $\Delta t_{r10-90}$ are reduced. Approximate full return XN delay $\Delta t_r$ usually has the same reduced maximum values as full forward delay $\Delta t_f$. 50% return XN delay $\Delta t_{r50}$ usually has the same reduced maximum values as 50% forward delay $\Delta t_{f50}$. 90% return XN delay $\Delta t_{r90}$ and 10%-to-90% return XN delay $\Delta t_{r10-90}$ usually have the same reduced maximum values as forward delays $\Delta t_{f90}$ and $\Delta t_{f10-90}$.

The general impact effect can be transmitted outside VC region 106. For instance, the effect can take the form of a general location-identifying impact signal supplied to a separate general CC duration controller as described below for FIGS. 54a and 54b or a characteristics-identifying impact signal supplied to a separate general intelligent CC controller as described below for FIGS. 64a and 64b. The effect can also take the form of multiple cellular location-identifying impact signals supplied to a separate cell CC duration controller as described below for FIGS. 59a and 59b or multiple characteristics-identifying impact signals supplied to a separate intelligent cell CC controller as described below for FIGS. 69a and 69b. When a duration controller is used, the effect is also provided to ID portion 138, or is converted into the general CC control signal provided to portion 138, for producing a color change at print area 118. However, the effect is not provided to portion 138 or always converted into the control signal when an intelligent controller is used. Instead, the intelligent controller makes a decision to provide, or not provide, portion 138 with a CC initiation signal which implements, or leads to the generation of, the control signal that produces a color change at area 118.

The positions of components 182 and 184 can sometimes be reversed so that IS component 182 extends between CC component 184 and substructure 134. SF zone 112 is then the upper surface of component 184. Components 182 and 184 still meet at interface 186. In this reversal, the pressure of the impact on OC area 116 or the deformation that object 104 causes along SF DF area 122 is transmitted pressurewise through component 184 to produce excess internal pressure at IF segment 196. IS segment 192 responds to the excess internal pressure at IF segment 196, and thus to object 104 impacting OC area 116 so as to meet excess internal pressure criteria that embody the TH impact criteria, by providing the general impact effect supplied to CC segment 194 or/and outside VC region 106 for potential generation of the general CC control signal.

Object-impact Structure having Impact-sensitive Component and Changeably Reflective or Changeably Emissive Color-change Component CC component 184 in OI structure 180 can be embodied in various ways to perform the CC function in accordance with the invention. In one group of embodiments, the core of the mechanism used to achieve color changing is light reflection (and associated light absorption). Component 184 in these embodiments is, for simplicity, termed "CR component 184" where "CR" again means changeably reflective. Light emission is the core of the mechanism used to achieve color changing in another group of embodiments. Component 184 in these other embodiments is termed "CE component 184" where "CE" again means changeably emissive.

Beginning with CR component 184, no significant amount of light is emitted by it so as to leave it during the normal or changed state. Starting with the normal state, CR component 184 normally reflects ARcc light which passes in substantial part through IS component 182. Normal reflected main color ARcc may be termed the first reflected main color. Including any ARis light normally reflected by IS component 182 and any ARsb light passing through it. A light is formed with ARcc light and any ARis and ARsb light normally leaving component 182 and thus VC region 106. ARcc light, a reflective implementation of ADcc light here, is usually a majority component, preferably a 75% majority component, more preferably a 90% majority component, of A light.

Responsive (a) in some general OI embodiments to the general impact effect for the impact meeting the basic TH impact criteria or (b) in other general OI embodiments to the general CC control signal generated in response to the effect sometimes dependent on other impact criteria also being met in those other embodiments, ID segment 194 of CR component 184 temporarily reflects XRcc light, materially different from ARcc light, which passes in substantial part through IS segment 192 during the changed state. Temporary reflected main color XRcc may be termed the second reflected main color. If IS component 182 normally reflects ARis light, segment 192 continues to reflect ARis light. Including any XRsb light passing through segment 192, X light is formed with XRcc light and any ARis and XRsb light leaving segment 192 and thus IDVC portion 138. XRcc light, a reflective implementation of XDcc light here, is usually a majority component, preferably a 75% majority component, more preferably a 90% majority component, of X light.

CR component 184 is an electrochromic structure or a photonic crystal structure in a basic embodiment. An electrochromic structure contains electrochromic material which temporarily changes color upon undergoing a change in electronic state, such as a change in charge condition resulting from a change in electric field across the material, in response to an electrical-effect implementation of the general impact effect provided by IS segment 192. Examples of electrochromic material are described in Fukuda, *Inorganic Chromotropism: Basic Concepts and Applications of Colored Materials* (Springer), 2007, pp. 34-38 and 291-336, and the references cited on those pages, contents incorporated by reference herein. Alternatively, CR component 184 is one or more of the following light-processing structures in which the light processing generally involves reflecting light off particles: a dipolar suspension structure, an electrofluidic structure, an electrophoretic structure, and an electrowetting structure. CR component 184 may also be a reflective liquid-crystal structure or a reflective microelectricalmechanicalsystem (display) structure such as an interferometric modulator structure or a transflective digital micro shutter structure.

CE component 184 can be embodied to operate in either of two modes termed the single-emission and double-emission modes. These two embodiments of CE component 184 are respectively termed single-emission CE component 184 and double-emission CE component 184.

For single-emission CE component 184, the normal and changed states of VC region 106 can be respectively designated as non-emissive and emissive states because significant light emission occurs during the changed state but not during the normal state. Single-emission CE component 184 operates the same during the normal (non-emissive) state as CR component 184.

Responsive (a) in some general OI embodiments to the general impact effect for the impact meeting the TH impact criteria or (b) in other general OI embodiments to the general CC control signal generated in response to the effect sometimes dependent on other impact criteria also being met in those other embodiments, ID segment 194 of single-emission CE component 184 temporarily emits XEcc light which passes in substantial part through IS segment 192 during the changed (emissive) state. CC segment 194 usually continues to reflect ARcc light which passes in substantial part through IS segment 192. XEcc and ARcc light form XDcc light. Since IS component 182 may normally reflect ARis light, segment 192 may reflect ARis light. Including any XRsb light passing through segment 192, X light is formed with XEcc and ARcc light and any ARis and XRsb light leaving segment 192 and thus IDVC portion 138. XEcc light, an emissive component of XDcc light here, differs materially from A, ADic, ADcc, and ARcc light. Either XEcc or ARcc light is usually a majority component of X light.

Alternatively, the emission of XEcc light may so affect CC segment 194 of single-emission CE component 184 during the changed state that segment 194 ceases to reflect ARcc light and, instead, temporarily reflects XRcc light significantly different from ARcc light. The XRcc light passes in substantial part through IS segment 192. XEcc and XRcc light now form XDcc light. The processing of any ARis and XRsb light is the same. X light is then formed with XEcc and XRcc light and any ARis and XRsb light leaving segment 192 and thus IDVC portion 138. Either XEcc or XRcc light is usually a majority component of X light.

Turning to double-emission CE component 184, the normal and changed states of VC region 106 can be respectively designated as first emissive and second emissive states because significant light emission occurs during both the normal and changed states. Double-emission CE component 184 operates as follows during the normal (first emissive) state. For the normal state, CE component 184 normally emits AEcc light which passes in substantial part through IS component 182. Normal emitted main color AEcc may be termed the first emitted main color. CE component 184 usually normally reflects ARcc light which passes in substantial part through IS component 182. Including any ARis light normally reflected by component 182 and any ARsb light passing through it, A light is formed with AEcc and ARcc light and any ARis and ARsb light normally leaving component 182 and thus VC region 106. Either AEcc or ARcc light is usually a majority component of A light.

Double-emission CE component 184 responds, during the changed (second emissive) state, (a) in some general OI embodiments to the general impact effect for the impact meeting the TH impact criteria or (b) in other general OI embodiments to the general CC control signal generated in response to the effect sometimes dependent on other impact criteria also being met in those other embodiments basically the same as single-emission CE component 184 responds during the changed (emissive) state. In particular, ID segment 194 of double-emission CE component 184 temporarily emits XEcc light which passes in substantial part through IS segment 192. Temporary emitted main color XEcc, which may be termed the second emitted main color, differs materially from normal (or first) emitted main color AEcc. CC segment 194 can implement this change by ceasing to emit AEcc light and replacing it with XEcc light or by ceasing to emit one or more components, but not all, of AEcc light, potentially accompanied by emitting additional light.

During the changed state, ID segment 194 of double-emission CE component 184 usually continues to reflect ARcc light which passes in substantial part through IS segment 192. Since IS component 182 may normally reflect ARis light, segment 192 may again reflect ARis light. Including any XRsb light passing through segment 192, X light is formed with XEcc and ARcc light and any ARis and XRsb light leaving segment 192 and thus IDVC portion 138. Either XEcc or ARcc light is usually a majority component of X light.

Alternatively, the emission of XEcc light may so affect ID segment 194 of double-emission CE component 184 that CC segment 194 temporarily ceases to reflect ARcc light and instead temporarily reflects XRcc light which passes through IS segment 192. Subject to segment 194 changing from emitting AEcc light to emitting XEcc light by ceasing to emit AEcc light and replacing it with XEcc light or by ceasing to emit one or more components, but not all, of AEcc light, possibly accompanied by emitting additional light, the operation of double-emission CE component 184 during the changed state in this alternative is the same as that of single-emission CE component 184 during the changed state in the corresponding alternative.

Both the single-emission and double-emission embodiments of CE component 184 are advantageous because use of light emission to produce changed color X enables print area 118 to be quite bright, thereby enhancing visibility of the color change. CE component 184, either embodiment, may variously be one or more of the following light-processing structures that emit light: a backlit liquid-crystal structure, a cathodoluminescent structure, a digital light processing structure, an electrochromic fluorescent structure, an electrochromic luminescent structure, an electrochromic phosphorescent structure, an electroluminescent structure, an emissive microelectricalmechanicalsystem (display) structure (such as a time-multiplexed optical shutter or a backlit digital micro shutter structure), a field-emission structure, a laser phosphor (display) structure, a light-emitting diode structure, a light-emitting electrochemical cell structure, a liquid-crystal-over-silicon structure, an organic light-emitting diode structure, an organic light-emitting transistor structure, a photoluminescent structure, a plasma panel structure, a quantum-dot light-emitting diode structure, a surface-conduction-emission structure, a telescopic pixel (display) structure, and a vacuum fluorescent (display) structure. Organic light-emitting diode structures are of particular interest because they provide bendability for impact resistance.

The above-described situation in which the positions of components 182 and 184 are reversed is particularly suitable for embodying CC component 184 as a CR CC component, especially an electrochromic or photonic crystal structure, or a CE CC component, especially an electrochromic fluorescent, electrochromic luminescent, electrochromic phosphorescent structure, or electroluminescent structure.

Figure 12A:
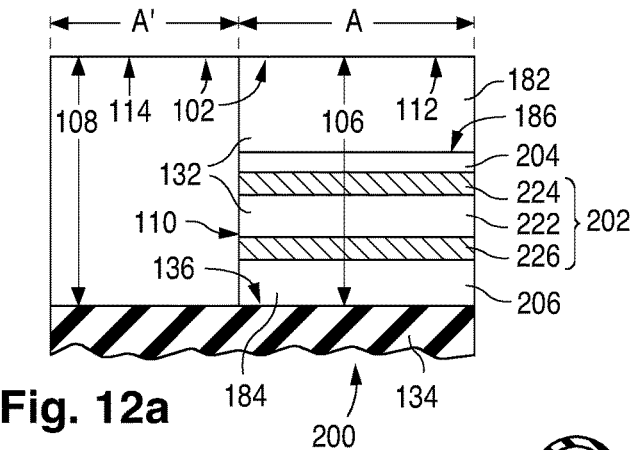
Figure 12B:
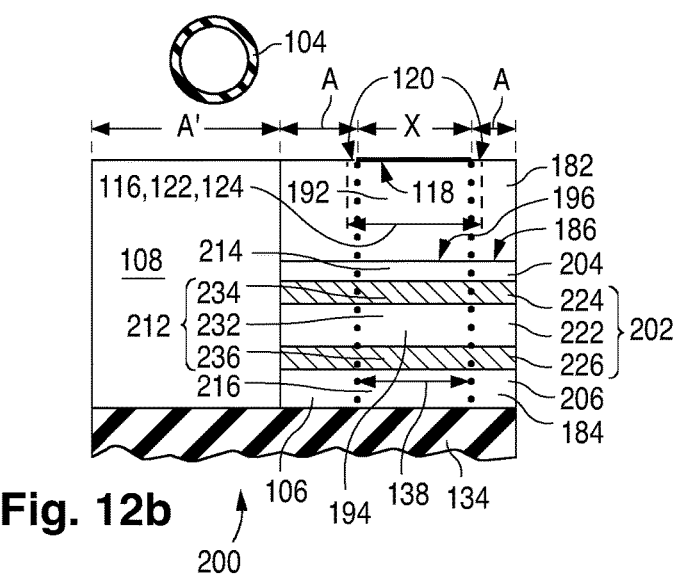
Figure 12C:
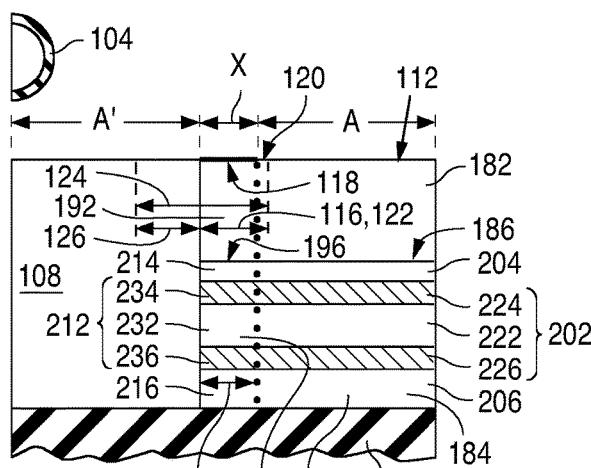

Object-impact Structure having Impact-sensitive Component and Color-change Component that Utilizes Electrode Assembly FIGS. 12a-12c (collectively "FIG. 12") illustrate an embodiment 200 of OI structure 180 and thus of OI structure 130. CC component 184 in OI structure 200 consists of a principal electrode assembly 202, an optional principal near (first) auxiliary layer 204 extending between electrode assembly 202 and interface 186 to meet IS component 182, and an optional principal far (second) auxiliary layer 206 extending between assembly 202 and substructure 134. See FIG. 12a. The adjectives "near" and "far" are used to differentiate near auxiliary layer 204 and far auxiliary layer 206 relative to their distances from SF zone 112, far auxiliary layer 206 being farther from zone 112 than near auxiliary layer 204. "NA" and "FA" hereafter respectively mean near auxiliary and far auxiliary. Assembly 202, NA layer 204, and FA layer and 206 all usually extend parallel to one another and parallel to zone 112 and interface 136.

NA layer 204, if present, usually contains insulating material for isolating IS component 182 and assembly 202 from each other as necessary. FA layer 206, if present, usually contains insulating material for appropriately isolating assembly 202 from substructure 134 as desired. Auxiliary layers 204 and 206 may perform other functions. Electrical conductors may be incorporated into NA layer 204 for electrically connecting selected parts of component 182 to selected parts of assembly 202. If VC region 106, potentially in combination with FC region 108, is manufactured as a separate unit and later installed on substructure 134, FA layer 206 protects assembly 202 during the time between manufacture of the unit and its installation on substructure 134. In some liquid-crystal embodiments of CC component 184, NA layer 204 includes a polarizer while FA layer 206 includes a polarizer and either a light reflector or a light emitter.

Light travels from interface 186 through NA layer 204, usually transparent, to assembly 202 and vice versa. Hence, light leaves assembly 202 along layer 204. In some embodiments of CC component 184, light also travels from interface 186 through both NA layer 204 and assembly 202 to FA layer 206 and vice versa. Light leaves FA layer 206 along assembly 202 in those embodiments. Preferably, no light striking layer 206 along assembly 202 passes fully through layer 206 to interface 136 during the normal or changed state. In particular, all light striking layer 206 along assembly 202 is preferably either absorbed or reflected by layer 206 so that there is no ARsb or XRsb light.

Auxiliary layers 204 and 206 may or may not be significantly involved in determining color change along print area 118. If layer 204 or 206 is significantly involved in determining color change, the involvement is usually passive. That is, light processed by layer 204 or 206 undergoes changes largely caused by changes in light processed by assembly 202 rather than partly or fully by changes in the physical or/and chemical characteristics of layer 204 or 206.

FA layer 206 (if present) operates during the normal state according to a light non-outputting normal general far auxiliary mode or one of several versions of a light outputting normal general far auxiliary mode depending on how subcomponents 202, 204, and 206 are configured and constituted. "GFA" hereafter means general far auxiliary. Largely no light leaves FA layer 206 along assembly 202 in the light non-outputting normal GFA mode. The light outputting normal GFA mode consists of one or both of the following actions: (i) any ARsb light passes in substantial part through layer 206 and (ii) light, termed ADfa light, is reflected or/and emitted by layer 206 so as to leave it along assembly 202.

ADfa light, which excludes any ARsb light, consists of (a) light (if any), termed ARfa light, normally reflected by FA layer 206 so as to leave it along assembly 202 after striking SF zone 112, passing through IS component 182, NA layer 204 (if present), and assembly 202 and (b) light (if any), termed AEfa light, normally emitted by layer 206 so as to leave it along assembly 202. Reflected ARfa light is typically present when ADfa light is present. The total light (if any), termed ATfa light, leaving layer 206 in the light outputting normal GFA mode consists of any ARfa and AEfa light provided directly by layer 206 and any ARsb light passing through it. This operation of layer 206 applies to situations in which it is both significantly used, and not used, in determining color change along zone 112.

Taking note that NA layer 204 may not be present in CC component 184, a recitation that light leaves assembly 202 means that the light leaves it along IS component 182, and thus via interface 186, if layer 204 is absent. Assembly 202 operates during the normal state according to a light non-outputting normal general assembly mode or one of a group of versions of a light outputting normal general assembly mode depending on how subcomponents 202, 204, and 206 are configured and constituted. "GAB" hereafter means general assembly. Largely no light normally leaves assembly 202 along NA layer 204 in the light non-outputting normal GAB mode. The light outputting normal GAB mode consists of one or more of the following actions: (i) a substantial part of any ARsb light passing through FA layer 206 passes through assembly 202, (ii) substantial parts of any FA-layer-provided ARfa and AEfa light pass through assembly 202, and (iii) light, termed ADab light, is reflected or/and emitted by assembly 202 so as to leave it along NA layer 204.

ADab light, which excludes any ARfa or ARsb light, consists of (a) light (if any), termed ARab light, normally reflected by assembly 202 so as to leave it along NA layer 204 after striking SF zone 112, passing through IS component 182, and layer 204 and (b) light (if any), termed AEab light, normally emitted by assembly 202 so as to leave it along layer 204. Reflected ARab light is typically present when ADab light is present. The total light, termed ATab light, leaving assembly 202 in the light outputting normal GAB mode consists of any ARab and AEab light provided directly by assembly 202, any FA-layer-provided ARfa and AEfa light passing through it, and any ARsb light passing through it.

ADfa light is present in some versions, but absent in other versions, of the light outputting normal GAB mode. When ADfa light is absent, ARsb light is also usually absent. Emitted AEab light is typically absent from the light outputting normal GAB mode when emitted AEfa light is present in it and vice versa. Either ADab or ADfa light, and therefore one of ARab, AEab, ARfa, and AEfa light, is usually a majority component, preferably a 75% majority component, more preferably a 90% majority component, of each of A, ADic, and ADcc light depending on how subcomponents 202, 204, and 206 are configured and constituted.

Substantial parts of any ARab, AEab, ARfa, AEfa, and ARsb light leaving assembly 202 pass through NA layer 204. In addition, layer 204 may normally reflect light, termed ARna light, which leaves it via interface 186 after striking SF zone 112 and passing through IS component 182 and which thus excludes any ARab, ARfa, or ARsb light. Total ATcc light normally leaving layer 204, and therefore CC component 184, consists of any assembly-provided ARab and AEab light passing through layer 204, any FA-layer-provided ARfa and AEfa light passing through it, any ARna light reflected by it, and any ARsb light passing through it.

Inasmuch as any ARab, AEab, ARfa, AEfa, and ARsb light leaving NA layer 204 form ATab light leaving layer 204 via interface 186, ATcc light leaving CC component 184 is also expressed as consisting of ATab light and any ARna light leaving layer 204. Also, any ARab, AEab, ARfa, AEfa, and ARna light leaving layer 204 form ADcc light leaving component 184. Substantial parts of any ARab, AEab, ARfa, AEfa, ARna, and ARsb light leaving component 184 pass through IS component 182. Including any ARis light reflected by component 182, A light is formed with any ARab, AEab, ARfa, AEfa, ARis, ARna, and ARsb light normally leaving component 182 and thus VC region 106.

Changes in the color of IDVC portion 138 occur due to changes in assembly 202 in responding (a) in first general OI embodiments to the general impact effect provided by IS segment 192 for the impact meeting the basic TH impact criteria or (b) in second general OI embodiments to the general CC control signal generated in response to the effect sometimes dependent on other impact criteria also being met in the second embodiments. The assembly changes are sometimes accompanied, as mentioned above, by changes in the light processed by NA layer 204, if present, or/and FA layer 206, if present. Referring to FIGS. 12b and 12c with this in mind, item 212 is the ID segment of assembly 202 present in portion 138. Items 214 and 216 respectively are the ID segments of auxiliary layers 204 and 206 present in portion 138.

During the changed state, ID segment 216 of FA layer 206 (if present) temporarily operates, usually passively, according to a light non-outputting changed GFA mode or one of several versions of a light outputting changed GFA mode. Largely no light leaves FA segment 216 along ID assembly segment 212 in the light non-outputting changed GFA mode, "AB" hereafter meaning assembly. The light outputting changed GFA mode consists of one or both of the following actions: (i) any XRsb light passes in substantial part through FA segment 216 and (ii) light, termed XDfa light, is reflected or/and emitted by segment 216 so as to leave it along AB segment 212.

XDfa light, which excludes any XRsb light, consists of (a) light (if any), termed XRfa light, temporarily reflected by FA segment 216 so as to leave it along AB segment 212 after striking print area 118, passing through IS segment 192, ID segment 214 of NA layer 204 (if present), and AB segment 212 and (b) light (if any), termed XEfa light, temporarily emitted by FA segment 216 so as to leave it along AB segment 212. Reflected XRfa light is typically present when XDfa light is present. Reflection of XRfa light or/and emission of XEfa light leaving FA segment 216 along AB segment 212 usually occur under control of segment 212 in response (a) in the first general OI embodiments to the general impact effect for the impact meeting the basic TH impact criteria or (b) in the second general OI embodiments to the general CC control signal generated in response to the effect sometimes dependent on other impact criteria also being met in the second embodiments. If FA layer 206 normally reflects ARfa light or/and emits AEfa light, a change in which largely no light temporarily leaves FA segment 216 likewise usually occurs under control of AB segment 212 in responding to the impact effect or to the control signal. The total light (if any), termed XTfa light, leaving FA segment 216 in the light outputting changed GFA mode consists of any XRfa and XEfa light provided directly by segment 216 and any XRsb light passing through it.

The foregoing operation of FA segment 216 applies to situations in which FA layer 206 is both significantly used, and not used, in determining color change along print area 118. XDfa light usually differs materially from A, ADic, ADcc, ADab, and ADfa light if layer 206 is significantly involved in determining color change along area h. The same applies usually to XRfa and XEfa light if both are present and, of course, to XRfa or XEfa light if it is present but respective XEfa or XRfa light is absent.

Again noting that NA layer 204 may not be present in CC component 184, a recitation that light leaves AB segment 212 means that the light leaves segment 212 along IS segment 192, and thus via IF segment 196, if layer 204 is absent. During the changed state, AB segment 212 responds (a) in the first general OI embodiments to the general impact effect or (b) in the second general OI embodiments to the general CC control signal generated in response to the effect sometimes dependent on both the TH impact criteria and other criteria being met by temporarily operating according to a light non-outputting changed GAB mode or one of a group of versions of a light outputting changed GAB mode. Largely no light leaves segment 212 along NA segment 214 in the light non-outputting changed GAB mode. The light outputting changed GAB mode consists of one or more of the following actions: (i) a substantial part of any XRsb light passing through FA segment 216 passes through AB segment 212, (ii) substantial parts of any FA-segment-provided XRfa and XEfa light pass through segment 212, and (iii) light, termed XDab light, is reflected or/and emitted by segment 212 so as to leave it along NA segment 214.

XDab light, which excludes any XRfa or XRsb light, consists of (a) light (if any), termed XRab light, temporarily reflected by AB segment 212 so as to leave it along NA segment 214 after striking print area 118, passing through IS segment 192 and NA segment 214 and (b) light (if any), termed XEab light, temporarily emitted by AB segment 212 so as to leave it along NA segment 214. Reflected XRab light is typically present when XDab light is present. The total light, termed XTab light, leaving AB segment 212 in the light outputting changed GAB mode consists of any XRab and XEab light provided directly by segment 212, any FA-segment-provided XRfa and XEfa light passing through it, and any XRsb light passing through it.

XDfa light is present in some versions, but is absent in other versions, of the light outputting changed GAB mode. When XDfa light is absent, XRsb light is also usually absent. Emitted XEab light is typically absent from the light outputting changed GAB mode when emitted XEfa light is present in it and vice versa. XDab light usually differs materially from A, ADic, ADcc, ADab, and ADfa light if FA layer 206 is not significantly involved in determining color change along print area 118. The same applies usually to XRab and XEab light if both are present and, of course, to XRab or XEab light if it is present but respective XEab or XRab light is absent. Either XDab or XDfa light, and thus one of XRab, XEab, XRfa, and XEfa light, is usually a majority component, preferably a 75% majority component, more preferably a 90% majority component, of each of X, XDic, and XDcc light depending on the configuration and constitution of subcomponents 202, 204, and 206.

Substantial parts of any XRab, XEab, XRfa, XEfa, and XRsb light leaving AB segment 212 pass through NA segment 214. In addition, segment 214 may reflect light, termed XRna light, which leaves it via IF segment 196 during the changed state after striking print area 118 and passing through IS segment 192 and which thus excludes any XRab, XRfa, or XRsb light. XRna light is usually largely ARna light. If NA segment 214 undergoes a change so that XRna light significantly differs from ARna light, the change usually occurs under control of AB segment 212 in responding to the general impact effect or to the general CC control signal. Total XTcc light temporarily leaving NA segment 214, and therefore CC segment 194, consists of any AB-segment-provided XRab and XEab light passing through segment 214, any FA-segment-provided XRfa and XEfa light passing through it, any XRna light directly reflected by it, and any XRsb light passing through it.

Inasmuch as any XRab, XEab, XRfa, XEfa, and XRsb light leaving NA segment 214 form XTab light leaving it via IF segment 196, XTcc light leaving CC segment 194 is also expressed as consisting of XTab light and any XRna light leaving NA segment 214. Any XRab, XEab, XRfa, XEfa, and XRna light leaving segment 214 form XDcc light leaving CC segment 194. Substantial parts of any XRab, XEab, XRfa, XEfa, XRna, and XRsb light leaving segment 194 pass through IS segment 192. If IS component 182 normally reflects ARis light, segment 192 continues to reflect ARis light. X light is formed with any XRab, XEab, XRfa, XEfa, ARis, XRna, and XRsb light temporarily leaving segment 192 and thus IDVC portion 138.

Different shades of the embodiments of colors A and X occurring in the absence of ARna and XRna light can be created by varying the reflection characteristics of NA layer 204, specifically the wavelength and intensity characteristics of ARna and XRna light, without changing assembly 202 or FA layer 206. NA layer 204 can thus strongly influence color A or/and color X.

Either of the changed GAB modes, including any of the versions of the light outputting changed GAB mode, can generally be employed with either of the normal GAB modes, including any of the versions of the light outputting normal GAB mode, in an embodiment of CC component 184 except for employing the light non-outputting changed GAB mode with the light non-outputting normal GAB mode provided, however, that the operation of the changed GAB mode is compatible with the operation of normal GAB mode in that embodiment. This compatibility requirement may effectively preclude employing certain versions of the light outputting changed GAB mode with certain versions of the light outputting normal GAB mode.

When two versions of the light outputting normal GAB mode differ only in that ARsb light is present in one of the versions and absent in the other, the difference is generally of a relatively minor nature. The same applies when the only difference between two versions of the light outputting changed GAB mode is that XRsb light is present in one of the versions and absent in the other. Subject to the preceding compatibility requirement, the major combinations of one of the changed GAB modes with one of the normal GAB modes consist of employing the light non-outputting changed GAB mode or the light outputting changed GAB mode for a version in which (a) XRfa or/and XEfa light provided by FA segment 216 passes through AB segment 212 or/and (b) XRab or/and XEab light is provided directly by segment 212 with the light non-outputting normal GAB mode or the light outputting normal GAB mode for a version in which (a) ARfa or/and AEfa light provided by FA layer 206 passes through assembly 202 or/and (b) ARab or/and AEab light is provided directly by assembly 202 again except for employing the light non-outputting changed GAB mode with the light non-outputting normal GAB mode.

Configuration and General Operation of Electrode Assembly

Electrode assembly 202 in OI structure 200 consists of a principal core layer 222, principal near (first) electrode structure 224, and principal far (second) electrode structure 226 located generally opposite, and spaced apart from, near electrode structure 224. Core layer 222 lies between electrode structures 224 and 226. "NE" and "FE" hereafter respectively mean near electrode and far electrode. FE structure 226 is farther away from SF zone 112 than NE structure 224 so that structures 224 and 226 respectively meet auxiliary layers 204 and 206. Core layer 222 and structures 224 and 226 all usually extend parallel to one another and to auxiliary layers 204 and 206, zone 112, and interface 136. Each structure 224 or 226 contains a layer (not separately shown) for conducting electricity. Structures 224 and 226 control core layer 222 as further described below and typically process light, usually passively, which affects the operation of layer 222 and thus CC component 184.

Light travels from NA layer 204 or, if it is absent, from interface 186 through NE structure 224 (including its electrode layer) to core layer 222 and vice versa. Accordingly, light leaves layer 222 along structure 224. In some embodiments of CC component 184, light travels from interface 186 through structure 224, layer 222, and FE structure 226 (similarly including its electrode layer) to FA layer 206 and vice versa so that light leaves layer 206 along structure 226.

FE structure 226 operates as follows during the normal state. When assembly 202 is in the light non-outputting normal GAB mode, largely no light leaves structure 226 along core layer 222. One or more of the following actions occur with structure 226 when assembly 202 is in the light outputting normal GAB mode: (i) a substantial part of any ARsb light passing through FA layer 206 (if present) passes through structure 226, (ii) substantial parts of any ARfa and AEfa light provided by layer 206 pass through structure 226, and (iii) structure 226 reflects light, termed ARfe light, which leaves it along core layer 222 after striking SF zone 112 and passing through IS component 182, NA layer 204 (if present), NE structure 224, and core layer 222 and which thus excludes any ARfa or ARsb light. The total light (if any), termed ATfe light, normally leaving structure 226 consists of any ARfa and AEfa light provided by FA layer 206 so as to pass through structure 226, any ARfe light directly reflected by it, and any ARsb light passing through it.

Core layer 222 operates as follows during the normal state. When assembly 202 is in the light non-outputting normal GAB mode, largely no light normally leaves layer 222 along NE structure 224. One or more of the following actions occur with layer 222 when assembly 202 is in the light outputting normal GAB mode so as to implement it for layer 222: (i) a substantial part of any ARsb light passing through FE structure 226 passes through layer 222, (ii) substantial parts of any FA-layer-provided ARfa and AEfa light passing through structure 226 pass through layer 222, (iii) a substantial part of any ARfe light reflected by structure 226 passes through layer 222, and (iv) light, termed ADcl light and of wavelength for a normal reflected/emitted core color ADcl, is reflected or/and emitted by layer 222 so as to leave it along NE structure 224.

ADcl light, which excludes any ARfe, ARfa, or ARsb light, consists of (a) light (if any), termed ARcl light and of wavelength for a normal reflected core color ARcl, normally reflected by core layer 222 so as to leave it along NE structure 224 after striking SF zone 112, passing through IS component 182, NA layer 204, and structure 224 and (b) light (if any), termed AEcl light and of wavelength for a normal emitted core color AEcl, normally emitted by core layer 222 so as to leave it along structure 224. Reflected ARcl light is typically present when ADcl light is present. The total light, termed ATcl light and of wavelength for a normal total core color ATcl, leaving layer 222 in the light outputting normal GAB mode consists of any ARcl and AEcl light provided directly by layer 222 and any ARfa, AEfa, ARfe, and ARsb light passing through it.

Emitted AEcl light is typically absent from the light outputting normal GAB mode when emitted AEfa light is present in it and vice versa. When ADfa light is absent, each of ADcl light and either ARcl or AEcl light is usually a majority component, preferably a 75% majority component, more preferably a 90% majority component, of each of A, ADic, ADcc, and ADab light depending on how subcomponents 202, 204, and 206 are configured and constituted.

Substantial parts of any ARcl, AEcl, ARfa, AEfa, ARfe, and ARsb light normally leaving core layer 222 pass through NE structure 224. In addition, structure 224 may normally reflect light, termed ARne light, which leaves it along NA layer 204 after striking SF zone 112 and passing through IS component 182 and layer 204 and which thus excludes any ARcl, ARfa, ARfe, or ARsb light. Total ATab light normally leaving structure 224, and therefore assembly 202, consists of any ARcl, AEcl, ARfa, AEfa, ARfe, and ARsb light passing through structure 224 and any ARne light directly reflected by it.

Any ARcl, AEcl, ARne, and ARfe light leaving NE structure 224 form ADab light leaving assembly 202. Any ARcl, AEcl, ARfa, AEfa, ARna, ARne, and ARfe light leaving NA layer 204 form ADcc light leaving CC component 184. Additionally, ARcc light reflected by component 184 consists of any ARab, ARfa, and ARna light, ARab light being formed with any ARcl, ARne, and ARfe light. AEcc light emitted by component 184 consists of any AEab and AEfa light, AEab light being formed with any AEcl light.

Changes in AB segment 212 during the changed state arise from electrical signals applied to electrode structures 224 and 226 in response (a) in the first general OI embodiments to the general impact effect provided by IS segment 192 for the impact meeting the basic TH impact criteria or (b) in the second general OI embodiments to the general CC control signal generated in response to the effect sometimes dependent on other impact criteria also being met in the second embodiments. Referring again to FIGS. 12b and 12c, item 232 is the ID segment of core layer 222 present in IDVC portion 138. Items 234 and 236 respectively are the ID segments of structures 224 and 226 present in portion 138.

ID FE segment 236 operates as follows during the changed state. When assembly 202 is in the light non-outputting changed GAB mode, largely no light leaves FE segment 236 along ID core segment 232. One or more of the following actions occur with FE segment 236 when assembly 202 is in the light outputting changed GAB mode: (i) a substantial part of any XRsb light passing through ID segment 216 of FA layer 206 (if present) passes through segment 236, (ii) substantial parts of any XRfa and XEfa light provided by FA segment 216 pass through segment 236, and (iii) segment 236 reflects light, termed XRfe light, which leaves it along core segment 232 after striking print area 118 and passing through IS segment 192, segment 214 of NA layer 204 (if present), ID NE segment 234, and core segment 232 and which thus excludes any XRfa or XRsb light. The total light (if any), termed XTfe light, temporarily leaving FE segment 236 consists of any FA-segment-provided XRfa and XEfa light passing through segment 236, any XRfe light directly reflected by it, and any XRsb light passing through it. XRfe light can be the same as, or significantly different from, ARfe light depending on how the light processing in IDVC portion 138 during the changed state differs from the light processing in VC region 106 during the normal state.

Core segment 232 responds (a) in the first general OI embodiments to the general impact effect or (b) in the second general OI embodiments to the general CC control signal generated in response to the effect sometimes dependent on both the TH impact criteria and other criteria being met by temporarily operating as follows during the changed state. When assembly 202 is in the light non-outputting changed GAB mode, largely no light leaves segment 232 along NE segment 234. One or more of the following actions occur in core segment 232 when assembly 202 is in the light outputting changed GAB mode so as to implement it for segment 232: (i) a substantial part of any XRsb light passing through FE segment 236 passes through core segment 232, (ii) substantial parts of any FA-segment-provided XRfa and XEfa light passing through FE segment 236 pass through core segment 232, (iii) a substantial part of any XRfe light reflected by FE segment 236 passes through core segment 232, and (iv) light, termed XDcl light and of wavelength for a temporary reflected/emitted core color XDcl, is reflected or/and emitted by segment 232 so as to leave it along NE segment 234.

XDcl light, which excludes any XRfa, XRfe, or XRsb light, consists of (a) light (if any), termed XRcl light and of wavelength for a temporary reflected core color XRcl, temporarily reflected by core segment 232 so as to leave it along NE segment 234 after striking print area 118, passing through IS segment 192, NA segment 214, and NE segment 234 and (b) light (if any), termed XEcl light and of wavelength for a temporary emitted core color XEcl, temporarily emitted by core segment 232 so as to leave it along NE segment 234. Reflected XRcl light is typically present when XDcl light is present. The total light, termed XTcl light and of wavelength for a temporary total core color XTcl, leaving core segment 232 in the light outputting changed GAB mode consists of any XRcl and XEcl light provided directly by segment 232 and any XRfa, XEfa, XRfe, and XRsb light passing through it. XTcl light differs materially from ATcl light.

Emitted XEcl light is typically absent from the light outputting changed GAB mode when emitted XEfa light is present in it and vice versa. XDcl light usually differs materially from A, ADic, ADcc, ADab, ADcl, and ADfa light if FA layer 206 is not significantly involved in determining color change along print area 118. The same applies usually to XRcl and AEcl light if both are present and, of course, to XRcl or XEcl light if it is present but respective XEcl or XRcl light is absent. When XDfa light is absent, each of XDcl light and either XRcl or XEcl light is usually a majority component, preferably a 75% majority component, more preferably a 90% majority component, of each of X, XDic, XDcc, and XDab light depending on how subcomponents 202, 204, and 206 are configured and constituted.

Substantial parts of any XRcl, XEcl, XRfa, XEfa, XRfe, and XRsb light leaving core segment 232 during the changed state pass through NE segment 234. If NE structure 224 reflects ARne light during the normal state, segment 234 reflects light, termed XRne light, which leaves it along NA segment 214 during the changed state after striking print area 118 and passing through IS segment 192 and NA segment 214 and which thus excludes any XRcl, XRfa, XRfe, or XRsb light. XRne light is usually largely ARne light. If XRne light significantly differs from ARne light, the difference usually arises due to segment 214 undergoing a change under control of AB segment 212 in responding to the general impact effect or to the general CC control signal. Total XTab light temporarily leaving NE segment 234, and therefore AB segment 212, consists of any XRcl, XEcl, XRfa, XEfa, XRfe, and XRsb light passing through NE segment 234 and any XRne light reflected by it. XTab light differs materially from ATab light.

Any XRcl, XEcl, XRne, and XRfe light leaving NE segment 234 form XDab light leaving AB segment 212. Any XRcl, XEcl, XRfa, XEfa, XRna, XRne, and XRfe light leaving NA segment 214 form XDcc light leaving CC segment 194. Also, XRcc light reflected by segment 194 consists of any XRab, XRfa, and XRna light, XRab light being formed with any XRcl, XRne, and XRfe light. XEcc light emitted by segment 194 consists of any XEab light and any XEfa light, XEab light being formed with any XEcl light.

Expanding on what was stated above in order to accommodate light reflected by NE structure 224, when two versions of the light outputting normal GAB mode differ only in that ARne or/and ARsb light is present in one of the versions and absent in the other version, the difference is generally of a relatively minor nature. The same applies when the only difference between two versions of the light outputting changed GAB mode is that XRne or/and XRsb light is present in one of the versions and absent in the other version. Subject to the above-mentioned compatibility requirement and particularizing to light provided by core layer 222, the major combinations of one of the changed GAB modes with one of the normal GAB modes consist of employing the light non-outputting changed GAB mode or the light outputting changed GAB mode for a version in which (a) XRfa or/and XEfa light provided by FA segment 216 passes through AB segment 212 or/and (b) XRcl or/and XEcl light provided by core segment 232 passes through NE segment 234 with the light non-outputting normal GAB mode or the light outputting normal GAB mode for a version in which (a) ARfa or/and AEfa light provided by FA layer 206 passes through assembly 202 or/and (b) ARcl or/and AEcl light provided by core layer 222 passes through NE structure 224 again except for employing the light non-outputting changed GAB mode with the light non-outputting normal GAB mode.

The reliability and longevity of OI structure 200 are generally enhanced when the pressure inside assembly 202, specifically inside core layer 222, is close to atmospheric pressure. More particularly, the average pressure across layer 222 of any fluid (liquid or/and gas) in layer 222 during operation of structure 200 is preferably at least 0.25 atm, more preferably at least 0.5 atm, even more preferably at least 0.75 atm, yet more preferably at least 0.9 atm, and is preferably no more than 2 atm, more preferably no more than 1.5 atm, even more preferably no more than 1.25 atm, yet more preferably no more than 1.1 atm.

Electrode Layers and their Characteristics and Compositions

The electrode layers of NE structure 224 and FE structure 226 are respectively termed NE and FE layers and can be embodied in various ways. Each NE or FE layer may be implemented with two or more electrode sublayers. In one embodiment, each electrode layer is a patterned layer laterally extending largely across the full extent of VC region 106. In another embodiment, one electrode layer, typically the NE layer, is a patterned layer extending largely across the full lateral extent of region 106 while the other electrode layer is a blanket layer (or sheet) extending largely across the full lateral extent of region 106.

Each patterned electrode layer may consist of one electrode or multiple electrodes spaced laterally apart from one another. The space to the sides of each patterned electrode layer is typically largely occupied with insulating material but can be largely empty or largely occupied with gas such as air. If each patterned electrode layer consists of multiple electrodes, one or more layers of conductive material may lie over or/and under the electrodes for electrical contacting them.

When each electrode layer is a patterned layer formed with multiple electrodes, the patterns can be the same such that the electrodes in each electrode layer lie respectively opposite the electrodes in the other electrode layer. The cellular structures described below for VC region 106 in regard to FIGS. 38a, 38b, 43a, 43b, 46a, 46b, 48a, 48b, 50a, 50b, and 53 present examples in which each electrode layer is a patterned layer consisting of multiple electrodes with the space to the sides of the electrodes largely occupied with insulating material and with the electrodes in each electrode layer lying respectively opposite the electrodes in the other electrode layer. Alternatively, the patterns in the electrode layers can differ materially so that the electrodes in the NE layer materially overlap the electrodes in the FE layer at selected sites across region 106.

In a third embodiment of electrode structures 224 and 226, each electrode layer is a blanket layer laterally extending largely across the full extent of VC region 106. The conductivity of one of the blanket electrode layers, typically the NE layer, is usually so low that a voltage applied to a specified point in that blanket layer attenuates relatively rapidly in spreading across the layer so as to effectively be received only in a relatively small area containing the voltage-application point of that electrode layer.

Core layer 222 contains thickness locations, termed chief core thickness locations, lying between opposite portions of the electrode layers, e.g., thickness locations extending perpendicular to both electrode layers. Depending on how the electrode layers are configured, layer 222 may also have thickness locations, termed subsidiary core thickness locations, not lying between opposite portions of the electrode layers. A subsidiary core thickness location occurs when an infinitely long straight line extending through that location generally parallel to its lateral surfaces, generally parallel to the lateral surfaces of the nearest chief core thickness location, and generally perpendicular to the electrode layers extends through only one of the electrode layers or through neither electrode layer. Let (a) $V_n$ represent the controllable voltage, termed the near (or first) controllable voltage, at any point in the NE layer, (b) $V_f$ represent the controllable voltage, termed the far (or second) controllable voltage, at any point in the FE layer, and (c) $V_{nf}$ represent the control voltage difference $V_n-V_f$ between controllable voltages $V_n$ and $V_f$ at those two points in the electrode layers. With the foregoing in mind, OI structure 200, including assembly 202, operates as follows.

Referring to FIG. 12a, near controllable voltage $V_n$ is normally largely at the same near normal control value $V_{nN}$ throughout the NE layer regardless of whether it consists of one electrode, patterned or unpatterned (blanket), or multiple electrodes. Similarly, far controllable voltage $V_f$ is normally largely at the same far normal control value $V_{fN}$ throughout the FE layer regardless of whether it is formed with a single electrode, patterned or unpatterned, or multiple electrodes. Let $V_{nfN}$ represent the normal value $V_{nN}-V_{fN}$ of control voltage $V_{nf}$ constituted as difference $V_n-V_f$. Ignoring any dielectric or semiconductor material between core layer 222 and either electrode layer, the electrode layers normally apply (a) a voltage equal to normal control value $V_{nfN}$ across essentially every chief thickness core location and (b) a voltage of the same sign as, but of lesser magnitude than, normal value $V_{nfN}$ across any subsidiary thickness core location.

The characteristics of core layer 222 and the core-layer voltage distribution resulting from normal control value $V_{nfN}$ are chosen so that, during the normal state, total ATab light consists of any ADab, ADfa, and ARsb light. Again, ADab light again consists of any ARcl, AEcl, ARne, and ARfe light while ADfa light consists of any ARfa and AEfa light. NA layer 204 is sufficiently transmissive of ATab light that ATcc light formed with ATab light and any ARna light normally leaves CC component 184. Similarly, IS component 182 is sufficiently transmissive of ATcc light that A light formed with ATcc light and any ARis light normally leaves VC region 106. VC region 106 often provides the principal general CC control signal in response to the general impact effect supplied by IS segment 192. Referring to FIGS. 12b and 12c, the control signal consists of changing control voltage $V_{nf}$ for IDVC portion 138 to a changed control value $V_{nfC}$ materially different from normal control value $V_{nfN}$. Region 106 goes to the changed state. The control signal as formed with changed control value $V_{nfC}$ can be generated by various parts of region 106, e.g., by component 182, specifically segment 192, or by a portion, such as NA layer 204, of CC component 184. Voltage $V_{nf}$ remains substantially at normal value $V_{nfN}$ for the remainder of region 106.

The general CC control signal can alternatively originate outside VC region 106. For instance, the control signal can be a general CC initiation signal conditionally supplied from an intelligent CC controller as described below for FIGS. 64a and 64b. In a cellular embodiment of assembly 202 as described below for FIGS. 43a and 43b, 46a and 46b, 48a and 48b, 50a and 50b, or 53, the control signal can consist of multiple cellular CC initiation signals supplied respectively to full CM cells, specifically to their electrode parts, as described below for FIG. 71 or 73.

The general CC control signal is applied between a voltage-application location in the NE layer and a voltage-application location in the FE layer. "VA" hereafter means voltage-application. At least one of the VA locations is in ID segment 194 of CC component 184 and depends on where object 104 contacts SF zone 112. Near controllable voltage $V_n$ at the VA location in the NE layer is then at a near (or first) CC control value $V_{nC}$. Far controllable voltage $V_f$ at the VA location in the FE layer is at a far (or second) CC control value $V_{fC}$. Depending on how the control signal is generated, CC values $V_{nC}$ and $V_{fC}$ may be respectively the same as, or respectively differ from, normal values $V_{nN}$ and $V_{fN}$ as long as far CC value $V_{fC}$ differs materially from far normal value $V_{fN}$ if near CC value $V_{nC}$ is the same as near normal value $V_{nN}$ and vice versa. In any event, CC values $V_{nC}$ and $V_{fC}$ are chosen so that changed value $V_{nfC}$ differs materially from normal value $V_{nfN}$.

The VA locations in the electrode layers can be variously implemented depending on their configurations. If each electrode layer is a patterned layer, the VA location in the NE layer extends partly or fully across ID segment 234 of NE structure 224, and the VA location in the FE layer extends partly or fully across ID segment 236 of FE structure 226. If one of the electrode layers, typically the NE layer, is a patterned layer while the other electrode layer is a blanket layer, the VA location in the patterned electrode layer extends partly or fully across its electrode segment 234 or 236, and the VA location in the other electrode layer extends partly or fully across the other electrode segment 236 or 234 and laterally beyond that other electrode segment 236 or 234, e.g., across the full lateral extent of VC region 106. If either patterned electrode layer consists of multiple electrodes, the VA location in that multi-electrode electrode layer may partly or fully encompass two or more of its electrodes.

If each electrode layer is a blanket layer with the conductivity of one of the electrode layers, again typically the NE layer, being so low that a voltage applied to a specified point in that blanket electrode layer attenuates relatively rapidly in spreading across it so as to effectively be received only in a relatively small area containing that layer's VA point, the small area in that blanket electrode layer constitutes its VA location and lies in electrode segment 234 or 236 where voltage $V_n$ or $V_f$ is effectively received at CC value $V_{nC}$ or $V_{fC}$. The VA location in the other electrode layer usually extends partly or fully across its electrode segment 236 or 234 and laterally beyond its electrode segment 236 or 234, e.g., again across the full lateral extent of VC region 106.

The common feature of the preceding ways of configuring the electrode layers is that the general CC control signal is applied between electrode segments 234 and 236. Ignoring any dielectric or semiconductor material between core layer 222 and either electrode layer, electrode segments 234 and 236 temporarily apply (a) a voltage equal to changed control value $V_{nfC}$ across essentially every chief thickness core location in core segment 232 and (b) a voltage of the same sign as, but of lesser magnitude than, changed value $V_{nfC}$ across any subsidiary thickness core location in segment 232. If there is no subsidiary thickness location in segment 232, the control signal is simply applied across segment 232, again ignoring any dielectric or semiconductor material between core layer 222 and either electrode layer.

The characteristics of core layer 222 and the core-segment voltage distribution resulting from changed value $V_{nfC}$ are chosen so that core segment 232 responds to the general CC control signal, and thus to the general impact effect from which the control signal is generated for the impact meeting the basic TH impact criteria sometimes dependent on other impact criteria also being met, by undergoing internal change that enables XTab light leaving AB segment 212 to consist of any XDab, XDfa, and XRsb light. Again, XDab light consists of any XRcl, XEcl, XRne, and XRfe light while XDfa light consists of any XRfa and XEfa light. NA layer 204 is sufficiently transmissive of XTab light that XTcc light formed with XTab light and any XRna light temporarily leaves CC segment 194. Similarly, IS component 182 is sufficiently transmissive of XTcc light that X light formed with XTcc light and any ARis light temporarily leaves IDVC portion 138.

NA layer 204 can include a programmable reflection-adjusting layer (not separately shown), typically separated from assembly 202 by insulating material, for being electrically programmed subsequent to manufacture of OI structure 200 for adjusting colors A and X. "RA" hereafter means reflection-adjusting. The RA layer is preferably clear transparent prior to programming. The programming causes the RA layer to become tinted transparent or more tinted transparent if it originally was tinted transparent. ARna light is thereby adjusted. XRna light is also adjusted, typically in a way corresponding to the ARna adjustment. As a result, colors A and X are adjusted respectively from an initial principal color $A_i$ and an initial changed color $X_i$ prior to programming to a final principal color $A_f$ and a final changed color $X_f$ subsequent to programming.

The programming of the RA layer can be variously done. In one programming technique, a temporary blanket conductive programming layer is deployed on SF zone 112 prior to programming. In another programming technique, OI structure 200 includes a permanent blanket conductive programming layer, typically constituted with part of NA layer 204, lying between zone 112 and the RA layer. In both techniques, a programming voltage is applied between the programming layer and NE structure 224 sufficiently long to cause the RA layer to change to a desired tinted transparency. The programming layer, if a temporary one, is usually removed from zone 112. The tinting adjustment can be caused by introduction of RA ions into the RA layer. If the NE layer is patterned, the RA material to the sides of the patterned NE layer usually undergoes the same tinting adjustment as the RA material between the programming layer and the NE layer.

Alternatively, core layer 222 can include a programmable RA layer lying along NE structure 224 and having the preceding transparency characteristics. The core RA layer is programmed to a desired tinted transparency by applying a programming voltage between the NE and FE layers for a suitable time period. Introduction of RA ions into the core RA layer can cause the tinting adjustment. If the NE or FE layer is patterned, the RA material to the sides of the patterned NE or FE layer usually undergoes the same tinting adjustment as the RA material between the NE and FE layers. The magnitude of the programming voltage is usually much greater than the magnitudes of control values $V_{nfN}$ and $V_{nfC}$. Regardless of whether the RA layer is located in NA layer 204 or structure 224, the programming voltage can be a selected one of plural different programming values for causing final principal color $A_f$ to be a corresponding one of like plural different specific final principal colors and for causing final changed color $X_f$ to be a corresponding one of like plural different specific final changed colors.

The NE layer transmits at least 40% of incident light across at least part of the visible spectrum and consists of conductive material or/and resistive material whose resistivity is, for example, 10-100 ohm-cm at 300° K. This conductive or/and resistive material is termed transparent conductive material since the resistivity of the resistive material, when present, is close to the upper limit, 10 ohm-cm at 300° K, of the resistivity for conductive material. "TCM" hereafter means transparent conductive material. The FE layer is similarly formed with TCM if visible light is intended to pass fully through one or more thickness locations of core layer 222 at certain times.

In situations where a thin layer of a TCM transmits at least 40% of incident light across part, but not all, of the visible spectrum, the selection of colors of light to be transmitted by the thin layer is limited to the part of the visible spectrum across which the layer transmits at least 40% of incident light. The part of the visible spectrum across which a thin layer of a TCM transmits at least 40% of incident light may be single portion continuous in wavelength or a plurality of portions separated by portions in which the thin layer transmits less than 40% of incident light. The transmissivity of incident visible light of a thin layer of the TCM across part, preferably all, of the visible spectrum is usually at least 50%, preferably at least 60%, more preferably at least 80%, even more preferably at least 90%, yet further preferably at least 95%.

The thicknesses of a TCM layer meeting the preceding transmissivity criteria is typically 0.1-0.2 µm but can be more or less. The layer thickness can generally be controlled. However, the layer thickness is sometimes determined by the characteristics of the TCM. For instance, the thickness of graphene when used as the TCM is largely the diameter of a carbon atom because graphene consists of a single layer of hexagonally arranged carbon atoms. The transmissivity normally increases with increasing resistivity and vice versa. In particular, decreasing the TCM layer thickness (when controllable) typically causes the transmissivity and resistivity of the TCM layer to increase and vice versa.

The transmissivity and resistivity of a TCM layer often depend on how it is fabricated. All of the materials identified below as TCM candidates meet the preceding TCM transmissivity and resistivity criteria for at least one set of TCM manufacturing conditions. If the transmissivity is too low, the transmissivity can generally be increased at the cost of increasing the resistivity by appropriately adjusting the manufacturing conditions or/and reducing the TCM layer thickness (when controllable). If the resistivity is too high, the resistivity can generally be reduced at the cost of reducing the transmissivity by appropriately adjusting the manufacturing conditions or/and increasing the TCM layer thickness (when controllable).

Many TCM candidates are transparent conductive oxides generally classified as (i) n-type meaning that majority conduction is by electrons or (ii) p-type meaning that majority conduction is by holes. TCO hereafter means transparent conductive oxide. N-type TCOs are generally much more conductive than p-type TCOs. In particular, the resistivities of n-type TCOs are often several factors of 10 below 1 ohm-cm at 300° K whereas the resistivities of p-type TCOs are commonly 1-10 ohm-cm at 300° K.

TCOs include undoped (essentially pure) metallic oxides and doped metallic oxides. In using a dopant metal to convert an undoped TCO containing one or more primary metals into a doped TCO, a dopant metal atom may replace a primary metal atom. Alternatively or additionally, a dopant metal atom may be added to the undoped TCO. The molar amount of dopant metal in a doped TCO is usually considerably less than the molar amount of primary metal in the TCO. If the molar amount of "dopant" metal approaches the molar amount of primary metal, the TCO is often described below as a mixture of oxides of the constituent metals. In some situations, a TCM candidate containing multiple metals is identified below both as a doped TCO and as a mixture of oxides of the metals.

Stoichiometric chemical names and/or stoichiometric chemical formulas are generally used below to identify TCM candidates. However, many TCM candidates, especially undoped TCOs, are insulators or semiconductors in their pure stoichiometric formulations. Conductivity sufficiently high for those materials to be TCMs arises from defects in the materials or/and TCM formulations that are somewhat non-stoichiometric. N-type (electron) conductivity sufficiently high to enable an undoped TCO to be an n-type TCM commonly arises when the molar amount of oxygen in the TCO is somewhat below the stoichiometric oxygen amount (oxygen vacancy) or, equivalently, the molar amount of metal in the TCO is somewhat above the stoichiometric metal amount. Similarly, p-type (hole) conductivity sufficiently high to enable an undoped TCO to be a p-type TCM commonly arises when the molar amount of oxygen in the TCO is somewhat above the stoichiometric oxygen amount (oxygen excess) or, equivalently, the molar amount of metal in the TCO is somewhat below the stoichiometric metal amount.

In light of the preceding chemical considerations, identifications of TCM candidates by their stoichiometric chemical names and/or stoichiometric chemical formulas here implicitly include formulations that are somewhat non-stoichiometric. More particularly, identification of an undoped n-type TCO by its stoichiometric chemical name or/and its stoichiometric chemical formula includes formulations in which the molar amount of oxygen in the TCO is somewhat below the stoichiometric amount. The same applies to a TCO in which the molar amount of oxygen in the TCO is somewhat below the stoichiometric oxygen amount and in which the TCO includes dopant such that the TCO still conducts n-type. Identification of a p-type TCO, doped or undoped, by its stoichiometric chemical name or/and its stoichiometric chemical formula similarly includes formulations in which the molar amount of oxygen in the TCO is somewhat above the stoichiometric amount.

Situations arise in which the molar amount of oxygen in a TCO is somewhat below the stoichiometric amount and in which the TCO includes dopant at a sufficiently high content that the TCO conducts p-type instead of n-type. Identification of such a p-type doped TCO by its stoichiometric chemical name or/and its stoichiometric chemical formula, includes formulations in which the molar amount of oxygen in the TCO is somewhat below the stoichiometric amount. Situations can also arise in which the molar amount of oxygen in a TCO is somewhat above the stoichiometric amount and in which the TCO includes dopant at a sufficiently high content that the TCO conducts n-type instead of p-type. Identification of such an n-type doped TCO by its stoichiometric chemical name or/and its stoichiometric chemical formula includes formulations in which the molar amount of oxygen in the TCO is somewhat above the stoichiometric amount.

The following conventions are employed in presenting TCM candidates. Alternative chemical names for some TCM candidates are presented in brackets after their IUPAC names. The name of a TCM candidate consisting essentially of a mixture of two or more compounds is presented as the names of the compounds with a dash separating the names of each pair of constituent compounds. The name of a TCM candidate containing dopant is presented as the name of the undoped compound followed by a colon and the name of the dopant. When the dopant consists of two or more different materials, a dash separates each pair of dopants. Many TCM candidates are placed in sets having certain characteristics in common. In some situations, a TCM candidate has the characteristics for multiple TCM sets. The TCM candidate then generally appears in each appropriate TCM set.

The formula for a TCM candidate consisting of an indefinite number of repeating units is generally given as the repeating unit followed by the subscript "n", e.g., $C_n$ for a carbon TCM. When a TCM candidate contains two or more constituents each formed with an indefinite number of repeating units, each constituent's portion of the formula is generally given as that constituent's repeating unit followed by a subscript consisting of "n" and a sequentially increasing number beginning with "1", e.g. $C_{n1}$—$(C_6H_4O_2S)_{n2}$ for graphene-poly(3,4-ethyldioxythiophene).

Preferred TCM candidates are graphene-containing materials because they generally provide high transmissivity in the visible spectrum, relatively high conductivity, high shock resistance, and high mechanical strength. In addition to graphene $C_n$ itself, graphene-containing TCM candidates include bilayer graphene $C_n$, few-layer graphene $C_n$, graphene foam $C_n$, graphene-graphite $C_{n1}$-$C_{n2}$, graphene-carbon nanotubes $C_{n1}$-$C_{n2}$, few-layer graphene-carbon nanotubes $C_{n1}$-$C_{n2}$, graphene-gold $C_n$—Au, few-layer graphene-gold $C_n$—Au, few-layer graphene-iron trichloride $C_n$—$FeCl_3$, graphene-diindium trioxide [graphene-indium oxide] $C_n$—$In_2O_3$, graphene-poly(3,4-ethyldioxythiophene) $C_{n1}$—$(C_6H_4O_2S)_{n2}$, graphene-silver nanowires $C_n$—Ag, and dopant-containing materials boron-doped graphene $C_n$:B (p-type), gold trichloride-doped graphene $C_n$:$AuCl_3$, gold-doped graphene $C_n$:Au, gold-doped few-layer graphene $C_n$:Au, graphene-doped silicon dioxide $SiO_2$:$C_n$, nitric acid-doped graphene $C_n$:$HNO_3$ (p-type), nitrogen-doped graphene $C_n$:N (n-type), tetracyanoquinodimethane-doped graphene $C_n$:$(NC)_2CC_6H_4C(CN)_2$ (p-type), graphene-doped carbon nanotubes $C_{n1}$:$C_{n2}$, and graphene-doped poly(3,4-ethylenedioxythiophene)-poly(styrenesulfonate) $(C_6H_4O_2S)_{n1}$—$(C_8H_8O_3S)_{n2}$:$C_n$.

Highly desirable TCM candidates are carbon-nanotube-containing materials because they generally provide high transmissivity in the visible spectrum, relatively high conductivity, high shock resistance, and high mechanical strength. In addition to carbon nanotubes $C_n$ itself, carbon-nanotube-containing TCM candidates include carbon nanotubes-gold $C_r$—Au and nitric acid-thionyl chloride-doped carbon nanotubes $C_n$:$HNO_3$—$SOCl_2$ (p-type) plus graphene-carbon nanotubes, few-layer graphene-carbon nanotubes, and graphene-doped carbon nanotubes also in the graphene-containing TCM candidates.

Certain organic materials, including materials formed with both organic and non-organic constituents, can serve as the TCM. Although organic TCM candidates generally have considerably higher resistivities than graphene and carbon nanotubes, some transparent organic materials provide relatively high shock resistance and relatively high mechanical strength. Organic TCM candidates of this type include poly(3,4-ethylenedioxythiophene) $(C_6H_4O_2S)$, termed PEDOT, poly(3,4-ethylenedioxythiophene)-poly(styrenesulfonate) $(C_6H_4O_2S)_{n1}$—$(C_8H_8O_3S)_{n2}$ termed PEDOT-PSS, and methanol-doped poly(3,4-ethylenedioxythiophene)-poly(styrenesulfonate) $(C_6H_4O_2S)_{n1}$—$(C_8H_8O_3S)_{n2}$:$CH_3OH$, i.e., methanol-doped PEDOT-PSS, plus graphene-poly(3,4-ethyldioxythiophene), graphene-doped poly(3,4-ethylenedioxythiophene)-poly(styrenesulfonate), and tetracyanoquinodimethane-doped graphene also in the graphene-containing TCM candidates. Each organic TCM candidate is a polymer or a polymer-containing material.

The preceding graphene-containing, carbon-nanotube-containing, and organic TCM candidates constitute sets of a larger set of carbon-containing TCM candidates. Subject to excluding graphene-diindium trioxide, nitric acid-thionyl chloride-doped carbon nanotubes, graphene-doped silicon dioxide, and nitric acid-doped graphene because they all contain oxides, the set of carbon-containing TCM candidates are part of an even larger set of transparent non-oxide TCM candidates that includes a set of halide-containing TCM candidates, a set of metal sulfide-containing TCM candidates, a set of metal nitride-containing TCM candidates, and a set of metal nanowire-containing TCM candidates. In addition to few-layer graphene-iron trichloride and gold trichloride-doped graphene also in the carbon-containing TCM candidates, halide-containing non-oxide TCM candidates include p-type copper-containing halides barium copper selenium fluoride BaCuSeF, barium copper tellurium fluoride BaCuTeF, and copper iodide CuI.

Metal sulfide-containing non-oxide TCM candidates include barium dicopper disulfide $BaCu_2S_2$ (p-type), copper aluminum disulfide $CuAlS_2$ (p-type), and dopant-containing materials aluminum-doped zinc sulfide ZnS:Al and zinc-doped copper aluminum disulfide $CuAlS_2$:Zn (p-type). Metal nitride-containing non-oxide TCM candidates include gallium nitride GaN and titanium nitride TiN. Metal nanowire-containing non-oxide TCM candidates include copper nanowires Cu, gold nanowires Au, and silver nanowires Ag plus graphene-silver nanowires also in the graphene-containing TCM candidates.

Undoped n-type TCO candidates for the TCM include cadmium oxide CdO, cadmium oxide-diindium trioxide [cadmium-indium oxide] CdO—$In_2O_3$, cadmium oxide-diindium trioxide-tin dioxide [cadmium-indium-tin oxide] CdO—$In_2O_3$—$SnO_2$ [Cd—In—Sn—O], cadmium oxide-tin dioxide [cadmium-tin oxide] CdO—$SnO_2$ [Cd—Sn—O], cadmium tin trioxide $CdSnO_3$, dicobalt trioxide-nickel oxide [cobalt-nickel oxide] $Co_2O_3$—NiO, digallium trioxide [gallium oxide] $Ga_2O_3$, digallium trioxide-tin dioxide [gallium-tin oxide] $Ga_2O_3$—$SnO_2$, diindium trioxide [indium oxide] $In_2O_3$, diindium trioxide-digallium trioxide [indium gallium oxide] $In_2O_3$—$Ga_2O_3$, diindium trioxide-tin dioxide [indium-tin oxide] $In_2O_3$—$SnO_2$, ditantalum oxide $Ta_2O$, dizinc diindium pentoxide $Zn_2In_2O_5$, dodecacalcium decaluminum tetrasilicon pentatricontoxide $Ca_{12}Al_{10}Si_4O_{35}$, digallium trioxide-diindium trioxide-tin dioxide [gallium-indium-tin oxide] $Ga_2O_3$—$In_2O_3$—$SnO_2$ [Ga—In—Sn—O], digallium trioxide-diindium trioxide-zinc oxide [gallium-indium-zinc oxide] $Ga_2O_3$—$In_2O_3$—ZnO [Ga—In—Zn—O], germanium dioxide-zinc oxide-diindium trioxide [germanium-zinc-indium oxide] $GeO_2$—ZnO—$In_2O_3$ [Ge—Zn—In—O], indium gallium trioxide $InGaO_3$, iridium dioxide $IrO_2$, lead dioxide $PbO_2$, magnesium indium gallium tetroxide $MgInGaO_4$, ruthenium dioxide $RuO_2$, strontium germanium trioxide $SrGeO_3$, tetrazinc diindium heptoxide $Zn_4In_2O_7$, tetrindium tritin dodecaoxide $In_4Sn_3O_{12}$, tin dioxide $SnO_2$, tricadmium tellurium hexoxide $Cd_3TeO_6$, trizinc diindium hexoxide $Zn_3In_2O_6$, zinc indium aluminum tetroxide $ZnInAlO_4$, zinc indium gallium tetroxide $ZnInGaO_4$, zinc oxide ZnO, zinc oxide-diindium trioxide [zinc-indium oxide] ZnO—$In_2O_3$ [Zn—In—O], zinc oxide-indium gallium trioxide ZnO—$InGaO_3$, zinc oxide-diindium trioxide-tin dioxide [zinc-indium-tin oxide] ZnO—$In_2O_3$—$SnO_2$ [Zn—In—Sn—O], zinc oxide-magnesium oxide [zinc-magnesium oxide] ZnO—MgO [Zn—Mg—O], and zinc tin trioxide $ZnSnO_3$. Undoped n-type TCO TCM candidates further include spinel-structured materials cadmium digallium tetroxide $CdGa_2O_4$, cadmium diindium tetroxide $CdIn_2O_4$, dicadmium tin tetroxide $Cd_2SnO_4$, dizinc tin tetroxide $Zn_2SnO_4$, magnesium diindium tetroxide $MgIn_2O_4$, and zinc digallium tetroxide $ZnGa_2O_4$.

A first set of doped n-type TCO TCM candidates consists of zinc oxide singly doped with certain elements including aluminum, arsenic, boron, cadmium, chlorine, cobalt, copper, fluorine, gallium, germanium, hafnium, hydrogen, indium, iron, lithium, manganese, molybdenum, nickel, niobium, nitrogen, phosphorus, scandium, silicon, silver, tantalum, terbium, tin, titanium, tungsten, vanadium, yttrium, and zirconium. A second set of doped n-type TCO TCM candidates consists of zinc oxide codoped with two or more of the preceding elements. Specific n-type dopant combinations for zinc oxide include aluminum-boron, aluminum-fluorine, aluminum-nitrogen, boron-fluorine, gallium-aluminum, indium-aluminum, indium-fluorine, scandium-aluminum, silver-nitrogen, titanium-aluminum, tungsten-hydrogen, tungsten-indium, tungsten-manganese, yttrium-aluminum, and zirconium-aluminum.

A third set of doped n-type TCO TCM candidates consists of tin dioxide singly doped with certain elements including aluminum, antimony, arsenic, boron, cadmium, chlorine, cobalt, copper, fluorine, gallium, indium, iron, lithium, manganese, molybdenum, niobium, silver, tantalum, tungsten, zinc, and zirconium. Most of the tin dioxide dopants are zinc oxide dopants. A fourth set of doped n-type TCO TCM candidates consists of tin dioxide codoped with two or more of the preceding elements and hafnium. Specific n-type dopant combinations for tin dioxide include hafnium-antimony and indium-gallium.

A fifth set of doped n-type TCO TCM candidates consists of diindium trioxide singly doped with certain elements including fluorine, gallium, germanium, hafnium, iodine, magnesium, molybdenum, niobium, tantalum, tin, titanium, tungsten, zinc, and zirconium. Most of the indium oxide dopants are zinc oxide dopants. A sixth set of doped n-type TCO TCM candidates consists of diindium trioxide codoped with two or more of the preceding elements and cadmium. Specific n-type dopant combinations for diindium trioxide include cadmium-tin, magnesium-tin, and zinc-tin.

A seventh set of doped n-type TCO TCM candidates consists of cadmium oxide singly doped with certain elements including aluminum, chromium, copper, fluorine, gadolinium, gallium, germanium, hydrogen, indium, iron, molybdenum, samarium, scandium, tin, titanium, yttrium, and zinc. Most of the cadmium oxide dopants are zinc oxide dopants. An eighth set of doped n-type TCO TCM candidates consists of indium gallium trioxide singly doped with certain elements including germanium and tin. A ninth set of doped n-type TCO TCM candidates consists of barium tin trioxide $BaSnO_3$ singly doped with certain elements including antimony and lanthanum. A tenth set of doped n-type TCO TCM candidates consists of strontium tin trioxide $SrTiO_3$ singly doped with certain elements including antimony, lanthanum, and niobium. An eleventh set of doped n-type TCO TCM candidates consists of titanium dioxide $TiO_2$ singly doped with certain elements including cobalt, niobium, and tantalum.

A twelfth set of doped n-type TCO TCM candidates consists of zinc oxide-diindium trioxide singly doped with certain elements including aluminum, gallium, germanium, and tin. A thirteenth set of doped n-type TCO TCM candidates consists of zinc oxide-magnesium oxide singly doped with certain elements including aluminum, gallium, indium, and nitrogen. Further doped n-type TCO TCM candidates include antimony-doped strontium tin trioxide $SrSnO_3$:Sb, bismuth-doped lead dioxide $PbO_2$:Bi, niobium-doped calcium titanium trioxide $CaTiO_3$:Nb, tin-doped iron copper dioxide $FeCuO_2$:Sn, yttrium-doped cadmium diantimony hexoxide $CdSb_2O_6$:Y, gadolinium-cerium-doped cadmium oxide CdO:Gd—Ce, neodymium-niobium-doped strontium titanium trioxide $SrTiO_3$:Nd—Nb, and hydrogen-doped ultraviolet-irradiated dodecacalcium heptaluminum tritricontoxide $Ca_{12}Al_7O_{33}$:H-UV [$12CaO.7Al_2O_3$:H-UV].

Undoped p-type TCO candidates for the TCM include disilver oxide $Ag_2O$, iridium dioxide, lanthanum copper selenium oxide LaCuSeO, nickel oxide NiO, ruthenium dioxide, silver oxide AgO, tristrontium discandium dicopper disulfur pentoxide [dicopper disulfide-tristrontium discandium pentoxide] $Sr_3Sc_2Cu_2S_2O_5$ [$Cu_2S_2$—$Sr_3Sc_2O_5$], dicobalt trioxide-nickel oxide, digallium trioxide-tin dioxide, zinc oxide-beryllium oxide ZnO—BeO, and zinc oxide-magnesium oxide, some of which are undoped n-type TCO TCM candidates.

Undoped p-type TCO TCM candidates include certain copper-containing and silver-containing delafossite-structured materials having the general formula $MaMbO_3$ where the valence of metal Ma is +1 and the valence of metal Mb is +3, Ma appearing after Mb when Ma is more electronegative than Mb. The undoped copper-containing delafossite-structured materials include chromium copper dioxide $CrCuO_2$, cobalt copper dioxide $CoCuO_2$, copper aluminum dioxide $CuAlO_2$, copper boron dioxide $CuBO_2$, copper gallium dioxide $CuGaO_2$, copper indium dioxide $CuInO_2$, iron copper dioxide $FeCuO_2$, scandium copper dioxide $ScCuO_2$, and yttrium copper dioxide $YCuO_2$. The undoped silver-containing delafossite-structured materials include cobalt silver dioxide $CoAgO_2$, scandium silver dioxide $ScAgO_2$, silver aluminum dioxide $AgAlO_2$, and silver gallium dioxide $AgGaO_2$.

Other undoped p-type TCO TCM candidates include certain copper-containing dumbbell-octahedral-structured materials having the general formula $McCu_2O_2$ where the valence of metal Mc is +2. The undoped copper-containing dumbbell-octahedral-structured materials include barium dicopper dioxide $BaCu_2O_2$, calcium dicopper dioxide $CaCu_2O_2$, magnesium dicopper dioxide $MgCu_2O_2$, and strontium dicopper dioxide $SrCu_2O_2$. Spinel-structured materials dicobalt nickel tetroxide $Co_2NiO_4$, dicobalt zinc tetroxide $Co_2ZnO_4$, diiridium zinc tetroxide $Ir_2ZnO_4$, and dirhenium zinc tetroxide $Rh_2ZnO_4$ are undoped p-type TCO TCM candidates.

A first set of doped p-type TCO TCM candidates consists of zinc oxide singly doped with certain elements including antimony, arsenic, bismuth, carbon, cobalt, copper, indium, lithium, manganese, nitrogen, phosphorus, potassium, sodium, and silver. A second set of doped p-type TCO TCM candidates consists of zinc oxide codoped with two or more of the preceding elements and aluminum, boron, copper, gallium, tantalum, and zirconium. Specific p-type dopant combinations for zinc oxide include aluminum-arsenic, copper-aluminum, and nitrogen-containing dopant combinations aluminum-nitrogen, boron-nitrogen, gallium-nitrogen, indium-nitrogen, lithium-nitrogen, silver-nitrogen, tantalum-nitrogen, and zirconium-nitrogen.

A third set of doped p-type TCO TCM candidates consists of tin dioxide singly doped with certain elements including antimony, cobalt, gallium, indium, lithium, and zinc. A fourth set of doped p-type TCO TCM candidates consists of diindium trioxide singly doped with certain elements including silver and zinc. A fifth set of doped p-type TCO TCM candidates consists of nickel oxide singly doped with certain elements including copper and lithium.

A sixth set of doped p-type TCO TCM candidates consists of zinc oxide-magnesium oxide singly doped with certain elements including nitrogen and potassium. Doped p-type TCO TCM candidates additionally include aluminum-nitrogen-doped zinc oxide-magnesium oxide ZnO—MgO:Al—N, indium-doped molybdenum trioxide $MoO_3$:In, indium-gallium-doped tin dioxide $SnO_2$:In—Ga, magnesium-doped lanthanum copper selenium oxide LaCuSeO:Mg, magnesium-nitrogen-doped dichromium trioxide [magnesium-nitrogen-doped chromium oxide] $Cr_2O_3$:Mg—N, silver-doped dicopper oxide $Cu_2O$:Ag, and tin-doped diantimony tetroxide $Sb_2O_4$:Sn. Some of the doped p-type TCO TCM candidates are doped n-type TCO TCM candidates.

Doped p-type TCO TCM candidates further include certain copper-containing delafossite-structured materials having the general formula $CuMbO_2$:Md where the valence of metal Mb is +3, Cu appearing after Mb when Cu is more electronegative than Mb, and Md is a dopant, usually a metal. Doped copper-containing delafossite-structured materials include calcium-doped copper indium dioxide $CuInO_2$:Ca, calcium-doped yttrium copper dioxide $YCuO_2$:Ca, iron-doped copper gallium dioxide $CuGaO_2$:Fe, magnesium-doped chromium copper dioxide $CrCuO_2$:Mg, magnesium-doped copper aluminum dioxide $CuAlO_2$:Mg, magnesium-doped iron copper dioxide $FeCuO_2$:Mg, magnesium-doped scandium copper dioxide $ScCuO_2$:Mg, oxygen-doped scandium copper dioxide $ScCuO_2$:O, and tin-antimony-doped nickel copper dioxide $NiCuO_2$:Sn—Sb. Other doped p-type TCO TCM candidates include certain copper-containing dumbbell-octahedral-structured materials $McCu_2O_2$ where the valence of metal Mc is +2. Doped copper-containing dumbbell-octahedral-structured materials include barium-doped strontium dicopper dioxide $SrCu_2O_2$:Ba, calcium-doped strontium dicopper dioxide $SrCu_2O_2$:Ca, and potassium-doped strontium dicopper dioxide $SrCu_2O_2$:K.

Reflection-based Embodiments of Color-change Component with Electrode Assembly

CC component 184 in OI structure 200 can be embodied in various ways. Four general embodiments of component 184 are based on changes in light reflection including light scattering. These four embodiments are termed the mid-reflection, mixed-reflection RT, mixed-reflection RN, and deep-reflection embodiments. None of these embodiments usually employs significant light emission.

The following preliminary specifications apply to the four embodiments. Substructure-reflected ARsb or XRsb light is absent. IS segment 192 reflects ARis light during the changed state if IS component 182 reflects ARis light during the normal state. XRna and XRne light respectively reflected by NA segment 214 and NE segment 234 during the changed state are respectively the same as ARna and ARne light respectively reflected by NA layer 204 and NE structure 224 during the normal state. For an embodiment variation in which XRna light differs significantly from ARna light and/or XRne light differs significantly from ARne light, XRna and/or XRne light are to be respectively substituted for ARna and/or ARne light in the following material describing the changed-state operation. Some reflected light invariably leaves VC region 106 during the normal state and IDVC portion 138 during the changed state.

The mid-reflection embodiment utilizes normal ARab light reflection and temporary XRab light reflection or, more specifically, normal ARne/ARcl/ARfe light reflection and temporary ARne/XRcl/XRfe light reflection respectively due mostly to ARcl/ARfe light reflection and XRcl/XRfe light reflection. FA layer 206, if present, is usually not involved in color changing in the mid-reflection embodiment. There is largely no ARfa or XRfa light, and thus largely no total ATfa or XTfa light, here.

During the normal state, the mid-reflection embodiment operates as follows. Core layer 222 normally reflects ARcl light or/and FE structure 226 normally reflects ARfe light that passes through layer 222. ARcl or ARfe light, usually ARcl light, is a majority component of A light. Total ATcl light consists mostly, usually nearly entirely, of normally reflected ARcl light and any normally reflected ARfe light passing through layer 222, typically mostly ARcl light, and is a majority component of A light. Total ATab light consists mostly, usually nearly entirely, of ARab light formed with ARcl light passing through NE structure 224, any ARne light reflected by it, and any ARfe light passing through it, likewise typically mostly ARcl light, and is also a majority component of A light.

Total ATcc light consists mostly, usually nearly entirely, of ARcl light passing through NA layer 204, any ARna light reflected by it, and any ARne and ARfe light passing through it, again typically mostly ARcl light. Including any ARis light reflected by IS component 182, A light is formed with ARcl light and any ARis, ARna, ARne, and ARfe light normally leaving component 182 and thus VC region 106.

During the changed state, core segment 232 responds to the general CC control signal applied between at least oppositely situated parts of electrode segments 234 and 236 by temporarily reflecting XRcl light or/and allowing XRfe light temporarily reflected by FE segment 236 to pass through core segment 232. XRcl or XRfe light, usually XRcl light, is a majority component of X light. Total XTcl light consists mostly, usually nearly entirely, of temporarily reflected XRcl light and any temporarily reflected XRfe light passing through segment 232, typically mostly XRcl light, and is a majority component of X light. Total XTab light consists mostly, usually nearly entirely, of XRab light formed with XRcl light passing through NE segment 234, any ARne light reflected by it, and any XRfe light passing through it, likewise typically mostly XRcl light, and is also a majority component of X light.

Total XTcc light consists mostly, usually nearly entirely, of XRcl light passing through NA segment 214, any ARna light reflected by it, and any ARne and XRfe light passing through it, again typically mostly XRcl light. Including any ARis light reflected by IS segment 192, X light is formed with XRcl light and any ARis, ARna, ARne, and XRfe light temporarily leaving segment 192 and thus IDVC portion 138.

Assembly 202 in the mid-reflection embodiment of CC component 184 may be embodied with one or more of the following light-processing arrangements: a dipolar suspension arrangement, an electrochromic arrangement, an electrofluidic arrangement, an electrophoretic arrangement (including an electroosmotic arrangement), an electrowetting arrangement, and a photonic crystal arrangement.

One implementation of the mid-reflection embodiment employs translation (movement) or/and rotation of a multiplicity (or set) of particles dispersed, usually laterally uniformly, in a supporting medium in core layer 222 for changing the reflection characteristics of core segment 232. The particles, often titanium dioxide, are normally distributed or/and oriented in the medium so as to cause layer 222 to normally reflect ARcl light such that total ATcl light formed with the ARcl light and any FE-structure-reflected ARfe light passing through layer 222 is at least a majority component of A light. Segment 232 contains a submultiplicity (or subset) of the particles. Responsive to the CC control signal, the particles in segment 232 translate or/and rotate for enabling it to temporarily reflect XRcl light such that total XTcl light formed with the XRcl light and any FE-segment-reflected XRfe light passing through segment 232 is at least a majority component of X light. ARcl and XRcl light are usually respective majority components of A and X light.

In one version of the particle translation or/and rotation implementation, the particles are charged particles of largely one color while the supporting medium is a fluid of largely another color. The fluid is typically of a color ARclm quite close to normal reflected core color ARcl and having a majority component of wavelength suitable for color A. The fluid reflects ARclm light while absorbing or/and transmitting, preferably absorbing, other light. The particles are largely of a color XRclm quite close to temporary reflected core color XRcl and having a majority component of wavelength suitable for color X. The particles thereby reflect XRclm light. Color XRclm, usually lighter than color ARclm here, differs materially from color ARclm.

Setting control voltage $V_{nf}$ at normal value $V_{nfN}$ laterally along core layer 222 causes the particles to be averagely, i.e., on the average, remote from (materially spaced apart from) NE structure 224. In particular, the particles are normally dispersed throughout the fluid or situated adjacent to (close to or adjoining) FE structure 226. Because the XRclm-colored particles are normally averagely remote from NE structure 224 and because the ARclm-colored fluid absorbs or/and transmits light other than ARclm light, the large majority of both reflected ARcl light and total ATcl light, formed with ARcl light and any ARfe light, leaving layer 222 is provided by reflection of ARclm light off the fluid. ATcl light leaving layer 222 is largely ARclm light.

The particle charging and the $V_{nfC}$ polarity are chosen such that the particles in core segment 232 translate so as to be adjacent to NE segment 234 when voltage $V_{nf}$ along core segment 232 goes to changed value $V_{nfC}$. The large majority of both reflected XRcl light and total XTcl light, formed with XRcl light and any XRfe light, leaving segment 232 is now provided by reflection of XRclm light off the particles in segment 232. XTcl light leaving segment 232 is largely XRclm light. Since color XRclm differs materially from color ARclm, temporary reflected core color XRcl differs materially from normal reflected core color ARcl. The same result is achieved by reversing both the particle charging and the $V_{nfC}$ polarity.

The fluid can alternatively be of color XRclm. If so, the fluid reflects XRclm light and absorbs or/and transmits, preferably absorbs, other light. The particles are of color ARclm usually now lighter than color XRclm, and either the particle charging or the $V_{nfC}$ polarity is reversed from that just described. The ARclm-colored particles are normally adjacent to NE structure 224. The large majority of both reflected ARcl light and total ATcl light is provided by reflection of ARclm light off the particles. ATcl light leaving core layer 222 is again largely ARclm light.

Changing voltage $V_{nf}$ in core segment 232 to value $V_{nfC}$ causes the particles in segment 232 to translate materially away from NE segment 234 so as to be dispersed throughout the segment of the fluid in core segment 232 or situated adjacent to FE segment 236. Because the particles in core segment 232 are now averagely remote from NE segment 234 and because the XRclm-colored fluid absorbs non-XRclm light, the large majority of both reflected XRcl light and total XTcl light is provided by reflection of XRclm light off the fluid in core segment 232. XTcl light leaving segment 232 is again largely XRclm light. With color XRclm differing materially from color ARclm, temporary reflected core color XRcl again differs materially from normal reflected core color ARcl. The same result is achieved by reversing both the particle charging and the $V_{nfC}$ polarity.

The particles in another version of the particle translation or/and rotation implementation consist of two groups of particles of different colors. The supporting medium is a transparent fluid, typically a liquid. The particles in one group are typically largely of color ARclm while the particles in the other group are largely of color XRclm. The particles have characteristics which enable the ARclm-colored particles to translate oppositely to the XRclm-colored particles in the presence of an electric field. The particles can be charged so that the XRclm-colored particles are charged oppositely to the ARclm-colored particles. The charge on each XRclm-colored particle can be of the same magnitude as, or a different magnitude than, the charge on each ARclm-colored particle.

The $V_{nfN}$ polarity and particle characteristics, e.g., particle charging, are chosen such that setting voltage $V_{nf}$ at normal value $V_{nfN}$ laterally along core layer 222 causes the ARclm-colored particles to be adjacent to NE structure 224 while the XRclm-colored particles are averagely remote from structure 224. The large majority of both reflected ARcl light and total ATcl light is normally provided by reflection of ARclm light off the ARclm-colored particles. ATcl light leaving layer 222 is largely ARclm light.

Changing voltage $V_{nf}$ in core segment 232 to value $V_{nfC}$ at a polarity opposite value $V_{nfN}$ causes the XRclm-colored particles in segment 232 to translate so as to be adjacent to NE segment 234 while the ARclm-colored particles in core segment 232 translate so as to be averagely remote from segment 234. The large majority of both reflected XRcl light and total XTcl light is now provided by reflection of XRclm light off the XRclm-colored particles in core segment 232. XTcl light leaving segment 232 is largely XRclm light. Since color XRclm differs materially from color ARclm, temporary reflected core color XRcl differs materially from normal reflected core color ARcl.

The ARclm light reflected by the ARclm-colored particles can be specularly reflected, scattered, or a combination of specularly reflected and scattered. The same applies to the XRclm light reflected by the XRclm-colored particles. The radiosity of the reflected ARclm or XRclm light can be very low such that color ARclm or XRclm is quite dark, sometimes nearly black. If so, the ARclm-colored or XRclm-colored particles absorb the large majority of incident light.

Different selections of particle coloring can be made in combination with altering other particle characteristics. In one example, the particles in one group are of color ARclm while the particles in the other group are of a color F1Rc significantly different from colors ARcl and XRcl. The F1Rc-colored particles reflect F1Rc light considerably different from ARcl and XRcl light. The particles have characteristics enabling the ARclm-colored particles to remain adjacent to NE structure 224 in the presence of an electric field that changes polarity while the F1Rc-colored particles translate, to the extent possible, toward or away from structure 224 depending on the field polarity. The F1Rc particles can be charged while the ARclm-colored particles are largely uncharged but have physical properties attracting them to structure 224.

The $V_{nfN}$ polarity and particle characteristics are chosen such that setting voltage $V_{nf}$ at normal value $V_{nfN}$ laterally across core layer 222 causes the ARclm-colored particles to be adjacent to NE structure 224 while the F1Rc-colored particles are averagely remote from structure 224. The large majority of both reflected ARcl light and total ATcl light is provided by reflection of ARclm light off the ARclm-colored particles. ATcl light leaving layer 222 is again largely ARclm light.

The $V_{nfN}$ polarity and particle characteristics are chosen such that setting voltage $V_{nf}$ at normal value $V_{nfN}$ laterally across core layer 222 causes the ARclm-colored particles to be adjacent to NE structure 224 while the F1Rc-colored particles are averagely remote from structure 224. The large majority of both reflected ARcl light and total ATcl light is provided by reflection of ARclm light off the ARclm-colored particles. ATcl light leaving layer 222 is again largely ARclm light.

In a complementary example, the particles in one group are of color XRclm while the particles in the other group are of a color G1Rc significantly different from colors ARcl and XRcl. The G1Rc-colored particles reflect G1Rc light considerably different from ARcl and XRcl light. The particles have characteristics enabling the XRclm-colored particles to remain adjacent to NE structure 224 in the presence of an electric field that changes polarity while the G1Rc-colored particles translate, to the extent possible, toward or away from structure 224 depending on the field polarity. The G1Rc-colored particles can be charged while the XRclm-colored particles are largely uncharged but have physical properties attracting them to structure 224.

The $V_{nfN}$ polarity and particle characteristics are chosen such that setting voltage $V_{nf}$ at normal value $V_{nfN}$ laterally across core layer 222 causes both the XRclm-colored and G1Rc-colored particles to be adjacent to NE structure 224. The large majority of both reflected ARcl light and total ATcl light is then normally provided by reflection of G1Rc and XRclm light off both the G1Rc-colored and XRclm-colored particles. ATcl light leaving layer 222 consists of a G1Rc and XRclm light. The ATcl combination of G1Rc and XRclm light is chosen to differ materially from XRcl light and, in particular, to have a majority component suitable for color A.

Changing voltage $V_{nf}$ in core segment 232 to value $V_{nfC}$ of opposite polarity to value $V_{nfN}$ causes the G1Rc-colored particles to translate materially away from NE segment 234 so as to be averagely remote from segment 234 while the XRclm-colored particles remain adjacent to segment 234. The large majority of both reflected XRcl light and total XTcl light is provided by reflection of XRclm light off the XRclm-colored particles in core segment 232. XTcl light leaving segment 232 is again largely XRclm light. Since the ARcl light combination of G1Rc and XRclm light differs materially from XRcl light, temporary core color XRcl differs materially from normal core color ARcl.

In a further version of the particle translation or/and rotation implementation, the surface of each particle consists of two portions of different colors. The particles are optically and electrically anisotropic. The optical anisotropicity is achieved by arranging for the outer surface of each particle to consist of one SF portion of color ARclm and another SF portion of color XRclm. The two SF portions are usually of approximately the same area. The particles can be generally spherical with the two SF portions of each particle being hemispherical surfaces. The electrical anisotropicity is achieved by providing the two SF portions of each particle with different zeta potentials. Each particle is usually a dipole with one SF portion negatively charged and the other positively charged. The supporting medium is a solid transparent sheet having cavities in which the particles are respectively located. Each cavity is slightly larger than its particle. The part of each cavity outside its particle is filled with transparent dielectric fluid for enabling each particle to rotate freely in its cavity.

Voltage values $V_{nfN}$ and $V_{nfC}$ are chosen so that one is positive and the other is negative. If value $V_{nfN}$ is positive, the ARclm-colored SF portions are negatively charged while the XRclm-colored SF portions are positively charged. The opposite surface-portion charging is used if value $V_{nfN}$ is positive. Either way, setting voltage $V_{nf}$ at normal value $V_{nfN}$ causes the particles to rotate so that their ARclm-colored SF portions face NE structure 224. The large majority of both reflected ARcl light and total ATcl light is provided by reflection of ARclm light off the ARclm-colored SF portions of the particles. ATcl light leaving core layer 222 is largely ARclm light.

Applying the general CC control signal to core segment 232 so that voltage $V_{nf}$ is at changed value $V_{nfC}$ across segment 232 causes the particles in it to rotate so that their XRcl-colored SF portions face NE segment 234. The large majority of both reflected XRcl light and total XTcl light is now provided by reflection of XRclm light off the XRcl-colored SF portions of the particles in core segment 232. XTcl light leaving segment 232 is largely XRclm light. With color XRclm differing materially from color ARclm, temporary core color XRcl differs materially from normal core color ARcl.

During the changed state in all three versions of the particle translation or/and rotation implementation, the particles in the remainder of core layer 222 largely maintain the particle orientations or/and average locations existent during the normal state. The large majority of both reflected light and total light leaving the remainder of layer 222 consists of reflected ARclm light or, in the last-mentioned example of the version using two groups of particles of different colors, a reflected combination of XRclm and G1Rc light identical to that normally present and thereby forming ARcl light.

Another implementation of the mid-reflection embodiment of CC component 184 entails changing the absorption characteristics of particles dispersed, usually uniformly, in a supporting medium usually a fluid such as a liquid in which the particles are suspended. In one version, the particles normally absorb much, usually most, of the light striking SF zone 112 so that ATcl light normally leaves layer 222. The particles in core segment 232 respond to the general CC control signal by scattering much, usually most, of the light striking print area 118. This causes XTcl light, including XRcl light, to temporarily leave segment 232. Alternatively, the particles in layer 222 normally scatter much, usually most, of the light striking zone 112 so that ATcl light, including ARcl light, normally leaves layer 222. The particles in segment 232 respond to the control signal by absorbing much, usually most, of the light striking area 118 for causing XTcl light to temporarily leave segment 232.

The particles in core layer 222 in another version of the absorption-characteristics-changing implementation are elongated dichroic particles normally at largely random orientations with largely no electric field existing across layer 222. The particles in layer 222 normally absorb much, usually most, of the light striking SF zone 112 so that ATcl light normally leaves layer 222. Responsive to the general CC control signal, the particles in core segment 232 align generally with an electric field produced across segment 232. Much, usually most, of the light striking print area 118 is transmitted through segment 232 for causing XTcl light, including reflected XRfe light, to temporarily leave segment 232. Alternatively, an electric field normally exists across all of layer 222. The particles in layer 222 align with the electric field for enabling much, usually most, of the light striking zone 112 to be transmitted through layer 222 so that ATcl light, including reflected ARfe light, normally leaves layer 222. In response to the control signal, the particles in segment 232 become largely randomly oriented for absorbing much, usually most, of the light striking area 118. XTcl light temporarily leaves segment 232.

Core layer 222 in a further implementation, an example being an electrowetting or electrofluidic arrangement, of the mid-reflection embodiment of CC component 184 employs a liquid whose shape is suitably manipulated to change the layer's reflection characteristics. The liquid is in a first shape for causing layer 222 to reflect ARcl light such that ATcl light formed with the ARcl light and any FE-structure-reflected ARfe light passing through layer 222 is a majority component of A light. Responsive to the general CC control signal, the liquid in core segment 232 temporarily changes to a second shape materially different from the first shape in segment 232 for causing it to reflect XRcl light such that total XTcl light formed with XRcl light and any FE-segment-reflected XRfe light passes through segment 232 and is a majority component of X light. Exemplary shapes for the liquid are described in U.S. Pat. Nos. 6,917,456 B2, 7,463,398 B2, and 7,508,566 B2, contents incorporated by reference herein. Three major versions of the liquid shape-changing implementation entail arranging for (a) ARcl light to be a majority component of A light with XRcl light being a majority component of X light, (b) ARcl light to be a majority component of A light with XRfe light being a majority component of X light, and (c) ARfe light to be a majority component of A light with XRcl light being a majority component of X light.

Turning to the two mixed-reflection embodiments of CC component 184, each mixed-reflection embodiment utilizes FA layer 206 for reflecting light in achieving color changing. Light striking core layer 222 along NE structure 224 passes through layer 222 to FE structure 226 at selected thickness locations along layer 222 at certain times and is blocked, i.e., reflected or/and absorbed, by layer 222 at other times. Light passing through selected thickness locations of layer 222 then passes through corresponding thickness locations of structure 226 and undergoes substantial reflection at corresponding thickness locations of FA layer 206. Resultant reflected light passes back through structure 226 and core layer 222. Assembly 202 functions as a light valve. The difference between the mixed-reflection embodiments is that FA layer 206 reflects light only during the changed state in the mixed-reflection RT embodiment and only in the normal state in the mixed-reflection RN embodiment.

The mixed-reflection RT embodiment employs normal ARab light reflection and temporary XRab/XRfa light reflection or, more specifically, normal ARne/ARcl/ARfe light reflection and temporary ARne/XRcl/XRfe/XRfa light reflection respectively due mostly to ARcl/ARfe light reflection and XRfa light reflection. During the normal state, the mixed-reflection RT embodiment operates the same as the mid-reflection embodiment.

Core segment 232 in the mixed-reflection RT embodiment responds to the general CC control signal applied between at least oppositely situated parts of electrode segments 234 and 236 during the changed state by allowing a substantial part of light striking print area 118 and passing through IS segment 192, NA segment 214, and NE segment 234 to temporarily pass through core segment 232 such that a substantial part of that light passes through FE segment 236. FA segment 216 temporarily reflects XRfa light, a majority component of X light. Total XTfa light consists mostly, preferably only, of temporarily reflected XRfa light.

A substantial part of the XRfa light passes through FE segment 236 and, as also allowed by core segment 232, passes through it. Total XTcl light consists of XRfa light passing through segment 232, any XRcl light reflected by it, and any FE-segment-reflected XRfe light passing through it, mostly reflected XRfa light. Total XTab light consists of XRfa light passing through NE segment 234 and any XRab light formed with any ARne light reflected by segment 234 and any XRcl and XRfe light passing through it, likewise mostly XRfa light. Total XTcc light consists of XRfa light passing through NA segment 214, any ARna light reflected by it, and any ARne, XRcl, and XRfe light passing through it, again mostly XRfa light. Including any ARis light reflected by IS segment 192, X light is formed with XRfa light and any ARis, ARna, ARne, XRcl, and XRfe light temporarily leaving segment 192 and thus IDVC portion 138.

The mixed-reflection RN embodiment employs normal ARab/ARfa light reflection and temporary XRab light reflection or, more specifically, normal ARne/ARcl/ARfe/ARfa light reflection and temporary ARne/XRcl/XRfe light reflection respectively due mostly to ARfa light reflection and XRcl/XRfe light reflection. During the normal state, core layer 222 allows light striking SF zone 112 and passing through IS component 182, NA layer 204, and NE structure 224 to normally pass through core layer 222 such that a substantial part of that light normally passes through FE structure 226. FA layer 206 reflects ARfa light, a majority component of A light. Total ATfa light consists mostly, preferably only, of normally reflected ARfa light.

A substantial part of the ARfa light passes through FE structure 226 and, as also allowed by core layer 222, passes through it. Total ATcl light consists of ARfa light passing through layer 222, any ARcl light reflected by it, and any FE-structure-reflected ARfe light passing through it, mostly reflected ARfa light. Total ATab light consists of ARfa light passing through NE structure 224 and any ARab light formed with any ARne light reflected by structure 224 and any ARcl and ARfe light passing through it, likewise mostly ARfa light. Total ATcc light consists of ARfa light passing through NA layer 204, any ARna light reflected by it, and any ARne, ARcl, and ARfe light passing through it, again mostly ARfa light. Including any ARis light reflected by IS component 182, A light is formed with ARfa light and any ARis, ARna, ARne, ARcl, and ARfe light normally leaving component 182 and thus VC region 106.

Core segment 232 in the mixed-reflection RN embodiment responds to the general CC control signal the same as in the mid-reflection embodiment. Accordingly, the mixed-reflection RN embodiment operates the same in the changed state as the mid-reflection embodiment.

In one version of each mixed-reflection embodiment of CC component 184, core layer 222 contains core particles distributed laterally across the layer's extent and switchable between light-transmissive and light-blocking states. NA layer 204 may be present or absent. FA layer 206 contains a light reflector extending along, and generally parallel to, FE structure 226. The light reflector may be a specular (mirror-like) reflector or a diffuse reflector that reflectively scatters light.

The core particles are usually dimensionally anisotropic, each particle typically shaped generally like a rod or a sheet. For a rod-shaped core particle having (a) a maximum dimension, termed the long dimension, (b) a shorter dimension which reaches a maximum value, termed the first short dimension, in a plane perpendicular to the long dimension, and (c) another shorter dimension which extends perpendicular to the other two dimensions and which reaches a maximum value, termed the second short dimension, no greater than the first short dimension, the long dimension is at least twice, preferably at least four times, more preferably at least eight times, the first short dimension. For a sheet-shaped core particle having (a) a maximum dimension, termed the first long dimension, (b) another dimension which reaches a maximum value, termed the second long dimension, no greater than the first long dimension in a plane perpendicular to the first long dimension, and (c) a shorter dimension which reaches a maximum value, termed the short dimension, and which extends perpendicular to the other two dimensions, the first long dimension is at least twice, preferably at least four times, more preferably at least eight times, the short dimension.

The core particles in core layer 222 in the mixed-reflection RT version are normally oriented largely randomly relative to electrode structures 224 and 226. This enables the core particles in layer 222 to absorb or/and scatter light striking it along NE structure 224. Either way, light striking SF zone 112 and passing through IS component 182 and NA layer 204 so as to strike core layer 222 along structure 224 is normally blocked from passing through layer 222. Total ATcl light leaving layer 222 consists of any ARcl light reflected by it and any FE-structure-reflected ARfe light passing through it.

Applying the general CC control signal to AB segment 212 in the mixed-reflection RT version causes the core particles in core segment 232 to orient themselves generally perpendicular to electrode segments 234 and 236. In particular, the long dimension of a rod-shaped core particle extends generally perpendicular to segments 234 and 236 while one of the long dimensions of a sheet-shaped core particle extends generally perpendicular to segments 234 and 236 so that the general plane of the sheet-shaped particle is perpendicular to segments 234 and 236. This orientation enables light striking print area 118 and passing through IS segment 192 and NA segment 214 so as to strike core segment 232 along NE segment 234 to be temporarily transmitted through core segment 232 and reflected by the segment of the light reflector in FA segment 216. The temporarily reflected XRfa light passes in substantial part back through core segment 232. Total XTcl light leaving segment 232 consists of XRfa light passing through it, any XRcl light reflected by it, and any FE-segment-reflected XRfe light passing through it.

Essentially the reverse occurs in the mixed-reflection RN version. The core particles present in core layer 222 are normally oriented generally perpendicular to electrode structures 224 and 226. Specifically, the long dimension of a rod-shaped core particle extends generally perpendicular to structures 224 and 226 while one of the long dimensions of a sheet-shaped core particle extends generally perpendicular to structures 224 and 226 so that the general plane of the sheet-shaped particle is perpendicular to structures 224 and 226. Light striking SF zone 112 and passing through IS component 182 and NA layer 204 so as to strike core layer 222 along NE structure 224 is transmitted through layer 222 and reflected by the light reflector. The normally reflected ARfa light passes in substantial part back through layer 222. Total ATcl light leaving layer 222 consists of ARfa light passing through it, any ARcl light reflected by it, and any FE-structure-reflected ARfe light passing through it.

Applying the general CC control signal to AB segment 212 in the mixed-reflection RN version causes the core particles in core segment 232 to become randomly oriented relative to electrode segments 234 and 236. Light striking print area 118 and passing through IS segment 192 and NA segment 214 so as to strike core segment 232 along NE segment 234 is largely scattered or/and absorbed by the core particles in core segment 232 and is thereby blocked from passing through segment 232. Total XTcl light leaving segment 232 consists of any XRcl light reflected by it and any FE-segment-reflected XRfe light passing through it.

Core layer 222 consists of liquid-crystal material formed with elongated liquid-crystal molecules that constitute the core particles in another version of the mixed-reflection RT or RN embodiment of CC component 184 where it is a reflective liquid-crystal arrangement, usually polarizer-free. "LC" hereafter means liquid-crystal. The LC molecules, which switch between light-transmissive and light-scattering states, can employ various LC phases such as nematic, smectic, and chiral. The LC material typically has no pre-established twist. For this purpose, the surfaces of electrode structures 224 and 226 along layer 222 are preferably flat rather than grooved.

The reflected XRfa or ARfa light in each LC version of the mixed-reflection RT or RN embodiment usually appears along NE structure 224 as a dark color but, depending on the constituency of core layer 222, can appear along structure 224 as a light color. The dark color can be largely black. The scattered ARcl or XRcl light usually appears along NE structure 224 as a light color but, likewise depending on the constituency of layer 222, can appear along structure 224 as a dark color. The light color can be white or largely white.

In a further version of the mixed-reflection RT or RN embodiment of CC component 184, core layer 222 is formed with a fluid, typically a liquid, in which dipolar particles constituting the core particles are colloidally suspended. The dipolar particles, usually dichroic, can be elongated rod-like particles or flat sheet-like particles. Each dipole particle has a positively charged end and a negatively charged end. Voltage $V_{nf}$ across opposite segments of electrode structures 224 and 226 is usually largely zero when the intervening dipole particles are randomly oriented so as to scatter or/and absorb light striking them. Adjusting voltage $V_{nf}$ across opposite segments of structures 224 and 226 to a non-zero value causes the intervening dipole particles to align generally perpendicular to those two electrode segments with the positively charged end of each intervening dipolar particle closest to the more negative one of the electrode segments and vice versa.

Various color combinations are available with the dipolar-particle suspension. Subject to a dark color being produced along NE structure 224 if the dipolar particles in core layer 222 or core segment 232 absorb incident light due to being randomly oriented relative to electrode structures 224 and 226, the scattered ARcl or XRcl light in each mixed-reflection version can appear along NE structure 224 as a light color, or as a dark color, if the dipolar particles across layer 222 or in segment 232 scatter incident light due to being randomly oriented relative to structures 224 and 226. The reflected XRfa or ARfa light correspondingly appears along NE structure 224 as a dark color, or as a light color, depending on the characteristics of the light reflector.

The deep-reflection embodiment of CC component 184 employs normal ARab/ARfa light reflection and temporary XRab/XRfa light reflection or, more specifically, normal ARne/ARcl/ARfe/ARfa light reflection and temporary ARne/XRcl/XRfe/XRfa light reflection respectively due mostly to ARfa light reflection and XRfa light reflection. Light striking SF zone 112 passes through IS component 182, NA layer 204, NE structure 224, core layer 222, and FE structure 226, is reflected by FA layer 206, and then passes back through subcomponents 226, 222, 224, and 182. Core layer 222 and auxiliary layers 204 and 206 usually impose certain traits, e.g., wavelength-independent traits such as polarization traits, on the light. "WI" hereafter means wavelength-independent.

When WI traits are employed, the deep-reflection embodiment operates as follows during the normal state. NA layer 204 typically imposes a WI NA incoming trait on light normally passing from IS component 182 through layer 204 so that the light has the NA incoming trait upon reaching core layer 222, "NA" again meaning near auxiliary. Layer 222 imposes a WI primary incoming trait on light normally passing from NE structure 224 through layer 222 so that the light has the primary incoming trait upon reaching FA layer 206. The primary incoming trait usually differs materially from the NA incoming trait.

FA layer 206 normally reflects ARfa light, a majority component of A light, so that total ATfa light consists mostly, preferably only, of normally reflected ARfa light. As an adjunct to reflecting ARfa light, layer 206 typically imposes a WI FA trait on ARfa light leaving layer 206 along FE structure 226, "FA" again meaning far auxiliary. The FA trait is usually applied to light just before and after reflection by layer 206. The FA trait can be the same as, or significantly different from, the NA incoming trait.

The ARfa light passes in substantial part through FE structure 226. Total ATfe light consists of ARfa light passing through structure 226 and any ARfe light reflected by it, mostly ARfa light having the FA trait. The ATfe light passes in substantial part through core layer 222 and NE structure 224. In transmitting ATfe light, layer 222 imposes a WI primary outgoing trait on ATfe light passing from FE structure 226 through layer 222 so that the ATfe light has the primary outgoing trait upon reaching NA layer 204. The primary outgoing and incoming traits are usually the same. Total ATcl light consists of ARfa light passing through core layer 222, any ARcl light reflected by it, and any ARfe light passing through it, mostly ARfa light having the primary outgoing trait. The ATcl light passes in substantial part through NE structure 224. Total ATab light consists of ARfa light passing through structure 224 and any ARab light formed with any ARne light reflected by structure 224 and any ARcl and ARfe light passing through it, likewise mostly ARfa light.

The ATab light passes in substantial part through NA layer 204 and IS component 182. If the NA incoming trait is imposed on light passing from component 182 through layer 204, layer 204 usually imposes a WI NA outgoing trait on ATab light passing from NE structure 224 through layer 204 so that ATab light has the NA outgoing trait upon reaching component 182. The NA outgoing and incoming traits are usually the same. Total ATcc light consists of ARfa light passing through layer 204, any ARna light reflected by it, and any ARne, ARcl, and ARfe light passing through it, again mostly ARfa light. Including any ARis light normally reflected by component 182, A light is formed with ARfa light and any ARis, ARna, ARne, ARcl, and ARfe light normally leaving component 182 and thus VC region 106.

Core segment 232 in the deep-reflection embodiment responds to the general CC control signal applied between at least oppositely situated parts of electrode segments 234 and 236 by causing light passing from NE segment 234 through core segment 232 to be temporarily of a WI changed incoming trait such that the light has the changed incoming trait upon reaching FA segment 216. More particularly, if NA layer 204 imposes the NA incoming trait on light normally passing from IS component 182 through layer 204, NA segment 214 imposes the NA incoming trait on light passing from IS segment 192 through segment 214 so that the light has the NA incoming trait upon reaching core segment 232. Segment 232 then imposes the changed incoming trait on light temporarily passing from NE segment 234 through segment 232 so that the light has the changed incoming trait upon reaching FA segment 216. The changed incoming trait differs materially from the primary incoming trait.

FA segment 216 temporarily reflects XRfa light, a majority component of X light, so that total XTfa light consists mostly, preferably only, of temporarily reflected XRfa light. Although the primary and changed incoming traits are independent of wavelength, the material difference between them is chosen to cause color XRfa to differ materially from color ARfa. More specifically, colors ARfa and XRfa usually have the same wavelength characteristics but differ materially in radiosity so as to differ materially in lightness/darkness and therefore materially in color. Core segment 232 and AB segment 212 function as a light valve in producing the color difference. In the course of reflecting XRfa light, FA segment 216 imposes the FA trait on XRfa light leaving it along FE segment 236 if FA layer 206 imposes the FA trait on ARfa light leaving layer 206 along FE structure 226. The FA trait is usually applied to light just before and after reflection by FA segment 216.

The XRfa light passes in substantial part through FE segment 236. Total XTfe light consists of XRfa light passing through segment 236 and any XRfe light reflected by it, mostly XRfa light having the FA trait. The XTfe light passes in substantial part through core segment 232. In transmitting XTfe light, segment 232 imposes a WI changed outgoing trait on XTfe light passing from FE segment 236 through segment 232 so that the XTfe light has the changed outgoing trait upon reaching NA segment 214. The changed outgoing trait, usually the same as the changed incoming trait, differs materially from the primary incoming and outgoing traits. Total XTcl light consists of XRfa light passing through core segment 232, any XRcl light reflected by it, and any XRfe light passing through it, mostly XRfa light now having the changed outgoing trait. Any XRcl light is usually largely ARcl light. The XTcl light passes in substantial part through NA segment 214. Total XTab light consists of XRfa light passing through NE segment 234 and any XRab light formed with any ARne light reflected by segment 234 and any XRcl and XRfe light passing through it, likewise mostly XRfa light.

The XTab light passes in substantial part through NA segment 214 and IS segment 192. If NA segment 214 imposes the NA incoming trait on light passing from IS segment 192 through NA segment 214, segment 214 imposes the NA outgoing trait on XTab light passing from NE segment 234 through segment 214 so that XTab light has the NA outgoing trait upon reaching IS segment 192. Including any ARna light reflected by NA segment 214, total XTcc light consists of XRfa light passing through segment 214, any ARna light reflected by it, and any ARne, XRcl, and XRfe light passing through it, again mostly XRfa light. Similarly including any ARis light reflected by IS segment 192, X light is formed with XRfa light and any ARis, ARna, ARne, XRcl, and XRfe light leaving segment 192 and thus IDVC portion 138.

The deep-reflection embodiment of CC component 184 is typically a reflective LC structure in which core layer 222 consists largely of LC material such as nematic liquid crystal formed with elongated LC particles. FA layer 206 contains a light reflector extending along, and generally parallel to, FE structure 226. The light reflector, specular or diffuse, is designed to reflect ARfa light during the normal state such that the segment of the light reflector in FA segment 216 reflects XRfa light during the changed state. The reflector is a white-light reflector if one of colors ARfa and XRfa is white. If neither is white, the reflector can be a color reflector or a white-light reflector and a color filter lying between the white-light reflector and structure 226.

NA layer 204 usually contains a near (first) plane polarizer extending along, and generally parallel to, NE structure 224. If so, FA layer 206 contains a far (second) plane polarizer extending along, and generally parallel to, FE structure 226 so as to extend generally parallel to the near polarizer. The far polarizer is located between structure 226 and the light reflector.

Each polarizer has a polarization direction parallel to the plane of that polarizer. "PZ" hereafter means polarization. The PZ direction of the near polarizer is termed the p direction. The direction parallel to the plane of the near polarizer and perpendicular to the p direction is termed the s direction. The PZ direction of the far polarizer is typically perpendicular to, or parallel to, the near polarizer's PZ direction but can be at a non-zero angle materially different from 90° to the PZ direction. In the following description of the operation of the reflective LC structure, the polarizers have perpendicular PZ directions so that the far polarizer's PZ direction is the s direction.

Relative to the near polarizer, incoming light striking NA layer 204 consists of a p directional component and an s directional component. For each color A or X, the near polarizer transmits a high percentage, usually at least 70%, preferably at least 80%, more preferably at least 90%, even more preferably at least 95%, of the p component and blocks, preferably absorbs, the s component. Light passing through the near polarizer so as to strike assembly 202 is plane polarized in the PZ direction of the near polarizer, i.e., the p direction. The plane polarized light passes in substantial part through the LC material.

The elongated particles of the LC material in core layer 222 are normally in an orientation which causes the PZ direction of incoming incident p polarized light to rotate a primary LC amount so that the transmitted light leaving the LC material and striking the far polarizer is plane polarized in a direction materially different from the p direction. The primary LC amount of the PZ direction rotation is usually 45°-90° for which an actual PZ direction rotation of greater than 360° is converted to an effective PZ direction rotation by subtracting 360° one or more times until the resultant rotation value is less than 360°. For each color A or X, the far polarizer transmits a high percentage, usually at least 70%, preferably at least 80%, more preferably at least 90%, even more preferably at least 95%. of incident s polarized light and blocks, preferably absorbs, any other incident light. The radiosity of the s polarized light passing through the far polarizer increases as the effective PZ direction rotation provided by the LC material moves toward 90°.

A substantial part of the plane polarized light passing through the far polarizer is normally reflected by the light reflector and passes back through the far polarizer, the LC material, and the near polarizer. The far polarizer blocks, preferably absorbs, any reflected incident light plane polarized in any direction other than the s direction so that reflected light passing through the far polarizer largely forms ARfa light plane polarized in the s direction. The LC material causes reflected incident s polarized ARfa light to undergo a rotation in PZ direction largely equal to the primary LC amount. The near polarizer blocks, preferably absorbs, any reflected incident light plane polarized in largely any direction other than the p direction so that reflected light passing through the near polarizer includes ARfa light plane polarized in the p direction. The radiosity of the reflected p polarized ARfa light passing through the near polarizer increases as the effective PZ direction rotation provided by the LC material moves toward 90°.

Core segment 232 responds to the general CC control signal provided during the changed state by causing the LC particles in segment 232 to change to an orientation materially different from their orientation in the normal state such that incoming plane polarized light passing through segment 232 and striking the segment of the far polarizer in segment 216 of FA layer 206 is plane polarized in a materially different direction than incoming plane polarized light passing through core layer 222 and striking the far polarizer during the normal state. The LC-particle orientation change in core segment 232 may entail rotating the PZ direction of plane polarized light passing through segment 232 by a changed LC rotational amount usually less than 45°. If so, the effective PZ direction rotation provided by segment 232 during the changed state is materially different from, usually materially less than, the effective PZ direction rotation provided by layer 222 during the normal state.

During the changed state, the far polarizer segment in FA segment 216 transmits a high percentage of incident polarized light plane polarized in the s direction and blocks, preferably absorbs, incident light plane polarized in largely any other direction just as in the normal state. However, the radiosity of the reflected s polarized light temporarily passing through the far polarizer segment in FA segment 216 differs materially from, is usually materially less than, the radiosity of the reflected s polarized light normally passing through the far polarizer because the effective PZ direction rotation, if any, temporarily provided by the LC material in core segment 232 differs materially from, is usually materially less than, the effective PZ direction rotation normally provided by the LC material in core layer 222.

A substantial part of the plane polarized light passing through the far polarizer segment in FA segment 216 during the changed state is reflected by the segment of the light reflector in FA segment 216 and passes back through the far polarizer segment in segment 216, core segment 232, and the segment of the near polarizer in NA segment 214. The far polarizer segment in FA segment 216 blocks, preferably absorbs, any reflected incident light plane polarized in any direction other than the s direction so that reflected light passing through the far polarizer segment in segment 216 largely forms XRfa light plane polarized in the s direction. To the extent that the PZ direction of incoming p polarized XRfa light leaving the near polarizer segment in NA segment 214 temporarily undergoes rotation, the LC material in core segment 232 causes reflected incident s polarized XRfa light to undergo the same rotation in PZ direction. The near polarizer segment in NA segment 214 blocks, preferably absorbs, any reflected incident light plane polarized in any direction other than the p direction so that reflected light passing through the near polarizer segment in NA segment 214 includes XRfa light plane polarized in the p direction.

The radiosity of the reflected p plane polarized XRfa light temporarily passing through the near polarizer segment in NA segment 214 differs materially from, is usually materially less than, the radiosity of the reflected p plane polarized ARfa light normally passing through the near polarizer because the radiosity of the reflected s plane polarized XRfa light temporarily passing through the far polarizer segment in FA segment 216 differs materially from, is usually materially less than, the radiosity of the reflected s plane polarized ARfa light normally passing through the far polarizer due to the effective PZ direction rotation, if any, temporarily provided by core segment 232 differing materially from, usually being materially less than, the effective PZ direction rotation normally provided by core layer 222. Colors ARfa and XRfa normally have the same wavelength characteristics. However, the material difference in radiosity between the resultant reflected p plane polarized XRfa light temporarily leaving NA segment 214 and the resultant reflected p plane polarized ARfa light normally leaving NA layer 204 by itself, or in combination with other reflected light leaving print area 118 during the changed state and SF zone 112 during the normal state enables color X to differ materially from color A. With color XRfa being of materially lower radiosity than color ARfa, color X is materially lighter than color A even though the wavelength characteristics of ARfa and XRfa light are the same. For instance, color X can be pink while color A is red.

The WI traits in the deep-reflection embodiment are embodied as follows in the reflective LC structure with the polarizers having perpendicular PZ directions. For the NA incoming and outgoing traits, the near polarizer causes light passing either way through NA layer 204 to be plane polarized in the p direction. For the FA trait, the far polarizer causes light passing either way through the FA layer 206 to be plane polarized in the s direction. For the primary incoming and outgoing traits, the LC material in core layer 222 causes the PZ direction of plane polarized light passing either way through layer 222 during the normal state to rotate the primary LC rotational amount, usually 45°-90°. For the changed incoming and outgoing traits, the segment of the LC material in core segment 232 causes the PZ direction of light passing through segment 232 during the changed state to rotate the changed LC rotational amount, usually less than 45°, if the LC material in segment 232 undergoes any PZ direction rotation during the changed state.

When the polarizers in the reflective LC structure have parallel PZ directions with the near polarizer causing light passing either way through NA layer 204 to be plane polarized in the p direction, the actions performed by the far polarizer and the LC material during the normal and changed states are opposite from the actions performed by the far polarizer and the LC material when the polarizers in the reflective LC structure have perpendicular PZ directions. The WI traits in the deep-reflection embodiment are then embodied as follows. For the FA trait, the far polarizer causes light passing either way through FA layer 206 to be plane polarized in the p direction. For the primary incoming and outgoing traits, the LC material in core layer 222 causes the PZ direction of plane polarized light normally passing either way through layer 222 to rotate a primary LC amount, usually less than 45°, if the LC material in layer 222 normally undergoes any PZ direction rotation. For the changed incoming and outgoing traits, the segment of the LC material in core segment 232 causes the PZ direction of light temporarily passing through segment 232 to rotate a changed LC amount, usually 45°-90°.

Emission-based Embodiments of Color-change Component with Electrode Assembly

Six general embodiments of CC component 184 in OI structure 200 are based on changes in light emission. These six embodiments are termed the mid-emission ET, mid-emission EN, mid-emission EN-ET, deep-emission ET, deep-emission EN, and deep-emission EN-ET embodiments. The above-described preliminary specifications for the four CC-component light-reflection embodiments apply to these six CC-component light-emission embodiments.

Beginning with the three mid-emission embodiments of CC component 184, FA layer 206 is not significantly involved in color changing in any of the mid-emission embodiments. There is largely no ARfa, AEfa, XRfa, or XEfa light, and thus largely no ADfa, ATfa, XDfa, or XTfa light, in any of the mid-emission embodiments. The difference between the two single mid-emission embodiments is that core layer 222 emits light only during the changed state in the mid-emission ET embodiment and only during the normal state in the mid-emission EN embodiment. Layer 222 emits light during both states in the mid-emission EN-ET embodiment.

The mid-emission ET embodiment utilizes normal ARab light reflection and temporary XEab light emission-XRab light reflection or, more specifically, normal ARne/ARcl/ARfe light reflection and temporary XEcl light emission-ARne/XRcl/XRfe light reflection respectively due mostly to ARcl/ARfe light reflection and XEcl light emission. During the normal state, the mid-emission ET embodiment operates the same as the mixed-reflection RT embodiment and thus the same as the mid-reflection embodiment.

During the changed state, core segment 232 in the mid-emission ET embodiment responds to the general CC control signal applied between at least oppositely situated parts of electrode segments 234 and 236 by temporarily emitting XEcl light, usually a majority component of X light. Total XTcl light consists of XEcl light, any XRcl light reflected by segment 232, and any FE-segment-reflected XRfe light passing through it, usually mostly temporarily emitted XEcl light. Any reflected XRcl light is usually largely ARcl light. Total XTab light consists of XDab light formed with XEcl light passing through NE segment 234, any ARne light reflected by it, and any XRcl and XRfe light passing through it, likewise usually mostly XEcl light. Total XTcc light consists of XEcl light passing through NA segment 214, any ARna light reflected by it, and any ARne, XRcl, and XRfe light passing through it, again usually mostly XEcl light. Including any ARis light reflected by IS segment 192, X light is formed with XEcl light and any ARis, ARna, ARne, XRcl and XRfe light leaving segment 192 and thus IDVC portion 138.

The mid-emission EN embodiment utilizes normal AEab light emission-ARab light reflection and temporary XRab light reflection or, more specifically, normal AEcl light emission-ARne/ARcl/ARfe light reflection and temporary ARne/XRcl/XRfe light reflection respectively due mostly to AEcl light emission and XRcl/XRfe light reflection. During the normal state, core layer 222 normally emits AEcl light, usually a majority component of A light. Total ATcl light consists of AEcl light, any ARcl light reflected by layer 222, and any FE-structure-reflected ARfe light passing through it, usually mostly normally emitted AEcl light. Total ATab light consists of ADab light formed with AEcl light passing through NE structure 224, any ARne light reflected by it, and any ARcl and ARfe light passing through it, likewise usually mostly AEcl light. Total ATcc light consists of AEcl light passing through NA layer 204, any ARna light reflected by it, and any ARne, ARcl, and ARfe light passing through it, again usually mostly AEcl light. Including any ARis light reflected by IS component 182, A light is formed with AEcl light and any ARis, ARna, ARne, ARcl, and ARfe light normally leaving component 182 and thus VC region 106.

Core layer 222 in the mid-emission EN embodiment responds to the general CC control signal the same as in the mixed-reflection RN embodiment. Hence, the mid-emission EN embodiment operates the same in the changed state as the mid-reflection embodiment.

Assembly 202 in mid-emission EN or ET embodiment may be one or more of the following light-processing arrangements: a cathodoluminescent arrangement, an electrochromic fluorescent arrangement, an electrochromic luminescent arrangement, an electrochromic phosphorescent arrangement, an electroluminescent arrangement, an emissive microelectricalmechanicalsystem (display) arrangement (such as a time-multiplexed optical shutter or a backlit digital micro shutter structure), a field-emission arrangement, a light-emitting diode arrangement, a light-emitting electrochemical cell arrangement, an organic light-emitting diode arrangement, an organic light-emitting transistor arrangement, a photoluminescent arrangement, a plasma panel arrangement, a quantum-dot light-emitting diode arrangement, a surface-conduction-emission arrangement, and a vacuum fluorescent (display) arrangement.

Core layer 222 in each light-processing arrangement usually contains a multiplicity of light-emissive elements distributed laterally uniformly across layer 222. "LE" hereafter means light-emissive. Each LE element lies between a small part of NE structure 224 and a generally oppositely situated small part of FE structure 226 for which these two parts of electrode structures 224 and 226 occupy approximately the same lateral area as that LE element. The LE elements continuously or selectively emit light during operation of OI structure 200 depending on factors such as their locations in layer 222. The LE elements reflect light constituting part or all of the ARcl light during the normal state. Core segment 232 contains a submultiplicity of the LE elements. The LE elements in segment 232 reflect light constituting part or all of the XRcl light during the changed state.

During the normal state in the mid-emission ET embodiment of each light-processing arrangement with control voltage $V_{nf}$ along core layer 222 at normal value $V_{nfN}$, the LE elements either no light or emit light provided that little, preferably none, of the emitted light leaves layer 222 along NE structure 224. When voltage $V_{nf}$ along core segment 232 goes to value $V_{nfC}$ to initiate the changed state, the LE elements in segment 232 emit XEcl light, again usually a majority component of X light, leaving segment 232. When voltage $V_{nf}$ along segment 232 returns to value $V_{nfN}$, the LE elements in segment 232 return to emitting no light or to emitting light provided that little, preferably none, of the emitted light leaves segment 232 along NE segment 234.

The opposite occurs in the mid-emission EN embodiment of each light-processing arrangement. With voltage $V_{nf}$ along core layer 222 being value $V_{nfN}$ during the normal state, the LE elements emit AEcl light, again usually a majority component of A light, leaving layer 222. When voltage $V_{nf}$ along core segment 232 goes to value $V_{nfC}$ to initiate the changed state, the LE elements in segment 232 either emit no light or continue to emit light provided that little, preferably none, of the emitted light leaves segment 232 along NE segment 234. When voltage $V_{nf}$ along core segment 232 returns to value $V_{nfN}$, the LE elements in segment 232 return to emitting AEcl light leaving it.

The LE elements are at fixed locations in core layer 222, and thus in CC component 184, in one version of the mid-emission ET or EN embodiment. In the mid-emission ET version, the LE elements emit no light during the normal state. In the mid-emission EN version, the LE elements in core segment 232 largely cease emitting light in response to the general CC control signal so as to emit no light during the changed state.

Each LE element has an element emissive area across which AEcl light is emitted during the normal state in the mid-emission EN embodiment and XEcl light is emitted during the changed state in the mid-emission ET embodiment if that LE element is in IDVC portion 138. AEcl or XEcl light of each LE element can be emitted relatively uniformly across its emissive area. Alternatively, each LE element includes three or more LE subelements, each operable to emit light of a different one of three or more primary colors, e.g., red, green, and blue, combinable to produce many colors usually including white. Each LE subelement usually emits its primary color across a subelement emissive subarea of the emissive area of its LE element. The standard human eye/brain would interpret the combination of the primary colors of the light emitted by the LE subelements in each LE element of the mid-emission EN embodiment as color AEcl if the AEcl light traveled to the human eye unaccompanied by other light. The same applies to color XEcl and XEcl light for each LE element in portion 138 of the mid-emission ET embodiment.

The radiosities of the light of the primary colors emitted from each element emissive area can be programmably adjusted subsequent to manufacture of OI structure 200 for adjusting AEcl light, and thus A light, in the mid-emission EN embodiment and XEcl light, and thus X light, in the mid-emission ET embodiment. The programming is performed, as necessary, for each primary color, by providing the LE subelements operable for emitting light of that primary color with a programming voltage that causes them to emit light of their primary color at radiosity suitable for the desired AEcl light in the mid-emission EN embodiment and suitable for the desired XEcl light in the mid-emission ET embodiment.

Another version of the mid-emission ET or EN embodiment entails providing the LE elements in a supporting medium, usually a fluid such as a liquid, in core layer 222. The supporting medium is a medium color M1Rc materially different from temporary emitted core color XEcl. Hence, the medium reflects M1Rc light and absorbs or/and transmits other light. The LE elements have electrical characteristics, typically electrical charging, which enable them to translate (move) in response to a changing electric field. Also, the LE elements are usually of an LE-element color L1Rc so as reflect L1Rc light and absorb or/and transmit, preferably absorb, other light.

In the mid-emission ET translating-element version, setting voltage $V_{nf}$ at normal value $V_{nfN}$ laterally along core layer 222 results in the LE elements being normally distributed in the medium such that, even if they emit light, largely none of the emitted light leaves layer 222 along NE structure 224. Specifically, the LE elements are normally dispersed throughout the medium or situated adjacent to FE structure 226 so as to be averagely remote from NE structure 224. The medium absorbs any light emitted by the LE elements and traveling toward structure 224. Since the medium reflects M1Rc light and since the LE elements reflect L1Rc light, ARcl light normally leaving layer 222 consists of M1Rc light and any L1Rc light. Total ATcl light consists of M1Rc light and any L1Rc and XRfe light. Any LiRc light normally leaving layer 222 along structure 224 is of low radiosity compared to M1Rc light normally leaving layer 222 along structure 224.

The $V_{nfC}$ polarity and the characteristics, e.g., charging, of the LE elements are chosen such that the LE elements in core segment 232 translate so as to be adjacent to NE segment 234 when voltage $V_{nf}$ along segment 232 goes to changed value $V_{nfC}$. The LE elements in segment 232 then emit XEcl light leaving it. With XRcl light leaving segment 232 consisting of M1Rc and L1Rc light, total XTcl light consists of XEcl, M1Rc, and L1Rc light and any ARfe light so as to differ materially from the ATcl light normally leaving core layer 222. The same result is achieved by reversing both the $V_{nfC}$ polarity and the characteristics of the LE elements.

The mid-emission EN translating-element version operates in the opposite way. Setting voltage $V_{nf}$ at value $V_{nfN}$ laterally along core layer 222 results in the LE elements normally being adjacent to NE structure 224. The LE elements normally emit AEcl light leaving layer 222. Since the medium reflects M1Rc light and since the LE elements reflect L1Rc light, ARcl light normally leaving layer 222 consists of M1Rc and L1Rc light. Total ATcl light consists of AEcl, M1Rc, and L1Rc light and any ARfe light.

Changing voltage $V_{nf}$ in core segment 232 to value $V_{nfC}$ causes the LE elements in segment 232 to translate so as to be averagely remote from NE segment 234. In particular, the LE elements in segment 232 become dispersed throughout it or situated adjacent to FE segment 236. The segment of the medium in core segment 232 absorbs any light emitted by the LE elements in segment 232 and traveling toward NE segment 234. With XRcl light leaving segment 232 consisting largely of M1Rc light and any L1Rc light, total XTcl light consists largely of M1Rc light and any L1Rc and ARfe light and differs materially from the ATcl light normally leaving core layer 222. Any LiRc light temporarily leaving segment 232 along NE segment 234 is of low radiosity compared to M1Rc light temporarily leaving segment 232 along NE segment 234. The same result is again achieved by reversing both the $V_{nfC}$ polarity and the characteristics of the LE elements.

Various mechanisms can cause the LE elements in the translating-element version of the mid-emission ET or EN embodiment to emit XEcl or AEcl light. The LE elements can emit light an electrochromic fluorescently, electrochromic luminescently, electrochromic phosphorescently, or electroluminescently in response to an alternating-current voltage signal imposed on voltage $V_{nf}$. The LE elements can emit light photoluminescently in response to electromagnetic radiation provided from a source outside assembly 202. "EM" hereafter means electromagnetic. The EM radiation is typically IR radiation but can be light or UV radiation, usually UV radiation just beyond the visible spectrum. The radiation source is typically in FA layer 206 but can be in NA layer 204. The EM radiation can sometimes simply be ambient light. In addition, the LE elements can sometimes emit light naturally, i.e., without external stimulus.

The LE elements in the translating-element version of the mid-emission ET or EN embodiment can emit light continuously during operation of OI structure 200. This can occur in response to EM radiation provided from a source of EM radiation. If so and if the EM radiation source is capable of being switched between radiating (on) and non-radiating (off) states, the radiation source is usually placed in the non-radiating state when structure 200 is out of operation so as to save power. Alternatively, the LE elements in core segment 232 of the mid-emission ET version can emit XEcl light in response to the general CC control signal but be non-emissive of light at other times. In a complementary manner, the LE elements in segment 232 of the mid-emission EN version can normally emit AEcl light and become non-emissive of light in response to the control signal.

The mid-emission EN-ET embodiment utilizes normal AEab light emission-ARab light reflection and temporary XEab light emission-XRab light reflection or, more specifically, normal AEcl light emission-ARne/ARcl/ARfe light reflection and temporary XEcl light emission-ARne/XRcl/XRfe light reflection respectively due mostly to AEcl light emission and XEcl light emission. The mid-emission EN-ET embodiment operates the same during the normal state as the mid-emission EN embodiment. Core segment 232 in the mid-emission EN-ET embodiment responds to the general CC control signal the same as in the mid-emission ET embodiment. Hence, the mid-emission EN-ET embodiment operates the same during the changed state as the mid-emission ET embodiment.

Assembly 202 in the mid-emission EN-ET embodiment can generally be any one or more of the above light-processing arrangements usable to implement the mid-emission EN and ET embodiments subject to modification of each light-processing arrangement to be capable of emitting both AEcl light and XEcl light. In one modification, core layer 222 contains a multiplicity of first LE elements distributed laterally uniformly across layer 222 and a multiplicity of second LE elements distributed laterally uniformly across layer 222 and thus approximately uniformly among the first LE elements. Each LE element lies between a small part of NE structure 224 and a generally oppositely situated small part of FE structure 226 for which these two parts of electrode structures 224 and 226 occupy approximately the same lateral area as that LE element. Core segment 232 contains a submultiplicity of the first LE elements and a submultiplicity of the second LE elements. The mechanisms causing the first and second LE elements to emit light are the same as those described above for causing the LE elements in the above-described version of the mid-emission ET or EN embodiment to emit light.

The first and second LE elements, i.e., all the properly functioning ones, have the following light-emitting capabilities. The first LE elements emit light of wavelength for a first LE emitted color P1Ec during the normal state in which voltage $V_{nf}$ between electrode structures 226 and 224 is at value $V_{nfN}$ such that P1Ec light leaves core layer 222 and exits VC region 106. During the changed state with voltage $V_{nf}$ between the two parts of structures 226 and 224 for each LE element in core segment 232 at value $V_{nfC}$, the first LE elements outside segment 232 continue to emit P1Ec light leaving layer 222 and exiting region 106. The first LE elements in segment 232 may or may not emit P1Ec light leaving segment 232 and exiting IDVC portion 138 during the changed state depending on which of the switching modes, described below, is used. The circumstance of a first LE element in segment 232 not providing light leaving portion 138 during the changed state can be achieved by having that element temporarily be non-emissive or by having it emit light that temporarily does not leave portion 138, e.g., due to absorption in segment 232.

The second LE elements in core segment 232 emit light of wavelength for a second LE emitted color Q1Ec during the changed state such that Q1Ec light leaves segment 232 and exits IDVC portion 138. The second LE elements outside segment 232 may or may not emit Q1Ec light which leaves core layer 222 and exits VC region 106 during the changed state depending on which of the switching modes is used. The same applies to the second LE elements during the normal state. The circumstance of a second LE element not providing light leaving region 106 during the normal or changed state can be achieved by having that element normally or temporarily be non-emissive or by having it emit light that normally or temporarily does not leave region 106, e.g., due to absorption in layer 222.

Additionally, the first LE elements usually reflect light striking them and of wavelength for a first LE reflected color P1Rc while absorbing or/and transmitting, preferably absorbing, other incident light. P1Rc light may or may not leave core layer 222 and exit VC region 106 during the normal and changed states. Similarly, the second LE elements usually reflect light striking them and of wavelength for a second LE reflected color Q1Rc while absorbing or/and transmitting, preferably absorbing, other incident light. Q1Rc light may or may not leave layer 222 and exit region 106 during the normal and changed states.

Subject to the preceding emission/reflection specifications, the first and second LE elements operate in one of the following three switching modes. In a first LE switching mode, the first and second LE elements respectively normally emit P1Ec and Q1Ec light which forms AEcl light, usually a majority component of A light, leaving core layer 222 along NE structure 224 and then leaving VC region 106 via SF zone 112. Total ATcl light consists of P1Ec and Q1Ec light and any ARcl and ARfe light, usually mostly P1Ec and Q1Ec light, where the ARcl light includes any P1Rc and Q1Rc light. The first LE elements in core segment 232 respond to the general CC control signal by temporarily largely ceasing to emit light leaving IDVC portion 138 via print area 118. The second LE elements in segment 232 continue to emit Q1Ec light which forms XEcl light, usually a majority component of X light, leaving segment 232 along NE segment 234 and then leaving portion 138 via area 118. Total XTcl light consists largely of Q1Ec light and any XRcl and ARfe light, usually mostly Q1Ec light, where the XRcl light includes any P1Rc and Q1Rc light.

In a second LE switching mode, the first LE elements normally emit P1Ec light which forms AEcl light, usually a majority component of A light, leaving core layer 222 along NE structure 234 and then leaving VC region 106 via SF zone 112. The second LE elements normally emit largely no light leaving region 106 along zone 112. Total ATcl light consists largely of P1Ec light and any ARcl and ARfe light, usually mostly P1Ec light, where the ARcl light again includes any P1Rc and Q1Rc light. Upon occurrence of the general CC control signal, the first LE elements in core segment 232 continue to emit P1Ec light leaving it along NE segment 234 and then leaving IDVC portion 138 via print area 118. The second LE elements in core segment 232 respond to the general CC control signal by temporarily emitting Q1Ec light leaving segment 232 via NE segment 234 and then leaving portion 138 via area 118. P1Ec and Q1Ec light form XEcl light, usually a majority component of X light. Total XTcl light consists of P1Ec and Q1Ec light and any XRcl and ARfe light, usually mostly P1Ec and Q1Ec light, where the XRcl light again includes any P1Rc and Q1Rc light.

In a third LE switching mode, the first and second LE elements operate the same during the normal state as in the second LE switching mode. The first LE elements in core segment 232 respond to the general CC control signal by temporarily largely ceasing to emit light leaving IDVC portion 138 along print area 118. The second LE elements in segment 232 respond to the control signal by temporarily emitting Q1Ec light which forms XEcl light, usually a majority component of X light, temporarily leaving segment 232 along NE segment 234 and then leaving portion 138 along area 118. As in the first LE switching mode, total XTcl light consists largely of Q1Ec light and any XRcl and ARfe light, usually mostly Q1Ec light, where the XRcl light includes any P1Rc and Q1Rc light.

The first and second LE elements are at fixed locations in core layer 222 and thus in CC component 184 in a version of the mid-emission EN-ET embodiment implementing each LE switching mode. During the normal state in the version implementing the third LE switching mode, the first LE elements emit P1Ec light while the second LE elements emit no light. During the changed state, the second LE elements in core segment 232 temporarily emit Q1Ec light in response to the general CC control signal while the first LE elements in segment 232 become non-emissive in response to the control signal.

When the first and second LE elements are fixedly located in core layer 222, those LE elements also usually have the physical characteristics of the fixed-location LE elements in the mid-emission ET or EN embodiment. Accordingly, each first or second LE element can include three or more LE subelements, each operable to emit light of a different one of three or more primary colors, e.g., again red, green, and blue, combinable to produce many colors usually including white. The standard human eye/brain would interpret the combination of the primary colors of the light emitted by the first or second LE subelements in each LE element as color P1Ec or Q1Ec if the P1Ec or Q1Ec light traveled to the human eye unaccompanied by other light.

The radiosities of the light of the primary colors emitted from each emissive area can be programmably adjusted subsequent to manufacture of OI structure 200 for enabling AEcl and XEcl light, and thus A and X light, to be adjusted. The programming is performed, as necessary, for each primary color, by providing the LE subelements operable for emitting light of that primary color with a selected programming voltage that causes those LE subelements to emit their primary color at radiosities suitable for the desired AEcl and XEcl light.

Another version of the mid-emission EN-ET embodiment implementing the third LE switching mode entails providing the two sets of LE elements in a supporting medium, usually a fluid such as a liquid, in core layer 222. The supporting medium is again generally of medium color M1Rc. The medium is preferably transparent so that the M1Rc radiosity is close to zero. The LE elements have electrical characteristics, typically electrical charging, which enable the second LE elements to translate oppositely to the first LE elements in the presence of an electric field. Setting voltage $V_{nf}$ at normal value $V_{nfN}$ laterally along layer 222 causes the first LE elements to be adjacent to NE structure 224 while the second LE elements are averagely remote from structure 224. In particular, the second LE elements are normally dispersed throughout the medium or situated adjacent to FE structure 226. The first LE elements emit P1Ec light leaving layer 222 along NE structure 224 and then VC region 106 via SF zone 112. The medium absorbs light emitted by the second LE elements and traveling toward structure 224. Since the medium reflects M1Rc light and since the first and second LE elements respectively reflect P1Rc and Q1Rc light, total ATcl light consists largely of P1Ec and P1Rc light and any Q1Rc, M1Rc, and ARfe light. Any Q1Rc light normally leaving layer 222 along structure 224 is of low radiosity compared to P1Rc light normally leaving layer 222 along structure 224.

The $V_{nfC}$ polarity and the characteristics, e.g., charging, of the LE elements are chosen such that changing voltage $V_{nf}$ along core segment 232 to value $V_{nfC}$ causes the second LE elements in segment 232 to translate so as to be adjacent to NE segment 234 while the first LE elements in core segment 232 oppositely translate so as to be averagely remote from NE segment 234. In particular, the first LE elements in core segment 232 become temporarily dispersed throughout the segment of the medium in segment 232 or situated adjacent to FE segment 236. The second LE elements in core segment 232 emit Q1Ec light leaving segment 232 along NE segment 234 and then IDVC portion 138 via print area 118. The medium absorbs light emitted by the first LE elements in core segment 232 and traveling toward NE segment 234. With the segment of the medium in core segment 232 reflecting M1Rc light and with the first and second LE elements respectively reflecting P1Rc and Q1Rc light, total XTcl light consists largely of Q1Ec and Q1Rc light and any P1Rc, M1Rc, and ARfe light and differs materially from the ATcl light normally leaving core layer 222. During the changed state, any P1Rc light leaving segment 232 along NE segment 234 is of low radiosity compared to Q1Rc light leaving segment 232 along NE segment 234.

The first and second LE elements may emit light continuously during operation of OI structure 200 in the preceding version of the mid-emission EN-ET embodiment. This can occur in response to EM radiation provided from an EM radiation source. If so and if the radiation source can be switched between radiating and non-radiating states, the radiation source is usually placed in the non-radiating state when structure 200 is out of operation so as to save power. Alternatively, the second LE elements in core segment 232 can emit XEcl light in response to the general CC control signal but be non-emissive at other times while the first LE elements emit AEcl light continuously during operation of structure 200 or normally emit AEcl light but become non-emissive in response to the control signal.

Moving to the three deep-emission embodiments of CC component 184, FA layer 206 is utilized in each deep-emission embodiment for emitting light in making color change. The difference between the single deep-emission embodiments is that light emitted by layer 206 passes through core layer 222 only during the changed state in the deep-emission ET embodiment but only in the normal state in the deep-emission EN embodiment. Light emitted by FA layer 206 passes through core layer 222 during both states in the deep-emission EN-ET embodiment.

The deep-emission ET embodiment employs normal ARab light reflection and temporary XEfa light emission-XRab/XRfa light reflection or, more specifically, normal ARne/ARcl/ARfe light reflection and temporary XEfa light emission-ARne/XRcl/XRfe/XRfa light reflection respectively due mostly to ARcl/ARfe light reflection and XEfa light emission. The deep-emission ET embodiment is similar to the mixed-reflection RT embodiment except that FA layer 206 in the deep-emission ET embodiment emits light and lacks the light reflector of the mixed-reflection RT embodiment. During the normal state, the deep-emission ET embodiment operates the same as the mid-emission ET embodiment and thus the same as the mid-reflection embodiment.

Core segment 232 in the deep-emission ET embodiment responds to the general CC control signal applied between at least oppositely situated parts of electrode segments 234 and 236 during the changed state by allowing a substantial part of XEfa light, usually a majority component of X light, emitted by FA segment 216 and passing through FE segment 236 to temporarily pass through core segment 232. Total XTfa light consists of XEfa light and any XRfa light reflected by FA segment 216, usually mostly emitted XEfa light.

A substantial part of any XRfa light passes through FE segment 236 and, as allowed by core segment 232, through it. Total XTcl light consists of XEfa light passing through segment 232, any XRfa light passing through it, any XRcl light reflected by it, and any FE-segment-reflected XRfe light passing through it, usually mostly XEfa light. Total XTab light consists of XEfa light passing through NE segment 234, any XRfa light passing through it, and any XRab light formed with any ARne light reflected by it and any XRcl and XRfe light passing through it, likewise usually mostly XEfa light. Total XTcc light consists of XEfa light passing through NA segment 214, any ARna light reflected by it, and any ARne, XRcl, XRfe, and XRfa light passing through it, again usually mostly XEfa light. Including any ARis light reflected by IS segment 192, X light is formed with XEfa light and any ARis, ARna, ARne, XRcl, XRfe, and XRfa light temporarily leaving segment 192 and thus IDVC portion 138. XEfa light is preferably a 75% majority component, more preferably a 90% majority component, of each of XTfa, XTcl, XTab, XTcc, and X light.

The deep-emission EN embodiment employs normal AEfa light emission-ARab/ARfa light reflection and temporary XRab light reflection or, more specifically, normal AEfa light emission-ARne/ARcl/ARfe/ARfa light reflection and temporary ARne/XRcl/XRfe light reflection respectively due mostly to AEfa light emission and XRcl/XRfe light reflection. The deep-emission EN embodiment is similar to the mixed-reflection RN embodiment except that FA layer 206 in the deep-emission EN embodiment emits light and lacks the light reflector of the single mixed-reflection RN embodiment. During the normal state, core layer 222 in the deep-emission EN embodiment allows AEfa light, usually a majority component of A light, emitted by FA layer 206 and passing through FE structure 226 to pass through core layer 222. Total ATfa light consists of AEfa light and any ARfa light reflected by FA layer 206, usually mostly emitted AEfa light.

A substantial part of any ARfa light passes through FE structure 226 and, as allowed by core layer 222, through it. Total ATcl light consists of AEfa light passing through layer 222, any ARfa light passing through it, any ARcl light reflected by it, and any FE-structure-reflected ARfe light passing through it, usually mostly emitted AEfa light. Total ATab light consists of AEfa light passing through NE structure 224, any ARfa light passing through it, and any ARab light formed with any ARne light reflected by structure 224 and any ARcl and ARfe light passing through it, likewise usually mostly emitted AEfa light. Total ATcc light consists of AEfa light passing through NA layer 204, any ARna light reflected by it, and any ARne, ARcl, ARfe, and ARfa light passing through it, again usually mostly AEfa light. Including any ARis light reflected by IS component 182, A light is formed with AEfa light and any ARis, ARna, ARne, ARcl, ARfe, and ARfa light temporarily leaving component 182 and thus VC region 106. AEfa light is preferably a 75% majority component, more preferably a 90% majority component, of each of ATfa, ATcl, ATab, ATcc, and A light.

Core segment 232 in the deep-emission EN embodiment responds to the general CC control signal the same as in the mid-emission EN embodiment. Consequently, the deep-emission EN embodiment operates the same during the changed state as the mid-reflection embodiment.

In one implementation of the deep-emission ET or EN embodiment, core layer 222 contains dimensionally anisotropic core particles distributed laterally across the layer's extent and switchable between light-transmissive and light-blocking states. The core particles have the characteristics described above for the implementation of the mixed-reflection RT or RN embodiment utilizing dimensionally anisotropic core particles. NA layer 204 may or may not be present in this deep-emission ET or EN implementation. FA layer 206 in the deep-emission ET or EN implementation contains a light emitter extending along, and generally parallel to, FE structure 226. The deep-emission ET or EN implementation is configured the same as the implementation of the mixed-reflection RT or RN embodiment utilizing anisotropic core particles except that the light emitter replaces the light reflector. The deep-emission ET or EN implementation operates the same as the mixed-reflection RT or RN implementation utilizing anisotropic core particles except as described below.

The deep-emission ET implementation operates the same as the mixed-reflection RT implementation utilizing anisotropic core particles except that, during the changed state, the combination of XEfa light emitted by the segment of the light emitter in FA segment 216 and any XRfa light reflected by segment 216 replaces XRfa light reflected by the segment of the light reflector in segment 216. The light emitter may continuously emit XEfa light during operation of the deep-emission ET implementation. Alternatively, the light emitter may respond to the general CC control signal by emitting XEfa light only during the changed state in order to reduce power consumption.

The deep-emission EN implementation operates the same as the mixed-reflection RN implementation utilizing anisotropic core particles except that, during the normal state, the combination of AEfa light emitted by the light emitter and any ARfa light reflected by FA layer 206 replaces ARfa light reflected by the light reflector. The light emitter usually continuously emits AEfa light during operation of the deep-emission EN implementation.

Core layer 222 consists of LC material formed with elongated LC molecules constituting the core particles in one version of the deep-emission ET or EN implementation for which CC component 184 consists of a reflective LC arrangement, typically polarizer-free. In another version of the deep-emission ET or EN implementation, layer 222 is formed with a fluid, typically a liquid, in which dipolar particles constituting the core particles are colloidally suspended. These two versions of the deep-emission ET or EN implementation are respectively configured and operable as described above for the two versions of the mixed-reflection RT or RN implementation utilizing anisotropic core particles formed respectively with elongated LC molecules and with dipolar particles subject to (a) the light emitter replacing the light reflector, (b) the changed-state combination of XEfa light emitted by the segment of the light emitter in FA segment 216 and any XRfa light reflected by segment 216 replacing XRfa light reflected by the segment of the light reflector in segment 216, and (c) the normal-state combination of AEfa light emitted by the light emitter and any ARfa light reflected by FA layer 206 replacing ARfa light reflected by the light reflector.

The deep-emission EN-ET embodiment employs normal AEfa light emission-ARab/ARfa light reflection and temporary XEfa light emission-XRab/XRfa light reflection or, more specifically, normal AEfa light emission-ARne/ARcl/ARfe/ARfa light reflection and temporary XEfa light emission-ARne/XRcl/XRfe/XRfa light reflection respectively due mostly to AEfa light emission and XEfa light emission. The deep-emission EN-ET embodiment is similar to the deep-reflection embodiment except that FA layer 206 in the deep-emission EN-ET embodiment emits light and lacks the strong light-reflection capability of the deep-reflection embodiment. Core layer 222 and auxiliary layers 204 and 206 are usually employed in the deep-emission EN-ET embodiment for imposing certain traits, usually WI traits such as PZ traits, on light emitted by FA layer 206 and passing through FE structure 226, core layer 222, NE structure 224, NA layer 204, and IS component 182. In particular, the deep-emission EN-ET embodiment operates the same as the deep-reflection embodiment when WI traits are employed except as described below.

During the normal state, FA layer 206 emits AEfa light, usually a majority component of A light. Layer 206 also typically reflects ARfa light. Total ATfa light consists of AEfa light and any ARfa light, usually mostly emitted AEfa light. Layer 206 typically imposes the FA trait on the AEfa light and on at least part of the ARfa light.

The remaining light processing during the normal state in the deep-emission EN-ET embodiment is the same as in the deep-reflection embodiment except that the combination of AEfa light and any ARfa light replaces ARfa light. Total ATfe light consists of AEfa light passing through FE structure 226, any ARfa light passing through it, and any ARfe light reflected by it, usually mostly AEfa light. ATfe light passing through core layer 222 has the primary outgoing trait upon reaching NA layer 204. Total ATcl light consists of AEfa light passing through core layer 222, any ARcl light reflected by it, and any ARfe and ARfa light passing through it, usually mostly AEfa light having the primary outgoing trait. Total ATab light consists of AEfa light passing through NE structure 224, any ARfa light passing through it, and any ARab light formed with any ARne light reflected by structure 224 and any ARcl and ARfe light passing through it, likewise usually mostly AEfa light.

ATab light passing through NA layer 204 typically has the NA outgoing trait upon reaching IS component 182. Total ATcc light consists of AEfa light passing through layer 204, any ARna light reflected by it, and any ARne, ARcl, ARfe, and ARfa light passing through it, again usually mostly AEfa light. Including any ARis light normally reflected by component 182, A light is formed with AEfa light and any ARis, ARna, ARne, ARcl, ARfe, and ARfa light normally leaving component 182 and thus VC region 106. AEfa light is preferably a 75% majority component, more preferably a 90% majority component, of each of ATfa, ATcl, ATab, ATcc, and A light.

During the changed state, core segment 232 responds to the general CC control signal applied between at least oppositely situated parts of electrode segments 234 and 236 by allowing XEfa light, usually a majority component of X light, emitted by FA segment 216 and passing through FE segment 236 to temporarily pass through core segment 232. FA segment 216 typically reflects XRfa light, usually largely ARfa light. Total XTfa light consists of XEfa light and any XRfa light, usually mostly emitted XEfa light. Segment 216 typically imposes the FA trait on the XEfa light and on at least part of the XRfa light.

The remaining light processing during the changed state in the deep-emission EN-ET embodiment is the same as in the deep-reflection embodiment except that the combination of XEfa light and any XRfa light replaces XRfa light. Total XTfe light consists of XEfa light passing through FE segment 236, any XRfa light passing through it, and any ARfe light reflected by it, usually mostly XEfa light. XTfe light passing through core segment 232 has the changed outgoing trait upon reaching NA segment 214. Total XTcl light consists of XEfa light passing through core segment 232, any XRcl light reflected by it, and any XRfe and XRfa light passing through it, usually mostly XEfa light having the changed outgoing trait. Total XTab light consists of XEfa light passing through NE segment 234, any XRfa light passing through it, and any XRab light formed with any ARne light reflected by segment 234 and any XRcl and XRfe light passing through it, likewise usually mostly XEfa light.

XTab light passing through NA segment 214 typically has the NA outgoing trait upon reaching IS segment 192. Total XTcc light consists of XEfa light passing through NA segment 214, any ARna light reflected by it, and any ARne, XRcl, XRfe, and XRfa light passing through it, again usually mostly XEfa light. Including any ARis light reflected by IS segment 192, X light is formed with XEfa light and any ARis, ARna, ARne, XRcl, XRfe, and XRfa light temporarily leaving segment 192 and thus IDVC portion 138. XEfa light is preferably a 75% majority component, more preferably a 90% majority component, of each of XTfa, XTcl, XTab, XTcc, and X light.

While the primary outgoing and changed outgoing traits are independent of wavelength, the material difference between them is chosen to result in temporary total core color XTcl differing materially from normal total core color ATcl in the deep-emission EN-ET embodiment. This often results from the radiosity of the XEfa component in the XTcl light during the changed state differing materially from, usually being materially less than, the radiosity of the AEfa component in the ATcl light during the normal state due to the material difference between the primary outgoing and changed outgoing traits so that the XTcl and ATcl light differ materially in radiosity. Color X differs materially from color A.

One embodiment of the deep-emission EN-ET embodiment of CC component 184 is a backlit LC structure in which core layer 222 consists largely of LC material such as nematic liquid crystal formed with elongated LC particles. FA layer 206 contains a light emitter such as a lamp extending parallel to, and along all of, assembly 202 so as to emit light, usually of uniform radiosity, leaving layer 206 along all of assembly 202.

The backlit LC structure is configured the same as the reflective LC structure of the deep-reflection embodiment except that the light emitter replaces the light reflector. NA layer 204 again contains a near plane polarizer extending along, and generally parallel to, NE structure 224. FA layer 206 contains a far plane polarizer extending along, and generally parallel to, FE structure 226 so as to lie between structure 226 and the light emitter. The PZ direction of the far polarizer again typically extends perpendicular to, or parallel to, the PZ direction of the near polarizer but can extend at a non-zero angle materially different from 90° to the PZ direction of the near polarizer. The backlit LC structure with perpendicular polarizers operates the same as the reflective LC structure with perpendicular polarizers except as described below.

The light emitter emits, usually continuously during operation of OI structure 200, AEfa light that impinges on the far polarizer. With the emitted light consisting of p and s directional components defined relative to the near polarizer so that the PZ direction of the far polarizer extends in the s direction, the far polarizer transmits a high percentage of the s component and blocks, preferably absorbs, the p component. Emitted AEfa light and any reflected ARfa light passing through the far polarizer so as to strike FE structure 226 and core layer 222 are plane polarized in the s direction. This action occurs during both the normal and changed states with structure 226 and layer 222.

During the normal state, the combination of AEfa light and any ARfa light undergoes the same further processing that ARfa light undergoes in the deep-reflection embodiment. Specifically, the LC material causes incident s polarized AEfa light and any ARfa light to undergo a rotation in PZ direction largely equal to the primary LC amount. The near polarizer blocks, preferably absorbs, any incident light plane polarized in largely any direction other than the p direction so that light passing through the near polarizer includes AEfa light and any ARfa light plane polarized in the p direction.

During the changed state, core layer 222 here responds to the general CC control signal the same as in the deep-reflection embodiment. The combination of XEfa light and any XRfa light undergoes the same further processing that XRfa light undergoes in the deep-reflection embodiment. More particularly, to the extent that the PZ direction of any incoming p polarized XRna light leaving the near polarizer segment in NA segment 214 undergoes rotation in core segment 232, the LC segment in segment 232 causes incident s polarized XEfa light and any XRfa light to undergo the same rotation in PZ direction. The near polarizer segment in NA segment 214 blocks, preferably absorbs, any incident light plane polarized in any direction other than the p direction so that light passing through the near polarizer segment in segment 214 includes XEfa light and any XRfa light plane polarized in the p direction. The radiosity of the p plane polarized XEfa light passing through the near polarizer segment in segment 214 during the changed state differs materially from, is usually materially less than, the radiosity of the p plane polarized AEfa light passing through the near polarizer during the normal state because the radiosity of the s plane polarized XEfa light passing through the far polarizer segment in FA segment 216 during the changed state differs materially from the radiosity of the s plane polarized AEfa light passing through the far polarizer during the normal state due to the effective PZ direction rotation, if any, provided by core segment 232 during the changed state differing materially from, usually being materially less than, the effective PZ direction rotation provided by core layer 222 during the normal state.

Similar to what occurs with colors ARfa and XRfa in the deep-reflection embodiment, colors AEfa and XEfa normally have the same wavelength characteristics. However, the material difference in radiosity between the resultant p plane polarized XEfa light leaving NA segment 214 during the changed state and the resultant p plane polarized AEfa light leaving NA layer 204 during the normal state by itself, or in combination with other reflected light leaving print area 118 during the changed state and SF zone 112 during the normal state enables color X to differ materially from color A. With color XEfa being at materially lower radiosity than color AEfa, color X is again materially lighter than color A even though even though the wavelength characteristics of XEfa and AEfa light are the same.

The mid-emission ET, mid-emission EN-ET, deep-emission ET, and deep-emission EN-ET embodiments are advantageous because use of light emission to produce changed color X enables print area 118 to be quite bright. Visibility of the color change is enhanced, especially in dark ambient environments where certain colors are difficult to distinguish.

Figure 13A:
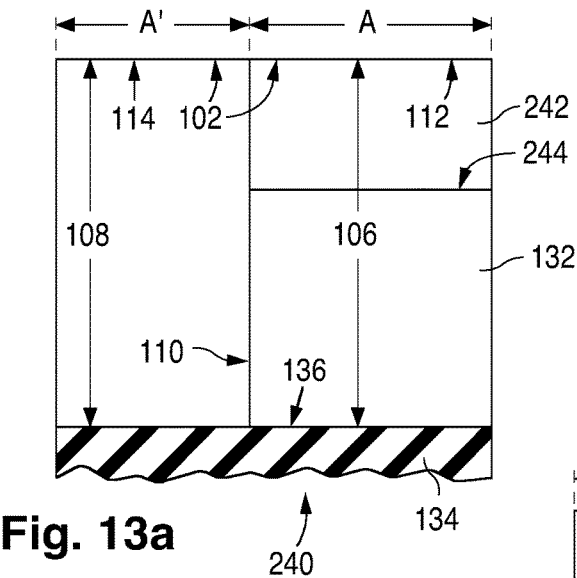
Figure 13B:
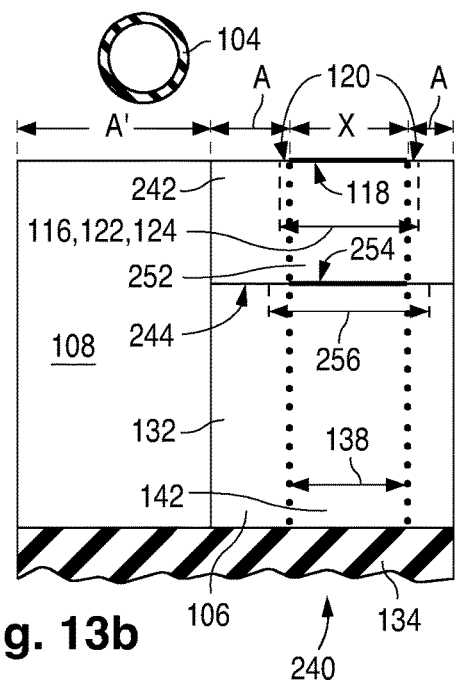
Figure 13C:
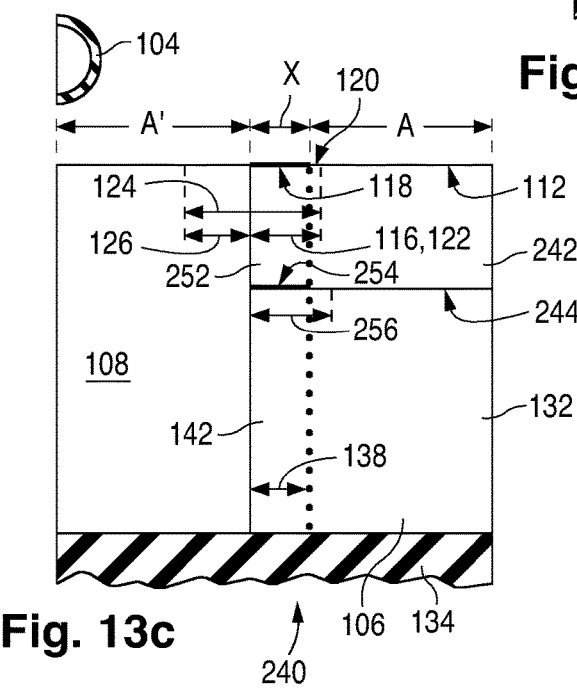

Object-impact Structure having Surface Structure for Protection, Pressure Spreading, and/or Velocity Restitution Matching FIGS. 13a-13c (collectively "FIG. 13") illustrate an extension 240 of OI structure 130. OI structure 240 is configured the same as structure 130, e.g., ISCC structure 132 can be embodied as CR or CE material, except that VC region 106 here includes a principal SF structure 242 extending from SF zone 112 to meet ISCC structure 132 along a flat principal structure-structure interface 244 extending parallel to zone 112. See FIG. 13a. SF structure 242 performs various functions such as protecting ISCC structure 132 from damage and/or spreading pressure to improve the matching between print area 118 and OC area 116 during impact on zone 112. For either of these functions, structure 242 typically consists largely of insulating material along all of zone 112. Structure 242 may provide velocity restitution matching between SF zones 112 and 114 as discussed below for FIGS. 102a and 102b. Structure 242 is usually transparent but may nonetheless strongly influence principal color A or/and changed color X.

Light travels through SF structure 242. ISCC structure 132 here operates the same during the normal state as in OI structure 130 except that light leaving ISCC structure 132 via SF zone 112 in OI structure 130 leaves ISCC structure 132 via interface 244 here. The total light, termed ATic light, normally leaving structure 132 consists of ARic light reflected by it, any AEic light emitted by it, and any substructure-reflected ARsb light passing through it.

Substantial parts of the ARic light, any AEic light, and any ARsb light pass through SF structure 242. Additionally, structure 242 may normally reflect light, termed ARss light, which leaves it via SF zone 112 after striking zone 112. ARic light and any AEic, ARss, and ARsb light normally leaving structure 242, and thus VC region 106, form A light. Each of ADic light and either ARic or AEic light is again usually a majority component, preferably a 75% majority component, more preferably a 90% majority component, of A light. ARss light may, however, be a majority component of A light if structure 242 strongly influences principal color A.

SF structure 242 usually absorbs some light. Hence, ATic light reaching SF zone 112 so as to leave VC region 106 can be of significantly lower radiosity than total ATic light directly leaving ISCC structure 132 along interface 244. To the extent that light absorption by SF structure 242 is significantly wavelength dependent, light incident on zone 112 and of wavelength significantly absorbed by structure 242 is considerably attenuated before reaching interface 244. ARic light reflected by ISCC structure 132 is of comparatively low spectral radiosity at the spectral radiosity constituency of incident light absorbed by SF structure 242 because that light does not reach interface 244 so as to be reflected by ISCC structure 132 and included in the ARic light leaving structure 132. ARic light reaching zone 112 is usually of the same spectral radiosity constituency as the ARic light directly leaving structure 132. If ARic light leaving structure 132 is the same in both OI structures 130 and 240, the ARic light leaving structure 240 can be of considerably different spectral radiosity constituency than ARic light leaving structure 130 because it lacks SF structure 242 and does not undergo such wavelength-dependent absorption. Insofar as undesirable, this situation is alleviated by choosing the light-absorption characteristics of structure 242 to significantly avoid absorbing light at the spectral radiosity constituency of ARic light directly leaving ISCC structure 132.

The circumstances differ somewhat with any AEic light emitted by ISCC structure 132. Any component of AEic light leaving structure 132 at wavelength significantly absorbed by SF structure 242 is considerably attenuated before reaching SF zone 112 due to absorption in structure 242. AEic light reaching zone 112 so as to leave VC region 106 can be of considerably different spectral radiosity constituency than the AEic light directly leaving ISCC structure 132. If AEic light leaving structure 132 is the same in OI structures 130 and 240, AEic light leaving structure 240 can also be of considerably different spectral radiosity constituency than AEic light leaving structure 130 because it lacks structure 242 and does not undergo such wavelength-dependent absorption. To the extent undesirable, this situation is alleviated by choosing the light-absorption characteristics of structure 242 to significantly avoid absorbing light at the spectral radiosity constituency of AEic light directly leaving ISCC structure 132.

Referring to FIGS. 13b and 13c, item 252 is the ID segment of SF structure 242 present in IDVC portion 138. Print area 118, the upper surface of portion 138, is also the upper surface of surface-structure segment 252 here. "SS" hereafter means surface-structure. Item 254 is the ID segment of interface 244 present in portion 138. In FIGS. 13b and 13c and in analogous later side cross-sectional drawings, ID IF segment 254 is shown with extra thick line to clearly identify its exemplary location along interface 244.

The impact of object 104 on OC area 116 creates excess SF pressure along area 116. The excess SF pressure is transmitted through SF structure 242 to interface 244 for producing excess internal pressure along an ID distributed-pressure area 256 of interface 244. "DP" hereafter means distributed-pressure. ID internal DP IF area 256 is situated opposite, and laterally outwardly conforms to, OC area 116. IF area 256 is usually larger than, and usually extends laterally beyond, OC area 116 as shown in the example of FIGS. 13b and 13c and as arises when structure 242 provides pressure spreading. While IF area 256 can be smaller than OC area 116, this results in print area 118 being even smaller than OC area 116.

ISCC segment 142 responds (a) in some general OI embodiments to the excess internal pressure along DP IF area 256, specifically IF segment 254, by causing IDVC portion 138 to temporarily appear as color X if the excess internal pressure along segment 254 meets the above-described principal basic excess internal pressure criteria here requiring that the excess internal pressure at a point along interface 244 equal or exceed a local TH value in order for the corresponding point along SF zone 112 to temporarily appear as color X or (b) in other general OI embodiments to the general CC control signal generated in response to the excess internal pressure along segment 254 meeting the excess internal pressure criteria sometimes dependent on other impact criteria also being met in those other embodiments by causing portion 138 to temporarily appear as color X. The changed state begins as portion 138 goes to a condition in which XRic light reflected by ISCC segment 142 and any XEic light emitted by it temporarily leave it along IF segment 254. The total light, termed XTic light, temporarily leaving ISCC segment 142 consists of XRic light, any XEic light, and any substructure-reflected XRsb light passing through it.

Substantial parts of the XRic light, any XEic light, and any XRsb light pass through ID SS segment 252. If SF structure 242 reflects ARss light during the normal state, SS segment 252 reflects ARss light during the changed state. XRic light and any XEic, ARss, and XRsb light leaving segment 252, and thus IDVC portion 138, form X light. XDic light differs materially from A and ADic light. Each of XDic light and either XRic or XEic light is again usually a majority component, preferably a 75% majority component, more preferably a 90% majority component, of X light. If structure 242 strongly influences A light especially if ARss light is a majority component of A light, ARss light usually has a significant effect on X light. The contributions of ARss light to A and X light are chosen so that color X materially differs from color A.

Analogous to what occurs with ATic light, XTic light reaching print area 118 so as to leave IDVC portion 138 can be of significantly lower radiosity than total XTic light directly leaving ISCC segment 142 along IF segment 254 due to light absorption by SS segment 252. To the extent that light absorption by segment 252 is significantly wavelength dependent, light incident on area 118 and of wavelength significantly absorbed by segment 252 is considerably attenuated before reaching IF segment 254. XRic light reflected by ISCC segment 142 is of comparatively low spectral radiosity at the spectral radiosity constituency of light absorbed by SF structure 242 because the light absorbed by SS segment 252 does not reach IF segment 254 so as to be reflected by ISCC segment 142 and included in the XRic light leaving segment 142. XRic light reaching area 118 is usually of the same spectral radiosity constituency as XRic light directly leaving segment 142. If XRic light leaving area 118 is the same in both OI structures 130 and 240, XRic light leaving area 118 in structure 240 can be of considerably different spectral radiosity constituency than XRic light leaving area 118 in structure 130 because it lacks SF structure 242 and does not undergo such wavelength-dependent absorption. Insofar as undesirable, this situation is alleviated by choosing the light-absorption characteristics of structure 242 to significantly avoid absorbing light at the spectral radiosity constituency of XRic light directly leaving segment 142.

Analogous to what occurs with AEic light, the circumstances differ somewhat with any XEic light emitted by ISCC segment 142. Any component of XEic light leaving segment 142 at wavelength significantly absorbed by SF structure 242 is considerably attenuated before reaching print area 118 due to absorption in SS segment 252. XEic light reaching area 118 can thus be of considerably different spectral radiosity constituency than XEic light directly leaving ISCC segment 142. If XEic light leaving area 118 is the same in both OI structures 130 and 240, XEic light leaving area 118 in structure 240 so as to leave IDVC portion 138 can be of considerably different spectral radiosity constituency than XEic light leaving area 118 so as to leave portion 138 in structure 130 because it lacks SF structure 242 and does not undergo such wavelength-dependent absorption. To the extent undesirable, this situation is alleviated by choosing the light-absorption characteristics of OI structure 240 to significantly avoid absorbing light at the spectral radiosity constituency of XEic light directly leaving ISCC segment 142.

SF structure 242 functions as a color filter for significantly absorbing light of selected wavelength in an embodiment of OI structure 240 in which structure 242 strongly influences principal SF color A or/and changed SF color X. For this embodiment, total ATic light as it leaves ISCC structure 132 along interface 244 during the normal state is of wavelength for a color termed principal internal color ATic. Because SF structure 242 significantly absorbs light, ISCC structure 132 is not externally visible along interface 244 as principal internal color ATic during the normal state. Total XTic light as it leaves ISCC segment 142 along IF segment 254 during the changed state is of wavelength for a color termed changed internal color XTic. ISSC segment 142 is not externally visible along IF segment 254 as changed internal color XTic during the changed state.

A selected one of internal colors ATic and XTic is a principal comparatively light color LP. The remaining one of colors ATic and XTic is a principal comparatively dark color DP darker than light color LP. Lightness L* of light color LP is usually at least 70, preferably at least 80, more preferably at least 90. Lightness L* of dark color DP is usually no more than 30, preferably no more than 20, more preferably no more than 10. If principal internal color ATic is light color LP, principal SF color A is darker than light color LP due to the light absorption by SF structure 242 while changed SF color X may be darker than dark color DP depending on the characteristics of the light absorption by structure 242 and on the lightness of dark color DP. If changed internal color XTic is light color LP, changed SF color X is darker than light color LP while principal SF color A may be darker than dark color DP. Importantly, the colors embodying colors A and X can be significantly varied by changing the light absorption characteristics of structure 242 without changing ISCC structure 132.

Different shades of the embodiments of colors A and X occurring in the absence of ARss light can be created by varying the reflection characteristics of SF structure 242, specifically the wavelength and intensity characteristics of ARss light, without changing ISCC structure 132. SF structure 242 thus strongly influences color A or/and color X.

The pressure spreading performable by SF structure 242 enables print area 118 to closely match OC area 116 in size, shape, and location along SF zone 112. Structure 242 is a principal pressure-spreading structure. "PS" hereafter means pressure-spreading. Interface 244, spaced apart from zone 112 so as to be inside OI structure 240, is a principal internal PS surface. ISCC structure 132 is a principal pressure-sensitive CC structure because it is sensitive to the excess internal pressure produced by PS structure 242 along PS surface 244. "PSCC" hereafter means pressure sensitive color-change. ISCC segment 142 is similarly a PSCC segment.

For the situation in which IDVC portion 138 temporarily appears as color X if the excess internal pressure along segment 254 meet the excess internal pressure criteria, an understanding of the benefits of pressure spreading on PSCC structure 132 is facilitated by first considering what occurs during an impact in similar OI structure 130 lacking PS structure 242 in the corresponding situation where portion 138 temporarily appears as color X if the impact meets the basic TH impact criteria. With reference to FIGS. 6b and 6c respectively corresponding to FIGS. 13b and 13c, the impact creates excess SF pressure along area 116. The TH impact criteria which must be met for IDVC portion 138 to temporarily appear as color X in response to the impact and which determine the size, shape, and location of print area 118 along SF zone 112 largely become the above-described principal basic excess SF pressure criteria requiring that the excess SF pressure at a point along zone 112 equal or exceed a local TH value in order for that point to be a TH CM point and temporarily appear as color X. Since the excess SF pressure drops to zero along the perimeter of OC area 116, print area 118 is located inside OC area 116 with the perimeters of areas 116 and 118 separated by perimeter band 120 which appears as color A during the changed state because the excess SF pressure at each point in band 120 is less than the local TH excess SF pressure value for that point.

Perimeter band 120 generally becomes smaller as the TH excess SF pressure values decrease. This improves the size, shape, and location matching between OC area 116 and print area 118. However, reducing the TH excess SF pressure values makes it easier for color change to occur along SF zone 112 and can result in undesired color change. The area of band 120 usually cannot be reduced to essentially zero without introducing reliability difficulty into OI structure 130.

Returning to FIGS. 13b and 13c, PS structure 242 laterally spreads the excess SF pressure caused by the impact so that DP IF area 256 is laterally larger than OC area 116. An annular band (not labeled) of internal PS surface 244 extends between the perimeters of IF area 256 and IF segment 254. This band lies opposite a corresponding annular band (not separately indicated) of SF zone 112. The excess internal pressure along IF area 256 reaches a maximum value within area 256 and drops to zero along its perimeter. This results in the excess internal pressure criteria not being met in the annular band between the perimeters of area 256 and IF segment 254. The corresponding annular band of SF zone 112 appears as color A during the changed state. Because area 256 is laterally larger than oppositely situated OC area 116, the size and shape of the annular band of zone 112 can be adjusted to achieve very close size, shape, and location matching between OC area 116 and print area 118. In effect, the pressure spreading enables perimeter band 120 between areas 116 and 118 to be made quite small without introducing reliability difficulty into PSCC structure 132. The same arises when IDVC portion 138 temporarily appears as color X if PSCC segment 142 is provided with the general CC control signal generated in response to the excess internal impact criteria being met and sometimes other impact criteria also being met.

Print area 118, although shown as being smaller than OC area 116 in FIGS. 13b and 13c, can be larger than it in OI structure 240. The perimeters of areas 116 and 118 in structure 240 can variously cross each other. Print area 118 in structure 240 differs usually by no more than 20%, preferably by no more than 15%, more preferably by no more than 10%, even more preferably by no more than 5%, in area from OC area 116, at least when total OC area 124 is in SF zone 112 as arises in FIG. 13b. In FIG. 13c where area 124 extends beyond zone 112, the same percentages apply to an imaginary variation of structure 240 in which zone 112 is extended to encompass all of area 124.

Turning to the protective function, SF structure 242 is located between ISCC structure 132 and the external environment. This shields structure 132 from the external environment. In particular, protective SF structure 242 is sufficiently thick to materially protect ISCC structure 132 from being damaged by most matter impacting, lying on, and/or moving along SF zone 112 and thereby serves as a protective structure. Protective structure 242, which may be thicker than ISCC structure 132, materially absorbs the shock of matter, including object 104, impacting zone 112. Part of the force exerted by object 104 dissipates in structure 242 so that the force exerted on DP IF area 256 due to the object impact is less, typically considerably less, than the force exerted by object 104 directly on OC area 116.

SF structure 242 blocks at least 80%, preferably at least 90%, more preferably at least 95%, of UV radiation striking it. As a result, structure 242 materially protects ISCC structure 132 from being damaged by UV radiation. DP IF area 256, which is larger than IF segment 254 when protective structure 242 performs pressure spreading, is usually closer to segment 254 in size if structure 242 performs the protective function but does not (significantly) perform the PS function.

Figure 14A:
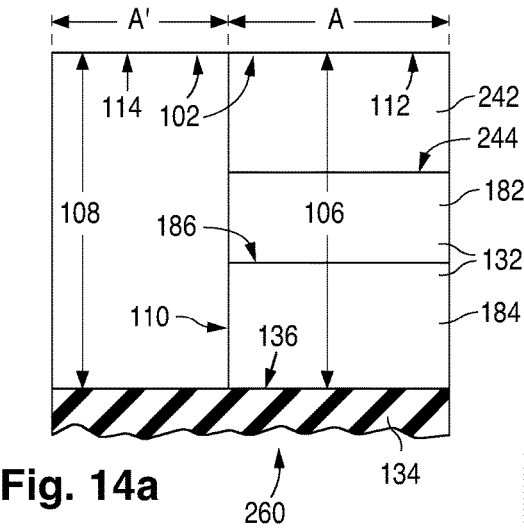
Figure 14B:
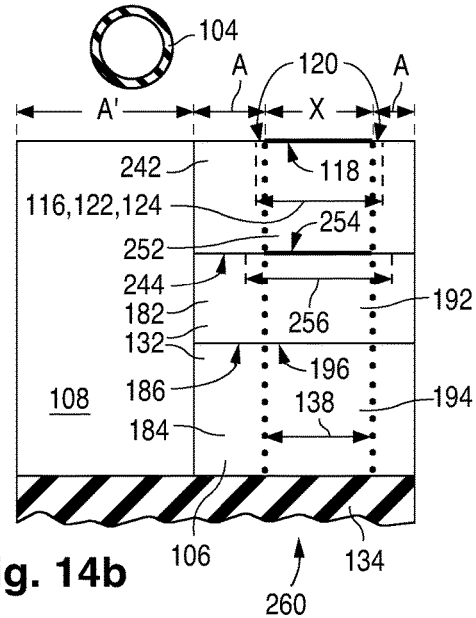
Figure 14C:
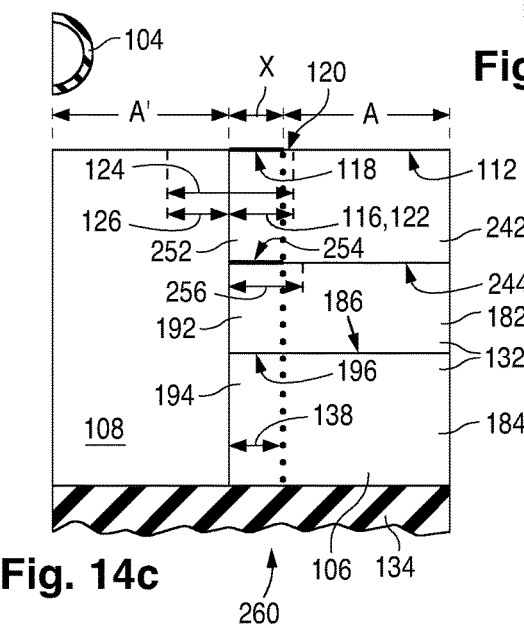

FIGS. 14a-14c (collectively "FIG. 14") illustrate an embodiment 260 of OI structure 240. OI structure 260 is also an extension of OI structure 180 to include SF structure 242. ISCC structure 132 here is formed with components 182 and 184 configured the same as in OI structure 180. See FIG. 14a. SF structure 242, which meets IS component 182 along interface 244, is here configured and operable the same as in OI structure 240.

ISCC structure 132 here operates the same during the normal state as in OI structure 180 except that light leaving structure 132 via SF zone 112 in OI structure 180 leaves structure 132 via interface 244 here. Total ATcc light consists of ARcc light and any AEcc and ARsb light leaving CC component 184. Total ATic light leaving IS component 182, and thus structure 132, consists of ARcc light passing through component 182, any AEcc and ARsb light passing through it, and any ARis light reflected by it. Substantial parts of the ARcc light and any AEcc, ARis, and ARsb light pass through SF structure 242. Including any ARss light reflected by structure 242, A light is formed with ARcc light and any AEcc, ARss, ARis, and ARsb light normally leaving structure 242 and therefore VC region 106.

The changed-state light processing in ISCC segment 142 here is essentially the same as in OI structure 180 except that light leaving segment 142 via print area 118 in structure 180 leaves segment 142 via IF segment 254 here. See FIGS. 14b and 14c. IS segment 192 provides a principal general impact effect if the impact meets the basic TH impact criteria. The general impact effect is specifically provided in response to the excess internal pressure along IF segment 254 meeting the basic excess internal pressure criteria which implement the TH impact criteria. Total XTcc light consists of XRcc light and any XEcc and XRsb light leaving CC segment 194 in response (a) in some general OI embodiments to the general impact effect or (b) in other general OI embodiments to the general CC control signal generated in response to the effect sometimes dependent on other impact criteria also being met in those other embodiments. Total XTic light leaving IS segment 192, and thus ISCC segment 142, consists of XRcc light passing through segment 192, any XEcc and XRsb light passing through it, and any ARis light reflected by it. Substantial parts of the XRcc light and any XEcc, ARis, and XRsb light pass through SS segment 252. Including any ARss light reflected by segment 252, X light is formed with XRcc light and any XEcc, ARss, ARis, and XRsb light leaving segment 252 and hence IDVC portion 138.

Figure 15A:
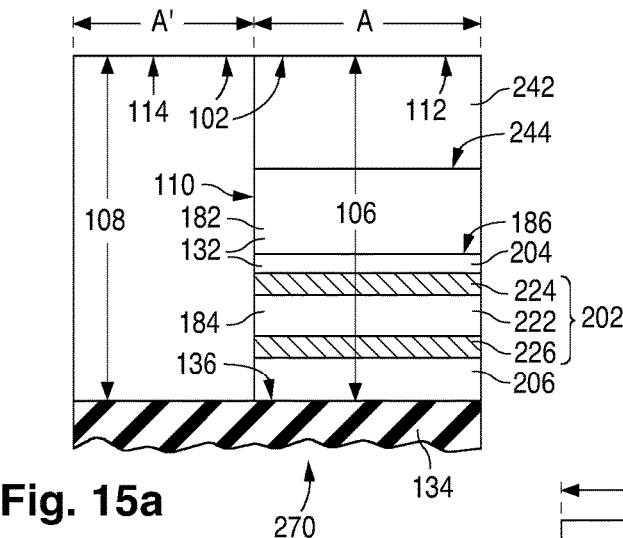
Figure 15B:
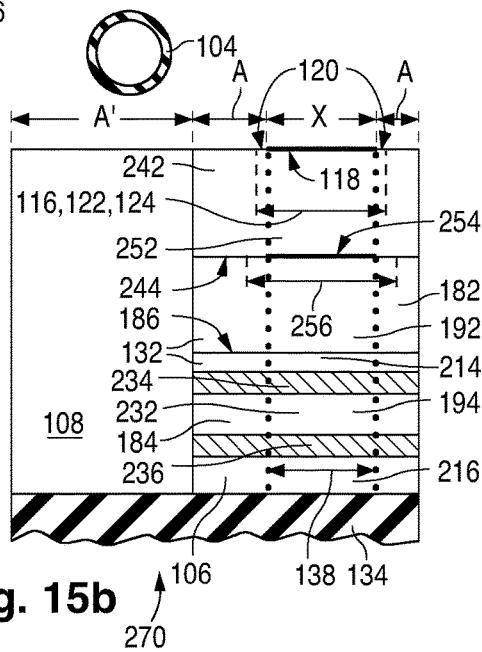
Figure 15C:
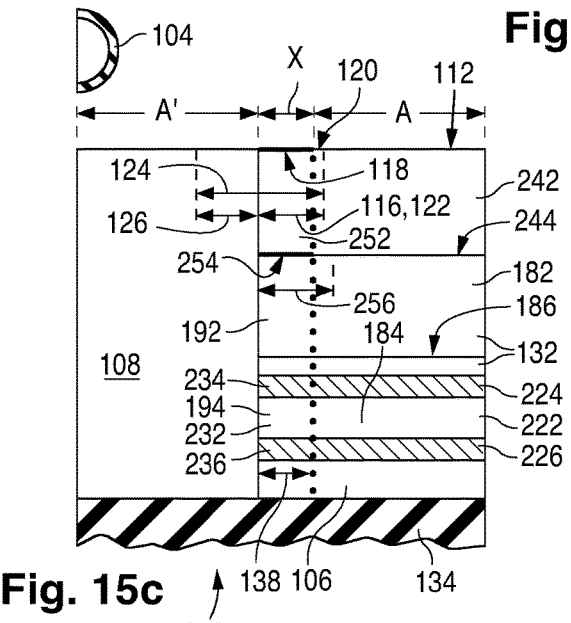

FIGS. 15a-15c (collectively "FIG. 15"), illustrate an embodiment 270 of OI structure 260 and thus of OI structure 240. OI structure 270 is also an extension of OI structure 200 to include SF structure 242. See FIG. 15a. ISCC structure 132 here is formed with IS component 182 and CC component 184 consisting of NA layer 204, NE structure 224, core layer 222, FE structure 226, and FA layer 206 configured the same as in OI structure 200. SF structure 242, which again meets component 182 along interface 244, is here configured and operable the same as in OI structure 260 and thus the same as in OI structure 240.

CC component 184 here operates the same during the normal state as in OI structure 200. Total ATcc light consists of any ARab, AEab, ARfa, AEfa, ARna, and ARsb light leaving component 184. IS component 182 here operates the same during the normal state as in structure 200 except that light leaving component 182 via SF zone 112 in structure 200 leaves component 182 via interface 244 here. Total ATic light normally leaving component 182, and thus ISCC structure 132, consists of any ARab, AEab, ARfa, AEfa, ARna, and ARsb light passing through component 182 and any ARis light reflected by it.

Substantial parts of any ARab, AEab, ARfa, AEfa, ARis, ARna, and ARsb light pass through SF structure 242. Including any ARss light normally reflected by structure 242, A light is formed with any ARab, AEab, ARfa, AEfa, ARss, ARis, ARna, and ARsb light normally leaving structure 242 and thus VC region 106. The following normal-state relationships apply here to the extent that the indicated light species are present: ARab, ARfa, and ARna light form ARcc light; ARab light consists of ARcl, ARne, and ARfe light; AEab and AEfa light form AEcc light; and AEab light consists of AEcl light.

ID segments 214, 234, 232, 236, and 216 of respective subcomponents 204, 224, 222, 226, and 206 are not labeled in FIG. 15b or 15c due to spacing limitations. See FIG. 12b or 12c for identifying segments 214, 234, 232, 236, and 216 in FIG. 15b or 15c. With reference to FIGS. 15b and 15c, IS segment 192 again provides a principal general impact effect in response to the excess internal pressure along IF segment 254 meeting the basic excess internal pressure criteria which implement the basic TH impact criteria. The changed-state light processing in CC segment 194 here is then the same as in OI structure 200. Total XTcc light consists of any XRab, XEab, XRfa, XEfa, XRna, and XRsb light leaving segment 194 in response (a) in some general OI embodiments to the general impact effect or (b) in the other general OI embodiments to the general CC control signal generated in response to the effect sometimes dependent on both the TH impact criteria and other criteria being met. The changed-state light processing in IS segment 192 here is the same as in structure 200 except that light leaving segment 192 via print area 118 in structure 200 leaves segment 192 via IF segment 254 here. Total XTic light leaving segment 192, and thus ISCC segment 142, consists of any XRab, XEab, XRfa, XEfa, XRna, and XRsb light passing through segment 192 and any ARis light reflected by it.

Substantial parts of any XRab, XEab, XRfa, XEfa, ARis, XRna, and XRsb light pass through SS segment 252. Including any ARss light reflected by segment 252, X light is formed with any XRab, XEab, ARfa, XEfa, XRss, ARis, XRna, and XRsb light normally leaving segment 252 and thus IDVC portion 138. The general CC control signal to which core layer 222 responds as VC region 106 goes to the changed state can be generated by SF structure 242, IS component 182, or a portion, e.g., NA layer 204, of CC component 184 in response to the pressure-sensitive general impact effect. The control signal can also be generated outside VC region 106. The following changed-state relationships apply here to the extent that the indicated light species are present: XRab, XRfa, and XRna light form XRcc light; XRab light consists of XRcl, XRne, and XRfe light; XEab and XEfa light form XEcc light; and XEab light consists of XEcl light.

Figure 16A:
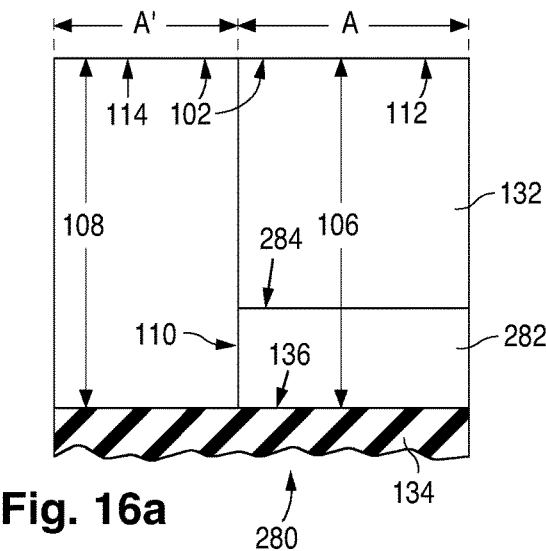
Figure 16B:
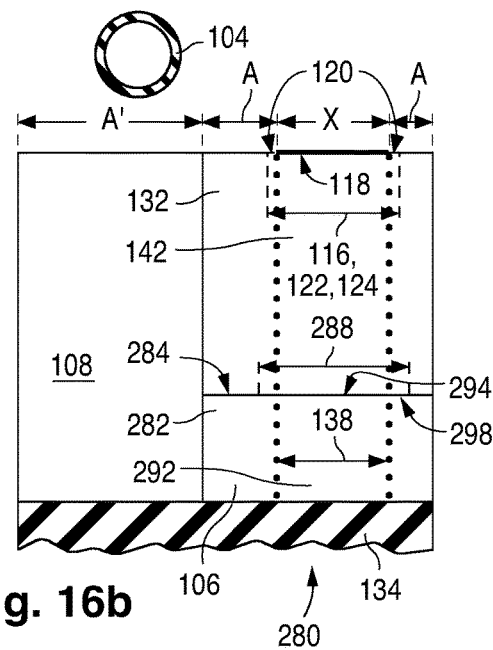
Figure 16C:
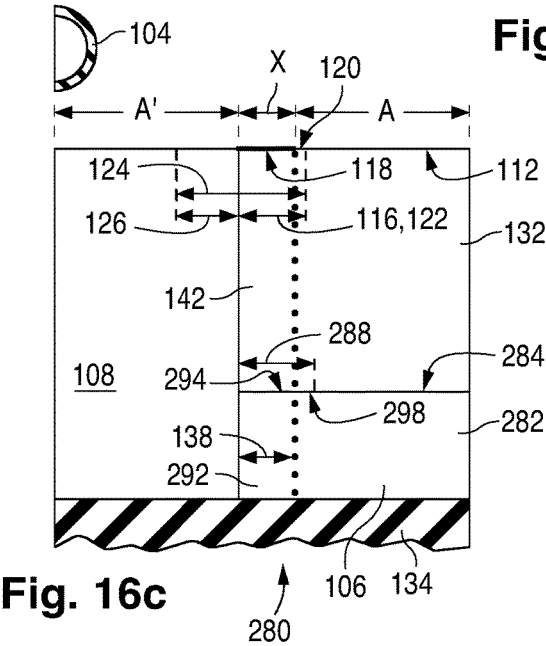

Object-impact Structure having Deformation-controlled Extended Color-change Duration FIGS. 16a-16c (collectively "FIG. 16") illustrate an extension 280 of OI structure 130 for which the duration of each temporary color change along print area 118 is extended in a pre-established deformation-controlled manner. OI structure 280 is configured the same as structure 130 except that VC region 106 here includes a principal duration-extension structure 282 extending from substructure 134 to meet ISCC structure 132 along a flat principal structure-structure interface 284 extending parallel to SF zone 112. See FIG. 16a. "DE" hereafter means duration-extension.

Light may pass through ISCC structure 132. If so, DE structure 282 may normally reflect light, termed ARde light, which leaves it via interface 284. If any light passes through structure 282 and strikes substructure 134, substructure 134 may reflect ARsb light which passes in substantial part through structure 282. The total light, termed ATde light, normally leaving structure 282 via interface 284 consists of any ARde and ARsb light. Substantial parts of any ARde and ARsb light pass through structure 132. ARic light reflected by structure 132, any AEic light emitted by it, and any ARde and ARsb light together normally leaving it, and thus VC region 106, form A light. Each of ADic light and either ARic or AEic light is once again usually a majority component, preferably a 75% majority component, more preferably a 90% majority component, of A light.

VC region 106 deforms along SF DF area 122 in response to object 104 impacting OC area 116, "DF" again meaning deformation. See FIG. 16b or 16c. Since SF zone 112 is a surface of ISCC structure 132 in OI structure 280, ISCC structure 132 directly deforms along DF area 122. If the TH impact criteria are met, i.e., if the SF deformation along area 122, specifically print area 118, meets the principal basic SF DF criteria embodying the principal basic TH impact criteria, the SF deformation causes IDVC portion 138 to temporarily appear as color X for base duration $\Delta t_{drbs}$ as the changed state begins. More particularly, ISCC segment 142 cause portion 138 to change color in response to the SF deformation if the TH impact criteria are met. Base duration $\Delta t_{drbs}$ is passively determined largely by the properties of the material in ISCC structure 132 operating in response to the SF deformation along area 122. In the absence of DE structure 282, CC duration $\Delta t_{dr}$ would be automatic value $\Delta t_{drau}$ equal to base duration $\Delta t_{drbs}$.

DE structure 282 responds to the deformation along SF DF area 122, and thus to the impact, by deforming along an ID principal internal DF area 288 of interface 284. If the TH impact criteria are met, the internal deformation of ISCC structure 132 along ID internal DF area 288, spaced apart from DF area 122 and located opposite it, causes IDVC portion 138 to further temporarily appear as color X for extension duration $\Delta t_{drext}$ so that automatic duration $\Delta t_{drau}$ is the sum of durations $\Delta t_{drbs}$ and $\Delta t_{drext}$. Subject to the TH impact criteria being met, ISCC segment 142 specifically responds to the internal deformation along DF area 288 by causing portion 138 to continue temporarily appearing as color X. Extension duration $\Delta t_{drext}$ is passively determined largely by the properties of the material in DE structure 282 and ISCC structure 132 operating in response to the internal deformation along area 288.

Also, item 292 in FIGS. 16b and 16c is the ID segment of DE structure 282 present in IDVC portion 138. Item 294 is the ID segment of interface 284 present in portion 138. ID IF segment 294 at least partly encompasses, and at least mostly outwardly conforms to, internal DF area 288. FIGS. 16b and 16c depict area 288 as being larger than segment 294 because the perimeters of area 288 and segment 294 are usually separated by a band 298 in which the deformation along interface 284 is insufficient to meet the TH impact criteria. Internal change sufficient to cause portion 138 to appear as color X occurs along segment 294 but usually not along perimeter band 298. Hence, ISCC segment 142 specifically causes portion 138 to continue its color change in response to the deformation along segment 294.

ISCC structure 132 here can be embodied in many ways including as a single material consisting of IS CR or CE material which temporarily reflects X light due to the deformation at DF areas 122 and 288 caused by the impact. The deformation along area 122 or 288 can be impact-caused compressive deformation or impact-caused vibrational deformation whose amplitude rapidly decreases largely to zero. If vibrational deformation along area 122 partly or fully causes structure 132 to temporarily reflect X light during base duration $\Delta t_{drbs}$, vibrational deformation along internal area 288 usually partly or fully causes structure 132 to temporarily reflect X light during extension duration $\Delta t_{drext}$.

ID DE segment 292 may reflect light, termed XRde light, which leaves it via IF segment 294 during the changed state. XRde light can be the same as, or significantly differ from, ARde light depending on how the light processing in IDVC portion 138 during the changed state differs from the light processing in VC region 106 during the normal state. If any light passes through DE segment 292 so as to strike substructure 134 along portion 138, substructure 134 may reflect XRsb light which passes in substantial part through segment 292. The total light, termed XTde light, temporarily leaving segment 292 via IF segment 294 consists of any XRde and XRsb light. Substantial parts of any XRde and XRsb light pass through ISCC segment 142. XRic light reflected by segment 142, any XEic light emitted by it, and any XRde and XRsb light together leaving it, and thus portion 138, form X light. Each of XDic light and either XRic or XEic light is once again usually a majority component, preferably a 75% majority component, more preferably a 90% majority component, of X light.

Figure 17A:
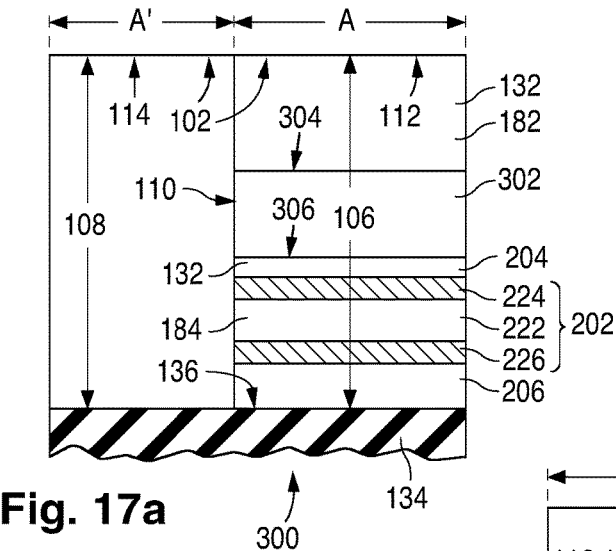
Figure 17B:
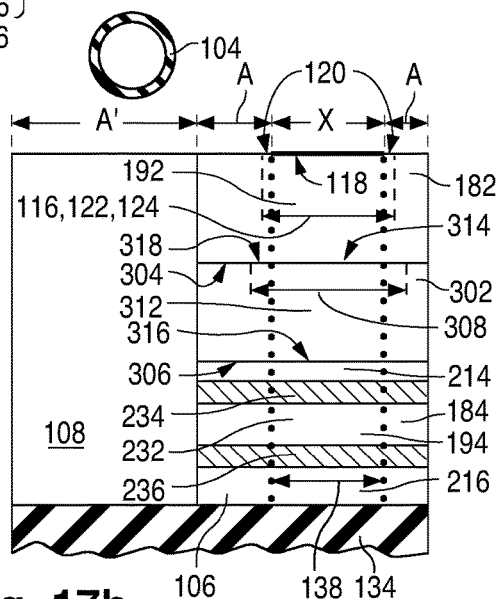
Figure 17C:
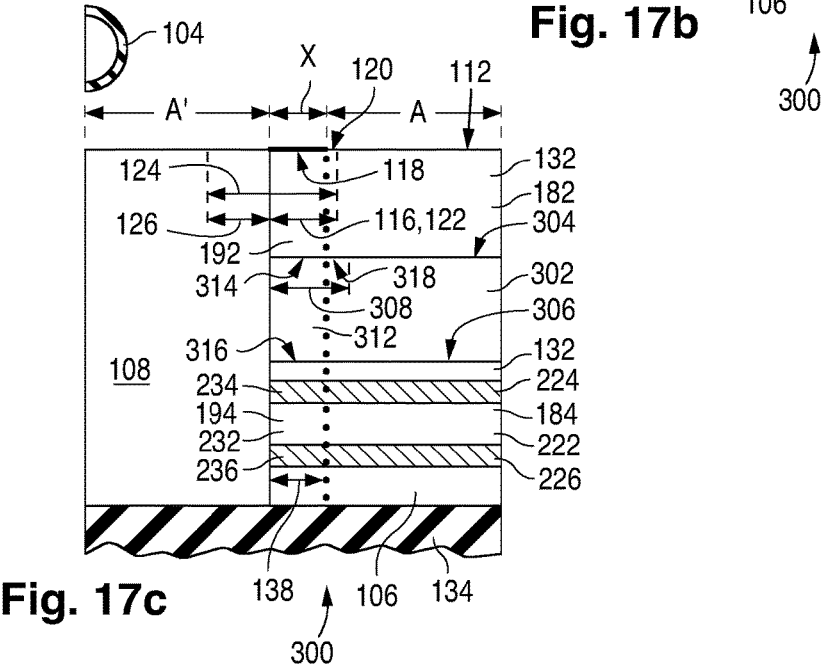

FIGS. 17a-17c (collectively "FIG. 17") illustrate an extension 300 of OI structure 200, and hence of OI structure 180, for which the duration of each color change along print area 118 is extended in a pre-established deformation-controlled manner. VC region 106 of OI structure 300 contains a principal DE structure 302 located between overlying IS component 182 and underlying CC component 184 so that they are spaced apart from each other. See FIG. 17a. Direct electrical connections between components 182 and 184 in structure 200 are generally replaced here with electrical connections passing through DE structure 302. As in OI structure 200, CC component 184 here consists of auxiliary layers 204 and 206 and assembly 202 formed with core layer 222 and electrode structures 224 and 226. DE structure 302 meets (a) IS component 182 along a flat principal near light-transmission interface 304 extending parallel to SF zone 112 and (b) CC component 184, specifically NA layer 204, along a flat principal far light-transmission interface 306 likewise extending parallel to zone 112 and thus to interface 304.

CC component 184 here operates the same during the normal state as in OI structure 200 except that light leaving component 184 via interface 186 in structure 200 leaves component 184 via interface 306 here. Total ATcc light consists of ARcc light reflected by component 184, any AEcc light emitted by it, and any ARsb light passing through it. The following normal-state relationships again apply to the extent that the indicated light species are present: ARab, ARfa, and ARna light form ARcc light; ARab light consists of ARcl, ARne, and ARfe light; AEab and AEfa light form AEcc light; and AEab light consists of AEcl light.

Substantial parts of the ARcc light and any AEcc and ARsb light pass through DE structure 302. Structure 302 may normally reflect ARde light. Total ATde light leaving structure 302 via interface 304 consists of ARcc light and any AEcc, ARde, and ARsb light. Substantial parts of the ARcc light and any AEcc, ARde, and ARsb light pass through IS component 182. Including any ARis light reflected by component 182, A light is formed with ARcc light and any AEcc, ARis, ARde, and ARsb light normally leaving component 182 and thus VC region 106. Even though components 182 and 184 are spaced apart from each other here, ADcc light and any ARis light still form ADic light consisting of ARic light and any AEic light for which ARic light is formed with ARcc light and any ARis light while AEic light is formed with any AEcc light. Each of ADcc light and either ARcc or AEcc light is again usually a majority component, preferably a 75% majority component, more preferably a 90% majority component, of each of A and ADic light.

IS component 182 deforms along SF DF area 122 in response to the impact. See FIG. 17b or 17c. If the TH impact criteria are met, i.e., if the deformation along area 122, specifically print area 118, meets the principal basic SF DF criteria embodying the principal basic TH impact criteria, component 182, largely IS segment 192, provides the general impact effect, termed the principal general first impact effect. CC segment 194 responds to the principal general first impact effect by causing IDVC portion 138 to temporarily appear as color X for base duration $\Delta t_{drbs}$, thereby beginning the changed state. Duration $\Delta t_{drbs}$ is passively determined largely by the properties of (a) the material in component 182 operating in response to the SF deformation along SF DF area 122 and (b) the material in CC component 184 operating in response to the first general impact effect.

DE structure 302 responds to the deformation along SF DF area 122, and thus to the impact, by deforming along an ID principal internal DF area 308 of interface 304. Since interface 304 is also a surface of IS component 182, the deformation of structure 302 along ID internal DF area 308, spaced apart from SF DF area 122 and located opposite it, causes component 182 to deform along area 308. If the TH impact criteria are met, component 182, again largely IS segment 192, responds to the internal deformation along area 308 by providing another impact effect, termed the principal general second impact effect, slightly after providing the first general impact effect. CC segment 194 responds to the principal general second impact effect by causing IDVC portion 138 to further temporarily appear as color X for extension duration $\Delta t_{drext}$. Automatic duration is again $\Delta t_{drau}$ extended from base duration $\Delta t_{drbs}$ to the sum of durations $\Delta t_{drbs}$ and $\Delta t_{drext}$. Duration $\Delta t_{drext}$ is passively determined largely by the properties of (a) the material in structure 302 and IS component 182 operating in response to the internal deformation along area 308 and/or (b) the material in CC component 184 operating in response to the second general impact effect.

Also, item 312 in FIGS. 17b and 17c is the ID segment of DE structure 302 present in IDVC portion 138. Items 314 and 316 respectively are the ID segments of interfaces 304 and 306 present in portion 138. ID IF segment 314 at least partly laterally encompasses, and at least mostly outwardly conforms to, internal DF area 308. FIGS. 17b and 17c depict area 308 as being larger than IF segment 314 because the perimeters of area 308 and segment 314 are usually separated by a band 318 in which the deformation along interface 304 is insufficient to meet the TH impact criteria. Internal change sufficient to cause portion 138 to appear as color X occurs along segment 314 but usually not along perimeter band 318. Accordingly, ISCC segment 142 specifically causes portion 138 to continue its color change in response to the deformation along segment 314.

Each general impact effect provided by IS segment 192 is typically an electrical effect consisting of one or more electrical signals supplied to CC segment 194 via one or more of the above-mentioned electrical connections through DE structure 302. The deformation along DF area 122 or 308 can be impact-caused compressive deformation or impact-caused vibrational deformation whose amplitude eventually decreases largely to zero.

The changed-state light processing in CC segment 194 here is the same as in OI structure 200 except that light leaving segment 194 via IF segment 196 in structure 200 leaves it via ID IF segment 316 here. Total XTcc light consists of XRcc light reflected by CC segment 194, any XEcc light emitted by it, and any XRsb light passing through it. The following changed-state relationships again apply to the extent that the indicated light species are present: XRab, XRfa, and XRna light form XRcc light; XRab light consists of XRcl, XRne, and XRfe light; XEab and XEfa light form XEcc light; and XEab light consists of XEcl light.

Substantial parts of the XRcc light and any XEcc and XRsb light pass through ID DE segment 312. If ARde light is reflected by DE structure 302 during the normal state, segment 312 reflects ARde light during the changed state. Total XTde light leaving segment 312 via IF segment 314 consists of XRcc light and any XEcc, ARde, and XRsb light. Substantial parts of the XRcc light and any XEcc, ARde, and XRsb light pass through IS segment 192. Including any ARis light reflected by segment 192, X light is formed with XRcc light and any XEcc, ARis, ARde, and XRsb light leaving segment 192 and thus IDVC portion 138. The changed-state light processing is the same during both of durations $\Delta t_{drbs}$ and $\Delta t_{drext}$.

Additionally, XDcc light and any ARis light still form XDic light consisting of XRic light and any XEic light for which XRic light is formed with XRcc light and any ARis light while XEic light is formed with any XEcc light. Each of XDcc light and either XRcc or XEcc light is again usually a majority component, preferably a 75% majority component, more preferably a 90% majority component, of each of X and XDic light.

Figure 18A:
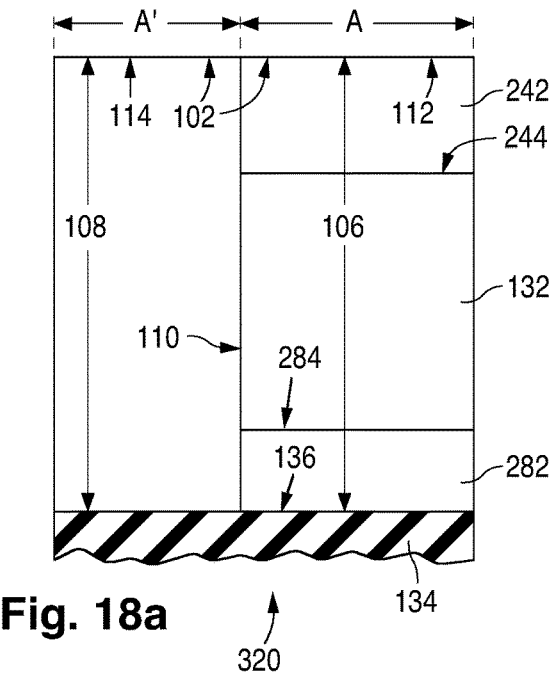
Figure 18B:
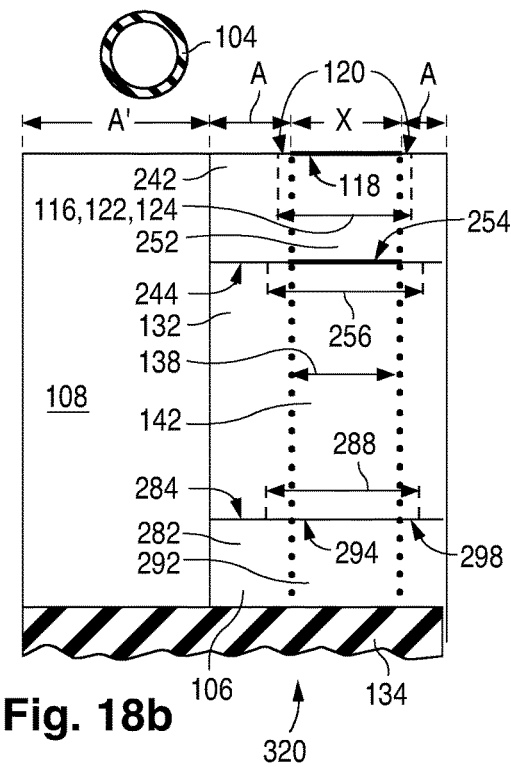
Figure 18C:
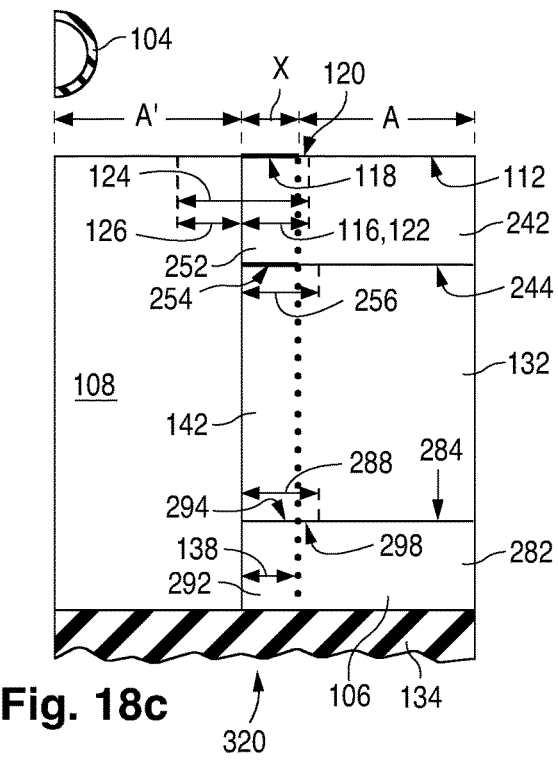

FIGS. 18a-18c (collectively "FIG. 18") illustrate an extension 320 of both OI structure 240 and OI structure 280. OI structure 320 is configured the same as structure 280 except that VC region 106 here contains SF structure 242 extending from SF zone 112 to ISCC structure 132 to meet it along interface 244. See FIG. 18a. Structure 242 here is configured and operable the same as in OI structure 240.

ISCC structure 132 and DE structure 282 here operate the same during the normal state as in OI structure 280 except that light leaving ISCC structure 132 via SF zone 112 in OI structure 280 leaves structure 132 via interface 244 here. Total ATic light consists of ARic light reflected by structure 132, any AEic light emitted by it, and any ARde and ARsb light passing through it. Substantial parts of the ARic light and any AEic, ARde, and ARsb light pass through SF structure 242. Including any ARss light normally reflected by structure 242, A light is formed with ARic light and any AEic, ARss, ARde and ARsb light normally leaving structure 242 and thus VC region 106. Again, each of ADic light and either ARic or AEic light is usually a majority component, preferably a 75% majority component, more preferably a 90% majority component, of A light.

SF structure 242 here deforms along SF DF area 122 in response to the impact. See FIG. 18b or 18c. The impact also creates excess SF pressure along OC area 116. The excess SF pressure is transmitted through structure 242 to produce excess internal pressure along DP IF area 256, causing it to deform. Because interface 244 is a surface of ISCC structure 132 here, structure 132 deforms along area 256. If the TH impact criteria are met, i.e., if the internal deformation along area 256, specifically IF segment 254, meets principal basic internal DF criteria embodying the principal basic TH impact criteria, the internal deformation causes IDVC portion 138 to temporarily appear as color X for base duration $\Delta t_{drbs}$ as the changed state begins. More particularly, ISCC segment 142 responds to the internal deformation along area 256, and thus to the impact-caused SF deformation along area 122, by causing portion 138 to begin temporarily appearing as color X if the TH impact criteria are met. Duration $\Delta t_{drbs}$ is passively determined largely by the properties of the material in SF structure 242 and ISCC structure 132 operating in response to the internal deformation along area 256.

DE structure 282 here responds to the internal deformation along DP IF area 256 by deforming along internal DF area 288 of interface 284. Since interface 284 is a surface of ISCC structure 132, the deformation of DE structure 282 along area 288 causes ISCC structure 132 to deform along area 288. If the TH impact criteria are met, the internal deformation of structure 132 along area 288, specifically IF segment 294, causes IDVC portion 138 to further temporarily appear as color X for extension duration $\Delta t_{drext}$. Subject to the TH impact criteria being met, ISCC segment 142 specifically responds to the internal deformation along area 288, and thus to the impact, by causing portion 138 to continue temporarily appearing as color X. Automatic duration $\Delta t_{drau}$ lengthens to $\Delta t_{drbs}+\Delta t_{drext}$. Duration $\Delta t_{drext}$ is passively determined largely by the properties of the material in SF structure 242 and ISCC structure 132 operating in response to the internal deformation along area 288. Internal change sufficient to cause portion 138 to appear as color X again occurs along IF segment 294 but usually not along perimeter band 298 where the deformation is insufficient to meet the TH impact criteria. Consequently, ISCC segment 142 specifically causes portion 138 to continue its color change in response to the deformation along segment 294.

The changed-state light processing in ISCC segment 142 and DE segment 292 here is the same as in OI structure 280 except that light leaving ISCC segment 142 via print area 118 in structure 280 leaves segment 142 via IF segment 254 here. Total XTic light consists of XRic light reflected by ISCC segment 142, any XEic light emitted by it, and any XRde and XRsb light passing through it. Substantial parts of the XRic light and any XEic, XRde, and XRsb light pass through SS segment 252. Including any ARss light reflected by segment 252, X light is formed with XRic light and any XEic, ARss, XRde and XRsb light temporarily leaving segment 252 and thus IDVC portion 138. Again, each of XDic light and either XRic or XEic light is usually a majority component, preferably a 75% majority component, more preferably a 90% majority component, of X light.

FIGS. 19a-19c (collectively "FIG. 19") illustrate an extension 330 of both OI structure 270 and OI structure 300. OI structure 330 is configured and operable the same as structure 300 except that VC region 106 here contains SF structure 242 extending from SF zone 112 to ISCC structure 132 to meet it, specifically IS component 182, along interface 244. See FIG. 19a. SF structure 242 here is configured and operable the same as in OI structure 270 and thus the same as in OI structure 240.

IS component 182, DE structure 302, and CC component 184 here operate the same during the normal state as in OI structure 300 except that light leaving IS component 182 via SF zone 112 in structure 300 leaves component 182 via interface 244 here. Total ATcc light consists of ARcc light reflected by CC component 184, any AEcc light emitted by it, and any ARsb light passing through it. Total ATic light leaving IS component 182, and therefore ISCC structure 132, consists of ARcc light passing through component 182 and DE structure 302, any AEcc and ARsb light passing through component 182 and structure 302, any ARde light passing through component 182, and any ARis light reflected by it. Substantial parts of the ARcc light and any AEcc, ARis, ARde, and ARsb light pass through SF structure 242. Including any ARss light reflected by structure 242, A light is formed with ARcc light and any AEcc, ARss, ARis, ARde, and ARsb light normally leaving structure 242 and thus VC region 106. Each of ADcc light and either ARcc or AEcc light is once again usually a majority component, preferably a 75% majority component, more preferably a 90% majority component, of each of A and ADic light.

SF structure 242 here deforms along SF DF area 122 in response to the impact. See FIG. 19b or 19c. The attendant excess SF pressure along OC area 116 is transmitted through structure 242 to produce excess internal pressure along DP IF area 256, causing it to deform. Because interface 244 is a surface of IS component 182 here, it deforms along area 256. If the TH impact criteria are met, i.e., if the internal deformation along area 256, specifically IF segment 254, meets principal basic internal DF criteria embodying the principal basic TH impact criteria, component 182, likewise largely IS segment 192, provides the general impact effect, again termed the principal general first impact effect. CC segment 194 responds to the principal general first impact effect by causing IDVC portion 138 to temporarily appear as color X for base duration $\Delta t_{drbs}$, thereby beginning the changed state. Duration $\Delta t_{drbs}$ is passively determined largely by the properties of (a) the material in structure 242 and component 182 operating in response to the internal deformation along area 256 and (b) the material in CC component 184 operating in response to the first general impact effect.

DE structure 302 here responds to the internal deformation along DP IF area 256 by deforming along internal DF area 308 of interface 304. Because interface 304 is a surface of IS component 182, the deformation of structure 302 along area 308 causes component 182 to deform. If the TH impact criteria are met, component 182, largely IS segment 192, provides another impact effect, again termed the principal general second impact effect. CC segment 194 responds to the principal general second impact effect by further temporarily appearing as color X for extension duration $\Delta t_{drext}$. Automatic duration $\Delta t_{drau}$ is again lengthened to $\Delta t_{drbs}$+$\Delta t_{drext}$. Duration $\Delta t_{drext}$ is passively determined by the properties of (a) the material in structure 302 and component 182 operating in response to the internal deformation along area 308 and/or (b) the material in CC component 184 operating in response to the second general impact effect. Internal change sufficient to cause IDVC portion 138 to appear as color X again occurs along IF segment 314 but usually not along perimeter band 318 where the deformation is insufficient to meet the TH impact criteria. Hence, ISCC segment 142 specifically causes portion 138 to continue its color change in response to the deformation along segment 314.

The changed-state light processing in IS segment 192, DE segment 312, and CC segment 194 here is the same as in OI structure 300 except that light leaving IS segment 192 via print area 118 in structure 300 leaves segment 192 via IF segment 254 here. Total XTcc light consists of XRcc light reflected by CC segment 194, any XEcc light emitted by it, and any XRsb light passing through it. Total XTic light leaving IS segment 192, and thus ISCC segment 142, consists of XRcc light passing through IS segment 192 and DE segment 312, any XEcc and XRsb light passing through segments 192 and 312, any ARde light passing through IS segment 192, and any ARis light reflected by it. Substantial parts of the XRcc light and any XEcc, ARis, ARde, and XRsb light pass through SS segment 252. Including any ARss light reflected by segment 252, X light is formed with XRcc light and any XEcc, ARss, ARis, ARde and XRsb light temporarily leaving segment 252 and therefore IDVC portion 138. Each of XDcc light and either XRcc or XEcc light is once again usually a majority component, preferably a 75% majority component, more preferably a 90% majority component, of each of X and XDic light.

Equation-form Summary of Light Relationships

Given below is an equation-form summary of the potential light relationships along SF zone 112 during the normal and changed states for an embodiment of OI structure 100 in which VC region 106 contains (a) ISCC structure 132 formed with IS component 182 and CC component 184 consisting of NA layer 204, FA layer 206, and assembly 202 consisting of subcomponents 222, 224, and 226, (b) possibly SF structure 242, and (c) possibly DE structure 282 or 302 where the alphabetic notation used in these equations means the light described above using the same notation, e.g., "A" and "XDcc" in the equations respectively mean A light and XDcc light and where "XRde/ARde" means "XRde" for DE segment 292 and "ARde" for DE segment 312. Each term in these equations is the normalized spectral radiosity for the light species identified by that term. Light absorption by a region, e.g., SF structure 242 or SS segment 252, situated between ISCC structure 132 and zone 112 is ignored with regard to emitted light.

I. Equations for Normal State:
SF structure 242, DE structure 282 or 302, ISCC structure 132, and substructure 134:

$$A = ARss + ARde + ADic + ARsb \quad (B1)$$

where ADic=ARic+AEic
ISCC structure 132 consisting of IS component 182 and CC component 184:

$$ADic = ARis + ADcc \quad (B2)$$

where ADcc=ARcc+AEcc
SF structure 242, IS component 182, DE structure 282 or 302, CC component 184, and substructure 134:

$$A = ARss + ARis + ARde + ADcc + ARsb \quad (B3)$$

CC component 184 consisting of NA layer 204, assembly 202, and FA layer 206:

$$ADcc = ARna + ADab + ADfa \quad (B4)$$

where ADab=ARab+AEab, and ADfa=ARfa+AEfa
Assembly 202 consisting of NE structure 224, core layer 222, and FE structure 226:

$$ADab = ARab + AEab = ARne + ADcl + ARfe \quad (B5)$$

where ARab=ARne+ARcl+ARfe, AEab=AEcl, and ADcl=ARcl+AEcl
Combination of normal-state equations:

$$A = ARss + ARde + ARis + ARna + ARne + ARcl + AEcl + ARfe + ARfa + AEfa + ARsb \quad (B6)$$

II. Equations for Changed State:

SS segment 252, DE segment 292 or 312, ISCC segment 142, and segment of substructure 134 along IDVC portion 138:

$$X = ARss + XRde/ARde + XDic + XRsb \quad (B7)$$

where XDic=XRic+XEic

ISCC segment 142 consisting of IS segment 192 and CC segment 194:

$$XDic = ARis + XIDcc \quad (B8)$$

where XDcc=XRcc+XEcc

SS segment 252, IS segment 192, DE segment 292 or 312, CC segment 194, and segment of substructure 134 along IDVC portion 138:

$$X = ARss + ARis + XRde/ARde + XIDcc + XRsb \quad (B9)$$

CC segment 194 consisting of NA segment 214, AB segment 212, and FA segment 216:

$$XDcc = XRna + XDab + XDfa \quad (B10)$$

where XDab=XRab+XEab, and XDfa=XRfa+XEfa

AB segment 212 consisting of NE segment 234, core segment 232, and FE segment 236:

$$XDab = XRab + XEab = XRne + XDcl + XRfe \quad (B11)$$

where XRab=XRne+XRcl+XRfe, XEab=XEcl, and XDcl=XRcl+XEcl

Combination of changed-state equations:

$$X = ARss + XRde/ARde + ARis + XRna + XRne + XRcl + XEcl + XRfe + XRfa + XEfa + XRsb \quad (B12)$$

Light not present in an embodiment of OI structure 100 is to be deleted from these equations in particularizing them to that embodiment. The radiosities of ARss, ARis, ARde, ARna, ARne, ARfe, ARsb, XRna, XRne, XRfe, and XRsb light are preferably as low as feasible. This provides flexibility in choosing colors A and X and their components. The radiosities of these eleven light species can variously be set to zero so as to correspondingly eliminate them from the above equations and the description of OI structure 100 and its embodiments to provide simplifying approximations for design purposes.

Transmissivity Specifications

The transmissivity (or transmittance) of (a) SF structure 242 (if present) at one or more thickness locations along it to light incident perpendicularly on SF zone 112 at at least wavelengths of ADic and XDic light for them respectively being majority components of A and X light, (b) IS component 182 at one or more thickness locations along it to light incident perpendicularly on zone 112 at at least wavelengths of ADcc and XDcc light for them respectively being majority components of A and X light, (c) DE structure 302 (if present) at one or more thickness locations along it to light incident perpendicularly on zone 112 at at least wavelengths of ADab, ADfa, XDab, and XDfa to the extent present for either ADab or ADfa light being a majority component of A light and for either XDab or XDfa light being a majority component of X light, (d) NA layer 204 (if present) at one or more thickness locations along it to light incident perpendicularly on zone 112 at at least wavelengths of ADab, ADfa, XDab, and XDfa light to the extent present for either ADab or ADfa light being a majority component of A light and for either XDab or XDfa light being a majority component of X light, and (e) NE structure 224 at one or more thickness locations along it to light incident perpendicularly on zone 112 at at least wavelengths of ADcl, ADfa, XDcl, and XDfa light to the extent present for either ADcl or ADfa light being a majority component of A light and for either XDcl or XDfa light being a majority component of X light is usually at least 40%, preferably at least 60%, more preferably at least 80%, even more preferably at least 90%, yet further preferably at least 95%.

The composite transmissivity of (a) the combination of SF structure 242 (if present) and IS component 182 at one or more thickness locations along that combination to light incident perpendicularly on SF zone 112 at at least wavelengths of ADcc and XDcc light, (b) the combination of structure 242 (if present), component 182, and DE structure 302 (if present) at one or more thickness locations along that combination to light incident perpendicularly on zone 112 at at least wavelengths of ADab, ADfa, XDab, and XDfa light to the extent present, (c) the combination of structure 242 (if present), component 182, and NA layer 204 (if present) at one or more thickness locations along that combination to light incident perpendicularly on zone 112 at at least wavelengths of ADab, ADfa, XDab, and XDfa light to the extent present, and (d) the combination of structure 242 (if present), component 182, layer 204 (if present), and NE structure 224 at one or more thickness locations along that combination to light incident perpendicularly on zone 112 at at least wavelengths of ADcl, ADfa, XDcl, and XDfa light to the extent present is usually at least 30%, preferably at least 50%, more preferably at least 70%, even more preferably at least 80%, yet further preferably at least 90%.

Some of the present OI structures may be embodied to allow light to pass through one or more thickness locations of assembly 202 at certain times but not at other times during regular operation. Light then passes through one or more corresponding thickness locations of core layer 222 and FE structure 226 at certain times but not at other times. When such an assembly or core/FE-structure thickness location is light transmissive, the transmissivity of each of assembly 202, layer 222, and structure 226 to light incident perpendicularly on SF zone 112 at at least wavelengths of ADfa and XDfa light for either ARfa or ARfe light being a majority component of A light and for either XRfa or XRfe light being a majority component of X light is usually at least 60%, preferably at least 70%, more preferably at least 80%, even more preferably at least 90%, yet further preferably at least 95%, along that thickness location. The composite transmissivity of the combination of SF structure 242 (if present), IS component 182, NA layer 204 (if present), and assembly 202 or the combination of structure 242 (if present), component 182, layer 204 (if present), NE structure 224, core layer 222, and FE structure 226 to light incident perpendicularly on zone 112 at at least wavelengths of ADfa and XDfa light is usually at least 30%, preferably at least 50%, more preferably at least 70%, even more preferably at least 80%, yet further preferably at least 90%, along such an assembly or core thickness location when it is light transmissive.

Each component of each of the preceding light species for which a transmissivity specification is given above also meets that transmissivity specification.

Manufacture of Object-impact Structure

OI structure 100, including each embodiment 130, 180, 200, 240, 260, 270, 280, 300, 320, or 330, can be manufactured in various ways. In one manufacturing process, the materials of VC region 106 and FC region 108 are deposited on substructure 134. In another manufacturing process, the material of one of color regions 106 and 108 is deposited on substructure 134, and the other of regions 106 and 108 is formed separately and then attached to substructure 134. In a further manufacturing process, regions 106 and 108 are formed separately and later attached to substructure 134.

Where feasible, the materials of regions 106 and 108 consist of polymer in order to provide them with impact resistance and bending flexibility.

In each manufacturing process where color region 106 or 108 is formed separately, region 106 or 108 may be fabricated as a relatively rigid structure or as a significantly bendable structure capable of, e.g., being rolled on substructure 134. In each manufacturing process where VC region 106 consists of two or more subregions, such as components 182 and 184, one of the subregions is typically initially fabricated. Each other subregion is then typically formed over the initially fabricated subregion.

Figure 20A:
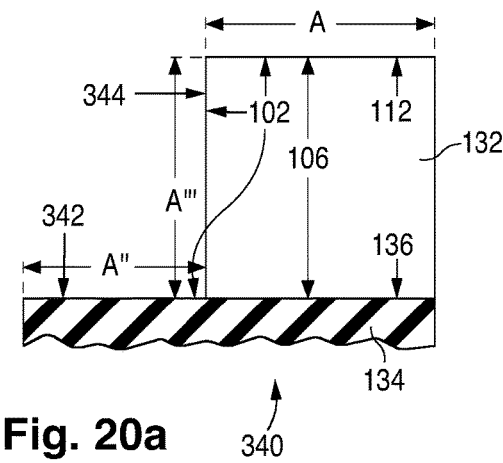
FIGS. 20a and 20b and 21a and 21b are respective cross-sectional side views of two variations of the OI structure of FIGS. 5a-5c according to the invention. The cross sections of FIGS. 20a and 20b are respectively taken through planes a1-a1 and b1-b1 in FIGS. 5a and 5b subject to deletion of the fixed-color region in the OI structure of FIGS. 5a and 5b. The same applies to FIGS. 21a and 21b.
Figure 20B:
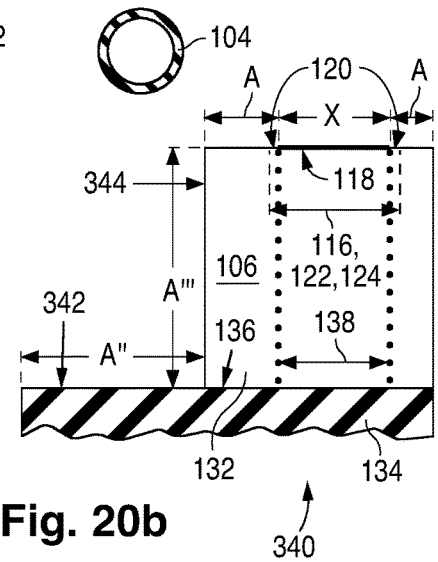

FIGS. 20a and 20b present side cross sections of a more easily manufacturable variation 340 of OI structure 100. OI structure 340 is configured the same as OI structure 130 except that structure 340 lacks FC region 108. Instead, OI substructure 134 is externally exposed to the side(s) of VC region 106. The absence of region 108 in structure 340 enables it to be manufactured more easily than structure 100.

The surface of the exposed portion of substructure 134 is indicated as item 342 and is termed the exposed substructure SF zone. Due to the absence of FC region 108, VC region 106 is externally exposed along a principal side SF zone 344 extending from VC SF zone 112 to exposed substructure SF zone 342. Side SF zone 344 is shown in FIGS. 20a and 20b as being flat and extending perpendicular to SF zones 112 and 342. However, zone 344 can be significantly curved. Also, even if zone 344 is flat, it can extend significantly non-perpendicular to zones 112 and 342. Zones 112, 342, and 344 form surface 102 here.

Substructure 134 appears along substructure SF zone 342 as a substructure color A". VC region 106 appears alongside SF zone 344 as a side color A'". Each color A" or A'" is often the same as, but can differ significantly from, color A. If region 106 consists of multiple subregions extending to zone 344, color A'" can be a group of different colors. Alternatively, region 106 may include a generally homogeneous layer (not shown) whose outer surface largely forms zone 344 so that color A'" is usually a single color often the same as color A.

VC region 106 here operates the same as in OI structure 130. FIG. 20a, corresponding to FIG. 6a, shows how OI structure 340 normally appears. FIG. 20b, corresponding to FIG. 6b, presents an example in which object 104 contacts surface 102 fully within SF zone 112.

Figure 21A:
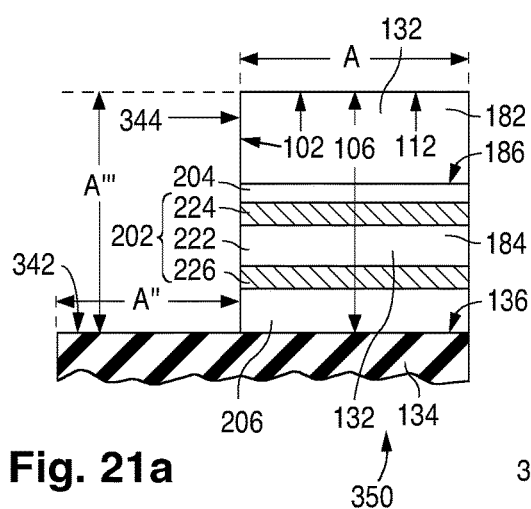
Figure 21B:
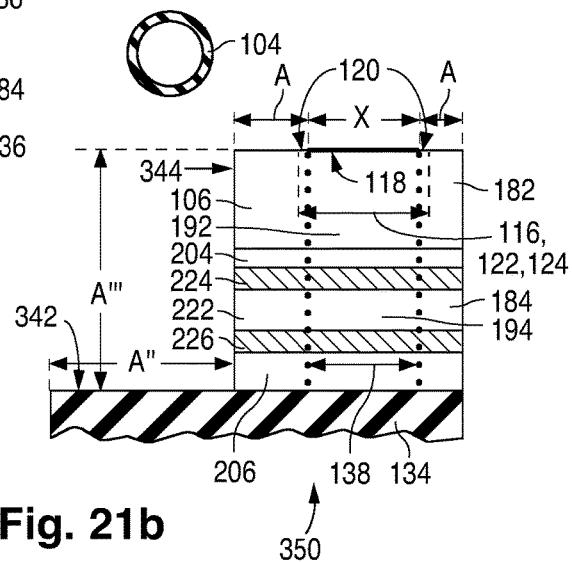

FIGS. 21a and 21b present side cross sections of an embodiment 350 of OI structure 340 and thus a more easily manufacturable variation of OI structure 100. ISCC structure 132 here consists of IS component 182 and CC component 184 formed with auxiliary layers 204 and 206 and assembly 202 consisting of subcomponents 224, 222, and 226 arranged as in OI structure 200.

VC region 106 here operates the same as in OI structure 200. FIG. 21a, corresponding to FIG. 12a, shows how OI structure 350 normally appears. FIG. 21b, corresponding to FIG. 12b, presents an example in which object 104 contacts surface 102 fully within SF zone 112. ID segments 214, 234, 232, 236, and 216 of respective subcomponents 204, 224, 222, 226, and 206 are not labeled in FIG. 21b due to spacing limitations. See FIG. 12b for identifying segments 214, 234, 232, 236, and 216 in FIG. 21b.

Analogous to OI structures 340 and 350, other more easily manufacturable variations of OI structure 100 are configured the same as OI structures 180, 200, 240, 260, 270, 280, 300, 320, and 330 except that each of these other variations lacks FC region 108. VC region 106 in each such variation of structure 180, 200, 240, 260, 270, 280, 300, 320, or 330 operates the same as in that OI structure. Structures 340 and 350 and these other variations of structure 100 are suitable for applications in which region 106 is sufficiently thin that the distance from SF zone 112 to substructure SF zone 342 does not significantly affect structure usage.

A wedge is optionally placed alongside SF zone 344 to produce a relatively gradual transition from SF zone 112 to substructure SF zone 342 if the distance from zone 112 to zone 342 would detrimentally affect structure usage. The wedge dimension along zone 342 usually exceeds the wedge dimension along zone 344. The wedge can be of roughly right triangular cross section with the longest surface extending approximately from zone 342 to the intersection of zones 112 and 344. The wedge can be truncated slightly where the longest surface would otherwise meet zone 342.

A removable protective cover can be placed over SF zone 112 of each of OI structures 180, 200, 240, 260, 270, 280, 300, 320, 330, 340, and 350, including the wedge-containing variations, when that OI structure is not in use for reducing damage that it would otherwise incur if not so protected. The protective cover is removed before the OI structure is used and reinstalled after use is completed.

If the protective cover could be a safety risk, each OI structure 180, 200, 240, 260, 270, 280, 300, 320, or 330 is mounted in a cavity along surface 102 so that the exposed surface of the cover is approximately coplanar with surface 102 along the cavity opening. SF zone 112 then lies below the cavity opening at least when the OI structure is not in use. Although zone 112 can remain below the cavity opening when the OI structure is in use, the OI structure is preferably provided with apparatus, usually located at least partly along substructure 134, for enabling the OI structure to be moved toward the cavity opening so that zone 112 is approximately coplanar with surface 102 along the cavity opening when the OI structure is in use. The cover is removed shortly before or after the movement is performed. After usage is complete, the OI structure is returned to the cavity, and the cover is reinstalled over the OI structure.

Object-impact Structure with Print Area at Least Partly Around Unchanged Area

FIGS. 5b and 5c present, as described above, examples of object 104 impacting OC area 116 in OI structure 100 such that print area 118 consists of the area within perimeter band 120. In contrast, FIGS. 22a and 22b depict what occurs along surface 102 of structure 100 when object 104 contacts surface 102 such that area 118 lies at least partly around a generally unchanged area 360 of SF zone 112. Area 118 in FIGS. 22a and 22b has an outer perimeter and an inner perimeter relative to the area's center. VC region 106 appears along unchanged area 360 as color A, rather than as color X, when the IDVC portion (138) temporarily appears as color X.

Unchanged area 360 can arise due to various phenomena such as the shape of object 104, the momentum with which it impacts SF zone 112, and deformation that it may undergo in impacting zone 112. If object 104 has a depression along its outer surface at the location where it contacts zone 112, area 360 can arise if the momentum of the impact is insufficient to cause the entire surface of the depression to contact zone 112 with sufficient force to meet the principal TH impact criteria. Deformation incurred by object 104 in impacting zone 112 can be of such a nature as to result in area 360.

FIG. 22a, analogous to FIG. 5b, presents an example in which object 104 impacts surface 102 fully within VC SF zone 112. Print area 118 in FIG. 22a fully surrounds unchanged area 360 and is shaped like a fully annular band.

Area 118 in FIG. 22a thus fully outwardly conforms to OC area 116 but does not fully inwardly conform to it. Areas 116 and 118 are, nonetheless, largely concentric.

FIG. 22b, analogous to FIG. 5c, presents an example in which object 104 contacts surface 102 partly within VC SF zone 112 and partly within FC SF zone 114 in the same impact. In this example, print area 118 lies partly around unchanged area 360 and is shaped like a partially annular band. With OC area 116 extending along part of the SF edge of interface 110 here, print area 118 extends along only a fraction of that SF edge interface part. Area 118 in FIG. 22b outwardly conforms mostly, but not fully, to OC area 116 and does not inwardly conform mostly to it. Areas 116 and 118 here are largely concentric.

Figure 23A:
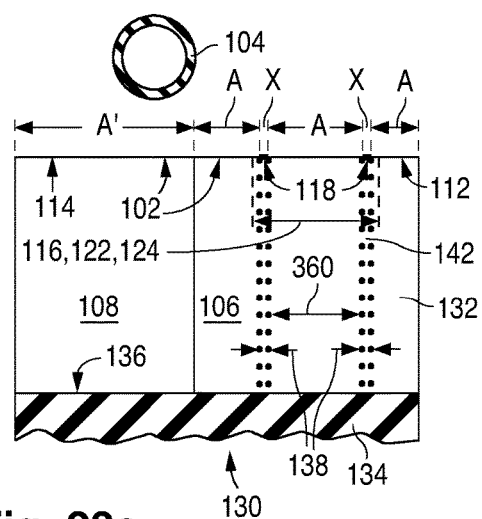
FIGS. 23a and 23b are cross-sectional side views of the embodiment of the OI structures of FIGS. 6a-6c for the impact conditions respectively represented in FIGS. 22a and 22b. The cross sections of FIGS. 23a and 23b are respectively taken through planes a2-a2 and b2-b2 in FIGS. 22a and 22b.
Figure 23B:
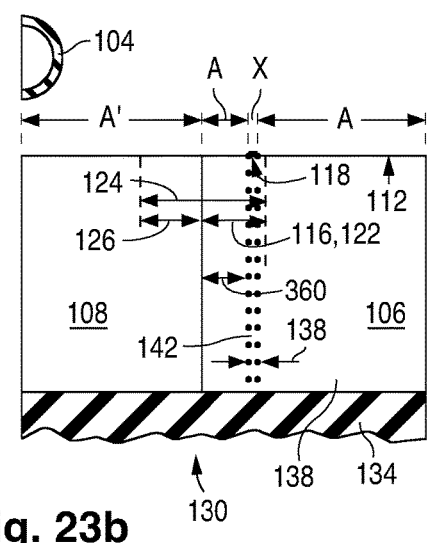

FIGS. 23a and 23b respectively corresponding to FIGS. 22a and 22b are side cross sections illustrating what occurs in embodiment 130 of OI structure 100 when object 104 contacts surface 102 so that print area 118 lies at least partly around unchanged area 360 of VC SF zone 112. The presence of area 360 causes IDVC portion 138 to have a shape matching that of print area 118. Hence, portion 138 is shaped like a full hollow cylinder in FIG. 23a and like a partial hollow cylinder in FIGS. 23b. Each of OC areas 116 and 124 and SF DF area 122 is shaped like a fully annular band in FIG. 23a. In FIGS. 23b, each of areas 116 and 122 and OC area 126 is shaped like a partially annular band while total OC area 124 is shaped like a fully annular band. Portion 138 and areas 116, 122, and 124 and, when present, area 126 have the same shapes in embodiments 180, 200, 240, 260, 270, 280, 300, 320, and 330 of structure 100.

Configurations of Impact-sensitive Color-change Structure

Figure 24A:
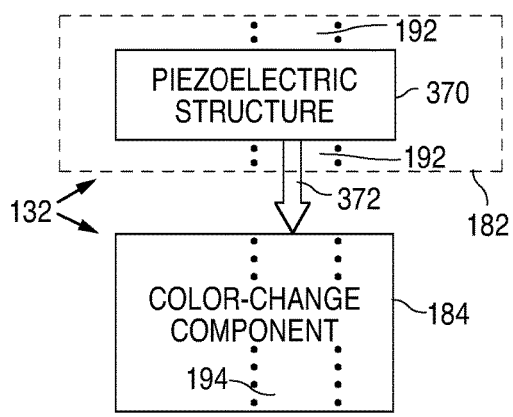
FIGS. 24a and 24b are composite block diagrams/side cross-sectional views of two respective embodiments of the impact-sensitive color-change ("ISCC") structure in the OI structure of FIGS. 11a-11c or 14a-14c.
Figure 24B:
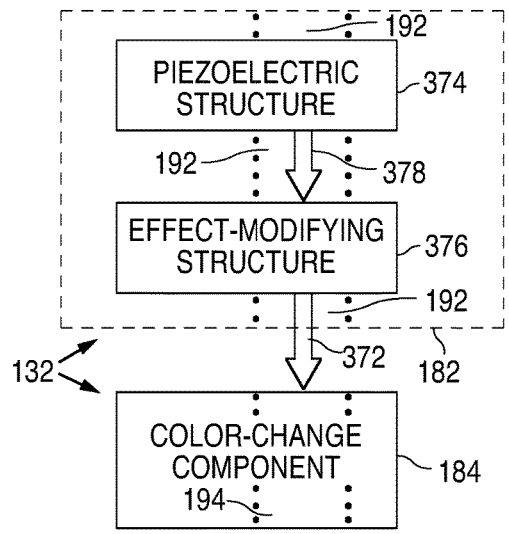

FIGS. 24a and 24b depict two embodiments of ISCC structure 132 suitable for OI structure 180, 200, 260, 270, 300, or 330. Each electrical effect mentioned below consists of one or more electrical signals. In FIG. 24a, IS component 182 contains piezoelectric structure 370. For OI structure 180, 200, 260, or 270, the segment of piezoelectric structure 370 in IS segment 192 provides the general impact effect as an electrical effect in response to pressure, specifically excess SF pressure, of object 104 impacting OC area 116 if the impact meets the TH impact criteria. The electrical effect is supplied from structure 370 along an electrical path 372 to CC component 184, specifically CC segment 194.

For OI structure 300 or 330, the segment of piezoelectric structure 370 in IS segment 192 provides the first general impact effect as an electrical effect in response to deformation along SF DF area 122 due to pressure, specifically excess SF pressure, caused by object 104 impacting OC area 116. The segment of structure 370 in segment 192 similarly provides the second general impact effect as an electrical effect in response to deformation along internal DF area 308 caused by pressure, specifically excess internal pressure, exerted by DE structure 302 on area 308 due to the impact. Both electrical effects are supplied along path 372 to CC segment 194.

IS component 182 in FIG. 24b contains piezoelectric structure 374 and effect-modifying structure 376. For OI structure 180, 200, 260, or 270, the segment of piezoelectric structure 374 in IS segment 192 provides an initial electrical effect along an electrical path 378 to effect-modifying structure 376, largely the segment of structure 376 in IS segment 192, in response to pressure, specifically excess SF pressure, of the impact. Structure 376, likewise largely the structure segment in segment 192, modifies the initial electrical effect to produce the general impact effect as a modified electrical effect supplied to CC segment 194 along path 372.

For OI structure 300 or 330, the segment of piezoelectric structure 374 in IS segment 192 provides an initial first electrical effect in response to deformation along SF DF area 122 due to pressure, specifically excess SF pressure, caused by the impact. The segment of structure 374 in segment 192 similarly provides an initial second electrical effect in response to deformation along internal DF area 308 due to pressure, specifically excess internal pressure, exerted by DE structure 302 on area 308 caused by the impact. Both initial electrical effects are supplied along path 378 to effect-modifying structure 376, largely the structure segment in IS segment 192. Structure 376, again largely the structure segment in segment 192, modifies the initial first and second electrical effects to produce the first and second general impact effects respectively as modified first and second electrical effects supplied to CC segment 194 along path 372.

Effect-modifying structure 376 usually modifies the voltage or/and current of each initial electrical effect to produce the resultant modified electrical effect at modified voltage or/and current suitable for CC component 184. Structure 376 may amplify, or attenuate, the voltage or/and current of each initial electrical effect as well as shifting its voltage level(s).

Figure 25A:
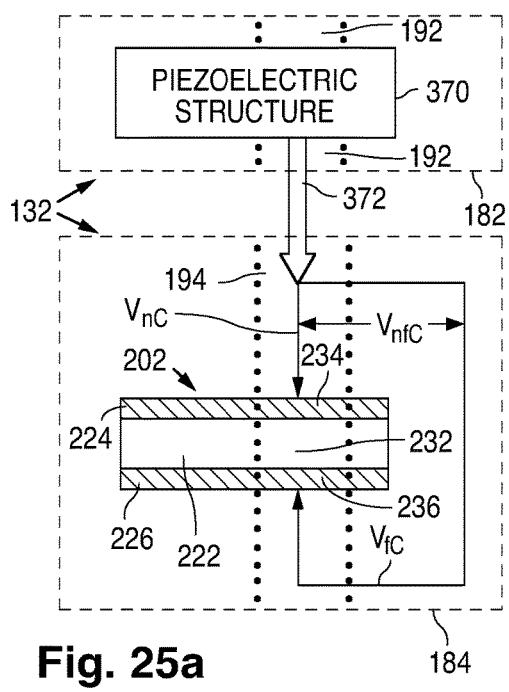
FIGS. 25a and 25b are composite block diagrams/side cross-sectional views of two respective embodiments of the ISCC structure in the OI structure of FIGS. 12a-12c, 15a-15c, 17a-17c, 19a-19c, or 21a and 21b.
Figure 25B:
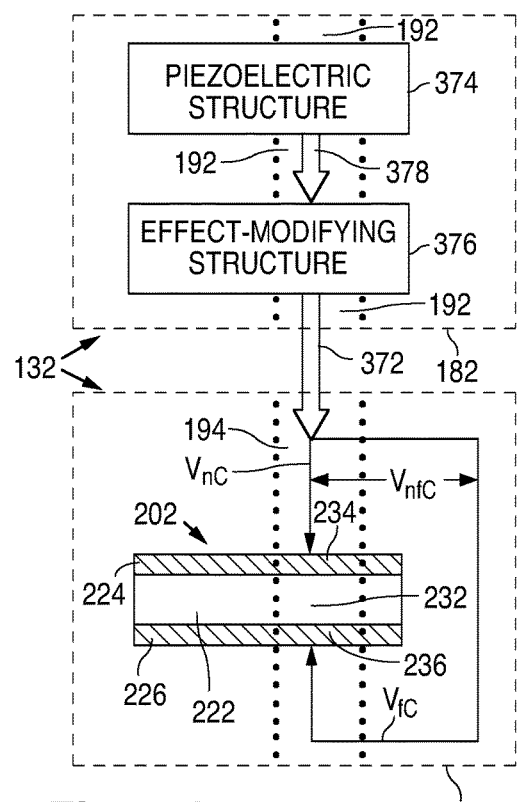

FIGS. 25a and 25b depict two embodiments of ISCC structure 132 suitable for OI structure 200, 270, 300, or 330. In FIG. 25a, IS component 182 contains piezoelectric structure 370 arranged and operable the same as in FIG. 24a. CC component 184 in FIG. 25a contains assembly 202 formed with subcomponents 222, 224, and 226. Auxiliary layers 204 and 206, neither shown in FIG. 25a, may be present in component 184 of FIG. 25a.

ISCC structure 132 in FIG. 25a converts the electrical effect on path 372 into principal general CC control signal $V_{nfC}$ formed by the difference between CC values $V_{nC}$ and $V_{fC}$. Although FIG. 25a illustrates this conversion as occurring within CC component 184, the conversion may occur earlier in the signal processing. Control signal $V_{nfC}$ is applied between electrode structures 224 and 226 so that near CC value $V_{nC}$ is present at the VA location in the segment of the electrode layer in NE segment 234, and far CC value $V_{fC}$ is present at the VA location in the segment of the electrode layer in FE segment 236.

IS component 182 in FIG. 25b consists of piezoelectric structure 374 and effect-modifying structure 376 arranged and operable the same as in FIG. 24b. CC component 184 in FIG. 25b contains assembly 202 arranged and operable the same as in FIG. 25a. Although FIG. 25b illustrate the conversion of the electrical effect on path 372 into general CC control signal $V_{nfC}$ as occurring within component 184, this conversion may occur earlier in the signal processing. In particular, structure 376 in FIG. 25b may perform the conversion.

Piezoelectric structure 370 or 374 can be any one or more of numerous piezoelectric materials such as ammonium dihydrogen phosphate $NH_4H_2PO_4$, potassium dihydrogen phosphate $KH_2PO_4$, monocrystalline or polycrystalline barium titanate $BaTiO_3$, lead zirconium titanate $PbZr_xTi_{1-x}O_3$, lead lanthanum zirconium titanate $Pb_{1-y}La_y(Zr_xTi_{1-x})_{1-0.25y}Vac_{0.25y}O_3$ where Vac means vacancy, polyvinylidene fluoride $(CH_2CF_2)_n$, quartz (silicon dioxide) $SiO_2$, and zinc oxide. These piezoelectric materials and others are presented in "Piezoelectricity", Wikipedia, en.wikipedia.org/wiki/Piezoelectricity, 28 Feb. 2013, 11 pp., and the references cited therein, contents incorporated by reference herein.

Pictorial Views of Color Changing by Light Reflection and Emission

Figure 29A:
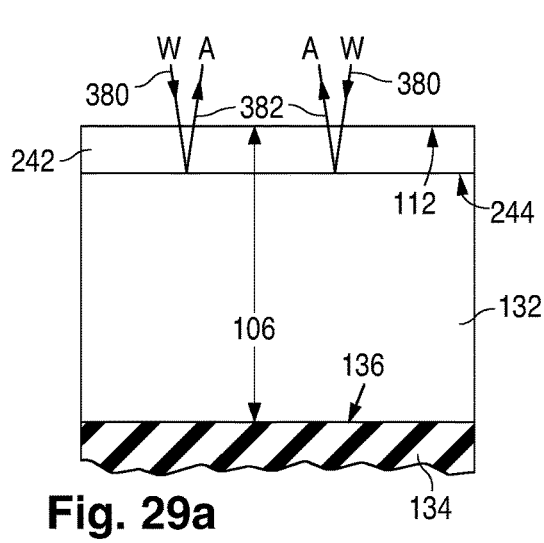
Figure 29B:
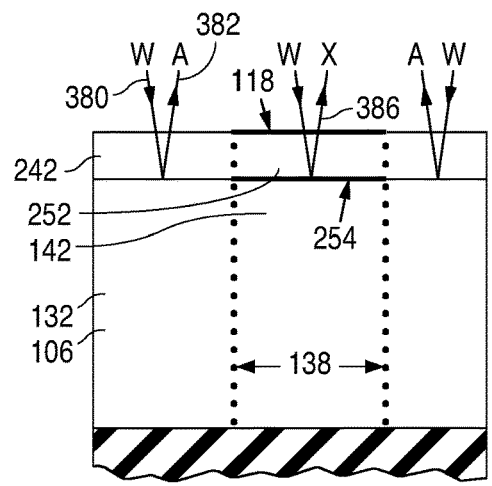
Figure 30A:
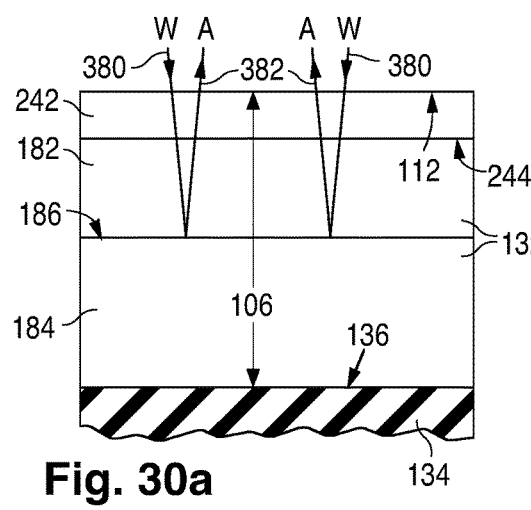
Figure 30B:
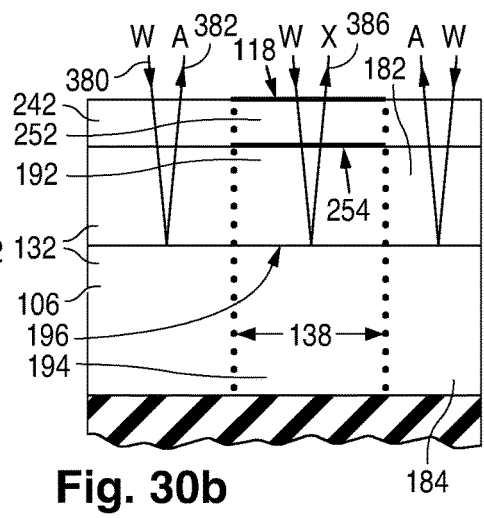
Figure 31A:
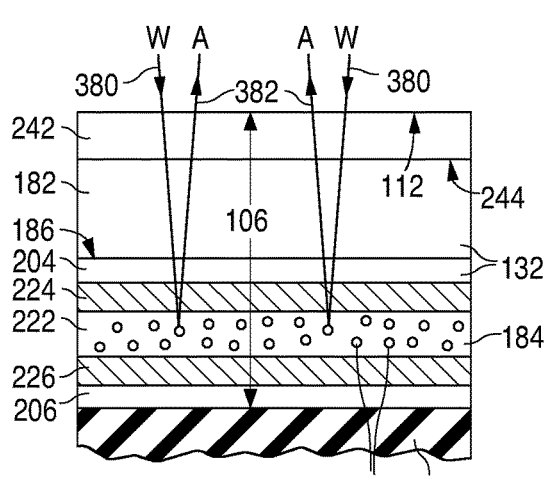
Figure 31B:
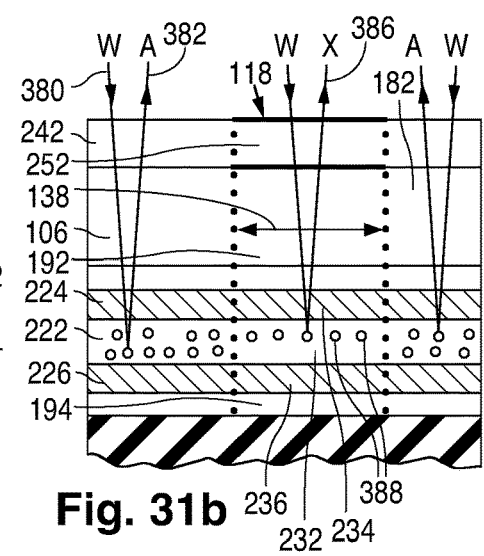

FIGS. 26a and 26b depict how color changing occurs by light reflection in VC region 106 of OI structure 130 or 340. FIGS. 27a and 27b depict how color changing occurs by light reflection in region 106 of OI structure 180. FIGS. 28a and 28b depict how color changing occurs by light reflection in some embodiments of region 106 of OI structure 200 or 350. FIGS. 29a and 29b depict how color changing occurs by light reflection in region 106 of OI structure 240. FIGS. 30a and 30b depict how color changing occurs by light reflection in region 106 of OI structure 260. FIGS. 31a and 31b depict how color changing occurs by light reflection in some embodiments of region 106 of OI structure 270.

The normal state is presented in FIGS. 26a, 27a, 28a, 29a, 30a, and 31a where arrows 380 directed toward VC region 106 from above SF zone 112 represent rays of light striking region 106. Incident light 380 consists of a mixture of wavelengths across at least one relatively broad part of the visible spectrum. Incident broad-spectrum light 380 typically consists of an appropriate mixture of wavelengths across the entire visible spectrum so as to form light, termed "white light", further labeled with the letter W. Implementing light 380 with white light provides great flexibility in choosing color A. Nevertheless, light 380 can be significantly non-white light.

Arrows 382 directed away from VC region 106 along SF zone 112 in FIG. 26a, 27a, 28a, 29a, 30a, or 31a represent rays of A light leaving region 106. Region 106 reflects part of light 380 and absorbs or/and transmits, preferably absorbs, the remainder of light 380. No internally emitted light leaves region 106 via zone 112 in FIG. 26a, 27a, 28a, 29a, 30a, or 31a. A light 382 consists nearly entirely of the reflected part of light 380.

A light 382 usually has multiple components as described above but, for simplicity, not indicated in FIG. 26a, 27a, 28a, 29a, 30a, or 31a. In FIG. 26a, the light reflection to form most of light 382 can occur along or/and below SF zone 112. The places where the arrows representing light 382 originate in FIGS. 27a, 28a, 29a, 30a, and 31a indicate the minimum depths below zone 112 at which light forming most of light 382 is reflected. The light reflection forming most of light 382 in FIG. 27a occurs along or/and below interface 186. In FIGS. 28a and 31a, items 384 in core layer 222 are examples of particles off which part of broad-spectrum light 380 reflects to form most of light 382.

The changed state is presented in FIGS. 26b, 27b, 28b, 29b, 30b, and 31b. During the changed state, IDVC portion 138 temporarily reflects part of broad-spectrum light 380 to form reflected light 386 whose rays are represented by arrows leaving portion 138. Portion 138 absorbs or/and transmits, preferably absorbs, the remainder of light 380 striking it. No internally emitted light leaves portion 138 via print area 118 in FIG. 26b, 27b, 28b, 29b, 30b, or 31b. X light thus consists nearly entirely of reflected light 386. Also, the remainder of VC region 106 continues to reflect A light 382.

Reflected X light 386 usually has multiple components as described above but, for simplicity, not shown in FIG. 26b, 27b, 28b, 29b, 30b, or 31b. In FIG. 26b, the light reflection to form most of light 386 can occur along or/and below print area 118. The places where the arrows representing light 386 originate in FIGS. 27b, 28b, 29b, 30b, and 31b indicate the minimum depths below area 118 at which light forming most of light 386 is reflected. The light reflection forming most of light 386 in FIG. 27b occurs along or/and below IF segment 196.

Referring to FIGS. 28b and 31b, items 388 in ID segment 232 of core layer 222 are examples of selected ones of particles 384. Selected particles 388 have translated or/and rotated so that part of broad-spectrum light 380 striking particles 388 reflects to form most of light 386. For exemplary purposes, FIGS. 28b and 31b depict particles 388 as being adjacent to NE segment 234 and thus averagely remote from FE segment 236 as arises in the version of the mid-reflection embodiment of CC component 184 where layer 222 contains charged particles of one color distributed in a fluid of another color. Nevertheless, selected particles 388 can translate or/and rotate as described above for any of the other versions of the mid-reflection embodiment of component 184.

Figure 32A:
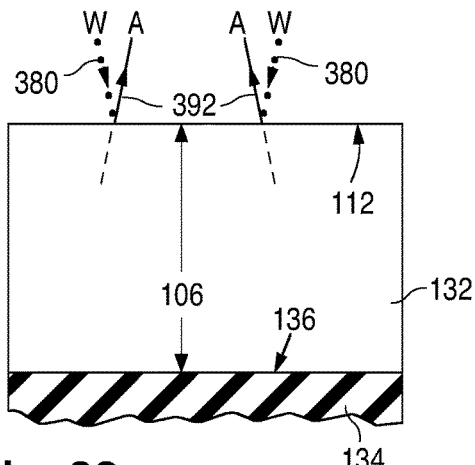
FIGS. 32a and 32b, 33a and 33b, 34a and 34b, 35a and 35b, 36a and 36b, and 37a and 37b are cross-sectional side views showing how color changing occurs by light emission in VC regions.
Figure 32B:
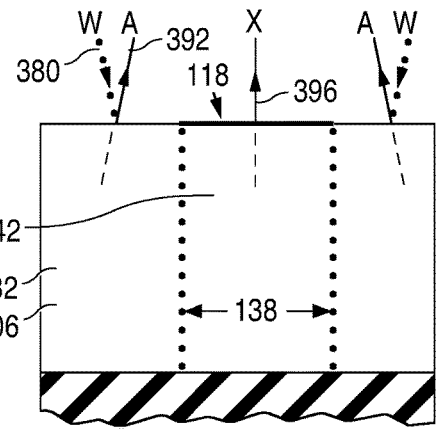
Figure 33A:
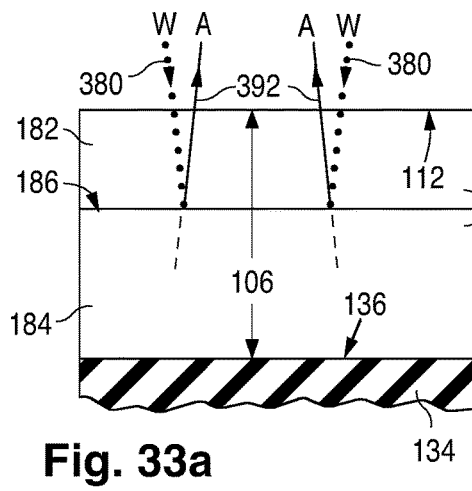
Figure 33B:
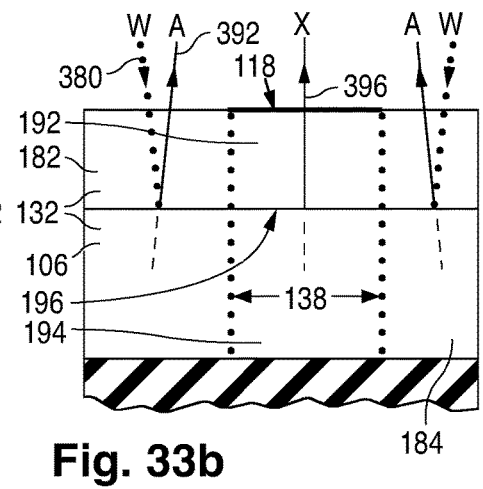
Figure 34A:
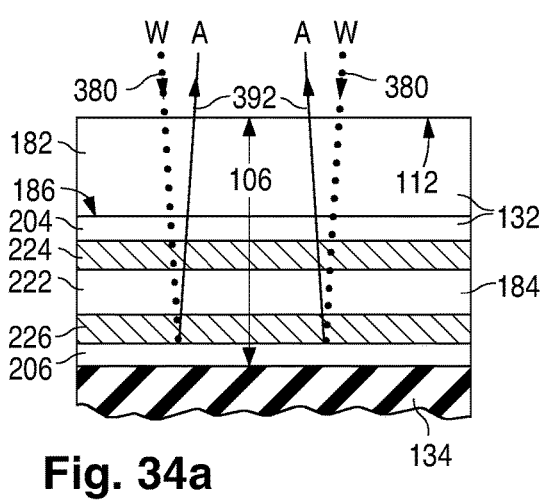
Figure 34B:
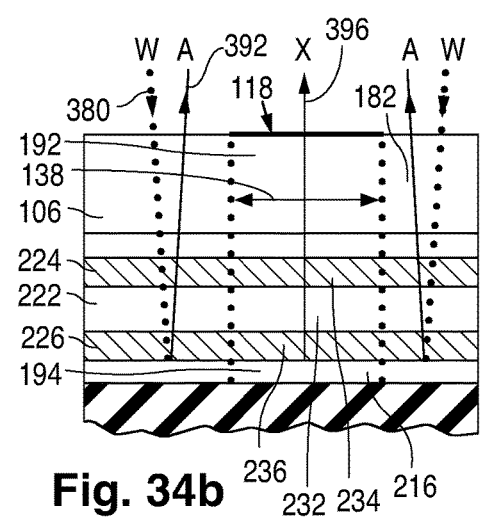
Figure 35A:
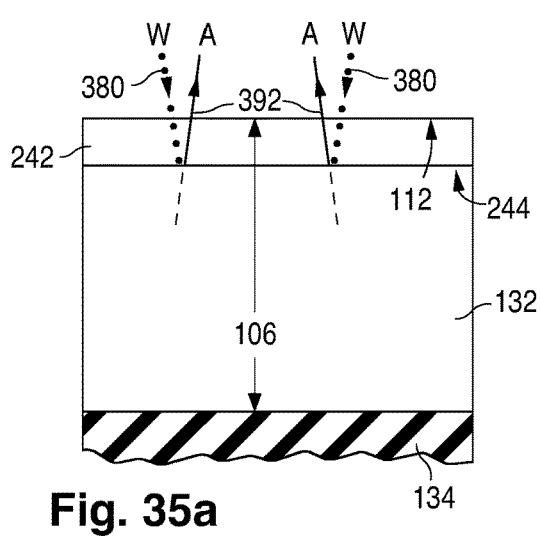
Figure 35B:
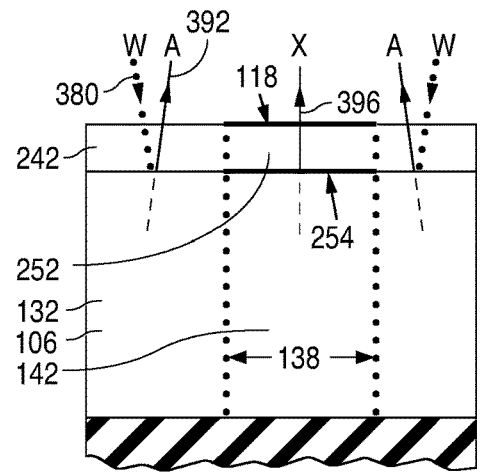
Figure 36A:
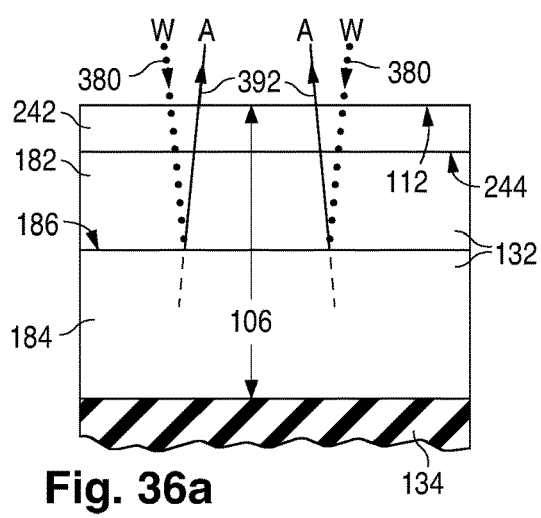
Figure 36B:
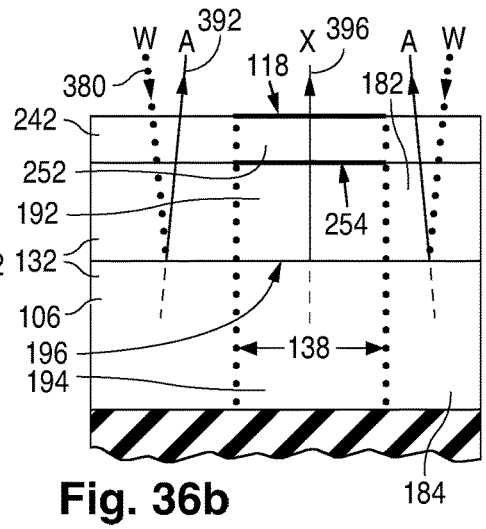
Figure 37A:
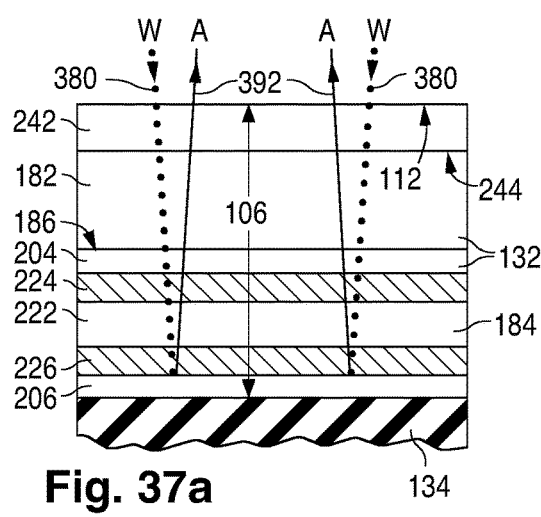
Figure 37B:
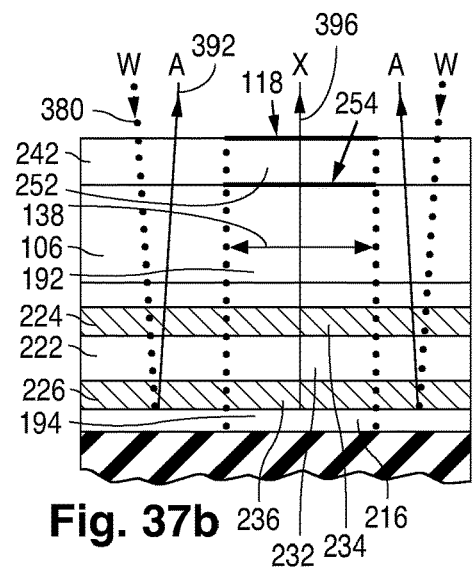

FIGS. 32a and 32b depict how color changing occurs primarily by light emission in VC region 106 of OI structure 130 or 340. FIGS. 33a and 33b depict how color changing occurs primarily by light emission in region 106 of OI structure 180. FIGS. 34a and 34b depict how color changing occurs primarily by light emission in region 106 of OI structure 200 or 350. FIGS. 35a and 35b depict how color changing occurs primarily by light emission in region 106 of OI structure 240. FIGS. 36a and 36b depict how color changing occurs primarily by light emission in region 106 of OI structure 260. FIGS. 37a and 37b depict how color changing occurs primarily by light emission in region 106 of OI structure 270.

The normal state is presented in FIGS. 32a, 33a, 34a, 35a, 36a, and 37a where the arrows representing rays of broad-spectrum light 380 are shown in dotted line because change in the reflection of part of light 380 is usually a secondary contributor to color changing. Arrows 392 directed away from VC region 106 along SF zone 112 represent A light leaving region 106. Region 106 again reflects part of light 380 and absorbs or/and transmits, preferably absorbs, the remainder of light 380. However, internally emitted light can leave region 106 via zone 112 during the normal state. A light 392 consists of the reflected part of light 380 and any such emitted light.

A light 392 usually has multiple components as described above but, for simplicity, not shown in FIG. 32a, 33a, 34a, 35a, 36a, or 37a. The locations where the arrows representing light 392 originate in FIGS. 32a, 33a, 34a, 35a, 36a, and 37a indicate depths below SF zone 112 at which any emitted part of light 392 can be emitted. Because no significant amount of light emission may occur during the normal state, the arrows representing light 392 are shown in dashed line extending from their potential emission-origination locations upward to the locations of the minimum depths below zone 112 at which reflected light in light 392 is reflected. The arrows representing light 392 in FIG. 32a are shown in dashed line extending from zone 112 to underlying locations because any emitted light in light 392 is usually emitted below zone 112. In FIGS. 34a and 37a, the arrows representing light 392 are shown without dashed-line as originating at the interface between FE structure 226 and FA layer 206 because (i) reflected light in light 392 can be reflected at that interface and (ii) any emitted light in light 392 can be emitted by layer 206.

The changed state is presented in FIGS. 32b, 33b, 34b, 35b, 36b, and 37b. Arrows 396 directed away from IDVC portion 138 along print area 118 represent X light leaving portion 138. X light 396 consists of a reflected part of broad-spectrum light 380 striking portion 138 and usually light emitted by it. Portion 138 absorbs or/and transmits, preferably absorbs, the remainder of light 380 striking it. When X light 396 contains light emitted by portion 138, the emitted light usually forms most of light 396. The remainder of VC region 106 continues to reflect A light 392.

X light 396 usually has multiple components as described above, but for simplicity, not indicted in FIG. 32b, 33b, 34b, 35b, 36b, or 37b. The locations where the arrows representing light 396 originate in FIGS. 32b, 33b, 34b, 35b, 36b, and 37b indicate depths below print area 118 at which the emitted part, if any, of light 396 can be emitted. Because no significant amount of light emission sometimes occurs during the changed state, the arrows representing light 396 are shown in dashed line extending from their potential emission-origination locations upward to the locations of the minimum depths below area 118 at which reflected light in light 396 is reflected. The arrow representing light 396 in FIG. 32b is shown in dashed line extending from area 118 to an underlying location because any emitted light in light 396 is usually emitted below area 118. In FIGS. 34b and 37b, the arrows representing light 396 are shown without dashed line as originating at the interface between FE segment 236 and FA segment 216 because (i) reflected light in light 396 can be reflected at that interface and (ii) any emitted light in light 396 can be emitted by segment 216.

Object-impact Structure with Cellular Arrangement

Figure 38A:
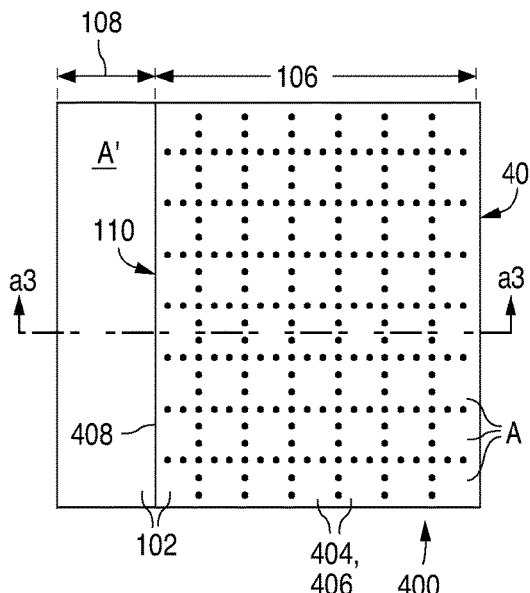
FIGS. 38a and 38b are layout views of a cellular embodiment of the OI structure of FIGS. 5a-5c according to the invention. The cross section of each of FIGS. 41a, 42a, 43a, 44a, 45a, 46a, 47a, 48a, 49a, and 50a described below is taken through plane a3-a3 in FIG. 38a. The cross section of each of FIGS. 41b, 42b, 43b, 44b, 45b, 46b, 47b, 48b, 49b, and 50b described below is taken through plane b3-b3 in FIG. 38b.
Figure 38B:
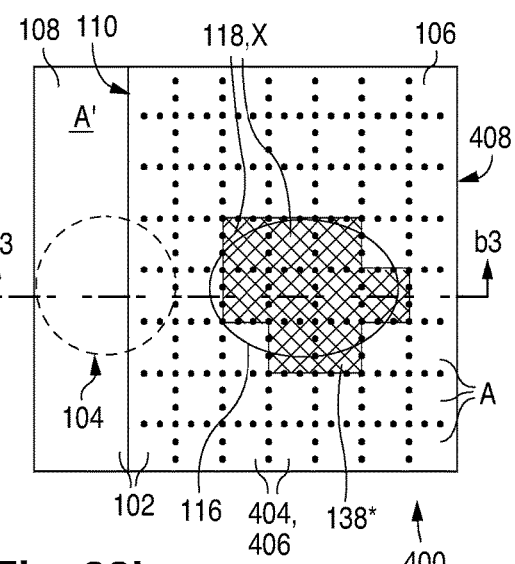

FIGS. 38a and 38b (collectively "FIG. 38") depict the layout of a general embodiment 400 of OI structure 100 in which VC region 106 is allocated into a multiplicity, at least four, usually at least 100, typically thousands to millions, of principal independently operable VC cells 404 arranged laterally in a layer as a two-dimensional array, each VC cell 404 extending to a corresponding part 406 of SF zone 112. The dotted lines in FIG. 38 indicate interfaces between SF parts 406 of adjacent cells 404. The general layout of OI structure 400 is shown in FIG. 38a. FIG. 38b depicts an example of color change that occurs along surface 102 upon being impacted by object 104 indicated in dashed line at a location subsequent to impact. Each cell 404 functions as a pixel cell, its SF part 406 being a pixel.

VC cells 404 consist of (a) peripheral cells along the lateral periphery 408 of VC region 106, each peripheral cell having sides respectively adjoining sides of at least two other peripheral cells, and (b) interior cells spaced apart from lateral periphery 408, each interior cell having sides respectively adjoining sides of at least four other cells 404. Cells 404, usually arrayed in rows and columns across region 106, are preferably identical but can variously differ. The row and column directions respectively are the horizontal and vertical directions in FIG. 38. Peripheral cells 404 may sometimes differ from interior cells 404. Cell SF parts 406 are usually shaped like polygons, preferably quadrilaterals, more preferably rectangles, typically squares as shown in the example of FIG. 38. For rectangles, including squares, each cell column extends perpendicular to each cell row. Other shapes for SF parts 406 are discussed below in regard to FIGS. 87a and 87b.

Cells 404 appear along their parts 406 of SF zone 112 as principal color A during the normal state, A light normally leaving each cell 404 along its SF part 406. See FIG. 38a. A cell 404 is a principal CM cell if it temporarily appears as changed color X along its part 406 of zone 112 as a result of object 104 impacting OC area 116, X light temporarily leaving each CM cell 404 along its part 406 of print area 118 during the changed state. See FIG. 38b. Again, "CM" means criteria-meeting. OC area 116 is again capable of being of substantially arbitrary shape. Recitations hereafter of (a) cells 404 normally appearing as color A mean that they normally so appear along their parts 406 of zone 112 and (b) a CM cell 404 temporarily appearing as color X means that it temporarily so appears along its part 406 of area 118.

Each cell 404 that meets principal cellular TH impact criteria in response to object 104 impacting OC area 116 is a principal TH CM cell. The principal cellular TH impact criteria embody the principal basic TH impact criteria. Since the principal basic TH impact criteria can vary with where print area 118 occurs in SF zone 112, the cellular TH impact criteria can vary with where each cell's SF part 406 occurs in zone 112. In some cellular OI embodiments, each TH CM cell 404 temporarily appears as color X during the changed state. In other cellular OI embodiments, other impact criteria must also be met for a TH CM cell 404 to appear as color X during the changed state. Each such TH CM cell 404 then becomes a principal full CM cell, sometimes simply a CM cell.

Also, a cell 404 significantly affected by the impact, e.g., by experiencing significant impact-caused excess pressure or/and undergoing significant impact-caused deformation, is a candidate for a CM cell. A candidate cell 404 meeting the cellular TH impact criteria temporarily becomes a TH CM cell and either temporarily appears as color X during the changed state or, if subject to other impact criteria, becomes a full CM cell and temporarily appears as color X if the other impact criteria are met. A cell 404, including a candidate cell 404, not meeting the cellular TH impact criteria appears as color A during the changed state. The same applies to a cell 404 for which the other impact criteria are not met in a cellular OI embodiment subject to the other impact criteria.

There is invariably an ID group of cells 404 that temporarily constitute CM cells, the ID cell group being a plurality of less than all cells 404. The ID cell group, termed ID cell group 138*, embodies IDVC portion 138. SF parts 406 of CM cells 404 in ID cell group 138* constitute print area 118 and temporarily appear as color X. CM cells 404 in cell group 138* are usually cell-wise continuous in that each CM cell 404 adjoins, or is connected 404 via one or more other CM cells 404 to, each other CM cell 404.

The cellular TH impact criteria for each cell 404 can consist of multiple sets of different principal cellular TH impact criteria having the same characteristics as, and employable the same as, the sets of principal basic TH impact criteria. Hence, the sets of different principal cellular TH impact criteria respectively correspond to different specific changed colors ($X_1$-$X_n$). Each cell 404 meeting the cellular TH impact criteria in a cellular OI embodiment not subject to other impact criteria appears as the specific changed color ($X_i$) for the set of cellular TH impact criteria actually met by the impact. Each cell 404 meeting the cellular TH impact criteria in a cellular OI embodiment subject to other impact criteria appears as the specific changed color ($X_i$) for the set of cellular TH impact criteria actually met by the impact if the other impact criteria are met. Hence, each cell 404 meeting the cellular TH impact criteria is solely capable of appearing as the specific changed color ($X_i$) for the set of cellular TH impact criteria actually met by the impact.

Print area 118 usually variously extends inside and outside OC area 116 depending on the cellular TH impact criteria. Arranging for areas 116 and 118 to have this type of relationship to each other generally enables the contour of print area 118 to better match the contour of OC area 116 because cell SF parts 406 are of finite size, quadrilaterals here, rather than being points.

An indicator $\Delta R_{proc}$ of how close the contour of print area 118 matches the contour of OC area 116 is the sum of the fractional differences in area by which print area 118 extends inside and outside OC area 116. Let $A_{pri}$ and $A_{pro}$ respectively represent the areas by which print area 118 extends inside and outside OC area 116. Fractional inside-and-outside area difference $\Delta R_{proc}$ is then $(A_{pri}+A_{pro})/A_{oc}$ where $A_{oc}$ is again the area of OC area 116. Fractional area difference $\Delta R_{proc}$ devolves to $A_{pri}/A_{oc}$ if print area 118 only extends inside OC area 116 and to $A_{pro}/A_{oc}$ if print area 118 only extends outside OC area 116. In percentage, fractional difference $\Delta R_{proc}$ averages usually no more than 10%, preferably no more than 8%, more preferably no more than 6%, even more preferably no more 4%, further preferably no more than 2%, further more preferably no more than 1%.

The matching between the contours of areas 116 and 118, sometimes described as quantized for OI structure 400 because ID cell group 138* contains an integer number of CM cells 404, is relatively weak in the example of FIG. 38b where the number of CM cells 404 whose SF parts 406 form quantized print area 118 of cell group 138* is relatively small. The print-area-to-OC-area matching generally improves as the cell density, or pixel resolution, increases so that more CM cells 404 are present in group 138* for a given lateral area of group 138*. "PA" hereafter means print-area.

Figure 39A:
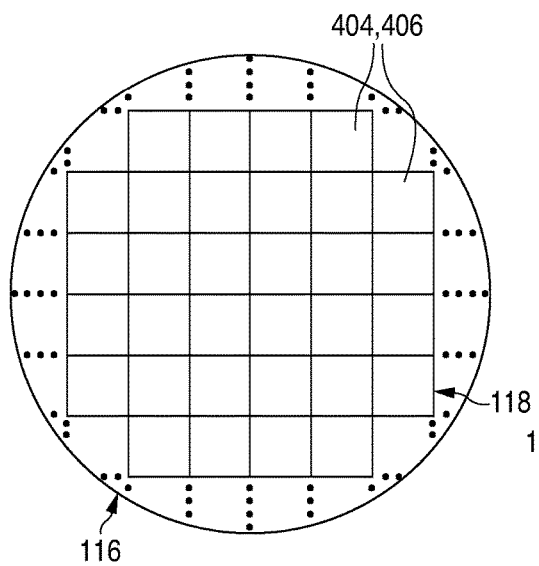
FIGS. 39a and 39b are diagrams of exemplary quantized print areas within circular object-contact areas for the OI structure of FIGS. 38a and 38b.
Figure 39B:
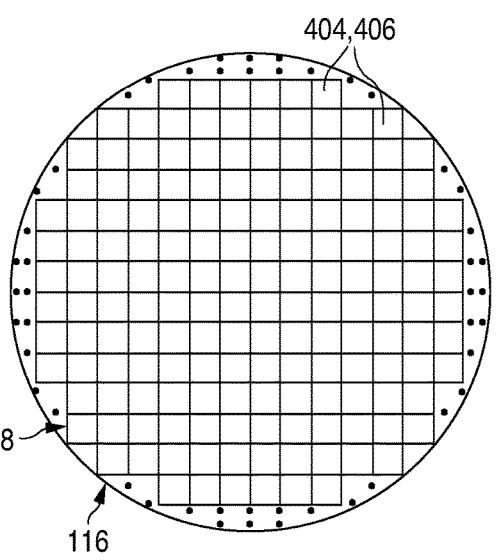

An understanding of how the PA-to-OC-area matching improves with increasing cell density is facilitated with assistance of FIGS. 39a and 39b (collectively "FIG. 39") which depict quantized print area 118 at two different cell densities for an example in which OC area 116 is a true circle. Quantized print area 118 here is a quantized "circle" lying fully within the true circle, subject to certain edges of the quantized circle possibly touching the true circle. Cell SF parts 406 in FIG. 39 are identical squares, the squares within the quantized circle shown in solid line for clarity.

Area $A_t$ of the true circle formed by OC area 116 in FIG. 39 is $\pi d_t^2/4$ where $d_t$ is the diameter of the true circle. Letting $d_s$ represent the dimension of each side of each square, area $A_q$ of the quantized circle is $n_{min}d_s^2$ where $n_{min}$ is the minimum number of squares fully within the true circle, with certain edges of certain squares possibly touching the true circle, for any location of the true circle on the grid of squares. The ratio $R_{qt}$ of area $A_q$ of the quantized circle to area $A_t$ of the true circle is $4n_{min}d_s^2/\pi d_t^2$. Letting $R_{cs}$ represent the ratio of diameter $d_t$ of the true circle to the dimension $d_s$ of each side of each square, circle area ratio $R_{qt}$ is then $4n_{min}/\pi R_{cs}^2$. Circle area ratio $R_{qt}$ approaches 1 as the quantized circle approaches a true circle of diameter $d_t$.

The fractional circle area difference $\Delta R_{qt}$ between the contours of the true and quantized circles is $1-R_q t$. Fractional circle area difference $\Delta R_{qt}$ approaches zero as the quantized circle approaches the true circle and is another indicator of how close the contour of print area 118 matches the contour of OC area 116. Additionally, the quantized circle often contains more squares than minimum number $n_{min}$ used in deriving fractional difference $\Delta R_{qt}$. Difference $\Delta R_{qt}$ represents the "worst-case" matching because the difference between the contours of the quantized and true circles is often less than that indicated by difference $\Delta R_{qt}$.

Figure 40:
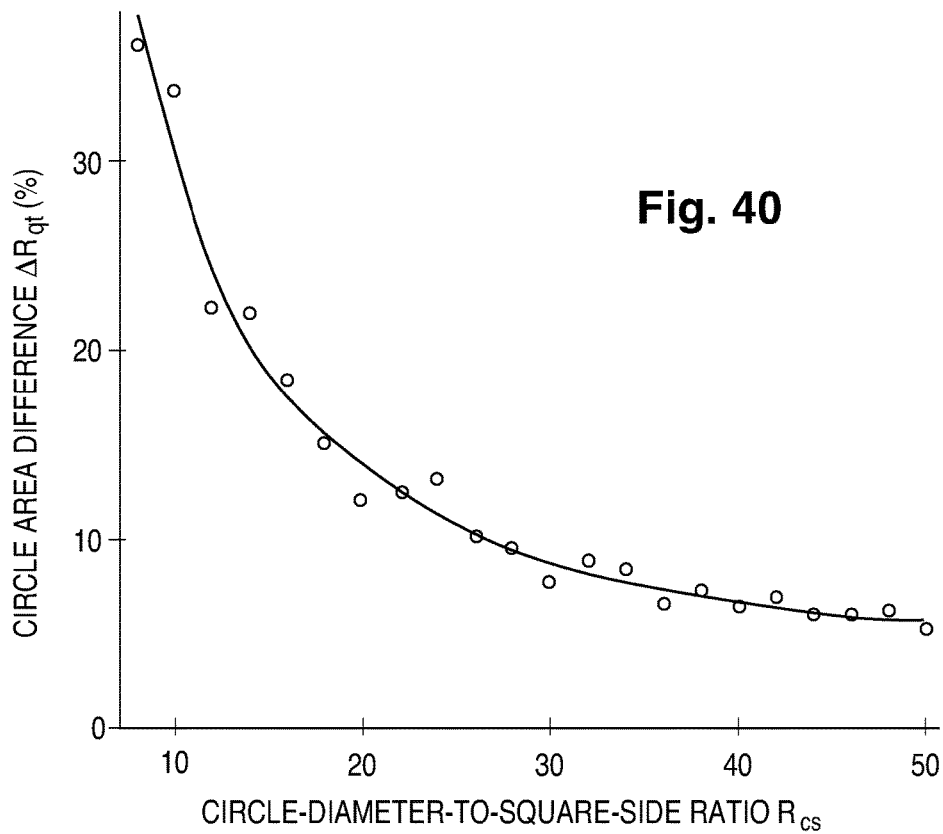
FIG. 40 is a graph of the ratio of the difference in area between a true circle and a quantized circle as a function of the ratio of the radius of the true circle to the length/width dimension of identical squares forming the quantized circle.

FIG. 40 shows how fractional circle area difference $\Delta R_{qt}$ decreases with increasing even-integer values of circle-diameter-to-square-side ratio $R_{cs}$. Table 2 below presents the data, including minimum number $n_{min}$ of squares and quantized-circle-to-true-circle area ratio $R_{qt}$, used in generating FIG. 40. Although diameter-to-side ratio $R_{cs}$ only has even integer values in FIG. 40 and Table 2, ratio $R_{cs}$ can have odd integer values as well as non-integer values.

TABLE 2

| Diameter-to-side Ratio $R_{cs}$ | Min. No. $n_{min}$ of Squares | Area Ratio $R_{qt}$ | Diff. $\Delta R_{qt}$ (%) |
|---|---|---|---|
| 4 | 4 | 0.318 | 68.2 |
| 6 | 16 | 0.566 | 43.4 |
| 8 | 32 | 0.637 | 36.3 |
| 10 | 52 | 0.662 | 33.8 |
| 12 | 88 | 0.778 | 22.2 |
| 14 | 120 | 0.780 | 22.0 |
| 16 | 164 | 0.816 | 18.4 |
| 18 | 216 | 0.849 | 15.1 |
| 20 | 276 | 0.879 | 12.1 |
| 22 | 332 | 0.873 | 12.7 |
| 24 | 392 | 0.867 | 13.3 |
| 26 | 476 | 0.897 | 10.3 |
| 28 | 556 | 0.903 | 9.7 |
| 30 | 652 | 0.922 | 7.8 |
| 32 | 732 | 0.910 | 9.0 |
| 34 | 832 | 0.916 | 8.4 |
| 36 | 952 | 0.935 | 6.5 |
| 38 | 1052 | 0.927 | 7.3 |
| 40 | 1176 | 0.935 | 6.5 |
| 42 | 1288 | 0.930 | 7.0 |
| 44 | 1428 | 0.939 | 6.1 |
| 46 | 1560 | 0.939 | 6.1 |
| 48 | 1696 | 0.937 | 6.3 |
| 50 | 1860 | 0.947 | 5.3 |

Object 104 occupies a maximum area $A_{oc}$ along SF zone 112 while contacting OC area 116. Assume that true circle area $A_t$ is approximately OC area $A_{oc}$. Let $N_L$ represent the lineal density (or resolution), in squares per unit length, of squares needed to achieve a particular value of fractional difference $\Delta R_{qt}$. For a given value of true circle area $A_t$, lineal square density $N_L$ is estimated as $(n_{min}/A_{oc})^{1/2}$ for any $\Delta R_{qt}$ value in Table 2. For a $\Delta R_{qt}$ value lower than the lowest $\Delta R_{qt}$ value in Table 2, lineal density $N_L$ is estimated using the same formula by extending Table 2 to suitably higher values of minimum square number $n_{min}$. Because number $n_{min}$ can become very high, extending Table 2 may entail using a suitable computer program.

As an exemplary $N_L$ estimate, OC area $A_{oc}$ for a tennis ball embodying object 104 is typically 15-20 cm². Assume that a $\Delta R_{qt}$ value of 5-6% is desired. The corresponding $n_{min}$ value is roughly 1,500-2,000. Using the preceding $N_L$ formula, the desired $N_L$ value is approximately 10 squares/cm or 10 pixels/cm since each square is a pixel. State-of-the-art imaging systems easily achieve resolutions of 100 pixels/cm and can usually readily achieve resolutions of 200 pixels/cm. A $\Delta R_{qt}$ value of 5-6% is well within the state of the art. $\Delta R_{qt}$ values considerably less than 5-6% are expected to be readily achievable with OI structure 400.

Different from the model of FIG. 39 in which the quantized circle embodying print area 118 lies fully within the true circle embodying OC area 116, print area 118 often extends partly outside OC area 116 as occurs in the example of FIG. 38b. Also, some cell SF parts 406 along the perimeter of OC area 116 may not form part of print area 118. In the example of FIG. 38b, each cell SF part 406 along the perimeter of OC area 116 forms a portion of print area 118 only when approximately half or more of that SF part's area is within OC area 116. Fractional inside-and-outside area difference $\Delta R_{proc}$ for the model of FIG. 39 equals fractional circle area difference $\Delta R_{qt}$ when the number of squares fully within area 116 is minimum number $n_{min}$. Circle area difference $\Delta R_{qt}$ can then serve as an estimate of inside-and-outside area difference $\Delta R_{proc}$ for approximately determining the minimum linear cell density needed to achieve a particular $\Delta R_{proc}$ value. Lineal density $N_L$ in cells 404 per unit length is usually at least 10 cells/cm, preferably at least 20 cells/cm, more preferably at least 40 cells/cm, even more preferably at least 80 cells/cm, in both the row and column directions.

FIGS. 41a, 41b, 42a, 42b, 43a, 43b, 44a, 44b, 45a, 45b, 46a, 46b, 47a, 47b, 48a, 48b, 49a, 49b, 50a, and 50b present side cross sections of ten embodiments of OI structure 400 where each pair of Figs. ja and jb for integer j varying from 41 to 50 depicts a different embodiment. The basic side cross sections, and thus now the ten embodiments appear in the normal state, are respectively shown in FIGS. 41a, 42a, 43a, 44a, 45a, 46a, 47a, 48a, 49a, and 50a corresponding to FIG. 38a. FIGS. 41b, 42b, 43b, 44b, 45b, 46b, 47b, 48b, 49b, and 50b corresponding to FIG. 38b present examples of changes that occur during the changed state when object 104 contacts surface 102 fully within SF zone 112.

SF DF area 122, which usually encompasses most of principal OC area 116, and total OC area 124, which is identical to OC area 116 in the examples of FIGS. 41b, 42b, 43b, 44b, 45b, 46b, 47b, 48b, 49b, and 50b, are not separately labeled in those figures to simplify the labeling. Nor are areas 122 and 124 separately labeled in earlier FIG. 38b. In the embodiments of FIGS. 42a and 42b, 43a and 43b, 44a and 44b, 45a and 45b, 46a and 46b, 47a and 47b, 48a and 48b, 49a and 49b, and 50a and 50b where each cell 404 consists of multiple parts, the parts of each cell 404 are not separately labeled to simplify the labeling.

As to cell parts described below for subregions 242, 182, 302, 204, 224, 202, 222, and 226, each such cell part meets the transmissivity specification given above for corresponding subregion 242, 182, 302, 204, 224, 202, 222, or 226 containing that cell part. Similarly regarding combinations of functionally different cell parts described below for subregions 242, 182, 302, 204, 224, 202, 222, and 226, each such combination of functionally different cell parts meets the transmissivity specification given above for the corresponding combination of subregions 242, 182, 302, 204, 224, 202, 222, and 226 containing that combination of cell parts.

Figures 41A, 41B:
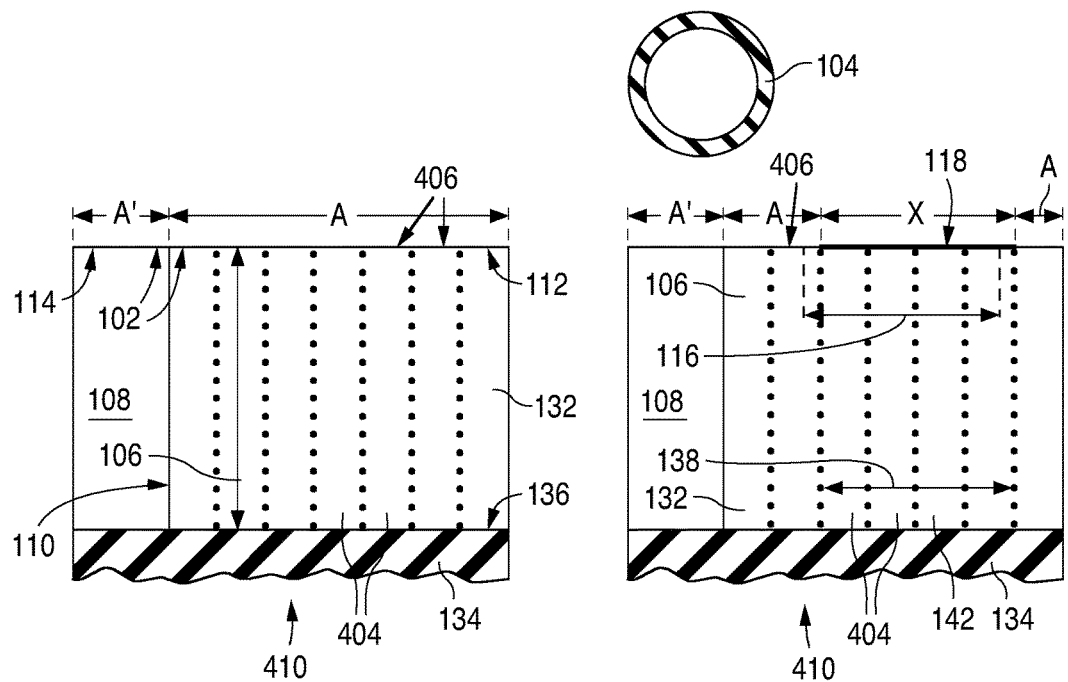

Referring to FIGS. 41a and 41b, they illustrate a general embodiment 410 of OI structure 400 for which automatic duration $\Delta t_{drau}$ of the changed state is passively determined by the properties of the material in ISCC structure 132. OI structure 410 is also an embodiment of OI structure 130. The lateral (side) boundary of each cell 404 usually extends perpendicular to its part 406 of SF zone 112 so as to appear largely as a pair of straight lines along a plane extending through that cell 404 perpendicular to zone 112. See FIG. 41a. Each cell 404 here consists of a part, termed an ISCC part (or element), of ISCC structure 132.

Each cell 404 here operates the same during the normal state as VC region 106 in OI structure 130. A light normally leaving each cell 404 via its SF part 406 is formed with ARic light reflected by its ISCC part, any AEic light emitted by its ISCC part, and any substructure-reflected ARsb light passing through its ISCC part. Each cell 404 normally appears as color A.

Each cell 404 having its SF part 406 partly or fully in OC area 116 is a candidate for a CM cell. Each CM cell 404 operates the same during the changed state as IDVC portion 138 in structure 130. Referring to FIG. 41b, X light temporarily leaving each CM cell 404 via its part 406 of print area 118 is formed with XRic light reflected by its ISCC part, any XEic light emitted by its ISCC part, and any substructure-reflected XRsb light passing through its ISCC part. CM cells 404 usually enter the changed state simultaneously and leave the changed state simultaneously. CC duration $\Delta t_{dr}$ of each CM cell 404 is largely equal to CC duration $\Delta t_{dr}$ of OI structure 400 as a whole. Automatic duration $\Delta t_{drau}$ of each CM cell 404 is likewise largely equal to automatic duration $\Delta t_{drau}$ of structure 400 as a whole.

The ISCC part of each cell 404 here can, subject to the potential modifications described below for FIG. 51, be embodied in any of the ways described above for embodying ISCC structure 132 in OI structure 130. For instance, each cell's ISCC part can be formed essentially solely with IS CR or CE material. Automatic CC duration $\Delta t_{drau}$ for each cell 404 when it is a CM cell is then base portion $\Delta t_{drbs}$.

Figure 42A:
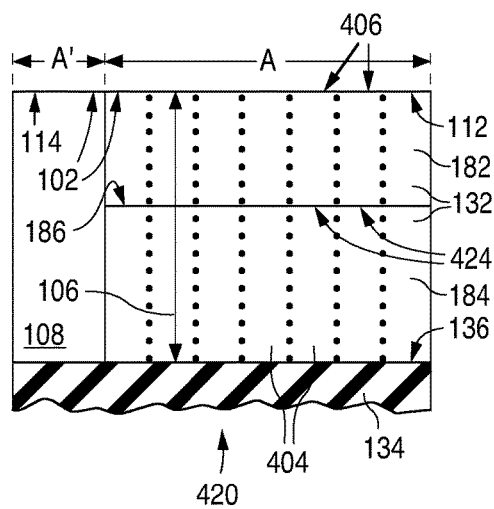
Figure 42B:
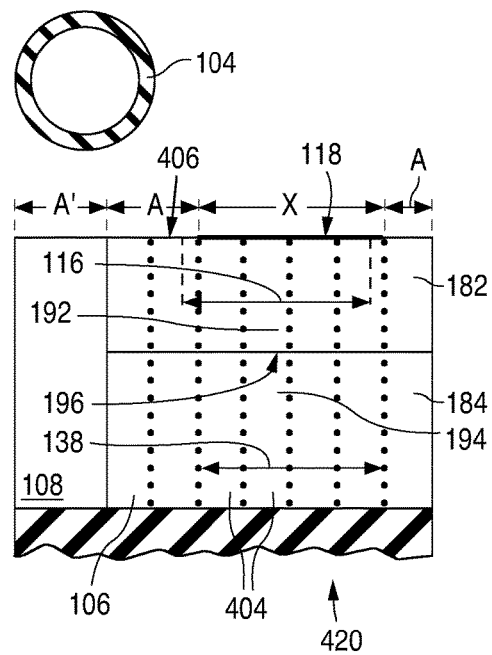

FIGS. 42a and 42b illustrate an embodiment 420 of OI structure 410. OI structure 420 is also an embodiment of OI structure 180. ISCC structure 132 of VC region 106 here consists of components 182 and 184 deployed as in OI structure 180 to meet at interface 186. See FIG. 42a. Each cell 404 here consists of an ISCC part of ISCC structure 132, the ISCC part formed with (a) a part, termed an IS part, of IS component 182 and (b) a part, termed a CC part, of underlying CC component 184. The IS part of each cell 404 extends to its SF part 406 and between its boundary portions in IS component 182. The CC part of each cell 404 extends to substructure 134 and between that cell's boundary portions in CC component 184. The cell's IS and CC parts meet along a corresponding part 424 of interface 186.

The IS and CC parts of each cell 404 respectively operate the same during the normal state as components 182 and 184 in OI structure 180. Total ATcc light normally leaving the CC part of each cell 404 via its IF part 424 consists of ARcc light reflected by its CC part, any AEcc light emitted by its CC part, and any ARsb light passing through its CC part. A light normally leaving each cell 404 via its SF part 406 consists of ARcc light and any AEcc and ARsb light passing through its IS part and any ARis light reflected by its IS part.

Each cell 404 having its SF part 406 partly or fully in OC area 116 is a candidate for a CM cell. Each CM cell 404 operates essentially the same during the changed state as IDVC portion 138 in structure 130. In particular, each CM cell 404 temporarily appears as color X (a) in some general OI embodiments if it meets the cellular TH impact criteria so as to be a TH CM cell or (b) in other general OI embodiments if it is provided with a principal cellular CC control signal generated in response to it meeting the cellular TH impact criteria sometimes dependent on other impact criteria also being met in those other embodiments so that it becomes a full CM cell. Referring to FIG. 41b, X light temporarily leaving each CM cell 404 via its part 406 of print area 118 is formed with XRic light reflected by its ISCC part, any XEic light emitted by its ISCC part, and any substructure-reflected XRsb light passing through its ISCC part. A light continues to leave each other cell 404 during the changed state. The cellular CC control signals provided to all CM cells 404 implement the general CC control signal.

The IS part of each CM cell 404 responds to object 104 impacting OC area 116 so as to meet the cellular TH impact criteria for that CM cell 404 by providing a principal cellular ID impact effect usually resulting from the pressure of the impact on area 116 or from deformation that object 104 causes along SF DF area 122. The CC part of each CM cell 404 responds (a) in some general OI embodiments to its cellular ID impact effect by causing that CM cell 404 to temporarily appear as color X or (b) in other general OI embodiments to its cellular CC control signal generated in response to its cellular impact effect sometimes dependent on other impact criteria also being met in those other embodiments by causing that CM cell 404 to temporarily appear as color X. Specifically, the CC part of each CM cell 404 changes in such a way that XRcc light reflected by its CC part and any XEcc light emitted by its CC part temporarily leave its CC part. Total XTcc light temporarily leaving the CC part of each CM cell 404 via its IF part 424 consists of XRcc light, any XEcc light, and any XRsb light passing through its CC part. X light temporarily leaving each CM cell 404 via its part 406 of print area 118 consists of XRcc light and any XEcc and XRsb light passing through its IS part and any ARis light reflected by its IS part. A light continues to leave the remainder of cells 404. The cellular impact effects of all CM cells 404 implement the general impact effect.

The IS and CC parts of each cell 404 here can, subject to the potential modifications described below for FIG. 52, be respectively embodied in any of the ways described above for embodying components 182 and 184 of OI structure 180. For instance, the cell's CC part can be embodied as reduced-size CR or CE CC structure in basically any of the ways that CC component 184 is embodied as a CR or CE CC component.

Figure 43A:
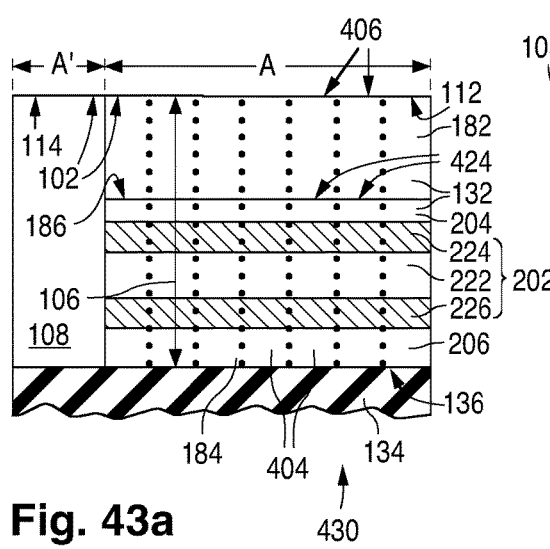
Figure 43B:
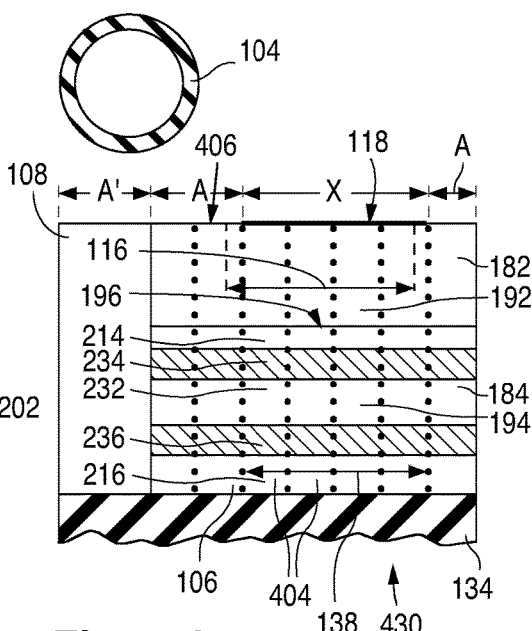

FIGS. 43a and 43b illustrate an embodiment 430 of OI structure 420. OI structure 430 is also an embodiment of OI structure 200 and thus of OI structure 180. CC component 184 is formed with assembly 202 and optional auxiliary layers 204 and 206. See FIG. 43a. The CC part of each cell 404 consists of (a) a part, termed an (electrode) AB part, of assembly 202, (b) a part, termed an NA part, of NA layer 204, and (c) a part, termed an FA part, of FA layer 206. The AB, NA, and FA parts of each cell 404 each extend between the cell's lateral boundary portions in component 184. The NA part of each cell 404 extends to its part 424 of interface 186. The FA part of each cell 404 extends to its part of interface 136. The AB part of each cell 404 extends between its NA and FA parts.

The AB, NA, and FA parts of each cell 404 respectively operate the same during the normal state as assembly 202 and auxiliary layers 204 and 206 in OI structure 200. The cell's FA part specifically operates during the normal state according to a light non-outputting normal cellular far auxiliary mode or one of several versions of a light outputting normal cellular far auxiliary mode. "CFA" hereafter means cellular far auxiliary. Largely no light leaves the FA part of each cell 404 along its AB part in the light non-outputting normal CFA mode. The light outputting normal CFA mode consists of one or both of the following actions: (a) a substantial part of any ARsb light leaving substructure 134 along the FA part of each cell 404 passes through its FA part and (b) ADfa light formed with any ARfa light reflected by its FA part and any AEfa light emitted by its FA part leaves its FA part along its AB part. Total ATfa light normally leaving the FA part of each cell 404 along its AB part consists of any such ARfa, AEfa, and ARsb light.

The AB part of each cell 404 operates during the normal state according to a light non-outputting normal cellular assembly mode or one of a group of versions of a light outputting normal cellular assembly mode. "CAB" hereafter means cellular assembly. Largely no light leaves the AB part of each cell 404 along its NA part in the light non-outputting normal CAB mode. The light outputting normal CAB mode consists of one or more of the following actions: (a) a substantial part of any ARsb light passing through the FA part of each cell 404 passes through its AB part, (b) substantial parts of any ARfa and AEfa light provided by its FA part pass through its AB part, and (c) ADab light formed with any ARab light reflected by its AB part and any AEab light emitted by its AB part leaves its AB part along its NA part. Total ATab light normally leaving the AB part of each cell 404 along its NA part consists of any such ARab, AEab, ARfa, AEfa, and ARsb light.

Each cell's NA part operates as follows during the normal state. Substantial parts of any ARab, AEab, ARfa, AEfa, and ARsb light leaving the AB part of each cell 404 pass through its NA part. In addition, the NA part of each cell 404 may normally reflect ARna light. Total ATcc light normally leaving the NA part of each cell 404, and thus its CC part, via its IF part 424 consists of any such ARab, AEab, ARfa, AEfa, ARna, and ARsb light.

The IS part of each cell 404 operates the same during the normal state as IS component 182 of OI structure 420 where ARcc light in structure 420 consists of any ARab, ARfa, ARna, and ARsb light and where AEcc light in structure 420 consists of any AEab and AEfa light. Substantial parts of any ARab, AEab, ARfa, AEfa, ARna, and ARsb light leaving the NA part of each cell 404 pass through its IS part. Including any ARis light normally reflected by the IS part of each cell 404, any ARab, AEab, ARfa, AEfa, ARis, ARna, and ARsb light normally leaving its IS part, and thus that cell 404 itself, via its SF part 406 form A light.

Upon going to the changed state, the AB, NA, and FA parts of each CM cell 404 respectively respond to the cellular impact effect provided by its IS part the same as AB segment 212 and auxiliary segments 214 and 216 in IDVC portion 138 of OI structure 200 respond to the general impact effect. See FIG. 43b. More particularly, the FA part of each CM cell 404 temporarily operates, usually passively, according to a light non-outputting changed CFA mode or one of several versions of a light outputting changed CFA mode. Largely no light leaves the FA part of each CM cell 404 along its AB part in the light non-outputting changed CFA mode. The light outputting changed CFA mode consists of one or both of the following actions: (a) a substantial part of any XRsb light leaving substructure 134 along the FA part of each CM cell 404 passes through its FA part and (b) XDfa light formed with any XRfa light reflected by its FA part and any XEfa light emitted by its FA part leaves its FA part along its AB part. Reflection of XRfa light or/and emission of XEfa light leaving the FA part of each CM cell 404 usually occur under control of its AB part operating in response (a) in first cellular OI embodiments to its cellular impact effect for the impact meeting its cellular TH impact criteria or (b) in second cellular OI embodiments to its cellular CC control signal generated in response to its cellular impact effect sometimes (conditionally) dependent on other impact criteria also being met in the second embodiments. If FA layer 206 normally reflects ARfa light or/and emits AEfa light, a change in which largely no light temporarily leaves the FA part of each CM cell 404 likewise usually occurs under control of its AB part responding to its cellular impact effect or its cellular control signal. Total XTfa light leaving the FA part of each CM cell 404 along its AB part consists of any such XRfa, XEfa, and XRsb light.

The AB part of each CM cell 404 responds (a) in the first cellular OI embodiments to its cellular impact effect or (b) in the second cellular OI embodiments to its cellular CC control signal generated in response to the effect sometimes dependent on both its cellular TH impact criteria and other criteria being met by temporarily operating according to a light non-outputting changed CAB mode or one of a group of versions of a light outputting changed CAB mode. Largely no light leaves the AB part of each CM cell 404 along its NA part in the light non-outputting changed CAB mode. The light outputting changed CAB mode consists of one or more of the following actions: (a) a substantial part of any XRsb light passing through the FA part of each CM cell 404 passes through its AB part, (b) substantial parts of any XRfa and XEfa light provided by its FA part pass through its AB part, and (c) XDab light formed with any XRab light reflected by its AB part and any XEab light emitted by its AB part leaves its AB part along its NA part. Total XTab light leaving the AB part of each CM cell 404 along its NA part consists of any such XRab, XEab, XRfa, XEfa, and XRsb light.

The NA part of each CM cell 404 operates as follows during the changed state. Substantial parts of any XRab, XEab, XRfa, XEfa, and XRsb light leaving the AB part of each CM cell 404 pass through its NA part. If NA layer 204 reflects ARna light during the normal state, the NA part of each CM cell 404 reflects XRna light, usually largely ARna light, during the changed state. If the NA part of each CM cell 404 undergoes a change so that XRna light significantly differs from ARna light, the change usually occurs under control of the AB part of that CM cell 404 in responding to its cellular impact effect or to its cellular control signal. Total XTcc light leaving the NA part of each CM cell 404, and thus its CC part, along its IF part 424 consists of any such XRab, XEab, XRfa, XEfa, XRna, and XRsb light.

The IS part of each CM cell 404 operates the same during the changed state as IS segment 192 of OI structure 420 where XRcc light consists of any XRab, XRfa, XRna, and XRsb light and where XEcc light consists of any XEab and XEfa light. Substantial parts of any XRab, XEab, XRfa, XEfa, XRna, and XRsb light leaving the AB part of each CM cell 404 pass through its IS part. Including any ARis light reflected by the IS part of each CM cell 404, any XRab, XEab, XRfa, XEfa, ARis, XRna, and XRsb light leaving its IS part, and thus that CM cell 404 itself, via its part 406 of print area 118 form X light.

Analogous to what occurs with the normal and changed GAB modes, either of the changed CAB modes, including any of the versions of the light outputting changed CAB mode, can generally be combined with either of the normal CAB modes, including any of the versions of the light outputting normal CAB mode, in an embodiment of CC component 184 except for combining the light non-outputting changed CAB mode with the light non-outputting normal CAB mode provided, however, that the operation of the changed CAB mode is compatible with the operation of the normal CAB mode. As with the GFA modes, this compatibility requirement may effectively preclude combining certain versions of the light outputting changed CAB mode with certain versions of the light outputting normal CAB mode.

Assembly 202 here consists of core layer 222 and electrode structures 224 and 226. Each cell's AB part is formed with (a) a part, termed a core part, of layer 222, (b) a part, termed an NE part, of NE structure 224, and (c) a part, termed an FE part, of FE structure 226. The core part of each cell 404 extends between its NE and FE parts which respectively meet its NA and FA parts. The core, NE, and FE parts of each cell 404 also each extend between its lateral boundary portions in assembly 202.

Figure 53:
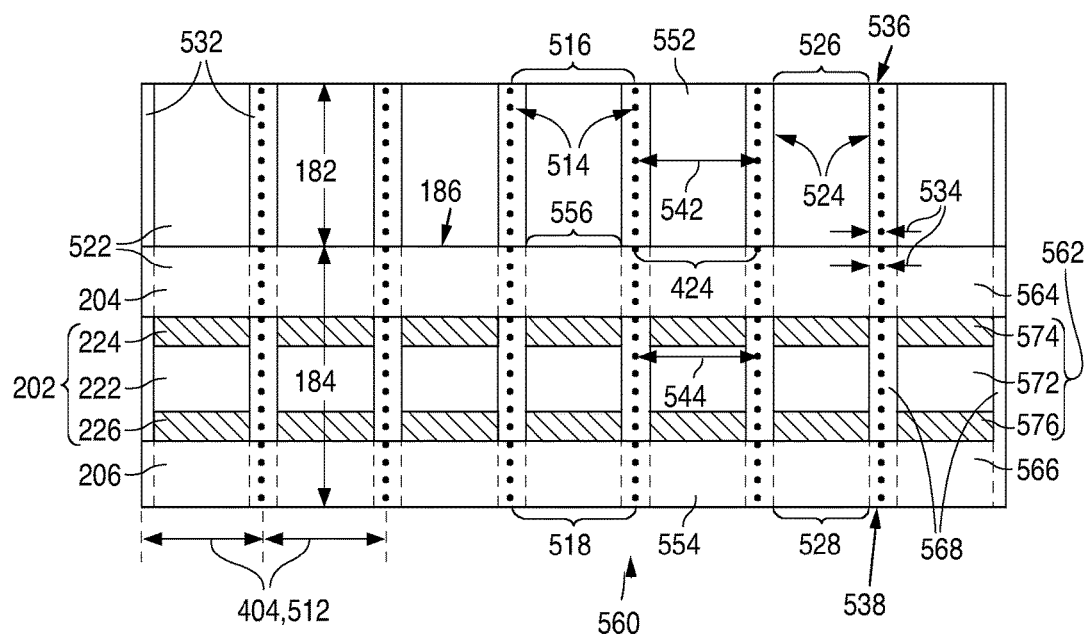
FIG. 53 is an expanded cross-sectional view of an embodiment of the cellular ISCC structure in the OI structure of FIGS. 43*a* and 43*b* or 46*a* and 46*b*.

Each cell's NE part contains a near electrode of the electrode layer in NE structure 224. Each cell's FE part similarly contains a far electrode of the electrode layer in FE structure 226. The electrodes in each cell 404 are at least partly located opposite each other. At least part, termed the core section, of the core part of each cell 404 is located at least partly between its electrodes. FIG. 53, dealt with below, presents an example of this configuration for the core section and electrodes of each cell 404.

The core, NE, and FE parts of each cell 404 respectively operate the same during the normal state as core layer 222, NE structure 224, and FE structure 226 in OI structure 200. Controllable voltage $V_n$ on each cell's near electrode is normally at near normal control value $V_{nN}$. Controllable voltage $V_f$ on each cell's far electrode is normally at far normal control value $V_{fN}$. Control voltage $V_{nf}$ applied by the electrodes in each cell 404 across its core section is normally at normal control value $V_{nfN}$ equal to $V_{nN}-V_{fN}$. Value $V_{nfN}$ is chosen such that each cell 404 normally appears as color A.

With the foregoing in mind, each cell's FE part undergoes the following normal-state light processing. Largely no light leaves the FE part of each cell 404 along its core part if its AB part is in the light non-outputting normal CAB mode. One or more of the following actions occur with the FE part of each cell 404 if its AB part is in the light outputting normal CAB mode: (a) a substantial part of any ARsb light passing through its FA part passes through its FE part, (b) substantial parts of any ARfa and AEfa light provided by its FA part pass through its FE part, and (c) its FE part reflects ARfe light leaving its FE part along its core part. Total ATfe light normally leaving the FE part of each cell 404 along its core part consists of any such ARfa, AEfa, ARfe, and ARsb light.

Each cell's core part undergoes the following normal-state light processing. Largely no light leaves the core part of each cell 404 along its NE part if its AB part is in the light non-outputting normal CAB mode. One or more of the following actions occur in the core part of each cell 404 if its AB part is in the light outputting normal CAB mode so as to implement that mode for its core part: (a) a substantial part of any ARsb light passing through its FE part passes through its core part, (b) substantial parts of any ARfa and AEfa light passing through its FE part pass through its core part, (c) a substantial part of any ARfe light reflected by its FE part passes through its core part, and (d) ADcl light formed with any ARcl light reflected by its core part and any AEcl light emitted by its core part leaves its core part along its NE part. Total ATcl light normally leaving the core part of each cell 404 along its NE part consists of any such ARcl, AEcl, ARfa, AEfa, ARfe, and ARsb light.

Each cell's NE part undergoes the following normal-state light processing. Substantial parts of any ARcl, AEcl, ARfa, AEfa, ARfe, and ARsb light leaving the core part of each cell 404 pass through its NE part. In addition, the NE part of each cell 404 may normally reflect ARne light. Total ATab light normally leaving the NE part, and thus the AB part, of each cell 404 along its NA part consists of any such ARcl, AEcl, ARfa, AEfa, ARne, ARfe, and ARsb light. Total ATcc light of each cell 404 consists of any ARcl, AEcl, ARfa, AEfa, ARna, ARne, ARfe, and ARsb light leaving that cell 404 along its IF part 424. Any ARcl, AEcl, ARfa, AEfa, ARis, ARna, ARne, ARfe, and ARsb light normally leaving each cell 404 via its SF part 406 form A light.

In going into the changed state, control voltage $V_{nf}$ applied by the two electrodes in each CM cell 404 across its core section goes to changed control value $V_{nfC}$ equal to $V_{nC}-V_{fC}$ in response (a) in the first cellular OI embodiments to its cellular impact effect provided by its IS part for the impact meeting its cellular TH impact criteria or (b) in the second cellular OI embodiments to its cellular CC control signal generated in response to the effect sometimes dependent on other impact criteria also being met in the second embodiments. Voltage $V_n$ on the near electrode in each CM cell 404 is at near CC value $V_{nC}$. Voltage $V_f$ on the far electrode in each CM cell 404 is at far CC value $V_{fC}$. As mentioned above, CC values $V_{nC}$ and $V_{fC}$ are chosen such that changed value $V_{nfC}$ differs materially from normal value $V_{nfN}$. The $V_{nf}$ change across the core section in each CM cell 404 causes total light XTcl leaving its core part during the changed state to differ materially from total light ATcl leaving its core part during the normal state. Total XTab light of each CM cell 404 differs materially from its total ATab light. This enables each CM cell 404 to temporarily appear as color X.

The FE part of each CM cell 404 undergoes the following changed-state light processing. Largely no light leaves the FE part of each CM cell 404 if its AB part is in the light non-outputting changed CAB mode. One or more of the following actions occur with the FE part of each CM cell 404 if its AB part is in the light outputting changed CAB mode: (a) a substantial part of any XRsb light passing through its FA part passes through its FE part, (b) substantial parts of any XRfa and XEfa light provided by its FA part pass through its FE part, and (c) its FE part reflects XRfe light leaving its FR part along its core part. Total XTfe light leaving the FE part of each CM cell 404 along its core part consists of any such XRfa, XEfa, XRfe, and XRsb light.

The core part of each CM cell 404 responds (a) in the first cellular OI embodiments to its cellular impact effect or (b) in the second cellular OI embodiments to its cellular CC control signal generated in response to the effect sometimes dependent on both its cellular TH impact criteria and other criteria being met by undergoing the following changed-state light processing. Largely no light leaves the core part of each CM cell 404 along its NE part if its AB part is in the light non-outputting changed CAB mode. One or more of the following actions occur in the core part of each CM cell 404 if its AB part is in the light outputting changed CAB mode so as to implement that mode for its core part: (a) a substantial part of any XRsb light passing through its FE part passes through its core part, (b) substantial parts of any XRfa and XEfa light passing through its FE part pass through its core part, (c) a substantial part of any XRfe light reflected by its FE part passes through its core part, and (d) XDcl light formed with XRcl light reflected by its core part and any XEcl light emitted by its core part leaves its core part along its NE part. Total XTcl light of each CM cell 404 consists of any such XRcl, XEcl, XRfa, XEfa, XRfe, and XRsb light.

The NE part of each CM cell 404 undergoes the following changed-state light processing. Substantial parts of any XRcl, XEcl, XRfa, XEfa, XRfe, and XRsb light leaving the core part of each CM cell 404 pass through its NE part. If the NE part of each cell 404 reflects ARne light during the normal state, the NE part of each CM cell 404 reflects XRne light, usually largely ARne light, during the changed state. Total XTab light leaving the NE part, and thus the AB part, of each CM cell 404 along its NA part consists of any such XRcl, XEcl, XRfa, XEfa, XRne, XRfe, and XRsb light. Total XTcc light of each CM cell 404 consists of any XRcl, XEcl, XRfa, XEfa, XRna, XRne, XRfe, and XRsb light leaving that CM cell 404 via its IF part 424. Any XRcl, XEcl, XRfa, XEfa, ARis, XRna, XRne, XRfe, and XRsb light leaving the IS part of each CM cell 404, and thus that CM cell 404 itself, via its part 406 of print area 118 form X light.

The AB, NA, and FA parts of each cell 404 can, subject to the potential modifications described below for FIG. 53, be embodied in any of the ways described above for respectively embodying assembly 202 and auxiliary layers 204 and 206 in OI structure 200. Also subject to those potential modifications, the core, NE, and FE parts of each cell's AB part can be embodied in any of the ways described above for respectively embodying core layer 222 and electrode structures 224 and 226 in OI structure 200.

The NA part of each cell 404 can include a programmable RA part (not separately shown), typically separated from that cell's AB part by insulating material, for being electrically programmed subsequent to manufacture of OI structure 430 for adjusting colors A and X for that cell 404. The RA cell parts are preferably clear transparent prior to programming. The programming causes the RA part to become tinted transparent or more tinted transparent if it was originally tinted transparent. ARna and Xna light are thereby adjusted for each cell 404. As a result, colors A and X for each cell 404 are respectively adjusted from pre-programming colors $A_i$ and $X_i$ to post-programming colors $A_f$ and $X_f$.

The programming of the RA cell parts can be done by various techniques. In one technique, a blanket conductive programming layer is temporarily deployed on SF zone 112 prior to programming. A programming voltage is applied between the programming layer and the NE part of each cell 404 sufficiently long to cause its RA part to change to a desired tinted transparency. The programming layer is usually removed from zone 112. In another technique, each cell 404 includes a permanent conductive programming part, typically constituted with part of the NA part of that cell 404, lying between its SF part 406 and its RA part. A programming voltage is applied between the programming part of each cell 404 and its NE part sufficiently long to cause its RA part to change to a desired tinted transparency. The tinted adjustment can be caused by introduction of RA ions into the RA parts.

Alternatively, the core part of each cell 404 can include a programmable RA part lying along that cell's NE part and having the foregoing transparency characteristics. The core RA part of each cell 404 is programmed to a desired tinted transparency by applying a programming voltage between its NE and FE parts for a suitable time period. Introduction of RA ions into each cell's core RA part can cause the tinting adjustment. The magnitude of the programming voltage is usually much greater than the $V_{nfN}$ and $V_{nfC}$ magnitudes. Regardless of whether the RA part of each cell 404 is located in its NA or NE part, the programming voltage can be a selected one of plural different programming values for causing final color $A_f$ or $X_f$ to be a corresponding one of like plural different specific final principal or changed colors.

The RA part of each cell 404 can include three or more transparent RA subparts, each programmable to reflect light of a different one of three or more primary colors, e.g., red, green, and blue, combinable to produce many colors usually including white. The NE part of each cell 404 then includes three or more NE subparts respectively adjacent the RA subparts. One or more, up to all, of the RA subparts of each cell 404 are programmed to cause each programmed RA subpart to change to a desired tinted transparency of that subpart's primary color. Color A can thus be adjusted across a broad realm of specific colors during the normal state. The same applies to color X for each CM cell 404 during the changed state. Programming is the same as described above except that, depending on which of the preceding cell arrangements is used, a programming voltage is applied between the NE subpart of each programmed RA subpart and its FE part, its programming part, or the programming layer. Adjusting the programming voltage, value or/and duration, for each programmed RA subpart usually enables its final tinted transparency to be programmably adjusted.

When LE elements fixedly located in the core parts are used in color changing, the core part of each cell 404 has a core-part emissive area across which AEcl light is emitted during the normal state in the mid-emission EN and EN-ET embodiments and XEcl light is emitted during the changed state in the mid-emission ET and EN-ET embodiments if that cell 404 is a CM cell. The core part of each cell 404 can include three or more core subparts, each containing one or more LE elements operable to emit light of a different one of three or more primary colors, e.g., again red, green, and blue, combinable to produce many colors usually including white. The core subpart of each cell 404 usually emits that subpart's primary color across a core-part emissive subarea of that core part's emissive area. The standard human eye/brain would interpret the combination of the primary colors of the light emitted by the core subparts in each cell 404 as color AEcl during the normal state in the mid-emission EN and EN-ET embodiments if the AEcl light traveled to the human eye unaccompanied by other light. The same applies to color XEcl and XEcl light for each CM cell 404 during the changed state in the mid-emission ET and EN-ET embodiments.

Each core subpart can be configured to receive a voltage causing the radiosity of the primary-color light emitted from that subpart's emissive subarea to be fixedly adjusted. The radiosities of the light of the primary colors emitted from each core-part emissive area can then be programmably adjusted subsequent to manufacture of OI structure 430 for enabling AEcl light, and thus A light, in the mid-emission EN and EN-ET embodiments to be fixedly adjusted and for enabling XEcl light, and thus X light, in the mid-emission ET and EN-ET embodiments to be fixedly adjusted. The programming is performed, as necessary, for each primary color, by providing the core subparts operable to emit light of that primary color with a programming voltage that causes them to emit light of their primary color at radiosity suitable for the desired AEcl light in the mid-emission EN and EN-ET embodiments and suitable for the desired XEcl light in the mid-emission ET and EN-ET embodiments. Programming of the RA cell parts and core-part emissive areas can be used in the mid-emission embodiments to expand the realms of specific colors that embody colors A and X.

Figure 44A:
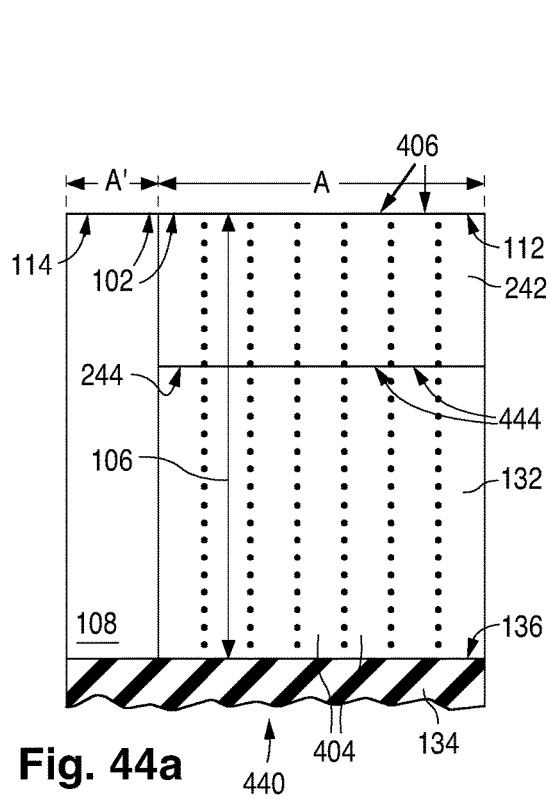
Figure 44B:
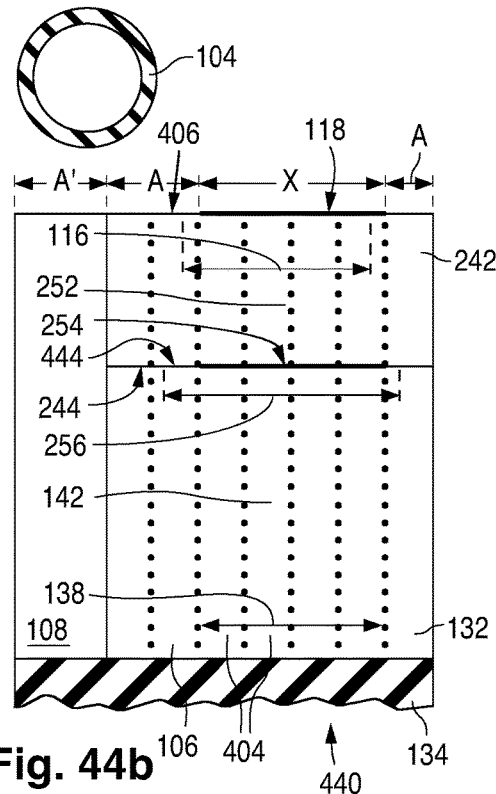

FIGS. 44a and 44b illustrate an extension 440 of OI structure 410. OI structure 440 is also an embodiment of OI structure 240. VC region 106 here consists of SF structure 242 and underlying ISCC structure 132 which meet along interface 244. See FIG. 44a. SF structure 242 again performs various functions usually including protecting ISCC structure 132 from damage and/or spreading pressure to improve the matching between print area 118 and OC area 116 during impact. Structure 242 here likewise may provide velocity restitution matching or/and strongly influence principal color A or/and changed color X. Each cell 404 here consists of (a) a part, termed the SS part, of structure 242 and (b) the underlying ISCC part of ISCC structure 132. The SS and ISCC parts of each cell 404 meet along a part 444 of interface 244.

Each cell's ISCC part here operates the same during the normal state as in OI structure 410 except that light leaving the ISCC part of each cell 404 via its SF part 406 in structure 410 leaves its ISCC part via its part 444 of interface 244 here. Total ATic light normally leaving the ISCC part of each cell 404 via its IF part 444 consists of ARic light reflected by its ISCC part, any AEic light emitted by its ISCC part, and any ARsb light passing through its ISCC part. Including any ARss light normally reflected by the SS part of each cell 404, A light is formed with ARic light and any AEic, ARss, and ARsb light normally leaving its SS part, and thus that cell 404, via its SF part 406.

Referring to FIG. 44b, the impact of object 104 on OC area 116 creates excess SF pressure along area 116. The excess SF pressure is transmitted through SF structure 242 to interface 244 producing excess internal pressure along DP IF area 256. Each cell 404 having its IF part 444 partly or fully located in area 256 is a candidate for a CM cell. A candidate cell 404 temporarily becomes a CM cell if the excess internal pressure along its IF part 444 meets principal cellular excess internal pressure criteria which embody the cellular TH impact criteria. The cellular excess internal pressure criteria require that the excess internal pressure at one or more points along IF part 444 of a cell 404 equal or exceed a local TH value for that cell 404 to temporarily be a CM cell.

During the changed state, the ISCC part of each CM cell 404 responds (a) in some cellular OI embodiments to the excess internal pressure along its IF part 444 meeting its cellular excess internal pressure criteria or (b) in other OI embodiments to its cellular CC control signal generated in response to the excess internal pressure along its IF part 444 meeting its cellular excess internal pressure criteria sometimes dependent on other impact criteria also being met in those other embodiments by changing in such a way that XRic light reflected by the ISCC part of that CM cell 404 and any XEic light emitted by its ISCC part temporarily leave that part via its IF part 444. Total XTic light leaving the ISCC part of each CM cell 404 via its IF part 444 consists of XRic light, any XEic light, and any XRsb light passing through its ISCC part. Including any ARss light reflected by the SS part of each CM cell 404, X light is formed with XRic light and any XEic, ARss, and XRsb light leaving its SS part, and thus that CM cell 404, via its part 406 of print area 118.

For the protective function, the SS part of each cell 404 protects its ISCC part from damage in the above-described way that SF structure 242 in OI structure 240 protects ISCC structure 132 from damage.

For pressure spreading, SF structure 242 is again a PS structure, "PS" again meaning pressure-spreading. The SS and ISCC parts of each cell 404 respectively are PS and PSCC parts which adjoin each other along its part 444 of interface 244 again serving as an internal PS surface, "PSCC" again meaning pressure-sensitive color-change. The PSCC part of each cell 404 causes it to temporarily appear as color X if excess internal pressure along its IF part 444 meets the principal cellular excess internal pressure criteria.

As to the benefits of pressure spreading, consider what happens in OI structure 410 lacking SF structure 242. Referring to FIG. 41b corresponding to FIG. 44b, each cell 404 having its SF part 406 located partly or fully in OC area 116 in OI structure 410 is, as mentioned above, a candidate for a CM cell. Certain of those candidate cells 404 in structure 410 become CM cells which temporarily appear as color X. Returning to FIG. 44b, more cells 404 here are candidates for CM cells than in structure 410 because DP IF area 256 extends laterally beyond oppositely situated area 116. Depending on the cellular excess internal pressure criteria, more cells 404 can be CM cells here than in structure 410. Importantly, appropriate choice of the cellular excess internal pressure criteria enables print area 118 to closely match OC area 116.

Figure 45A:
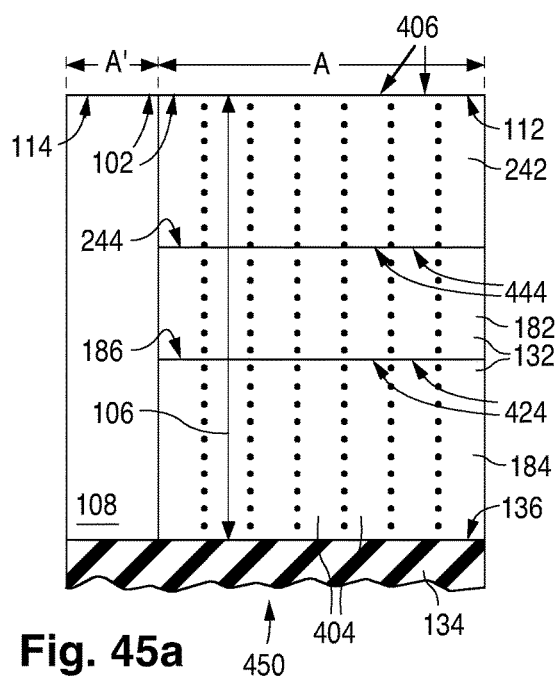
Figure 45B:
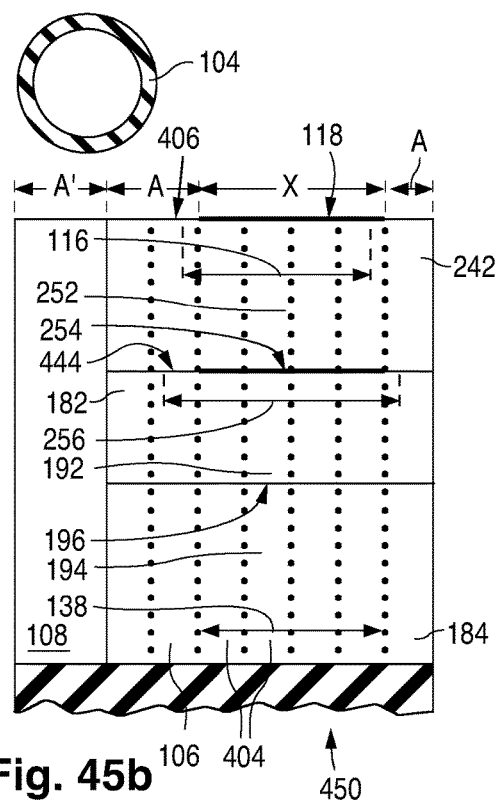

FIGS. 45a and 45b illustrate an embodiment 450 of OI structure 440. OI structure 450 is also an extension of OI structure 420 and an embodiment of OI structure 260. VC region 106 here consists of SF structure 242 and underlying ISCC structure 132 formed with components 182 and 184.

See FIG. 45a. SF structure 242 here is configured and operable the same as in OI structure 440. Each cell 404 consists of an SS part of structure 242 and the underlying ISCC part of ISCC structure 132, the ISCC part being formed with an IS part of IS component 182 and a CC part of CC component 184 deployed as in OI structure 420.

Each cell's IS and CC parts here are configured and operable the same as in OI structure 420. Total ATic light normally leaving the IS part, and thus the ISCC part, of each cell 404 via its IF part 444 consists of ARcc light and any AEcc, ARis, and ARsb light. ARcc light and any AEcc, ARss, ARis, and ARsb light normally leave each cell 404 via its part 406 of SF zone 112 to form A light.

Referring to FIG. 45b, the IS part of each CM cell 404 provides a principal cellular impact effect in response to object 104 impacting the SS part of that CM cell 404 along its surface part 406 so as to meet its cellular TH impact criteria. The cellular impact signal of each CM cell 404 is specifically provided during the changed state in response to the excess internal pressure along IF part 444 of that CM cell 404 meeting the above-mentioned cellular excess internal pressure criteria which embody the cellular TH impact criteria. The CC part of each CM cell 404 responds (a) in some cellular OI embodiments to its cellular impact effect or (b) in other cellular OI embodiments to its cellular CC control signal generated in response to its impact effect sometimes dependent on other impact criteria also being met in those other embodiments by changing in such a way that total XTic light leaving its IS part, and thus its ISCC part, via its IF part 444 consists of XRcc light and any XEcc, ARis, and XRsb light. XRcc light and any XEcc, ARss, ARis, and XRsb light leave each CM cell 404 via its part 406 of area 118 to form X light.

FIGS. 46a and 46b illustrate an embodiment 460 of OI structure 450. OI structure 460 is also an extension of OI structure 430 and an embodiment of OI structure 270. VC region 106 here consists of SF structure 242 and ISCC structure 132 formed with IS component 182 and underlying CC component 184 consisting of subcomponents 204, 224, 222, 226, and 206 deployed as in OI structure 430. See FIG. 46a. SF structure 242 here is configured and operable the same as in OI structure 450 and thus the same as in OI structure 440. Each cell 404 consists of an SS part of SF structure 242 and the underlying ISCC part of ISCC structure 132, the ISCC part being formed with an IS part of IS component 182 and the underlying CC part of CC component 184. Each cell's CC part consists of an NA part of NA layer 204, an NE part of NE structure 224, a core part of core layer 222, an FE part of FE structure 226, and an FA part of FA layer 206 deployed as in OI structure 430.

The IS, NA, NE, core, FE, and NA parts of each cell 404 are configured and operable the same as in OI structure 430. Total ATab light of each cell 404 consists of any ARcl, AEcl, ARfa, AEfa, ARne, ARfe, and ARsb light normally leaving that cell 404 along its NA part. Any ARcl, AEcl, ARfa, AEfa, ARss, ARis, ARna, ARne, ARfe, and ARsb light normally leave each cell 404 via its part 406 of SF zone 112 to form A light.

Referring to FIG. 46b, the IS part of each CM cell 404 again provides a principal cellular impact effect in response to object 104 impacting the SS part of that CM cell 404 along its SF part 406 so as to meet its cellular TH impact criteria. The cellular impact signal of each CM cell 404 is specifically provided during the changed state in response to the excess internal pressure along IF part 444 of that CM cell 404 meeting the cellular excess internal pressure criteria which embody the cellular TH impact criteria. The AB part of each CM cell 404 responds (a) in some cellular OI embodiments to its cellular impact effect or (b) in other cellular OI embodiments to its cellular CC control signal generated in response to its impact effect sometimes dependent on both its cellular TH impact criteria and other criteria being met by changing so that its total XTab light consists of any XRcl, XEcl, XRfa, XEfa, XRne, XRfe, and XRsb light leaving that CM cell 404 along its NA part. Any XRcl, XEcl, XRfa, XEfa, ARss, ARis, XRna, XRne, XRfe, and XRsb light leave each CM cell 404 along its part 406 of SF zone 112 to form X light.

The cellular impact effects can be transmitted outside VC region 106. For instance, the cellular impact effects can respectively take the form of multiple cellular location-identifying impact signals supplied to a separate cell CC duration controller as described below for FIGS. 59a and 59b or multiple characteristics-identifying impact signals supplied to a separate intelligent cell CC controller as described below for FIGS. 69a and 69b.

FIGS. 47a and 47b illustrate an extension 470 of OI structure 410 provided with CC duration extended in a pre-established deformation-controlled manner. OI structure 470 is also an embodiment of OI structure 280. VC region 106 here consists of ISCC structure 132 and underlying DE structure 282. See FIG. 47a. Each cell 404 consists of (a) an ISCC part of ISCC structure 132 and (b) a part, termed a DE part, of DE structure 282. The ISCC and DE parts of each cell 404 meet along a part 474 of interface 284.

Each cell 404 here operates the same during the normal state as VC region 106 in OI structure 280. A light normally leaving each cell 404 via its SF part 406 is formed with ARic light reflected by its ISCC part, any AEic light emitted by its ISCC part, any ARde passing through its ISCC part, and any ARsb light passing through its ISCC and DE parts.

The ISCC part of each cell 404 having its SF part 406 partly or fully in SF DF area 122 responds to object 104 impacting its SF part 406 by deforming along a cellular SF DF area constituted partly or fully with its SF part 406 so as to become a candidate for a CM cell. See FIG. 47b. A candidate cell 404 temporarily becomes a CM cell if the impact on that cell's SF DF area meets the cellular TH impact criteria, i.e., if that cell's SF deformation meets principal cellular SF DF criteria embodying the cellular TH impact criteria. The deformation along the SF DF area of each CM cell 404 then causes it to temporarily appear as color X for base duration $\Delta t_{drbs}$ during the changed state.

The DE part of each candidate cell 404 responds to the deformation along its SF DF area, and thus to object 104 impacting its SF part 406, by deforming along a cellular internal DF area constituted partly or fully with its part 474 of interface 284. Since interface 284 is a surface of ISCC structure 132, the deformation of the DE part of each candidate cell 404 along its internal DF area causes its ISCC part to deform. If a candidate cell 404 is a CM cell, the internal deformation of its ISCC part along its internal DF area causes that CM cell 404 to further temporarily appear as color X for extension duration $\Delta t_{drext}$. Automatic duration $\Delta t_{drau}$ for that CM cell 404 lengthens from $\Delta t_{drbs}$ to $\Delta t_{drbs} + \Delta t_{drext}$.

Each CM cell 404 here undergoes the same changed-state light processing as in IDVC portion 138 of OI structure 280. X light leaving each CM cell 404 via its part 406 of print area 118 is formed with XRic light reflected by its ISCC part, any XEic light emitted by its ISCC part, any XRde passing through its ISCC part, and any XRsb light passing through its ISCC and DE parts.

FIGS. 48a and 48b illustrate an extension 480 of OI structure 430 provided with CC duration extended in a pre-established deformation-controlled manner. OI structure 480 is also an embodiment of OI structure 300. VC region 106 here contains DE structure 302 lying between overlying IS component 182 and underlying CC component 184 to respectively meet them along interfaces 304 and 306. See FIG. 48a. Each cell 404 consists of (a) an ISCC part of ISCC structure 132 and (b) a part, termed a DE part, of DE structure 302, the ISCC part being formed with (a) an IS part of IS component 182 located above the DE part and (b) a CC part of CC component 184 located below the DE part. Each cell's IS and DE parts meet along a part 484 of interface 304. Each cell's DE and CC parts meet along a part 486 of interface 306. Each cell's CC part is formed with an NA part of NA layer 204, an NE part of NE structure 224, a core part of core layer 222, an FE part of FE structure 226, and an FA part of FA layer 206 deployed as in OI structure 430.

Each cell 404 here operates the same during the normal state as VC region 106 of OI structure 300. Total ATcc light of each cell 404 consists of ARcc light reflected by its CC part, any AEcc light emitted by its CC part, and any ARsb light passing through its CC part. A light normally leaving each cell 404 via its SF part 406 is formed with ARcc light passing through its IS and DE parts, any AEcc and ARsb light passing through its IS and DE parts, any ARde light passing through its IS part, and any ARis light reflected by its IS part. Each cell's NA, NE, core, FE, and FA parts here operate the same during the normal state as in OI structure 430.

The IS part of each cell 404 having its SF part 406 partly or fully in SF DF area 122 responds to object 104 impacting its SF part 406 by deforming along a cellular SF DF area constituted partly or fully with its SF part 406. See FIG. 48b. That cell 404 temporarily becomes a CM cell if the cellular TH impact criteria are met, i.e., if the SF deformation meets principal cellular SF DF criteria embodying the cellular TH impact criteria so that the changed state begins. The IS part of each CM cell 404 then provides a cellular impact effect, termed the principal cellular first impact effect. The principal cellular first impact effects provided by the IS parts of all CM cells 404 form the principal general first impact effect provided by IS component 182 of OI structure 300 in response to the impact.

The CC part of each CM cell 404 here responds to the cellular first impact effect provided from its IS part by changing the same as CC segment 194 in OI structure 300 changes in response to the general first impact effect. Total XTcc light of each CM cell 404 consists of XRcc light reflected by its CC part, any XEcc light emitted by its CC part, and any XRsb light passing through its CC part. X light leaving each CM cell 404 via its part 406 of print area 118 is formed with XRcc light passing through its IS and DE parts, any XEcc and XRsb light passing through its IS and DE parts, any ARde light passing through its IS part, and any ARis light reflected by its IS part. This enables each CM cell 404 to temporarily appear as color X for base duration $\Delta t_{drbs}$ as VC region 106 enters the changed state. The NA, NE, core, FE, and FA parts of each CM cell 404 here operate the same during the changed state as in OI structure 430.

The DE part of each candidate cell 404 responds to the deformation along its SF DF area, and thus to object 104 impacting its SF part 406, by deforming along an ID internal DF area constituted partly or fully with its IF part 484. Since interface 304 is also a surface of IS component 182, the deformation of the DE part of each candidate cell 404 along its internal DF area causes its IS part to deform. For each candidate cell 404 constituting a CM cell, its IS part responds to the deformation along its internal DF area by providing another cellular impact effect, termed the principal cellular second impact effect. The CC part of each CM cell 404 responds to its principal cellular second impact effect by causing it to further temporarily appear as color X for extension duration $\Delta t_{drext}$. Automatic duration $\Delta t_{drau}$ again lengthens to $\Delta t_{drbs}$–$\Delta t_{drext}$. The light processing in each CM cell 404 is the same during extension duration $\Delta t_{drext}$ as during base duration $\Delta t_{drbs}$.

FIGS. 49a and 49b illustrate an extension 490 of both OI structure 440 and OI structure 470. OI structure 490, also an embodiment of OI structure 320, is configured the same as structure 470 except that VC region 106 here contains SF structure 242 extending from SF zone 112 to ISCC structure 132 so as to meet it along interface 244. See FIG. 49a. SF structure 242 is again configured and operable the same as in OI structure 440. Each cell 404 consists of an SS part of SF structure 242, the underlying ISCC part of ISCC structure 132, and the further underlying DE part of DE structure 282.

Each cell 404 here operates the same during the normal state as VC region 106 in OI structure 320. Total ATic light of each cell 404 consists of ARic light reflected by its ISCC part, any AEic light emitted by its ISCC part, any ARde light passing through its ISCC part, and any ARsb light passing through its ISCC and DE parts. A light normally leaving each cell 404 via its SF part 406 is formed with ARic light passing through its SS part, any AEic, ARde, and ARsb light passing through its SS part, and any ARss light reflected by its SS part.

SF structure 242 deforms along SF DF area 122 in response to object 104 impacting OC area 116. See FIG. 49b. The attendant excess SF pressure along area 116 is transmitted through structure 242 to produce excess internal pressure along DP IF area 256. Each cell 404 having its IF part 444 partly or fully in area 256 specifically deforms along a first cellular internal DF area constituted partly or fully with its IF part 444, thereby becoming a candidate for a CM cell. A candidate cell 404 temporarily becomes a CM cell if the internal deformation along that cell's first internal DF area meets cellular internal DF criteria embodying the cellular TH impact criteria. The internal deformation along the first internal DF area of each CM cell 404 causes it to temporarily appear as color X for base duration $\Delta t_{drbs}$ as the changed state begins.

The DE part of each candidate cell 404 responds to the deformation along its first internal DF area, and thus to the impact, by deforming along a second cellular internal DF area constituted partly or fully with its IF part 474. Consequently, the ISCC part of each candidate cell 404 deforms along its second cellular internal DF area. If a candidate cell 404 is a CM cell, the deformation of its ISCC part along its second internal DF area causes it to further temporarily appear as color X for extension duration $\Delta t_{drext}$. Automatic duration $\Delta t_{drau}$ for that CM cell 404 is lengthened to $\Delta t_{drbs}$+$\Delta t_{drext}$.

Each CM cell 404 here undergoes the same changed-state light processing as in IDVC portion 138 of OI structure 320. Total XTic light of each CM cell 404 consists of XRic light reflected by its ISCC part, any XEic light emitted by its ISCC part, any XRde light passing through its ISCC part, and any XRsb light passing through its ISCC and DE parts. X light temporarily leaving each CM cell 404 via its part 406 of print area 118 is formed with XRic light passing through its SS part, any XEic, XRde, and XRsb light passing through its SS part, and any ARss light reflected by its SS part.

FIGS. 50a and 50b illustrate an extension 500 of both OI structure 460 and OI structure 480. OI structure 500, also an embodiment of OI structure 330, is configured the same as structure 480 except that VC region 106 here contains SF structure 242 extending from SF zone 112 to ISCC structure 132 to meet it, specifically IS component 182, along interface 244. See FIG. 50a. Structure 242 here is configured and operable the same as in OI structure 460 and thus the same as in OI structure 440. Each cell 404 consists of an SS part of SF structure 242, an ISCC part of ISCC structure 132, and a DE part of DE structure 302, the ISCC part being formed with (a) an IS part of IS component 182 located below the SS part and above the DE part (b) a CC part of CC component 184 located below the DE part. Each cell's CC part is formed with an NA part of NA layer 204, an NE part of NE structure 224, a core part of core layer 222, an FE part of FE structure 226, and an FA part of FA layer 206 deployed as in OI structure 480.

Each cell 404 here operates the same during the normal state as VC region 106 in OI structure 330. Total ATcc light of each cell 404 consists of ARcc light reflected by its CC part, any AEcc light emitted by its CC part, and any ARsb light passing through its CC part. Total ATic light normally leaving the IS part of each cell 404, and thus its ISCC part, via its IF part 444 consists of ARcc light passing through its IS and DE parts, any AEcc and ARsb light passing through its IS and DE parts, any ARde light passing through its IS part, and any ARis light reflected by its IS part. A light normally leaving each cell 404 via its SF part 406 is formed with ARcc light passing through its SS part, any AEcc, ARis, ARde, and ARsb light passing through its SS part, and any ARss light reflected by its SS part. Each cell's NA, NE, core, FE, and FA parts here operate the same during the normal state as in OI structure 460 and hence as in OI structure 430.

SF structure 242 here again deforms along SF DF area 122 in response to the impact. See FIG. 50b. As in OI structure 270, the attendant excess SF pressure along OC area 116 is transmitted through SF structure 242 to produce excess internal pressure along DP IF area 256. Because internal PS surface 244 is a surface of IS component 182, it deforms along area 256. Each cell 404 having its IF part 444 partly or fully in area 256 specifically deforms along a first cellular internal DF area constituted partly or fully with its IF part 444 so as to become a candidate for a CM cell. A candidate cell 404 again temporarily becomes a CM cell if the deformation along that cell's first internal DF area meets cellular internal DF criteria embodying the cellular TH impact criteria. The IS part of each CM cell 404 provides a cellular impact effect, again termed the principal cellular first impact effect. Responsive to the principal cellular first impact effect, the CC part of each CM cell 404 changes so that it temporarily appears as color X for base duration $\Delta t_{drbs}$ as the changed state begins.

The DE part of each candidate cell 404 responds to the deformation along its first internal DF area, and thus to object 104 impacting its SF part 406, by deforming along an ID second cellular internal DF area constituted partly or fully with its IF part 484. Accordingly, the ISCC part of each candidate cell 404 deforms along its second cellular internal DF area. If a candidate cell 404 is a CM cell, its IS part responds to the deformation along its second internal DF area by providing another cellular impact effect, again termed the principal cellular second impact effect. The CC part of each CM cell 404 responds to its principal cellular second impact effect by causing it to further temporarily appear as color X for extension duration $\Delta t_{drext}$. Automatic duration $\Delta t_{drau}$ is again lengthened to $\Delta t_{drab}$+drbs $\Delta t_{drext}$.

Each CM cell 404 here undergoes the same changed-state light processing as in IDVC portion 138 of OI structure 330. Total XTcc light of each CM cell 404 consists of XRcc light reflected by its CC part, any XEcc light emitted by its CC part, and any XRsb light passing through its CC part. Total XTic light leaving the IS part of each CM cell 404, and thus its ISCC part, via its IF part 444 consists of XRcc light passing through its IS and DE parts, any AEcc and ARsb light passing through its IS and DE parts, any ARde light passing through its IS part, and any ARis light reflected by its IS part. X light leaving each CM cell 404 via its part 406 of print area 118 is formed with XRcc light passing through its SS part, any XEcc, ARis, ARde, and XRsb light passing through its SS part, and any ARss light reflected by its SS part. The NA, NE, core, FE, and FA parts of each CM cell 404 here operate the same during the changed state as in OI structure 460 and thus as in OI structure 430. The light processing in each CM cell 404 is again the same during both durations $\Delta t_{drbs}$ and $\Delta t_{drext}$.

FIG. 51 presents a more detailed side cross section of a typical embodiment 510 of ISCC structure 132 in OI structure 410, 440, 470, or 490. With ISCC structure 510 allocated into a multiplicity of ISCC parts, one for each cell 404, each ISCC part is indicated by reference symbol 512. Each ISCC cell part 512 has a lateral (side) part boundary 514, indicated in dotted line, extending along that part's "length" from a near part area 516 to a far part area 518. Each near part area 516 constitutes a portion of SF zone 112 in OI structure 410 or 470 or a portion of interface 244 in OI structure 440 or 490. Each far part area 518 constitutes a portion of interface 136 in structure 410 or 440 or a portion of interface 284 in structure 470 or 490.

Each ISCC cell part 512 contains a central ISCC cell sector 522 having a lateral (side) sector boundary 524 extending along that sector's length from a near sector area 526 to a far sector area 528. Sector area 526 or 528 in each cell part 512 constitutes a portion of its part area 516 or 518. Lateral boundary 524 of each central ISCC cell sector 522 usually extends perpendicular to its sector area 526 or 528. Sector area 526 or 528 in each cell 404 is smaller than its part 406 of SF zone 112 and usually outwardly conforms laterally to its SF part 406.

An isolating region 532 of ISCC structure 510 laterally separates ISCC cell sectors 522 from one another along at least parts of their lengths. ISCC isolating region 532 specifically laterally surrounds sectors 522 of interior cells 404 along at least parts of their sector lengths and extends laterally at least partly around sectors 522 of peripheral cells 404 likewise along at least parts of their sector lengths. In the example of FIG. 51, isolating region 532 fully laterally surrounds every cell sector 522 along its entire length. Region 532 can, however, extend along parts of the sector lengths so that adjacent sectors 522 adjoin one another along the remainders of their sector lengths. Region 532, which typically consists of insulating material but can be open space or a combination of open space and insulating material, usually laterally electrically insulates (or isolates) sectors 522 from one another to the extent that region 532 extends along the sector lengths.

A different portion 534 of isolating region 532 is allocated to each ISCC cell part 512 and extends along its ISCC sector 522 such that isolating portions 534 of adjoining cell parts 512 merge seamlessly into one another. Each part 512 is formed with its sector 522 and its isolating portion 534. Isolating portion 534 of each cell part 512 specifically extends from its lateral sector boundary 524 to its lateral part boundary 514 and from a near isolating area 536 to a far isolating area 538. In the example of FIG. 51, each near isolating area 536 constitutes part of SF zone 112 in OI structure 410 or 470 or part of interface 244 in OI structure 440 or 490 while each far isolating area 538 constitutes part of interface 136 in structure 410 or 440 or part of interface 284 in structure 470 or 490. Area 516 or 518 of each cell part 512 consists of its sector area 526 or 528 and its isolating area 536 or 538.

Sector area 526 or 528 in each ISCC cell part 512 is of much greater area than its isolating area 536 or 538. The CC characteristics of each cell 404 are largely determined by its ISCC sector 522. In this regard, lateral part boundaries 514 are usually defined such that lateral boundary 514 of each cell part 512 is spaced apart from, and thus lies around typically concentrically, its lateral sector boundary 524. Light striking SF part 406 of each cell 404 either directly strikes its near part area 516, as occurs in OI structure 410 or 470, or at least partly passes through its SS part and strikes its area 516, as occurs in OI structure 440 or 490. During both the normal and changed states, each isolating portion 534 may reflect light, termed ARim light, which leaves it along its near isolating area 536 after striking that area 536. ARim light can be the same as ARic or XRic light or significantly differ from both ARic and XRic light.

The light, termed ADic* light, normally leaving each ISCC cell sector 522 via its near sector area 526 after being reflected or/and emitted by that sector 522 consists of (a) light, termed ARic* light, normally reflected by that sector 522 so as to leave it via its area 526 after striking its area 526 and (b) light (if any), termed AEic* light, normally emitted by that sector 522 so as to leave it via its area 526. ADic* light excludes any ARsb light and, in OI structures 470 and 490, any ARde light.

ADic light leaving each ISCC cell part 512 via its near part area 516 during the normal state consists of ADic* and ARim light leaving it respectively via its near areas 526 and 536. To the extent that ADic* and ARim light differ, areas 516 are preferably sufficiently small that the standard human eye/brain interprets the combination of ADic* and ARim light as a single species of light. Because near sector area 526 in each cell part 512 is much larger than its near isolating area 536, ADic light normally provided by each cell part 512 consists largely of its ADic* light. ARic light is largely ARic* light while any AEic light is AEic* light.

Each cell 404 meeting the cellular TH impact criteria and temporarily becoming a CM cell, sometimes also requiring that the below-described principal supplemental impact criteria be met, undergoes changes by which light, termed XDic* light, materially different from A, ADic, and ADic* light leaves its ISCC sector 522 via its near sector area 526 during the changed state after being reflected or/and emitted by that sector 522. XDic* light consists of (a) light, termed XRic* light, temporarily reflected by that sector 522 so as to leave it via its area 526 after striking its area 526 and (b) light (if any), termed XEic* light, temporarily emitted by that sector 522 so as to leave it via its area 526. XDic* light excludes any XRsb light and, in OI structures 470 and 490, any XRde light.

XDic light leaving ISCC cell part 512 of each CM cell 404 via its near part area 516 during the changed state consists of XDic* and ARim light leaving it respectively via its near areas 526 and 536. To the extent that XDic* and ARim light differ, the standard human eye/brain interprets the combination of XDic* and ARim light as a single species of light if, as preferably occurs, the standard human eye/brain interprets the combination of ADic* and ARim light as a single species of light. Since near sector area 526 in each cell part 512 is much larger than its near isolating area 536, XDic light temporarily provided by cell part 512 of each CM cell 404 consists largely of its XDic* light. XRic light is largely XRic* light while any XEic light is XEic* light. Because XDic* light differs materially from ADic* light, XDic light differs materially from ADic light even though both of them include ARim light.

Determination of both total ATic light normally leaving each ISCC cell part 512 via its near part area 516 and total XTic light temporarily leaving part 512 of each CM cell 404 via its area 516 involves spatial mixing of any light reflected by substructure 134 and, if present, DE structure 282 and becomes quite complex. Nevertheless, the relationship between ATic and XTic light is the same as the relationship between ADic and XDic light. Because XDic* light differs materially from ADic* light, XTic light differs materially from ATic light. X light differs materially from A light even though both of them include ARim light.

Each ISCC cell sector 522 can be embodied as a single material formed with IS CR or CE material such as piezochromic or piezochromic luminescent/piezoluminescent material. Sector 522 of each CM cell 404 then operates the same during the changed state as ID segment 142 of ISCC structure 132 in OI structure 130 when ISCC structure 132 is embodied as a single material formed with IS CR or CE material.

Figure 52:
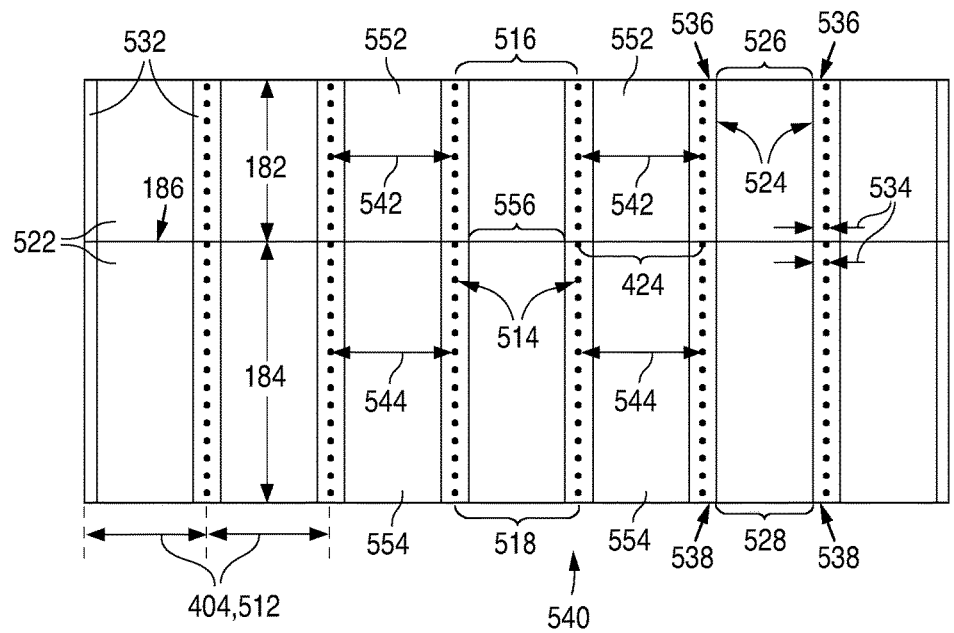
FIG. 52 is an expanded cross-sectional view of an embodiment of the cellular ISCC structure in the OI structure of FIGS. 42*a* and 42*b* or 45*a* and 45*b*.

FIG. 52 presents a more detailed side cross section of a typical embodiment 540 of ISCC structure 132 in OI structure 420 or 450. ISCC structure 540 is also an embodiment of ISCC structure 510. Each ISCC cell part 512 here consists of (a) an IS part 542 of IS component 182 and (b) a CC part 544 of CC component 184. Each IS part 542 contains a central IS cell sector 552 formed with the portion of that part's ISCC cell sector 522 in IS component 182. Each CC part 544 contains a central CC cell sector 554 formed with the portion of that part's cell sector 522 in CC component 184.

Light striking near sector areas 526 passes at least partly through IS parts 542 and strikes interface 186. The light, termed ADcc* light, normally leaving each central CC cell sector 554 via a part 556 of interface 186 after being reflected or/and emitted by that sector 554 consists of (a) light, termed ARcc* light, normally reflected by that sector 554 so as to leave it via its IF part 556 after striking its part 556 and (b) light (if any), termed AEcc* light, normally emitted by that sector 554 so as to leave it via its IF part 556. ADcc* light excludes any ARsb light.

ADcc* light provided by CC sector 554 of each cell 404 passes in substantial part through its central IS sector 552. Including any ARis light reflected by sector 552 of each cell 404 and any ARim light reflected by its isolating portion 534, ADic light normally leaving its ISCC cell part 512 via its near part area 516 here consists of ADcc* light and any ARis and ARim light. Areas 516 are preferably sufficiently small that the standard human eye/brain interprets ADcc* light combined with any ARis and ARim light as a single species of light. Because near sector area 526 in each cell part 512 is much larger than its near isolating area 536, ADic light normally provided by each cell part 512 here consists largely of ADcc* light and any ARis light. ARic light is largely ARcc* light combined with any ARis light while any AEic light is AEcc* light.

IS sector 552 of each cell 404 meeting the cellular TH impact criteria provides its cellular impact effect so that it temporarily becomes a CM cell directly or upon the supplemental impact criteria also being met if they are used. CC sector 554 of each CM cell 404 responds either to its cellular impact effect or to a cellular CC initiation signal, or cellular CC control signal, generated if the supplemental impact criteria are met by changing so that light, termed XDcc* light, materially different from A, ADic, ADic*, ADcc, and ADcc* light leaves its sector 554 via its IF part 556 during the changed state after being reflected or/and emitted by its sector 554. XDcc* light consists of (a) light, termed XRcc* light, temporarily reflected by each sector 554 so as to leave it via its IF part 556 after striking its part 556 and (b) light (if any), termed XEcc* light, temporarily emitted by that sector 554 so as to leave it via its IF part 556. XDcc* light excludes any XRsb light.

XDcc* light provided by CC sector 554 of each CM cell 404 passes in substantial part through its IS sector 552. Including any ARis light reflected by sector 552 of each CM cell 404 and any ARim light reflected by its isolating portion 534, XDic light temporarily leaving its ISCC cell part 512 via its near part area 516 consists of XDcc* light and any ARis and ARim light. The standard human eye/brain interprets XDcc* light combined with any ARis and ARim light as a single species of light if, as preferably occurs, the standard human eye/brain interprets ADcc* light combined with any ARis and ARim light as a single species of light. Since near sector area 526 in each cell part 512 is much larger than its near isolating area 536, XDic light temporarily provided by cell part 512 of each CM cell 404 consists largely of XDcc* light and any ARis light. XRic light is largely XRcc* light combined with any ARis light while any XEic light is XEcc* light. Because XDcc* light differs materially from ADcc* light, XDic light differs materially from ADic light even though both of them again include ARim light. For the reasons presented above in regard to FIG. 51, total XTic light temporarily leaving cell part 512 of each CM cell 404 differs materially from total ATic light normally leaving each cell part 512. X light differs materially from A light.

IS sector 552 of each cell 404 can be implemented the same as IS component 182 in FIG. 24a so as to consist of piezoelectric structure (374) for providing that cell's cellular impact effect as at least a cellular electrical effect resulting from excess pressure of object 104 impacting OC area 116. Alternatively, sector 552 of each cell 404 can be implemented the same as component 182 in FIG. 24b so as to consist of piezoelectric structure (374) and effect-modifying structure (376). The piezoelectric structure provides an initial cellular electrical effect resulting from excess pressure of the impact if it causes that cell 404 to meet the cellular TH impact criteria. The effect-modifying structure modifies the initial electrical effect to produce a modified cellular electrical effect as at least part of that cell's cellular impact effect.

CC sector 554 of each cell 404 can be embodied in any of the ways described above for embodying CC component 184. For instance, each sector 554 can be embodied as reduced-size CR CC structure in the same way that component 184 is embodied as a CR CC component. Sector 554 of each cell 404 then normally reflects light having at least a majority component of wavelength for color A for causing that cell 404 to normally appear as color A. Sector 554 of each CM cell 404 responds (a) in some cellular OI embodiments to its cellular impact effect for the impact meeting its cellular TH impact criteria or (b) in other cellular OI embodiments to its cellular CC control signal generated in response to its impact effect sometimes dependent on other criteria also being met in those other embodiments by temporarily reflecting light having at least a majority component of wavelength for color X for causing that CM cell 404 to temporarily appear as color X.

Each CC sector 554 can alternatively be embodied as reduced-size CE CC structure in the same way that CC component 184 is embodied as a CE CC component. If so, sector 554 of each CM cell 404 responds (a) in some cellular OI embodiments to its cellular impact effect or (b) in other cellular OI embodiments to its cellular CC control signal generated in response to its impact effect sometimes dependent on both its cellular TH impact criteria and other criteria being met by temporarily emitting light having at least a majority component of wavelength for color X for causing that CM cell 404 to temporarily appear as color X. In this case, sector 554 of each cell 404 may normally either reflect or emit light having at least a majority component of wavelength for color A for causing that cell 404 to normally appear as color A.

FIG. 53 presents a more detailed side cross section of a typical embodiment 560 of ISCC structure 132 in OI structure 430 or 460. ISCC structure 560 is also an embodiment of ISCC structure 540. Each ISCC cell part 512 here consists of IS part 542 and CC part 544 formed with an AB part 562 of assembly 202, an NA part 564 of NA layer 204, an FA part 566 of FA layer 206, and an isolating part 568 of isolating portion 534 of that cell part 512. Isolating part 568 of each CC part 544 largely laterally surrounds its AB part 562. Isolating region 532 thereby laterally isolates, and laterally insulates, AB parts 562 from one another. Isolating part 568 of each CC part 544 may or may not laterally surround its NA part 564 and may or may not laterally surround its FA part 566 as indicated in FIG. 53 by dashed-line extensions of its isolating part 568 into its auxiliary parts 564 and 566.

AB part 562 of each CC part 544 consists of a core section 572 of core layer 222, a near electrode 574 of NE structure 224, and a far electrode 576 of FE structure 226. Electrodes 574 and 576 in each AB part 562 are situated generally opposite each other. Core section 572 in each part 562 lies at least partly between its electrodes 574 and 576. In the example of FIG. 53, all of section 572 in each part 562 lies between its electrodes 574 and 576. Layer 222 consists of sections 572 and the laterally adjacent material of isolating region 532. NE structure 224 consists of near electrodes 574 and the laterally adjacent material of region 532. FE structure 226 consists of far electrodes 576 and the laterally adjacent material of region 532. Electrodes 574 and 576 usually adjoin region 532 along their entire lateral peripheries.

Electrodes 574 and 576 in each cell 404 are respectively at controllable voltages $V_n$ and $V_f$ so that control voltage $V_{nf}$ equal to voltage difference $V_n-V_f$ is applied across that cell's core section 572. Voltages $V_n$ and $V_f$ for each cell 404 are normally at respective normal control values $V_{nN}$ and $V_{fN}$ so that its electrodes 574 and 576 normally apply normal control value $V_{nfN}$ across that cell's core section 572. This enables light having at least a majority component of wavelength for color A to normally leave section 572 of each cell 404 along its near electrode 574. Each cell 404 normally appears as color A.

A cellular CC voltage is provided for each CM cell 404 directly in response to its cellular impact effect provided by its IS sector 552 or from a CC initiation signal generated in response to the supplemental impact criteria, if used, being met. Providing the cellular CC voltage for each CM cell 404 entails changing its control voltage $V_{nf}$ to changed value $V_{nfC}$ materially different from its normal value $V_{nfN}$. When provided directly in response to the cellular impact effect, the cellular CC voltage of each CM cell 404 can be generated by various parts of that CM cell 404, e.g., by its sector 552 or by a portion, such as its NA part 564, of its CC part 544. Core section 572 of each CM cell 404 responds to its cellular CC voltage by enabling light having at least a majority component of wavelength for color X to temporarily leave that CM cell 404 along its near electrode 574. Each CM cell 404 temporarily appears as color X.

Determination of both total ATcc light normally leaving CC part 544 of each cell 404 via its IF part 424 and total XTcc light temporarily leaving part 544 of each CM cell 404 via its IF part 424 during the changed state becomes quite complex due to spatial mixing of light variously provided by its cell parts 564, 566, 568, 572, 574, and 576 and any light reflected by substructure 134 and, if present, DE structure 282. However, by arranging for parts 564, 566, 572, 574, and 576 of each cell 404 to operate so that XDcc* light differs materially from ADcc* light, XTcc light differs materially from ATcc light. Total XTic light then differs materially from total ATcc light so that X light differs materially from A light even though both of them again include ARim light.

ISCC structure 132 in OI structure 480 or 500 can be embodied the same as ISCC structure 560 except that DE structure 302 lies between components 182 and 184. A DE part of structure 302 then lies between parts 542 and 544 of each cell 404. By arranging for parts 564, 566, 572, 574, and 576 of each cell 404 to operate so that XDcc* light differs materially from ADcc* light, XTcc light differs materially from ATcc light. Total XTic light again differs materially from total ATcc light so that X light differs materially from A light.

IS part 542, auxiliary parts 564 and 566, core section 572, and electrodes 574 and 576 in each cell 404 can respectively be embodied in any of the ways described above for embodying IS component 182, auxiliary layers 204 and 206, core layer 222, and electrode structures 224 and 226 subject to (a) structures 224 and 226 being embodied as electrodes, (b) the general impact effect provided by component 182 being embodied as the cellular impact effect provided by that cell's IS sector 552, and (c) the general CC control signal applied to structures 224 and 226 being embodied as the cellular CC voltage applied to that cell's electrodes 574 and 576.

As one example, core section 572 of each cell 404 consists of a supporting medium and a multiplicity of particles distributed in the medium. The particles in each cell 404 normally reflect ARcl light such that ATcl light formed with the ARcl light and any FE-structure-reflected ARfe light passing through layer that cell's section 572 is a majority component of A light. The particles in each CM cell 404 translate or/and rotate in response to the cellular CC voltage so as to temporarily reflect XRcl light such that total XTcl light formed with XRcl light and any FE-segment-reflected XRfe light passing through that cell's section 572 is a majority component of X light. ARcl and XRcl light are usually respective majority components of A and X light.

As another example, core section 572 of each cell 404 contains a liquid normally in a first cell-liquid shape for causing that cell's section 572 to reflect ARcl light such that ATcl light formed with the ARcl light and any FE-structure-reflected ARfe light passing through that cell's section 572 is a majority component of A light. The liquid in each CM cell 404 changes to a second cell-liquid shape materially different from the first cell-liquid shape in response to the cellular CC voltage. This causes section 572 of each CM cell 404 to temporarily reflect XRcl light so that total XTcl light formed with XRcl light and any FE-segment-reflected XRfe light passing through that cell's section 572 is a majority component of X light.

The cell architecture of OI structure 400 has various advantages. The boundary of print area 118 defined by cell SF parts 406 is clear. The color can change along SF part 406 of any cell 404 without changing color along SF part 406 of any neighboring cell 404 not intended to undergo color change. The ambit of materials suitable for implementing OI structure 100 is increased because there is no need to limit VC region 106, especially IS component 182, to materials for which the effect of the impact does not laterally spread significantly beyond OC area 116. Any desired print accuracy can be achieved by adjusting linear density $N_L$ of cells 404 in the row and column directions. If the cellular TH impact criteria are intended to vary along SF zone 112, neighboring cells 404 can readily be provided with different cellular TH impact criteria. Different shades of the embodiments of colors A and X occurring in the absence of ARis light can be created by varying the reflection characteristics of the IS parts, specifically the wavelength and intensity characteristics of ARis light, without changing the CC parts.

Adjustment of Changed-state Duration

Figure 54A:
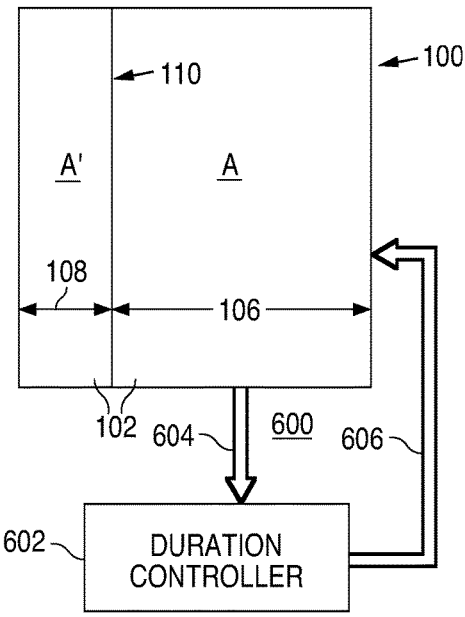
FIGS. 54*a* and 54*b* are composite block diagrams/layout views of an IP structure containing an OI structure having a surface for being impacted by an object at an ID area and for changing color along a corresponding print area of a VC region under control of a duration controller for adjusting color-change ("CC") duration according to the invention.
Figure 54B:
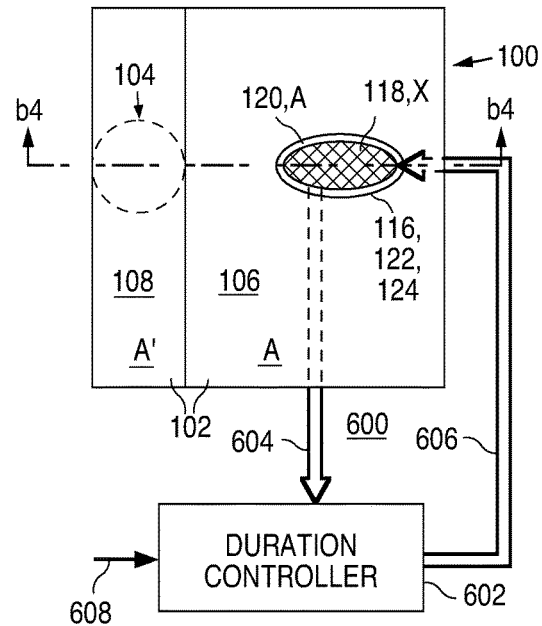

FIGS. 54a and 54b present block diagram/layout views of an information-presentation structure 600 consisting of OI structure 100 and a principal general CC duration controller 602 for adjusting duration $\Delta t_{dr}$ of the changed state subsequent to impact. "IP" hereafter means information-presentation. A network 604 of communication paths extends from VC region 106 to general CC duration controller 602 in IP structure 600. "COM" hereafter means communication. See FIG. 54a. A network 606 of COM paths extends from controller 602 back to region 106. In the absence of adjustment caused by controller 602, CC duration $\Delta t_{dr}$ would be at a preset value equal to automatic value $\Delta t_{drau}$.

Controller 602 responds to external instruction 608 and to object 104 impacting OC area 116 by controlling the IDVC portion (138), specifically the ID ISCC segment (142), to adjust CC duration $\Delta t_{dr}$. See FIG. 54b. The resultant adjusted value $\Delta t_{dradj}$ of duration $\Delta t_{dr}$ differs from automatic value $\Delta t_{drau}$. Duration $\Delta t_{dr}$ is usually lengthened. Adjusted value $\Delta t_{dradj}$ is then greater than automatic value $\Delta t_{drau}$, typically greater than the high end of the principal pre-established CC duration range mentioned above. Duration $\Delta t_{dr}$ can be shortened so that adjusted value $\Delta t_{dradj}$ is less than value $\Delta t_{drau}$, typically less than the low end of the principal $\Delta t_{dr}$ range. In either case, external instruction 608 is supplied to controller 602 after duration $\Delta t_{dr}$ begins, i.e., after the color change occurs, and before automatic value $\Delta t_{drau}$ would otherwise terminate. After duration $\Delta t_{dr}$ ends, controller 602 automatically returns the preset value of duration $\Delta t_{dr}$ to automatic value $\Delta t_{drau}$ in preparation for the next impact.

Instruction 608, formed with one or more individual instructions, can cause CC duration $\Delta t_{dr}$ to continue in various time-dependent ways. Instruction 608 can be provided essentially instantaneously to controller 602 for causing duration $\Delta t_{dr}$ to continue for a selected time increment after which duration $\Delta t_{dr}$ automatically terminates. If it is desired that duration $\Delta t_{dr}$ extend beyond this termination point, instruction 608 can be renewed prior to the expected termination so that duration $\Delta t_{dr}$ continues for another such time increment after which duration $\Delta t_{dr}$ again automatically terminates. The instruction renewal process can, if desired, continue indefinitely or be limited to a prescribed number of renewals.

Instruction 608 can be generated so that CC duration $\Delta t_{dr}$ continues indefinitely until instruction 608 changes in a way intended to cause duration $\Delta t_{dr}$ to terminate. For example, instruction 608 can be continuously supplied to controller 602 for causing duration $\Delta t_{dr}$ to continue until instruction 608 ceases being supplied to controller 602. Alternatively, instruction 608 can be supplied essentially instantaneously in one form to controller 602 for causing duration $\Delta t_{dr}$ to continue indefinitely. Instruction 608 is later supplied essentially instantaneously to controller 602 in another form for causing duration $\Delta t_{dr}$ to terminate.

In some embodiments of IP structure 600, instruction 608 can be furnished to controller 602 after automatic value $\Delta t_{drau}$ of duration $\Delta t_{dr}$ ends and thus after the IDVC portion (138) has started returning to appearing as principal color A, usually provided that controller 602 receives instruction 608 no later than a specified time period after impact at time $t_{ip}$, after object separation is just completed at OS time $t_{os}$, or after duration $\Delta t_{dr}$ begins at forward XN end time $t_{fe}$. The IDVC portion then returns to appearing as changed color X in accordance with instruction 608. After the so-interrupted version of duration $\Delta t_{dr}$ finally ends, controller 602 again automatically returns the preset value of duration $\Delta t_{dr}$ to automatic value $\Delta t_{drau}$.

Typically human originated, instruction 608 can be furnished in various ways to controller 602. A person can manually address one or more instruction-input elements, such as sliders, keys, switches or/and buttons, on controller 602 to provide it with instruction 608. A person can manually touch a touch-sensitive area of controller 602 with an instructing object to provide it with instruction 608. The instructing object can be a finger or other part of the person's body or an electronic instructing object. Controller 602 can have a sensitive area, e.g., capacitively sensitive, for receiving instruction 608 by having a person bring an instructing object, again such as a finger or other part of the person's body or an electronic instructing object, suitably close to, but not necessarily in contact with, the sensitive area. A person can generate instruction 608 by using a radiation-emitting element to direct radiation such as light or IR radiation onto a radiation-sensitive area of controller 602.

Instruction 608 can be provided to controller 602 by human voice. Controller 602 can be coded to respond (a) only to the voice of a selected person or any person in a selected group of people and thus not interpret any other such voice or sound as instruction 608 or/and (b) only to selected words and therefore not interpret any other word(s) as instruction 608. Controller 602 can receive instruction 608 via a remote device in communication with controller 602. A person can provide instruction 608 to the remote device in any of the ways, including by human voice, for providing instruction 608 directly to controller 602. The remote device converts that instruction into instruction 608 and transmits it to controller 602 via a COM path. Also, instruction 608 can be provided to other CC controllers described below in any way for providing instruction 608 to controller 602.

IP structure 600 operates as follows. The IDVC portion (138) temporarily appears as color X if the impact of object 104 on OC area 116 meets the principal basic TH impact criteria. When VC region 106 includes structure besides the ISCC structure (132), the ID ISCC segment (142) specifically causes the IDVC portion to temporarily appear as color X if the basic TH impact criteria are met. The IDVC portion, specifically the ISCC segment, provides a principal general location-identifying impact signal in response to the impact if it meets the basic TH impact criteria. "LI" hereafter means location-identifying. The general LI impact signal, transmitted via COM network 604 to controller 602, identifies the location of print area 118 along SF zone 112. This identification usually arises because the origination of the impact signal from the ISCC segment provides information identifying where the IDVC portion is located laterally in region 106 and thus where area 118 is located in zone 112.

If controller 602 receives instruction 608, controller 602 responds to instruction 608 and to the general LI impact signal by providing a principal general CC duration signal transmitted via COM network 606 to the IDVC portion (138), specifically the ID ISCC segment (142), for adjusting CC duration $\Delta t_{dr}$ subsequent to impact. The IDVC portion responds to the general CC duration signal by continuing to appear as color X in accordance with instruction 608. When VC region 106 contains structure besides the ISCC structure (132), the ISCC segment specifically causes the IDVC portion to continue appearing as color X in accordance with instruction 608. If instruction 608 later changes to a form intended to cause duration $\Delta t_{dr}$ to terminate, the IDVC portion returns to appearing as color A. If instruction 608 is not supplied to controller 602, the IDVC portion simply returns to appearing as color A when automatic value $\Delta t_{drau}$ expires.

Figure 55:
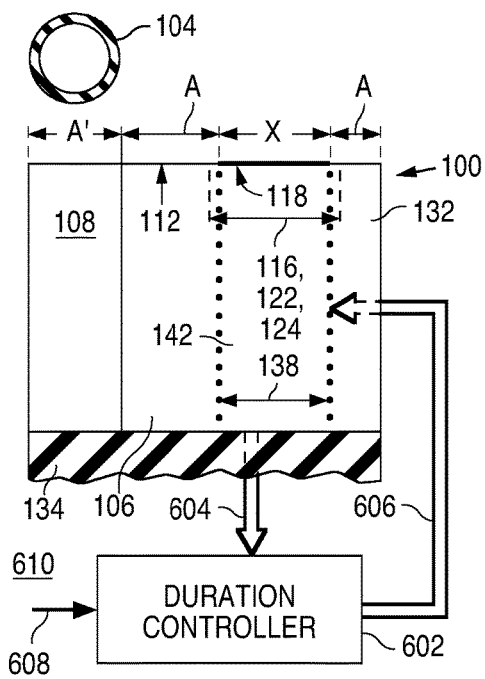
FIGS. 55-58 are composite block diagrams/side cross-sectional views of four respective embodiments of the IP structure of FIGS. 54*a* and 54*b* according to the invention. The cross section of the layout portion of each of FIGS. 55-58 is taken through plane b4-b4 in FIG. 54*b*.

FIGS. 55-58 present composite block diagrams/side cross sections. FIG. 55 illustrates an embodiment 610 of IP structure 600 responding to instruction 608. IP structure 610 is also an extension of OI structure 130 to include controller 602. VC region 106 here consists solely of ISCC structure 132 in which IDVC portion 138/ISCC segment 142 supplies the general LI impact signal to controller 602 via network 604 if the basic TH impact criteria are met and receives the general CC duration signal from controller 602 via network 606. Subject to portion 138/segment 142 supplying the impact signal and receiving the duration signal, region 106/structure 132 here usually contains components 182 and 184 as in OI structure 180.

Figure 56:
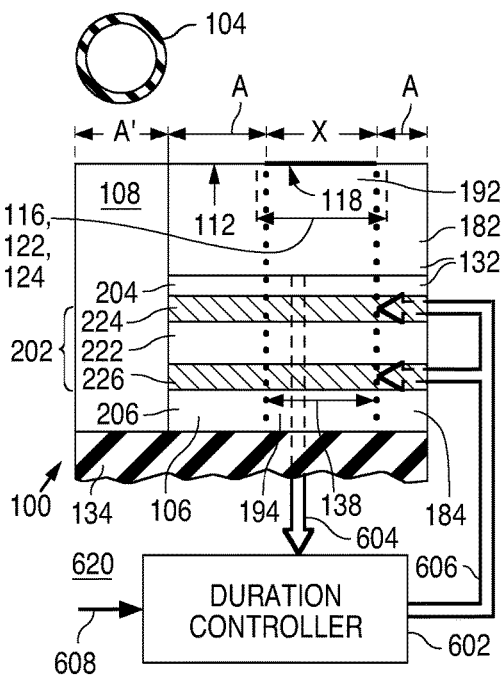

FIG. 56 depicts an embodiment 620 of IP structure 600 responding to instruction 608. IP structure 620 is also an extension of OI structure 200 to include controller 602. VC region 106 here consists solely of ISCC structure 132 formed with IS component 182 and CC component 184 consisting of subcomponents 204, 224, 222, 226, and 206. ID segments 214, 234, 232, 236, and 216 of subcomponents 204, 224, 222, 226, and 206 are not labeled in FIG. 56 due to spacing limitations. See FIG. 12b for identifying segments 214, 234, 232, 236, and 216 in FIG. 56.

IS segment 192 supplies the LI impact signal to controller 602 via network 604 if the basic TH impact criteria are met. Electrode segments 234 and 236 of CC segment 194 receive the general CC duration signal from controller 602 via network 606. The duration signal causes voltage $V_{nf}$ for IDVC portion 138/ISCC segment 142 to be maintained at changed value $V_{nfC}$ or sufficiently close to it that CC duration $\Delta t_{dr}$ continues in accordance with instruction 608. Subject to IS segment 192 supplying the impact signal and CC segment 194 receiving the duration signal, components 182 and 184 here can be embodied in any way described above for embodying them in OI structure 200.

Figure 57:
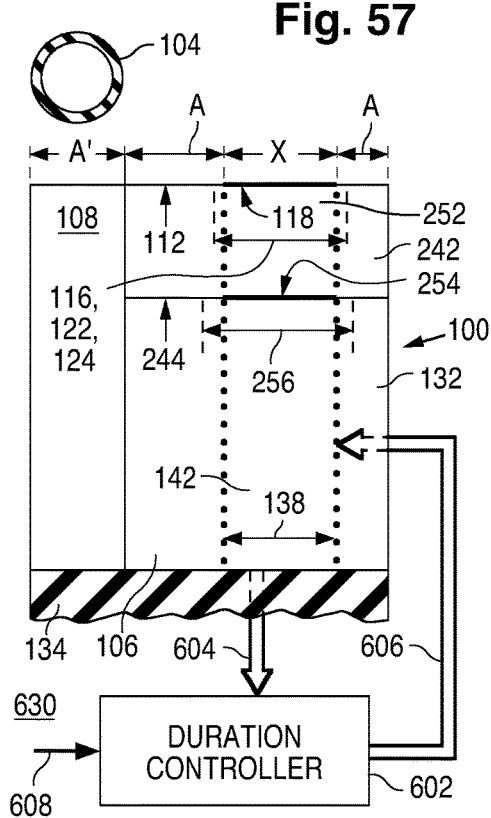

FIG. 57 depicts an embodiment 630 of IP structure 600 responding to instruction 608. IP structure 630 is also an extension of OI structure 240 to include controller 602 and an extension of IP structure 610 to include SF structure 242. VC region 106 here consists of ISCC structure 132 and SF structure 242. ISCC structure 132 and controller 602 here are configured, operate, and interact the same as in IP structure 610. SF structure 242 here is configured and functions the same as in OI structure 240. When ISCC structure 132 functions as a PSCC structure, ISCC segment 142 supplies the general LI impact signal to controller 602 if the excess internal pressure along DP IF area 256 meets the excess internal pressure criteria that embody the basic TH impact criteria.

An IP structure formed with controller 602 and OI structure 280 containing ISCC structure 132 and DE structure 282 can be implemented in the same way as IP structure 630. An IP structure formed with controller 602 and OI structure 320 containing ISCC structure 132, SF structure 242, and DE structure 282 can also be implemented in the same way as IP structure 630.

Figure 58:
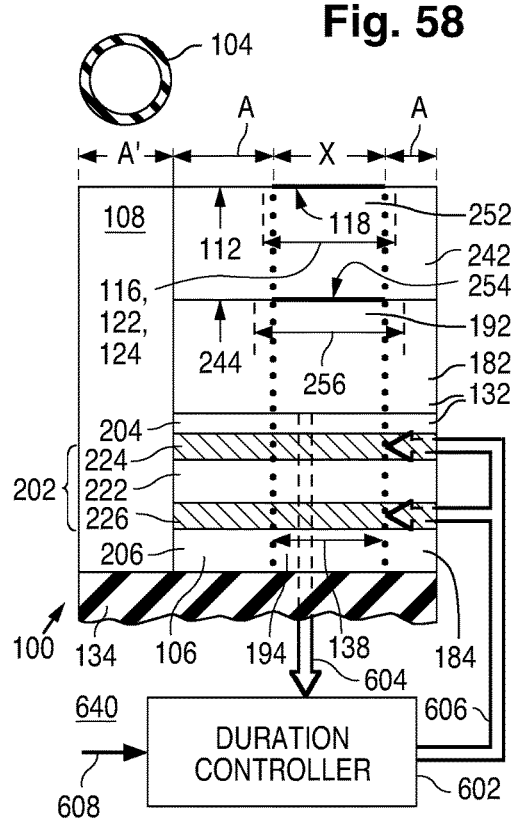

FIG. 58 depicts an embodiment 640 of IP structure 600 responding to instruction 608. IP structure 640 is also an extension of OI structure 270 to include controller 602 and an extension of IP structure 620 to include SF structure 242. VC region 106 here thus includes ISCC structure 132 formed with IS component 182 and CC component 184 consisting of subcomponents 204, 224, 222, 226, and 206. See FIG. 12*b* for identifying their ID segments 214, 234, 232, 236, and 216 not labeled in FIG. 58 due to spacing limitations. Components 182 and 184 and controller 602 here are configured, operate, and interact the same as in IP structure 620. SF structure 242 here is configured and functions the same as in OI structure 270. When ISCC structure 132 functions as a PSCC structure, IS segment 192 supplies the LI impact signal to controller 602 if the excess internal pressure criteria are met.

An IP structure formed with controller 602 and OI structure 300 containing DE structure 302 and ISCC structure 132 formed with IS component 182 and CC component 184 consisting of subcomponents 204, 224, 222, 226, and 206 can be implemented the same as IP structure 640 except that DE structure 302 lies between components 182 and 184. An IP structure formed with controller 602 and OI structure 330 containing SF structure 242, DE structure 302, and ISCC structure 132 formed with IS component 182 and CC component 184 consisting of subcomponents 204, 224, 222, 226, and 206 can also be implemented the same as IP structure 640 again except that DE structure 302 lies between components 182 and 184.

Figure 59A:
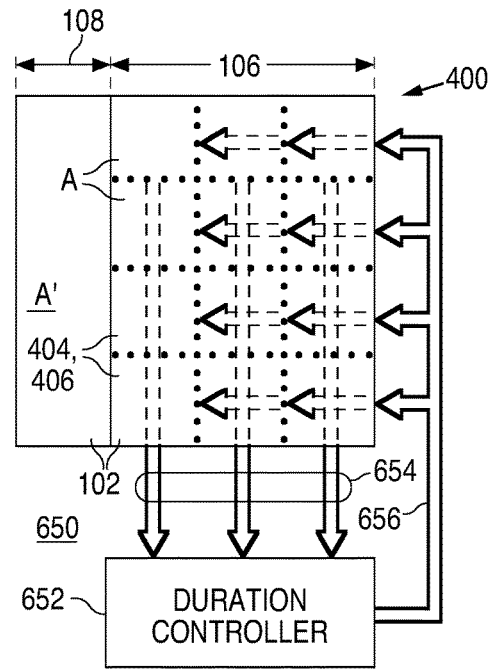
FIGS. 59*a* and 59*b* are composite block diagrams/layout views of an IP structure containing an OI structure having a surface for being impacted by an object at an ID area and for changing color along a corresponding print area of a cellular VC region under control of a duration controller for extending CC duration according to the invention.
Figure 59B:
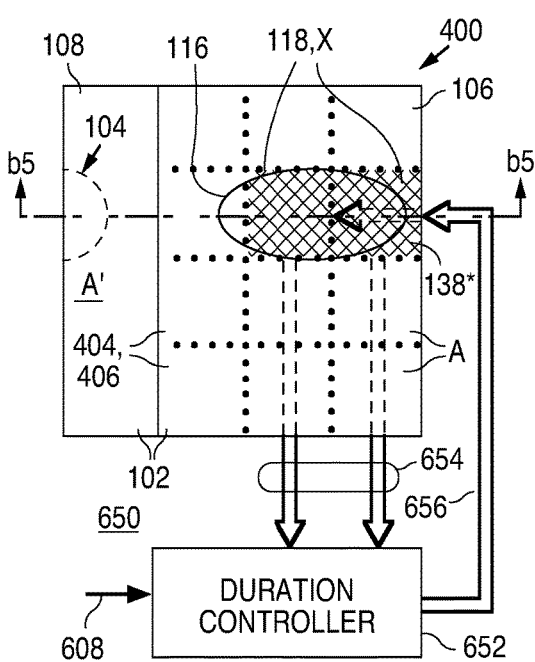

FIGS. 59*a* and 59*b* present block diagram/layout views of an IP structure 650 consisting of OI structure 400 and a principal cell CC duration controller 652 responsive to instruction 608 for adjusting CC durations $\Delta t_{dr}$ of CM cells 404, i.e., cells 404 in ID group 138*. IP structure 650 is also an embodiment of IP structure 600 for which cell CC duration controller 652 embodies general duration controller 602. Referring to FIG. 59*a*, a network 654 of COM paths extends from all cells 404 to controller 652. A network 656 of COM paths extends from controller 652 back to all cells 404. Each COM network 654 or 656 usually includes a set of row COM paths, each connected to a different row of cells 404, and a set of column COM paths, each connected to a different column of cells 404. Absence adjustment caused by controller 652, duration $\Delta t_{dr}$ for each cell 404 would be at a preset value equal to automatic value $\Delta t_{drau}$ for that cell 404. Automatic value $\Delta t_{drau}$ for each cell 404 from impact to impact lies in a cellular CC duration range the same as the principal CC duration range.

Each CM cell 404, i.e., each cell 404 meeting the principal cellular TH impact criteria, responds to object 104 impacting OC area 116 by providing a principal cellular LI impact signal, transmitted via network 654 to controller 652, identifying that cell's location along SF zone 112. See FIG. 59*b* which only shows the parts of networks 654 and 656 used by CM cells 404. The same is done in later FIGS. 60-63. The location identification usually arises because the origination of the cellular LI impact signal from each CM cell 404 identifies where its SF part 406 is located in zone 112. When VC region 106 includes structure besides the ISCC structure (132), the ISCC part of each CM cell 404 specifically provides that cell's LI impact signal. The cellular LI impact signals of all CM cells 404 embody the general LI impact signal identifying the location of print area 118 along zone 112 in IP structure 600.

If controller 652 receives instruction 608, controller 652 responds to instruction 608 and to the cellular LI impact signal of each CM cell 404 by providing a principal cellular CC duration signal, transmitted via network 656 to that cell 404 specifically its ISCC part, for adjusting its CC duration $\Delta t_{dr}$ subsequent to impact. Controller 652 usually creates the cellular CC duration signals by producing a general CC duration signal and suitably splitting it. The adjusted value $\Delta t_{dradj}$ of duration $\Delta t_{dr}$ for each CM cell 404 differs from its automatic value $\Delta t_{drau}$. Duration $\Delta t_{dr}$ for each CM cell 404 is usually lengthened. Adjusted value $\Delta t_{dradj}$ for each CM cell 404 is then greater than its value $\Delta t_{drau}$, typically greater than the high end of the principal CC duration range. Duration $\Delta t_{dr}$ for each CM cell 404 can be shortened so that its adjusted value $\Delta t_{dradj}$ is less than its value $\Delta t_{drau}$, typically less than the low end of the principal $\Delta t_{dr}$ range. In either case, instruction 608 is supplied to controller 652 before value $\Delta t_{drau}$ for any CM cell 404 would otherwise terminate.

Each CM cell 404 responds to its cellular CC duration signal by continuing to appear as color X in accordance with instruction 608. When VC region 106 contains structure besides the ISCC structure (132), the ISCC part of each CM cell 404 specifically causes it to continue appearing as color X. If instruction 608 later changes to a form intended to cause CC duration $\Delta t_{dr}$ of each CM cell 404 to terminate, it returns to appearing as color A. Controller 652 controls all CM cells 404 in unison so that they all receive their duration signals at largely one time and all return to appearing as color A at largely another later time. If instruction 608 is not supplied to controller 652, each CM cell 404 simply returns to appearing as color A when its automatic CC duration value $\Delta t_{drau}$ expires. After duration $\Delta t_{dr}$ ends, controller 652 automatically returns the preset value of duration $\Delta t_{dr}$ of each CM cell 404 to its automatic value $\Delta t_{drau}$ to prepare for the next impact.

Figure 60:
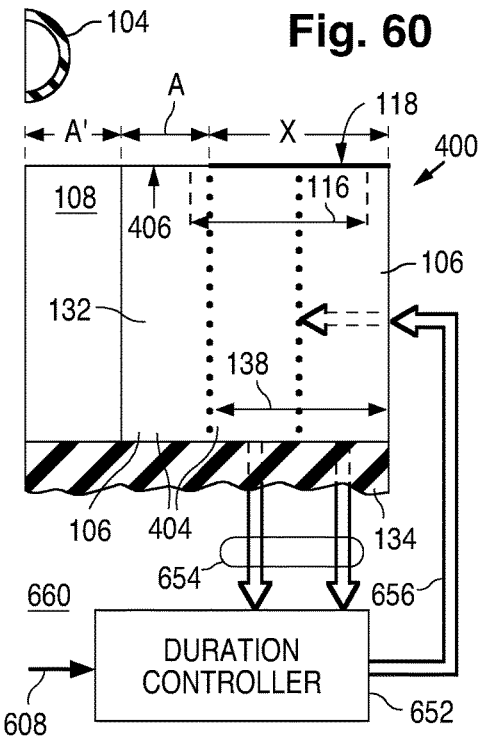
FIGS. 60-63 are composite block diagrams/side cross-sectional views of four respective embodiments of the IP structure of FIGS. 59*a* and 59*b* according to the invention. The cross section of the layout portion of each of FIGS. 60-63 is taken through plane b5-b5 in FIG. 59*b*.

FIGS. 60-63 present composite block diagrams/side cross sections. FIG. 60 depicts an embodiment 660 of IP structure 650 responding to instruction 608. IP structure 660 is also an extension of OI structure 410 to include controller 652. VC region 106 here consists solely of ISCC structure 132 in which each CM cell 404/its ISCC part supplies its cellular LI impact signal to controller 652 via network 654 and receives its cellular CC duration signal from controller 652 via network 656. Subject to each CM cell 404/its ISCC part supplying its impact signal and receiving its duration signal, each cell 404/its ISCC part here usually contains IS and CC parts as in OI structure 420.

Figure 61:
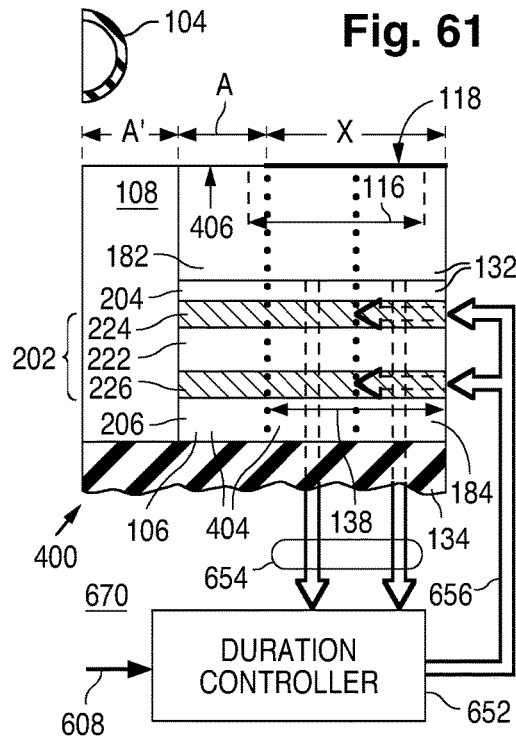

FIG. 61 depicts an embodiment 670 of IP structure 650 responding to instruction 608. IP structure 670 is also an extension of OI structure 430 to include controller 652. VC region 106 here is formed solely with ISCC structure 132 consisting of IS component 182 and CC component 184 formed with subcomponents 204, 224, 222, 226, and 206. Hence, each cell 404/its ISCC part here consists of an IS part and a CC part formed with individual NA, NE, core, FE, and FA parts.

The IS part of each CM cell 404 supplies its LI impact signal to controller 652 via network 654. The electrode parts of the CC part of each CM cell 404 receive its CC duration signal from controller 652 via network 656. The duration signal for each CM cell 404 causes its control voltage $V_{nf}$ to be maintained at, or sufficiently close to, changed value $V_{nfC}$ that its CC duration $\Delta t_{dr}$ continues in accordance with instruction 608. Subject to the IS part of each CM cell 404 supplying its impact signal and its CC part receiving its duration signal, the IS and CC parts of each cell 404 here can be embodied in any way described above for embodying them in OI structure 430.

Figure 62:
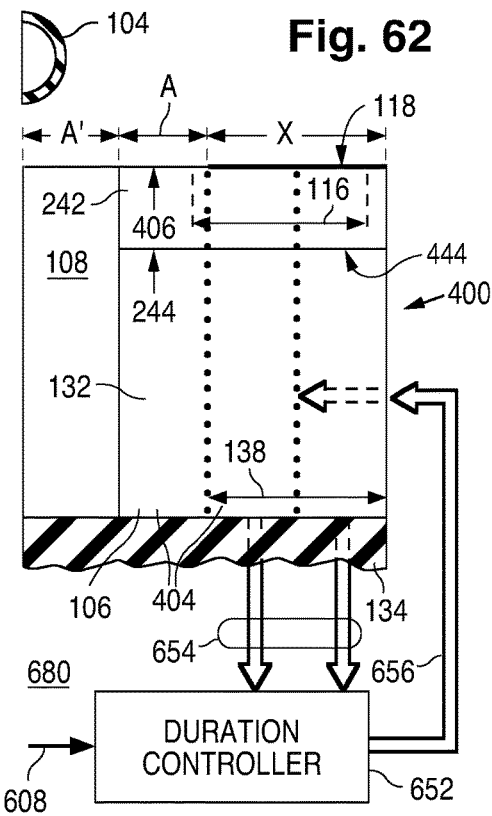

FIG. 62 depicts an embodiment 680 of IP structure 650 responding to instruction 608. IP structure 680 is also an extension of OI structure 440 to include controller 652 and an extension of IP structure 660 to include SF structure 242. VC region 106 here consists of ISCC structure 132 and overlying SF structure 242. ISCC structure 132 and controller 652 here are configured, operate, and interact the same as in IP structure 660. SF structure 242 here is configured and functions the same as in OI structure 440. When ISCC structure 132 functions as a PSCC structure, each cell 404 for which the excess internal pressure along its IF part 444 meets the cellular excess internal pressure criteria embodying the cellular TH impact criteria becomes a CM cell whose IS part supplies that cell's LI impact signal to controller 652 and whose CC part receives that cell's CC duration signal from controller 652.

An IP structure formed with controller 652 and OI structure 470 containing ISCC structure 132 and DE structure 282 can be implemented in the same way as IP structure 680. An IP structure formed with controller 652 and OI structure 490 containing ISCC structure 132, SF structure 242, and DE structure 282 can also be implemented in the same way as IP structure 680.

Figure 63:
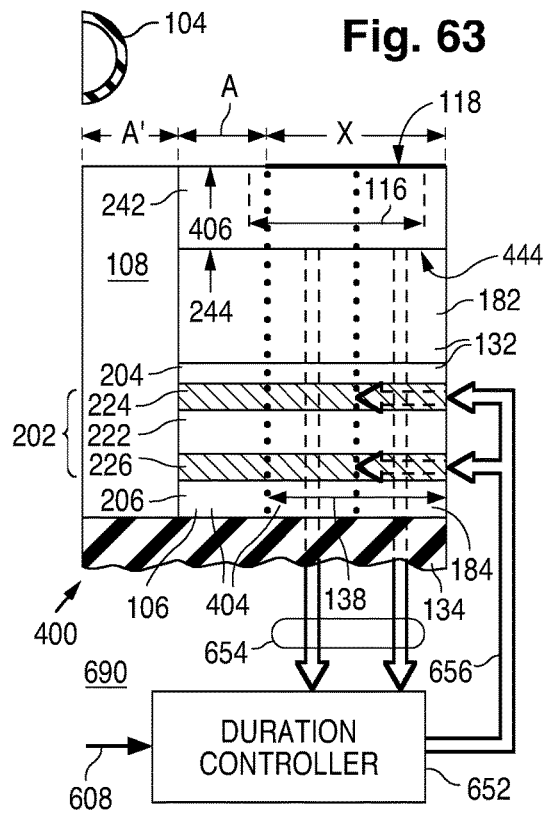

FIG. 63 depicts an embodiment 690 of IP structure 650 responding to instruction 608. IP structure 690 is also an extension of OI structure 460 to include controller 652 and an extension of IP structure 670 to include SF structure 242. VC region 106 here thus consists of ISCC structure 132 formed with IS component 182 and CC component 184 consisting of subcomponents 204, 224, 222, 226, and 206. Components 182 and 184 and controller 652 here are configured, operate, and interact the same as in IP structure 670. SF structure 242 here is configured and functions the same as in OI structure 460. When ISCC structure 132 functions as a PSCC structure, each cell 404 meeting the cellular excess internal pressure criteria becomes a CM cell.

An IP structure formed with controller 652 and OI structure 480 containing DE structure 302 and ISCC structure 132 formed with IS component 182 and CC component 184 consisting of subcomponents 204, 224, 222, 226, and 206 can be implemented the same as IP structure 690 except that DE structure 302 lies between components 182 and 184. An IP structure formed with controller 652 and OI structure 500 containing SF structure 242, DE structure 302, and ISCC structure 132 formed with IS component 182 and CC component 184 consisting of subcomponents 204, 224, 222, 226, and 206 can also be implemented the same as IP structure 690 again except that DE structure 302 lies between components 182 and 184.

Intelligent Color-change Control

Figure 64A:
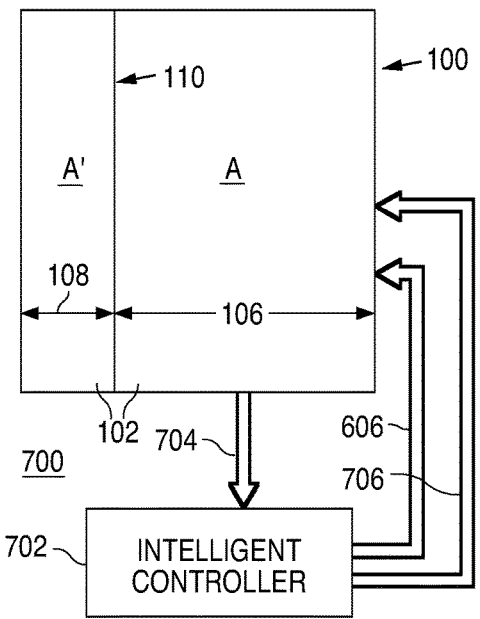
FIGS. 64*a* and 64*b* are composite block diagrams/layout views of an IP structure containing an OI structure having a surface for being impacted by an object at an ID area and for changing color along a corresponding print area of a VC region under control of an intelligent controller according to the invention.
Figure 64B:
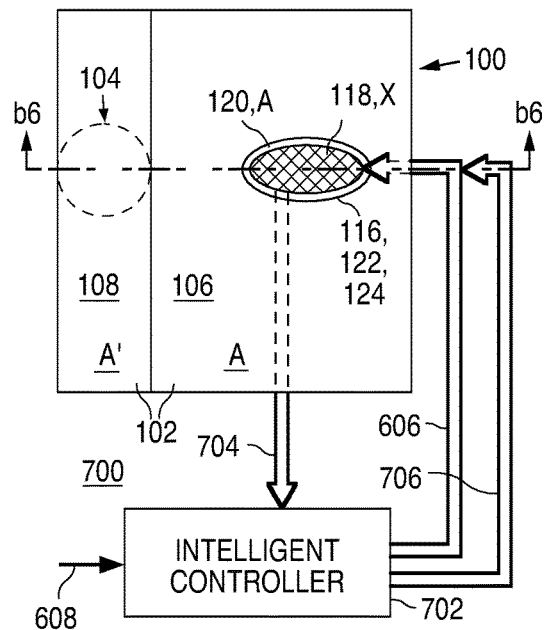

FIGS. 64a and 64b present block diagram/layout views of an IP structure 700 consisting of OI structure 100 and a principal general intelligent CC controller 702 for providing a supplemental impact assessment capability to determine whether an impact meeting the principal basic TH impact criteria has certain principal supplemental impact characteristics and, if so, for causing the IDVC portion (138) to temporarily appear as color X. The supplemental assessment capability enables IP structure 700 to distinguish between impacts of object 104 on SF zone 112 for which color change at print area 118 is desired and impacts of bodies on zone 112 for which color change is not desired. General intelligent CC controller 702 is also capable of adjusting CC duration $\Delta t_{dr}$ subsequent to impact the same as duration controller 602. A network 704 of COM paths extends from VC region 106 to controller 702. See FIG. 64a. A network 706 of COM paths extends from controller 702 back to region 106. In addition, structure 700 contains network 606 usually at least partly overlapping COM network 706.

The IDVC portion (138), specifically the ID ISCC segment (142), provides a principal general characteristics-identifying impact signal in response to object 104 impacting OC area 116 if the impact meets the basic TH impact criteria. See FIG. 64b. "CI" hereafter means characteristics-identifying. The general CI impact signal, transmitted via COM network 704 to controller 702, identifies principal general characteristics of the impact. The general impact characteristics consist of the location expected for print area 118 in SF zone 112 and principal general supplemental impact information for the impact on OC area 116. The identification of the expected PA location usually arises because the origination of the CI impact signal from the ISCC segment provides information identifying where the IDVC portion is laterally located in VC region 106 and thus where area 118 is expected to be located in zone 112.

Controller 702 responds to the general CI impact signal by determining whether the general supplemental impact information meets (or satisfies) principal supplemental impact criteria and, if so, provides a principal general CC initiation signal transmitted via network 706 to the IDVC portion (138), specifically the ID ISCC segment (142). The IDVC portion responds to the general CC initiation signal, which implements the principal general CC control signal, by temporarily appearing as color X. When VC region 106 includes structure besides the ISCC structure (132), the ISCC segment specifically causes the IDVC portion to temporarily appear as color X. An impact on SF zone 112 thus must meet principal expanded impact criteria consisting of the basic TH impact criteria and the supplemental impact criteria to cause a temporary color change.

IP structure 700 is able to distinguish between impacts of object 104 for which color change is desired and impacts of other bodies for which color change is not desired so that color change occurs only for suitable impacts of object 104. The time period taken by controller 702 to determine whether the principal supplemental impact criteria are met and, if so, to produce the initiation signal is very short, usually several ms or less. Approximate full forward XN delay $\Delta t_f$ is still usually no more than 2 s, preferably no more than 1 s, more preferably no more than 0.5 s, even more preferably no more than 0.25 s.

Controller 702 may receive instruction 608. If so and if the supplemental impact criteria are met, controller 702 responds to instruction 608 by providing the general CC duration signal transmitted via network 606 to the IDVC portion (138), specifically the ID ISCC segment (142), for adjusting CC duration $\Delta t_{dr}$ subsequent to impact as described above for IP structure 600.

The general supplemental impact information usually includes the size and/or shape expected for print area 118 if the IDVC portion (138) changes to temporarily appear as color X. The supplemental impact criteria then include corresponding static size and/or shape criteria for area 118. The PA size criteria preferably include a maximum reference area value $A_{prh}$ for the expected area $A_{pr}$ of area 118, "PA" again meaning print-area. Controller 702 provides the ID ISCC segment (142) with the general CC initiation signal only when expected PA area $A_{pr}$ is less than or equal to maximum PA reference area value $A_{prh}$. The size criteria may include a minimum reference area value $A_{prl}$ for PA area $A_{pr}$ if area 118 is expected to be located fully in SF zone 112. If so, controller 702 provides the ISCC segment with the initiation signal when PA area $A_{pr}$ is greater than or equal to minimum PA reference area value $A_{prl}$ provided that area 118 is expected to be located fully in zone 112. The PA shape criteria preferably include (a) a reference shape for area 118 and (b) a shape parameter set consisting of at least one shape parameter defining variations from the reference shape. Controller 702 provides the ISCC segment with the initiation signal only when the expected shape of area 118 falls within the shape parameter set.

The general supplemental impact information may include duration $\Delta t_{oc}$ of object 104 in contact with OC area 116 and thus in contact with the expected location of print area 118. The supplemental impact criteria then include OC time duration criteria. The OC duration criteria may include a minimum reference OC duration value $\Delta t_{ocrl}$ for area 118 located fully in SF zone 112. If so, controller 702 provides the ID ISCC segment (142) with the general CC initiation signal when duration $\Delta t_{oc}$ is greater than or equal to minimum reference OC duration value $\Delta t_{ocrl}$ provided that area 118 is expected to be located fully in zone 112. Small particles whose OC durations $\Delta t_{oc}$ are less than reference OC duration value $\Delta t_{ocrl}$ do not cause color change even if they impact surface 102 hard enough to meet the basic TH impact criteria.

The OC duration criteria may alternatively or additionally include a maximum reference OC time duration value $\Delta t_{ocrh}$. Controller 702 then provides the ID ISCC segment (142) with the CC initiation signal only when OC duration $\Delta t_{oc}$ is less than or equal to maximum reference OC duration value $\Delta t_{ocrh}$. For example, OC duration $\Delta t_{oc}$ is nearly always less than 25 ms when object 104 is a typical hollow sports ball such as a tennis ball, basketball, or volleyball that bounces off surface 102 after impacting it. Duration $\Delta t_{oc}$ is typically 4-5 ms, and thus invariably less than 10 ms, for a served or returned tennis ball moving over a tennis court whose playing surface embodies surface 102. Duration $\Delta t_{oc}$ is typically in the vicinity of 15 ms for a basketball being dribbled on a basketball court whose playing surface embodies surface 102.

In contrast, the time period during which a shoe on a foot of a person is in continuous contact with surface 102 as the person moves over surface 102 is nearly always greater than 50 ms. The shoe/foot contact time for a person running over a hard floor or other hard surface is reportedly a at least 80 ms, typically 100-200 ms or more, for elite runners. Consequently, the shoe/foot contact time for a person running over a hard surface is considerably greater than typical duration $\Delta t_{oc}$ of no more than 25 ms for a tennis ball or basketball. By choosing maximum reference OC duration value $\Delta t_{ocrh}$ to be suitably greater than 5 ms for a tennis ball or suitably greater than 15 ms for a basketball but suitably less than the time period during which either shoe of a person contacts surface 102 as the person moves over it, e.g., reference value $\Delta t_{ocrh}$ can be set at a value from 10 ms up to at least 50 ms, possibly up to 75 ms, for a tennis ball or at a value from 20 ms likewise up to at least 50 ms, possibly up to 75 ms, for a basketball, color changes occur when tennis balls or basketballs impact surface 102 but largely not when the shoes of people impact surface 102. Color changes similarly occur when the shoes of people impact surface 102 but largely not when tennis balls or basketballs impact surface 102 by choosing maximum reference OC duration value $\Delta t_{ocrh}$ to be suitably greater than the time period during which either shoe of a person contacts surface 102 as the person moves over it, e.g., reference value $\Delta t_{ocrh}$ can be set at a value of more than 75 ms such as 80, 90, or 100 ms.

The supplemental impact criteria may cover various time-varying phenomena. In this regard, OC area 116 is the maximum area where object 104 contacts SF zone 112 during the impact. However, the area where object 104 contacts zone 112 during the impact usually varies with time, reaching area 116 at some instant during OC duration $\Delta t_{oc}$. Let contact area 116* be the time-varying instantaneous area which spans where object 104 contacts zone 112 and for which the basic TH impact criteria are met. Instantaneous TH-meeting contact area 116*, which most closely approaches OC area 116 at some instant during duration $\Delta t_{oc}$, is of an instantaneous area $A_{oc}*$.

With the foregoing in mind, the general supplemental impact information may include instantaneous area $A_{oc}*$. The size criteria then include a plurality of maximum reference area values $A_{ocrh}*$ for successive instants separated by selected time periods. Controller 702 provides the ID ISCC segment (142) with the CC initiation signal only when instantaneous area $A_{oc}*$ is less than or equal to the maximum reference area value $A_{ocrh}*$ for each of a selected group of the successive instants during which object 104 is in contact with SF zone 112. The supplemental impact information may similarly include the instantaneous shape for TH-meeting contact area 116*. If so, the shape criteria include a plurality of reference shapes for successive instants separated by selected time periods and (b) a like plurality of sets of at least one shape parameter respectively defining variations from the reference shapes for the successive instants. Controller 702 provides the ISCC segment with the initiation signal only when the instantaneous shape of contact area 116* falls within the shape parameter set for each of a selected group of the successive instants while object 104 is in contact with zone 112.

The color that the IDVC portion (138) would appear along print area 118 during OC duration $\Delta t_{oc}$ if area 118 were externally exposed during duration $\Delta t_{oc}$ is generally immaterial because the presence of object 104 on OC area 116 usually prevents any person from then seeing area 118. An impact meeting the basic TH impact criteria but insufficient to meet the supplemental impact criteria can cause the IDVC portion to change to a condition in which it would appear along area 118 as changed color X, or some other color, during duration $\Delta t_{oc}$ if area 118 were then externally exposed as long as the IDVC portion largely returns to its normal-state condition as principal color A at or prior to the end of duration $\Delta t_{oc}$.

Similar to the basic TH impact criteria, the supplemental impact criteria can consist of multiple sets of fully different principal supplemental impact criteria respectively associated with different specific (or specified) changed colors materially different from principal color A. More than one, usually all, of the specific changed colors again differ, usually materially. The supplemental impact information is potentially capable of meeting (or satisfying) any of the supplemental impact criteria sets. If the supplemental impact information meets the supplemental impact criteria, generic changed color X is the specific changed color for the criteria set actually met by the supplemental impact information.

The supplemental impact criteria sets sometimes form a continuous chain in which consecutive criteria sets meet each other without overlapping.

The supplemental impact criteria for the expected shape of print area 118 can consist of multiple sets of expected shapes for area 118, each set of PA shape criteria associated with a specific changed color materially different from color A. Each PA shape criteria set preferably includes (a) a reference shape for area 118 and (b) a shape parameter set consisting of at least one shape parameter defining variations from the reference shape. The reference shapes all differ. Letting Roc represent the OC range from minimum reference OC duration value $\Delta t_{ocrl}$ maximum reference OC duration value $\Delta t_{ocrh}$, the supplemental impact criteria for values $\Delta t_{ocrl}$ and $\Delta t_{ocrh}$ can consist of multiple sets of non-overlapping OC ranges $R_{toc}$, each $R_{toc}$ range similarly associated with a specific changed color materially different from color A. Provided that there are at least two different changed colors, changed color X is the specific changed color for the expected PA shape criteria met by the expected PA shape in the supplemental impact information or for the OC duration range $R_{toc}$ met by OC duration $\Delta t_{oc}$ in the supplemental impact information.

The supplemental impact criteria sets can sometimes be mathematically described as follows in terms of a supplemental parameter Q akin to impact parameter difference $\Delta P$. Letting n again be an integer greater than 1, n principal supplemental impact criteria sets $T_1, T_2, \ldots T_n$ are respectively associated with n specific changed colors materially different from principal color A and with n progressively increasing low-limit supplemental parameter values $Q_{l,1}, Q_{l,2}, \ldots Q_{l,n}$. Each low-limit supplemental parameter value $Q_{l,i}$, except lowest-numbered value $Q_{l,1}$, thereby exceeds next-lowest-numbered value $Q_{l,i-1}$ where integer i again varies from 1 to n.

Each supplemental criteria set $T_i$, except highest-numbered criteria set $T_n$, is defined by the requirement that parameter Q equal or exceed low-limit supplemental parameter value $Q_{l,i}$ but be no greater than an infinitesimal amount below a higher supplemental parameter value $Q_{h,i}$ less than or equal to next higher low-limit supplemental parameter value $Q_{l,i+1}$. Each criteria set $T_i$, except set $T_n$, is a Q range $R_i$ extending between a low limit equal to low-limit value $Q_{l,i}$ and a high limit an infinitesimal amount below high-limit value $Q_{h,i}$. Highest-numbered criteria set $T_n$ is defined by the requirement that parameter Q equal or exceed low-limit supplemental parameter value $Q_{l,n}$ but not exceed a higher supplemental parameter value $Q_{h,n}$. Consequently, highest-numbered set $T_n$ is a Q range $R_n$ extending between a low limit equal to low-limit value $Q_{l,n}$ and a high limit equal to high-limit value $Q_{h,n}$.

High-limit value $Q_{h,i}$ for each range $R_i$, except highest range $R_n$, usually equals low-limit value $Q_{l,i+1}$ for next higher range $R_{n+1}$. In that case, criteria sets $T_1$-$T_n$ substantially cover a total Q range extending continuously from lowest low-limit value $Q_{l,1}$ to highest high-limit value $Q_{h,n}$. Supplemental parameter Q is potentially capable of meeting any of criteria sets $T_1$-$T_n$. If the general supplemental impact information meets the supplemental impact criteria, changed color X is the specific changed color for criteria set $T_i$ actually met by parameter Q.

This mathematical formulation can be used to embody the supplemental impact criteria sets as fully different PA size criteria sets expected for print area 118 and as fully different OC time duration sets for OC time duration $\Delta t_{oc}$. In particular, high-limit supplemental parameter values $Q_{h,1}$-$Q_{h,n}$ can respectively be n different values of maximum reference area value $A_{prh}$ for area 118 or n different values of maximum reference duration $\Delta t_{ocrh}$ for duration $\Delta t_{oc}$ subject to deleting the infinitesimal amount limitations. Provided that area 118 is expected to be located fully in SF zone 112, low-limit supplemental parameter values $Q_{l,1}$-$Q_{l,n}$ can respectively be n different values of minimum reference area value $A_{prl}$ for area 118 or n different values of minimum reference OC duration $\Delta t_{ocrl}$ for duration $\Delta t_{oc}$. Because each size or OC duration criteria set $T_i$ is a range $R_i$, these supplemental impact criteria implementations of different $A_{prh}$ or $\Delta t_{ocrh}$ values and different $A_{prl}$ or $\Delta t_{ocrl}$ values accomplish the same result.

Use of supplemental impact criteria sets provides a capability to distinguish between different types of impacts, specifically between different embodiments of object 104 as it impacts SF zone 112. For example, if one embodiment of object 104 is shaped considerably differently than another embodiment of object 104 or usually contacts zone 112 for a considerably different $\Delta t_{oc}$ value than the other object embodiment, appropriate choice of the supplemental impact criteria sets enables IP structure 700 to distinguish between the two object embodiments as they contact zone 112. Taking note that a tennis ball embodying object 104 usually creates print area 118 of considerably different shape than a shoe of a person embodying object 104 and that a tennis ball and a person's shoe usually impact zone 112 for considerably different $\Delta t_{oc}$ values, the supplemental impact criteria sets can readily be chosen in suitable shape parameter sets or/and OC duration range $R_{toc}$ set to provide a different specific changed color X for an impact of a tennis ball than for an impact of a person's shoe or other body of considerably different impact characteristics than a tennis ball.

Controller 702 can provide the general CC initiation signal in various ways for causing the IDVC portion (138) to temporarily appear as the specific changed color X for the supplemental impact criteria set met by the supplemental impact information. For example, the initiation signal can be providable at a value falling into multiple different ranges respectively corresponding to the different supplemental criteria sets. Providing the initiation signal at a value falling into one of these ranges due to the supplemental impact information meeting the supplemental impact criteria for that range then causes the IDVC portion to temporarily appear as the specific changed color X for that range. Alternatively, the initiation signal can consist of multiple general CC initiation subsignals respectively corresponding to the different supplemental criteria sets. Each general CC initiation subsignal goes to an enable condition when the supplemental impact information meets the supplemental impact criteria for that subsignal and is otherwise at disable condition so that no more than one of the initiation subsignals can be at its enable condition at any time. Causing one of the initiation subsignals to go to its enable condition due to the supplemental impact information meeting the supplemental impact criteria for that subsignal causes the IDVC portion to temporarily appear as the specific changed color X for that subsignal.

Figure 65:
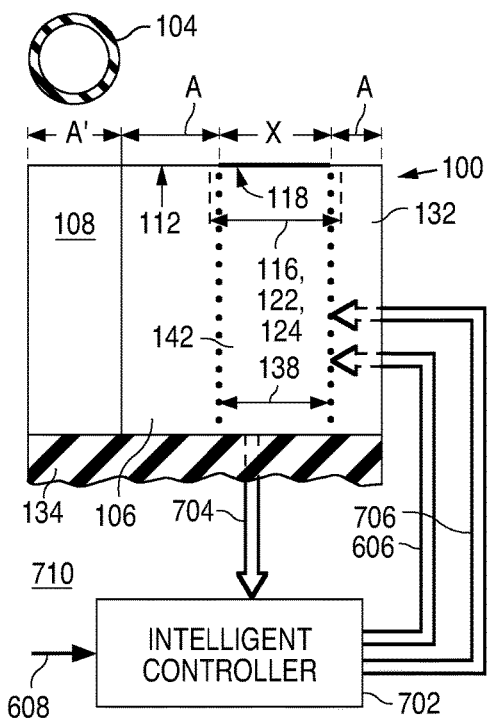

FIGS. 65-68 present composite block diagrams/side cross sections. FIG. 65 depicts an embodiment 710 of IP structure 700 responding to instruction 608. IP structure 710 is also an extension of OI structure 130 to include controller 702. VC region 106 here consists solely of ISCC structure 132 in which IDVC portion 138/ISCC segment 142 supplies the general CI impact signal to controller 702 via network 704 if the basic TH impact criteria are met and receives the general CC initiation and duration signals from controller 702 respectively via networks 706 and 606 if the supplemental impact criteria are met. Subject to portion 138/ segment 142 supplying the impact signal and receiving the initiation and duration signals, region 106/structure 132 usually contains components 182 and 184 as in OI structure 180.

Figure 66:
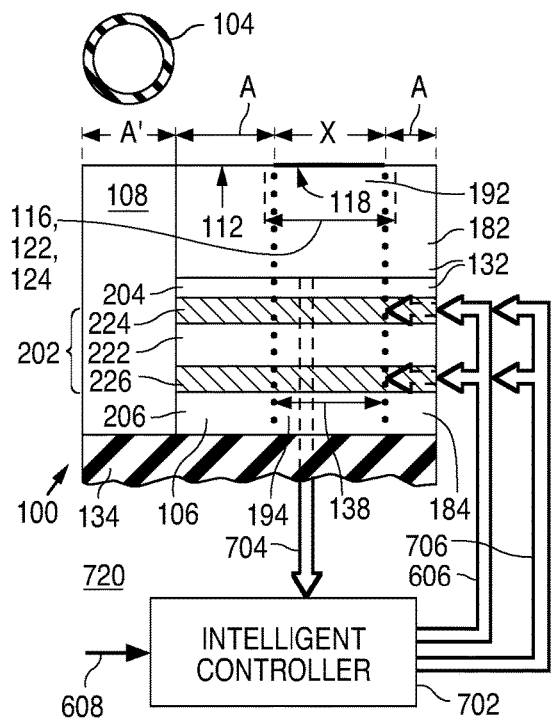

FIG. 66 depicts an embodiment 720 of IP structure 700 responding to instruction 608. IP structure 720 is also an extension of OI structure 200 to include controller 702. VC region 106 is here formed solely with ISCC structure 132 consisting of IS component 182 and CC component 184 formed with subcomponents 204, 224, 222, 226, and 206. ID segments 214, 234, 232, 236, and 216 of subcomponents 204, 224, 222, 226, and 206 are not labeled in FIG. 66 due to spacing limitations. See FIG. 12b for identifying segments 214, 234, 232, 236, and 216 in FIG. 66.

IS segment 192 supplies the general CI impact signal to controller 702 via network 704 if the basic TH impact criteria are met. Electrode segments 234 and 236 of CC segment 194 receive the general CC initiation and duration signals from controller 702 respectively via networks 706 and 606 if the supplemental impact criteria are met. The initiation signal causes voltage $V_{nf}$ for IDVC portion 138/ ISCC segment 142 to go to changed value $V_{nfC}$ for causing portion 138 to temporarily appear as color X. Since the time period taken by controller 702 to determine that the general supplemental impact information meet the supplemental impact criteria is usually several ms or less, full forward XN delay $\Delta t_f$ still can be as high as 0.4 s, sometimes as high as 0.6, 0.8, or 1.0 s but again is usually reduced to no more than 0.2 s, preferably no more than 0.1 s, more preferably no more than 0.05 s, even more preferably no more than 0.025 s. The duration signal causes voltage $V_{nf}$ for portion 138/ segment 142 to be maintained at, or sufficiently close to, value $V_{nfC}$ that CC duration $\Delta t_{dr}$ continues in accordance with instruction 608. Subject to IS segment 192 supplying the impact signal and CC segment 194 receiving the initiation and duration signals, components 182 and 184 here can be embodied in any way described above for embodying them in OI structure 200.

FIG. 67 depicts an embodiment 730 of IP structure 700 responding to instruction 608. IP structure 730 is also an extension of OI structure 240 to include controller 702 and an extension of IP structure 710 to include SF structure 242. VC region 106 here thus consists of ISCC structure 132 and SF structure 242. ISCC structure 132 and controller 702 here are configured, operate, and interact the same as in IP structure 710. SF structure 242 here is configured and functions the same as in OI structure 240. When ISCC structure 132 functions as a PSCC structure, ISCC segment 142 supplies the general CI impact signal to controller 702 if the excess internal pressure along DP IF area 256 meets the excess internal pressure criteria.

An IP structure formed with controller 702 and OI structure 280 containing ISCC structure 132 and DE structure 282 can be implemented in the same way as IP structure 730. An IP structure formed with controller 702 and OI structure 320 containing ISCC structure 132, SF structure 242, and DE structure 282 can also be implemented in the same way as IP structure 730.

FIG. 68 depicts an embodiment 740 of IP structure 700 responding to instruction 608. IP structure 740 is also an extension of OI structure 270 to include controller 702 and an extension of IP structure 720 to include SF structure 242. VC region 106 here thus consists of ISCC structure 132 formed with IS component 182 and CC component 184 consisting of subcomponents 204, 224, 222, 226, and 206. See FIG. 12b for identifying their ID segments 214, 234, 232, 236, and 216 not labeled in FIG. 68 due to spacing limitations. Components 182 and 184 and controller 702 here are configured, operate, and interact the same as in IP structure 720. SF structure 242 here is configured and functions the same as in OI structure 270. When ISCC structure 132 functions as a PSCC structure, IS segment 192 supplies the general CI impact signal to controller 702 if the excess internal pressure criteria are met.

An IP structure formed with controller 702 and OI structure 300 containing DE structure 302 and ISCC structure 132 formed with IS component 182 and CC component 184 consisting of subcomponents 204, 224, 222, 226, and 206 can be implemented the same as IP structure 740 except that DE structure 302 lies between components 182 and 184. An IP structure formed with controller 702 and OI structure 330 containing SF structure 242, DE structure 302, and ISCC structure 132 formed with IS component 182 and CC component 184 consisting of subcomponents 204, 224, 222, 226, and 206 can also be implemented the same as IP structure 740 again except that DE structure 302 lies between components 182 and 184.

FIGS. 69a and 69b present block diagram/layout views of an IP structure 750 consisting of OI structure 400 and a principal intelligent cell CC controller 752 for providing a supplemental impact assessment capability to determine whether an impact meeting the principal cellular TH impact criteria has certain supplemental impact characteristics and, if so, for causing CM cells 404 to temporarily appear as color X. IP structure 750 is also an embodiment of IP structure 700 for which intelligent cell CC controller 752 embodies general intelligent CC controller 702. Referring to FIG. 69a, a network 754 of COM paths extends from all cells 404 to controller 752. A network 756 of COM paths extends from controller 752 back to all cells 404. Each COM network 754 or 756 usually includes a set of row COM paths, each connected to a different row of cells 404, and a set of column COM paths, each connected to a different column of cells 404. IP structure 750 further contains network 656 usually at least partly overlapping network 756.

Each cell 404 meeting the cellular TH impact criteria temporarily becomes a TH CM cell and responds to object 104 impacting OC area 116 by providing a principal cellular CI impact signal, transmitted via network 754 to controller 752, identifying principal cellular characteristics for the impact as experienced at that cell 404. See FIG. 69b. Multiple cells 404 virtually always temporarily become TH CM cells. The principal cellular impact characteristics for each TH CM cell 404 consist of the location of its SF part 406 in SF zone 112 and principal cellular supplemental information for the impact. The location identification usually arises because the origination of the cellular CI impact signal from each TH CM cell 404 identifies where its SF part 406 is located in zone 112. When VC region 106 contains structure besides the ISCC structure (132), the ISCC part of each TH CM cell 404 specifically provides that cell's CI impact signal. The cellular CI impact signals of all TH CM cells 404 embody the general CI impact signal in IP structure 700.

Controller 752 responds to the cellular CI impact signals by combining the principal cellular supplemental impact information of all TH CM cells 404 to form the principal general supplemental impact information and then determining whether it meets the supplemental impact criteria. If so, each TH CM cell 404 temporarily becomes a full CM cell. For each full CM cell 404, controller 752 provides a principal cellular CC initiation signal transmitted via network 756 to that cell 404 specifically its ISCC part. FIG. 69b only shows the parts of networks 754, 756, and 656 used by full CM cells 404. The same is done in later FIGS. 70-73. Each full CM cell 404 responds to its cellular CC initiation signal, which implements its cellular CC control signal, by temporarily appearing as color X. When VC region 106 includes structure besides the ISCC structure (132), the ISCC part of each full CM cell 404 specifically causes it to temporarily appear as color X. ID cell group 138* embodying IDVC portion 138 consists of full CM cells 404. The cellular CC initiation signals of all full CM cells 404 embody the general CC initiation signal in IP structure 700.

The principal expanded impact criteria that must be met to cause a temporary color change consist of the cellular TH impact criteria and the supplemental impact criteria. Controller 752 usually creates the cellular CC initiation signals by producing a principal general CC initiation signal and suitably splitting it. The cellular CC initiation signals provided to all full CM cells 404 embody the general CC initiation signal in IP structure 700.

If the supplemental impact criteria consist of multiple sets ($T_1$-$T_n$) of different principal supplemental impact criteria respectively associated with multiple specific changed colors ($X_i$-$X_n$) materially different from principal color A, controller 752 responds to the cellular impact signal of each TH CM cell 404 by providing it, specifically its ISCC part, with a cellular CC initiation signal that causes it to temporarily become a full CM cell and temporarily appear as the specific changed color ($X_i$) for the supplemental criteria set actually met by the supplemental impact information.

Controller 752 may receive instruction 608. If so and if the general supplemental impact information meets the supplemental impact criteria, controller 752 responds to instruction 608 by providing, for each full CM cell 404, a principal cellular CC duration signal, transmitted via network 656 to that cell 404 specifically its ISCC part, for adjusting that cell's CC duration $\Delta t_{dr}$ subsequent to impact the same as in IP structure 650. Each full CM cell 404 responds to its cellular CC duration signal by continuing to appear as color X in accordance with instruction 608. When VC region 106 contains structure besides the ISCC structure (132), the ISCC part of each full CM cell 404 specifically causes it to continue appearing as color X in accordance with instruction 608. Controller 752 usually creates the cellular CC duration signals by producing a general CC duration signal and suitably splitting it.

Figure 70:
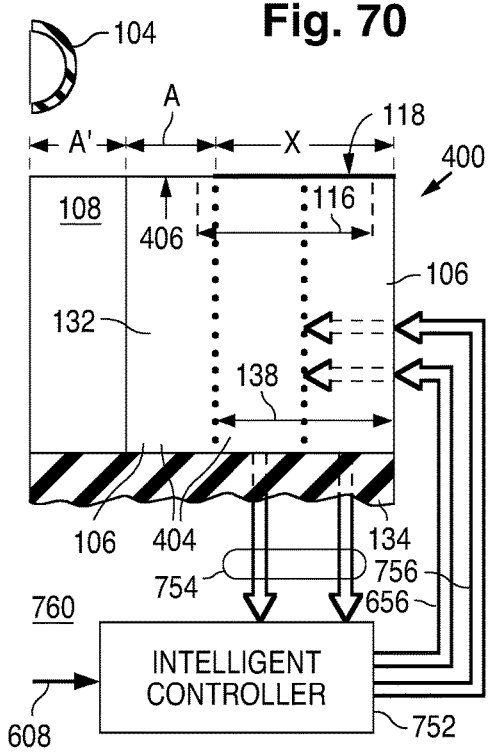
FIGS. 70-73 are composite block diagrams/side cross-sectional views of four respective embodiments of the IP structure of FIGS. 69*a* and 69*b* according to the invention. The cross section of the layout portion of each of FIGS. 70-73 is taken through plane b7-b7 in FIG. 69*b*.

FIGS. 70-73 present composite block diagrams/side cross sections. FIG. 70 depicts an embodiment 760 of IP structure 750 responding to instruction 608. IP structure 760 is also an extension of OI structure 410 to include controller 752. VC region 106 here consists solely of ISCC structure 132 in which each TH CM cell 404/its ISCC part supplies its cellular CI impact signal to controller 752 via network 754 and in which each full CM cell 404/its ISCC part receives its cellular CC initiation and duration signals from controller 752 respectively via networks 756 and 656. Subject to each TH CM cell 404/its ISCC part supplying its impact signal and each full CM cell 404/its ISCC part receiving its initiation and duration signals, each cell 404/its ISCC part here usually contains IS and CC parts as in OI structure 420.

Figure 71:
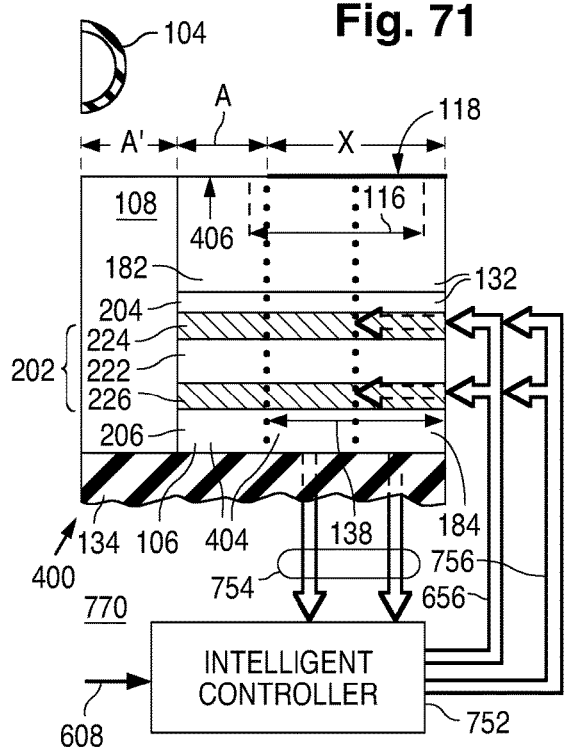

FIG. 71 depicts an embodiment 770 of IP structure 750 responding to instruction 608. IP structure 770 is also an extension of OI structure 430 to include controller 752. VC region 106 here is formed solely with ISCC structure 132 consisting of IS component 182 and CC component 184 formed with subcomponents 204, 224, 222, 226, and 206. Each cell 404/its ISCC part here consists of an IS part and a CC part formed with individual NA, AB, and FA parts, each AB part being formed with individual NE, core, and FE parts.

The IS part of each TH CM cell 404 supplies its cellular CI impact signal to controller 752 via network 754. The electrode parts of each full CM cell 404 receive its cellular CC initiation and duration signals from controller 752 respectively via networks 756 and 656. The initiation signal for each full CM cell 404 causes its control voltage $V_{nf}$ to go to changed value $V_{nfC}$ for causing it to temporarily appear as color X. The duration signal for each full CM cell 404 causes its voltage $V_{nf}$ to be maintained at, or sufficiently close to, value $V_{nfC}$ that its CC duration $\Delta t_{dr}$ continues in accordance with instruction 608. Subject to the IS part of each TH CM cell 404 supplying its impact signal and the CC part of that full CM cell 4E04 receiving its initiation and duration signals, the IS and CC parts of each cell 404 here can be embodied in any of the ways described above for embodying those parts in OI structure 430.

Figure 72:
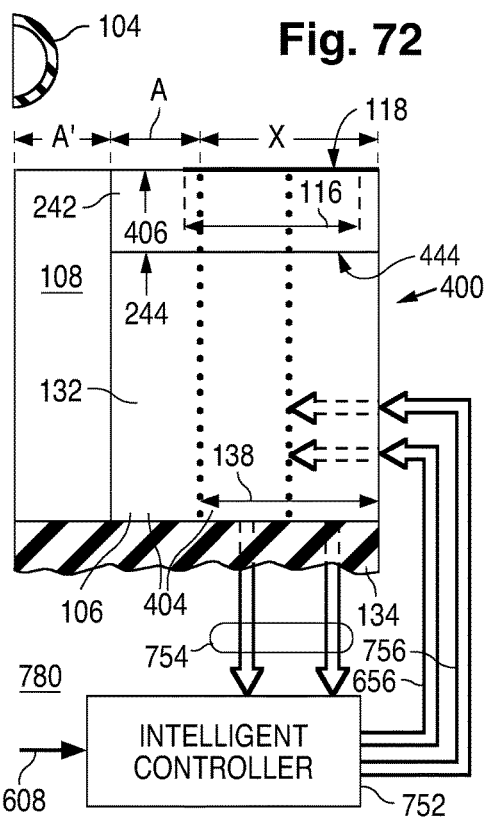

FIG. 72 depicts an embodiment 780 of IP structure 750 responding to instruction 608. IP structure 780 is also an extension of OI structure 440 to include controller 752 and an extension of IP structure 760 to include SF structure 242. VC region 106 here consists of ISCC structure 132 and overlying SF structure 242. ISCC structure 132 and controller 752 here are configured, operate, and interact the same as in IP structure 760. SF structure 242 here again is configured and functions the same as in OI structure 440. When ISCC structure 132 functions as a PSCC structure, each cell 404 for which the excess internal pressure along its IF part 444 meets the cellular excess internal pressure criteria becomes a TH CM cell whose IS part supplies that cell's CI impact signal to controller 752. The CC part of each full CM cell 404 receives its CC initiation and duration signals from controller 752.

An IP structure formed with controller 752 and OI structure 470 containing ISCC structure 132 and DE structure 282 can be implemented in the same way as IP structure 780. An IP structure formed with controller 752 and OI structure 490 containing ISCC structure 132, SF structure 242, and DE structure 282 can likewise be implemented in the same way as IP structure 780.

Figure 73:
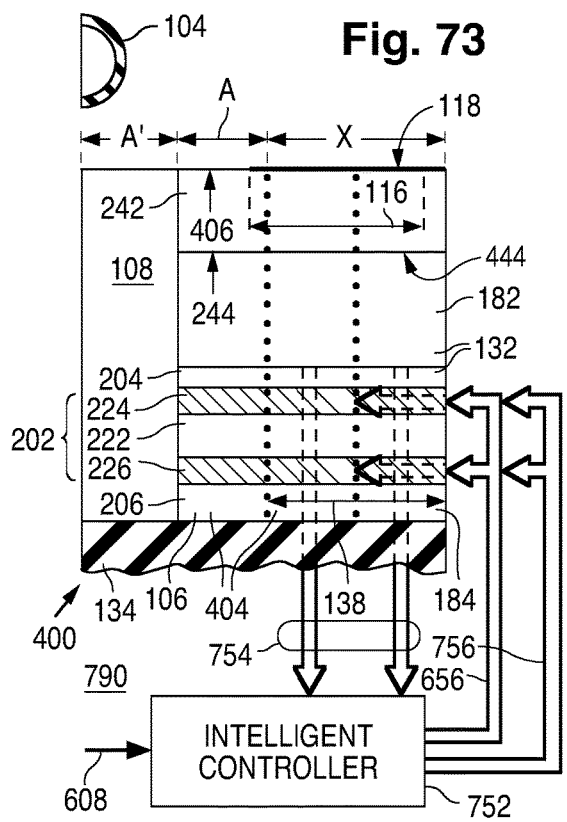

FIG. 73 depicts an embodiment 790 of IP structure 750 responding to instruction 608. IP structure 790 is also an extension of OI structure 460 to include controller 752 and an extension of IP structure 770 to include SF structure 242. VC region 106 here consists of ISCC structure 132 formed with IS component 182 and CC component 184 consisting of subcomponents 204, 224, 222, 226, and 206. Components 182 and 184 and duration controller 602 here are configured, operate, and interact the same as in IP structure 770. SF structure 242 here again is configured and functions the same as in OI structure 460. When ISCC structure 132 functions as a PSCC structure, each cell 404 meeting the cellular excess internal pressure criteria temporarily becomes a TH CM cell and, if the supplemental impact criteria are met, a full CM cell.

An IP structure formed with controller 752 and OI structure 480 containing DE structure 302 and ISCC structure 132 formed with IS component 182 and CC component 184 consisting of subcomponents 204, 224, 222, 226, and 206 can be implemented the same as IP structure 790 except that DE structure 302 lies between components 182 and 184. An IP structure formed with controller 752 and OI structure 500 containing SF structure 242, DE structure 302, and ISCC structure 132 formed with IS component 182 and CC component 184 consisting of subcomponents 204, 224, 222, 226, and 206 can also be implemented the same as IP structure 790 again except that DE structure 302 lies between components 182 and 184.

Controller 752 may provide a PA shape correction capability. As indicated above, the general supplemental impact information received by controller 752 via the cellular CI impact signals from TH CM cells 404 meeting the cellular TH impact criteria usually includes the shape expected for print area 118. The supplemental impact criteria then include static shape criteria for area 118. In determining that the shape information sufficiently satisfies the shape criteria so that each TH CM cell 404 becomes a full CM cell, controller 752 may determine that one or more nearby cells 404 not meeting the cellular TH impact criteria should undergo color change to better present area 118 in view of the shape criteria. If so, the PA shape correction capability is performed by having controller 752 provide a principal cellular CC initiation signal, transmitted via network 756, to the ISCC part of each such nearby cell 404 for causing it to temporarily appear as color X. If controller 752 receives instruction 608, controller 752 provides each such nearby cell 404 with a principal cellular CC duration signal, transmitted via network 656, to the ISCC part of that cell 404 for adjusting its CC duration $\Delta t_{dr}$ subsequent to impact.

The supplemental impact assessment capability furnished by intelligent controller 702 or 752 enables each of IP structures 700, 710, 720, 730, and 740 or 750, 760, 770, 780, and 790 to accurately and quickly distinguish between impacts of object 104 for which color change is desired and impacts of bodies for which color change is not desired so as to provide color change only for suitable impacts of object 104. The size, shape, and/or OC duration criteria can be chosen to cause color change when a ball impacts SF zone 112 sufficiently hard but not when a shoe of a person impacts zone 112 as arises with tennis lines, and vice versa as arises with the three-point lines in basketball. The supplemental impact assessment capability for any impact is usually performed in a very small part of a second, usually no more than 0.1 s, preferably no more than 10 ms, more preferably no more than 5 ms. Hence, a color change at print area 118 seems to occur almost simultaneously with the impact as seen by a person. Also, the size and/or shape criteria, both static and time-varying, may vary with where area 118 is located in zone 112.

The supplemental impact criteria sometimes require that print area 118 be entirely inside SF zone 112. This is typically expressed by the physical requirement that area 118 be spaced apart from interface 110 and each other part of the boundary of zone 112. For this purpose, controller 702 or 752 may maintain an electronic map of zone 112, including the location of the edge of interface 110 along surface 102 and each other part of the boundary of zone 112. The general supplemental impact information includes the location of OC area 116 on the map. Controller 702 or 752 determines the expected location of print area 118 from the OC-area location and examines the map to determine whether area 118 is entirely inside zone 112.

Image Generation and Object Tracking

Figure 74:
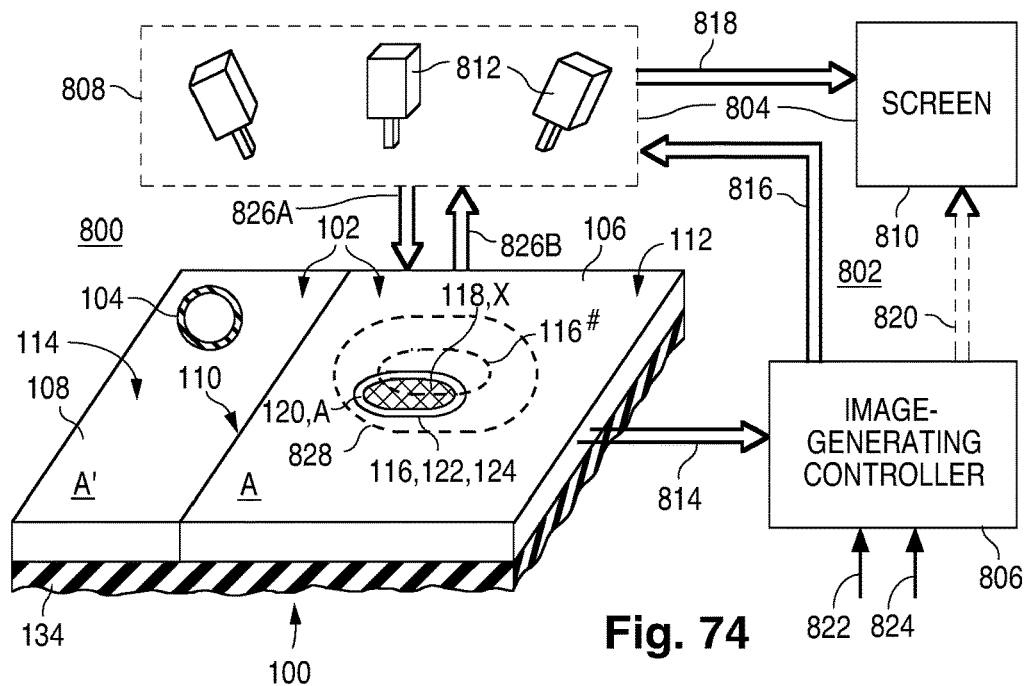
FIGS. 74-77 are composite block diagrams/perspective cross-sectional views of four respective IP structures, each containing an OI structure having a surface for being impacted by an object at an ID area and for changing color along a corresponding print area of a VC region and also having an image-generating capability according to the invention.

FIG. 74 illustrates an IP structure 800 consisting of OI structure 100 and an image-generating system 802 for generating images (or pictures) of print area 118 and selected adjoining SF area. "IG" hereafter means image-generating. The images can be used, e.g., by persons, to examine where area 118 occurs in SF zone 112, e.g., to assist in determining how closely area 118 comes to a selected part of the boundary of zone 112. VC region 106 here can be embodied in any way for embodying it in any of OI structures 130, 180, 200, 240, 260, 270, 280, 300, 320, 330, 340, and 350.

IG system 802 consists of IG structure 804 for generating images and an IG controller 806 for controlling IG structure 804 to suitably generate principal PA vicinity images. "PAV" hereafter means print-area vicinity. Structure 804 is formed with an image-collecting apparatus 808 for collecting images, including PAV images, and a video screen 810 for displaying the collected images. Image-collecting apparatus 808, typically formed with one or more cameras 812, is deployed to have a field of view that enables apparatus 808 to collect an image of any part of VC SF zone 112 as well as an adjoining part of surface 102 outside zone 112, e.g., an adjoining part of FC SF zone 114. A network 814 of COM paths extends from VC region 106 to IG controller 806.

Each principal PAV image, usually a rectangular static (still) color image, consists of an image of print area 118 and adjacent surface extending to at least a selected location of surface 102. The selected SF location is usually a partial boundary of SF zone 112, e.g., the edge of interface 110 along zone 112. Area 118 appears as an image print area on the PAV image. Each PAV image occupies an imaging area $A_{im}$. The image print area occupies an imaging print area $A_{pim}$. For assisting persons to rapidly see how close area 118 comes to the selected SF location, the ratio $A_{im}/A_{pim}$ of imaging area $A_{im}$ to imaging print area $A_{pim}$ is usually no more than 100, preferably no more than 50, more preferably no more than 25, even more preferably no more than 10.

The ID ISCC segment (142) provides the general LI impact signal in response to the impact if it meets the basic TH impact criteria. Responsive to the LI impact signal transmitted via COM network 814 and thus to the impact if the basic TH impact criteria are met, controller 806 provides a principal PA identification signal identifying the location of print area 118 in SF zone 112 provided that a principal IG condition, explained below, is met. The PA identification signal is transmitted via a COM path 816 to IG structure 804, specifically image-collecting apparatus 808. Structure 804 responds by generating a PAV image. In particular, apparatus 808 collects the PAV image, specifically the data for the PAV image, in response to the PA identification signal. The PAV-image data is transmitted via a COM path 818 to video screen 810 which displays the PAV image. Controller 806 may provide a screen activation/deactivation signal, transmitted via a COM path 820, to screen 810 for activating or deactivating it.

Controller 806 can usually be selected (or set) to operate in an automatic mode or in an instruction mode for causing IG structure 804 to generate PAV images if the basic TH impact criteria are met. The mode selection is done with a mode-selection device (not shown) located on controller 806 or with a remote mode-selection device (also not shown) which communicates with controller 806 via a COM path. In the automatic mode, controller 806 responds to the LI impact signal by automatically causing structure 804 to generate a PAV image if print area 118 meets the principal distance condition that a point in area 118 be less than or equal to a selected distance away from the selected location on surface 102. The distance condition is met when a point in area 118 is in the selected SF location. Controller 806 analyzes the impact signal to determine if the distance condition is met and, if so, provides the PA identification signal that causes structure 804 to generate the PAV image.

In the instruction mode, controller 806 responds to external instruction 822 prescribing that a PAV image be generated. External instruction 822 is supplied to controller 806 after CC duration $\Delta t_{dr}$ begins and before it terminates. Typically human originated, instruction 822 can be furnished to controller 806 in any of the ways for supplying instruction 608 to controller 602. If controller 806 receives both instruction 822 and the LI impact signal, controller 806 provides the identification signal which causes IG structure 804 to generate the PAV image. The IG condition that must be met for the identification signal to be supplied to structure 804 if the basic TH impact criteria are met thus consists of print area 118 meeting the distance condition or/and controller 806 receiving instruction 822.

An electronic map of SF zone 112, including the location of the SF edge of interface 110 and each other part of the boundary of zone 112, may be maintained in controller 806. Responsive to the general LI impact signal, controller 806 determines the expected location of print area 118 on the map and itself generates the data for a PAV image if the IG condition is met. When the basic TH impact criteria are met, controller 806 thus generates the PAV-image data if (a) area 118 meets the distance condition that a point in area 118 be less than or equal to a selected distance away from a selected location on surface 102 or/and (b) controller 806 receives instruction 822. The PAV-image data includes the shape of the perimeter of area 118, the shape of the selected location on surface 102, and distance data defining the spatial relationship between the perimeter of area 118 and the selected SF location. Controller 806 provides the PAV-image data directly, e.g., via COM path 820, to screen 810 which responds by generating the PAV image. The main difference between this technique for generating a PAV image and the earlier-mentioned technique for generating a PAV image is that controller 806 here directly generates the PAV-image data instead of image-collecting apparatus 808 generating the PAV-image data in response to the PA identification signal supplied from controller 806.

IG controller 806 may be capable of providing a magnify/shrink signal prescribing a selected percentage of magnification or shrinkage of the image print area. IG structure 804 responds to the magnify/shrink signal by magnifying or shrinking the image print area by approximately the selected percentage. This can be done by increasing or decreasing the size of the PAV image so that it appears larger or smaller on screen 810 while maintaining ratio $A_{im}/A_{pim}$ constant or/and by increasing or decreasing the size of the image print area while maintaining the size of PAV image constant so that ratio $A_{im}/A_{pim}$ decreases or increases.

The magnify/shrink signal can be automatically provided by controller 806 when a selected impact condition arises. The impact condition can, for example, be the above distance condition that a point in print area 118 be less than or equal to a selected distance away from the selected location on surface 102. Controller 806 can alternatively supply the magnify/shrink signal in response to external instruction 824. Typically human originated, external instruction 824 can be furnished to controller 806 in any of the ways for supplying instruction 608 to controller 602. The magnify/shrink signal can be supplied to image-collecting apparatus 808 via, e.g., COM path 816. Apparatus 808 magnifies or shrinks the image print area and supplies the resultant adjusted version of the PAV image via COM path 818 to screen 810 for it to display. Alternatively, controller 806 can supply the magnify/shrink signal directly to screen 810, e.g., via path 820. Screen 810 then contains a capability for providing the requisite magnification or shrinkage of the image print area.

Image-collecting apparatus 808 optionally functions as an object-tracking control apparatus for optically tracking the movement of object 104 over surface 102 in order to facilitate distinguishing between impacts of object 104 for which color change is desired and impacts of bodies for which color change is not desired. "OT" hereafter means object-tracking. The optical tracking entails having OT control apparatus 808 generate images of object 104 as it moves over surface 102 to form a film (or motion picture) of the object's movement relative to surface 102.

In a first basic OT technique, VC region 106 is capable of being enabled to be capable of changing color at locations dependent on the object tracking. All of region 106 is normally disabled from being capable of changing color so that region 106 normally appears as principal color A. The ISCC structure (132) provides the enablable/disablable CC capability. Using trajectory-assessment software, OT control apparatus 808 estimates where object 104 is expected to impact surface 102 according to the tracked movement of object 104 and provides a principal general CC enable signal shortly prior to the impact if the tracked movement of object 104 indicates that it is expected to contact surface 102 at least partly in SF zone 112. The general CC enable signal, transmitted via a COM path 826A to region 106 specifically the ISCC structure, at least partly identifies an ID estimated OC area 116#, indicated by dashed line in FIG. 74 and in later FIG. 75, spanning where object 104 is so expected to contact zone 112. Based on the size, shape, and material characteristics of object 104 and on the kinematics of the expected impact between object 104 and zone 112, estimated OC area 116# is usually of roughly the same physical area as actual OC area 116 even though areas 116 and 116# (turn out to) differ somewhat in location along zone 112.

Figure 75:
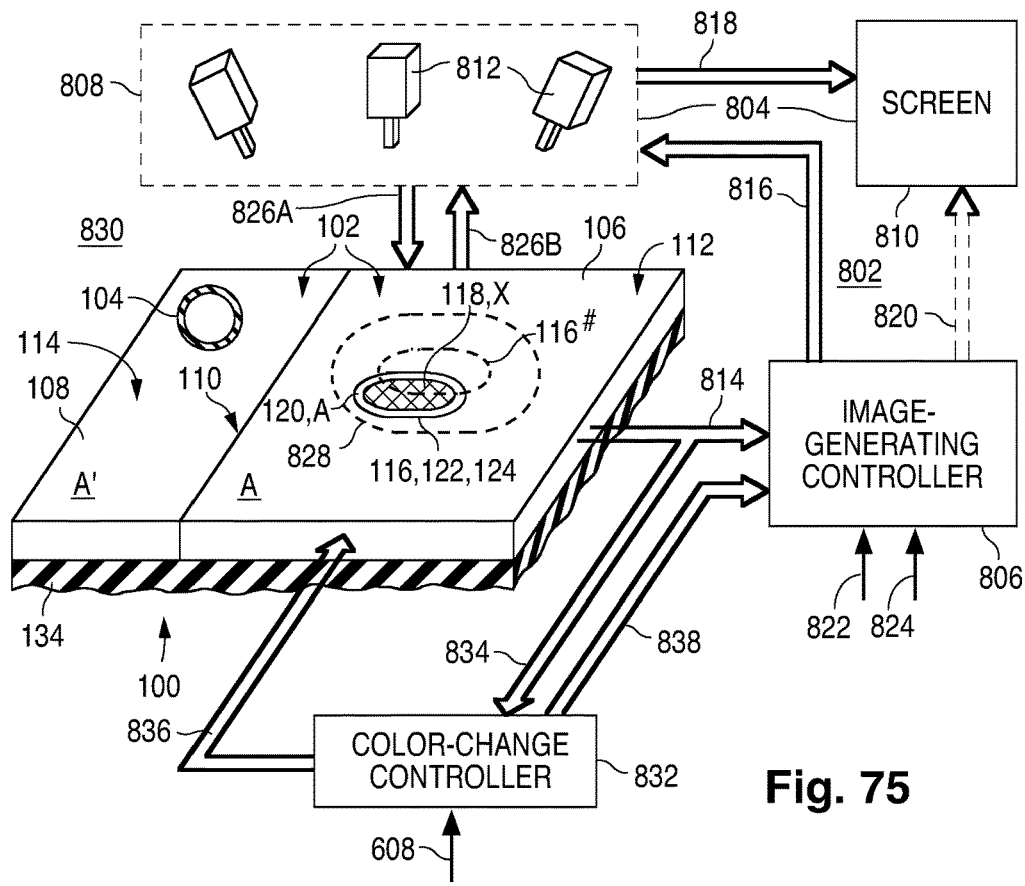

Responsive to the CC enable signal, an ID laterally oversize portion of VC region 106 extending to an ID oversize area 828, also indicated by dashed line in FIGS. 74 and 75, of SF zone 112 is temporarily enabled to be capable of changing color as the oversize portion of region 106 appears along ID oversize area 828. When region 106 includes structure besides the ISCC structure, the ISCC structure causes the oversize portion of region 106 to be enabled to be capable of changing color. Area 828, usually roughly concentric with estimated OC area 116#, encompasses and extends beyond it. Oversize area 828 can be determined by OT control apparatus 808 and then identified by the enable signal or determined by region 106, usually the ISCC structure, in response to the enable signal. Apparatus 808 and region 106, specifically the ISCC structure, operate so that area 828 virtually always fully encompasses actual OC area 116. For this purpose, the ratio of oversize area 828, in area, to estimated OC area 116#, in area, is usually at least 2, preferably at least 4, and usually no more than 16, preferably no more than 8. The ratio of the average diameter of area 828 to the average diameter of area 116# is thus usually at least $\sqrt{2}$, preferably at least 2, and usually no more than 4, preferably no more than $2\sqrt{2}$.

The IDVC portion (138), which is included in the oversize portion of VC region 106 and is thereby temporarily enabled to be capable of changing color, responds to object 104 impacting oversize area 828 at actual OC area 116 by temporarily appearing along print area 118 as changed color X if the impact meets the basic TH impact criteria. When region 106 includes structure besides the ISCC structure, the ID ISCC segment (142) causes the IDVC portion to temporarily appear as color X. The anticipation time period $\Delta t_{ant}$ between the instant $t_{act}$ at which the oversize portion of region 106 becomes enabled to be capable of changing color and instant $t_{ip}$ at which object 104 impacts surface 102 is usually no more than 200 ms, preferably no more than 100 ms, more preferably no more than 50 ms, even more preferably no more than 25 ms. The oversize portion of region 106 remains enabled to be capable of changing color throughout CC duration $\Delta t_{dr}$, automatic value $\Delta t_{drau}$ here unless changed in any of the ways described above, after which the IDVC portion returns to (appearing as) color A.

The oversize portion of VC region 106 typically automatically becomes disabled from being capable of changing color at a specified enable-end time period $\Delta t_{end}$ after the end of CC duration $\Delta t_{dr}$ and thus after the IDVC portion has substantially returned to color A. Enable-end time period $\Delta t_{end}$ is usually no more than 200 ms, preferably no more than 100 ms, more preferably no more than 50 ms, even more preferably no more than 25 ms. Alternatively, the oversize portion of region 106 automatically becomes disabled from being capable of changing color at the end of CC duration $\Delta t_{dr}$. This causes the IDVC portion to return to color A.

VC region 106, specifically the ISCC structure, in the first basic OT technique typically contains components 182 and 184. IS segment 192 responds to object 104 impacting OC area 116 by providing the general impact effect if the impact meets the basic TH impact criteria and the oversize portion of region 106 is enabled to be capable of changing color. In other words, segment 192 provides the impact effect in response to joint occurrence of the impact meeting the basic TH impact criteria and the oversize portion of region 106 being enabled to be capable of changing color. CC segment 194 responds to the impact effect by causing the IDVC portion to temporarily appear as color X. When CC component 184 contains assembly 202, the general CC control signal applied between electrode segments 234 and 236 and largely across core segment 232 is provided by region 106 in response to the impact effect applied between a location in NE structure 224 and a location in FE structure 226 if the oversize portion of region 106 is enabled to be capable of changing color.

In a second basic OT technique, OT control apparatus 808 provides a principal general impact tracking signal, specifically at an impact-indicating condition, during at least part of a tracking contact time period $\Delta t_{cont}$ extending substantially from when, approximately impact time $t_{ip}$, object 104 impacts SF zone 112 to when, approximately OS time $t_{os}$, object 104 leaves zone 112 according to the tracked movement of object 104. The general impact tracking signal, which indicates that object 104 impacted zone 112, is transmitted via COM path 826A to the IDVC portion (138), specifically the ID ISCC segment (142). The IDVC portion responds to largely joint occurrence of the tracking signal and the impact by temporarily appearing along print area 118 as color X if the impact meets the basic TH impact criteria. When VC region 106 contains structure besides the ISCC structure, the ISCC segment causes the IVDC portion to temporarily appear as color X.

VC region 106, specifically the ISCC structure, in the second basic OT technique typically contains components 182 and 184. IS segment 192 responds to object 104 impacting OC area 116 by providing the general impact effect if the impact meets the basic TH impact criteria. CC segment 194 responds to largely joint occurrence of the tracking signal and the impact effect, e.g., to the logical AND of the tracking signal and a signal representing the effect, by causing the IDVC portion to temporarily appear as color X. When CC component 184 contains assembly 202, the general CC control signal applied between electrode segments 234 and 236 and largely across core segment 232 is provided by region 106 in response to largely joint occurrence of the tracking signal and the impact effect which is applied between a location in NE structure 224 and a location in FE structure 226.

In a third basic OT technique, the IDVC portion (138), specifically the ID ISCC segment (142), responds to object 104 impacting SF zone 112 at OC area 116 by providing a principal general LI impact signal if the impact meets the basic TH impact criteria, "LI" again meaning location-identifying. The general LI impact signal, transmitted via a COM path 826B to OT control apparatus 808, identifies an expected location of print area 118 in zone 112. Using trajectory-assessment software, apparatus 808 estimates where object 104 contacted surface 102 according to the tracked movement of object 104 and provides a principal general estimation impact signal indicative of the estimated OC area spanning where object 104 is so estimated to have contacted surface 102 if the estimate of that contact is at least partly in zone 112. Apparatus 808 then compares the LI impact signal and the general estimation impact signal. If the comparison of the LI and estimation impact signals indicates that area 118 and the estimated OC area at least partly overlap, apparatus 808 provides a principal general CC initiation signal to the IDVC portion, specifically the ISCC segment, via path 826A. The IDVC portion responds to the general CC initiation signal by temporarily appearing along area 118 as color X. When VC region 106 contains structure besides the ISCC structure, the ISCC segment causes the IDVC portion to temporarily appear as color X in response to the initiation signal.

VC region 106, specifically the ISCC structure, in the third basic OT technique typically contains components 182 and 184. IS segment 192 responds to object 104 impacting OC area 116 by providing the general impact effect in the form of the general LI impact signal if the impact meets the basic TH impact criteria. After OT control apparatus 808 operates on the general LI and estimation impact signals to produce the general CC initiation signal, CC segment 194 responds to the initiation signal by causing the IDVC portion to temporarily appear along print area 118 as color X. When CC component 184 includes assembly 202, the general CC control signal applied between electrode segments 234 and 236 and largely across core segment 232 is provided by region 106 in response to the impact effect applied between a location in NE structure 224 and a location in FE structure 226.

Importantly, if a body not tracked by OT control apparatus 808 impacts SF zone 112 so as to meet the basic TH impact criteria in each of the three OT techniques, apparatus 808 (i) does not provide a general CC enable signal that leads to enablement of the CC capability in an oversize portion of VC region 106 in the first OT technique, (ii) does not provide an impact tracking signal to indicate that the body contacted zone 112 in the second OT technique, and (iii) does not provide a general CC initiation signal that leads to a color change at the location where the body contacted zone 112 in the third OT technique. No color change along zone 112 occurs where the body contacted zone 112 even though the body's impact met the TH impact criteria. Each OT technique thus enables IP structure 800 to cause color change for impacts of object 104 for which color change is desired and to avoid causing color change for impacts of bodies for which color change is not desired.

The need for the general LI impact signal in the first and second basic OT techniques is reduced, virtually eliminated, because the object tracking identifies object 104 and determines where it impacts SF zone 112. IG controller 806 can sometimes be provided in simpler form to be responsive only to instructions 822 and 824. Alternatively, controller 806 can be eliminated, instruction 822 can be directly provided to OT control apparatus 808, and instruction 824 can be provided directly to screen 810.

FIG. 75 illustrates an IP structure 830 containing OI structure 100 and IG system 802 for generating images of print area 118 and selected adjoining SF area. System 802 is again formed with IG controller 806 and IG structure 804 consisting of image-collecting apparatus 808 and screen 810. OI structure 100 and imaging components 806, 808, and 810 here are all configured, embodiable, and operable the same as in IP structure 800 except as explained below. In addition, IP structure 830 includes a principal general CC controller 832. A network 834 of COM paths extends from VC region 106 to general CC controller 832. COM network 834 may partly overlap network 814 for system 802. A network 836 of COM paths extends from controller 832 back to region 106.

Controller 832 can be duration controller 602 for adjusting CC duration $\Delta t_{dr}$ subsequent to impact. COM networks 834 and 836 then respectively embody networks 604 and 606 for transmitting the general LI impact and CC duration signals for VC region 106. Alternatively, controller 832 can be intelligent controller 702 for providing the supplemental impact assessment capability to determine whether an impact meeting the basic TH impact criteria has certain supplemental impact characteristics and, if so, for causing the IDVC portion (138) to temporarily appear as color X. The impact characteristics identified by the general CI impact signal provided by the IDVC portion, specifically the ID ISCC segment (142), upon meeting the TH impact criteria again consist of the location expected for print area 118 in SF zone 112 and the general supplemental impact information. The principal expanded impact criteria that must be met to cause a temporary color change consist of the basic TH impact criteria and the supplemental impact criteria. Networks 834 and 836 now respectively embody networks 704 and 706 for transmitting the general CI impact and CC initiation signals. For either embodiment, controller 832 responds to instruction 608 the same as controller 602 or 702.

IG controller 806 can operate in various ways when controller 832 is an intelligent controller. It is sometimes desirable to generate a PAV image regardless of whether the supplemental impact criteria are, or are not, met. Controller 806 then supplies the PA identification signal in response to the expected location for print area 118 provided in the general CI impact signal. Network 814 may transmit the entire general CI impact signal to controller 806. If so, controller 806 largely ignores the supplemental impact information. A PAV image is generated whenever the basic TH impact criteria are met. Controller 806 usually provides the PA identification signal in response to the general CC initiation signal supplied from controller 832 via a COM path 838. In that case, a PAV image is generated only when the supplemental impact criteria are met.

If image-collecting apparatus 808 functions as an OT control apparatus for optically tracking the movement of object 104 over surface 102 in IP structure 830, there is generally considerably less need to provide the supplemental impact assessment capability for distinguishing between impacts of object 104 for which color change at print area 118 is desired and impacts of bodies for which color change is not desired because the object tracking usually inherently means that impact of object 104 on SF zone 112 is highly likely to meet the supplemental impact criteria. Use of controller 832 as an intelligent controller can often be significantly reduced or eliminated.

Alternatively, controller 832 performs all or part of the data processing performed by image-collecting apparatus 808 in the three OT techniques described above. Controller 832 or the combination of controller 832 and apparatus 808 then functions as an OT control apparatus. For instance, in a variation of the first OT technique, controller 832 estimates where object 104 is expected to contact surface 102 according to the tracked movement of object 104 and provides the general CC enable signal if the tracked movement indicates that object 104 is expected to contact surface 102 at least partly in SF zone 112. Controller 832 provides the general impact tracking signal in a variation of the second OT technique. In a variation of the third OT technique, controller 832 estimates where object 104 contacted surface 102 according to the tracked movement of object 104, provides the general estimation impact signal if object 104 is estimated to have at least partly contacted zone 112, compares the general LI and estimation impact signals, and provides the general CC initiation signal if the comparison indicates that the estimated OC area and print area 118 at least partly overlap.

Figure 76:
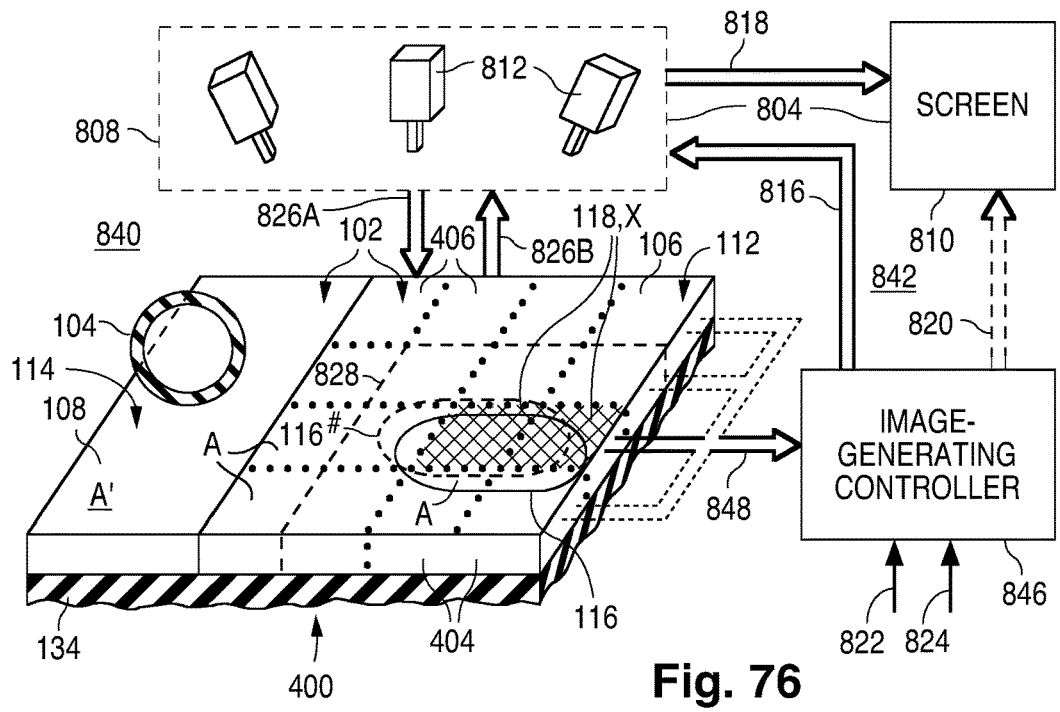

FIG. 76 illustrates an IP structure 840 consisting of OI structure 400 and an IG system 842 for generating images of print area 118 and selected adjoining SF area. The images can be used to examine where area 118 occurs in SF zone 112, e.g., to see how closely area 118 comes to a selected part of the boundary of zone 112. Structure 400 here can be embodied with any of OI structures 410, 420, 430, 440, 450, 460, 470, 480, 490, and 500 implemented in any way described above.

IG system 842 consists of IG structure 804 and an IG controller 846 for controlling structure 804 to suitably generate principal PAV images. Structure 804 here consists of image-collecting apparatus 808 and screen 810 configured and operable the same as in IP structure 800. A network 848 of COM paths extends from all cells 404 to IG controller 846. COM network 848 usually includes a set of row COM paths, each connected to a different row of cells 404, and a set of column COM paths, each connected to a different column of cells 404.

The ISCC part of each CM cell 404 responds to object 104 impacting OC area 116 by providing the cellular LI impact signal identifying that cell's location along SF zone 112. The cellular LI impact signal of each CM cell 404 is transmitted via network 848 to controller 846. FIG. 76 and later FIG. 77 utilize solid line to show the parts of network 848 used by CM cells 404 in the illustrated example and dashed line to show the other parts of network 848.

Responsive to the cellular LI impact signals from CM cells 404, controller 846 provides a PA identification signal identifying the location of print area 118 in SF zone 112 if an IG condition is met. The PA identification signal is transmitted via path 816 to IG structure 804, specifically image-collecting apparatus 808. As with IG controller 806, the IG condition consists of area 118 meeting the above-described distance condition or controller 846 receiving instruction 822. Structure 804 here responds to the PA identification signal the same as in IP structure 800.

Controller 846 can usually be selected (or set) the same as controller 806 to operate in an automatic mode or in an instruction mode for causing IG structure 804 to generate a PAV image if the basic TH impact criteria are met, controller 846 being responsive to instruction 822 in the instruction mode. Controller 846 may maintain an electronic map of SF zone 112, including the location of the SF edge of interface 110 and each other part of the boundary of zone 112. If so, controller 846 can generate the data for a PAV image the same as controller 806 uses such a map to generate the data for a PAV image. The PAV-image data is supplied from controller 846 directly, e.g., via path 820, to screen 810 which displays the PAV image. The cell arrangement of VC region 106 in OI structure 400 facilitates generation of the map because SF part 406 of each cell 404 is at a different specified location on the map. Responsive to instruction 824, controller 846 may provide a magnify/shrink signal the same as controller 806.

Image-collecting apparatus 808 optionally functions as an OT control apparatus for optically tracking the movement of object 104 over surface 102 in IP structure 840 in implementations of the OT techniques described above for IP structure 800 to provide color change only for impacts of object 104 for which color change is desired. Although not shown in FIG. 76 or 77, path 826A splits into a group of individual COM paths respectively extending to the ISCC parts of all cells 404.

Figure 77:
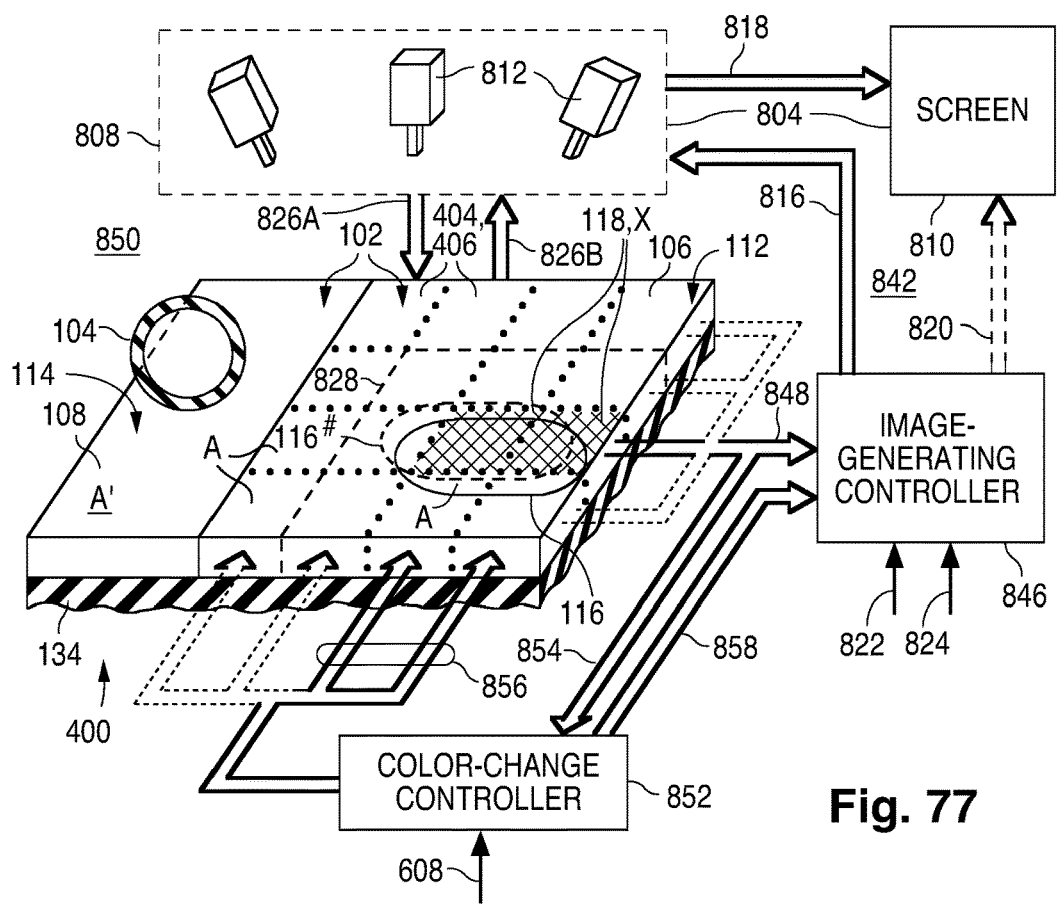

Cells 404 in an implementation of the first basic OT technique are enablable/disablable cells normally disabled from being capable of changing color as they appear along SF parts 406. The oversize portion of VC region 106 is constituted with an ID group of cells 404 termed the oversize cell group. In FIGS. 76 and 77, dashed line is used to indicate the left-most edges of left-most cells 404 in the oversize cell group and to indicate the farthest-most edges of farthest-most cells 404 in the oversize cell group. Oversize area 828 consists of SF parts 406 of cells 404 in the oversize cell group. Responsive to the CC enable signal transmitted along one of COM paths 826A, each cell 404 in the oversize cell group is enabled in to be capable of changing color. When region 106 includes structure besides the ISCC structure (132), the ISCC part of each cell 404 in the oversize cell group causes that cell 404 to be enabled to be capable of changing color. Each so-enabled cell 404 temporarily appears as changed color X if the impact of object 104 on SF zone 112 causes that cell 404 to meet the cellular TH impact criteria and temporarily become a CM cell. When region 106 contains structure besides the ISCC structure, the ISCC part of each CM cell 404 causes it to temporarily appear as color X.

The IDVC portion (138) in an implementation of the second basic OT technique is constituted with an ID group of cells 404. Each cell 404 in the ID cell group responds to largely joint occurrence of the general impact tracking signal, transmitted along a corresponding one of paths 826A, and object 104 impacting SF zone 112 by temporarily appearing as color X if the impact causes that cell 404 to meet the cellular TH impact criteria. Cells 404 in the ID group become CM cells that form ID cell group 138*. When VC region 106 includes structure besides the ISCC structure (132), the ISCC part of each cell 404 in cell group 138* causes that cell 404 to temporarily appear as color X.

In an implementation of the third basic OT technique, each of multiple cells 404 for which the impact of object 104 on that cell's SF part 406 meets the cellular TH impact criteria becomes part of a first ID group of cells 404 termed the ID expected PA cell group. Cells 404 in the ID expected PA cell group are TH CM cells. Each cell 404, specifically its ISCC part, in the expected PA cell group provides a principal cellular LI impact signal identifying the location of its SF part 406 in SF zone 112. Although not shown in FIG. 76 or 77, COM path 826B includes a group of individual COM paths respectively extending from all cells 404, specifically their ISCC parts, to OT control apparatus 808. The cellular LI impact signal of each cell 404 in the expected PA cell group is provided along a corresponding one of COM paths 826B to apparatus 808. SF parts 406 of cells 404 in the expected PA cell group form the area expected for print area 118. The cellular LI impact signals of all cells 404 in the expected PA cell group together form the general LI impact signal.

OT control apparatus 808 estimates where object 104 contacted surface 102 according to the tracked movement of object 104 and provides the general estimation impact signal to determine the estimated OC area here consisting of SF parts 406 of a second ID group of cells 404 termed the estimated-area cell group. As in IP structure 800, apparatus 808 here determines whether the estimated OC area at least partly overlaps print area 118. In this way, apparatus 808 determines whether any cell 404 is in both the estimated-area cell group and the expected PA cell group. If so, apparatus 808 provides the general CC initiation signal. Each cell 404 in the expected PA cell group responds to the CC initiation signal, transmitted along a corresponding one of paths 826A, by temporarily appearing as color X. When VC region 106 includes structure besides the ISCC structure (132), the ISCC part of each cell 404 in the expected PA cell group causes that cell 404 to temporarily appear as color X.

If a body not tracked by OT control apparatus 808 impacts SF zone 112 so as to meet the cellular TH impact criteria in each of these implementations of the three basic OT techniques, apparatus 808 (i) does not provide a general CC enable signal leading to enablement of the CC capability in cells 404 in the oversize cell group in the implementation of the first OT technique, (ii) does not provide an impact tracking signal to indicate that the body contacted zone 112 in the implementation of the second OT technique, and (iii) does not provide a general CC initiation signal leading to a color change at the location where the body contacted zone 112 in the implementation of the third OT technique. No color change along zone 112 occurs where the body contacted zone 112 even though the body's impact met the cellular TH impact criteria. The implementation of each OT technique enables IP structure 840 to cause color change for impacts of object 104 for which color change is desired and to substantially avoid causing color change for impacts of bodies for which color change is not desired. There is much less need for the cellular CI impact signals in all three implementations because the object tracking identifies object 104, thereby eliminating the need to provide general supplemental impact information for use in determining whether a body impacting zone 112 constitutes object 104.

FIG. 77 illustrates an IP structure 850 containing OI structure 400 and IG system 842 for generating images of print area 118 and selected adjoining SF area. IG system 842 is again formed with IG controller 846 and IG structure 804 consisting of image-collecting apparatus 808 and screen 810. Structure 400 and imaging components 808, 810, and 846 here are all configured, embodiable, and operable the same as in IP structure 840 except as explained below. Additionally, IP structure 850 includes a principal cell CC controller 852. A network 854 of COM paths extends from all cells 404 to cell CC controller 852. COM network 854 may partly overlap network 848 for IG system 842. A network 856 of COM paths extends from controller 852 back to all cells 404. Each COM network 854 or 856 usually includes a set of row COM paths, each connected to a different row of cells 404, and a set of column COM paths, each connected to a different column of cells 404.

Controller 852 can be duration controller 652 for adjusting CC duration $\Delta t_{dr}$ of each CM cell 404 subsequent to impact. Networks 854 and 856 then respectively embody networks 654 and 656 for transmitting the cellular LI impact and cellular CC duration signals for each CM cell 404. FIG. 77 utilizes solid line to show the parts of network 854 and 856 used by CM cells 404 in the illustrated example and dashed line to show the other parts of network 854 and 856. Alternatively, controller 852 can be intelligent controller 752 for providing the supplemental impact assessment capability to determine whether an impact meeting the TH impact criteria has certain supplemental impact characteristics and, if so, for causing TH CM cells 404 to temporarily become full CM cells 404 temporarily appearing as color X. If so, the ISCC parts of TH CM cells 404 provide the cellular CI impact signals. The cellular impact characteristics for each TH CM cell 404 again consist of its location in SF zone 112 and cellular supplemental impact information. The principal expanded impact criteria that must be met to cause a temporary color change consist of the cellular TH impact criteria and the supplemental impact criteria. Networks 854 and 856 now respectively embody networks 754 and 756 for transmitting the cellular CI impact and CC initiation signals for each CM cell 404. For either embodiment, controller 852 responds to instruction 608 the same as controller 652 or 752.

IG controller 846 can operate in various ways when controller 852 is an intelligent controller. If a PAV image is desired regardless of whether the supplemental impact criteria are, or are not, met, IG controller 846 furnishes the PA identification signal in response to the expected locations for CM cells 404, and thus print area 118, provided in the cellular CI impact signals transmitted via network 848. A PAV image is generated whenever the cellular TH impact criteria are met. Controller 846 usually provides the PA identification signal in response to the general CC initiation signal supplied from controller 852 via a COM path 858. A PAV image is then generated only when the supplemental impact criteria are met.

If image-collecting apparatus 808 is used as an OT control apparatus for optically tracking object 104 over surface 102 in IP structure 850, the need for the supplemental impact assessment capability is less because the object tracking usually inherently means that impact of object 104 on SF zone 112 is highly likely to meet the supplemental impact criteria. Use of controller 852 as an intelligent controller can often be significantly reduced or eliminated. Alternatively, controller 852 performs all or part the data processing performed by apparatus 808 in the implementations of the three OT techniques similar to how controller 832 alternatively performs all or part the data processing performed by apparatus 808 in the three OT techniques. Controller 852 or the combination of controller 852 and apparatus 808 then functions as an OT control apparatus.

The signals provided from and to OI structure 100 or 400 via networks 814, 834, and 836 or 848, 854, and 856 in IP structures 800 and 830 or 840 and 850 may leave and enter OI structure 100 or 400 via wires along its sides or/and along substructure 134. Any of those wires leaving structure 100 or 400 along its sides extend into adjoining material of FC region 108, into other regions adjoining the sides of structure 100 or 400, or/and into open space. Part of the signal processing performed on the signals provided from structure 100 or 400 via networks 814 and 834 or 848 and 854 to produce the signals provided to structure 100 or 400 via networks 836 or 856 may be physically performed in structure 100 or 400, e.g., in FA layer 206 when VC region 106 is embodied as in any of OI structures 200, 270, and 300 or 460, 480, and 500. Controllers 806 and 832 or 846 and 852 may thus partially merge into structure 100 or 400.

Multiple Variable-color Regions

"PP", "AD", "FR", and "CP" hereafter respectively mean principal, additional, further, and composite.

Figure 78A:
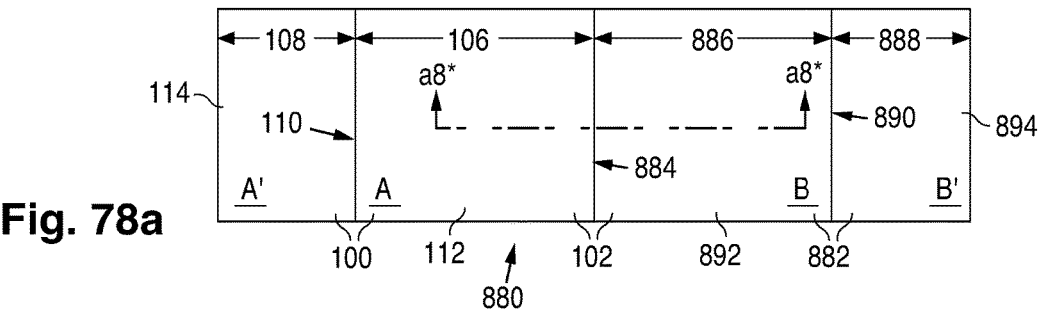
FIGS. 78*a* and 78*b* are layout views of an OI structure having a surface for being impacted by an object at an ID area and for changing color along a corresponding print area of one or both of two adjoining VC regions according to the invention.
Figure 78B:
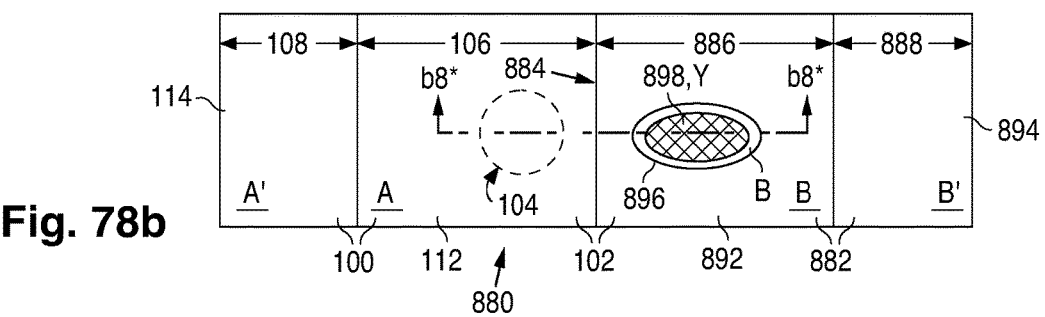

FIGS. 78*a* and 78*b* (collectively "FIG. 78") illustrate the layout of an OI structure 880 for being impacted by object 104. OI structure 880, which serves as or in an IP structure, consists of PP OI structure 100 and an AD OI structure 882 that meet along a PP-AD interface 884. See FIG. 78*a*. Although interface 884 appears straight in FIG. 78*a*, OI structures 100 and 882 can be variously geometrically configured, e.g., curved, or flat and curved, where they meet at interface 884. They can meet at corners. PP structure 100 can extend partly or fully laterally around AD structure 882 and vice versa. For instance, structure 882 can adjoin structure 100 along two or more sides of structure 100 if it is shaped laterally like a polygon and vice versa. Structure 882 consists of an AD VC region 886 and a subordinate FC region 888 that meet along an AD region-region interface 890. The preceding observations about the shape of interface 884 apply to interface 890 subject to color regions 886 and 888 replacing structures 100 and 882. VC regions 106 and 886 meet along interface 884.

AD VC region 886 extends to surface 102 at an AD VC SF zone 892 of surface 102 and normally appears along all of AD SF zone 892 as an AD SF color B. Region 886 is then in its normal state with only B light normally leaving it via zone 892. AD SF color B differs, usually materially, from PP color A. Color B usually differs, usually materially, from changed color X. Region 886 contains AD ISCC structure along or below all of zone 892. Examples of the AD ISCC structure, not separately indicated in FIG. 78, are described below and shown in later drawings. Region 886 may contain other structure likewise described below and shown in later drawings.

Subordinate FC region 888, which extends to surface 102 at a subordinate FC SF zone 894, fixedly appears along subordinate FC SF zone 894 as a subordinate SF color B'. Subordinate SF color B', usually different from secondary color A', is often the same as, but can differ significantly from, AD color B. Region 888 can consist of multiple subordinate FC subregions extending to zone 894 so that consecutive ones appear along it as different subordinate colors B'. Except as indicated below, region 888 is hereafter treated as appearing along zone 894 as only one color B'. SF zones 892 and 894 meet at an SF edge of interface 890.

Color regions 106, 108, 886, and 888 can laterally have various shapes besides the rectangles shown in FIG. 78. Examples of these shapes are presented below for FIGS. 96-101. FC regions 108 and 888 can meet each other. If so, they can merge so that colors A' and B' are the same color.

An ID portion, termed the AD IDVC portion, of VC region 886 responds to object 104 impacting VC SF zone 892 at an AD ID OC area 896 spanning where object 104 contacts (or contacted) zone 892 by temporarily appearing along a corresponding AD ID print area 898 of zone 892 as a generic altered SF color Y (a) in first general OI embodiments if the impact on AD ID OC area 896 meets AD basic TH impact criteria usually numerically the same as the PP basic TH impact criteria or (b) in second general OI embodiments if the AD IDVC portion is provided with an AD general CC control signal generated in response to the impact meeting the AD basic TH impact criteria sometimes dependent on other impact criteria also being met in those second embodiments. See FIG. 78*b*. OC area 896 is capable of being of substantially arbitrary shape. AD ID print area 898 constitutes part of zone 892, all of which is capable of temporarily appearing as generic altered SF color Y. Area 898 closely matches OC area 896 in size, shape, and location. Specifically, print area 898 at least partly encompasses OC area 896, at least mostly, usually fully, outwardly conforms to it, and is largely concentric with it. The AD basic TH impact criteria can vary with where print area 898 occurs in zone 892.

If VC region 886 includes structure besides the AD ISCC structure, an ID segment of the AD ISCC structure specifically responds to object 104 impacting OC area 896 by causing the AD IDVC portion to temporarily appear along print area 898 as altered SF color Y (a) in the first general OI embodiments if the impact on OC area 896 meets the AD basic TH impact criteria or (b) in the second general OI embodiments if the AD ID ISCC segment is provided with the AD general CC control signal. In any event, region 886 goes to its changed state with only Y light temporarily leaving the AD IDVC portion via print area 898. Altered color Y differs materially from AD color B. Y light differs materially from B light. Altered color Y usually differs, usually materially, from PP color A. Color Y also usually differs from color B' and may be the same as, or significantly differ from, changed color X. When object 104 impacts on or near PP-AD interface 884, choosing colors X and Y to differ materially enables an observer to rapidly determine (if desired) whether object 104 only impacted SF zone 112, only impacted SF zone 892, or simultaneously impacted both of SF zones 112 and 892.

Analogous to the PP basic TH impact criteria, the AD basic TH impact criteria can consist of multiple sets of fully different AD basic TH impact criteria respectively associated with multiple specific (or specified) altered colors materially different from AD color B. More than one, usually all, of the specific altered colors differ, usually materially, from one another. The impact of object 104 on SF zone 892 is potentially capable of meeting any of the AD basic TH impact criteria sets. If the impact on zone 892 meets the AD basic TH impact criteria, generic altered color Y is the specific altered color for the AD basic TH impact criteria set actually met by that impact likewise sometimes dependent on other criteria also being met. The AD basic TH impact criteria sets usually form a continuous chain in which consecutive criteria sets meet each other without overlapping. The AD basic TH impact criteria sets sometimes have the same mathematical description, presented above, as the PP basic TH impact criteria sets and can consist of fully different ranges of excess SF pressure across OC area 896 or excess internal pressure along a projection of area 896 onto an internal plane the same as described above for the PP basic TH impact criteria sets subject to recitations of AD, altered, color B, color Y, and area 896 respectively replacing the preceding recitations of principal, altered, color A, color X, and OC area 116.

Figure 79A:
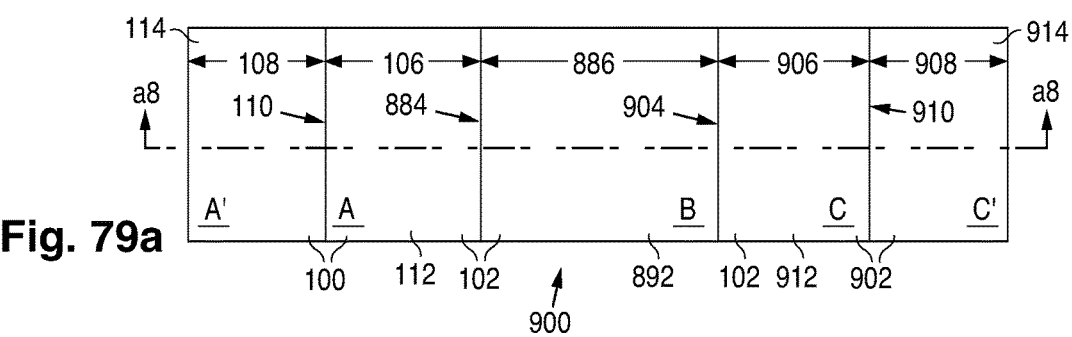
FIGS. 79*a* and 79*b* are layout views of an OI structure having a surface for being impacted by an object at an ID area and for changing color along a corresponding print area of one or more of three consecutively adjoining VC regions according to the invention. The cross section of each of FIGS. 80*a*, 81*a*, 82*a*, 83*a*, 84*a*, and 85*a* described below is taken through plane a8-a8 in FIG. 79*a*. The cross section of each of FIGS. 80*b*, 81*b*, 82*b*, 83*b*, 84*b*, and 85*b* described below is taken through plane b8-b8 in FIG. 79*b*. Label a8* in each of FIGS. 80*a*, 81*a*, 82*a*, 83*a*, 84*a*, and 85*a* indicates the location of a cross section taken through plane a8*-a8* in FIG. 78*a*. Label b8* in each of FIGS. 80*b*, 81*b*, 82*b*, 83*b*, 84*b*, and 85*b* indicates the location of a cross section taken through plane b8*-b8* in FIG. 78*b*.
Figure 79B:
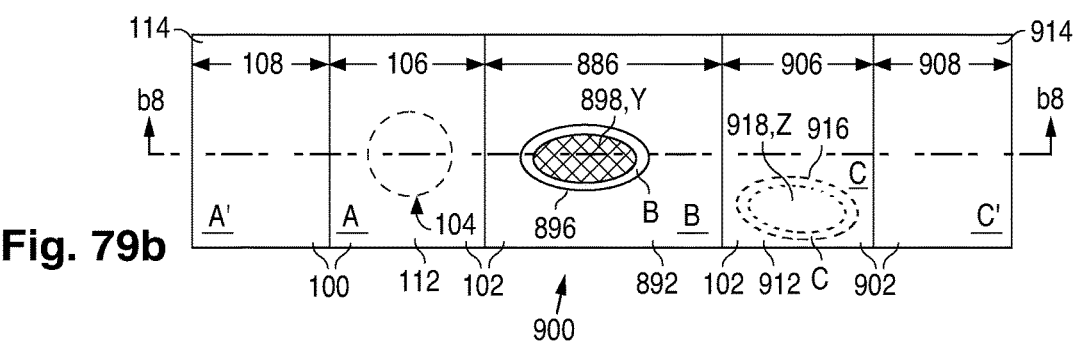

FIGS. 79a and 79b (collectively "FIG. 79") illustrate the layout of an OI structure 900 for being impacted by object 104. OI structure 900, which serves as or in an IP structure, consists of PP OI structure 100, an FR OI structure 902, and VC region 886 that meets OI structures 100 and 902 respectively along interface 884 and an AD-FR interface 904. All the above observations about the shape of interface 884 apply to interface 904 subject to FR OI structure 902 replacing OI structure 882. OI structure 902 consists of an FR VC region 906 and an ancillary FC region 908 that meet along an FR region-region interface 910. See FIG. 79a. All the above observations about the shape of interface 884 apply to interface 910 subject to color regions 906 and 908 replacing structures 100 and 882. VC regions 886 and 906 meet along interface 904.

FR VC region 906 extends to surface 102 at an FR VC SF zone 912 of surface 102 and normally appears along all of FR VC SF zone 912 as an FR SF color C. Region 906 is then its normal state with only C light normally leaving region 906 via zone 912. FR SF color C differs, usually materially, from AD color B. Color C usually differs, usually materially, from altered color Y and changed color X. Region 906 can significantly differ structurally from, or be the same structurally as, PP VC region 106. FR color C can thus significantly differ from, or be the same as, PP color A. PP color A, AD color B, and FR color C are sometimes termed normal-state colors. Region 906 contains FR ISCC structure along or below all of zone 912. Examples of the FR ISCC structure, not separately indicated in FIG. 79, are described below and shown in later drawings. Region 906 may contain other structure likewise described below and shown in later drawings.

Ancillary FC region 908, which extends to surface 102 at an ancillary FC SF zone 914, fixedly appears along ancillary FC SF zone 914 as an ancillary SF color C'. Ancillary SF color C', usually different from subordinate color B', is often the same as, but can differ significantly from, FR color C. FC region 908 can significantly differ structurally from, or be the same structurally as, FC region 108. Ancillary color C' can thus significantly differ from, or be the same as, secondary color A'. Also, region 908 can consist of multiple ancillary FC subregions extending to zone 914 so that consecutive ones appear along zone 914 as different ancillary colors C'. Except as indicated below, region 908 is hereafter treated as appearing along zone 914 as only one color C'. Color SF zones 912 and 914 meet at an SF edge of interface 910.

Color regions 108, 106, 886, 906, and 908 can be laterally shaped differently than the rectangles shown in FIG. 79. See FIGS. 96-101. VC regions 106 and 906 can meet each other. If so, they can merge so that colors A and C are the same color. FC regions 108 and 908 can likewise meet each other. If so, regions 108 and 908 can similarly merge so that colors A' and C' are the same color. FC region 888 (not shown here) having FC SF zone 894 can adjoin VC region 886 where it does not adjoin VC region 106 or 906.

FIG. 79b depicts an example in which object 104 impacts SF zone 892 of VC region 886 at OC area 896. An ID portion, termed the FR IDVC portion, of VC region 906 responds to object 104 impacting SF zone 912 of region 886 at an FR ID OC area 916 spanning where object 104 contacts (or contacted) zone 912 by temporarily appearing along a corresponding FR ID print area 918 of zone 912 as a generic modified SF color Z (a) in first general OI embodiments if the impact on FR ID OC area 916 meets FR basic TH impact criteria usually numerically the same as the AD basic TH impact criteria and thus usually numerically the same as the PP basic TH impact criteria or (b) in second general OI embodiments if the FR IDVC portion is provided with an FR general CC control signal generated in response to the impact meeting the FR basic TH impact criteria sometimes dependent on other impact criteria also being met in those second embodiments. OC area 916 is capable of being of substantially arbitrary shape. FR ID print area 918 constitutes part of zone 912, all of which is capable of temporarily appearing as generic modified SF color Z. Print area 918 closely matches OC area 916 in size, shape, and location. In particular, print area 918 at least partly encompasses OC area 916, at least mostly, usually fully, outwardly conforms to it, and is largely concentric with it. The FR basic TH impact criteria can vary with where print area 918 occurs in zone 912.

If VC region 906 includes structure besides the FR ISCC structure, an ID segment of the FR ISCC structure specifically responds to object 104 impacting OC area 916 by causing the FR IDVC portion to temporarily appear along print area 918 as modified SF color Z (a) in the first general OI embodiments if the impact on OC area 916 meets the FR basic TH impact criteria or (b) in the second general OI embodiments if the FR ID ISCC segment is provided with the FR general CC control signal. In any event, region 906 goes to its changed state with only Z light temporarily leaving the FR IDVC portion via print area 918. OC area 916 is spaced apart from OC area 896 in FIG. 79b and, along with print area 918, is illustrated in dashed line in FIG. 79b because spaced-apart occurrences of OC areas 896 and 916 are usually not simultaneously present. Modified color Z differs materially from FR color C. Z light thus differs materially from C light. Color Z usually differs, usually materially, from AD color B and PP color A. Color Z also usually differs from color C' and may be the same as, or significantly differ from, color X or Y. When object 104 impacts on or near interface 904, choosing colors Y and Z to differ materially enables an observer to rapidly determine (if desired) whether object 104 only impacted SF zone 892, only impacted SF zone 912, or simultaneously impacted both of SF zones 892 and 912. Changed color X, altered color Y, and modified color Z are sometimes termed changed-state colors.

The FR basic TH impact criteria can consist of multiple sets of fully different FR basic TH impact criteria respectively associated with multiple specific (or specified) modified colors materially different from FR color B. More than one, usually all, of the specific modified colors differ, usually materially, from one another. The impact of object 104 on SF zone 912 is potentially capable of meeting any of the FR basic TH impact criteria sets. If the impact on zone 912 meets the FR basic TH impact criteria, generic modified color Z is the specific modified color for the FR basic TH impact criteria set actually met by that impact sometimes dependent on other criteria also being met. The FR basic TH impact criteria sets usually form a continuous chain in which consecutive criteria sets meet each other without overlapping. The FR basic TH impact criteria sets sometimes have the same mathematical description as the PP basic TH impact criteria sets and can consist of fully different ranges of excess SF pressure across OC area 916 or excess internal pressure along a projection of area 916 onto an internal plane the same as occurs with the PP basic TH impact criteria sets subject to recitations of FR, modified, color C, color Z, and OC area 916 respectively replacing the preceding recitation of principal, altered, color A, color X, and OC area 116.

Recitations hereafter of (a) AD VC region 886 normally appearing as color B mean that it normally so appears along SF zone 892, (b) the AD IDVC portion temporarily appearing as color Y mean that it temporarily so appears along print area 898, (c) FR VC region 906 normally appearing as color C mean that it normally so appears along SF zone 912, and (d) to the FR IDVC portion temporarily appearing as color Z mean that it temporarily so appears along print area 918. Region 886 or 906 can be embodied and fabricated in any of the ways described above for embodying and fabricating VC region 106 subject to B or C light replacing A light. Region 886 or 906 also operates in any way above-described for operating region 106 subject to Y or Z light replacing X light and the AD or FR basic TH impact criteria replacing the PP basic TH impact criteria. The change from color B or C to color Y or Z along area 898 or 918 places region 886 or 906 in its changed state in which Y or Z light temporarily leaves the AD or FR IDVC portion via area 898 or 918.

Object 104 can simultaneously impact both VC SF zone 892 and VC SF zone 112 or 912. The AD IDVC portion can then temporarily appear as color Y if the AD basic TH impact criteria are met for the impact with OC area 896, no print area being identified along zone 892 if the AD basic TH impact criteria are not so met. The PP or FR IDVC portion can similarly temporarily appear as color X or Z if the PP or FR basic TH impact criteria are met for the impact with OC area 116 or 916, no print area being identified along zone 112 or 912 if the PP or FR basic TH impact criteria are not so met. The same can be done if object 104 simultaneously impacts all three zones 112, 892, and 912. However, this way of handling simultaneous impact of object 104 on zones 892 and 112 or/and 912 results in no print area being identified along zone 112, 892, or 912 if the PP, AD, or FR basic TH impact criteria are not met even though the impact is of such a nature that the PP, AD, or FR basic TH impact criteria would be met if the impact had been fully in zone 112, 892, or 912.

Impact of object 104 simultaneously on both SF zone 892 and SF zone 112 or 912 or simultaneously on all of zones 112, 892, and 912 is preferably handled by having the AD IDVC portion temporarily appear as color Y if the impact meets CP basic TH impact criteria for the total VC area where object 104 impacts zones 112, 892, and 912, i.e., for OC areas 896 and 116 or/and 916. The PP IDVC portion (138) temporarily appears as color X if, besides impacting zone 892, object 104 impacts zone 112, and the FR IDVC portion temporarily appears as color Z if object 104 also impacts zone 912. More specifically, the ID segments of the AD and PP or/and FR ISCC structures cause these temporary color changes. The CP basic TH impact criteria are usually numerically the same as the PP basic TH impact criteria and thus usually numerically the same as the AD or FR basic TH impact criteria. Regardless of how simultaneous impact on zones 892 and 112 or/and 912 is handled, CC durations $\Delta t_{dr}$ for all IDVC portions going to the changed state are usually approximately the same.

The CP basic TH impact criteria can consist of multiple sets of fully different CP basic TH impact criteria respectively associated with multiple specific changed colors materially different from PP color A, multiple specific altered colors materially different from AD color B, and multiple modified colors materially different from FR color C. More than one, usually all, of the specific changed colors differ, usually materially, from one another. The same applies to the specific altered colors and to the specific modified colors. The impact of object 104 on SF zones 892 and 112 or/and 912 is potentially capable of meeting any of the CP basic TH impact criteria sets. If this impact meets the CP basic TH impact criteria, generic altered color Y is the specific altered color, generic changed color X is the specific changed color, or/and generic modified color Z is the specific modified color for the CP basic TH impact criteria set actually met by the impact.

The CP basic TH impact criteria sets usually form continuous chains in which consecutive PP criteria sets meet each other without overlapping. The same applies to consecutive AD criteria sets and to consecutive FR criteria sets. The CP basic TH impact criteria sets sometimes have a mathematical description consisting of a combination of the mathematical descriptions of the PP, AD, and FR basic TH impact criteria sets and can consist of fully different ranges of excess SF pressure across OC areas 116, 896, and 916 or excess internal pressure along projections of areas 116, 896, and 916 onto respective internal planes in the same way as occurs with the PP, AD, and FR basic TH impact criteria sets.

FIGS. 80a, 80b, 81a, 81b, 82a, 82b, 83a, 83b, 84a, 84b, 85a, and 85b present side cross sections of six embodiments of OI structure 900 where each pair of Figs. ja and jb for integer j varying from 80 to 85 depicts a different embodiment. The basic side cross sections, and thus how the embodiments appear in the normal state, are respectively shown in FIGS. 80a, 81a, 82a, 83a, 84a, and 85a corresponding to FIG. 79a. FIGS. 80b, 81b, 82b, 83b, 84b, and 85b corresponding to FIG. 79b present examples of changes that occur during the changed state when object 104 contacts surface 102 fully within AD VC SF zone 892.

Figure 80A:
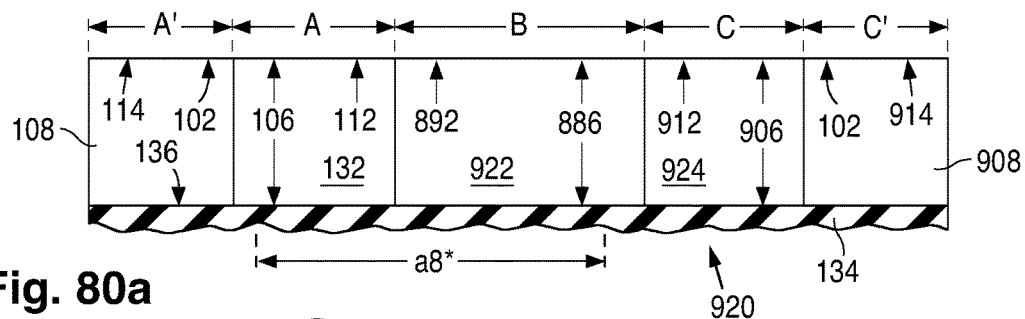
FIGS. 80*a* and 80*b*, 81*a* and 81*b*, 82*a* and 82*b*, 83*a* and 83*b*, 84*a* and 84*b*, and 85*a* and 85*b* are cross-sectional side views of six respective embodiments of the OI structure of FIGS. 79*a* and 79*b*.
Figure 80B:
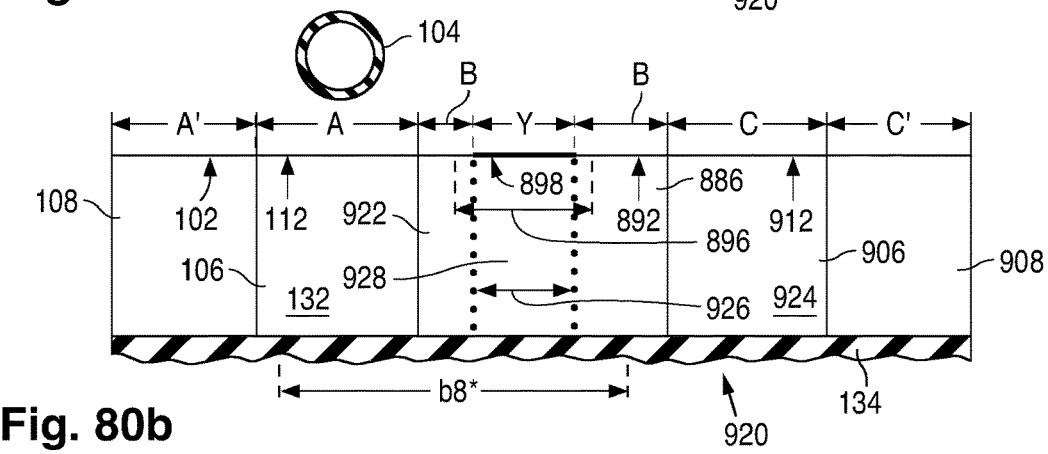

FIGS. 80a and 80b illustrate a general embodiment 920 of OI structure 900 in which VC regions 106, 886, and 906 respectively consist only of PP ISCC structure 132, the AD ISCC structure identified as item 922, and the FR ISCC structure identified as item 924. FC region 908, AD ISCC structure 922, and FR ISCC structure 924 meet substructure 134 along interface 136. See FIG. 80a. ISCC structures 922 and 924 also respectively extend up to SF zones 892 and 912. Items 926 and 928 in FIG. 80b respectively indicate the AD IDVC portion of region 886 and the AD ID segment of structure 922 present in AD IDVC portion 926. AD ID ISCC segment 928 is identical to portion 926 here but is a part of portion 926 in later embodiments of OI structure 900 where region 886 contains structure besides ISCC structure 922.

ISCC structures 922 and 924 usually operate the same as ISCC structure 132. Referring to FIG. 80a, light (if any) reflected by substructure 134 so as to leave it along AD VC region 886 during its normal state is termed BRsb light. Light, termed BDic light, normally leaving AD ISCC structure 922 via SF zone 892 after being reflected or/and emitted by structure 922, and thus excluding any substructure-reflected BRsb light, consists of (a) light, termed BRic light, normally reflected by structure 922 so as to leave it via zone 892 after striking zone 892 and (b) light (if any), termed BEic light, normally emitted by structure 922 so as to leave it via zone 892. Any BRsb light passes in substantial part through structure 922. BRic light, any BEic light, and any BRsb light normally leaving structure 922, and therefore region 886, via zone 892 form B light. Region 886 normally appears as AD color B.

Light (if any) reflected by substructure 134 so as to leave it along FR VC region 906 during its normal state is termed CRsb light. Light, termed CDic light, normally leaving FR ISCC structure 924 via SF zone 912 after being reflected or/and emitted by structure 924, and thus excluding any substructure-reflected CRsb light, consists of (a) light, termed CRic light, normally reflected by structure 924 so as to leave it via zone 912 after striking zone 912 and (b) light (if any), termed CEic light, normally emitted by structure 924 so as to leave it via zone 912. Any CRsb light passes in substantial part through structure 924. CRic light, any CEic light, and any CRsb light normally leaving structure 924, and therefore region 906, via zone 912 form C light. Region 906 normally appears as FR color C.

Referring to FIG. 80b, light (if any) reflected by substructure 134 so as to leave it along AD IDVC portion 926 during the changed state for AD VC region 886 is termed YRsb light. Light, termed YDic light, temporarily leaving AD ID ISCC segment 928 via print area 898 during that changed state after being reflected or/and emitted by segment 928, and thus excluding any substructure-reflected YRsb light, consists of (a) light, termed YRic light, temporarily reflected by segment 928 so as to leave it via area 898 after striking area 898 and (b) light (if any), termed YEic light, temporarily emitted by segment 928 so as to leave it via area 898. YDic light differs materially from B and BDic light. Any YRsb light passes in substantial part through segment 928. YRic light, any YEic light, and any YRsb light temporarily leaving segment 928, and therefore portion 926, via area 898 form Y light. Portion 926 temporarily appears as color Y.

Light (if any) reflected by substructure 134 so as to leave it along the FR IDVC portion during the changed state for FR VC region 906 is termed ZRsb light. Light, termed ZDic light, temporarily leaving an FR ID ISCC segment of FR ISCC structure 924 via print area 918 during that changed state after being reflected or/and emitted by the FR ISCC segment, and thus excluding any substructure-reflected ZRsb light, consists of (a) light, termed ZRic light, temporarily reflected by the FR ISCC segment so as to leave it via area 918 after striking area 918 and (b) light (if any), termed ZEic light, temporarily emitted by the FR ISCC segment so as to leave it via area 918. ZDic light differs materially from Z and ZDic light. Any ZRsb light passes in substantial part through the FR ISCC segment. ZRic light, any ZEic light, and any ZRsb light temporarily leaving the FR ISCC segment, and therefore the FR IDVC portion, via area 918 form Z light. The FR IDVC portion temporarily appears as color Z.

BRsb and CRsb light reflected by substructure 134 respectively along VC regions 886 and 906 during the normal state each usually differ from ARsb light reflected by substructure 134 along VC region 106 during the normal state because the incident light traveling from SF zones 892 and 912 respectively through regions 886 and 906 to interface 136 usually differs from the incident light traveling from SF zone 112 through region 106 to interface 136. Substructure-reflected BRsb and CRsb light usually differ from each other. YRsb or ZRsb light reflected by substructure 134 along AD IDVC portion 926 or the FR IDVC portion during the changed state can be the same as, or significantly different from, BRsb or CRsb light depending on how the light processing in portion 926 or the FR IDVC portion during the changed state differs from the light processing in region 886 or 906 during the normal state. YRsb or ZRsb light is absent when BRsb or CRsb light is absent.

Figure 81A:
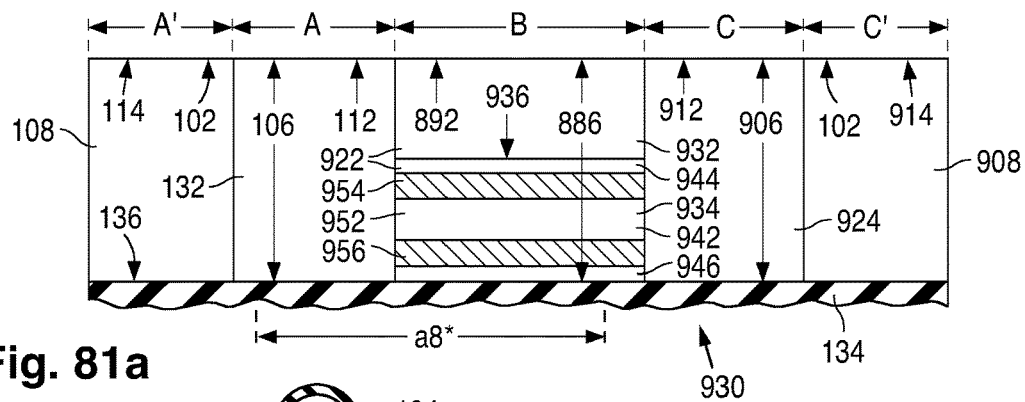
Figure 81B:
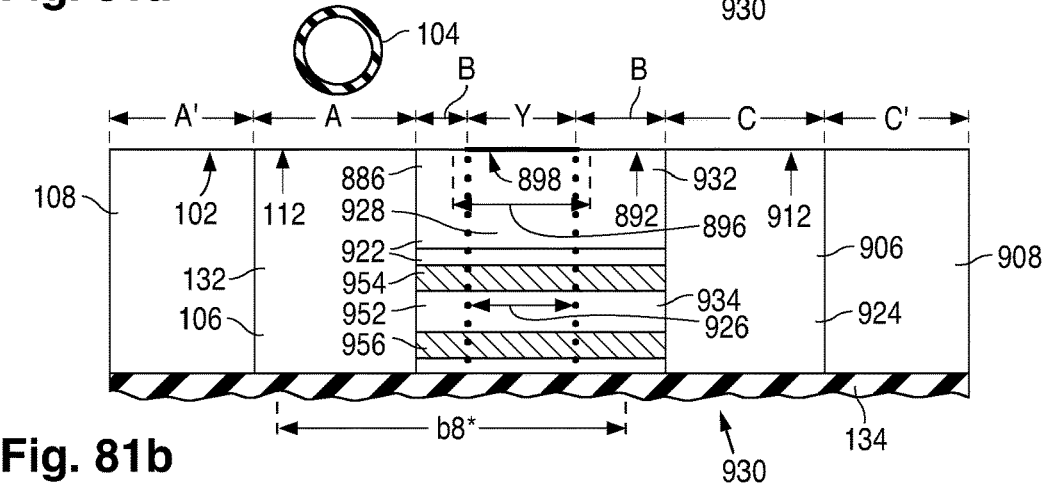

FIGS. 81a and 81b illustrate an embodiment 930 of OI structure 920 in which VC regions 106, 886, and 906 are again respectively formed solely with ISCC structures 132, 922, and 924. Region 886, and thus structure 922, consists of an AD IS component 932 and an AD CC component 934 which meet at an AD light-transmission interface 936. See FIG. 81a. AD components 932 and 934 are respectively arranged the same as PP components 182 and 184. CC component 934 is formed with an AD electrode assembly 942, an optional AD NA layer 944, and an optional AD FA layer 946 respectively arranged the same as subcomponents 202, 204, and 206. Electrode assembly 942 consists of an AD core layer 952, AD NE structure 954, and AD FE structure 956 respectively arranged the same as subcomponents 222, 224, and 226. Light having at least a majority component of wavelength for color B normally leaves core layer 952 along NE structure 954 for enabling region 886 to normally appear as color B.

Referring to FIG. 81b, each of components 932 and 934 has an AD ID segment present in IDVC portion 926. The same applies to assembly 942, NA layer 944 (when present), and FA layer 946 (when present) and to core layer 952, NE structure 954, and FE structure 956. While these ID segments are not labeled in FIG. 81b due to spacing limitations, each of them extends laterally fully across portion 926.

ISCC structure 922 (or VC region 886) here operates the same as ISCC structure 132 (or VC region 106) in OI structure 200 subject to colors B and Y respectively replacing colors A and X and subject to the AD basic TH impact criteria replacing the PP basic TH impact criteria. The ID segment of IS component 932 responds to object 104 impacting OC area 896 so as to meet the AD basic TH impact criteria by providing an AD general impact effect as VC region 886 goes to the changed state. The ID segment of CC component 934 responds to the AD general impact effect, if provided, by causing IDVC portion 926 to temporarily appear along print area 918 as altered color Y. More specifically, region 886 responds to the AD general impact effect by providing the AD general CC control signal that is applied between a VA location in NE structure 954 and a VA location in FE structure 956. At least one of the VA locations is in portion 926, specifically in the ID segment of electrode structure 954 or 956, and thus laterally depends on where object 104 contacts SF zone 892. Core layer 952 responds to the AD general control signal by enabling light having at least a majority component of wavelength for color Y to temporarily leave the ID segment of layer 952 along the ID segment of NE structure 954 such that portion 926 temporarily appears as color Y.

ISCC structure 132 (or VC region 106) here is configured and operable the same as in OI structure 200. The same applies to ISCC structure 924 (or VC region 906) subject to colors C and Z respectively replacing colors A and X and subject to the FR basic TH impact criteria replacing the PP basic TH impact criteria. Each ISCC structure 922 or 924 can be embodied and fabricated in any of the ways described above for embodying and fabricating ISCC structure 132.

Figure 82A:
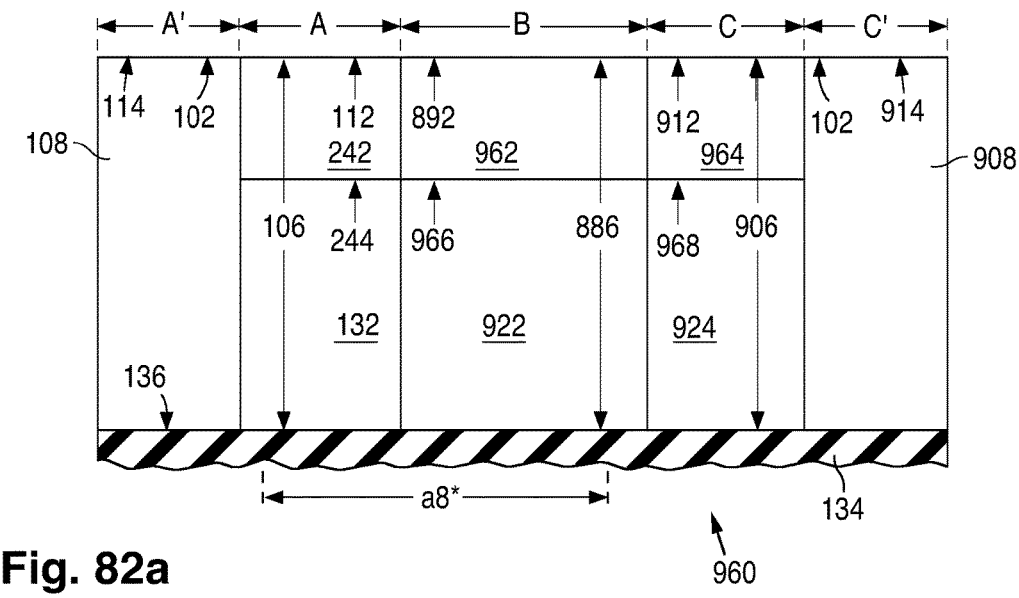
Figure 82B:
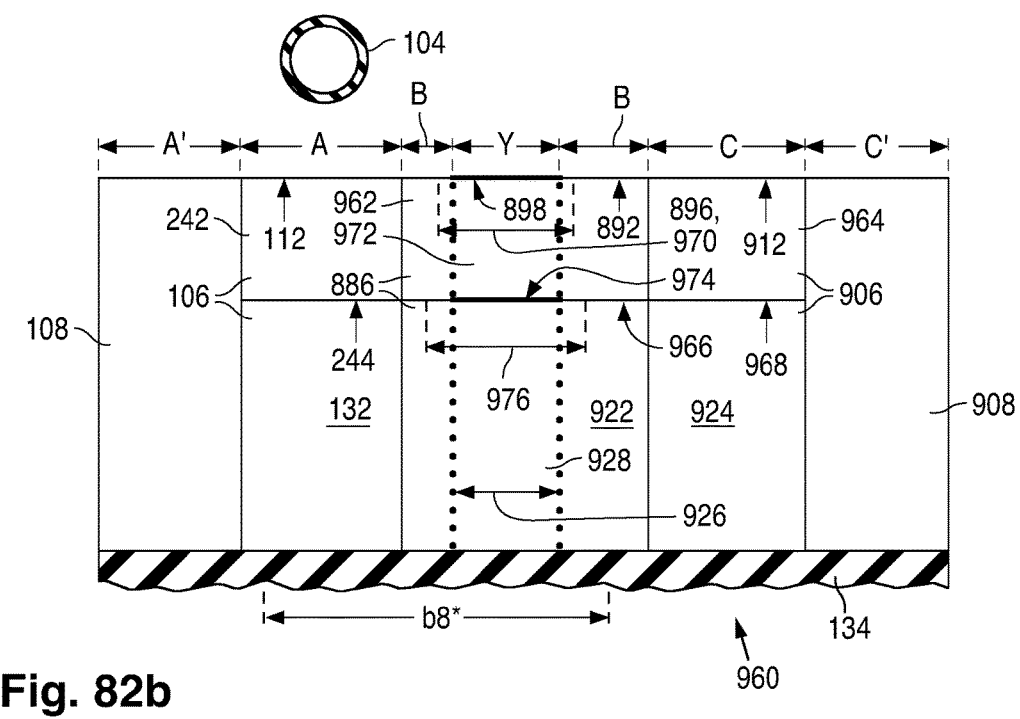

FIGS. 82a and 82b illustrate an extension 960 of OI structure 920. OI structure 960 is configured the same as structure 920 except that VC regions 106, 886, and 906 here respectively include SF structure 242, an AD SF structure 962 extending from SF zone 892 to ISCC structure 922, and an FR SF structure 964 extending from SF zone 912 to ISCC structure 924. See FIG. 82a. SF structures 962 and 964 respectively meet ISCC structures 922 and 924 along a flat AD structure-structure interface 966 and a flat FR structure-structure interface 968 coplanar with each other and with interface 244.

Light travels through SF structures 962 and 964. Each structure 962 or 964 functions the same, is internally configured the same, and has the same light transmissivity as SF structure 242. VC region 106, 886, or 906 here operates the same as region 106 in OI structure 240. In particular, AD SF structure 962 typically protects ISCC structure 922 from damage and/or spreads pressure to improve the matching between print area 898 and OC area 896 during impact of object 104 on SF zone 892. AD structure 962 may provide velocity restitution matching between zone 892 and FC SF zone 894 (not shown here), VC SF zone 112, or/and VC SF zone 912. With further reference to FIG. 79b, FR SF structure 964 typically protects ISCC structure 924 from damage and/or spreads pressure to improve the matching between print area 918 and OC area 916 during impact on SF zone 912. Structure 964 may provide velocity restitution matching between zone 912 and FC SF zone 914 or/and VC zone 892. Also, structures 962 and 964 may respectively strongly influence colors B and C or/and colors Y and Z. Structures 242, 962, and 964 usually merge seamlessly with one another to form a composite SF structure.

ISCC structure 922 or 924 here operates the same during the normal state as in OI structure 900 except that light leaving ISCC structure 922 or 924 via SF zone 892 or 912 in OI structure 900 leaves ISCC structure 922 or 924 via interface 966 or 968 here. The total light, termed BTic light, normally leaving structure 922 consists of BRic light reflected by it, any BEic light emitted by it, and any substructure-reflected BRsb light passing through it. The total light, termed CTic light, normally leaving structure 924 consists of CRic light reflected by it, any CEic light emitted by it, and any substructure-reflected CRsb light passing through it.

The BRic light, any BEic light, and any BRsb light pass in substantial part through SF structure 962. Structure 962 may normally reflect light, termed BRss light, leaving it via SF zone 892 after striking zone 892. BRis light, any BEic light, and any BRss and BRsb light normally leaving structure 962, and thus VC region 886, via zone 892 form B light. Similarly, the CRic light, any CEic light, and any CRsb light pass in substantial part through SF structure 964. Structure 964 may normally reflect light, termed CRss light, leaving it via SF zone 912 after striking zone 912. CRis light, any CEic light, and any CRss and CRsb light normally leaving structure 964, and therefore VC region 906, via zone 912 form C light.

SF structures 962 and 964 both usually absorb light. BTic or CTic light reaching SF zone 892 or 912 so as to leave VC region 886 or 906 can be of significantly lower radiosity than total BTic or CTic light directly leaving ISCC structure 922 or 924 along interface 966 or 968. The observations made above about how wavelength dependency of light absorption by SF structure 242 affects ARic and AEic light apply to how wavelength dependency of light absorption by SF structure 962 or 964 affects BRic and BEic or CRic and CEic light subject to recitations of BRic or CRic light, BEic or CEic light, SF structure 962 or 964, SF zone 892 or 912, interface 966 or 968, ISCC structure 922 or 924, OI structure 920, and OI structure 960 respectively replacing the preceding recitations of ARic light, AEic light, SF structure 242, SF zone 112, interface 244, ISCC structure 132, OI structure 130, and OI structure 240.

Referring to FIG. 82b, item 970 indicates the AD ID area where impact of object 104 on AD SF zone 892 causes it to deform. Although AD ID SF DF area 970 is sometimes slightly smaller than OC area 896, area 896 is also labeled as DF area 970 in FIG. 82b and in later drawings to simplify the representation. Item 972 is the ID segment of SF structure 962 present in IDVC portion 926. Item 974 is the ID segment of interface 966 present in portion 926 and is shown in FIG. 82b and in analogous later side cross-sectional drawings with extra thick line to clearly identify its location along interface 966. The excess SF pressure created by the impact is transmitted through structure 962 to interface 966 for producing excess internal pressure along an ID DP area 976 of interface 966. Items 896, 898, 926, 928, 970, 972, 974, and 976 respectively undergo the same actions as items 116, 118, 138, 142, 122, 252, 254, and 256 in OI structure 240 subject to B and Y light respectively replacing A and X light so that portion 926 temporarily appears as color Y.

The changed state for AD VC region 886 begins as IDVC portion 926 changes to a condition in which YRic light reflected by ISCC segment 928 and any YEic light emitted by it temporarily leave it along ID IF segment 974. The total light, termed YTic light, temporarily leaving ISCC segment 928 consists of YRic light, any YEic light, and any substructure-reflected YRsb light passing through it. The YRic light, any YEic light, and any YRsb light pass in substantial part through ID SS segment 972. If SF structure 962 reflects BRss light during the normal state, segment 972 reflects BRss light during the changed state. YRic light, any YEic light, and any BRss and BRsb light temporarily leaving segment 972, and thus portion 926, via print area 898 form Y light. YDic light differs materially from B and BDic light.

The changed state for FR VC region 906 similarly begins as the FR IDVC portion changes to a condition in which ZRic light reflected by the FR ID ISCC segment and any ZEic light emitted by it temporarily leave it along an ID segment of interface 968. The total light, termed ZTic light, temporarily leaving the FR ISCC segment consists of ZRic light, any ZEic light, and any substructure-reflected ZRsb light passing through it. The ZRic light, any ZEic light, and any ZRsb light pass in substantial part through an ID segment of FR SF structure 964. If structure 964 reflects ZRss light during the normal state, the FR ID SS segment reflects ZRss light during the changed state. ZRic light, any ZEic light, and any CRss and ZRsb light temporarily leaving the FR SS segment, and thus the FR IDVC portion, via the FR print area (918) form Z light. ZDic light differs materially from C and CDic light.

Analogous to what occurs with XTic light, YTic light reaching print area 898 so as to leave IDVC portion 926 can be of significantly lower radiosity than total YTic light directly leaving ISCC segment 928 along IF segment 974. With reference to FIG. 79b, ZTic light reaching print area 918 so as to leave the FR IDVC portion can be of significantly lower radiosity than total ZTic light directly leaving the FR ID ISCC segment along the FR IF segment. The observations made above about how wavelength dependency of light absorption by SS segment 252 affects XRic and XEic light apply to how wavelength dependency of light absorption by SS segment 972 or the FR SS segment affects YRic and YEic or ZRic and ZEic light subject to recitations of YRic or ZRic light, YEic or ZEic light, print area 898 or 918, ISCC segment 928 or the FR ISCC segment, IF segment 974 or the FR IF segment, SS segment 972 or the FR SS segment, SF structure 962 or 964, OI structure 920, OI structure 960, and ISCC structure 922 or 924 respectively replacing the preceding recitations of XRic light, XEic light, print area 118, ISCC segment 142, IF segment 254, SS segment 252, SF structure 242, OI structure 130, OI structure 240, and ISCC structure 132.

SF structures 962 and 964 function as color filters for significantly absorbing light of selected wavelength in a preferred embodiment of OI structure 960 in which SF structure 962 strongly influences AD color B or/and altered color Y and in which SF structure 964 strongly influences FR color C or/and modified color Z. In this embodiment, total BTic light as it leaves ISCC structure 922 along interface 966 during the normal state for VC region 886 is of wavelength for a color termed AD internal color BTic. Total CTic light as it leaves ISCC structure 924 along interface 968 during the normal state for VC region 906 is of wavelength for a color termed FR internal color CTic. Total YTic light as it leaves ISCC segment 928 along IF segment 974 during the changed state for region 886 is of wavelength for a color termed altered internal color YTic. Total ZTic light as it leaves the FR ID ISCC segment along the FR IF segment during the changed state for region 906 is of wavelength for a color termed modified internal color ZTic.

A selected one of internal colors BTic and YTic for VC region 886 is an AD comparatively light color LA. The remaining one is an AD comparatively dark color DA darker than light color LA. Similarly, a selected one of internal colors CTic and ZTic for VC region 906 is an FR comparatively light color LF. The remaining one is an FR comparatively dark color DF darker than light color LF. Lightness L* of light color LA or LF is usually at least 70, preferably at least 80, more preferably at least 90. Lightness L* of dark color DA or DF is usually no more than 30, preferably no more than 20, more preferably no more than 10.

The following relationships arise between SF colors B and Y or C and Z due to light absorption by SF structure 962 or 964. If AD internal color BTic for VC region 886 is light color LA, AD SF color B is darker than light color LA while changed SF color Y may be darker than dark color DA depending on the characteristics of the light absorption by structure 962 and on the lightness of color DA. Since color Y differs materially from color B, color Y is usually materially darker than color B. Similarly, if altered internal color YTic for region 886 is light color LA, altered SF color Y is darker than light color LA while AD SF color B may be darker than color DA. Color B is then usually materially darker than color Y.

If FR internal color CTic for VC region 906 is light color LF, FR SF color C is darker than light color LF due to the light absorption by SF structure 964 while modified SF color Z may be darker than dark color DF depending on the characteristics of the light absorption by structure 964 and on the lightness of color DF. Because color Z differs materially from color C, color Z is usually materially darker than color C. If modified internal color ZTic for region 906 is light color LF, modified SF color Z is darker than light color LF while FR SF color C may be darker than dark color DF. Color C is then usually materially darker than color Z. Structure 962 strongly influences AD color B or/and altered color Y while structure 964 strongly influences FR color C or/and modified color Z.

Importantly, ISCC structures 922 and 924 preferably have the same physical and chemical properties as ISCC structure 132 in this embodiment of OI structure 960. ISCC structures 132, 922, and 924 are preferably of the same internal construction, including dimensions perpendicular to substructure 134, in this preferred OI embodiment so that the cost of developing at least two ISCC structures differing in physical properties, chemical properties, or/and internal construction is avoided. In fact, structures 132, 922, and 924 here are preferably fabricated simultaneously as a single ISCC structure, thereby reducing the fabrication cost compared to the cost of fabricating at least two ISCC structures differing in physical properties, chemical properties, or/and internal construction. Internal colors BTic and CTic are thus identical to PP internal color ATic in this embodiment of OI structure 960. Internal colors YTic and ZTic are identical to changed internal color XTic in this preferred OI embodiment.

The light absorption characteristics of SF structure 962 differ significantly from those of both of SF structures 242 and 964 in the preferred embodiment of OI structure 960. The light absorption characteristics of structures 242, 962, and 964 are chosen so that normal-state color B differs significantly from normal-state colors A and C. Color B is enabled to differ significantly from colors A and C by appropriately arranging for structure 962 to have significantly different light characteristics than structures 242 and 964 preferably formed, along with structure 962, on a single ISCC structure which cooperates with structures 242, 962, and 964 for enabling colors A, B, and C to respectively differ materially from changed-state colors X, Y, and Z. Because the development of multiple different ISCC structures is avoided, this OI embodiment is a highly efficient arrangement for achieving the invention's color-difference specifications. The colors embodying colors A, B, C, X, Y, and Z can be varied by changing the light absorption characteristics of structures 242, 962, and 964 without modifying the ISCC structure.

Arranging for normal-state color B to differ significantly from normal-state colors A and C is facilitated by choosing internal color BTic to be light color LA. In that case, internal color ATic can be chosen to be light color LP or dark color DP while internal color CTic can be chosen to be light color LF or dark color DF. Choosing internal colors ATic and CTic to respectively be dark colors DA and DF provides color B with greater differences from colors A and C than does choosing colors ATic and CTic to respectively be light colors LP and LF but results in changed-state color Y differing more from changed-state colors X and Z. In any event, color B differs significantly from colors A and C when internal colors ATic and CTic are respectively chosen as light colors LP and LF by appropriately choosing the light absorption characteristics of SF structures 242, 962, and 964, especially taking advantage of the fact that colors A, B, and C are then respectively darker than light colors LP, LA, and LF.

Changed-state color Y may or may not differ significantly from changed-state colors X and Z depending on the light absorption characteristics of SF structures 242, 962, and 964 and on which of colors LP, DP, LA, DA, LF, and DF are chosen for normal-state color A, B, and C and, by default, for colors X, Y, and Z. Arranging for colors X, Y, and Z to be close to one another, is facilitated for the preferred situation in which internal color BTic is light color LA by choosing internal colors ATic and CTic respectively to be light colors LP and LF so that internal colors XTic and ZTic respectively are dark colors DP and DF. Inasmuch as colors X, Y, and Z are then respectively darker than dark colors DP, DA, and DF, colors X, Y, and Z become closer to one another as dark colors DP, DA, and DF become progressively darker and become the same, namely black, when colors DP, DA, and DF become black.

In fabricating the preferred embodiment of OI structure 960, the single ISCC structure implementing ISCC structures 132, 922, and 924 is usually first provided on substructure 134. SF structures 242, 962, and 964 are then provided on the ISCC structure. Structures 242, 962, and 964 can be prefabricated, e.g., as layers or strips, and then attached to the ISCC structure. Consecutive ones of the layers or strips are usually smooth and seamless where they meet along surface 102. The layers or strips are also usually smooth and seamless where they meet FC regions along surface 102. Alternatively, structures 242, 962, and 964 can be deposited on the ISCC structure in fluid or semi-fluid form. The fluid can be a liquid or a gas. If the fluid is a liquid, the liquid or semi-liquid material of structures 242, 962, and 964 is suitably dried. A semi-liquid form of the SS material can be a mixture, e.g., slurry, of solid particles and liquid such as water.

Figure 83A:
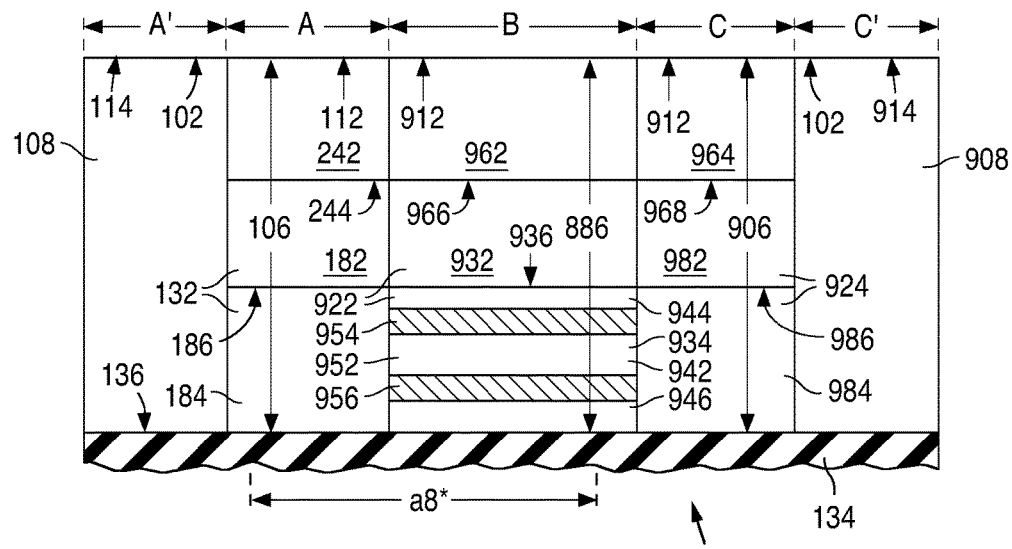
Figure 83B:
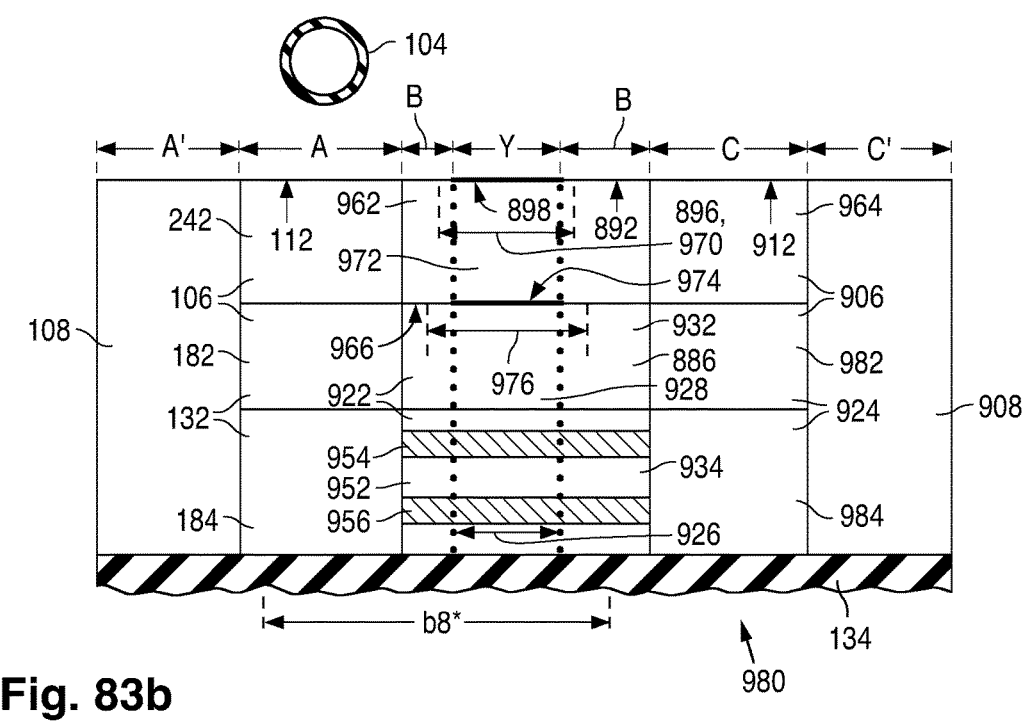

FIGS. 83a and 83b illustrate an embodiment 980 of OI structure 960. OI structure 980 is also an extension of OI structure 930 to include SF structures 242, 962, and 964 respectively in VC regions 106, 886, and 906. ISCC structure 132 here consists of components 182 and 184 configured and operable the same as in OI structure 260 and thus the same as in OI structure 180. CC component 184 here preferably consists of subcomponents 204, 224, 222, 226, and 206 (not shown) configured and operable the same as in OI structure 270 and therefore the same as in OI structure 200. ISCC structure 922 here is formed with IS component 932 and CC component 934 consisting of subcomponents 944, 954, 952, 956, and 946 configured and operable the same as in OI structure 930. SF structure 962, which again meets IS component 932 along interface 966, is here configured the same as in OI structure 930. ISCC structure 922 and SF structure 962 respectively operate the same as structures 132 and 242 in OI structure 270 subject to colors B and Y respectively replacing colors A and X and subject to the AD basic TH impact criteria replacing the PP basic TH impact criteria.

ISCC structure 924 consists of an FR IS component 982 and an FR CC component 984 that meet at an FR light-transmission interface 986. FR components 982 and 984 are configured the same as PP components 182 and 184 in OI structure 260, preferably as in OI structure 270, and thus the same as components 182 and 184 in OI structure 180, preferably as in OI structure 200. ISCC structure 924 and SF structure 964 operate the same as structures 132 and 242 in OI structure 260, preferably as in OI structure 270, subject to colors C and Z respectively replacing colors A and X and subject to the FR basic TH impact criteria replacing the PP basic TH impact criteria. Each ISCC structure 922 or 924 can again be embodied and fabricated in any of the ways described above for embodying and fabricating ISCC structure 132. SF structures 242, 962, and 964 typically provide the above-described protection and matching functions.

Figure 84A:
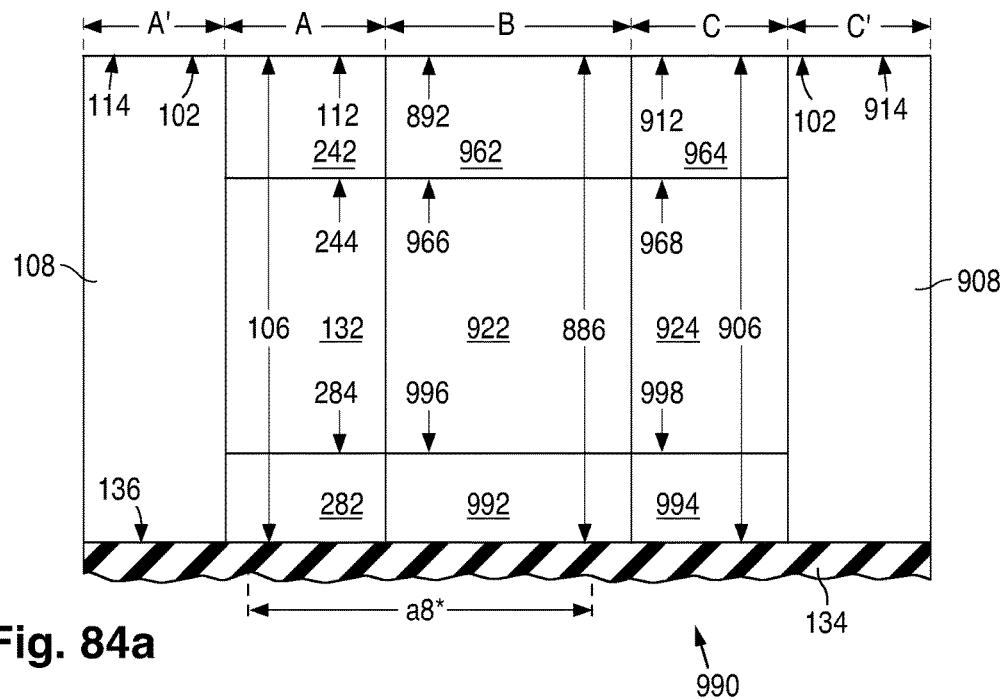
Figure 84B:
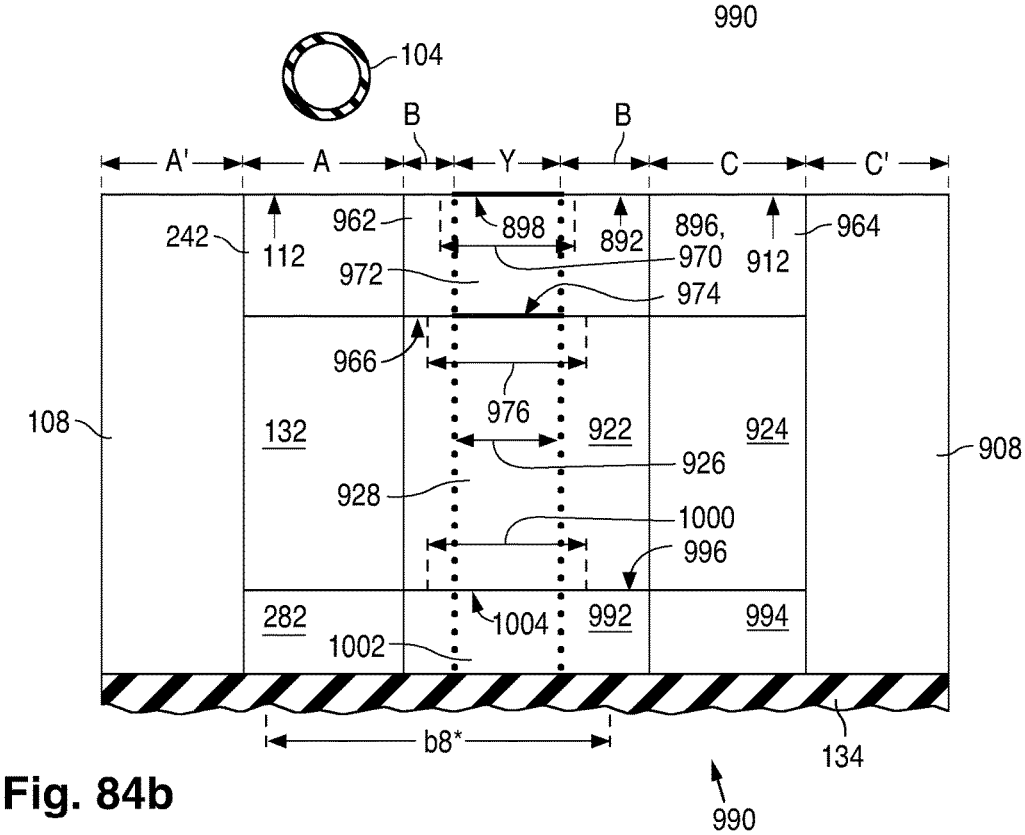

FIGS. 84a and 84b illustrate an extension 990 of OI structure 960 for which the duration of each temporary color change along each print area 118, 898, or 918 is extended in a pre-established deformation-controlled manner. OI structure 990 is configured the same as structure 960 except that VC regions 106, 886, and 906 here respectively include DE structure 282 extending from substructure 134 to ISCC structure 132, an AD DE structure 992 extending from substructure 134 to ISCC structure 922, and an FR DE structure 994 extending from substructure 134 to ISCC structure 924. See FIG. 84a. DE structures 992 and 994 respectively meet ISCC structures 922 and 924 along a flat AD structure-structure interface 996 and a flat FR structure-structure interface 998 coplanar with each other and with interface 284. SF structures 242, 962, and 964 here typically provide the above-described protection and matching functions.

Each DE structure 992 or 994 is configured and operable the same as DE structure 282. Referring to FIG. 84b and to FIGS. 18b and 79b, VC region 106, 886, or 906 here operates in a deformation-based way utilizing DE structure 282, 992, or 994 as described above for structure 282 in OI structure 320 to extend automatic value $\Delta t_{drau}$ of duration $\Delta t_{dr}$ of the changed state from color A, B, or C along print area 118, 898, or 918 to color X, Y, or Z from base duration $\Delta t_{drbs}$ to the sum of duration and extension duration $\Delta t_{drext}$ in response to object 104 impacting OC area 116, 896, or 916.

In particular, DE structure 992 responds to the deformation along ID DP area 976 of interface 966 resulting from the impact-caused deformation along SF DF area 970 by deforming along an AD ID internal DF area 1000 of interface 996. Item 1002 is the ID segment of structure 992 present in IDVC portion 926. Item 1004 is the ID segment of interface 996 present in portion 926. Items 896, 898, 926, 928, 970, 972, 974, 976, 1000, 1002, and 1004 respectively undergo the same actions as items 116, 118, 138, 142, 122, 252, 254, 256, 288, 292, and 294 in OI structure 320 subject to B and Y light respectively replacing A and X light such that portion 926 temporarily appears as color Y.

SF structures 242, 962, and 964 may be deleted in a variation of OI structure 990. VC region 106, 886, or 906 then operates in a deformation-based way utilizing DE structure 282, 992, or 994 as described above for structure 282 in OI structure 280 to extend changed-state automatic duration $\Delta t_{drau}$ from color A, B, or C along print area 118, 898, or 918 to color X, Y, or Z from base duration $\Delta t_{drbs}$ to $\Delta t_{drbs} + \Delta t_{drext}$ in response to object 104 impacting OC area 116, 896, or 916.

Figure 85A:
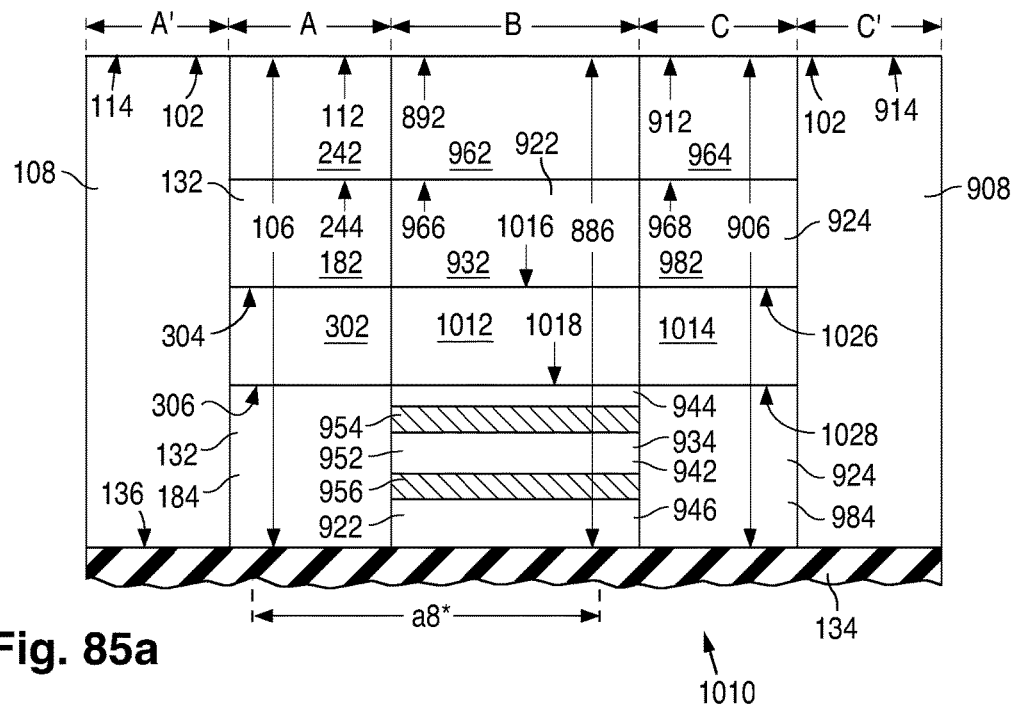
Figure 85B:
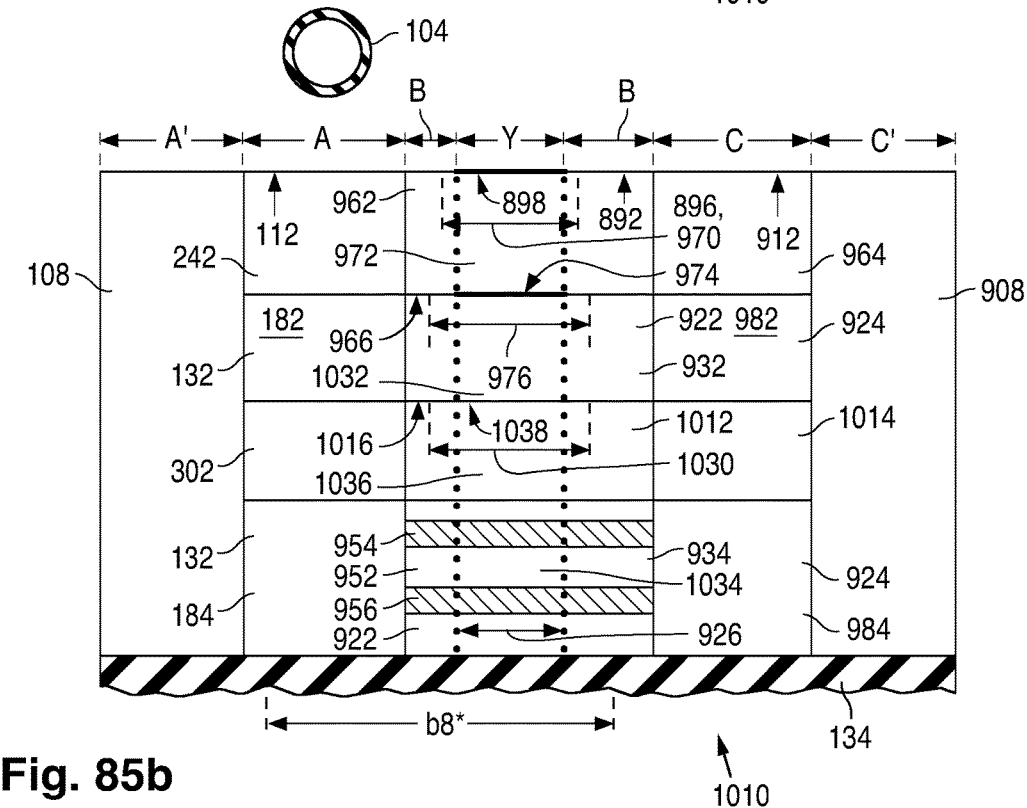

FIGS. 85*a* and 85*b* illustrate an extension 1010 of OI structure 980 for which the duration of each temporary color change along print area 118, 898, or 918 is extended in a pre-established deformation-controlled manner. OI structure 1010 is configured the same as structure 980 except that VC regions 106, 886, and 906 here respectively include DE structure 302 lying between components 182 and 184, an AD DE structure 1012 lying between components 932 and 934, and an FR DE structure 1014 lying between components 982 and 984. See FIG. 85*a*. AD DE structure 1012 meets components 932 and 934 respectively along flat near and far light-transmission interfaces 1016 and 1018 coplanar with interfaces 304 and 306. FR DE structure 1014 meets components 982 and 984 respectively along flat near and far light-transmission interfaces 1026 and 1028 coplanar with interfaces 304 and 306. SF structures 242, 962, and 964 here again typically provide the above-described protection and matching functions.

Each DE structure 1012 or 1014 is configured and operable the same as DE structure 302. CC component 184 here consists of subcomponents 204, 224, 222, 226, and 206 configured the same as in OI structure 330 and thus the same as in OI structure 200. Components 182 and 184 and structures 242 and 302 here operate the same as in OI structure 330. CC component 934 here consists of subcomponents 944, 954, 952, 956, and 946 configured the same as in OI structure 980. Components 932 and 934 and structures 962 and 1012 respectively operate the same as components 182 and 184 and structures 242 and 302 in OI structure 330 subject to colors B and Y respectively replacing colors A and X and subject to the AD basic TH impact criteria replacing the PP basic TH impact criteria.

CC component 984 here is usually configured the same as CC component 184 in OI structure 330 and thus the same as component 184 in OI structure 200. Components 982 and 984 and structures 964 and 1014 respectively operate the same as components 182 and 184 and structures 242 and 302 in OI structure 330 subject to colors C and Z respectively replacing colors A and X and subject to the FR basic TH impact criteria replacing the PP basic TH impact criteria. Referring to FIG. 85*b* and to FIGS. 19*b* and 79*b*, VC region 106, 886, or 906 here operates in a deformation-based way utilizing DE structure 302, 1012, or 1014 as described above for DE structure 302 in OI structure 330 to extend changed state automatic duration $\Delta t_{drau}$ from color A, B, or C along print area 118, 898, or 918 to color X, Y, or Z from $\Delta t_{drbs}$ to $\Delta t_{drbs} + \Delta t_{drext}$ in response to object 104 impacting OC area 116, 896, or 916.

Specifically, DE structure 1012 responds to the deformation along DP area 976 of interface 966 resulting from the impact-caused deformation along SF DF area 970 by deforming along an AD ID internal DF area 1030 of interface 1016. Items 1032, 1034, 1036, and 1038 are the ID segments of components 932 and 934, structure 1012, and interface 1016 respectively present in IDVC portion 926. Items 896, 898, 926, 928, 970, 972, 1030, 1032, 1034, 1036, and 1038 respectively undergo the same actions as items 116, 118, 138, 142, 122, 252, 308, 192, 194, 312, and 314 in OI structure 330 subject to B and Y light respectively replacing A and X light such that portion 926 temporarily appears as color Y.

SF structures 242, 962, and 964 may be deleted in a variation of OI structure 1010. VC region 106, 886, or 906 then operates in a deformation-based way utilizing DE structure 302, 1012, or 1014 as described above for structure 302 in OI structure 300 to extend changed-state automatic duration $\Delta t_{drau}$ from color A, B, or C along print area 118, 898, or 918 to color X, Y, or Z from base duration $\Delta t_{drbs}$ to $\Delta t_{drbs} + \Delta t_{drext}$ in response to object 104 impacting OC area 116, 896, or 916.

Figure 86A:
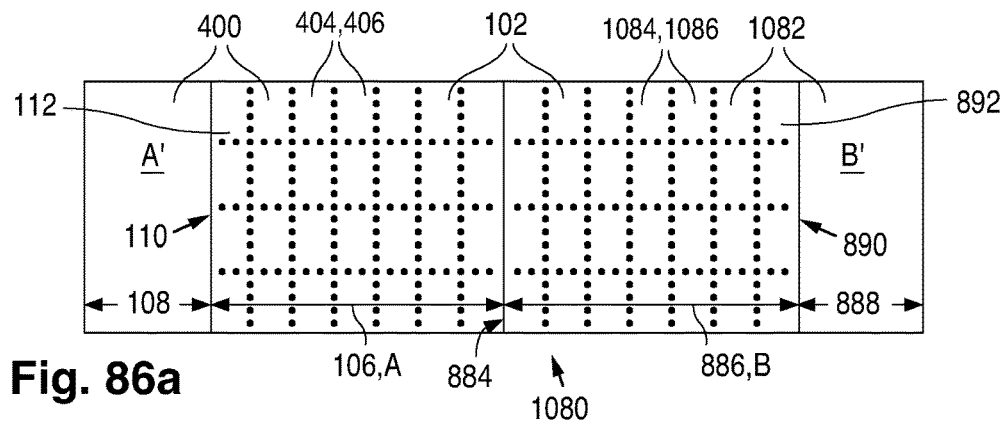
FIGS. 86*a* and 86*b* are layout views of an OI structure having a surface for being impacted by an object at an ID area and for changing color along a corresponding print area of one or both of two adjoining cellular VC regions according to the invention.
Figure 86B:
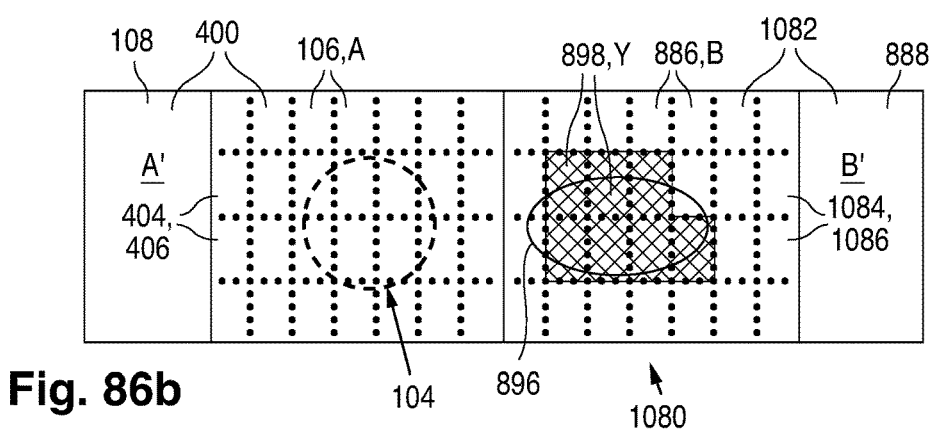

FIGS. 86*a* and 86*b* (collectively "FIG. 86") illustrate the layout of an OI structure 1080 for being impacted by object 104. OI structure 1080, which serves as or in an IP structure, consists of OI structure 400 and an AD OI structure 1082 which respectively embody OI structures 100 and 882 of larger OI structure 880. VC region 886 of AD OI structure 1082 is allocated into a multiplicity of AD independently operable VC cells 1084, usually identical, arranged laterally in a layer as a two-dimensional array. Each AD VC cell 1084 extends to a corresponding part 1086 of SF zone 892. The dotted lines in FIG. 86 indicate interfaces between SF parts 406 or 1086 of adjacent cells 404 or 1084. The general layout of structure 1080 is shown in FIG. 86*a*. FIG. 86*b* depicts an example of color change that occurs along zone 892 upon being impacted by object 104 indicated in dashed line at a location subsequent to impact.

Cells 1084 are typically of the same shape and size as cells 404, as occurs in the example of FIG. 86, but can be of different shape or/and size than cells 404. Subject to colors B and Y respectively replacing colors A and X and subject to the PP cellular TH being replaced with AD cellular TH impact criteria usually numerically the same as the PP cellular TH impact criteria, cells 1084 can be configured, fabricated, programmed, and operated in any way described above for configuring, fabricating, programming, and operating cells 404. This includes variously embodying cells 1084 with parts of IS component 932, CC component 934, SF structure 962, and DE structure 992 or 1012 in any way that cells 404 are variously embodied with parts of components 182 and 184, SF structure 242, and DE structure 282 or 302.

Figure 87A:
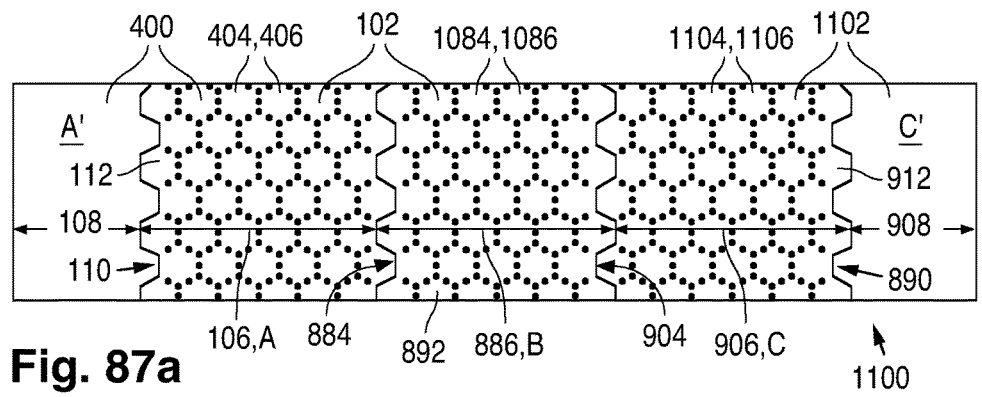
FIGS. 87*a* and 87*b* are layout views of an OI structure having a surface for being impacted by an object at an ID area and for changing color along a corresponding print area of one or more of three consecutively adjoining cellular VC regions according to the invention.
Figure 87B:
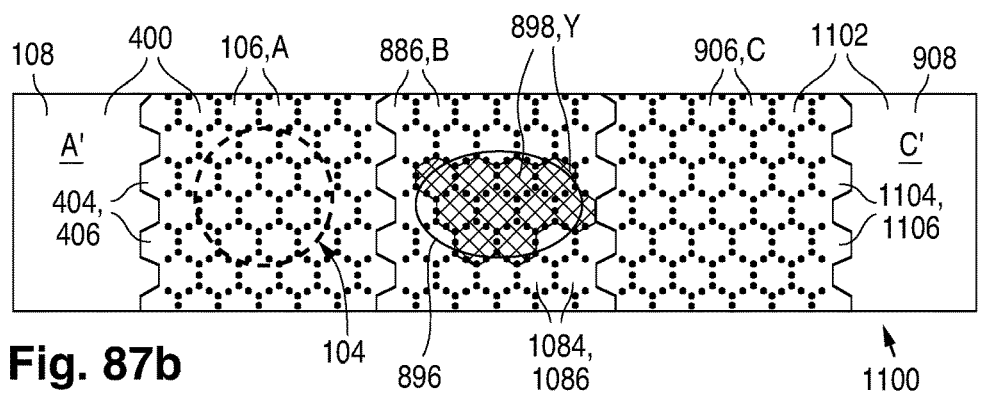

FIGS. 87*a* and 87*b* (collectively "FIG. 87") illustrate the layout of an OI structure 1100 for being impacted by object 104. OI structure 1100, which serves as or in an IP structure, consists of OI structure 400, cellular VC region 886, and an FR OI structure 1102 which respectively embody OI structure 100, region 886, and OI structure 902 of larger OI structure 900. Hence, structure 1100 embodies structure 900. VC region 906 of FR OI structure 1102 is allocated into a multiplicity of FR independently operable VC cells 1104, usually identical, arranged laterally in a layer as a two-dimensional array. Each FR VC cell 1104 extends to a corresponding part 1106 of SF zone 912. The dotted lines in FIG. 87 indicate interfaces between SF parts 406, 1086, or 1106 of adjacent cells 404, 1084, or 1104. The general layout of structure 1100 is shown in FIG. 87*a*. FIG. 87*b* depicts an example of color change that occurs along SF zone 892 upon being impacted by object 104 indicated in dashed line at a location subsequent to impact.

Cells 1104 are typically of the same shape and size as cells 404 and 1084, as occurs in the example of FIG. 87, but can be of different shape or/and size than cells 404 and 1084. SF parts 406, 1086, and 1106 are shaped as regular hexagons in this example but can be shaped like other polygons, preferably quadrilaterals, more preferably rectangles, typically squares, or triangles, e.g., equilateral triangles. Interfaces 110, 884, 904, and 910, although crooked in FIG. 87 due to the hexagonal cell shape, generally become straighter (or flatter) as cell SF parts 406, 1086, and 1106 become smaller. Subject to colors C and Z respectively replacing colors A and X and subject to the PP cellular TH impact criteria being replaced with FR cellular TH impact criteria usually numerically the same as the PP cellular TH impact criteria, cells 1104 can be configured, fabricated, programmed, and operated in any way described above for configuring, fabricating, programming, and operating cells 404. This includes variously embodying cells 1104 with parts of IS component 982, CC component 984, SF structure 964, and DE structure 994 or 1014 in any way that cells 404 are variously embodied with parts of components 182 and 184, SF structure 242, and DE structure 282 or 302.

Also, no changes in operation are needed if object 104 simultaneously impacts SF zones 892 and 112 or/and 912. Each cell 404, 1084, or 1104 meeting the PP, AD, or FR cellular TH impact criteria simply temporarily becomes a PP, AD, or FR CM cell. Recitations hereafter of (a) cells 1084 normally appearing as color B mean that they normally so appear along their parts 1086 of zone 892, (b) an AD CM cell 1084 temporarily appearing as color Y means that it temporarily so appears along its part 1086 of print area 898, (c) cells 1104 normally appearing as color C mean that they normally so appear along their parts 1106 of zone 912, and (d) to an FR CM cell 1104 temporarily appearing as color Z means that it temporarily so appears along its part 1106 of print area 918.

In manufacturing OI structure 1100, cells 404, 1084, and 1104 can be provided with programmable RA parts of any type described above and can be fabricated so as to be identical upon completion of manufacture. Cells 404, 1084, and 1104 are then selectively programmed according to the programming technique appropriate to the type of RA parts incorporated into cells 404, 1084, and 1104 so as to define the locations of interfaces 884 and 904 and any other interface between VC region 886 and another VC region such as VC region 106 or 906. When structure 1100 is embodied using the cellular version of any of the mid-emission embodiments, cells 404, 1084, and 1104 can alternatively or additionally be configured to have core subparts operable to emit radiosity-adjustable primary-color light as described above and can again be fabricated to be identical upon manufacture completion. Cells 404, 1084, and 1104 in the mid-emission embodiments are then selectively programmed as described above to define the locations of interfaces 884 and 904 and any other interface between region 886 and another VC region. The boundaries of SF zone 892 along SF zones 112 and 912 and any other VC SF zones in surface 102 are thereby determined by the post-manufacture cell programming.

The cell programming can be partly or fully performed using the cell CC controller described below for FIGS. 89, 92, and 93 with the programming voltages provided partly or fully along the COM paths for transmitting signals to OI structure 1100 depending on how cells 404, 1084, and 1104 are made programmable and programmed. Separate cell-controller equipment (not shown) including separate COM paths (not shown) for partly or fully supplying the programming voltages may be used in the cell programming.

The forgoing programming explanation applies to OI structure 1080 subject to interface 904 not being present in structure 1080. The boundary of SF zone 892 along SF zone 112 in surface 102 is thus determined by the post-manufacture cell programming.

Figure 88:
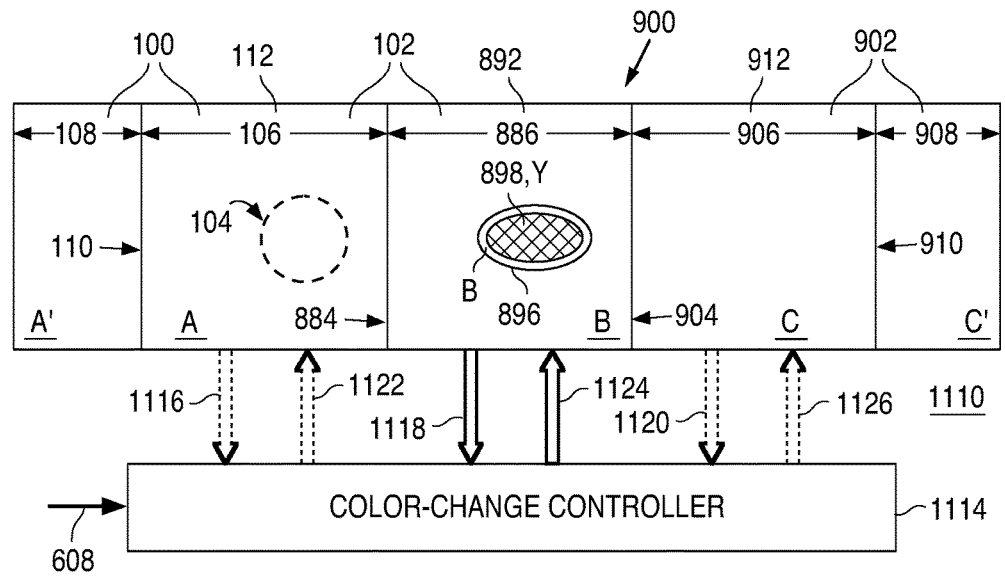
FIGS. 88 and 89 are composite block diagrams/layout views of two respective IP structures, each containing an OI structure having a surface for being impacted by an object at an ID area and for changing color along a corresponding print area of one or more of three consecutively adjoining VC regions under control of a CC controller according to the invention.

FIG. 88 illustrates an IP structure 1110 consisting of (a) OI structure 900 formed with OI structure 100, VC region 886, and OI structure 902 and (b) a general CC controller 1114 responsive to instruction 608 for controlling duration $\Delta t_{dr}$ of the changed state in response to suitable impact of object 104 on one or more of SF zones 112, 892, and 912. Networks 1116, 1118, and 1120 of COM paths respectively extend from VC regions 106, 886, and 906 to general CC controller 1114. Networks 1122, 1124, and 1126 of COM paths extend from controller 1114 respectively back to regions 106, 886, and 906. COM networks 1116, 1120, 1122, and 1126 are shown in dashed line in FIG. 88 because only COM networks 1118 and 1124 are used in the example of FIG. 88 in which object 104 impacts zone 892.

Controller 1114 may operate as a duration controller similar to controller 602 or as an intelligent controller similar to controller 702. As a duration controller, controller 1114 responds to instruction 608 for adjusting CC duration $\Delta t_{dr}$ after object 104 suitably impacts SF zone 112, 892, or 912. Also see FIGS. 5b, 54b, and 79b. For impact on zone 112, networks 1116 and 1122 respectively embody network 604 carrying the PP general LI impact signal if the PP basic TH impact criteria are met and network 606 carrying the PP general CC duration signal if instruction 608 is provided. The PP IDVC portion (138) temporarily appears as color X in accordance with instruction 608.

For impact on SF zone 892 or 912, the AD ID ISCC segment (928) or the FR ID ISCC segment provides an AD or FR general LI impact signal in response to the impact if it meets the AD or FR basic TH impact criteria. The AD or FR general LI impact signal, transmitted via network 1118 or 1120 to controller 1114, identifies the actual or expected location of print area 898 or 918 along zone 892 or 912. If instruction 608 is provided, controller 1114 responds to it and to the AD or FR general LI impact signal by providing an AD or FR general CC duration signal transmitted via network 1124 or 1126 to the AD or FR ISCC segment. The AD or FR ISCC segment responds by causing the AD IDVC portion (926) or the FR IDVC portion to temporarily appear as color Y or Z in accordance with instruction 608.

Impact of object 104 simultaneously on both SF zone 892 and SF zone 112 or 912 or simultaneously on all of zones 112, 892, and 912 is preferably handled by having the AD ID ISCC segment (928) provide the AD general LI impact signal if the impact meets the above-described CP basic TH impact criteria for the total VC area, i.e., OC areas 896 and 116 or/and 916, where object 104 contacts zones 112 and 892 or/and 912. The PP ID ISCC segment (142) then provides the PP general LI impact signal if object 104 impacts zone 112, and the FR ID ISCC segment provides the FR general LI impact signal if object 104 impacts zone 912.

As an intelligent controller, controller 1114 provides a supplemental impact assessment capability for determining whether an impact of object 104 on SF zone 112, 892, or 912 meeting the PP, AD, or FR basic TH impact criteria has certain supplemental impact characteristics and, if so, for causing the IDVC portion in VC region 106, 886, or 906 to temporarily appear as color X, Y, or Z. Also see FIGS. 5b, 64b, and 79b. Also, controller 1114 here responds to instruction 608 for adjusting CC duration $\Delta t_{dr}$ in the preceding way. For impact on zone 112, networks 1116 and 1122 respectively embody network 704 carrying the PP general CI impact signal provided by the PP ID ISCC segment (142) if the PP basic TH impact criteria are met and network 706 carrying the PP general CC initiation signal, here provided by controller 1114, for causing the PP IDVC portion (138) to temporarily appear as color X if the PP general supplemental impact information provided by the PP general CI impact signal meet the PP supplemental impact criteria. Network 1122 also embodies network 606 carrying the PP general CC duration signal if instruction 608 is provided.

For impact on SF zone 892 or 912, the AD ID ISCC segment (928) or the FR ID ISCC segment provides an AD or FR general CI impact signal in response to object 104 impacting zone 892 or 912 if the AD or FR basic TH impact criteria are met. The AD or FR general CI impact signal, transmitted via network 1118 or 1120 to controller 1114, identifies certain AD or FR characteristics of that impact. The AD or FR impact characteristics consist of the location expected for print area 898 or 918 in zone 892 or 912 and AD or FR general supplemental impact information usually formed with the same parameters, e.g., PA size and/or shape, as the PP general supplemental impact information.

Controller 1114 responds by determining whether the AD or FR general supplemental impact information meet AD or FR supplemental impact criteria usually numerically the same as the PP supplemental impact criteria and, if so, provides an AD or FR general CC initiation signal, transmitted via network 1124 or 1126 to the AD ID ISCC segment (928) or the FR ID ISCC segment, for causing the AD IDVC portion (926) or the FR IDVC portion to temporarily appear as color Y or Z. An impact on SF zone 892 or 912 must meet AD or FR expanded impact criteria consisting of the AD or FR basic TH impact criteria and the AD or FR supplemental impact criteria to cause a temporary color change. IP structure 1110 thus provides color change for suitable impacts of object 104 for which color changes is desired and substantially avoids providing color change for impacts of bodies for which color change is not desired. If controller 1114 receives instruction 608 and if the AD or FR supplemental impact criteria are met, controller 1114 responds by providing the AD or FR general CC duration signal, transmitted via network 1124 or 1126 to the AD or FR ISCC segment, for adjusting CC duration $\Delta t_{dr}$ subsequent to impact.

Similar to the PP supplemental impact criteria, the AD or FR supplemental impact criteria can consist of multiple sets of fully different AD or FR supplemental impact criteria respectively associated with different specific altered or modified colors materially different from AD color B or FR color C. More than one, usually all, of the specific altered or modified colors again differ, usually materially, from one another. The AD or FR supplemental impact information is potentially capable of meeting any of the AD or FR supplemental impact criteria sets. If the AD or FR supplemental impact information meets the AD or FR supplemental impact criteria, generic altered color Y or generic modified color Z is the specific altered or modified color for the AD or FR supplemental impact criteria set actually met by the AD or FR supplemental impact information. Controller 1114 usually provides the AD or FR general CC initiation signal for causing the AD IDVC portion (926) or the FR IDVC portion to temporarily appear as specific altered color Y or specific modified color Z for the AD or FR supplemental impact criteria set met by the AD or FR supplemental impact information the same as controller 702 provides the PP general CC initiation signal for causing the PP IDVC portion (138) to temporarily appear as the specific changed color X for the PP supplemental impact criteria set met by the PP supplemental impact information.

Impact of object 104 simultaneously on SF zones 892 and 112 or/and 912 is preferably handled by having the AD ID ISCC segment (928) provide the AD general CI impact signal if the impact meets the CP basic TH impact criteria for the total VC area where object 104 contacts zones 112 and 892 or/and 912. The PP ID ISCC segment (142) then provides the PP general CI impact signal if, besides impacting zone 892, object 104 impacts zone 112, and the FR ID ISCC segment provides the FR general CI impact signal if object 104 also impacts zone 912. Controller 1114 responds to the two or three general CI impact signals by combining the AD and PP or/and FR general supplemental impact information to form CP general supplemental impact information and determining whether it meets CP supplemental impact criteria usually numerically the same as the AD supplemental impact criteria and therefore usually numerically the same as the PP and FR supplemental impact criteria. If so, controller 1114 provides the AD general CC initiation signal for causing the AD IDVC portion (926) to temporarily appear as color Y. Controller 1114 provides the PP general CC initiation signal for causing the PP IDVC portion (138) to temporarily appear as color X if object 104 also impacted SF zone 112 or/and the FR general CC initiation signal for causing the FR IDVC portion to temporarily appear as color Z if object 104 also impacted zone 912. An impact on zones 892 and 112 or/and 912 must thus meet CP expanded impact criteria consisting of the CP basic TH impact criteria and the CP supplemental impact criteria, which apply to the total VC area where object 104 contacts zones 112 and 892 or/and 912, to cause a temporary color change.

The CP supplemental impact criteria can consist of multiple sets of fully different CP supplemental impact criteria respectively associated with multiple specific altered colors materially different from AD color B and multiple specific changed colors materially different from PP color A or/and multiple modified colors materially different from FR color C. More than one, usually all, of the specific changed, altered, or modified colors differ, usually materially. The impact of object 104 on SF zones 892 and 112 or/and 912 is potentially capable of meeting any of the CP supplemental impact criteria sets. If the impact meets the CP supplemental impact criteria, generic modified color Y is the specific altered color and generic changed color X is the specific changed color or/and generic modified color Z is the specific modified color for the CP supplemental impact criteria set actually met by the impact.

Figure 89:
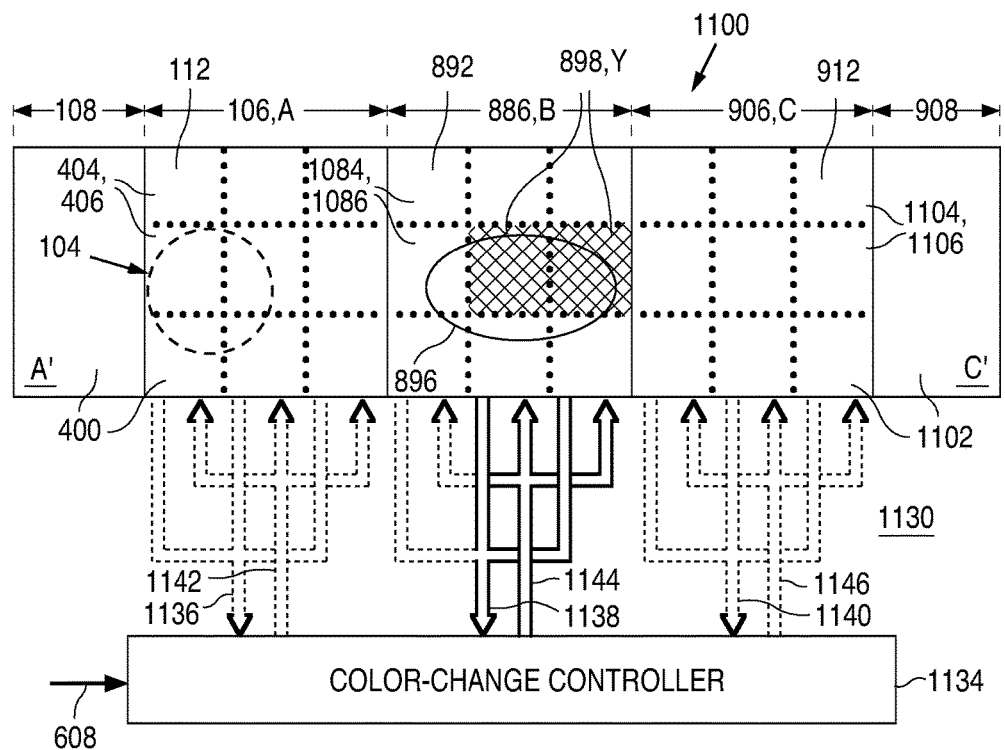

FIG. 89 illustrates an IP structure 1130 consisting of (a) OI structure 1100 formed with OI structure 400, cellular VC region 886, and OI structure 1102 and (b) a cell CC controller 1134 responsive to instruction 608 for controlling duration $\Delta t_{dr}$ of the changed state in response to suitable impact of object 104 on one or more of SF zones 112, 892, and 912. SF parts 406, 1086, and 1106 of cells 404, 1084, and 1104 are shown here as being rectangles, specifically squares. Networks 1136, 1138, and 1140 of COM paths respectively extend from VC regions 106, 886, and 906 to cell CC controller 1134. Networks 1142, 1144, and 1146 of COM paths extend from controller 1134 respectively back to regions 106, 886, and 906. Each COM network 1136, 1138, 1140, 1142, 1144, or 1146 usually includes a set of row COM paths, each connected to a different row of cells 404, 1084, or 1104, and a set of column COM paths, each connected to a different column of cells 404, 1084, or 1104. Networks 1136, 1140, 1142, and 1146 and parts of networks 1138 and 1144 are shown in dashed line in FIG. 89 because only the remaining parts of networks 1138 and 1144 are used in the example of FIG. 89 in which object 104 impacts zone 892.

Controller 1134 may operate as a duration controller similar to controller 652 or as an intelligent controller similar to controller 752. As a duration controller, controller 1134 responds to instruction 608 for adjusting CC duration Δt$_{dr}$ after object 104 suitably impacts SF zone 112, 892, or 912. Also see FIGS. 38*b*, 59*b*, 79*b*, and 87*b*. For impact on zone 112, networks 1136 and 1142 respectively embody network 654 carrying the PP cellular LI impact signals from CM cells 404 and network 656 carrying the PP cellular CC duration signals to CM cells 404 if instruction 608 is provided. After each CM cell 404 starts to temporarily appear as color X, each CM cell 404 continues to appear as color X in accordance with instruction 608.

For impact on SF zone 892 or 912, each cell 1084 or 1104 meeting the AD or FR cellular TH impact criteria in response to the impact temporarily becomes a CM cell. The ISCC part of each CM cell 1084 or 1104 provides an AD or FR cellular LI impact signal, transmitted via network 1138 or 1140 to controller 1134, identifying that cell's location along zone 892 or 912. If controller 1134 receives instruction 608, controller 1134 responds to it and to the cellular LI impact signal of each CM cell 1084 or 1104 by providing an AD or FR cellular CC duration signal, transmitted via network 1144 or 1146 to that cell's ISCC part, for adjusting that cell's CC duration Δt$_{dr}$ subsequent to impact. After each CM cell 1084 or 1104 starts to temporarily appear as color Y or Z, the ISCC part of each CM cell 1084 or 1104 responds to its cellular CC duration signal by causing it to continue appearing as color Y or Z in accordance with instruction 608.

As an intelligent controller, controller 1134 provides a supplemental impact assessment capability for determining whether an impact of object 104 on SF zone 112, 892, or 912 meeting the PP, AD, or FR cellular TH impact criteria has certain supplemental impact characteristics and, if so, for causing CM cells 404, 1084, or 1104 to temporarily appear as color X, Y, or Z. Also see FIGS. 38*b*, 69*b*, 79*b*, and 87*b*. Additionally, controller 1134 here responds to instruction 608 for adjusting CC duration Δt$_{dr}$ in the preceding way. For impact on zone 112, networks 1136 and 1142 respectively embody network 754 carrying the PP cellular CI impact signal for any cell 404 meeting the PP cellular TH impact criteria so as to be a TH CM cell and network 756 carrying the PP cellular CC initiation signal, provided here by controller 1134, for causing each TH CM cell 404 to temporarily become a full CM cell and temporarily appear as color X if the PP general supplemental impact information provided by the PP cellular CI impact signals of TH CM cells 404 meet the PP supplemental impact criteria. Network 1142 embodies network 656 carrying the PP cellular CC duration signals for all full CM cells 404 if instruction 608 is provided.

For impact on SF zone 892 or 912, the ISCC part of each cell 1084 or 1104 meeting the AD or FR cellular TH impact criteria responds to object 104 impacting OC area 896 or 916 by providing an AD or FR cellular CI impact signal, transmitted via network 1138 or 1140 to controller 1134, identifying certain cellular characteristics of the impact as experienced at that cell 1084 or 1104. Each such cell 1084 or 1104 temporarily becomes a TH CM cell. The cellular impact characteristics for each TH CM cell 1084 or 1104 consist of the location of its SF part 1086 or 1106 in zone 892 or 912 and AD or FR cellular supplemental impact information.

Controller 1134 responds to the AD or FR cellular CI impact signals by combining the AD or FR cellular supplemental impact information of TH CM cells 1084 or 1104 to form the AD or FR general supplemental impact information and determines whether it meets the AD or FR supplemental impact criteria. If so, each TH CM cell 1084 or 1104 temporarily becomes a full CM cell. For each full CM cell 1084 or 1104, controller 1134 provides an AD or FR cellular CC initiation signal transmitted via network 1144 or 1146 to that cell's ISCC part. Each full CM cell 1084 or 1104 then temporarily appears as color Y or Z. The AD or FR expanded impact criteria that must be met to cause a temporary color change consist of the AD or FR cellular TH impact criteria and the AD or FR supplemental impact criteria. Color change occurs for suitable impacts of object 104 for which color changes is desired and substantially avoids occurring for impacts of bodies for which color change is not desired. If controller 1134 receives instruction 608 and if the AD or FR supplemental impact criteria are met, controller 1134 responds by providing the AD or FR cellular CC duration signal, transmitted via network 1144 or 1146, to the ISCC part of each full CM cell 1084 or 1104 for adjusting its CC duration Δt$_{dr}$ subsequent to impact. Controller 1134 usually creates the PP, AD, or/and FR cellular CC initiation signals by producing a general CC initiation signal and suitably splitting it.

Simultaneous impact of object 104 on SF zones 892 and 112 or/and 912 is handled in the preceding way except that controller 1134 responds to the AD and PP or/and FR cellular CI impact signals by combining the cellular supplemental impact information of TH CM cells 1084 and 404 or/and 1104 to form CP general supplemental impact information and determines whether it meets the above-mentioned CP supplemental impact criteria. If so, each of TH CM cells 1084 and 404 or/and 1104 temporarily becomes a full CM cell. Controller 1134 provides the AD CC initiation signal for each full CM cell 1084 and the PP cellular CC initiation signal for each full CM cell 404 or/and the FR cellular CC initiation signal for each full CM cell 1104. Each full CM cell 1084 temporarily appears as color Y and each full CM cell 404 temporarily appears as color X or/and each full CM cell 1104 temporarily appears as color Z. The CP expanded impact criteria which must be met to cause a temporary color change consist of the CP supplemental impact criteria combined with the AD and PP or/and FR cellular TH impact criteria.

Figure 90:
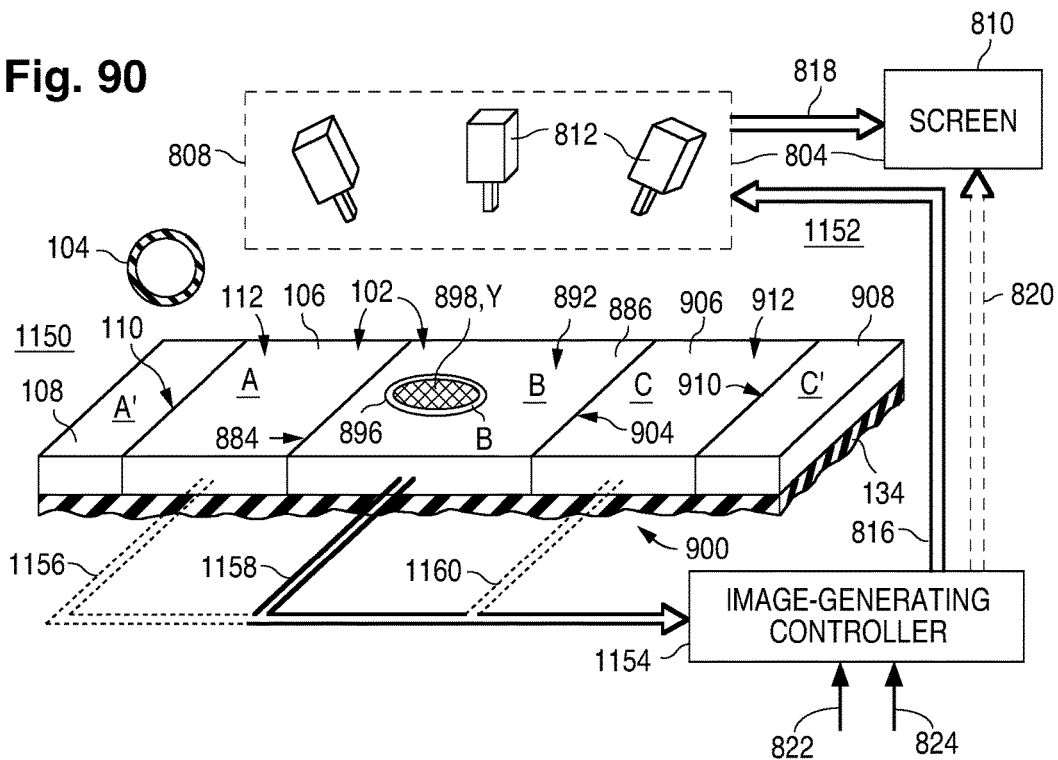
FIGS. 90-93 are composite block diagrams/perspective cross-sectional views of four respective IP structures, each containing an OI structure having a surface for being impacted by an object at an ID area and for changing color along a corresponding print area of one or more of three consecutively adjoining VC regions and having an image-generating capability according to the invention.

FIG. 90 illustrates an IP structure 1150 consisting of OI structure 900 and an IG system 1152 for variously generating images of print areas 118, 898, and 918 and selected adjoining SF area. Also see FIGS. 5*b* and 79*b*. Persons can utilize the images to examine where area 118, 898, or 918 occurs in SF zone 112, 892, or 912, e.g., to determine how closely area 118, 898, or 918 comes to a selected part of the boundary of zone 112, 892, or 912.

IG system 1152 consists of IG structure 804 for generating images and a general IG controller 1154 for controlling structure 804 to suitably generate PP, AD, FR, and CP PAV images. Image-collecting apparatus 808 in structure 804 is deployed for collecting an image of any part of VC SF zone 112, 892, or 912 and usually an adjoining part of surface 102 outside zone 112, 892, or 912. Networks 1156, 1158, and 1160 of COM paths respectively extend from VC regions 106, 886, and 906 to general IG controller 1154. COM networks 1156 and 1160 are shown in dashed line in FIG. 90 because only COM network 1158 is used in this example in which object 104 impacts zone 892.

Each PP, AD, or FR PAV image consists of an image of print area 118, 898, or 918 and adjacent surface extending to at least a selected location of surface 102. The selected SF location is usually a partial boundary of SF zone 112, 892, or 912, e.g., the edge of one of interfaces 110 and 884 along zone 112, the edge of one of interfaces 884 and 904 along zone 892, or the edge of one of interfaces 904 and 910 along zone 912. Each CP PAV image, generated for impact simultaneously on zones 892 and 112 or/and 912, consists of an image of areas 898 and 118 or/and 918 along with adjacent surface of surface 102. Subject to area 898 or 918 replacing area 118, each AD or FR PAV image has the above-described characteristics of a PP PAV image. The same applies to each CP PAV image subject to areas 898 and 118 or/and 918 replacing area 118.

The ID ISCC segment of VC region 106, 886, or 906 again provides a PP, AD, or FR general LI impact signal in response to object 104 impacting OC area 116, 896, or 916 if the PP, AD, or FR basic TH impact criteria are met. IG controller 1154 and IG structure 804 operate the same as IG controller 806 and structure 804 in responding to the PP general LI impact signal transmitted via network 1156, largely network 814, to controller 1154. Hence, controller 1154 can usually be set to operate in either the automatic or instruction mode of controller 806 for providing the PP PA identification signal transmitted via path 816 to structure 804 for causing it to generate a PP PAV image if a PP IG condition is met. Responsive to the AD or FR general LI impact signal transmitted via network 1158 or 1160, controller 1154 operating in either the automatic or instruction mode similarly provides an AD or FR PA identification signal identifying the location of print area 898 or 918 in SF zone 892 or 912 provided that an AD or FR IG condition is met. Structure 804 responds to the AD or FR PA identification signal transmitted via path 816 by generating an AD or FR PAV image the same as structure 804 generates a PP PAV image. The PP, AD, or FR IG condition consists of print area 118, 898, or 918 meeting the PP, AD, or FR distance condition that a point in area 118, 898, or 918 be less than or equal to a selected distance away from a selected location on surface 102 or controller 1154 receiving instruction 822.

Impact simultaneously on SF zones 892 and 112 or/and 912 is handled in the preceding way except that the AD ID ISCC segment (928) provides the AD general LI impact signal in response to object 104 impacting OC area 896 if the impact meets the CP basic TH impact criteria for the total VC area where object 104 contacts zones 892 and 112 or/and 912. The PP ID ISCC segment (142) provides the PP general LI impact signal if, besides impacting zone 892, object 104 impacts zone 112, and the FR ID ISCC segment provides the FR general LI impact signal if object 104 also impacts zone 912. Responsive to the AD and PP or/and FR general LI impact signals, controller 1154 again operating in either the automatic or instruction mode provides a CP PA identification signal identifying the location of print areas 898 and 118 or/and 918 in zones 892 and 112 or/and 912 provided that a CP IG condition is met. The CP IG condition consists of areas 898 and 118 or/and 918 meeting the distance condition that a point in areas 898 and 118 or/and 918 be less than or equal to a selected distance away from a selected location on surface 102 or controller 1154 receiving instruction 822. For the automatic mode, the distance condition is often satisfied when area 898 adjoins area 118 or/and area 918 as indicated by controller 1154 receiving the AD and PP or/and FR general LI impact signals. IG structure 804 responds to the CP PA identification signal transmitted via path 816 by generating a CP PAV image the same as structure 804 generates a PP PAV image.

Controller 1154 may maintain an electronic map of SF zones 112, 892, and 912, including the locations of the edges of interfaces 110, 884, 904, and 910 along surface 102 and each other part of the boundaries of zones 112, 892, and 912. Responsive to the PP, AD, or FR general LI impact signal, controller 1154 determines the expected location of print area 118, 898, or 918 on the map and generates the data for a PP, AD, or FR PAV image if the PP, AD, or FR IG condition is met. The PP, AD, or FR PAV-image data includes the shape of the perimeter of area 118, 898, or 918, the shape of the selected location on surface 102, and distance data defining the lateral spatial relationship between the perimeter of area 118, 898, or 918 and the selected SF location.

If object 104 simultaneously impacts SF zones 892 and 112 or/and 912 so as to meet the CP basic TH impact criteria, controller 1154 responds to the AD and PP or/and FR general LI impact signals by determining the expected locations of print areas 898 and 118 or/and 918 on the electronic map and generates the data for a CP PAV image if the CP IG condition is met. The CP PAV-image data includes the shape of the composite perimeter of areas 898 and 118 or/and 918, the shape of the selected location on surface 102, and distance data defining the lateral spatial relationship between the composite perimeter of areas 898 and 118 or/and 918 and the selected SF location. Controller 1154 provides the PP, AD, FR, or CP PAV-image data directly, e.g., via path 820, to screen 810 which responds by generating the PP, AD, FR, or CP PAV image.

Figure 91:
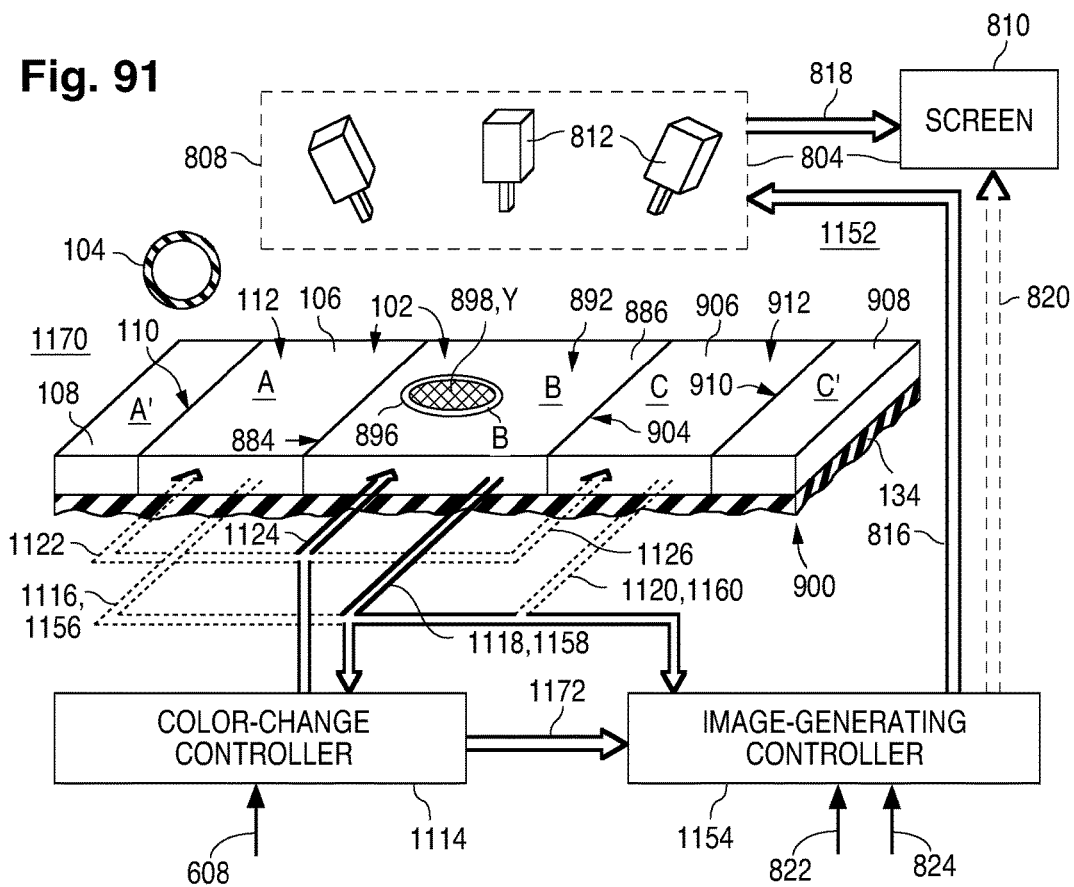

FIG. 91 illustrates an IP structure 1170 consisting of OI structure 900, CC controller 1114, and IG system 1152 formed with IG structure 804 and IG controller 1154. Also see FIGS. 5b, 79b, and 88. Networks 1156, 1158, and 1160 extending from VC regions 106, 886, and 906 to controller 1154 may respectively partly overlap networks 1116, 1118, and 1120 respectively extending from regions 106, 886, and 906 to CC controller 1114. Networks 1122, 1124, and 1126 again extend from CC controller 1114 respectively back to regions 106, 886, and 906. OI structure 900 and controller 1114 here operate the same as in IP structure 1110. OI structure 900, IG structure 804, and IG controller 1154 here operate the same as in IP structure 1150 except as described below.

CC controller 1114 can again be a duration controller, similar to controller 602, for adjusting CC duration $\Delta t_{dr}$ subsequent to impact. Alternatively, controller 1114 can be intelligent controller, similar to controller 702, for providing the supplemental impact assessment capability to determine whether an impact meeting the PP, AD, or FR basic TH impact criteria has certain supplemental impact characteristics and, if so, for causing the IDVC portion in VC region 106, 886, or 906 to temporarily appear as color X, Y, or Z.

IG controller 1154 can operate in various ways when controller 1114 is an intelligent controller. If a PAV image is desired regardless of whether the PP, AD, or FR supplemental impact criteria are, or are not, met, controller 1154 supplies the PP, AD, or FR PA identification signal in response to the location expected for print area 118, 898, or 918 provided in the PP, AD, or FR general CI impact signal transmitted via network 1156, 1158, or 1160. A PP, AD, or FR PAV image is generated whenever the PP, AD, or FR basic TH impact criteria are met. Controller 1154 preferably provides the PP, AD, or FR PA identification signal in response to the PP, AD, or FR general CC initiation signal supplied from controller 1114 via a COM path 1172. In that case, a PAV image is generated only when the PP, AD, or FR supplemental impact criteria are met. Impact simultaneously on SF zones 892 and 112 or/and 912 for both ways of operating controller 1154 is handled the same as just described except that the processing of the PA-location identifying information in the AD and PP or/and FR general CI impact signals is modified as described above in regard to IP structure 1150 for processing the AD and PP or/and FR general LI impact signals for impact simultaneously on zones 892 and 112 or/and 912.

Figure 92:
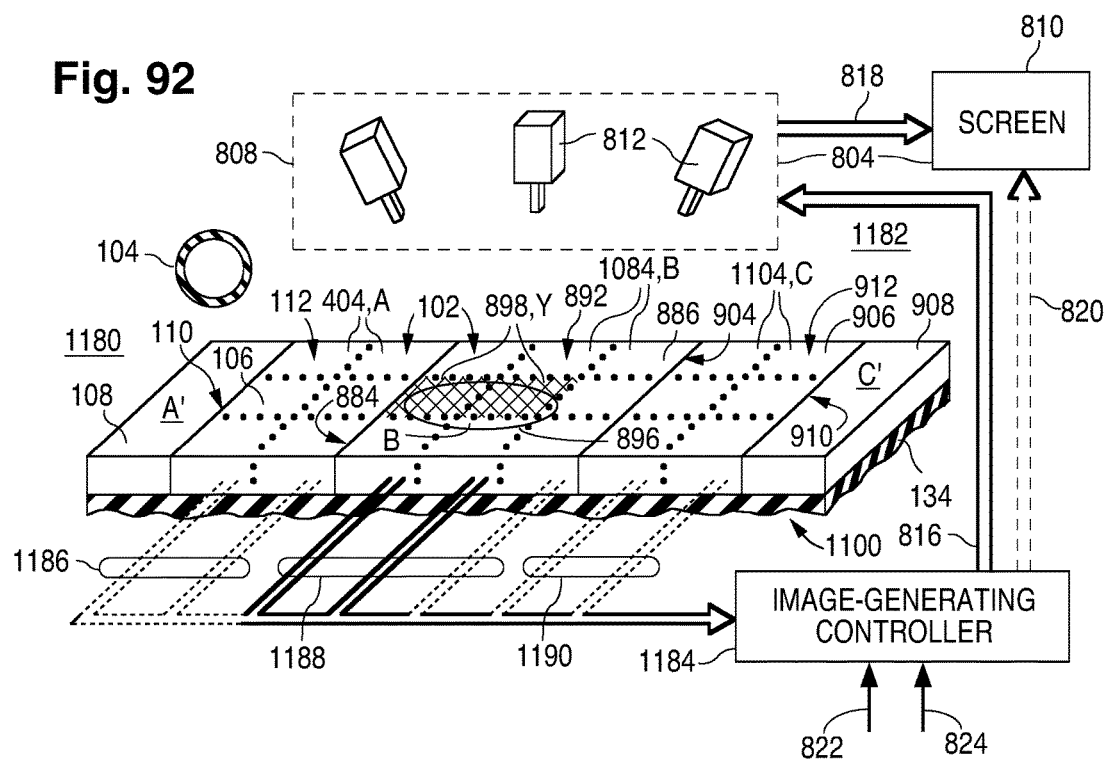

FIG. 92 illustrates an IP structure 1180 consisting of OI structure 1100 and an IG system 1182 for generating images of print areas 118, 898, and 918 and selected adjoining SF area. Also see FIGS. 38*b*, 79*b*, 87*b*, and 89. SF parts 406, 1086, and 1106 of cells 404, 1084, and 1104 again appear as rectangles, specifically squares. Persons can again utilize the images to examine where area 118, 898, or 918 occurs in SF zone 112, 892, or 912, e.g., to determine how closely area 118, 898, or 918 comes to a selected part of the boundary of zone 112, 892, or 912.

IG system 1182 consists of IG structure 804 for generating images and a cell IG controller 1184 for controlling structure 804 to suitably generate PP, AD, FR, and CP PAV images having the above-described characteristics. Image-collecting apparatus 808 in structure 804 is again used for collecting an image of any part of SF zone 112, 892, or 912 and usually an adjoining part of surface 102 outside zones 112, 892, and 912. Networks 1186, 1188, and 1190 of COM paths respectively extend from VC regions 106, 886, and 906 to cell IG controller 1184. Each COM network 1186, 1188, or 1190 usually includes a set of row COM paths, each connected to a different row of cells 404, 1084, or 1104, and a set of column COM paths, each connected to a different column of cells 404, 1084, or 1104. Networks 1186 and 1190 and part of network 1188 are shown in dashed line in FIG. 92 because only the remainder of network 1188 is used in this example in which object 104 impacts zone 892.

The ISCC part of each CM cell 404, 1084, or 1104 again provides a PP, AD, or FR cellular LI impact signal in response to object 104 impacting OC area 116, 896, or 916. IG controller 1184 and IG structure 804 operate the same as IG controller 846 and structure 804 in responding to the PP cellular LI impact signals transmitted from CM cells 404 via network 1186, largely network 848, to controller 1184. Controller 1184 can usually be set to operate in either the automatic or instruction mode of controller 846, and thus of controller 806, for providing the PP PA identification signal transmitted via path 816 to structure 804 for causing it to generate a PP PAV image. Responsive to the AD or FR general LI impact signal transmitted via network 1188 or 1190, controller 1184 operating in either the automatic or instruction mode similarly provides an AD or FR PA identification signal identifying the location of print area 898 or 918 in SF zone 892 or 912 provided that an AD or FR IG condition is met. Structure 804 again responds to the AD or FR PA identification signal transmitted via path 816 by generating an AD or FR PAV image the same as structure 804 generates a PP PAV image. The PP, AD, or FR IG condition consists of print area 118, 898, or 918 meeting the above-described PP, AD, or FR distance condition or controller 1184 receiving instruction 822.

If object 104 simultaneously impacts SF zones 892 and 112 or/and 912, the ISCC part of each cell 404, 1084, or 1104 meeting the PP, AD, or FR cellular TH impact criteria provides a PP, AD, or FR cellular LI impact signal in response to the impact and temporarily becomes a CM cell. Responsive to the AD and PP or/and FR cellular LI impact signals, controller 1184 provides a CP PA identification signal identifying the location of print areas 898 and 118 or/and 918 in zones 892 and 112 or/and 912 provided that the above-described CP IG condition is met. IG structure 804 again responds to the CP PA identification signal transmitted via path 816 by generating a CP PAV image the same as structure 804 generates a PP PAV image.

An electronic map of SF zones 112, 892, and 912, including the locations of the SF edges of interfaces 110, 884, 904, and 910 and each other part of the boundaries of zones 112, 892, and 912, may be maintained in controller 1184. If so, controller 1184 can generate the data for a PP, AD, FR, or CP PAV image the same as controller 1154 uses such a map to generate the data for a PP, AD, FR, or CP PAV image. The PP, AD, FR, or CP PAV-image data is then supplied from controller 1184 directly, e.g., via path 820, to screen 810 which displays the PP, AD, FR, or CP PAV image. The cell arrangement of VC regions 106, 886, and 906 in OI structure 1100 facilitates generation of the map because SF part 406, 1086, or 1106 of each cell 404, 1084, or 1104 is at a different specified location on the map.

Figure 93:
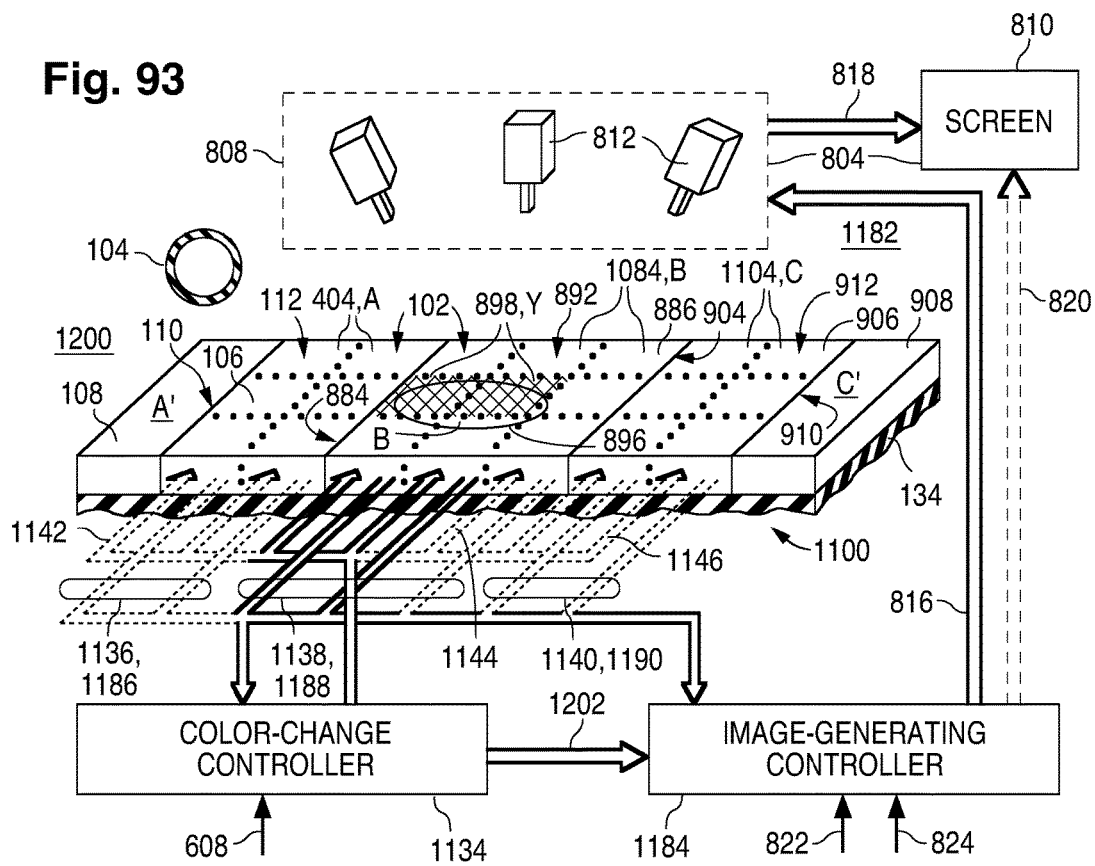

FIG. 93 illustrates an IP structure 1200 consisting of OI structure 1100, CC controller 1134, and IG system 1182 formed with IG structure 804 and IG controller 1184. Also see FIGS. 38*b*, 79*b*, and 87*b*. Cell SF parts 406, 1086, and 1106 again appear as rectangles, specifically squares. Networks 1186, 1188, and 1190 extending from VC regions 106, 886, and 906 to IG controller 1184 may respectively partly overlap networks 1136, 1138, and 1140 respectively extending from regions 106, 886, and 906 to CC controller 1134. Networks 1142, 1144, and 1146 again extend from controller 1134 respectively back to regions 106, 886, and 906. Structure 1100 and controller 1134 here operate the same as in IP structure 1130. Structure 1100, IG structure 804, and IG controller 1184 here operate the same as in IP structure 1180.

CC controller 1134 can again be a duration controller, similar to controller 652, for adjusting CC duration $\Delta t_{dr}$ subsequent to impact. Controller 1134 can alternatively be an intelligent controller, similar to controller 752, for providing the supplemental impact assessment capability to determine whether an impact meeting the PP, AD, or FR cellular TH impact criteria has certain supplemental impact characteristics and, if so, for causing for causing CM cells 404, 1084, or 1104 to temporarily appear as color X, Y, or Z.

IG controller 1184 can operate in various ways when controller 1134 is an intelligent controller. If a PAV image is desired regardless of whether the PP, AD, or FR supplemental impact criteria are, or are not, met, IG controller 1184 supplies the PP, AD, or FR PA identification signal in response to the expected location for print area 118, 898, or 918 provided in the PP, AD, or FR cellular CI impact signals transmitted via network 1186, 1188, or 1190. A PP, AD, or FR PAV image is generated whenever the PP, AD, or FR cellular TH impact criteria are met. IG Controller 1184 usually provides the PP, AD, or FR PA identification signal in response to the PP, AD, or FR cellular CC initiation signal supplied from controller 1134 via a COM path 1202. A PAV image is generated only when the PP, AD, or FR supplemental impact criteria are met. Impact simultaneously on SF zones 892 and 112 or/and 912 for both ways of operating controller 1184 is handled the same as just described except that the processing of the PA-location identifying information in the AD and PP or/and FR cellular CI impact signals is modified as described above in regard to IP structure 1180 for processing the AD and PP or/and FR cellular LI impact signals for impact simultaneously on zones 892 and 112 or/and 912.

IG controller 1154 or 1184 may provide a screen activation/deactivation signal, transmitted via path 820, to screen 810 for activating or deactivating it. Responsive to instruction 824, controller 1154 or 1184 may provide a magnify/shrink signal the same as controller 806 or 846. IG structure 804 here responds to the magnify/shrink signal the same as it responds to magnify/shrink signal provided by controller 806 or 846.

Controller 1154 or 1184 preferably includes an image analyzer for analyzing each PAV image to determine whether it is a PP, AD, or FR PAV image or a CP PAV image and for providing an indication of the analysis. The analysis indication may be presented on screen 810, e.g., as a part of the PAV image at a location spaced apart from the image print area of each print area 118, 898, or 918 appearing in the PAV image.

The PP, AD, or FR supplemental impact criteria sometimes require that print area 118, 898, or 918 be entirely inside SF zone 112, 892, or 912. This is typically expressed by the physical requirement that area 118 be spaced apart from the SF edges of interfaces 110 and 884 and each other part of the boundary of zone 112, that area 898 be spaced apart from the SF edges of interfaces 884 and 904 and each other part of the boundary of zone 892, or that area 918 be spaced apart from the SF edges of interfaces 904 and 910 and each other part of the boundary of zone 912. For this purpose, CC controller 1114 or 1134, often termed controller 1114/1134, may maintain an electronic map of zones 112, 892, and 912, including the locations of the SF edges of interfaces 110, 884, 904, and 910 and each other part of the boundaries of zones 112, 892, and 912. The PP, AD, or FR general supplemental impact information includes the location of OC area 116, 896, or 916 on the map. Controller 1114/1134 determines the expected location of area 118, 898, or 918 from the OC-area location and examines the map to determine whether area 118, 898, or 918 is entirely inside zone 112, 892, or 912.

Image-collecting apparatus 808 in IP structures 1150, 1170, 1180, and 1200 optionally functions as an OT control apparatus which optically tracks the movement of object 104 over surface 102 and which can be used in largely the ways described above for IP structures 800, 830, 840, and 850 to cause color change for impacts of object 104 for which color change is desired and to substantially avoid causing color change for impacts of bodies for which color change is not desired. Path 826A is replaced with a trio of COM paths (not shown) respectively extending from OT control apparatus 808 to VC regions 106, 886, and 906, specifically their PP, AD, and FR ISCC structures (132, 922, and 924), in OI structure 900 or 1100. The three COM paths replacing path 826A in structure 1100 split into three groups of individual COM paths (not shown) respectively extending to all cells 404, 1084, and 1104, specifically their ISCC parts.

In a first expanded OT technique, OT control apparatus 808 interacts with VC region 106, 886, or 906 for impact solely on SF zone 112, 892, or 912 basically the same as apparatus 808 interacts with region 106 for impact on zone 112 in the first basic OT technique. Regions 106, 886, and 906 are capable of being enabled to be capable of changing color at locations dependent on the object tracking and are normally disabled from being capable of changing color so as to normally respectively appear as PP color A, AD color B, and FR color C. The PP, AD, and FR ISCC structures (132, 922, and 924) provide the enablable/disablable CC capability.

OT control apparatus 808 estimates where object 104 is expected to impact surface 102 according to the tracked movement of object 104 and provides a PP, AD, or FR general CC enable signal shortly prior to the impact if the tracking indicates that object 104 is expected to contact surface 102 at least partly in SF zone 112, 892, or 912. If object 104 is expected to contact zone 112, the PP general CC enable signal, transmitted by a replacement for path 826A to VC region 106 specifically the PP ISCC structure, at least partly identifies ID estimated OC area 116[#] (shown in FIGS. 74 and 75 but not in FIGS. 90-93). If object 104 is expected to contact zone 892 or 912, the AD or FR general CC enable signal, also transmitted by a replacement for path 826A to VC region 886 or 906 specifically the AD or FR ISCC structure, at least partly identifies ID estimated OC area (not shown in FIGS. 90-93) spanning where object 104 is expected to contact zone 892 or 912. Analogous to estimated area 116[#], the estimated OC area for contact with zone 892 or 912 is usually of roughly the same physical area as actual OC area 896 or 916 even though the estimated and actual OC areas (turn out to) differ in location along zone 892 or 912.

An ID laterally oversize portion of VC region 106, 886, or 906 is enabled to be capable of changing color in response to the PP, AD, or FR CC enable signal. The oversize portion of region 106 extends to oversize area 828 (shown in FIGS. 74 and 75 but not in FIGS. 90-93) of SF zone 112. The oversize portion of region 886 or 906 extends to an ID oversize area (not shown in FIGS. 90-93) of SF zone 892 or 912. When region 106, 886, or 906 includes structure besides the PP, AD, or FR ISCC structure, the PP, AD, or FR ISCC structure causes the oversize portion of region 106, 886, or 906 to be enabled to be capable of changing color. Analogous to oversize area 828, the oversize area of zone 892 or 912 encompasses and extends beyond the estimated OC area of zone 892 or 912 as well as usually being roughly concentric with its estimated OC area. Analogous to what occurs with oversize area 828, OT control apparatus 808 and region 886 or 906, specifically the AD or FR ISCC structure, operate so that the oversize area of zone 892 or 912 virtually always fully encompasses actual OC area 896 or 916.

The PP IDVC portion (138), which is included in the oversize portion of VC region 106, responds to object 104 impacting oversize area 828 at actual OC area 116 by temporarily appearing as changed color X if the impact meets the PP basic TH impact criteria. The AD IDVC portion (926) or FR IDVC portion, which is included in the oversize portion of VC region 886 or 906, responds to object 104 impacting the oversize area of SF zone 892 or 912 at actual OC area 896 or 916 by temporarily appearing as altered color Y or modified color Z if the impact meets the AD or FR basic TH impact criteria. When region 106, 886, or 906 includes structure besides the PP, AD, or FR ISCC structure, the PP ID ISCC segment (142), AD ID ISCC segment (928), or FR ID ISCC segment causes the PP, AD, or FR IDVC portion to temporarily appear as color X, Y, or Z. The AD and FR IDVC portions usually have approximately the same anticipation time period $\Delta t_{ant}$ and enable-end time period $\Delta t_{end}$ as the PP IDVC portion.

Simultaneous impact on SF zones 892 and 112 or/and 912 in IP structures 1150 and 1170 is preferably handled in the preferred way described above for FIG. 79. That is, the AD IDVC portion temporarily appears as color Y if the impact meets the CP basic TH impact criteria for the total OC area 896 and 116 or/and 916 where object 104 impacts zones 892 and 112 or/and 912. The PP IDVC portion temporarily appears as color X if, besides impacting zone 892, object 104 impacts zone 112, and the FR IDVC portion temporarily appears as color Z if object 104 also impacts zone 912. When VC region 106, 886, or 906 includes structure besides the PP, AD, or FR ISCC structure, the AD ISCC segment causes the AD IDVC portion to temporarily appear as color Y. The PP or FR ID ISCC segment causes the PP or FR IDVC portion to temporarily appear as color X or Z if object 104 impacts zone 112 or 912.

Cells 404, 1084, and 1104 in IP structures 1180 and 1200 are enablable/disablable cells normally disabled from being capable of changing color. The oversize portion of VC region 106, 886, or 906 is constituted with an ID group of cells 404, 1084, or 1104 termed the PP, AD, or FR oversize cell group. Analogous to oversize area 828, the oversize area of SF zone 892 or 912 consists of SF parts 1086 or 1106 of cells 1084 or 1104 in the AD or FR oversize cell group. Responsive to the PP, AD, or FR CC enable signal transmitted along a replacement for path 826A, each cell 404, 1084, or 1104 in the PP, AD, or FR oversize cell group is enabled to be capable of changing color. When region 106, 886, or 906 includes structure besides the PP, AD, or FR ISCC structure, the ISCC part of each cell 404, 1084, or 1104 in the PP, AD, or FR oversize cell group causes that cell 404, 1084, or 1104 to be enabled to be capable of changing color. Each so-enabled cell 404, 1084, or 1104 temporarily appears as color X, Y, or Z if the impact of object 404 on SF zone 112, 892, or 912 causes that cell 404, 1084, or 1104 to meet the PP, AD, or FR cellular TH impact criteria and temporarily become a CM cell. When region 106, 886, or 906 contains structure besides the PP, AD, or FR ISCC structure, the ISCC part of each CM cell 404, 1084, or 1104 causes it to temporarily appear as color X, Y, or Z.

In a second expanded OT technique, OT control apparatus 808 interacts with VC region 106, 886, or 906 for impact solely on SF zone 112, 892, or 912 basically the same as apparatus 808 interacts with region 106 for impact on zone 112 in the second basic OT technique. Apparatus 808 provides a PP, AD, or FR general impact tracking signal during at least part of tracking contact time period $\Delta t_{cont}$ extending substantially from when object 104 impacts zone 112, 892, or 912 to when object 104 leaves zone 112, 892, or 912 according to the tracking. The PP, AD, or FR general impact tracking signal, which indicates that object 104 impacted zone 112, 892, or 912, is transmitted via a replacement for path 826A to the PP IDVC portion (138), AD IDVC portion (926), or FR IDVC portion, specifically the PP ID ISCC segment (142), AD ID ISCC segment (928), or FR ID ISCC segment. The PP, AD, or FR IDVC portion responds to largely joint occurrence of the PP, AD, or FR tracking signal and the impact by temporarily appearing as color X, Y, or Z if the impact meets the PP, AD, or FR basic TH impact criteria. When region 106 contains structure besides the PP, AD, or FR ISCC structure (132, 922, or 924), the PP, AD, or FR ISCC segment causes the PP, AD, or FR IVDC portion to temporarily appear as color X, Y, or Z.

Simultaneous impact on SF zones 892 and 112 or/and 912 in IP structures 1150 and 1170 is preferably handled by having the AD IDVC portion respond to largely joint occurrence of the AD general impact tracking signal and the impact by temporarily appearing as color Y if the impact meets the CP basic TH impact criteria for the total OC area 896 and 116 or/and 916 where object 104 impacts zones 892 and 112 or/and 912. The PP IDVC portion temporarily appears as color X if, besides impacting zone 892, object 104 impacts zone 112 while the FR IDVC portion temporarily appears as color Z if object 104 also impacts zone 912. When VC region 106, 886, or 906 contains structure besides the PP, AD, or FR ISCC structure, the AD ID ISCC segment causes the AD IDVC portion to temporarily appear as color Y. The PP or FR ID ISCC segment causes the PP or FR IDVC portion to temporarily appear as color X or Z for impact on zone 112 or 912.

For IP structures 1180 and 1200, the PP, FR, or AD IDVC portion consists of a PP, AD, or FR ID group of cells 404, 1084, or 1104. Each cell 404, 1084, or 1104 in the PP, AD, or FR ID cell group responds to largely joint occurrence of the PP, AD, or FR general impact tracking signal, transmitted along a replacement for path 826A, and object 104 impacting SF zone 112, 892, or 912 by temporarily appearing as color X, Y, or Z if the impact causes that cell 404, 1084, or 1104 to meet the PP, AD, or FR cellular TH impact criteria. When VC region 106, 886, or 906 includes structure besides the PP, AD, or FR ISCC structure, the ISCC part of each cell 404, 1084, or 1104 in the PP, AD, or FR ID cell group causes that cell 404, 1084, or 1104 to temporarily appear as color X, Y, or Z.

In a third expanded OT technique, OT control apparatus 808 interacts with VC region 106, 886, or 906 for impact solely on SF zone 112, 892, or 912 basically the same as apparatus 808 interacts with region 106 for impact on zone 112 in the third basic OT technique. In particular, path 826B is replaced with a trio of COM paths (not shown) respectively extending from regions 106, 886, and 906, specifically the PP, AD, and FR ISCC structures (132, 922, and 924), in OI structure 900 or 1100 to apparatus 808. The three COM paths replacing path 826B in structure 1100 respectively consist of three groups of individual COM paths (not shown in FIGS. 92 and 93) respectively extending from all cells 404, 1084, and 1104, specifically their ISCC parts, to apparatus 808.

The PP IDVC portion (138), AD IDVC portion (926), or FR IDVC portion responds to object 104 impacting SF zone 112, 892, or 912 at OC area 116, 896, or 916 by providing a PP, AD, or FR general LI impact signal if the impact meets the PP, AD, or FR basic TH impact criteria. The PP, AD, or FR general LI impact signal, transmitted via a replacement for path 826B to OT control apparatus 808, identifies an expected location of print area 118, 898, or 918 in zone 112, 892, or 912. When VC region 106, 886, or 906 includes structure besides the PP, AD, or FR ISCC structure (132, 922, or 924), the PP ID ISCC segment (142), AD ID ISCC segment (928), or FR ID ISCC segment provides the PP, AD, or FR LI impact signal. Apparatus 808 estimates where object 104 contacted surface 102 in zone 112, 892, or 912 according to the tracking and provides a PP, AD, or FR general estimation impact signal indicative of the estimated PP, AD, or FR OC area spanning where object 104 is so estimated to have contacted surface 102 provided that the estimate of that contact is at least partly in zone 112, 892, or 912. Apparatus 808 then compares the PP, AD, or FR general LI impact signal to the PP, AD, or FR general estimation impact signal. If the comparison indicates that area 118, 898, and 918 and the PP, AD, or FR estimated OC area at least partly overlap, apparatus 808 provides a PP, AD, or FR general CC initiation signal to the PP, AD, or FR IDVC portion, specifically the PP, AD, or FR ISCC segment, via a replacement for path 826A. The PP, AD, or FR IDVC portion responds to the PP, AD, or FR CC initiation signal by temporarily appearing as color X, Y, or Z. When region 106, 886, or 906 contains structure besides the PP, AD, or FR ISCC structure, the PP, AD, or FR segment causes the PP, AD, or FR IDVC portion to temporarily appear as color X, Y, or Z.

Simultaneous impact on SF zones 892 and 112 or/and 912 in IP structures 1150 and 1170 is preferably handled by having the AD IDVC portion, specifically the AD ID ISCC segment (928), respond to object 104 impacting zones 892 and 112 or/and 912 at OC areas 896 and 116 or/and 916 by providing an AD general LI impact signal if the impact meets the CP basic TH impact criteria for the total area 896 and 116 or/and 916 where object 104 impacts zones 892 and 112 or/and 912. The PP IDVC portion, specifically the PP ID ISCC segment (142), provides a PP general LI impact signal if, besides impacting zone 892, object 104 impacts zone 112, and the FR IDVC portion, specifically the FR ID ISCC segment, provides an FR general LI impact signal if object 104 also impacts zone 912. OT control apparatus 808 then interacts with the PP, AD, and FR IDVC portions the same as it interacts with each PP, AD, or FR IDVC portion for object 104 solely impacting zone 112, 892, or 912.

For IP structures 1180 and 1200, each of multiple cells 404, 1084, or 1104 for which the impact of object 104 on that cell's SF part 406, 1086, or 1106 meets the PP, AD, or FR cellular TH impact criteria becomes part of a first ID group of cells 404, 1084, or 1104 termed the PP, AD, or FR ID expected PA cell group. Cells 404, 1084, or 1104 in the PP, AD, or FR ID expected cell group are PP, AD, or FR TH CM cells. Each cell 404, 1084, or 1104, specifically its ISCC part when VC region 106, 886, or 906 contains structure besides the PP, AD, or FR ISCC structure, in the PP, AD, or FR expected cell group provides a PP, AD, or FR cellular LI impact signal identifying that cell's location in SF zone 112, 892, or 912. The PP, AD, or FR cellular LI impact signal of each cell 404, 1084, or 1104 in the PP, AD, or FR expected PA cell group is provided along a corresponding one of a replacement for path 826B to OT control apparatus 808. SF parts 406,1086, or 1106 of cells 404, 1084, or 1104 in the PP, AD, or FR expected PA cell group form the area expected for print area 118, 898, or 918. The PP, AD, or FR cellular LI impact signals of all cells 404, 1084, or 1104 in the PP, AD, or FR expected PA cell group together form the PP, AD, or FR general LI impact signal.

OT control apparatus 808 estimates where object 104 contacted surface 102 according to the tracked movement of object 104 and provides the PP, AD, or FR general estimation impact signal to determine the estimated PP, AD, or FR OC area here consisting of SF parts 406, 1086, or 1106 of a second ID group of cells 404, 1084, or 1104 termed the PP, AD, or FR estimated-area cell group. For determining whether the estimated PP, AD, or FR OC area at least partly overlaps print area 118, 898, or 918, apparatus 808 determines whether any cell 404, 1084, or 1104 is in both the PP, AD, or FR estimated-area cell group and the PP, AD, or FR expected PA cell group. If so, apparatus 808 provides the PP, AD, or FR general CC initiation signal. Each cell 404, 1084, or 1104 in the PP, AD, or FR expected PA cell group responds to the PP, AD, or FR CC initiation signal, transmitted along a replacement for a path 826A, by temporarily appearing as color X, Y, or Z. When VC region 106, 886, or 906 includes structure besides the PP, AD, or FR ISCC structure, the ISCC part of each cell 404, 1084, or 1104 in the PP, AD, or FR expected PA cell group causes that cell 404, 1084, or 1104 to temporarily appear as color X, Y, or Z.

CC controller 1114 or 1134 alternatively performs all or part of the data processing performed by image-collecting apparatus 808 for IP structure 1170 or 1200 in the three expanded OT techniques essentially the same as CC controller 832 or 852 alternatively performs all or part the data processing performed by apparatus 808 for IP structure 830 or 850 in the three basic OT techniques. Controller 1114/1134 or the combination of controller 1114/1134 and apparatus 808 then functions as an OT control apparatus. Importantly, the three expanded OT techniques enable IP structures 1150, 1170, 1180, and 1200 to distinguish between impacts of object 104 for which color change is desired and impacts of bodies for which color change is not desired essentially the same as in the three basic OT techniques.

Curve Smoothening

The boundaries of SF zones 112, 892, and 912 may be somewhat rough due to SF irregularities and other deviations from ideality. SF boundary portions ideally straight may be significantly crooked. The perimeters of print areas 118, 898, and 918 may likewise be somewhat rough due to irregularities in the shape of object 104 and irregularities along zones 112, 892, and 912. The SF-boundary/PA-perimeter roughness can create difficulty in determining whether area 118, 898, or 918 meets a boundary of zone 112, 892, or 912, especially if area 118, 898, or 918 is close to, e.g., less than 1 or 2 cm from, that boundary.

Figure 94A:
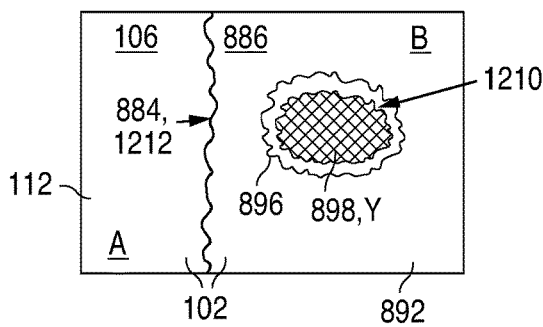
FIGS. 94*a*-94*d* are layout views of four respective examples of the object-contact location and resultant print area for the object variously impacting the surface in the OI structures of FIGS. 5*a* and 5*b*, 78*a* and 78*b*, and 79*a* and 79*b*.
Figure 94B:
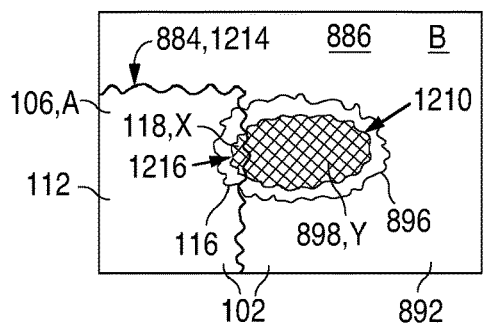

The SF-boundary/PA-perimeter roughness situation is illustrated in FIGS. 94a-94d which present four examples of the boundaries of SF zones 112, 892, and 912 and the perimeters of print areas 118, 898, and 918 for single impacts. In FIG. 94a, area 898 having a perimeter 1210 is near the illustrated portion 1212 of the boundary, formed by an edge of interface 884, between zones 112 and 892. PA perimeter 1210, ideally smoothly curved, and boundary portion 1212, ideally straight, are irregular. Area 898 is seemingly far enough away from portion 1212 that area 898 does not meet portion 1212. In FIG. 94b, area 898 is likewise near the illustrated portion 1214 of the boundary, formed by an edge of interface 884, between zones 112 and 892. Boundary portion 1214, ideally two straight lines meeting at a corner, is irregular. Area 898 is so close to portion 1214 that area 118 having a perimeter 1216, also irregular, may be present in zone 112 as an extension of area 898.

Figure 94C:
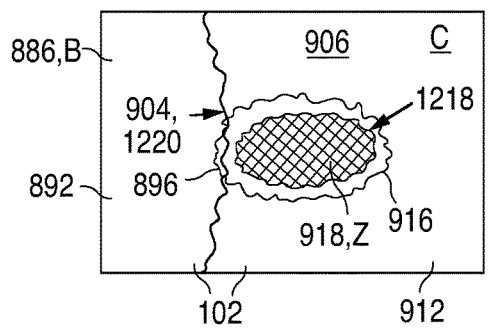
Figure 94D:
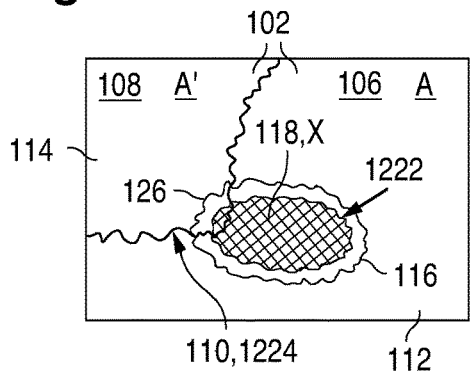

Turning to FIG. 94c, print area 918 having a perimeter 1218 is near the illustrated portion 1220 of the boundary, formed by an edge of interface 904, between SF zones 892 and 912. PA perimeter 1218 and boundary portion 1220, ideally smoothly curved, are irregular. It is unclear whether area 918 meets portion 1220 so that area 918 has extension 898 in zone 892. In FIG. 94d, print area 118 having a perimeter 1222 is near the illustrated portion 1224 of the boundary, formed by an edge of interface 110, between SF zones 112 and 114. PA perimeter 1222 and boundary portion 1224, respectively ideally straight and smoothly curved lines meeting at a corner, are irregular. It is unclear whether area 118 meets portion 1224.

Considerable clarity as to whether print area 118, 898, or 918 meets a boundary of SF zone 112, 892, or 912, especially when PA perimeter 1210, 1218, or 1222 is irregular or/and the boundary is irregular near area 118, 898, or 918, is achieved by providing an IP structure employing three-VC-region OI structure 900 or 1100, including any of its embodiments, with an approximation capability in which the perimeters of areas 118, 898, and 918 and adjacent portions of the boundaries of zones 112, 892, and 912 are approximated as smooth curves. Examples of the smooth-curve approximations are illustrated in FIGS. 95a-95d respectively corresponding to FIGS. 94a-94d. Each item identified in FIG. 95a-95c or 95d with a reference symbol consisting of a number followed by an asterisk is an approximation to an item identified by a reference symbol formed with the same number in corresponding FIG. 94a-94c or 94d.

The approximation capability, usually incorporated into IG controller 1154 or 1184 and performed with averaging software, entails first determining portion 1212, 1214, 1220, or 1224 of the boundary where print area 118, 898, or 918 is nearest the boundary. At least that boundary portion 1212, 1214, 1220, or 1224 is approximated as a smooth boundary vicinity curve 1212*, 1214*, 1220*, or 1224* potentially having one or more sharp corners (as occurs in FIG. 95b or 95d). PA perimeter 1210, 1218, or 1222, or a portion nearest the boundary, is similarly approximated as a smooth perimeter vicinity curve 1210*, 1218*, or 1222*. Each pair of boundary and perimeter vicinity curves are compared to determine if they meet or overlap. An indication of the comparison is provided as output information.

The comparison indication preferably includes having the apparatus, e.g., controller 1154 or 1184, performing the comparison provide screen 810 with the data for a curve-approximation image containing the two vicinity curves. Screen 810 then presents the curve-approximation image typically as a direct replacement for the PAV image. That is, the curve-approximation image typically appears in the same location on screen 810 as the PAV image which disappears when the curve-approximation image appears. Alternatively, screen 810 simultaneously presents both the curve-approximation image and the PAV image at screen locations close to each other so that observers can visually compare the images.

The comparison indication, including the curve-approximation image, for both the image-replacement situation and the simultaneous-image situation can be made available whenever a PAV image is automatically generated or whenever a PAV image is generated in response to instruction 822. Inasmuch as a PAV image is automatically generated when the unsmoothened version of print area 118, 898, or 918 meets the distance condition that a point in area 118, 898, or 918 be less than or equal to a selected distance away from a selected location on surface 102 provided that the PP, AD, or FR basic TH impact criteria are met, area 118, 898, or 918 in the curve-approximation image may not meet this distance condition due to the image smoothening. The same applies to areas 898 and 118 or/and 918 if object 104 simultaneously impacts SF zones 892 and 112 or 912 sufficient to meet the CP basic TH impact criteria.

Figure 95A:
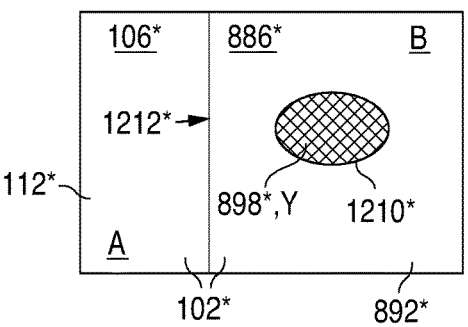
FIGS. 95*a*-95*d* are screen views of smooth-curve approximations, according to the invention, of the print area and nearby surface area respectively for the examples of FIGS. 94*a*-94*d*.
Figure 95B:
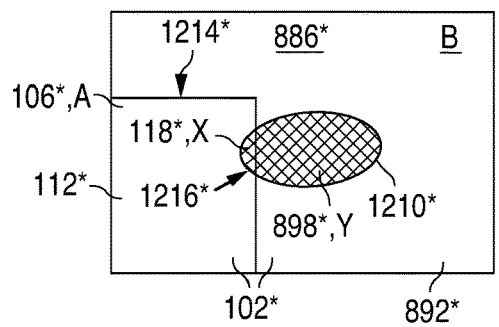
Figure 95C:
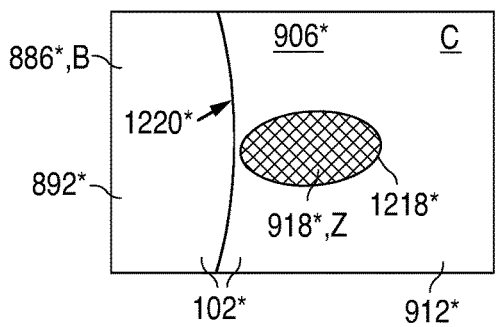
Figure 95D:
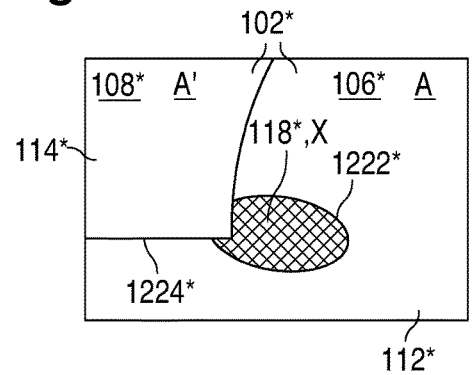

Each of FIGS. 95a-95d is exemplary of the curve-approximation image. FIG. 95a confirms that print area 898 does not meet boundary portion 1212 in the illustrated example. FIGS. 95b and 95d indicate that print areas 898 and 118 reasonably respectively meet boundary portions 1214 and 1224 in those examples. FIG. 95c indicates that print area 918 does not meet boundary portion 1220 in that example.

Controller 1154 or 1184 provides the approximation capability in response to the PP, AD, or/and FR general or cellular LI impact signals. The approximation capability can be provided for single-VC-region OI structure 100 or 400, including any of its embodiments, subject to limiting the scope to VC SF zone 112 and adjoining surface such as that of FC SF zone 114. The capability is then usually incorporated into controller 806 or 846 responding to the PP general or cellular LI impact signal. The approximation capability can be provided for double-VC-region OI structure 880 or 1080 subject to limiting the scope to VC SF zones 112 and 892 and adjoining surface such as that of FC SF zones 114 and 894. If so, the capability is incorporated into an IG controller similar to controller 1154 or 1184 but only responding to the PP or/and AD general or cellular LI impact signals for providing control directed to structure 880 or 1080.

Color Change Dependent on Location in Variable-color Region of Single Normal Color IP structure 700, 750, 830, or 850 can provide a capability for the IDVC portion (138) of VC region 106 to appear as a selected one of multiple changed colors dependent on the location of print area 118 in SF zone 112. The IDVC portion, specifically the ID ISCC segment (142), in a rudimentary general embodiment of structure 700 having this location-dependent CC capability responds to object 104 impacting OC area 116 by providing a principal general LI impact signal, instead of a CI impact signal, if the impact meets the principal basic TH impact criteria. The general LI impact signal again identifies an expected location of area 118 in zone 112. Area 118 meets (or satisfies) one of p mutually exclusive location criteria $LJ_1$, $LJ_2$, ... $LJ_p$ for the location of area 118 in zone 112, p being an integer greater than 1. Location criteria $LJ_1$-$LJ_m$ encompass all of zone 112 and respectively correspond to p specific changed colors $XJ_1$, $XJ_2$, ... $XJ_p$ which embody changed color X and which all materially differ from principal color A. More than one, usually all, of specific changed colors $XJ_1$-$XJ_p$ differ.

Intelligent controller 702 responds to the general LI impact signal by determining which location criterion $LJ_i$ is satisfied by print area 118 and then providing a principal general CC initiation signal at a condition corresponding to that location criterion $LJ_i$ where i here is an integer varying from 1 to p. The IDVC portion (138) responds to the initiation signal by temporarily appearing along area 118 as specific changed color $XJ_i$ for that location criterion $LJ_i$. When VC region 106 contains structure besides the ISCC structure (132), the ID ISCC segment (142) specifically causes the IDVC portion to temporarily appear as color $XJ_i$. Since SF zone 112 normally appears as color A, the location-dependent CC capability enables area 118 to appear as one of two or more changed colors $XJ_1$-$XJ_p$ depending on where object 104 impacts zone 112.

The IDVC portion (138), specifically the ID ISCC segment (142), in an advanced general embodiment of IP structure 700 having the location-dependent CC capability responds to object 104 impacting OC area 116 by providing a principal general CI impact signal if the impact meets the principal basic TH impact criteria. The general CI impact signal identifies principal general impact characteristics consisting of the location expected for print area 118 in SF zone 112 and principal general supplemental impact information, described above, for the impact. Responsive to the impact signal, controller 702 determines whether the general supplemental impact information meets the principal supplemental impact criteria and, if so, determines which location criterion $LJ_i$ is met by area 118 and provides a principal general CC initiation signal at a condition corresponding to that location criterion $LJ_i$. The IDVC portion responds to the initiation signal, if provided, by temporarily appearing as specific changed color $XJ_i$ for that location criterion $LJ_i$. When VC region 106 includes structure besides the ISCC structure (132), the ISCC segment specifically causes the IDVC portion to temporarily appear as color $XJ_i$. The combination of the location-dependent CC capability and the supplemental assessment capability achieved with the supplemental impact criteria enables controller 702 to distinguish between impacts of object 104 for which color change is desired and impacts of other bodies for which color change is not desired and thereby to cause color change only at area 118 as one of two or more changed colors $XJ_1$-$XJ_p$ depending on where object 104 impacted zone 112.

The location-dependent CC capability is the same in IP structure 830 with CC controller 832 implemented as an intelligent controller functioning the same as controller 702 in both rudimentary and advanced general embodiments respectively corresponding to the rudimentary and advanced general embodiments of IP structure 700. The location-dependent CC capability is also the same in cell-containing IP structures 750 and 850 subject to addition of the cell-related operational details and, for structure 850, implementing CC controller 852 as an intelligent controller functioning the same as controller 752 in both rudimentary and advanced cell-containing embodiments corresponding to the rudimentary and advanced general embodiments of structure 700.

Each cell 404 in the rudimentary cell-containing embodiment specifically provides a principal cellular LI impact signal if the impact causes that cell 404 to meet principal cellular TH impact criteria and temporarily become a TH CM cell. The cellular LI impact signal identifies where SF part 406 of that TH CM cell 404 is located in SF zone 112. Controller 752 or the intelligent implementation of controller 852 responds to the cellular impact signal of each TH CM cell 404 by providing it with a principal cellular CC initiation signal that causes it to temporarily become a full CM cell and temporarily appear along its part 406 of zone 112 as changed color $XJ_i$ for location criterion $LJ_i$ met by print area 118. In the advanced cell-containing embodiment, each cell 404 provides a principal cellular CI impact signal if the impact causes that cell 404 to meet the principal cellular TH impact criteria and temporarily become a TH CM cell. The cellular impact signal identifies the above-described principal cellular supplemental impact information for the object impacting OC area 116 as experienced at that TH CM cell 404. Responsive to the cellular impact signal of each TH CM cell 404, controller 752 or the intelligent implementation of controller 852 combines the cellular supplemental impact information of that TH CM cell 404 and any other TH CM cell 404 to form the principal general supplemental impact information, determines whether the general supplemental impact information meets the supplemental impact criteria, and, if so, provides a principal cellular CC initiation signal for causing that TH CM cell 404 causes to temporarily become a full CM cell and temporarily appear along its part 406 of zone 112 as color $XJ_i$ for criterion $LJ_i$ met by area 118.

VC region 106 preferably includes components 182 and 184 typically implemented as in OI structure 200. ID segment 192 of IS component 182 provides the LI or CI impact signal in response to the impact if it meets the basic TH impact criteria. ID segment 194 of CC component 184 responds to the initiation signal (if provided) by causing the IDVC portion (138) to temporarily appear as specific changed color $XJ_i$ for location criterion $LJ_i$. met by print area 118.

SF zone 112 has a perimeter. In one implementation of the location-dependent CC capability where integer p is 2, the location criteria consist of (i) first criterion $LJ_1$ that print area 118 adjoin the perimeter and (ii) second criterion $LJ_2$ that area 118 be entirely inside zone 112. Changed color X is (i) first changed color $XJ_1$ if area 118 adjoins the perimeter and (ii) second changed color $XJ_2$ different from color $XJ_1$ if area 118 is entirely inside zone 112. In another implementation of the location-dependent CC capability where p is again 2, the perimeter consists of multiple perimeter segments. The location criteria include (i) first criterion $LJ_1$ that area 118 adjoin a specified one of the perimeter segments and (ii) second criterion $LJ_2$ that area 118 be spaced apart from the specified perimeter segment. Color X is (i) changed color $XJ_1$ if area 118 adjoins the specified perimeter segment and (ii) changed color $XJ_2$ again different from color $XJ_1$ if area 118 is spaced apart from the specified perimeter segment. These two implementations sometimes achieve the same result.

IP structures 1110, 1130, 1170, and 1200 can each provide a capability for the AD IDVC portion (926) or FR IDVC portion of VC region 886 or 906 to appear as a selected one of multiple altered or modified colors dependent on the location of print area 898 or 918 in SF zone 892 or 912 besides enabling the PP IDVC portion (138) of VC region 106 to appear as a selected one of multiple changed colors dependent on the location of print area 118 in SF zone 112.

The location-dependent CC capability in general rudimentary and advanced embodiments for the AD or FR IDVC portion is performed the same as the general rudimentary and advanced embodiments for the PP IDVC portion subject to q specific altered colors $YK_1$, $YK_2$, ... $YK_q$ which embody altered color Y and materially differ from color B or r specific changed colors $ZL_1$, $ZL_2$, ... $ZL_r$ which embody modified color Z and materially differ from color C where q or r is an integer greater than 1 replacing changed colors $XJ_1$-$XJ_p$, q or r replacing p, q mutually exclusive location criteria $LK_1$, $LK_2$, ... $LK_q$ or r mutually exclusive location criteria $LL_1$, $LL_2$, ... $LL_r$ replacing location criteria $LJ_1$-$LJ_p$, and color $YK_i$ or $ZL_i$ replacing color $XJ_i$ where integer i varies from 1 to q or r for color $YK_i$ or $ZL_i$.

Recitations of VC region 886 or 906, SF zone 892 or 912, color B or C, the AD or FR IDVC portion, the AD or FR ISCC structure, the AD or FR ID ISCC segment, OC area 896 or 916, print area 898 or 918, an AD or FR general LI impact signal, the AD or FR basic TH impact criteria, an AD or FR general CC initiation signal, an AD or FR general CI impact signal, the AD or FR supplemental impact information, the AD or FR supplemental impact criteria, the AD or FR IS component including its AD or FR ID segment, and the AD or FR CC component including its AD or FR ID segment also respectively replace the preceding recitations of VC region 106, SF zone 112, color A, the PP IDVC portion, the PP ISCC structure, the PP ID ISCC segment, OC area 116, print area 118, the PP general LI impact signal, the PP basic TH criteria, the PP general CC initiation signal, the PP general CI impact signal, the PP supplemental impact information, the PP supplemental impact criteria, the PP IS component including its PP ID segment, and the PP CC component including its PP ID segment in the preceding description. In rudimentary and advanced cell-containing embodiments, recitations of cells 1084 or 1104, an AD or FR cellular impact signal, AD or FR cellular supplemental impact information, and an AD or FR cellular initiation signal additionally respectively replace the preceding recitations of cells 404, the PP cellular impact signal, the PP cellular supplemental impact information, and the PP cellular initiation signal. The preceding implementations of the location-dependent CC capabilities for which p is 2 extend to implementations in which q or r is 2 for each region 886 or 906 in each of IP structures 1110, 1130, 1170, and 1200.

In an example of the second implementation of the location-dependent CC capability for which p is 2 in IP structure 1110, 1130, 1170, or 1200, the specified segment of the perimeter of SF zone 112 is the edge of interface 884 where SF zones 112 and 892 meet along surface 102. By arranging for changed color X to be (i) first changed color $XJ_1$ if print area 118 adjoins this interface edge and (ii) second changed color $XJ_2$ if area 118 is spaced apart from this interface edge, it can readily be determined whether object 104 impacted zone 112 at a location adjoining zone 892 or at a location spaced apart from zone 892 by simply looking at changed color X of area 118. In particular, color X is (i) color $XJ_1$ if area 118 adjoins zone 892 and (ii) color $XJ_2$ if area 118 is spaced apart from zone 892.

The preceding example can be reversed by setting q at 2 and arranging for altered color Y to be (i) first altered color $YK_1$ if print area 898 adjoins the preceding interface edge and (ii) second altered color $YK_2$ different from color $YK_1$ if area 898 is spaced apart from that interface edge. It can then readily be determined whether object 104 impacted SF zone 892 at a location adjoining SF zone 112 or at a location spaced apart from zone 112 by simply looking at altered color Y of area 898. That is, color Y is (i) color $YK_1$ if area 898 adjoins zone 112 and (ii) color $YK_2$ if area 898 is spaced apart from zone 112. The second implementation of the location-dependent CC capability for which p or r is 2 can similarly be applied to the edge of interface 890 where SF zones 892 and 912 meet so that color Y is (i) color $YK_1$ if area 898 adjoins zone 912 and (ii) color $YK_2$ if area 898 is spaced apart from zone 912 or modified color Z is (i) first modified color $ZL_1$ if print area 918 adjoins zone 892 and (ii) second modified color $ZL_2$ different from color $ZL_1$ if area 918 is spaced apart from zone 892. These examples for p, q, or r being 2 are very helpful in making various determinations in sports as described below for FIGS. 96-101.

Controller 702 or 752 typically uses an electronic map of SF zone 112, including the location of the SF edge of interface 110 and each other part of the boundary of zone 112, to determine which location criterion $LJ_i$ is satisfied by print area 118. The same applies to controller 832 or 852 when it operates as an intelligent controller functioning the same as controller 702 or 752. Controller 1114/1134 likewise typically uses an electronic map of SF zones 112, 892, and 912, including the locations of the SF edges of interfaces 110, 884, 904, and 910 and each other part of the boundaries of zones 112, 892, and 912 to determine which location criterion $LJ_i$, $LK_i$, or $LL_i$ is satisfied by print area 118, 898, or 918.

The signals provided from and to OI structure 900 or 1100 via networks 1116, 1118, 1120, 1122, 1124, 1126, 1156, 1158, and 1160 or 1136, 1138, 1140, 1142, 1144, 1146, 1186, 1188, and 1190 in IP structures 1150 and 1170 or 1180 and 1200 may leave and enter OI structure 900 or 1100 via wires along its sides or/and along substructure 134. Any of those wires leaving structure 900 or 1100 along its sides extend into adjoining material of one or more of FC regions 108, 888, and 908, into any other regions adjoining the sides of structure 900 or 1100, or/and into open space. Part of the signal processing performed on the signals provided from structure 900 or 1100 via networks 1116, 1118, 1120, 1156, 1158, and 1160 or 1136, 1138, 1140, 1186, 1188, and 1190 to produce the signals provided to structure 900 or 1100 via networks 1122, 1124, and 1126 or 1142, 1144, and 1146 may be physically performed in structure 900 or 1100, e.g., in FA layer 206 when VC region 106 is embodied as in any of OI structures 200, 270, and 300 or 460, 480, and 500 and in FA layer 946 when VC region 886 of structure 900 is embodied as in any of OI structures 930, 980, and 1010. Controllers 1114 and 1154 or 1134 and 1184 may thus partially merge into structure 900 or 1100.

Sound Generation

Each IP structure 600, 650, 700, 750, 830, or 850 optionally has sound-generating apparatus, usually provided by CC controller 602, 652, 702, 752, 832, or 852, for generating a specified audible sound indicating that object 104 has impacted SF zone 112 to produce print area 118. The specified sound which is separate from any audible sound originating at OC area 116 due physically to object 104 impacting area 116, i.e., due to sound waves generated by the impact, sound is usually indicative of the meaning for the appearance, including potentially changed color X, of print area 118. Responsive to the PP general LI impact signal, the PP cellular LI impact signals, the PP general CI impact signal if the PP supplemental impact criteria are met, and the PP cellular CI impact signals if the PP supplemental impact criteria are met, structures 600, 650, 700, and 750 respectively generate the specified sound substantially immediately after object 104 has left zone 112. Structure 830 or 850 does the same in response to the PP general LI impact signal or the PP cellular LI impact signals for controller 832 or 852 implementing duration controller 602 or 652 and in response to the PP general CI impact signal or the PP cellular CI impact signals if the PP supplemental impact criteria are met for controller 832 or 852 implementing intelligent controller 702 or 752. Controllers 602, 652, 702, 752, 832, and 852 each provide a capability for a person to directly or remotely adjust (increase or decrease) the volume (nominal amplitude) of the sound.

Each of IP structures 600, 650, 700, 750, 830, and 850 selectively generates the specified sound, or substantially no audible sound, if the PP basic TH or supplemental impact criteria consist of multiple sets of different PP basic TH or supplemental impact criteria respectively associated with different specific changed colors materially different from PP color A as described above. In that case, the sets of PP basic TH or supplemental impact criteria are respectively associated with multiple sound candidates. Each sound candidate consists of either substantially no audible sound or a selected audible sound different from at least one other selected audible sound. All the sound candidates usually differ.

If only one set of the PP basic TH or supplemental impact criteria can be met for an impact, each of IP structures 600 and 650 or 700 and 750 generates the specified sound as the sound candidate for the PP TH or supplemental impact criteria set met by the impact, IP structure 830 does the same for CC controller 832 implementing duration controller 652 or intelligent controller 752, and IP structure 850 does the same for CC controller 852 implementing controller 652 or 752. If more than one set of the PP basic TH or supplemental impact criteria can potentially be met for an impact, the sets of PP TH or supplemental impact criteria have respective PP basic TH or supplemental sound priorities. Each of structures 600 and 650 or 700 and 750 then generates the specified sound as the sound candidate for the PP TH or supplemental criteria of the highest PP TH or supplemental sound priority met by the impact. With the sets of PP TH or supplemental impact criteria having respective PP TH or supplemental sound priorities if more than one set of the PP TH or supplemental criteria can potentially be met for an impact, structure 830 does the same for controller 832 implementing controller 602 or 702, and structure 850 does the same for controller 852 implementing controller 652 or 752.

IP structure 600, 650, 700, 750, 830, or 850 may not generate the specified sound when certain circumstances arise despite the above-described requirements for generating the sound having been met. This situation typically occurs when structure 600, 650, 700, 750, 830, or 850 is part of a larger IP structure having multiple VC regions akin to VC region 106 and when object 104 simultaneously impacts two or more selected ones of those VC regions. The larger IP structure then generates either substantially no audible sound or a selected audible sound different from each audible sound generatable by structure 600, 650, 700, 750, 830, or 850.

Each IP structure 800, 830, 840, or 850 optionally has sound-generating apparatus for generating such a specified audible sound if the above-described object-tracking indicates that object 104 is almost certainly going to impact SF zone 112. For structure 800 or 840, the sound-generating apparatus is incorporated into IG controller 806 or 846, incorporated into image-collecting apparatus 808, or provided by a separate apparatus (not shown). The same applies to structure 830 or 850 except that the sound-generating apparatus can also be incorporated into CC controller 832 or 852.

Each of IP structures 1110 and 1170 or 1130 and 1200 has optional sound-generating apparatus, typically provided by CC controller 1114 or 1134, for generating a specified audible sound indicating that object 104 has impacted one or more of SF zones 112, 892, and 912 to produce one or more of print areas 118, 898, and 918. The specified sound is separate from any audible sound originating at one or more of OC areas 116, 896, and 916 due physically to object 104 impacting one or more of areas 116, 896, and 916. Generation of the specified sound may depend on which of zones 112, 892, and 912 is/are impacted by object 104, e.g., the sound (a) is generated if object 104 solely impacts a specified one, or either of a specified two, of zones 112, 892, and 912 to produce the corresponding one of areas 118, 898, and 918, (b) is not generated if object 104 solely impacts either of the remaining two, or the remaining one, of zones 112, 892, and 912 to produce the corresponding one of areas 118, 898, and 918, and (c) selectively is, or is not, generated if object 104 simultaneously impacts at least one of the specified one or two of zones 112, 892, and 912 to produce the corresponding one or two of areas 118, 898, and 918 and at least one of the remaining two or one of zones 112, 912, and 912 to produce the corresponding two or one of areas 118, 898, and 918. In an example, the sound is generated if object 104 solely impacts zone 112 to produce area 118 but is not generated if object 104 solely impacts zone 892 or 912 to produce area 898 or 918 or simultaneously impacts any two or three of zones 112, 892, and 912 to produce the corresponding two or three of zones 118, 898, and 918 and vice versa. Zones 112 and 912 are inverted, accompanied by inverting areas 118 and 918, to produce a complementary example.

When generated for an impact solely on SF zone 112, 892, or 912 to produce print area 118, 898, or 918, the specified sound is usually indicative of the meaning for the appearance, including potentially color X, Y, or Z, of area 118, 898, or 918 and thus may differ depending on which of zones 112, 892, and 912 is impacted by object 104. For an impact simultaneously on zones 892 and 112 or/and 912 to produce areas 898 and 118 or/and 918 and cause the sound to be generated, the sound is similarly usually indicative of the meaning for the appearance, including potentially colors Y and X or/and Z, of areas 898 and 118 or/and 918 and may differ depending on which two or more of zones 112, 892, and 912 are impacted by object 104. Insofar as zones 112 and 892 or/and 912 are so impacted and the sound is generated, the sound may be the same as, or differ significantly from, the sound generated due to an impact solely on zone 112, 892, or 912.

Responsive to the AD and PP or/and FR general or cellular LI impact signals if the AD and PP or/and FR basic TH impact criteria are met for CC controller 1114 or 1134 implementing a controller analogous to duration controller 602 or 652 and responsive to the AD and PP or/and FR general or cellular CI impact signals if the AD and PP or/and FR supplemental impact criteria are met, or the CP supplemental impact criteria are met in the event that object 104 simultaneously impacts SF zones 892 and 112 or/and 912, for controller 1114 or 1134 implementing a controller analogous to intelligent controller 702 or 752, each of IP structures 1110 and 1170 or 1130 and 1200 ordinarily generates the specified sound substantially immediately after object 104 has left surface 102. Structures 1110, 1130, 1170, and 1200 each provide a capability for a person to directly or remotely adjust the sound's volume. If the sound differs depending on which of zones 112, 892, and 912 is/are impacted by object 104, the volume of each different sound preferably can be separately so adjusted.

If the PP, AD, or FR basic TH impact criteria consist of multiple sets of different PP, AD, or FR basic TH impact criteria respectively associated with different specific changed, altered, or modified colors materially different from PP color A, AD color B, or FR color C, the specified sound can be selectively generated, or not generated, for impact solely on SF zone 112, 892, or 912 to produce print area 118, 898, or 918 depending on which set of PP, AD, or FR basic TH impact criteria is met. The same applies to the PP, AD, or FR cellular TH impact criteria. Should the CP basic TH impact criteria consist of multiple sets of different CP basic TH impact criteria respectively associated with different specific altered colors materially different from AD color B and different specific changed colors materially different from PP color A or/and different specific modified colors materially different from FR color C, the sound can be selectively generated, or not generated, for impact simultaneously on zones 892 and 112 or/and 912 to produce areas 898 and 118 or/and 918 depending on which set of CP basic TH impact criteria is met.

Each IP structure 1150, 1170, 1180, or 1200 optionally has sound-generating apparatus for generating such a specified sound if the above-described object-tracking indicates that object 104 is almost certainly going to impact one or more of SF zones 112, 892, and 912. For structure 1150 or 1180, the sound-generating apparatus is incorporated into IG controller 1154 or 1184, incorporated into image-collecting apparatus 808, or provided by a separate apparatus (not shown). The same applies to structure 1170 or 1200 except that the sound-generating apparatus can also be incorporated into CC controller 1114 or 1134.

Accommodation of Color Vision Deficiency

The invention's CC capability can readily accommodate the large majority of persons with color vision deficiency, commonly termed color blindness, in which the ability to perceive color differences is reduced. Color vision deficiency arises much more in men, reportedly present in 8% of men, than in women, reportedly present in 0.5% of women. Color vision deficiency usually occurs due to one or more of the three types of optical cones either operating improperly or being absent (including nonfunctioning). There are three basic types of color vision deficiency, namely monochromacy, dichromacy, and anomalous trichromacy.

Monochromacy, quite rare, arises when two of the three types of cone pigments, commonly termed blue, green, and red, are missing. Monochromacy also arises when all three cone pigments are missing so that only the rods provide a vision function. Vision is essentially reduced to black, white, and shades of gray.

Dichromacy, divided into protanopia, deuteranopia, and tritanopia, arises when one of the three types of cone pigments is missing. Protanopia, reportedly present in 1% of men, is caused by the absence of red cones. Persons with protanopia have great difficulty in distinguishing between red and green. The usual brightness of red, orange, and yellow is much reduced. Violet, lavender, and purple are indistinguishable from various shades of blue because their reddish components are strongly dimmed. Deuteranopia, reportedly present in 1% of men, is caused by the absence of green cones. Persons with deuteranopia have great difficulty in distinguishing between red and green but without the dimming of protanopia. Tritanopia, very rare, is caused by the absence of blue cones. Blue colors appear greenish while yellow and orange colors appear pinkish.

Anomalous trichromacy, divided into protanomaly, deuteranomaly, and tritanomaly, arises when one of the three cone pigments is altered in spectral sensitivity. Protanomaly, reportedly present in 1% of men, is caused by shifting of the spectral sensitivity of the red cones toward green. Red, orange, and yellow appear somewhat shifted toward green and are somewhat dimmed. Deuteranomaly, reportedly present in 5% of men and thus the prevalent type of color vision deficiency, is caused by shifting of the spectral sensitivity of the green cones toward red. A deuteranomalous person has some difficulty in distinguishing between red, orange, yellow, and green but without the dimming of protanomaly. Tritanomaly, very rare, is caused by shifting of the spectral sensitivity of the blue cones toward green. Blues appear greenish while yellows and oranges appear pinkish.

Persons with color vision deficiency generally seem capable of clearly distinguishing sufficiently dark colors from sufficiently light colors even though they cannot distinguish the hues of certain colors from those of certain other colors. The invention take advantage of this to provide implementations of OI structure 100 and its embodiments, extensions, and variations, including OI structures 130, 180, 200, 240, 260, 270, 280, 300, 320, 330, 340, 350, 400, 410, 420, 430, 440, 450, 460, 470, 480, 490, 500, 880, 882, 900, 902, 920, 930, 960, 980, 990, 1010, 1080, 1082, 1100, and 1102 and their embodiments, extensions, and variations, in which the colors in at least one, regularly at least two, and often all three of the following three pairs of colors, to the extent present (in these implementations), differ materially as generally viewed by persons having dichromacy, anomalous trichromacy, or monochromacy: PP color A and changed color X, AD color B and altered color Y, and FR color C and modified color Z. Similarly, the colors in at least one, regularly at least two, and often three or more of the following six additional pairs of colors, to the extent present, usually differ materially as generally viewed by persons having dichromacy, anomalous trichromacy, or monochromacy: colors A and B, colors B and C, colors X and Y, colors Y and Z, colors A and Z, and colors C and X.

In particular, the colors in at least one, regularly at least two, and often all three of color pairs A and X, B and Y, and C and Z, to the extent present, differ materially in lightness L* in CIE L*a*b* color space. The difference in lightness L* between the colors in at least one, regularly at least two, and often all of color pairs A and X, B and Y, and C and Z, is usually at least 60, preferably at least 70, more preferably at least 80, sometimes at least 90. Similarly, the colors in at least one, regularly at least two, and often three or more of the six additional color pairs A and B, B and C, X and Y, Y and Z, A and Z, and C and X, to the extent present, usually differ materially in lightness L*. The difference in lightness L* between the colors in at least one, regularly at least two, and often three or more of color pairs A and B, B and C, X and Y, Y and Z, A and Z, and C and X is likewise usually at least 60, preferably at least 70, more preferably at least 80, sometimes at least 90.

One of each color pair A and X, B and Y, or C and Z is a light color while the other of that color pair is a dark color compared to the light color. In order to achieve the preceding L* difference between colors A and B when VC regions 106 and 886 are both present, a selected one of colors A and B is a light color while the remaining one of colors A and B is a dark color compared to the light color. If colors A and B respectively are light and dark colors, colors X and Y respectively are dark and light colors, and vice versa. In order to achieve the preceding L* differences among colors A, B, and C when VC regions 106, 886, and 906 are all present, color A, B, and C alternate between being light colors and dark colors respectively compared to the light colors. That is, if color A is a light color, color B is a dark color while color C is a light color and vice versa. If colors A, B, and C respectively are light, dark, and light colors, colors X, Y, and Z respectively are dark, light, and dark colors and vice versa.

The preceding selections of colors with VC regions 106 and 886 or VC regions 106, 886, and 906 present are expected to fully accommodate almost any person having a standard type of dichromacy, anomalous trichromacy, or monochromacy. Nonetheless, it may sometimes be sufficient to only partly accommodate color vision deficiency, especially since monochromacy and some types of dichromacy and anomalous trichromacy are rare. In an exemplary implementation having regions 106 and 886, the L* difference between the colors in each color pair A and B or A and X is at least 60 but the L* difference between colors B and Y is less than 60. In an exemplary implementation having regions 106, 886, and 906, the L* difference between the colors in each color pair A and B, A and X, or B and C is at least 60 but the L* difference between colors B and Y is less than 60. In another exemplary implementation having regions 106, 886, and 906, the L* difference between the colors in each color pair A and B, B and C, or B and Y is at least 60 but the L* difference between colors A and X is less than 60. The L* difference between colors C and Z in each of the last two implementations may be less than, or at least, 60.

Another way of partly accommodating color vision deficiency when the colors in at least one, regularly at least two, and often all of color pairs A and X, B and Y, and C and Z, to the extent present, differ materially as perceived by the standard human eye/brain is to basically restrict a selected one of each pair of colors A and X, B and Y, and C and Z from being any color from green to red in the visible spectrum or any color having a non-insignificant component of any color from green to red in the visible spectrum. Since the lower limit of the green wavelength range is approximately 490 nm and since the red wavelength range is at greater wavelength than the green wavelength range, this basic restriction devolves to restricting the selected one of each pair of colors A and X, B and Y, and C and Z from being any color having a wavelength of approximately 490 nm or more or any color having a non-insignificant component at a wavelength of approximately 490 nm or more. The basic restriction essentially limits the selected one of each of these three pairs of colors to being violet, blue, or shades of violet or blue.

The remaining one of each pair of colors A and X, B and Y, and C and Z is not so restricted. By so choosing colors A, B, C, X, Y, and Z to the extent present, persons with the general red-green color vision deficiencies of protanomaly, deuteranomaly, protanopia, and deuteranopia are generally expected to be readily able to rapidly distinguish between colors A and X, between colors B and Y, and between colors C and Z even though those persons may not recognize certain of colors A, B, C, X, Y, and Z as perceived by the standard human eye/brain. Since persons with protanomaly, deuteranomaly, protanopia, and deuteranopia constitute the vast majority of people with color vision deficiency, the selection of colors A, B, C, X, Y, and Z in this basic restriction is expected to accommodate the vast majority of color vision deficient persons.

In an exemplary implementation of the preceding way of partly accommodating color vision deficiency when VC regions 106 and 886 are present and when colors A and B differ materially as perceived by the standard human eye/brain, the basic restriction of not being any color from green to red in the visible spectrum or any color having a non-insignificant component of any color from green to red in the visible spectrum is placed either on colors A and Y or on colors X and B. If VC region 906 is also present with colors B and C differing materially as perceived by the standard human eye/brain, the basic restriction of not being any color from green to red in the visible spectrum or any color having a non-insignificant component of any color from green to red in the visible spectrum is placed either on colors A, Y, and C or on colors X, B, and Z.

The preceding way of partly accommodating color vision deficiency is extended to persons with tritanomaly and tritanopia by additionally restricting the remaining one of each pair of colors A and X, B and Y, and C and Z from being any color from violet to yellow in the visible spectrum or any color having a non-insignificant component of any color from violet to yellow in the visible spectrum. Since the upper limit of the yellow wavelength range is approximately 590 nm and since the violet wavelength range is at lower wavelength than the yellow wavelength range, this additional restriction devolves to restricting the selected one of each pair of colors A and X, B and Y, and C and Z from being any color having a wavelength of approximately 590 nm or less or any color having a non-insignificant component at a wavelength of approximately 590 nm or less. The additional restriction effectively limits the remaining one of each of these three pairs of colors to being orange, red, or shades of orange or red. By so choosing the remaining one of each pair of colors A and X, B and Y, and C and Z, persons with the general blue-yellow color vision deficiencies of tritanomaly and tritanopia, are generally expected to be readily able to rapidly distinguish between colors A and X, between colors B and Y, and between colors C and Z even though those persons may not recognize certain of colors A, B, C, X, Y, and Z as perceived by the standard human eye/brain.

In an exemplary implementation of the preceding way of additionally partly accommodating color vision deficiency when VC regions 106 and 886 are present and when colors A and B differ materially as perceived by the standard human eye/brain, the basic restriction of not being any color from green to red in the visible spectrum or any color having a non-insignificant component of any color from green to red in the visible spectrum is again placed either on colors A and Y or on colors X and B. The additional restriction of not being any color from violet to yellow in the visible spectrum or any color having a non-insignificant component of any color from violet to yellow in the visible spectrum is placed on colors X and B if the basic restriction is placed on colors A and Y and vice versa. If VC region 906 is also present with colors B and C differing materially as perceived by the standard human eye/brain, the basic restriction of not being any color from green to red in the visible spectrum or any color having a non-insignificant component of any color from green to red in the visible spectrum is again placed either on colors A, Y, and C or on colors X, B, and Z. The additional restriction of not being any color from violet to yellow in the visible spectrum or any color having a non-insignificant component of any color from violet to yellow in the visible spectrum is placed on colors X, B, and Z if the basic restriction is placed on colors A, Y, and C and vice versa.

Tennis Implementations

Many sports, such as tennis, employ sports-playing structures having finite-width lines which define penalty/reward decisions or/and result in temporary play stoppage depending on whether an object impacts the sports-playing structure at, or on one side of, any of the lines. The object can be a sports instrument, e.g., a ball, or a person such as a player including the person's footwear and other clothing. The present CC capability can be provided (or installed) at each line and directly along both edges of each line. However, the CC capability is often used to a lesser extent for various reasons, including keeping the cost down. If so, location priorities are employed in determining where to provide the CC capability.

With the foregoing in mind, all lines in this section dealing with tennis and in the next section dealing with other sports are of finite width except as otherwise indicated. Providing CC capability "at" a line means that CC capability is provided across essentially the entire width of the line. CC capability may be present at part or all of the line's length. Providing CC capability "directly along" an edge of a line means that CC capability is provided in area adjoining that edge of the line. The line-adjoining area may encompass part or all of the line's length. One edge of each line defining a penalty/reward/play-stoppage decision is termed its critical edge because that edge is the demarcating location for the penalty/reward/play-stoppage decision. That is, the penalty or reward or/and temporary play stoppage applies to one or more types of contact occurring at area directly along one side of the critical edge and not to such contact occurring at area directly along the other side of the critical edge.

"IB" and "OB" again respectively mean inbounds and out-of-bounds. For a sport having an IB area at least partly separated from an OB area by a closed boundary line that forms part of the IB or OB area, the "inside" edge of the boundary line is the edge meeting or lying in the IB area. The "outside" edge is the edge lying in or meeting the OB area. The critical edge of the boundary line is (a) its inside edge if the line lies in the OB area so as to meet the IB area and (b) its outside edge if the line lies in the IB area so as to meet the OB area.

Recitations of IDVC portion 138, OC area 116, and print area 118 of a VC structure portion or part hereafter respectively mean portion 138 and areas 116 and 118 of a unit of VC region 106 in the structure portion or part. Recitations of IDVC portion 926, OC area 896, and print area 898 of a VC structure portion or part similarly hereafter respectively mean portion 926 and areas 896 and 898 of a unit of VC region 886 in the structure portion or part. Recitations of an FR IDVC portion, OC area 916, and print area 918 of a VC structure portion or part hereafter respectively mean the FR IDVC portion and areas 916 and 918 of a unit of VC region 906 in the structure portion or part.

The present CC capability is preferably at least provided as a unit of VC region 106 (or 906) having SF zone 112 (or 912) situated in area, usually elongated, extending directly along the critical edge of a line defining a penalty/reward/play-stoppage decision. Providing the CC capability at this highest priority location directly along the line's critical edge enables an observer, e.g., a player or an official, to readily visually determine whether there is any space between the critical edge and the space beyond the critical edge so that the penalty/reward/play-stoppage decision can quickly be made. With the CC capability provided at the highest priority location, the CC capability may also be provided as a unit of VC region 886 having SF zone 892 situated at that line as the next (or second) highest CC location priority. Providing the CC capability at the next highest priority location further assists the observer in confirming whether any space is present between the critical edge and the space beyond the critical edge. Since the designations "886" and "106" (or "906") are arbitrary, region 886 and region 106 (or 906), along with zone 892 and zone 112 (or 912), can be reversed.

Rules of tennis generally require that the lines of a tennis court be the same color. The court lines are usually white or nearly white. Tennis rules generally require that remainder of the IB playing area be a color contrasting to that of the lines. For a tennis court used for singles and doubles, the servicecourts, backcourts, and doubles alleys are usually uniformly of a single color clearly contrasting to that of the lines. The OB playing area is uniformly, at least along the (outer) boundary of the IB area and commonly for at least several meters away from that boundary, a color contrasting with the line color.

Despite tennis rules, World Team Tennis utilizes tennis courts in which the servicecourts, backcourts, and alleys are of multiple different colors. With the court lines being the usual white, World Team Tennis commonly uses the following combination of four materially different non-white colors. Both backcourts are a first non-white color. One pair of diagonally opposite servicecourts are a second non-white color. The other pair of diagonally opposite servicecourts are a third non-white color. The alleys are a fourth non-white color.

Using the reference symbols for the tennis court in FIG. 1, the following definitions apply to the tennis IP structures described below for FIGS. 96 and 97. Each pair of adjoining servicecourts 38 separated by the imaginary or real line below net 32 constitute net-separated servicecourts. Baseline 28 and serviceline 34 on the same side of the imaginary/real net line below net 32 constitute associated lines. The part of each doubles alley 48 extending between a baseline 28 and the net line constitutes a half alley. The two half alleys of each alley 48 constitute net-separated half alleys. Each tennis court has a longitudinal axis running lengthwise through the center of centerline 36 and a transverse axis formed by the net line. Each half court has a straight imaginary extended serviceline running lengthwise through the center of serviceline 34 in that half court and past both alleys 48. Singles sidelines 30 and baselines 28, insofar as they extend between sidelines 30, form a closed boundary line 28/30 for singles IB area 22. Doubles sidelines 46 and baselines 28 form a closed boundary line 28/46 for doubles IB area 42.

Figure 96:
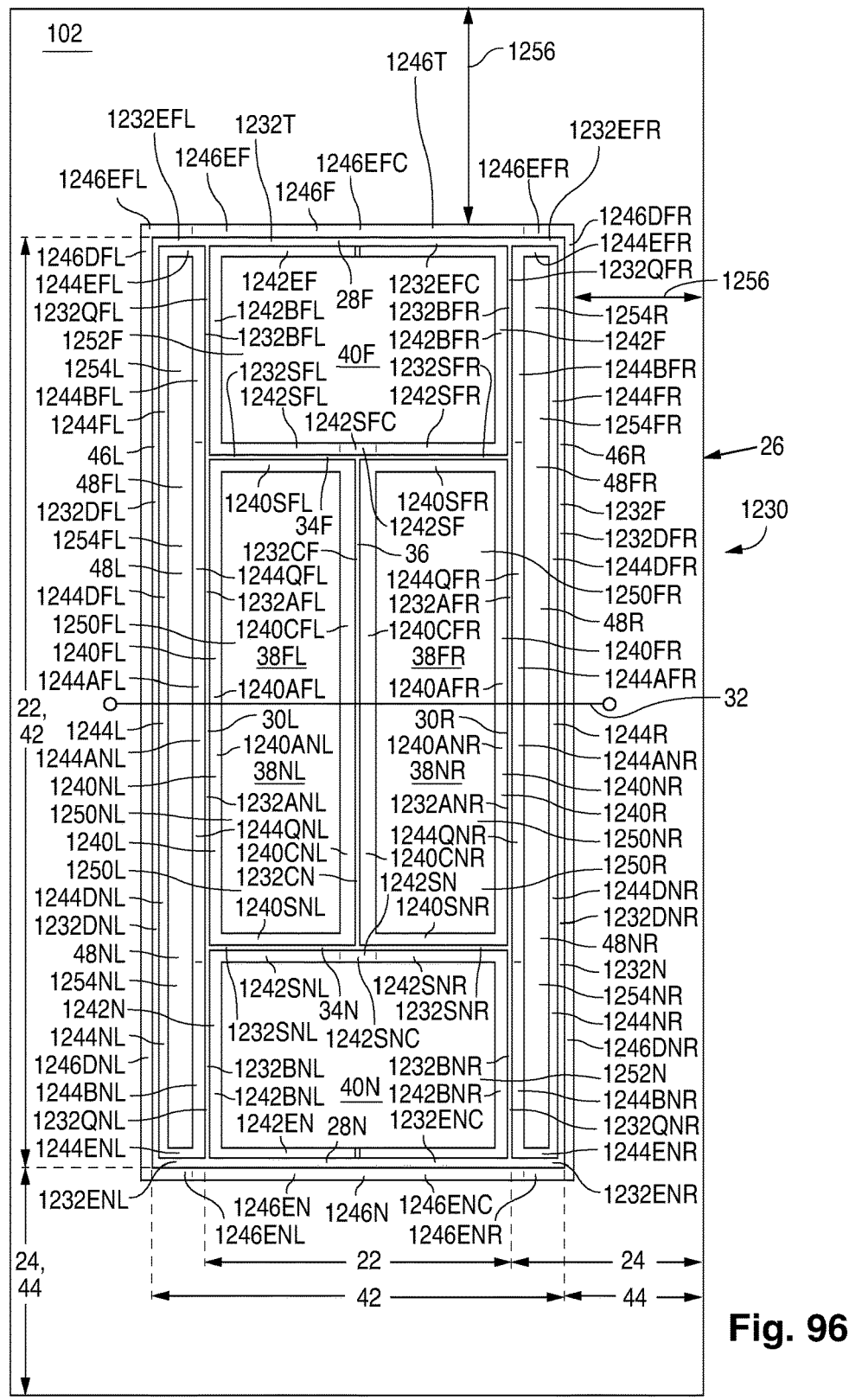
FIGS. 96 and 97 are layout views of two respective exemplary embodiments of an IP structure implemented into a tennis court according to the invention.
Figure 97:
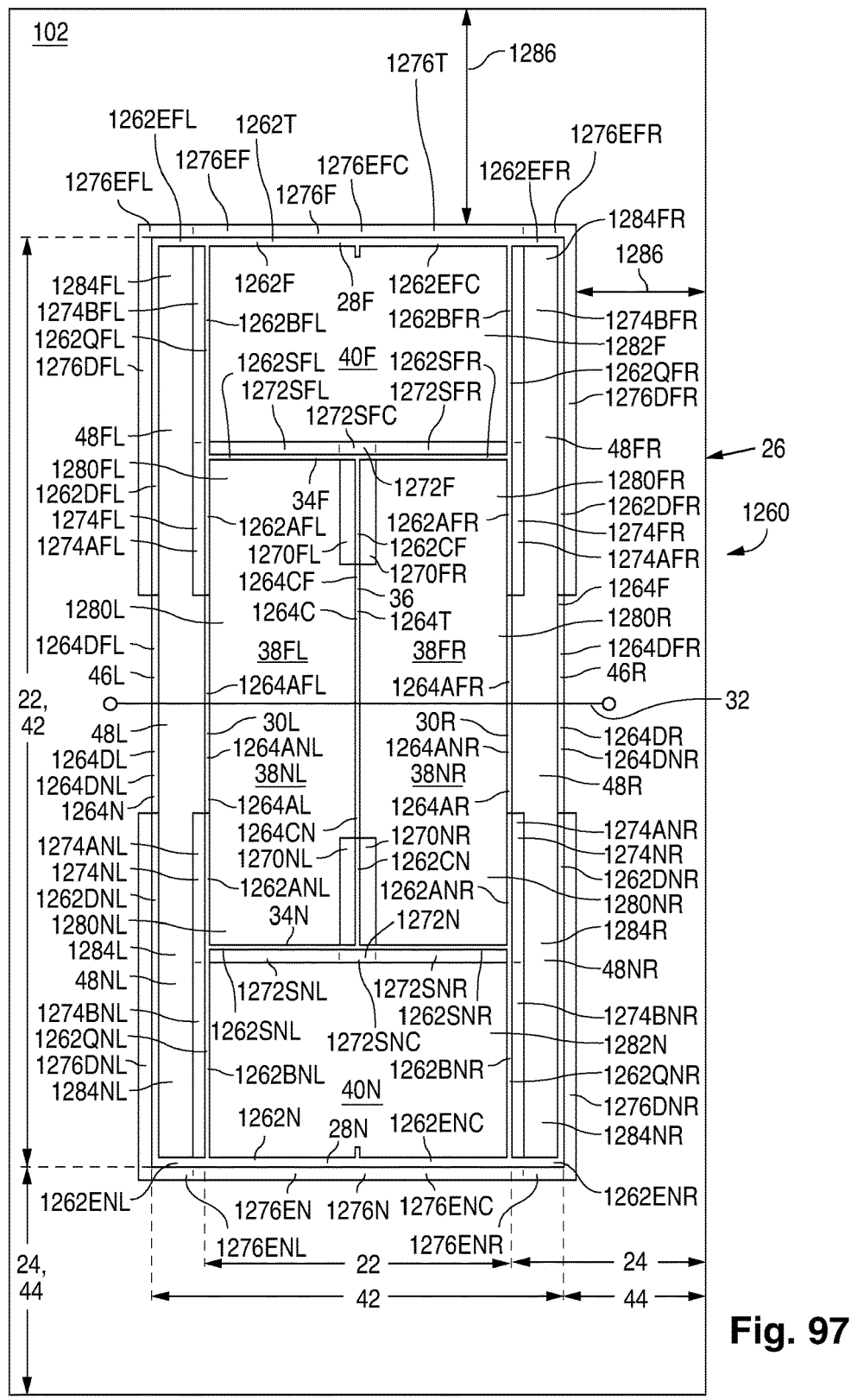

The adjectives "left", "right", "far", and "near" are used to distinguish identically shaped SF areas in the tennis courts of FIGS. 96 and 97 relative to a location at the center of baseline 28 closest to the bottom of each figure. The inside and outside edges of an elongated straight VC area portion, part, or segment adjoining a court line respectively are the edge adjoining the line and the edge opposite the line-adjoining edge. "BC", "SC", "HA", and "QC" hereafter respectively mean backcourt, servicecourt, half-alley, and quartercourt. "LA", "BLA", "CLA", "SLA", and "SVLA" hereafter respectively mean line-adjoining, baseline-adjoining, centerline-adjoining, sideline-adjoining, and serviceline-adjoining. A straight segment of a straight item means one of a plurality of straight segments arranged lengthwise in the item. Each recitation of a "ball" or "balls" in this section means a tennis ball or tennis balls.

A point in tennis usually begins with tennis service consisting of an effort by one player, the server, positioned at a location behind a baseline 28 and to one side of the center mark on that line 28 to serve a ball over net 32 and into diagonally opposite servicecourt 38. A ball hit by the server is sometimes termed a served ball until the ball impacts surface 102 and is hit by another player, the receiver, located on the opposite side of net 32 from the server. If a served ball is "in", return play begins with an effort by the receiver to return the served ball back over net 32. If the receiver fails to return the served ball over net 32, return play ends abruptly. If the receiver returns the served ball over net 32 so that the served ball lands "in", return play continues as the players hit the ball back and forth over net 32 until the ball finally impacts surface 102 "out" to end the point and return play. A ball hit during any tennis stoke subsequent to tennis service, including a return of the served ball, is sometimes termed a returned ball.

Finite-width court lines 28, 30, 34, 36, and 46 are of uniform color across them during the normal state. Each servicecourt 38, backcourt 40, or doubles half alley is of uniform color across that servicecourt 38, backcourt, or half alley during the normal state. Doubles OB playing area 44 is of uniform color along the perimeter of doubles IB playing area 42 during the normal state. In addition to contrastingly differing from the normal-state line color, the normal-state color of each of IB court areas 38 and 40, each half alley, and OB area 44 along the boundary of IB area 42 can potentially differ from the normal-state color of each other of court areas 38 and 40, each half alley, and area 44 along the boundary of area 42.

FIG. 96 illustrates a tennis IP structure 1230 containing OI structure 880 or 900 or, preferably, cell-containing OI structure 1080 or 1100 incorporated into a tennis court suitable for singles and doubles to form a tennis-playing structure having CC capability that assists in determining whether object 104 embodied with a ball is "in" or "out" when it impacts surface 102 in the immediate vicinity of a selected tennis line. The tennis-playing structure includes net 32. For doubles, surface 102 consists of OB area 44 and IB area 42 formed with four servicecourts, two backcourts, two doubles alleys, and nine court lines consisting of near and far baselines 28N and 28F (collectively "baselines 28"), left and right singles sideline 30L and 30R (collectively "singles sidelines 30"), near and far servicelines 34N and 34F (collectively "servicelines 34"), centerline 36, and left and right doubles sidelines 46L and 46R (collectively "doubles sidelines 46"). Lines 28, 30, 34, 36, and 46 here are arranged the same as in FIG. 1.

The servicecourts consist of near left, near right, far left, and far right servicecourts 38NL, NR, 38FL, and 38FR (collectively "servicecourts 38") arranged the same relative to net 32 as servicecourts 38 in FIG. 1. Servicecourts 38NL and 38NR are in the near half court. Servicecourts 38FL and 38FR are in the far half court. Centerline 36 separates net-separated servicecourts 38NR and 38FR from net-separated servicecourts 38NL and 38FL. The backcourts consist of near and far backcourts 40N and 40F (collectively "backcourts 40"). Backcourt 40N or 40F is separated from servicecourts 38NL and 38NR or 38FL and 38FR by serviceline 34N or 34F.

The doubles alleys consist of left and right doubles alleys 48L and 48R (collectively "alleys 48"). Doubles alley 48L is separated from servicecourts 38NL and 38FL or 38NR and 38FR by singles sideline 30L or 30R and toward the left or right from OB area 44 by doubles sideline 46L or 46R. Baseline 28N or 28F separates alleys 48 and backcourt 40N or 40F from OB area 44 toward the near or far end of the tennis court. The net line divides (a) left alley 48L into near left and far left half alleys 48NL and 48FL respectively in the near and far half courts and (b) right alley 48R into near right and far right half alleys 48NR and 48FR respectively in the near and far half courts. The court thus has four doubles half alleys 48NL, 48NR, 48FL, and 48FR (collectively "half alleys 48H").

IP structure 1230 is a full-line CC structure that provides CC capability at, and directly along both edges of, the entire length of each court line 28, 30, 34, 36, or 46. In particular, lines 28, 30, 34, 36, and 46 form a composite VC singles/doubles line area 1232T consisting of near and far VC singles/doubles line area 1232N and 1232F respectively in the near and far half courts. Each VC singles/doubles line area 1232N or 1232F consists of twelve elongated straight continuous VC line area parts 1232ENL, 1232ENC, 1232ENR, 1232SNL, 1232SNR, 1232ANL, 1232BNL, 1232ANR, 1232BNR, 1232CN, 1232DNL, and 1232DNR or 1232EFL, 1232EFC, 1232EFR, 1232SFL, 1232SFR, 1232AFL, 1232BFL, 1232AFR, 1232BFR, 1232CF, 1232DFL, and 1232DFR (collectively "1232"). VC line area parts 1232 in each half court variously end at the net line and the intersections of lines 28, 30, 34, 36, and 46 in that half court.

VC line parts 1232ENL, 1232ENC, and 1232ENR respectively lying fully along the near ends of half alley 48NL, backcourt 40N, and half alley 48NR form near baseline 28N. VC line parts 1232EFL, 1232EFC, and 1232EFR respectively lying fully along the far ends of half alley 48FL, backcourt 40F, and half alley 48FR form far baseline 28F. VC line parts 1232BNL, 1232ANL, 1232AFL, and 1232BFL respectively lying fully along backcourt 40N, servicecourts 38NL and 38FL, and backcourt 40F and jointly lying fully along alley 48L form left singles sideline 30L. VC line parts 1232BNR, 1232ANR, 1232AFR, and 1232BFR respectively lying fully along backcourt 40N, servicecourts 38NR and 38FR, and backcourt 40F and jointly lying fully along alley 48R form right singles sideline 30R. VC line parts 1232ANL and 1232BNL, 1232ANR and 1232BNR, 1232AFL and 1232BFL, or 1232AFR and 1232BFR form a straight VC QC singles sideline area part 1232QNL, 1232QNR, 1232QFL, or 1232QFR.

VC line parts 1232SNL and 1232SNR or 1232SFL and 1232SFR respectively lying fully along servicecourts 38NL and 38NR or 38FL and 38FR and jointly lying fully along backcourt 40N or 40F form serviceline 34N or 34F. VC line parts 1232CN and 1232CF (collectively "1232C") form centerline 36. VC line parts 1232DNL and 1232DFL or 1232DNR and 1232DFR lying fully along alley 48L or 48R form doubles sideline 46L or 46R.

Each VC line area part 1232 embodies one or more units of SF zone 892 (of one or more units of VC region 886) in a plurality of larger units of a specified one of OI structures 900 and 1100. Each such larger unit contains a pentad of consecutively adjoining color regions 108, 106, 886, 906, and 908. In the multiple-unit situation, a line part 1232 is allocated into (or consists of) multiple straight VC area segments, each embodying a unit of zone 892 in a different one of the pentad units. AD color B for zone 892 in each pentad unit is the color of VC line area 1232T during the normal state and, as dealt with below, is usually the same in every pentad unit. As also dealt with below, altered color Y of print area 898 of zone 892 in each pentad unit is usually the same color, materially different from color B, in every pentad unit during the changed state.

Each near servicecourt 38NL or 38NR is partly occupied with a ⌐-shaped individual near VC IB CLA SC area portion 1240NL or 1240NR consisting of three elongated straight near VC LA SC area parts 1240ANL, 1240SNL, and 1240CNL or 1240ANR, 1240SNR, and 1240CNR respectively lying fully along part 1232ANL or 1232ANR of (closest) singles sideline 30L or 30R, part 1232SNL or 1232SNR of near (closest) serviceline 34N, and near part 1232CN of centerline 36. Each far servicecourt 38FL or 38FR is partly occupied with a ⌐-shaped individual far VC IB CLA SC area portion 1240FL or 1240FR consisting of three elongated straight far VC LA SC area parts 1240AFL, 1240SFL, and 1240CFL or 1240AFR, 1240SFR, and 1240CFR respectively lying fully along part 1232AFL or 1232AFR of (closest) singles sideline 30L or 30R, part 1232SFL or 1232SFR of far (closest) serviceline 34F, and far part 1232CF of centerline 36. VC SC portions 1240NL, 1240NR, 1240FL, and 1240FR (collectively "1240") are usually mirror images about the court's longitudinal and transverse axes. SC portions 1240NL and 1240FL or 1240NR and 1240FR form a rectangular annular composite VC IB CLA SC area portion 1240L or 1240R in which singles SLA SC parts 1240ANL and 1240AFL or 1240ANR and 1240AFR are continuous and in line with each other and in which CLA SC parts 1240CNL and 1240CFL or 1240CNR and 1240CFR are continuous and in line with each other.

Each backcourt 40N or 40F is partly occupied with a rectangular annular VC IB SVLA BC area portion 1242N or 1242F consisting of four elongated straight VC LA BC area parts 1242EN, 1242SN, 1242BNL, and 1242BNR or 1242EF, 1242SF, 1242BFL, and 1242BFR respectively lying fully along central part 1232ENC or 1232EFC of (closest) baseline 28N or 28F, associated (closest) serviceline 34N or 34F and thus serviceline parts 1232SNL and 1232SNR or 1232SFL and 1232SFR, part 1232BNL or 1232BFL of singles sideline 30L, and part 1232BNR or 1232BFR of singles sideline 30R. VC BC portions 1242N and 1242F (collectively "1242") are usually symmetrical about the court's longitudinal axis and mirror images about the court's transverse axis.

Each SVLA BC part 1242SN or 1242SF consists of three elongated straight VC SVLA BC area parts (or subparts) 1242SNL, 1242SNC, and 1242SNR or 1242SFL, 1242SFC, and 1242SFR respectively termed left end, central, and right end area parts. Each central SVLA BC part 1242SNC or 1242SFC lies fully along the segments of serviceline parts 1232SNL and 1232SNR or 1232SFL and 1232SFR situated between imaginary extensions of the outside edges of CLA SC parts 1240CNL and 1240CNR or 1240CFL and 1240CFR into backcourt 40N or 40F. Each end SVLA BC part 1242SNL, 1242SNR, 1242SFL, or 1242SFR lies fully along the remainder of serviceline part 1232SNL, 1232SNR, 1232SFL, or 1232SFR.

Each half alley 48NL, 48NR, 48FL, or 48FR is partly occupied with a ⌐-shaped individual near VC IB singles SLA HA area portion 1244NL, 1244NR, 1244FL, or 1244FR consisting of four elongated straight individual near VC LA HA area parts 1244DNL, 1244ENL, 1244BNL, and 1244ANL, 1244DNR, 1244ENR, 1244BNR, and 1244ANR, 1244DFL, 1244EFL, 1244BFL, and 1244AFL, or 1244DFR, 1244EFR, 1244BFR, and 1244AFR. VC HA portions 1244NL, 1244NR, 1244FL, and 1244FR (collectively "1244") are usually mirror images about the court's longitudinal and transverse axes. Near HA parts 1244DNL and 1244ENL or 1244DNR and 1244ENR respectively lie fully along part 1232DNL or 1232DNR of (closest) doubles sideline 46L or 46R and end part 1232ENL or 1232ENR of near (closest) baseline 28N. Far HA parts 1244DFL and 1244EFL or 1244DFR and 1244EFR respectively lie fully along part 1232DFL or 1232DFR of (closest) doubles sideline 46L or 46R and end part 1232EFL or 1232EFR of far (closest) baseline 28F.

Each left singles SLA HA part 1244ANL or 1244AFL lies fully along left singles sideline part 1232ANL or 1232AFL and the segment of left singles sideline part 1232BNL or 1232BFL situated between part 1232ANL or 1232AFL and an imaginary leftward extension of the outside edge of SVLA BC part 1242SN or 1242SF. Each right singles SLA HA part 1244ANR or 1244AFR lies fully along right singles sideline part 1232ANR or 1232AFR and the segment of right singles sideline part 1232BNR or 1232BFR situated between part 1232ANR or 1232AFR and an imaginary rightward extension of the outside edge of BC part 1242SN or 1242SF. Each other singles SLA HA part 1244BNL, 1244BNR, 1244BFL, or 1244BFR extends fully along the remainder of singles sideline part 1232BNL, 1232BNR, 1232BFL, or 1232BFR. Singles SLA HA parts 1244ANL and 1244BNL, 1244ANR and 1244BNR, 1244AFL and 1244BFL, or 1244AFR and 1244BFR are continuous and in line with each other to form a straight VC singles SLA QC HA area part 1244QNL, 1244QNR, 1244QFL, or 1244QFR lying fully along singles sideline part 1232QNL, 1232QNR, 1232QFL, or 1232QFR. SLA HA portions 1244NL and 1244FL or 1244NR and 1244FR form a rectangular annular composite VC IB SLA alley area portion 1244L or 1244R in which doubles SLA HA parts 1244DNL and 1244DFL or 1244DNR and 1244DFR are continuous and in line with each other and in which singles SLA HA parts 1244ANL and 1244AFL or 1244ANR and 1244AFR are continuous and in line with each other.

Doubles OB area 44 is partly occupied with two ⊔-shaped individual VC doubles OB BLA area portions 1246N and 1246F (collectively "1246") together lying fully along baselines 28 and sidelines 30 on opposite respective near and far sides of the net line so as to fully surround doubles IB area 42. VC OB portions 1246 are usually symmetrical about the court's longitudinal axis and mirror images about the court's transverse axis. Each doubles OB portion 1246N or 1246F consists of five elongated straight VC doubles OB LA area parts 1246DNL, 1246ENL, 1246ENC, 1246ENR, and 1246DNR or 1246DFL, 1246EFL, 1246EFC, 1246EFR, and 1246DFR.

Doubles OB parts 1246ENL, 1246ENC, and 1246ENR or 1246EFL, 1246EFC, and 1246EFR, respectively termed left end, central, and right end BLA area parts, are continuous and in line with one another to form a straight composite VC doubles OB BLA area part 1246EN or 1246EF. Central OB BLA part 1246ENC or 1246EFC lies fully along central baseline part 1232ENC or 1232EFC and the segments of end baseline parts 1232ENL and 1232ENR or 1232EFL and 1232EFR situated between part 1232ENC or 1232EFC and imaginary extensions of the outside edges of singles SLA HA parts 1244BNL and 1244BNR or 1244BFL and 1244BFR. Each end OB BLA part 1246ENL, 1246ENR, 1246EFL, or 1246EFR lies fully along the remainder of end baseline part 1232ENL, 1232ENR, 1232EFL, or 1232EFR.

Doubles OB part 1246DNL, 1246DNR, 1246DFL, or 1246DFR, termed a doubles SLA area part, lies fully along doubles sideline part 1232DNL, 1232DNR, 1232DFL, or 1232DFR. OB portions 1246 form a rectangular annular composite VC doubles OB area portion 1246T in which doubles SLA parts 1246DNL and 1246DFL or 1246DNR and 1246DFR are continuous and in line with each other.

Each straight area part of each of VC court area portions 1240, 1242, 1244, and 1246 embodies one or more units of SF zone 112 or 912 (of one or more units of VC region 106 or 906) in the pentad units of color regions 108, 106, 886, 906, and 908. It is immaterial whether each such embodiment is performed with one or more units of zone 112 or with one or more units of zone 912 because reference symbols "112" and "912" are arbitrary designators and do not affect the substance of the embodiments. For simplicity, each pentad of regions 108, 106, 886, 906, and 908 is hereafter treated as a pentad of consecutively adjoining regions 108, 106, 886, 106, and 108. Each pair of adjoining regions 106 and 108 are described as associated regions. As needed to distinguish the two units of VC region 106 in each pentad, one of them is denominated the "principal" (or "PP") VC region while the other is denominated the "further" (or "FR") VC region otherwise identified with reference symbol 906. As needed to distinguish the two units of FC region 108 in each pentad, region 108 adjoining "principal" region 106 is denominated the "secondary" FC region while FC region 108 adjoining "further" region 106 is denominated the "ancillary" FC region otherwise identified with reference symbol 908.

Similarly, color SF zones 114, 112, 892, 912, and 914 in each region pentad are hereafter treated as consecutively adjoining zones 114, 112, 892, 112, and 114. Each pair of adjoining zones 112 and 114 are described as associated color SF zones. As needed to distinguish the two units of VC zone 112 in each pentad, zone 112 of "principal" VC region 106 is denominated the "principal" VC SF zone while zone 112 of "further" region 106 is denominated the "further" VC SF zone otherwise identified with reference symbol 912. As needed to distinguish the two units of FC zone 114, zone 114 of "secondary" FC region 108 is denominated the "secondary" FC SF zone while zone 114 of "ancillary" region 108 is denominated the "ancillary" FC SF zone otherwise identified with reference symbol 914. Using this transformation, each straight part of each of VC court portions 1240, 1242, 1244, and 1246 embodies an even number of two or more units of zone 112 (of one or more units of region 106) in the pentad units of color regions 108, 106, 886, 106, and 108. For four or more units of zone 112, a straight part of any portion 1240, 1242, 1244, or 1246 is allocated into multiple straight segments, each embodying two units of zone 112 in a different one of the pentad units.

Each VC court portion 1240, 1242, 1244, or 1246 is usually of uniform color, termed normal-state LA color, across that portion 1240, 1242, 1244, or 1246 during the normal state. PP color A for SF zone 112 of each pentad unit having zone 112 formed with a straight part, including a straight segment of such a straight part, of each portion 1240, 1242, 1244, or 1246 is then usually its normal-state LA color. There may be multiple normal-state LA colors.

Changed color X for print area 118 of SF zone 112 of each pentad unit having zone 112 formed with a straight part, including a straight segment of such a straight part, of each VC court portion 1240, 1242, 1244, or 1246 is a changed-state LA color for that portion 1240, 1242, 1244, or 1246. There may be multiple changed-state LA colors.

VC region 886 is sometimes embodied differently in some pentad units than in other pentad units usually provided that parts 1232, or/and straight segments of parts 1232, forming each pair of lines 28, 30, 34, or 46 are embodied the same. In other words, each line part 1232 may selectively embody each of its one or more units of SF zone 892 in its one or more pentad units differently using a different unit of region 886 than zone 892 in each other pentad unit usually provided that the overall embodiment of the units of region 886 is symmetrical about the court's longitudinal and transverse axes. Since AD color B for zone 892 is the same for every pentad unit, this situation usually arises when non-color court characteristics, such as the AD basic TH impact criteria, vary across VC line area 1232T.

The two units of VC region 106 in a pentad unit are sometimes embodied differently in some pentad units than in other pentad units. The different embodiments of the units of region 106 usually arise when court characteristics, such as normal-state LA color, changed-state LA color, and the PP TH impact characteristics, vary across VC court portions 1240, 1242, 1244, and 1246. The embodiments of the units of region 106 are usually symmetrical about the court's longitudinal and transverse axes for variations in the PP TH impact characteristics across portions 1240, 1242, 1244, and 1246.

The part of each servicecourt 38NL, 38NR, 38FL, or 38FR beyond its VC SC portion 1240NL, 1240NR, 1240FL, or 1240FR is a rectangular remainder individual FC IB SC area part 1250NL, 1250NR, 1250FL, or 1250FR extending directly along LA SC parts 1240ANL, 1240SNL, and 1240CNL, 1240ANR, 1240SNR, and 1240CNR, 1240AFL, 1240SFL, and 1240CFL, or 1240AFR, 1240SFR, and 1240CFR. FC SC parts 1250NL and 1250FL or 1250NR or 1250FR in each pair of net-separated servicecourts 38NL and 38FL or 38NR and 38FR form a rectangular composite FC IB SC area portion 1250L or 1250R fully directly surrounded by composite SC portion 1240L or 1240R. The part of each backcourt 40N or 40F beyond its annular VC BC portion 1242N or 1242F is a rectangular remainder individual FC IB BC area part 1252N or 1252F fully directly surrounded by BC portion 1242N or 1242F.

The part of each half alley 48NL, 48NR, 48FL, or 48FR beyond its VC HA portion 1244NL, 1244NR, 1244FL, or 1244FR is a rectangular remainder individual FC doubles HA area part 1254NL, 1254NR, 1254FL, or 1254FR extending directly along LA HA 1244DNL, 1244ENL, and 1244QNL, 1244DNR, 1244ENR, and 1244QNR, 1244DFL, 1244EFL, and 1244QFL, or 1244DFR, 1244EFR, and 1244QFR. FC HA parts 1254NL and 1254FL or 1254NR and 1254FR in each pair of net-separated half alleys 48NL and 48FL or 48NR and 48FR form a rectangular composite FC IB alley area portion 1254L or 1254R fully directly surrounded by composite HA portion 1244L or 1244R. The part of OB area 44 beyond VC OB portions 1246 is a rectangular annular remainder FC doubles OB area part 1256 which fully directly surrounds portions 1246. Each FC part 1250NL, 1250NR, 1250FL, 1250FR, 1252N, 1252F, 1254NL, 1254NR, 1254FL, 1254FR, or 1256 is spaced apart from VC line area 1232T.

Each of FC SC parts 1250NL, 1250NR, 1250FL, and 1250FR (collectively "1250"), FC BC parts 1252N and 1252F (collectively "1252"), FC HA parts 1254NL, 1254NR, 1254FL, and 1254FR (collectively "1254"), and FC doubles OB part 1256 embodies a unit of SF zone 114 (of FC region 108) in at least three pentad units. For example, each BC part 1252N or 1252F usually embodies four units of zone 114 in four pentad units respectively containing four units of SF zone 112 of BC parts 1242EN, 1242SN, 1242BNL, and 1242BNR or 1242EF, 1242SF, 1242BFL, and 1242BFR and preferably embodies six units of zone 114 in six pentad units respectively containing six units of zone 112 of BC parts 1242EN, 1242SNL, 1242SNC, 1242SNR, 1242BNL, and 1242BNR or 1242EF, 1242SFL, 1242SFC, 1242SFR, 1242BFL, and 1242BFR.

Each FC court part 1250, 1252, or 1254 is usually of uniform fixed color across that part 1250, 1252, or 1254. Secondary color A' for SF zone 114 of each pentad unit having zone 114 formed with a part 1250, 1252, or 1254 is usually largely its fixed color. FC doubles OB part 1256 is usually of uniform fixed color at least along its entire (or full) interface with each VC OB portion 1246. Color A' for zone 114 of each pentad unit having zone 114 formed with OB part 1256 is usually largely its fixed color at least along its entire interface with each OB portion 1246. There may be multiple such fixed colors.

VC line area 1232T encompassing all lines 28, 30, 34, 36, and 46 is usually uniformly a single color, termed the normal-state line color and preferably white or close to white, during the normal state consistent with tennis rules. Since part of line area 1232T embodies SF zone 892 in each pentad unit, AD color B for zone 892 in each pentad unit is usually the same color, preferably white or close to white, in all the pentad units. Altered color Y for print area 898 in each pentad unit is usually uniformly a single color, materially different from color B, in all the pentad units. Color Y, termed the changed-state line color, can nonetheless variously differ from pentad unit to pentad unit.

PP normal-state LA color A for each VC SF zone 112 in each pentad unit is usually the same as secondary color A' for associated FC SF zone 114 in that pentad unit. Color A for VC court portion 1240, 1242, or 1244 in each court area 38, 40, or 48H is usually largely the fixed color of its FC part 1250, 1252, or 1254 so that each court area 38, 40, or 48H is usually uniformly a single color during the normal state. Color A for VC OB portion 1246 is usually largely the fixed color of FC OB part 1256 at least along its entire interface with each OB portion 1246 so that doubles OB area 44 is usually uniformly a single color extending from the perimeter of IB area 42 through portions 1246 into OB part 1256 during the normal state.

Per the court color specifications presented near the beginning of this section, PP normal-state LA color A for each SF zone 112 in each pentad unit contrasts to, and thus differs significantly from, AD normal-state line color B for VC line area 1232T whose parts 1232 or/and straight segments of parts 1232 embody SF zones 892 in the pentad units. Color A for zone 112 in each pentad unit selectively differs from, i.e., significantly differs from or is the same as on a selective basis, color A for zone 112 in one or more other pentad units. In particular, color A for zone 112 in one or more pentad units having zone 112 formed with a straight part, or a straight segment of a straight part, of any of VC court portions 1240, 1242, 1244, and 1246 can differ from color A for zone 112 in one or more other pentad units having zone 112 formed with a straight part, or a straight segment of a straight part, of any of portions 1240, 1242, 1244, and 1246. The pentad units in IP structure 1230 can thus have multiple PP colors A. These colors can be designated as first PP color A, second PP color A, and so on up to the total number of colors A. If there are multiple changed colors X respectively corresponding to two or more of multiple colors A, the multiple colors X can be designated as first changed color X, second changed color X, and so on.

Other color designations can be employed. Since the VC portions of court areas 38NL, 38NR, 38FL, 38FR, 40N, 40F, 48NL, 48NR, 49FL, 48FR, and 44 in IP structure 1230 can potentially be of different colors during the normal state, thirty-four color court-descriptive designations of the type shown in Table 3 can be used where the parenthetical "≈" means largely the same as.

TABLE 3

| Court Area | Fixed Secondary Color A' of FC Area Part | Principal (Normal-state) Color A of VC Area Portion | Changed (Changed-state) Color X of Print Area of VC Area Portion |
| --- | --- | --- | --- |
| Near left servicecourt 38NL | FSNL | ASNL (≃FSNL) | XSNL |
| Near right servicecourt 38NR | FSNR | ASNR (≃FSNR) | XSNR |
| Far left servicecourt 38FL | FSFL | ASFL (≃FSFL) | XSFL |
| Far right servicecourt 38FR | FSFR | ASFR (≃FSFR) | XSFR |
| Near backcourt 40N | FBN | ABN (≃FBN) | XBN |
| Far backcourt 40F | FBF | ABF (≃FBF) | XBF |
| Near left half alley 48NL | FHNL | AHNL (≃FHNL) | XHNL |
| Near right half alley 48NR | FHNR | AHNR (≃FHNR) | XHNR |
| Far left half alley 48FL | FHFL | AHFL (≃FHFL) | XHFL |
| Far right half alley 48FR | FHFR | AHFR (≃FHFR) | XHFR |
| OB area 44 along the part of the perimeter of IB area 42 in the near half court | FOB | AOB (≃FOB) | XOBN |
| OB area 44 along the part of the perimeter of IB area 42 in the far half court | FOB | AOB (≃FOB) | XOBF |

PP normal-state color A for the VC LA portion of each area 38NL, 38NR, 38FL, 38FR, 40N, 40F, 48NL, 48NR, 48FL, or 48FR is usually largely fixed secondary color A' of that area's FC portion as indicated parenthetically in Table 3. The same applies to OB area 44 along largely the full perimeter of IB area 42 because VC doubles OB portions 1246 both adjoin FC doubles OB part 1256. However, OB portions 1246 can have different changed colors X as indicated by colors XOBN and XOBF in Table 3. AD color B for VC line area 1232T is designated as normal-state line color BL. Altered color Y for print area 898 in each unit of AD VC region 886 in line area 1232T is designated as changed-state line color YL.

A ball impacting an appropriate tennis line is "in". The area critical to determining whether a ball is "in" or "out" is an area along the "outside" edge of each tennis line. The outside edge of each line 28, 30, 34, or 46 is the edge furthest from the center of the court. Either edge of centerline 36 constitutes its outside edge depending on where tennis service originates.

In view of the preceding, SVLA BC parts 1242SN and 1242SF (collectively "1242S") are usually wider than SVLA SC parts 1240SNL, 1240SNR, 1240SFL, and 1240SFR (collectively "1240S"), e.g., by amounts of at least the widths of servicelines 34. Singles SLA HA parts 1244QNL, 1244QNR, 1244QFL, and 1244QFR (collectively "1244Q") are usually wider than singles SLA SC parts 1240ANL, 1240ANR, 1240AFL, and 1240AFR (collectively "1240A") and singles SLA BC parts 1242BNL, 1242BNR, 1242BFL, and 1242BFR (collectively "1242B"), e.g., by amounts of at least the widths of singles sidelines 30. OB BLA parts 1246EN and 1246EF (collectively "1246E") are usually wider than BLA BC parts 1242EN and 1242EF (collectively "1242E") and BLA HA parts 1244ENL, 1244ENR, 1244EFL, and 1244EFR (collectively "1244E"), e.g., by amounts of at least the widths of baselines 28. Doubles OB SLA parts 1246DNL, 1246DNR, 1246DFL, and 1246DFR (collectively "1246D") are usually wider than doubles SLA HA parts 1244DNL, 1244DNR, 1244DFL, and 1244DFR (collectively "1244D"), e.g., by amounts of at least the widths of doubles sidelines 46. CLA SC parts 1240CNL, 1240CNR, 1240CFL, and 1240CFR (collectively "1240C") are usually of approximately the same width.

Taking note that tennis lines are usually 5 cm wide with baselines being 5-10 cm wide, commonly 10 cm wide, wider SVLA BC parts 1242S, wider singles SLA HA parts 1244Q, and wider doubles OB SLA parts 1246D are usually at least 10 cm, preferably at least 15 cm, more preferably at least 20 cm, wide. Wider OB BLA parts 1246E and CLA SC parts 1240C are usually at least 15 cm, preferably at least 20 cm, more preferably at least 25 cm, wide. Narrower SVLA SC parts 1240S, narrower singles SLA SC parts 1240A, narrower singles SLA BC parts 1242B, narrower doubles SLA HA parts 1244D, narrower BLA BC parts 1242E, and narrower BLA HA parts 1244E are correspondingly usually at least 5 cm, preferably at least 10 cm, more preferably at least 15 cm, wide.

Players competing in, and any officials used for, tennis matches usually can nearly always accurately directly visually determine, i.e., without using the present CC capability, whether balls impacting surface 102 more than 30 cm outside, or more than 25 cm inside, any of lines 30, 34, and 46 are "in" or "out". Accordingly, wider LA parts 1242S, 1244Q, and 1246D are usually no more than 30 cm, preferably no more than 25 cm, wide. Narrower LA parts 1240S, 1240A, 1242B, 1244D, 1242E, and 1244E are correspondingly usually no more than 25 cm, preferably no more than 20 cm, wide. The players and any officials can usually nearly always accurately directly visually determine whether balls impacting surface 102 more than 35 cm outside baselines 28 are "in" or "out". The same applies to served balls impacting surface 102 more than 35 cm away from centerline 36. LA parts 1246E and 1240C are usually no more than 35 cm, preferably no more than 30 cm, wide.

Balls impacting on or close to sidelines 30 and 46 near net 32 tend to impact surface 102 with less force than balls impacting on or close to lines 30 and 46 farther away from net 32. In light of this, the PP, AD, FR, and CP basic TH impact criteria can vary with distance from net 32 to require less force or pressure near net 32, e.g., less than a quarter way from net 32 to baselines 28, than farther away from net 32, the FR basic TH impact criteria hereafter being replaced with PP basic TH impact criteria for the same reasons that color regions 906 and 908 in the pentad units are respectively replaced with color regions 106 and 108.

IP structure 1230 is relatively expensive because it provides CC capability at and directly along both edges of the entire length of each line 28, 30, 34, 36, or 46. However, only a small fraction of balls impacting on or close to tennis lines usually impact the half of centerline 36 nearest net 32 during tennis service, the quarter of each singles sideline 30 nearest net 32 during singles, or the quarter of each doubles sideline 46 nearest net 32 during doubles. A less expensive implementation of the present tennis IP structure is achieved by omitting the CC capability along the foregoing parts of centerline 36 and sidelines 30 and 46. Since the area critical to determining whether a ball impacting on or close to each line 28, 30, 34, or 46 is "in" or "out" extends along its outside edge, a less expensive implementation is also achieved by omitting the CC capability along the inside edge of each line 28, 30, 34, or 46.

FIG. 97 illustrates a tennis IP structure 1260 consisting of net 32 and OI structures 880 and 900 or, preferably, cell-containing OI structures 1080 and 1100 incorporated in the foregoing way into a tennis court suitable for singles and doubles to form a tennis-playing structure having CC capability that assists in determining whether object 104 embodied with a ball impacting surface 102 in the immediate vicinity of a selected court line is "in" or "out". For doubles, surface 102 again consists of OB area 44 and IB area 42 formed with servicecourts 38NL, 38NR, 38FL, and 38FR, backcourts 40N and 40F, half alleys 48NL, 48NR, 48FL, and 48FR, and court lines consisting of baselines 28N and 28F, singles sidelines 30L and 30R, servicelines 34N and 34F, centerline 36, and doubles sidelines 46L and 46R all identified the same as in IP structure 1230.

Portions of court lines 28, 30, 34, 36, and 46 form a composite VC singles/doubles line area 1262T consisting of near and far VC singles/doubles line area 1262N and 1262F respectively in the near and far half courts. Each VC singles/doubles line area 1262N or 1262F consists of twelve elongated straight continuous VC line area parts 1262ENL, 1262ENC, 1262ENR, 1262SNL, 1262SNR, 1262ANL, 1262BNL, 1262ANR, 1262BNR, 1262CN, 1262DNL, and 1262DNR or 1262EFL, 1262EFC, 1262EFR, 1262SFL, 1262SFR, 1262AFL, 1262BFL, 1262AFR, 1262BFR, 1262CF, 1262DFL, and 1262DFR (collectively "1262"). VC line parts 1262ENL, 1262ENC, and 1262ENR respectively lying fully along the near ends of half alley 48NL, backcourt 40N, and half alley 48NR form near baseline 28N. VC line parts 1262EFL, 1262EFC, and 1262EFR respectively lying fully along the far ends of half alley 48FL, backcourt 40F, and half alley 48FR form far baseline 28F. VC line parts 1262SNL and 1262SNR or 1262SFL and 1262SFR respectively lying fully along servicecourts 38NL and 38NR or 38FL and 38FR and jointly lying fully along backcourt 40N or 40F form serviceline 34N or 34F.

VC line part 1262BNL or 1262BFL lying between backcourt 40N or 40F and left half alley 48NL or 48FL forms the part of left singles sideline 30L extending from baseline 28N or 28F to serviceline 34N or 34F. VC line part 1262BNR or 1262BFR lying between backcourt 40N or 40F and right half alley 48NR or 48FR forms the part of right singles sideline 30R extending from baseline 28N or 28F to serviceline 34N or 34F. VC line part 1262ANL or 1262AFL lying between left servicecourt 38NL or 38FL and left half alley 48NL or 48FL forms a part of left singles sideline 30L extending from serviceline 34N or 34F to a selected left singles sideline location situated between (or spaced apart from) line 34N or 34F and the net line. VC line part 1262ANR or 1262AFR lying between right servicecourt 38NR or 38FR and right half alley 48NR or 48FR forms a part of right singles sideline 30R extending from serviceline 34N or 34F to a selected right singles sideline location situated between line 34N or 34F and the net line. Singles sideline parts 1262ANL and 1262BNL, 1262ANR and 1262BNR, 1262AFL and 1262BFL, or 1262AFR and 1262BFR form a straight VC QC singles sideline area part 1262QNL, 1262QNR, 1262QFL, or 1262QFR.

VC line part 1262CN or 1262CF lying between servicecourts 38NL and 38NR or 38FL and 38FR forms a part of centerline 36 extending from serviceline 34N or 34F to a selected centerline location situated between line 34N or 34F and the net line. VC line part 1262DNL or 1262DFL lying between left half alley 48NL or 48FL and doubles OB area 44 forms a part of left doubles sideline 46L extending from baseline 28N or 28F to a selected left doubles sideline location situated between line 28N or 28F and the net line. VC line part 1262DNR or 1262DFR lying between right half alley 48NR or 48FR and OB area 44 forms a part of right doubles sideline 46R extending from baseline 28N or 28F to a selected right doubles sideline location situated between line 28N or 28F and the net line.

The selected singles sideline, centerline, and doubles sideline locations in each half court are usually from one fourth to three fourths of the distance from the imaginary extended serviceline in that half court to the net line. VC line area 1262T is spaced apart from the net line. Each individual VC line area 1262N or 1262F in the example of FIG. 97 consists of baseline 28N or 28F, associated serviceline 34N or 34F, approximately the three eighths of sidelines 30 and 46 extending from baseline 28N or 28F toward the net line, and approximately the one fourth of centerline 36 extending from serviceline 34N or 34F toward the net line. Line area 1262T is usually symmetrical about the court's longitudinal and transverse axes.

The remainders of sidelines 30 and 46 and centerline 36 form an FC singles/doubles line area 1264T consisting of near and far FC singles/doubles line areas 1264N and 1264F respectively in the near and far half courts. Each FC singles/doubles line area 1264N or 1264F consists of five elongated straight continuous individual FC line area parts 1264ANL, 1264ANR, 1264CN, 1264DNL, and 1264DNR or 1264AFL, 1264AFR, 1264CF, 1264DFL, and 1264DFR. Line parts 1264ANL and 1264AFL or 1264ANR and 1264AFR form a continuous straight composite FC line area part 1264AL or 1264AR constituting the remainder of singles sideline 30L or 30R. Line parts 1264CN and 1264CF form a continuous straight composite FC line area part 1264C constituting the remainder of centerline 36. Line parts 1264DNL and 1264DFL or 1264DNR and 1264DFR form a continuous straight composite FC line area part 1264DL or 1264DR constituting the remainder of doubles sideline 46L or 46R.

Each VC line area part 1262 embodies one or more units of SF zone 892 (of one or more units of VC region 886) in a plurality of larger units of a specified one of OI structures 880 and 1080 or 900 and 1100. In the multiple-unit situation, a line part 1262 is allocated into multiple straight VC area segments, each embodying a unit of zone 892 in a different one of the larger units. AD color B for zone 892 in each larger unit is the color of VC line area 1262T during the normal state and, as dealt with below, is usually the same in every larger unit. Inasmuch as line area 1262T and FC line area 1264T form the total line area consisting of lines 28, 30, 34, 36, and 46, the fixed color of line area 1264T is usually largely color B.

Each larger unit containing baseline part 1262ENL, 1262ENC, 1262ENR, 1262EFL, 1262EFC, or 1262EFR, serviceline part 1262SNL, 1262SNR, 1262SFL, or 1262SFR, sideline part 1262BNL, 1262BNR, 1262BFL, or 1262BFR, or a straight segment of any of these line parts, is a tetrad of color regions 108, 106, 886, and 888 for which subordinate FC region 888 appears solely as single subordinate color B' along subordinate SF zone 894 in that tetrad unit. If sideline part 1262ANL, 1262ANR, 1262AFL, 1262AFR, 1262DNL, 1262DNR, 1262DFL, or 1262DFR is allocated into multiple straight segments, this also applies to each segment spaced apart from FC line area 1264T. Each of these tetrad units constitutes a single-sub tetrad unit where "sub" means subordinate.

A larger unit containing sideline part 1262ANL, 1262ANR, 1262AFL, 1262AFR, 1262DNL, 1262DNR, 1262DFL, or 1262DFR when it is not allocated into multiple straight segments is a tetrad of color regions 108, 106, 886, and 888 for which subordinate FC region 888 consists of two subordinate FC subregions respectively appearing as two different subordinate colors B' along two respective subordinate FC SF subzones of subordinate SF zone 894 in that tetrad unit. If sideline part 1262ANL, 1262ANR, 1262AFL, 1262AFR, 1262DNL, 1262DNR, 1262DFL, or 1262DFR is allocated into multiple straight segments, the same applies to the segment adjoining FC line area 1264T. Each of these tetrad units constitutes a double-sub tetrad unit, "sub" again meaning subordinate. The single-sub and double-sub tetrad units provide the same CC capability because they differ only in regard to the constituency of an FC region, namely region 888.

Subordinate color B' of FC SF zone 894 in each single-sub tetrad unit is termed FC non-line subordinate color B' because it is the color of FC court area beyond FC line area 1264T. Subordinate color B' of one of the subzones of zone 894 in each double sub tetrad unit is likewise termed FC non-line subordinate color B' because it also is the color of FC court area beyond line area 1264T. Subordinate color B' of other of the subzones of zone 894 in each double sub tetrad unit is termed FC line subordinate color B' because it is the color of area 1264T. Since area 1264T is usually largely color B, FC line subordinate color B' is usually largely color B.

Each larger unit containing one of centerline parts 1262CN and 1262CF (collectively "1262C") when it is not allocated into multiple straight segments is a hexad of color regions 108, 106, 886, 888, 906, and 908 for which FC region 888 consists of straight part 1264C of FC line area 1264T at centerline 36. For the reasons presented above in regard to the pentad units in IP structure 1230, each hexad unit of regions 108, 106, 886, 888, 906, and 908 is hereafter treated as a hexad unit of regions 108, 106, 886, 888, 106, and 108 respectively having SF zones 114, 112, 892, 894, 112, and 114. The above-described procedure for distinguishing the two units of VC region 106, or their two zones 112, for each pentad unit is used as necessary for each hexad unit of regions 108, 106, 886, 888, 106, and 108.

If a centerline part 1262C is allocated into multiple straight segments, a larger unit containing the segment adjoining FC line area 1264T is a hexad of color regions 108, 106, 886, 888, 106, and 108 for which FC region 888 again consists of FC centerline part 1264C whereas a larger unit containing each segment spaced apart from line area 1264T is a pentad of color regions 108, 106, 886, 906, and 908 hereafter treated as a pentad of regions 108, 106, 886, 106, and 108 as described above for IP structure 1230. Subordinate color B' of SF zone 894 of region 888 in each hexad unit is termed FC line subordinate color B' because it is largely AD color B of centerline part 1264C embodying that unit of zone 894. The hexad and pentad units provide the same CC capability because they differ only in regard to the presence/absence of an FC region, again region 888. The hexad and pentad units are sometimes together termed hexad/pentad units.

Each near servicecourt 38NL or 38NR is partly occupied with an elongated straight near VC IB CLA SC area portion (or part) 1270NL or 1270NR lying fully along near centerline part 1262CN so as to end at its selected centerline location. Each far servicecourt 38FL or 38FR is partly occupied with an elongated straight far VC IB CLA SC area portion (or part) 1270FL or 1270FR lying fully along far centerline part 1262CF so as to end at its selected centerline location. VC SC portions 1270NL, 1270NR, 1270FL, and 1270FR (collectively "1270") are usually mirror images about the court's longitudinal and transverse axes.

Each backcourt 40N or 40F is partly occupied with an elongated straight full VC IB SVLA BC area portion (or part) 1272N or 1272F lying fully along (closest) serviceline 34N or 34F so as to end at singles sidelines 30. VC BC portions 1272N and 1272F (collectively "1272") are usually symmetrical about the court's longitudinal axis and mirror images about the court's transverse axis.

Each BC portion 1272N or 1272F consists of three elongated straight VC SVLA BC area parts 1272SNL, 1272SNC, and 1272SNR or 1272SFL, 1272SFC, and 1272SFR respectively termed left end, central, and right end area parts. Each central SVLA BC part 1272SNC or 1272SFC lies fully along the segments of serviceline parts 1262SNL and 1262SNR or 1262SFL and 1262SFR situated between imaginary extensions of the outside edges of CLA SC portions 1270 into backcourt 40N or 40F. Each end SVLA BC part 1272SNL, 1272SNR, 1272SFL, or 1272SFR lies fully along the remainder of serviceline part 1262SNL, 1262SNR, 1262SFL, or 1262SFR.

Each near half alley 48NL or 48NR is partly occupied with an elongated straight near VC IB singles SLA HA area portion (or part) 1274NL or 1274NR lying fully along parts 1262BNL and 1262ANL or 1262BNR and 1262ANR of (closest) singles sideline 30L or 30R so as to end at the selected singles sideline location of sideline part 1262BNL or 1262BNR. Each far half alley 48FL or 48FR is partly occupied with an elongated straight far VC IB singles SLA HA area portion (or part) 1274FL or 1274FR lying fully along parts 1262BFL and 1262AFL or 1262BFR and 1262AFR of (closest) singles sideline 30L or 30R so as to end at the selected singles sideline location of sideline part 1262BFL or 1262BFR. VC singles HA portions 1274NL, 1274NR, 1274FL, and 1274FR (collectively "1274") are usually mirror images about the court's longitudinal and transverse axes.

Each HA portion 1274NL, 1274NR, 1274FL, or 1274FR consists of two elongated straight VC singles SLA HA area parts 1274ANL and 1274BNL, 1274ANR and 1274BNR, 1274AFL and 1274BFL, or 1274AFR and 1274BFR. Each left singles SLA HA part 1274ANL or 1274AFL lies fully along left sideline part 1262ANL or 1262AFL and the segment of left sideline part 1262BNL or 1262BFL situated between part 1262ANL or 1262AFL and an imaginary leftward extension of the outside edge of SVLA BC portion 1272N or 1272F. Each right singles SLA HA part 1274ANR or 1274AFR lies fully along right sideline part 1262ANR or 1262AFR and the segment of right sideline part 1262BNR or 1262BFR situated between part 1262ANR or 1262AFR and an imaginary rightward extension of the outside edge of BC portion 1272N or 1272F. Each other singles SLA HA part 1274BNL, 1274BNR, 1274BFL, or 1274BFR lies fully along the remainder of sideline part 1262BNL, 1262BNR, 1262BFL, or 1262BFR.

Doubles OB area 44 is partly occupied with two ⌐-shaped individual VC doubles OB BLA area portions 1276N and 1276F on opposite sides of the net line so as to form a composite VC doubles OB area portion 1276T. VC OB portions 1276N and 1276F (collectively "1276") are usually symmetrical about the court's longitudinal axis and mirror images about the court's transverse axis. Each doubles OB portion 1276N or 1276F consists of five elongated straight VC doubles OB LA area parts 1276DNL, 1276ENL, 1276ENC, 1276ENR, and 1276DNR or 1276DFL, 1276EFL, 1276EFC, 1276EFR, and 1276DFR. Doubles OB part 1276DNL, 1276DFL, 1276DNR, or 1276DFR, termed a doubles SLA area part, lies fully along doubles sideline part 1262DNL, 1262DFL, 1262DNR, or 1262DFR so as to end at its selected doubles sideline location.

Doubles OB parts 1276ENL, 1276ENC, and 1276ENR or 1276EFL, 1276EFC, and 1276EFR, respectively termed left end, central, and right end area parts, are continuous and in line with one other to form a straight composite VC doubles OB BLA area part 1276EN or 1276EF. Central OB BLA part 1276ENC or 1276EFC lies fully along central baseline part 1262ENC or 1262EFC and the segments of end baseline parts 1262ENL and 1262ENR or 1262EFL and 1262EFR situated between part 1262ENC or 1262EFC and imaginary extensions of the outside edges of singles SLA HA parts 1274BNL and 1274BNR or 1274BFL and 1274BFR. Each end OB BLA part 1276ENL, 1276ENR, 1276EFL, or 1276EFR lies fully along the remainder of end baseline part 1262ENL, 1262ENR, 1262EFL, or 1262EFR.

Each VC SC portion 1270 embodies one or more units of VC SF zone 112 (of one or more units of VC region 106) in the hexad/pentad units. In the multiple-unit situation, an SC portion 1270 is allocated into multiple straight area segments, each embodying a unit of zone 112 in a different one of the hexad/pentad units. Each straight part of each of VC court portions 1272, 1274, and 1276 embodies one or more units of zone 112 in the tetrad units. In this multiple-unit situation, a straight part of any court portion 1272, 1274, or 1276 is allocated into multiple straight area segments, each embodying a unit of zone 112 in a different one of the tetrad units.

Each VC court portion 1270, 1272, 1274, or 1276 is usually of uniform color, termed normal-state LA color, across that portion 1270, 1272, 1274, or 1276 during the normal state. PP Color A for SF zone 112 of each hexad/pentad unit in each SC portion 1270 is then usually its normal-state LA color. Color A for zone 112 of each tetrad unit in each court portion 1272, 1274, or 1276 is usually its normal-state LA color. Also, OB portions 1276 are usually the same color during the normal state so that color A is usually the same for zone 112 of every tetrad unit in portions 1276. IP structure 1260 may have multiple normal-state LA colors.

Changed color X for print area 118 of SF zone 112 of each hexad/pentad unit in each SC portion 1270 is a changed-state LA color of that SC portion 1270. Color X for area 118 of zone 112 of each tetrad unit in each court portion 1272, 1274, or 1276 is a changed-state LA color of that portion 1272, 1274, or 1276. Color X is usually the same for area 118 of zone 112 of every tetrad unit in OB portions 1276. IP structure 1260 may have multiple changed-state LA colors.

The tetrad and hexad/pentad units are collectively termed "polyad units". Subject to changing VC line area 1232T to VC line area 1262T, VC region 886 is sometimes embodied differently in some polyad units than in other polyad units in the same way that region 886 in IP structure 1230 is sometimes embodied differently in some pentad units than in other pentad units. Subject to changing VC court portions 1240, 1242, 1244, and 1246 respectively to VC court portions 1270, 1272, 1274, and 1276, the one or two units of VC region 106 in a polyad unit are sometimes embodied differently in some polyad units than in other polyad units in the same way that the two units of region 106 in a pentad unit in structure 1230 are sometimes embodied differently in some pentad units than in other pentad units.

The part of each servicecourt 38NL, 38NR, 38FL, or 38FR beyond its VC SC portion 1270NL, 1270NR, 1270FL, or 1270FR is a roughly rectangular remainder individual FC IB SC area part 1280NL, 1280NR, 1280FL, or 1280FR adjoining the entire outside edge of SC portion 1270NL, 1270NR, 1270FL, or 1270FR. FC SC parts 1280NL and 1280FL or 1280NR and 1280FR in each pair of net-separated servicecourts 38NL and 38FL or 38NR and 38FR form a continuous roughly rectangular composite FC IB SC area portion 1280L or 1280R. The part of each backcourt 40N or 40F beyond its VC BC portion 1272N or 1272F is a rectangular remainder individual FC IB BC area part 1282N or 1282F adjoining the entire outside edge of BC portion 1272N or 1272F.

The part of each half alley 48NL, 48NR, 48FL, or 48FR beyond its VC HA portion 1274NL, 1274NR, 1274FL, or 1274FR is a roughly rectangular remainder individual FC doubles IB HA area part 1284NL, 1284NR, 1284FL, or 1284FR adjoining the entire outside edge of HA portion 1274NL, 1274NR, 1274FL, or 1274FR. FC doubles IB HA parts 1284NL and 1284FL or 1284NR and 1284FR in each pair of net-separated half alleys 48NL and 48FL or 48NR and 48FR form a continuous roughly rectangular FC doubles IB alley area portion 1284L or 1284R. The part of OB area 44 beyond VC OB portions 1276 is a roughly rectangular annular remainder FC doubles OB area part 1286 fully adjoining the outside edges of portions 1276.

Each FC SC part 1280NL, 1280NR, 1280FL, or 1280FR embodies a unit of FC SF zone 894 (of FC region 888) in at least one single-sub tetrad unit (lying along serviceline part 1262SNL, 1262SNR, 1262SFL, or 1262SFR and potentially along at least one straight segment of singles sideline part 1262ANL, 1262ANR, 1262AFL, or 1262AFR spaced apart from FC singles sideline part 1264ANL, 1264ANR, 1264AFL, or 1264AFR) and partly in at least one double-sub tetrad unit (lying either along part 1262ANL, 1262ANR, 1262AFL, or 1262AFR or along a straight segment of part 1262ANL, 1262ANR, 1262AFL, or 1262AFR adjoining part 1264ANL, 1264ANR, 1264AFL, or 1264AFR) as well as embodying a unit of FC SF zone 114 (of FC region 108) in at least one hexad unit (lying either along a centerline part 1262C or along a straight segment of a part 1262C adjoining FC centerline part 1264C). If VC SC portion 1270NL, 1270FL, 1270NR, or 1270FR is allocated into multiple straight segments, each FC SC part 1280NL, 1280NR, 1280FL, or 1280FR also embodies a unit of zone 114 in at least one pentad unit (lying along a straight segment of a part 1262C spaced apart from part 1264C).

Each FC BC part 1282N or 1282F embodies a unit of SF zone 114 in at least two single-sub tetrad units (lying along serviceline parts 1262SNL and 1262SNR or 1262SFL and 1262SFR) and a unit of SF zone 894 in at least three single-sub tetrad units (lying along baseline part 1262BN or 1262BF and singles sideline parts 1262BNL and 1262BNR or 1262BFL and 1262BFR).

Each FC HA part 1284NL, 1284NR, 1284FL, or 1284FR embodies a unit of SF zone 114 in at least one single-sub tetrad unit (lying along singles sideline part 1262BNL, 1262BNR, 1262BFL, or 1262BFR and potentially along at least one straight segment of singles sideline part 1262ANL, 1262ANR, 1262AFL, or 1262AFR spaced apart from FC singles sideline part 1264ANL, 1264ANR, 1264AFL, or 1264AFR) and in at least one double-sub tetrad unit (lying either along part 1262ANL, 1262ANR, 1262AFL, or 1262AFR or along a straight segment of part 1262ANL, 1262ANR, 1262AFL, or 1262AFR adjoining FC part 1264ANL, 1264ANR, 1264AFL, or 1264AFR) as well as embodying a unit of SF zone 894 in at least one single-sub tetrad unit (lying along baseline part 1262ENL, 1262ENR, 1262EFL, or 1262EFR and potentially along at least one straight segment of doubles sideline part 1262DNL, 1262DNR, 1262DFL, or 1262DFR spaced apart from FC doubles sideline part 1264DNL, 1264DNR, 1264DFL, or 1264DFR) and partly in at least one double-sub tetrad unit (lying either along part 1262DNL, 1262DNR, 1262DFL, or 1262DFR or along a straight segment of part 1262DNL, 1262DNR, 1262DFL, and 1262DFR adjoining FC part 1264DNL, 1264DNR, 1264DFL, or 1264DFR).

FC doubles OB part 1286 embodies a unit of SF zone 114 in at least six single-sub tetrad units (lying along baseline parts 1262ENL, 1262ENC, 1262ENR, 1262EFL, 1262EFC, and 1262EFR and potentially along straight segments of doubles sideline parts 1262DNL, 1262DNR, 1262DFL, and 1262DFR respectively spaced apart from FC doubles sideline parts 1264DNL, 1264DNR, 1264DFL, and 1264DFR) and partly in at least four double-sub tetrad units (lying either along parts 1262DNL, 1262DNR, 1262DFL, and 1262DFR or along straight segments of parts 1262DNL, 1262DNR, 1262DFL, and 1262DFR respectively adjoining FC parts 1264DNL, 1264DNR, 1264DFL, and 1264DFR).

More particularly, the two subzones of SF zone 894 in each double-sub tetrad unit are respectively embodied with (i) FC SC part 1280NL, 1280NR, 1280FL, or 1280FR and FC singles sideline part 1264ANL, 1264ANR, 1264AFL, or 1264AFR or with (ii) FC alley part 1284NL, 1284NR, 1284FL, or 1284FR and FC doubles sideline part 1264DNL, 1264DNR, 1264DFL, or 1264DFR. The two SF zones 114 in each hexad/pentad unit are respectively embodied with FC SC parts 1280NL and 1280NR or 1280FL and 1280FR. Also, zones 114 and 894 in each single-sub tetrad unit are variously respectively embodied with the two parts of one of a plurality of different pairs of different ones of FC SC parts 1280NL, 1280NR, 1280FL, and 1280FR (collectively "1280"), FC BC parts 1282N and 1282F (collectively "1282"), FC HA parts 1284NL, 1284NR, 1284FL, and 1284FR (collectively "1284"), and FC doubles OB part 1286. The pairs consist of (a) either SC part 1280 and associated (closest) BC part 1282, (b) either SC part 1280 and closest HA part 1284, (c) either BC part 1282 and either associated (closest) HA part 1284, (d) either BC part 1282 and OB part 1286, and (e) either HA part 1284 and OB part 1286.

Each FC court part 1280, 1282, or 1284 is usually of uniform fixed color across that part 1280, 1282, or 1284. Consequently, FC non-line subordinate color B' for SF zone 894 of each single-sub tetrad unit having zone 894 formed with a court part 1280 or 1284 is usually largely its fixed color. FC non-line subordinate color B' for the subzone of zone 894 of each double-sub tetrad unit having that subzone formed with a court part 1280 or 1284 is also usually largely its fixed color. FC line subordinate color B' for the subzone of zone 894 of each double-sub tetrad unit having that subzone formed with one of FC sideline parts 1264ANL, 1264ANR, 1264AFL, and 1264AFR (collectively "1264A") or 1264DNL, 1264DNR, 1264DFL, and 1264DFR (collectively "1264D") is usually largely color B. FC line subordinate color B' for zone 894 of each hexad unit having SF zone 114 formed with an SC part 1280 is usually largely color B.

Secondary color A' for SF zone 114 of each hexad/pentad unit having zone 114 formed with an SC part 1280 is usually largely its fixed color. Color A' or FC non-line subordinate color B' for SF zone 114 or 894 of each single-sub tetrad unit having zone 114 or 894 formed with a BC part 1282 is usually largely its fixed color. Color A' for zone 114 of each single-sub tetrad unit having zone 114 formed with an HA part 1284 is usually largely its fixed color. Doubles OB part 1286 is usually of uniform fixed color at least along its entire interface with each VC OB portion 1276. Color A' for zone 114 of each of the tetrad units, i.e., both single-sub and double-sub tetrad units, having zone 114 formed with OB part 1286 is usually largely its fixed color at least along its entire interface with each VC OB portion 1276. IP structure 1260 may have multiple such fixed colors.

VC line area 1262T is usually uniformly a single color, the normal-state line color preferably white or nearly white, during the normal state consistent with tennis rules. Since part of line area 1262T embodies SF zone 892 in each polyad unit, AD color B for zone 892 in each polyad unit is usually the same color, preferably white or close to white, in all the polyad units. This also applies to color B' of FC line area 1264T. Altered color Y for print area 898 of zone 892 in each polyad unit is usually uniformly a single color, the changed-state line color materially different from color B, in all the polyad units. Color Y can nonetheless variously differ from polyad unit to polyad unit.

PP normal-state color A for each VC SF zone 112 in each polyad unit is usually the same as secondary color A' for associated FC SF zone 114 in that polyad unit. Color A for VC portion 1270, 1272, or 1274 in each court area 38, 40, or 48H is usually largely the fixed color of its FC part 1280, 1282, or 1284 so that each court area 38, 40, or 48H is usually uniformly a single color during the normal state. Color A for VC OB portion 1276 is usually uniformly largely the fixed color of FC OB part 1286 at least along its entire interfaces with OB portions 1276.

Per the above-described court color specifications, PP normal-state LA color A for each SF zone 112 in each polyad unit contrasts to, and thus differs significantly from, AD normal-state line color B for VC line area 1262T whose parts 1262 or/and straight segments of parts 1262 embody SF zones 892 in the polyad units. Color A for each zone 112 in each polyad unit selectively differs from, i.e., significantly differs from or is the same on a selective basis as, color A for zone 112 in one or more other polyad units. Specifically, color A for each zone 112 in one or more polyad units having zone 112 formed with any of an SC portion 1270, a straight segment of a portion 1270, a straight part (described above) of any of court portions 1272, 1274, and 1276, and a straight segment of a straight part of any of portions 1272, 1274, and 1276 can differ from color A for zone 112 in one or more other polyad units having zone 112 formed with any of a portion 1270, a straight segment of a portion 1270, a straight part of any of portions 1272, 1274, and 1276, and a straight segment of a straight part of any of portions 1272, 1274, and 1276. The polyad units in IP structure 1260 can have multiple PP colors A. These colors can be designated as first PP color A, second PP color A, and so on up to the total number of colors A. If there are multiple changed colors X respectively corresponding to two or more of multiple colors A, the multiple colors X can be designated as first changed color X, second changed color X, and so on.

Other color designations can be utilized. Since the VC portions of court areas 38NL, 38NR, 38FL, 38FR, 40N, 40F, 48NL, 48NR, 48FL, 48FR, and 44 in IP structure 1260 can potentially be of different colors during the normal state, structure 1260 can use thirty-four color court-descriptive designations of the type shown in Table 3 provided that the parenthetical color headings in Table 3 are used, at least for the fixed colors of the FC area parts, because the fixed colors are variously embodied with fixed secondary color A' and non-line subordinate color B'. AD color B for line area 1262T is designated as normal-state line color BL. Altered color Y for print area 898 in each unit of VC region 886 in line area 1262T is designated as changed-state line color YL. The fixed color, usually largely color B, of FC line area 1264T is designated as fixed line color FL.

SC portions 1270 and parts 1276EN and 1276EF (collectively "1276E") of OB portions 1276 along baselines 28 are usually at least 15 cm, preferably at least 20 cm, more preferably at least 25 cm, wide and are usually no more than 35 cm, preferably no more than 30 cm, wide. BC portions 1272, HA portions 1274, and parts 1276DNL, 1276DNR, 1276DFL, and 1276DFR (collectively "1276D") of OB portions 1276 along doubles sidelines 46 are usually at least 10 cm, preferably at least 15 cm, more preferably at least 20 cm, wide and are usually no more than 30 cm, preferably no more than 25 cm, wide.

Singles/doubles tennis IP structures 1230 and 1260 are considered largely together in the following material.

The normal-state colors of VC court portions 1240, 1242, 1244, and 1246 or 1270, 1272, 1274, or 1276 are the same in one embodiment of IP structure 1230 or 1260. In another embodiment, the normal-state colors of portions 1240, 1242, and 1244 or 1270, 1272, and 1274 are the same and differ materially from the normal-state color of OB portions 1246 or 1276. In a third embodiment, the normal-state colors of SC portions 1240NL and 1240FR or 1270NL and 1270FR are a first color, the normal-state colors of SC portions 1240NR and 1240FL or 1270NR and 1270FL are a second color, the normal-state colors of BC portions 1242 or 1272 are a third color, and the normal-state colors of HA portions 1244 or 1274 are a fourth color where the four numbered colors differ materially from one another and from the normal-state color of OB portions 1246 or 1276.

The changed-state color of SC portion 1240NL, 1240NR, 1240FL, or 1240FR can selectively differ materially among SC parts 1240ANL, 1240SNL, and 1240CNL, 1240ANR, 1240SNR, and 1240CNR, 1240AFL, 1240SFL, and 1240CFL, or 1240AFR, 1240SFR, and 1240CFR. The changed-state color of BC portion 1242N or 1242F can selectively differ materially among BC parts 1242EN, 1242SN, 1242BNL, and 1242BNR or 1242EF, 1242SF, 1242BFL, and 1242BFR. The changed-state color of HA portion 1244NL, 1244NR, 1244FL, or 1244FR can selectively differ materially among HA parts 1244DNL, 1244ENL, 1244BNL, and 1244ANL, 1244DNR, 1244ENR, 1244BNR, and 1244ANR, 1244DFL, 1244EFL, 1244BFL, and 1244AFL, or 1244DFR, 1244EFR, 1244BFR, and 1244AFR. The changed-state color of OB portion 1246N or 1246F can selectively differ materially among OB parts 1246DNL, 1246ENL, 1246ENC, 1246ENR, and 1246DNR or 1246DFL, 1246EFL, 1246EFC, 1246EFR, and 1246DFR. Similarly, the changed-state color of OB portion 1276N or 1276F can selectively differ materially among OB parts 1276DNL, 1276ENL, 1276ENC, 1276ENR, and 1276DNR or 1276DFL, 1276EFL, 1276EFC, 1276EFR, and 1276DFR. Changed-state line color YL can selectively differ materially from the changed-state colors of VC court portions 1240, 1242, 1244, and 1246 or 1270, 1272, 1274, and 1276.

Taking note of the above-described areas critical to making in/out determination on balls impacting at/near lines 28, 30, 34, 36, and 46, changed-state line color YL in a first embodiment of IP structure 1230 or 1260 differs materially from the changed-state LA colors of CLA SC parts 1240C, SVLA BC parts 1242S, and singles SLA HA parts 1244ANL, 1244ANR, 1244AFL, and 1244AFR (collectively "1244A") or CLA SC portions 1270, SVLA BC portions 1272, and singles SLA HA parts 1274ANL, 1274ANR, 1274AFL, and 1274AFR (collectively "1274A") for assisting an observer in visually making in/out determinations on object 104 embodied with a served ball impacting at/near the outside edge of at least one of centerline 36, servicelines 34, and parts 1232ANL, 1232ANR, 1232AFL, and 1232AFR (collectively "1232A") or 1262ANL, 1262ANR, 1262AFL, and 1262AFR (collectively "1262A") of singles sidelines 30. In a second embodiment, line color YL differs materially from the changed-state LA colors of singles SLA HA parts 1244Q and OB BLA parts 1246ENC and 1246EFC or single SLA HA portions 1274 and OB BLA parts 1276ENC and 1276EFC for assisting an observer in visually making in/out determinations on object 104 embodied with a returned ball impacting at/near the outside edge of one or more of singles sidelines 30 and parts 1232ENC and 1232EFC or 1262ENC and 1262EFC of baselines 28 during singles. In a third embodiment, color YL differs from the changed-state LA colors of OB LA portions 1246 or 1276 for assisting an observer in visually making in/out determinations on object 104 embodied with a returned ball impacting at/near the outside edge of one or more of baselines 28 and doubles sidelines 46 during doubles. A fourth embodiment has all the color differences of the second and third embodiments. A fifth embodiment has all the color differences of the first, second, and third embodiments.

IP structures 1230 and 1260 are now further described in three-dimensional structural terminology adapted to tennis where color regions 906 and 908 and color SF zones 912 and 914 are respectively replaced with color regions 106 and 108 and color SF zones 112 and 114 as described above. For this structural description, each VC line structure consists of one or more units of AD VC region 886 extending to surface 102 at a VC line area constituted with part or all of VC line area 1232T or 1262T. Each other VC structure, i.e., each VC LA structure, consists of one or more units of PP VC region 106 at a corresponding VC LA area. Each FC line structure consists of one or more units of subordinate FC region 888 extending to surface 102 at an FC line area. Each other FC structure consists of one or more units of secondary FC region 108 extending to surface 102 at a corresponding FC area.

Each IP structure 1230 or 1260 consists, for singles, of total singles IB structure and total singles OB structure extending to surface 102 respectively at singles IB playing area 22 and singles OB playing area 24. The total singles OB structure laterally surrounds the total singles IB structure and adjoins it along its entire lateral boundary so that OB area 24 surrounds IB area 22 and adjoins it along its entire perimeter. The total singles IB structure is formed with IB SC structure, singles IB BC structure, and singles IB line structure.

The IB SC structure which extends to surface 102 at IB SC area formed with servicecourts 38 consists of VC LA SC structure and FC SC structure. The VC LA SC structure consists of four VC LA SC structure portions extending to surface 102 respectively at LA SC area portions 1240 or 1270 that form VC LA SC area. The FC SC structure consists of four FC SC structure parts extending to surface 102 respectively at SC area parts 1250 or 1280. The singles IB BC structure which extends to surface 102 at singles IB BC area formed with backcourts 40 consists of VC singles LA BC structure and FC singles BC structure. The VC singles LA BC structure consists of two spaced-apart VC singles LA BC structure portions extending to surface 102 respectively at two spaced-apart VC singles LA BC area portions, one for each half court, that form VC singles LA BC area. Each VC singles LA BC area portion consists of an LA BC area portion 1242 or 1272. The FC singles BC structure consists of two spaced-apart FC singles BC structure parts extending to surface 102 respectively at BC area parts 1252 or 1282.

The singles IB line structure extends to surface 102 at singles IB line area formed with singles sidelines 30, servicelines 34, centerline 36, and the parts of baselines 28 lying between sidelines 30. The singles IB line structure consists of VC singles line structure and potentially FC singles line structure as arises in IP structure 1260. The VC singles line structure extends to surface 102 at composite VC singles line area formed with the portion of line area 1232T or 1262T at sidelines 30, servicelines 34, centerline 36, and the parts of baselines 28 lying between sidelines 30. The composite VC singles line area is specifically formed with near and far VC singles line areas respectively in the near half and far courts. The near VC singles line area consists of line parts 1232ENC, 1232SNL, 1232SNR, 1232QNL, 1232QNR, and 1232CN or 1262ENC, 1262SNL, 1262SNR, 1262QNL, 1262QNR, and 1262CN. The far VC singles line area consists of line parts 1232EFC, 1232SFL, 1232SFR, 1232QFL, 1232QFR, and 1232CF or 1262EFC, 1262SFL, 1262SFR, 1262QFL, 1262QFR, and 1262CF. The FC singles line structure, if present, extends to surface 102 at FC singles line area consisting of one or more parts of the singles IB line area beyond (or outside) the VC singles line area. The FC singles line area for IP structure 1260 consists of line parts 1264A and 1264C.

The total singles OB structure consists of VC singles OB LA structure and "FC singles OB structure". The VC singles OB LA structure consists of two VC singles OB LA structure portions extending to surface 102 respectively at two VC singles OB LA area portions that form VC singles OB LA area. Each VC singles OB LA area portion consists at least of the part of an OB LA portion 1246 or 1276 lying along a shortened baseline 28, i.e., the part of a baseline 28 between singles sidelines 30, and preferably includes the area of LA HA portions 1244 or 1274 along lines 30 so as to form a ⊔-shaped area portion discontinuous at the corners. In particular, the VC singles OB LA area portion along the near or far half court in IP structure 1230 preferably consists of central OB BLA part 1246ENC or 1246EFC and singles SLA HA parts 1244QNL and 1244QNR or 1244QFL and 1244QFR. The VC singles OB LA area portion along the near or far half court in IP structure 1260 preferably consists of central OB BLA part 1276ENC or 1276EFC and singles SLA HA portions 1274NL and 1274NR or 1274FL and 1274FR.

The FC singles OB structure extends to surface 102 at "FC singles OB area" formed with the part of singles OB area 24 beyond the VC singles OB area. During singles, any color change occurring in any part of the FC singles OB area due to that part being a VC part for doubles is ignored. Each such VC doubles part of the FC singles OB area is treated as being fixed color during singles. Alternatively, the CC capability of each such VC doubles part of the FC singles OB area is deactivated (or disabled) for singles as described below. The FC singles OB area for IP structure 1230 consists of HA parts 1254, doubles OB part 1256, and the intervening FC-treated or CC-deactivated parts of VC HA portions 1244, line area 1232T, and OB portions 1246. The FC singles OB area for IP structure 1260 consists of HA parts 1284, doubles OB part 1286, and the intervening FC-treated or CC-deactivated parts of VC line area 1262T and OB portions 1276. The VC singles OB area partly occupies singles OB area 24 so that the VC and FC singles OB areas form OB area 24.

Each IP structure 1230 or 1260 consists, for doubles, of total doubles IB structure and total doubles OB structure respectively extending to surface 102 at doubles IB area 42 and doubles OB area 44. The total doubles OB structure laterally surrounds the total doubles IB structure and adjoins it along its entire lateral boundary so that OB area 44 surrounds IB area 42 and adjoins it along its entire perimeter. The total doubles IB structure is formed with the IB SC structure described above, doubles IB BC structure, IB alley (or HA) structure, and doubles IB line structure.

The doubles IB BC structure which, as with the singles IB BC structure, extends to surface 102 at doubles IB BC area formed with backcourts 40 consists of "VC doubles LA BC structure" and "FC doubles BC structure". The VC doubles LA BC structure consists of two spaced-apart VC doubles LA BC structure portions extending to surface 102 respectively at two spaced-apart "VC doubles LA BC area portions", one for each half court, that form VC doubles LA BC area. Each VC doubles LA BC area portion consists of the parts of an LA BC portion 1242 along serviceline 34 and baseline 28 in a backcourt 40 so as to partly occupy that backcourt 40 or an LA BC portion 1272 situated in, and partly occupying, a backcourt 40. Specifically, each VC doubles LA BC area portion for IP structure 1230 consists of LA BC parts 1242SN and 1242EN or 1242SF and 1242EF. Each VC doubles LA BC area portion for IP structure 1260 consists of LA BC portion 1272N or 1272F.

Singles SLA BC parts 1242B in IP structure 1230 may be included in the VC doubles LA BC area if the CC capability of those SLA BC area parts is activated (or enabled) during doubles. Any color change occurring only at any of those VC singles SLA BC area parts is ignored in doubles. Alternatively, the CC capability in those VC singles SLA BC area parts is deactivated for doubles as described below so that they are excluded from the VC doubles LA BC area. The FC doubles BC structure consists of two spaced-apart FC doubles BC structure parts extending to surface 102 respectively at two spaced-apart "FC doubles BC area parts". Each FC doubles BC area part consists of a BC part 1252N or 1252F including, if their CC capability is deactivated during doubles, VC singles SLA BC parts 1242BNL and 1242BNR or 1242BFL and 1242BFR in a backcourt 40N or 40F or a BC part 1282 in a backcourt 40.

The IB alley structure which extends to surface 102 at IB alley area formed with alleys 48 consists of VC LA alley (or HA) structure and FC alley (or HA) structure. The VC LA alley structure consists of four VC singles LA HA structure portions extending to surface 102 respectively at LA HA area portions 1244 or 1274 that form VC singles LA alley (or HA) area. The FC alley structure consists of four FC HA structure parts extending to surface 102 respectively at HA area parts 1254 or 1284.

The doubles IB line structure extends to surface 102 at doubles IB line area formed with baselines 28, servicelines 34, centerline 36, doubles sidelines 46, and the parts of singles sidelines 30 along servicecourts 38. The doubles IB line structure consists of VC doubles line structure and potentially FC doubles line structure as arises in IP structure 1260. The VC doubles line structure extends to surface 102 at VC doubles line area formed with the part of VC line area 1232T or 1262T at baselines 28, servicelines 34, centerline 36, doubles sidelines 46, and the parts of singles sidelines 30 adjoining servicecourts 38.

Singles sideline parts 1232BNL, 1232BNR, 1232BFL, and 1232BFR (collectively "1232B") or 1262BNL, 1262BNR, 1262BFL, and 1262BFR (collectively "1262B") adjoining backcourts 40 may be included in the VC doubles line area if the CC capability in those BC-adjoining VC singles sideline area parts is activated during doubles. Any color change occurring only at those VC singles sideline area parts is ignored in doubles. Alternatively, the CC capability in those VC singles sideline area parts is deactivated for doubles as described below so that they are excluded from the VC doubles line area. The VC doubles line area specifically consists of line parts 1232SNL, 1232SNR, 1232SFL, and 1232SFR (collectively "1232S"), 1232ENL, 1232ENC, 1232ENR, 1232EFL, 1232EFC, and 1232EFR (collectively "1232E"), 1232DNL, 1232DNR, 1232DFL, and 1232DFR (collectively ("1232D"), 1232A, and 1232C or 1262SNL, 1262SNR, 1262SFL, and 1262SFR (collectively "1262S"), 1262ENL, 1262ENC, 1262ENR, 1262EFL, 1262EFC, and 1262EFR (collectively "1262E"), 1262DNL, 1262DNR, 1262DFL, and 1262DFR (collectively "1262D"), 1262A, and 1262C and BC-adjoining singles sideline parts 1232B or 1262B if their CC capability is activated during doubles.

The FC doubles line structure, if present, extends to surface 102 at FC doubles line area consisting of the parts of the doubles IB line area beyond the VC doubles line area. The FC doubles line area for IP structure 1260 consists of line parts 1264A, 1264C, and 1264D.

The total doubles OB structure consists of VC doubles OB LA structure and FC doubles OB structure. The VC doubles OB LA structure consists of two VC doubles OB LA structure portions extending to surface 102 respectively at doubles OB LA portions 1246 or 1276 that form VC doubles OB LA area. The FC doubles OB structure extends to surface 102 at FC doubles OB area formed with doubles OB area part 1256 or 1286 beyond the VC doubles OB area.

Each IP structure 1230 or 1260 consists, for singles and doubles, of total singles/doubles IB structure and total singles/doubles OB structure respectively extending to surface 102 at doubles areas 42 and 44. The total singles/doubles IB structure is formed with the IB SC structure, the singles IB BC structure, the IB alley (or HA) structure, and singles/doubles IB line structure extending to surface 102 at singles/doubles IB line area formed with lines 28, 30, 34, 36, and 46. The singles/doubles IB line structure consists of VC singles/doubles line structure and potentially FC singles/doubles line structure as arises in IP structure 1260. The VC singles/doubles line structure extends to surface 102 at composite VC singles/doubles line area formed with line area 1232T or 1262T. The FC singles/doubles line structure, if present, extends to surface 102 at FC singles/doubles line area consisting of the parts of the singles/doubles IB line area beyond the VC singles/doubles line area. The FC singles/doubles line area for structure 1260 consists of singles/doubles line area 1264T. The total singles/doubles OB structure which laterally surrounds the total singles/doubles IB structure and adjoins it along its entire lateral boundary, consists of VC singles/doubles OB LA structure and FC singles/doubles OB structure respectively formed with the VC and FC doubles OB structures.

Each VC LA SC, VC singles LA BC, VC LA HA, or VC doubles OB LA structure portion normally appears along its SC area portion (1240 or 1270), singles BC area portion (1242 or 1272), HA area portion (1244 or 1274), or doubles OB area portion (1246 or 1276) as a PP SC color ASC, PP BC color ABC, PP HA color AHA, or PP OB color AOB embodying PP color A. Each VC doubles LA BC or VC singles OB LA structure portion normally appears along its doubles BC or singles OB area portion (described above) as color ABC or AOB. The VC singles or doubles line structure normally appears along the VC singles or doubles line area (described above) as AD line color BL embodying AD color B.

Using the designations in Table 3, SC color ASC is color ASNL for SC portion 1240NL or 1270NL, color ASNR for SC portion 1240NR or 1270NR, color ASFL for SC portion 1240FL or 1270FL, and color ASFR for SC portion 1240FR or 1270FR. BC color ABC is color ABN for singles BC portion 1242N or 1272N and color ABF for singles BC portion 1242F or 1272F. Similarly, color ABC is color ABN for the VC doubles BC area portion in the near half court and color ABF for the VC doubles BC area portion in the far half court. HA color AHA is color AHNL for HA portion 1244NL or 1274NL, color AHNR for HA portion 1244NR or 1274NR, color AHFL for HA portion 1244FL or 1274FL, and color AHFR for HA portion 1244FR or 1274FR. OB color AOB is the same for both doubles OB portions 1246 or 1276 and for both singles OB area portions.

IDVC portion 138 of a VC LA SC, singles LA BC, LA HA, or doubles OB LA structure portion responds to object 104 impacting the SC area portion (1240 or 1270), singles BC area portion (1242 or 1272), HA area portion (1244 or 1274), or doubles OB area portion (1246 or 1276) of that structure portion at OC area 116 by temporarily appearing as a changed SC color XSC, changed BC color XBC, changed HA color XHA, or changed OB color XOB embodying changed color X and materially different from color ASC, ABC, AHA, or AOB of that structure portion if the impact meets PP basic TH impact criteria of that structure portion. Portion 138 of a VC doubles LA BC or singles OB LA structure portion responds to object 104 impacting the doubles BC or singles OB area portion (described above) of that structure portion at area 116 by temporarily appearing as color XBC or XOB of that structure portion if the impact meets PP basic TH impact criteria of that structure portion. Each VC LA structure portion preferably includes components 182 and 184 typically implemented as in OI structure 200. IS segment 192 provides the PP general impact effect in response to object 104 impacting the area portion of that LA structure portion at area 116 if the impact meets the basic TH impact criteria of that structure portion. CC segment 194 responds to the PP impact effect, if provided, by causing portion 138 of that structure portion to temporarily appear as changed color XSC, XBC, XHA, XOB, XBC, or XOB.

Again using the designations in Table 3, SC color XSC is color XSNL for SC portion 1240NL or 1270NL, color XSNR for SC portion 1240NR or 1270NR, color XSFL for SC portion 1240FL or 1270FL, and color XSFR for SC portion 1240FR or 1270FR. BC color XBC is color XBN for singles BC portion 1242N or 1272N and color XBF for singles BC portion 1242F or 1272F. Similarly, color XBC is color XBN for the VC doubles BC area portion in the near half court and color XBF for the VC doubles BC area portion in the far half court. HA color XHA is color XHNL for HA portion 1244NL or 1274NL, color XHNR for HA portion 1244NR or 1274NR, color XHFL for HA portion 1244FL or 1274FL, and color XHFR for HA portion 1244FR or 1274FR. OB color XOB is color XOBN for doubles OB portion 1246N or 1276N and color XOBF for doubles OB portion 1246F or 1276F. Color XOB is also color XOBN for the singles OB area portion along the near half court and color XOBF for the singles OB area portion along the far half court.

IDVC portion 926 of the VC singles or doubles line structure responds to object 104 impacting the VC singles or doubles line area (described above) at OC area 896 by temporarily appearing as altered line color YL embodying altered color Y and materially different from AD color BL of the VC singles or doubles line structure if the impact meets AD basic TH impact criteria of the VC singles or doubles line structure. The VC singles or doubles line structure preferably includes IS component 932 and CC component 934 typically implemented as in OI structure 930. The ID segment of component 932 provides the AD general impact effect in response to the impact if it meets the basic TH impact criteria of the VC singles or doubles line structure. The ID segment of component 934 responds to the AD impact effect, if provided, by causing portion 926 to temporarily appear as altered color YL.

Object 104 is typically a (tennis) ball. The PP and AD basic TH impact criteria are then chosen to be suitable for expected impacts of balls on surface 102 during tennis play. For singles, color change occurs at each location of the VC LA SC, singles LA BC, singles OB LA, and singles line areas for ball impacts on surface 102 sufficient to meet the appropriate basic TH impact criteria. For doubles, color change similarly occurs at each location of the VC LA SC, doubles LA BC, LA alley, doubles OB LA, and doubles line areas for ball impacts on surface 102 sufficient to meet the appropriate basic TH impact criteria.

The critical edge of each line 28, 30, 34, or 46 is, as indicated above, its outside edge since a ball embodying object 104 is "out" only if the ball impacts surface 102 fully beyond (or outside) line 28, 30, 34, or 46 insofar as it defines an in/out location. The highest location priority for providing lines 28, 30, 34, and 46 with CC capability is elongated area, usually straight, lying directly along the outside edge of each line 28, 30, 34, or 46 as occurs with VC court parts/portions 1242S, 1244Q, and 1246 or 1272, 1274, and 1276.

The CC capability is, for instance, provided as highest CC location priority in elongated area directly along the critical outside edge of the composite boundary line consisting (a) for singles of shortened baselines 28 and singles sidelines 30 and (b) for doubles of baselines 28 and doubles sidelines 46. Since each edge of centerline 36 for a served ball variously constitutes the outside, and thus critical, edge depending on servicecourt 38 to which the ball is to be directed, the highest location priority for providing line 36 with CC capability is elongated area, usually straight, lying directly along each edge of line 36 as occurs with VC SC parts/portions 1240C or 1270. The next highest location priority for providing line 28, 30, 34, 36, or 46 with CC capability is all or part of line 28, 30, 34, 36, or 46 as occurs with VC line area 1232T or 1262T.

Alleys 48 are deleted in variations of IP structures 1230 and 1260 intended only for singles by deleting doubles sidelines 46 and the parts of baselines 28 along alleys 48 so that doubles sideline parts 1232D or 1262D and baseline parts 1232ENL, 1232ENR, 1232EFL, and 1232EFR or 1262ENL, 1262ENR, 1262EFL, and 1262EFR cease to exist. With baselines 28 shortened to extend only between singles sidelines 30, OB LA parts 1246D, 1246ENL, 1246ENR, 1246EFL, and 1246EFR or 1276D, 1276ENL, 1276ENR, 1276EFL, and 1276EFR are also deleted along with doubles SLA HA parts 1244D and BLA HA parts 1244E. Remaining singles SLA HA parts/portions 1244Q or 1274 are extended to remaining OB BLA parts 1246ENC and 1246EFC or 1276ENC and 1276EFC along shortened baselines 28 and become parts of OB portions 1246 or 1276.

With HA court portions 1244 or 1274 so adjusted, the VC singles OB structure in the singles-only variation of IP structure 1230 or 1260 consists of two VC singles OB structure portions extending to surface 102 respectively at two ⌴-shaped near VC singles OB area portions for the near and far half courts. The near VC singles OB area portion consists of so-adjusted OB LA parts 1244QNL, 1246ENC, and 1244QNR or 1274NL, 1276ENC, and 1274NR. The far VC singles OB area portion similarly consists of so-adjusted OB LA parts 1244QFL, 1246EFC, and 1244QFR or 1274FL, 1276EFC, and 1274FR. The VC singles OB area portions are usually symmetrical about the court's longitudinal axis and mirror images about the court's transverse axis. The portion of singles OB area 24 beyond the VC singles OB area portions is a rectangular annular remainder FC singles OB area portion which fully directly surrounds the VC singles OB area formed with the VC singles OB area portions.

The singles-only tennis IP structure operates basically the same as singles/doubles IP structure 1230 or 1260 used for singles except that alleys 48 are absent. In particular, the above description of the operation of structure 1230 or 1260 applies to the singles-only IP structure subject to ignoring the material dealing with the VC doubles LA BC, LA alley, doubles OB LA, and doubles line structures and replacing recitations of the VC singles OB LA structure with recitations of the VC singles OB LA structure as modified here.

Each of IP structures 1230 and 1260, including the singles-only variations, preferably contains CC controller 1114 or 1134 either for implementing IP structure 1110 or 1130 that includes OI structure 900 or 1100 or for implementing IP structure 1170 or 1200 that includes both OI structure 900 or 1100 and IG system 1152 or 1182. Controller 1114/1134 here preferably operates as an intelligent controller as described above. In that case, controller 1114/1134 usually causes color change only when the impact characteristics meet the PP, AD, FR, or CP expanded impact criteria for a ball impact where the FR expanded impact criteria are again replaced with PP expanded impact criteria for the reasons presented above. Color change generally does not occur when an object, such as a shoe, whose print area differs from that of a ball impacts the court. If a ball lies on the court at a location having the CC capability, a temporary color change either does not occur if the ball's impact with the court is insufficient to meet the PP, AD, or CP general or cellular TH impact criteria or does not persist beyond automatic length $\Delta t_{drau}$, usually no more than 60 s, often no more than 30 s, of CC duration $\Delta t_{dr}$ unless instruction 608 is supplied to controller 1114/1134 to increase duration $\Delta t_{dr}$.

The following occurs when controller 1114 is an intelligent controller. IDVC portion 138 of each VC LA SC, singles LA BC, LA HA, or doubles OB LA structure portion responds to object 104 impacting the SC area portion (1240 or 1270), singles BC area portion (1242 or 1272), HA area portion (1244 or 1274), or doubles OB area portion (1246 or 1276) of that structure portion at OC area 116 by providing a PP general CI impact signal if the impact meets the PP basic TH impact criteria of that structure portion. The impact signal identifies an expected location of print area 118 in that area portion and PP supplemental impact information for the impact. Controller 1114 responds to the impact signal by determining whether the PP supplemental impact information meets PP supplemental impact criteria of that structure portion and, if so, provides a PP general CC initiation signal to which that portion 138 responds by temporarily appearing as changed color XSC, XBC, XHA, or XOB. Portion 138 of a VC doubles LA BC or singles OB LA structure portion interacts with controller 1114 the same as portion 138 of a VC singles LA BC or doubles OB LA structure portion for potentially causing portion 138 of that structure portion to temporarily appear as color XBC or XOB. Each VC LA structure portion again preferably includes components 182 and 184 typically implemented as in OI structure 200. IS segment 192 provides a PP general impact signal in response to object 104 impacting the area portion of that LA structure portion at area 116 if the impact meets the basic TH impact criteria of that structure portion. CC segment 194 responds to the initiation signal, if provided, by causing portion 138 of that structure portion to temporarily appear as color XSC, XBC, XHA, XOB, XBC, or XOB.

An IDVC portion 926 of the VC singles or doubles line structure responds to object 104 impacting the VC singles or doubles line area at OC area 896 by providing an AD general CI impact signal if the impact meets the AD basic TH impact criteria of the VC singles or doubles line structure. The impact signal identifies an expected location of print area 898 in the VC singles or doubles line area and AD supplemental impact information for the impact. Controller 1114 responds to the AD general CI impact signal by determining whether the AD supplemental impact information meets AD supplemental impact criteria of the VC singles or doubles line structure and, if so, provides an AD general CC initiation signal to which that portion 926 responds by temporarily appearing as altered line color YL. The VC singles or doubles line structure again preferably includes IS component 932 and CC component 934 typically implemented as in OI structure 930. The ID segment of component 932 provides an AD general impact signal in response to the impact if it meets the basic TH impact criteria of the VC singles or doubles line structure. The ID segment of component 934 responds to the initiation signal, if provided, by causing that portion 926 to temporarily appear as color YL.

For an impact solely on SF zone 112 or 892 sufficient to meet the PP or AD basic TH impact criteria, controller 1114 determines whether the PP or AD general supplemental impact information meets the PP or AD supplemental impact criteria implemented to be characteristic of a ball impacting surface 102. For an impact simultaneously on zones 112 and 892 sufficient to meet the CP basic TH impact criteria, controller 1114 determines whether the CP general supplemental impact information meets the CP supplemental impact criteria implemented the same to be characteristic of a ball impacting surface 102.

Print area 118 or 898 is usually roughly elliptical for a ball impact. The short diameter of the rough ellipse for a ball impact is typically in the vicinity of half the diameter of a ball dependent on various factors including the impact angle, vertical impact speed, and court characteristics. The ratio of the long ellipse diameter to the short ellipse diameter for a ball impact depends on various factors including the impact angle, lateral impact speed, and court characteristics. The ellipse diameter ratio typically varies from 1 (circular) to 3 or 4. This information is used to incorporate ball size and/or shape specifications into the PP, AD, and CP supplemental impact criteria. Inasmuch as the shoeprint of a person such as a tennis player is almost invariably considerably different from the size and shape of area 118 or 898 for a ball impact, controller 1114 causes color changes to occur at object-impact locations when balls impact the court but largely not when peoples' shoes impact the court. With OC duration $\Delta t_{oc}$ typically being 4-5 ms, invariably less than 10 ms, for a ball impacting a tennis court, the PP, AD, and CP supplemental impact criteria can include OC duration criteria in which maximum reference OC duration value $\Delta t_{ocrh}$ is chosen as described above for the PP supplemental impact criteria to be suitably greater than 5 ms but suitably less than the time period during which either shoe of a person contacts the court.

The operation is basically the same when controller 1134 is an intelligent controller here. The PP or AD cellular CI impact signals provided from all TH CM cells 404 or 1084 to controller 1134 embody the PP general CI impact signal. The PP or AD cellular CC initiation signals provided by controller 1134 to all full CM cells 404 or 1084 embody the PP general CC initiation signal.

Object 104 embodied with a (tennis) ball is termed ball 104 in the following material dealing with IP structures 1230 and 1260. One part, termed the VC service strip, of the units of VC regions 106 and 886 is used in determining whether ball 104 is "in" or "out" after it is served. Another part, termed the VC return strip, of the units of regions 106 and 886 is used in determining whether ball 104 is "in" or "out" during subsequent return play. The VC service strip differs from the VC return strip which differs between singles and doubles. The service strip and the return strip for singles have four common portions, termed VC sideline common substrips, extending along singles sidelines 30 on both sides of the net line so that each VC sideline common substrip is associated with a different one of servicecourts 38.

The VC service strip consists of (a) the units of VC region 886 extending to surface 102 at VC service-strip line area formed with the VC area at centerline 36, servicelines 34, and the parts of singles sidelines 30 extending between servicelines 34 and (b) the units of region 106 extending to surface 102 at VC service-strip LA area formed with the VC area lying fully along the VC service-strip line area. The VC service-strip line area consists of line parts 1232C, 1232S, and 1232A or 1262C, 1262S, and 1262A. The VC service-strip LA area consists of LA parts/portions 1240, 1242S, 1244A or 1270, 1272, and 1274A. The service-strip line and LA areas form VC service-strip composite area.

The VC return strip for singles consists of (a) the units of VC region 886 extending to surface 102 at singles VC return-strip line area formed with the VC area at singles sidelines 30 and the portions of baselines 28 extending between sidelines 30 and (b) the units of VC region 106 extending to surface 102 at singles VC return-strip LA area formed with the VC area lying fully along the singles VC return-strip line area. The singles VC return-strip line area consists of line parts 1232QNL, 1232QNR, 1232QFL, and 1232QFR (collectively "1232Q"), 1232ENC, and 1232EFC or 1262QNL, 1262QNR, 1262QFL, and 1262QFR (collectively 1262Q"), 1262ENC, and 1262EFC. The singles VC return-strip LA area consists of LA parts/portions 1240A, 1242B, 1242E, 1244Q, 1246ENC, and 1246EFC or 1274, 1276ENC, and 1276EFC. The singles return-strip line and LA areas form singles VC return-strip composite area.

The VC return strip for doubles consists of (a) the units of VC region 886 extending to surface 102 at doubles VC return-strip line area formed with the VC area at doubles sidelines 46 and baselines 28 and (b) the units of VC region 106 extending to surface 102 at doubles VC return-strip LA area formed with the VC area lying fully along the doubles VC return-strip line area. The doubles VC return-strip line area consists of line parts 1232D and 1232E or 1262D and 1262E. The doubles VC return-strip LA area consists of LA parts/portions 1242E, 1244E, 1244D, and 1246 or 1276. The doubles return-strip line and LA areas form doubles VC return-strip composite area.

Each VC sideline common substrip consists of (a) the units of VC region 886 extending to surface 102 at a VC sideline common line area formed with the VC area at the part of a sideline 30 lying fully along a different one of servicecourts 38 and (b) the units of VC region 106 extending to surface 102 at a VC sideline common LA area formed with the VC area lying fully along that VC sideline common line area. The VC sideline common line area for servicecourt 38NL consists of line part 1232ANL or 1262ANL. The VC sideline common LA area for servicecourt 38NL consists of LA part(s) 1240ANL and 1244ANL or 1274ANL. The VC sideline common line area for servicecourt 38NR consists of line part 1232ANR or 1262ANR. The VC sideline common LA area for servicecourt 38NR consists of LA part(s) 1240ANR and 1244ANR or 1274ANR. The VC sideline common line area for servicecourt 38FL consists of line part 1232AFL or 1262AFL. The VC sideline common LA area for servicecourt 38FL consists of LA part(s) 1240AFL and 1244AFL or 1274AFL. The VC sideline common line area for servicecourt 38FR consists of line part 1232AFR or 1262AFR. The VC sideline common LA area for servicecourt 38FR consists of LA part(s) 1240AFR and 1244AFR or 1274AFR. The sideline common line and LA areas for each servicecourt 38 form a VC sideline common composite area for that servicecourt's sideline common substrip.

A device, typically CC controller 1114/1134, controls the VC strips so that (a) the VC service strip is activated during tennis service, at least as ball 104 impacts surface 102 during service, and is inactivated (or inactive) during return play except, in singles, for the VC sideline common substrips and (b) the VC return strip for singles or doubles is activated during return play and is inactivated during service except, in singles, for the sideline common substrips. The service strip is except, in singles, for the sideline common substrips deactivated after return, or attempted return, of service during a point while ball 104 is crossing, or attempting to cross, over net 32 as the return strip for singles or doubles is activated, the sideline common substrips already being activated in singles. The sideline common substrips are thus continuously activated during a point in singles but, during a point in doubles, only activated during service. Both the service and return strips, including the sideline common substrips, are typically inactivated during time periods between points, e.g., to save power and reduce usage deterioration, but can variously be activated during in-between point periods.

One or more persons, such as one or more tennis officials, control the VC strips with a control switch for switching the return strip between singles and doubles and for switching each strip between activated and inactivated conditions subject to the sideline common substrips being continuously activated during a point in singles. The control switch can consist of (a) a two-position switch that switches the return strip between singles and doubles and (b) a three-position switch having (i) a first position in which the service strip is activated and the return strip is inactivated except, in singles, for the sideline common substrips, (ii) a second position in which the return strip is activated and the service strip is inactivated except, in singles, for the sideline common substrips, and (iii) a third position in which both strips are inactivated. The two-position switch is used to select the return strip for singles or doubles prior to a tennis match depending on whether it is singles or doubles. The three-position switch is used during play for activating and deactivating the VC strips as described above. Each control switch can be located on controller 1114/1134 or remote from it so as to communicate with it via a COM path. The person(s) operating each control switch can operate it manually or by voice in such a way as to avoid significantly disturbing the players.

Alternatively, controller 1114/1134 includes a shape-recognition capability for use in automatically activating and deactivating the VC strips as described above. Prior to a tennis match, controller 1114/1134 is adjusted to select the return strip for singles or doubles depending on whether the match is singles or doubles. IG structure 804, specifically image-collecting apparatus 808, generates a moving image of the server at least during tennis service and return play, typically continuously during play including in-between point periods. Controller 1114/1134 receives the moving image via a COM path and analyzes it using the shape-recognition capability to determine when the server is serving and when the server is in return play. When the shape-recognition capability indicates that the server is beginning the serve, controller 1114/1134 controls the strips so that the service strip is activated and the return strip for singles or doubles is inactivated subject, in singles, to the sideline common substrips being activated. When the shape-recognition capability indicates that the server has just completed the serve, controller 1114/1134 controls the strips so that the return strip for singles or doubles is activated and the service strip is inactivated subject, in singles, to the sideline common substrips being activated.

Tennis service during a game is performed with the server's feet positioned behind a specified one of baselines 28 to one side or the other of the center mark on that line 28 depending on the score of the game. Controller 1114/1134 may keep track of the game score and where the server should be positioned, relative to lines 28 and their center marks, for service at the beginning of each point. If so, controller 1114/1134 can using this scoring information and attendant expected server positioning information to assist the shape-recognition capability in determining when the server is beginning the serve.

By controlling the VC strips in the preceding way, impact of ball 104 on the return strip for singles or doubles immediately prior to service, e.g., as the server bounces ball 104 on or close to adjacent baseline 28, does not cause that return strip to undergo color change. Nor does impact of either of the server's shoes on the return strip for singles or doubles during service, i.e., immediately before, as, or immediately after the server strikes ball 104, cause that return strip to undergo color change. During return play, impact of ball 104 on or along centerline 36 or either serviceline 34 except where it meets singles sidelines 30 similarly does not cause color change. The requirements placed on controller 1114/1134 to act as an intelligent controller for differentiating between impacts intended to cause color change and impacts not intended to cause color change are considerably reduced. Controller 1114/1134 may sometimes even simply be a duration controller depending on how the strip activation/deactivation is achieved.

The VC service strip can be allocated into four partially overlapping portions, termed VC QC substrips, one for each servicecourt 38. Each VC QC substrip lies fully along a servicecourt 38 and thus along a singles sideline 30, a serviceline 34, and centerline 36. When ball 104 is to be directed toward a servicecourt 38 during tennis service, that servicecourt's QC substrip, termed the designated QC substrip, can be used in determining whether served ball 104 is "in" or "out". Each VC QC substrip and the VC return strip for singles have a common portion formed with a different one of the VC sideline common substrips. The two QC substrips in each half court have a common portion, referred to as a VC centerline common substrip, extending along centerline 36 for a total of two VC centerline common substrips.

Each VC QC substrip consists of (a) the units of VC region 886 extending to surface 102 at a VC QC substrip line area formed with the VC area at the part of centerline 36 lying fully along a different one of servicecourts 38, the part of a serviceline 34 lying fully along that servicecourt 38, and the part of a singles sideline 30 lying fully along that servicecourt 38 and (b) the units, as present, of VC region 106 extending to surface 102 at a VC QC substrip LA area formed with the VC area lying fully along the VC QC substrip line area. The VC QC substrip line and LA areas for each servicecourt 38 form a VC QC substrip composite area for that servicecourt's QC substrip. Each VC centerline common substrip consists of (a) the units of region 886 extending to surface 102 at a VC centerline common line area formed with the VC area at the part of centerline 36 in each half court and (b) the units, as present, of regions 106 extending to surface 102 at a VC centerline common LA area formed with the VC area lying fully along the VC centerline common line area. The VC centerline common line and LA areas for each half court form a VC centerline common composite area for that half court's centerline common substrip.

Instead of controlling the VC service strip as described above, CC controller 1114/1134 provides a capability for controlling the VC QC substrips so that (a) the designated QC substrip is activated during service of a point, at least as ball 104 impacts surface 102 during tennis service, and is inactivated during return play of that point except, in singles, for that section's sideline common substrip and (b) the three QC substrips for the other three servicecourts 38 are inactivated during both service and return play of that point except, in singles, for those three sections' sideline common substrips. The designated QC substrip is except, in singles, for that substrip's sideline common substrip deactivated after return, or attempted return, of service during a point while ball 104 is crossing, or attempting to cross, over net 32 as the return strip for singles or doubles is activated, the sideline common substrips already being activated in singles. The sideline common substrips thus are continuously activated during a point in singles but, during a point in doubles, only the sideline common substrip for the designated QC substrip is activated and only during service. Also, the centerline common substrip of each pair of QC substrips on each side of net 32 is activated whenever one of those two QC substrips, e.g., the designated QC substrip, is activated. All four QC substrips and both centerline common substrips are typically inactivated during time periods between points but can be activated during in-between point periods.

The VC QC substrips are typically controlled by a person, such as a tennis official, using a control switch for suitably switching the return strip and each QC substrip between activated and inactivated conditions subject to the sideline common substrip of the designated QC substrip being continuously activated during a point in singles. The control switch can consist of (a) a two-position switch for switching the return strip between singles and doubles, (b) a four-position switch for selecting designated servicecourt 38 and thus the designated QC substrip, and (c) a three-position switch having (i) a first position in which the designated QC substrip, including its sideline common and centerline common substrips, is activated while the other three QC substrips, including their sideline common substrips and the other centerline common substrip, and the return strip are inactivated, (ii) a second position in which the return strip is activated and all four QC substrips, including both centerline common substrips, are inactivated except, in singles, for the four sideline common substrips, and (iii) a third position in which the return strip and all four QC substrips, including all four sideline common substrips and both centerline common substrips, are inactivated. The two-position switch is again used to select the return strip for singles or doubles prior to a tennis match depending on whether it is singles or doubles. The four-position and three-position switches are used during play for activating and deactivating the return strip and the QC substrips as described above.

In one variation of IP structure 1230 or 1260 applicable to both a singles/doubles implementation and a singles-only variation, the present CC capability is provided only along servicecourts 38 for use in determining whether ball 104 is "in" or "out" during service. That is, only VC line parts 1232C, 1232S, and 1232A or 1262C, 1262S, and 1262A and VC LA parts/portions 1240, 1242S, and 1244A or 1270, 1272, and 1274A are present. During service, the receiving player virtually never steps on any of the VC line and LA area parts situated at and alongside designated servicecourt 38 to which served ball 104 is directed. The partner of the receiving player during service in doubles similarly rarely, if ever, ever steps on any of the VC line and LA area parts situated at and alongside designated servicecourt 38. In view of this, there is no need during service to distinguish between impacts of ball 104 on surface 102 and other impacts on it. Controller 1114/1134 is not usually present in this variation.

Letting an "out" VC LA structure portion mean a VC LA structure portion (or part) for which an impact is "out" if print area 118 is spaced apart from VC line area 1232T or 1262T, controller 1114/1134 preferably operates as an intelligent controller using the location-dependent version of the CC capability to control the color changing so that IDVC portion 138 of any "out" VC LA structure portion appears as (i) first changed color $X_1$ if area 118 of the LA area portion (or part) of that structure portion adjoins line area 1232T or 1262T and (ii) second changed color $X_2$ different from color $X_1$ if area 118 of the area portion of that structure portion is spaced apart from line area 1232T or 1262T. Colors $X_1$ and $X_2$ here are respective different embodiments of each changed color XSNL, XSNR, XSFL, XSFR, XBN, XBF, XHNL, XHNR, XHFL, XHFR, XOBN, or XOBF. Color $X_1$ is preferably the same for all "out" LA structure portions. Color $X_2$ is also preferably the same for all "out" LA structure portions.

During service toward designated servicecourt 38, the appearance of print area 118 of any of the VC LA area portions, including any segment of those portions, adjoining the part of VC line area 1232T or 1262T along the outside edge of that servicecourt 38 as color $X_1$ indicates that served ball 104 is "in" because having area 118 of each such LA area portion adjoin line area 1232T or 1262T means that ball 104 impacted the part of area 1232T adjoining that servicecourt 38 whereas the appearance of each such LA portion as color $X_2$ indicates that ball 104 is "out" because having area 118 of that LA area portion be spaced apart from area 1232T or 1262T means that ball 104 failed to impact the part of area 1232T or 1262T adjoining that servicecourt 38 except for the rare instances in which ball 104 simultaneously impacts both that LA portion and FC line area 1264T in IP structure 1260 without impacting area 1262T. A viewer, e.g., a player or an official, can nearly always determine whether served ball 104 impacts surface 102 "in" or "out" in IP structure 1230 or 1260 by simply examining the color of area 118. If ball 104 simultaneously impacts such an LA portion and FC line area 1264T in structure 1260 without impacting VC line area 1262T, area 118 lacks the shape for a ball impacting surface 102 at a service "out" location so as to indicate that the in/"out" status of ball 104 is unclear.

The appearance of print area 118 of any of the VC LA area parts adjoining IB area 22 or 42 along baselines 28 or/and sidelines 30 or 46, as color $X_1$ during return play in singles or doubles in IP structure 1230 indicates that returned ball 104 is "in" because having area 118 of each such LA area part adjoin area 22 or 42 means that ball 104 impacted area 22 or 42 along baselines 28 or/and sidelines 30 or 46 whereas the appearance of each such LA part as color $X_2$ indicates that ball 104 is "out" because having area of that LA area part be spaced apart from area 22 or 42 means that ball 104 failed to impact area 22 or 42 along baselines 28 or/and sidelines 30 or 46. In IP structure 1260, the appearance of area 118 of any of the VC LA area parts adjoining IB area 22 or 42 along baselines 28 or/and sidelines 30 or 46, as color $X_1$ during singles or doubles return play similarly indicates that ball 104 is "in" whereas the appearance of each such LA part as color $X_2$ indicates that ball 104 is "out" except for the rare instances in which ball 104 simultaneously impacts both that LA part and FC line area 1264T without impacting VC line area 1262T. A viewer can again nearly always determine whether returned ball 104 impacts surface 102 "in" or "out" in structure 1230 or 1260 by simply examining the color of area 118. If ball 104 simultaneously impacts such an LA part and FC line area 1264T in structure 1260 without impacting VC line area 1262T, area 118 lacks the shape for a ball impacting surface 102 at a returned "out" location so as to indicate unclarity in the in/out status of ball 104.

Using the sound-generation capability, controller 1114/1134 optionally generates an audible sound indicating that ball 104 is "out", e.g., the word "out" in English, when ball 104 impacts a selected portion of surface 102 where ball 104 is "out" without simultaneously impacting a portion of surface 102 where ball 104 is "in". The portion of surface 102 where ball 104 is "out" embodies one or more of SF zones 112 and 892. An audible "out" sound is specifically optionally generated in IP structure 1230 or 1260 (a) during tennis service if ball 104 impacts any one or more of the parts of VC court portions 1240, 1242, and 1244 or 1270, 1272, and 1274 along, but outside, designated servicecourt 38 to which ball 104 is directed without simultaneously impacting any part of VC line area 1232T or 1262T along that servicecourt 38, (b) during singles return play if ball 104 impacts any one or more of the parts of VC court portions 1244 and 1246 or 1274 and 1276 along singles IB area 22 without simultaneously impacting any part of line area 1232T or 1262T along IB area 22, and (c) during doubles return play if ball 104 impacts either of VC OB portions 1246 or 1276 without simultaneously impacting any part of area 1232T or 1262T along doubles IB area 42.

Impact of ball 104 on surface 102 usually results in an audible ball-impact sound that starts during OC duration $\Delta t_{oc}$, typically 4-5 ms, extending from object-impact time $t_{ip}$ to OS time $t_{os}$. The out-indicating sound made for ball 104 landing "out" preferably starts both soon after the start of the ball-impact sound so as to be clearly associated with the impact and sufficiently later than the start of the ball-impact sound to avoid having it materially affect the clarity of the out-indicating sound. In particular, the out-indicating sound starts at least 0.1 s, preferably at least 0.25 s, after OS time $t_{os}$ and no more than 1 s, preferably no more than 0.75 s, more preferably no more than 0.5 s, after time $t_{os}$.

IP structure 1230 or 1260 could provide an audible sound indicating that ball 104 is "in", e.g., the word "in" in English, when ball 104 impacts surface 102 at any CC location not fully outside designated servicecourt 38 during tennis service, not fully outside singles IB area 22 during singles return play, and not fully outside doubles IB area 42 during doubles return play. However, such a sound is usually not provided because (a) it would be distracting to the tennis players and (b) the non-occurrence of a sound indicating that ball 104 hitting in the immediate vicinity of that location is "out" means that ball 104 is "in".

The invention's CC capability can be implemented in various tennis situations besides those described above. For instance, the CC capability can be provided (a) along the top of tennis net 32 to determine if an otherwise "good" served ball 104 grazed net 32 in passing over it and must be replayed and (b) along baselines 28 to assist in determining whether a foot fault occurs during service for which controller 1114/1134 functions as an intelligent controller sensitive to the shape of a shoe embodying object 104.

Exclusive of the material embodying the units of VC regions 106 and 886, surface 102 in IP structure 1230 or 1260, including any of its above-described variations, is typically formed with hard-court material or clay. To avoid or reduce using velocity-restitution matching described below, the present CC capability can be provided only in one or more of the following places in clay-court variations of structure 1230 or 1260 (a) at baselines 28 and or/and along their outside edges, i.e., by line parts 1232E or 1262E or/and LA parts 1246E or 1276E, (b) at shortened baselines 28 and or/and along their outside edges, i.e., by line parts 1232ENC and 1232EFC or 1262EFC and 1262EFC or/and LA parts 1246ENC and 1246EFC or 1276ENC and 1276EFC, in a singles-only variation, (c) at singles sidelines 30 or/and along their outside edges, i.e., by line parts 1232Q or 1262Q or/and LA parts/portions 1244Q or 1274, especially in a singles-only variation, and (d) at doubles sidelines 46 or/and along their outside edges, i.e., by line parts 1232D or 1262D or/and LA parts 1246D or 1276D.

Incorporating the CC capability into a grass tennis court without significantly affecting the ball-bounce and player shoe-traction characteristics of grass-court play is challenging. Surface 102 for a grass tennis court having the CC capability usually consists of grassy areas at the FC SF zones formed with units of SF zones 114 and 894 and relatively hard areas at the VC SF zones formed with units of SF zones 112 and 892. The hard areas for the VC SF zones are at the bottoms of channels in the grass. The width of each channel is slightly greater than the sum of the widths of the units of SF zones exposed by that channel. Using these channels, each IP structure 1230 or 1260 is implemented in a grass court without significantly affecting the ball-bounce characteristics of grass-court play by providing surface 102 with good velocity-restitution matching between tennis-ball impacts on the grassy FC SF zones and tennis-ball impacts on the hard VC SF zones. The presence of good velocity-restitution matching across surface 102 is expected to result in the shoe-traction characteristics being only slightly affected as players switch between stepping (partly or fully) on grassy FC SF zones and stepping on hard VC SF zones. It is expected that good tennis players will generally readily adapt to switching between stepping on grassy FC SF zones and stepping on hard VC SF zones.

The CC capability is alternatively incorporated into a grass tennis court with VC SF zones provided at the bottoms of channels in the grass in any or more of the following ways to reduce the need for good velocity-restitution matching across surface 102. Firstly, an elongated straight VC SF zone formed with a BLA part 1246E or 1276E is provided fully along the outside edge of each baseline 28 if the court is a singles/doubles court. For a singles-only court having shortened baselines 28, an elongated straight VC SF zone formed with one of OB BLA parts 1246ENC and 1246EFC or 1276ENC and 1276EFC is instead provided fully along the outside edge of each shortened baseline 28. Secondly, for a singles-only court, an elongated straight VC SF zone formed with a singles SLA HA part 1244Q or 1274 is provided directly along the outside edge of the half of each singles sideline 30 in each half court so as to adjoin that half singles sideline starting from baseline 28 in that half court. If the court has VC BLA SF zones, they merge with the VC singles SLA SF zones to form two ⌐-shaped VC OB SF zones. Thirdly, for a singles/doubles court, an elongated straight VC SF zone formed with a double OB SLA part 1246D or 1276D is provided directly along the outside edge of the half of each doubles sideline 46 in each half court so as to adjoin that half doubles sideline starting from baseline 28 in that half court. If the court has VC BLA SF zones, they merge with the VC doubles SLA SF zones to form ⌐-shaped OB area portions 1246 or 1276.

Any difference between the bounce characteristics of balls impacting the grassy FC SF zones and the bounce characteristics of balls impacting the hard VC LA SF zones during singles point play is largely immaterial for balls solely impacting the hard VC OB BLA SF zones or/and the VC singles (HA or OB) SLA SF zones, or impacting them along any of their outside edges because those balls are "out" to immediately end the points. The same applies to any balls impacting the VC doubles OB SLA SF zones during singles. A difference between the bounce characteristics of balls impacting the grassy FC SF zones and the bounce characteristics of balls impacting the hard VC LA SF zones is of concern for balls impacting (a) the part of a singles sideline 30 along a servicecourt 38 and the adjoining part of the adjoining VC singles SLA SF zone simultaneously during service, (b) a grassy baseline 28 and the adjoining VC OB BLA SF zone simultaneously during return play, (c) a grassy singles sideline 30 and the adjoining VC singles SLA SF zone simultaneously during singles return play, (d) a grassy doubles sideline 46 and the adjoining VC doubles OB SLA SF zone simultaneously during doubles return play, and (e) a grassy singles sideline 30 during doubles return play because those balls are "in". However, it is expected that good tennis players will generally readily adapt to such a difference in ball-bounce characteristics, especially since the ball-bounce characteristics of grass tennis courts are known to usually be somewhat unpredictable compared to the ball-bounce characteristics of conventional hard-surface and clay tennis courts.

The effect of such a difference in ball-bounce characteristics can be significantly reduced by variously replacing the preceding VC LA SF zones with VC SF zones provided at the bottoms of channels in the grass at locations spaced apart from baselines 28, singles sidelines 30, and doubles sidelines 46 in each of the following ways for which recitation of such a VC SF zone as being "adjacent" to a line 28, 30, or 46 means that the zone is close to, but spaced apart from, that line 28, 30, or 46. Firstly, an elongated straight VC SF zone is provided beyond the outside edge of each baseline 28 for a singles/doubles court, or shortened baseline 28 for a singles-only court, to extend the full length of that baseline, or shortened baseline 28, while being spaced apart from it. The average distance from each such VC OB baseline-adjacent SF zone to closest baseline, or shortened baseline, 28 is usually no greater than the average length, termed the nominal baseline just-out PA distance, of the longitudinally shortest ones of print areas 118 that would arise from balls impacting a VC OB BLA SF zone situated along the outside edge of each line, or shortened line, 28 after being struck from locations close to opposite line, or shortened line, 28 and then moving along trajectories approximately perpendicular to net 32, "PA" again meaning print-area. By employing VC OB baseline-adjacent SF zones situated approximately the nominal baseline just-out PA distance beyond baselines, or shortened baselines, 28, color changes occur in those VC SF zones only for balls impacting surface 102 fully beyond lines, or shortened lines, 28 and thus only for balls that are "out".

Secondly, an elongated straight VC SF zone is provided slightly beyond the outside edge of each half singles sideline in a singles-only court to extend generally along, but spaced apart from, that half singles sideline starting from an imaginary straight line extending largely through the inside edge of shortened baseline 28 in that half court so as to terminate past the imaginary extended serviceline in that half court either at the net line or short of the net line usually one fourth to three fourths of the distance from the imaginary extended serviceline in that half court to the net line. The average distance from each such VC singles sideline-adjacent SF zone to closest singles sideline 30 is usually no greater than the average longitudinal width, termed the nominal sideline just-out PA distance, of print areas 118 that would arise from balls impacting a VC SLA SF zone situated along the outside edge of the half of each sideline 30 in each half court after being struck from locations close to shortened baseline 28 in the opposite half court. Use of VC singles sideline-adjacent SF zones situated approximately the nominal sideline just-out PA distance beyond sidelines 30 enables color changes in those VC SF zones to occur only for balls impacting fully beyond sidelines 30 and thus only for balls that are "out" in singles return play.

Thirdly, an elongated straight VC OB SF zone is provided slightly beyond the outside edge of each half doubles sideline in a singles/doubles court to extend generally along, but spaced apart from, that half doubles sideline starting from the imaginary straight line extending largely through the inside edge of baseline 28 in that half court so as to terminate past the imaginary extended serviceline in that half court either at the net line or short of the net line usually one fourth to three fourths of the distance from the imaginary extended serviceline in that half court to the net line. The average distance from each such VC doubles OB sideline-adjacent SF zone to closest doubles sideline 46 is usually no greater than the nominal sideline just-out PA distance. By utilizing VC doubles OB sideline-adjacent SF zones situated approximately the nominal sideline just-out PA distance beyond lines 46, color changes in those VC SF zones occur only for balls impacting fully beyond lines 46 and therefore only for balls that are "out" in doubles return play.

Any difference between the bounce characteristics of balls impacting the grassy FC SF zones and the bounce characteristics of balls impacting the hard VC baseline-adjacent and singles sideline-adjacent SF zones during singles point play or impacting the hard VC baseline-adjacent and doubles sideline-adjacent SF zones during doubles point play is largely immaterial for balls solely impacting those VC SF zones, or impacting them along any of their outside edges, because those balls are "out" to immediately end the points. The same usually applies to the large majority of balls impacting the VC baseline-adjacent and singles sideline-adjacent SF zones along their inside edges during singles or impacting the VC baseline-adjacent and doubles sideline-adjacent SF zones along their inside edges during doubles, especially when the average distance between each VC baseline-adjacent SF zone and closest baseline 28 is approximately the nominal baseline just-out PA distance and when the average distance between each VC singles sideline-adjacent SF zone and closest singles sideline 30 or between each VC doubles sideline-adjacent SF zone and closest doubles sideline 46 is approximately the nominal sideline just-out PA distance. A difference between the bounce characteristics of balls impacting the grassy FC SF zones in alleys 48 and the bounce characteristics of balls impacting the hard VC singles sideline-adjacent SF zones in alleys 48 may arise for balls impacting alleys 48 during doubles. Again, it is expected that good tennis players will generally readily adapt to such a difference in ball-bounce characteristics.

Advantageously, balls simultaneously impacting each grassy baseline 28 and the FC grassy area between that line 28 and the VC OB baseline-adjacent SF zone closest to that line 28 usually do not incur any significant difference in ball-bounce characteristics even though good velocity-restitution matching may not exist across surface 102. The same applies to balls simultaneously impacting each grassy singles sideline 30 and the FC grassy area between that sideline 30 and either VC singles sideline-adjacent SF zone closest to that line 30 in singles and to balls simultaneously impacting each grassy doubles sideline 46 and the FC grassy area between that line 46 and either VC doubles sideline-adjacent SF zone closest to that line 46 in doubles. No print area 118 is usually generated for any of these impacts. Since a ball (partly or fully) impacting a baseline 28, a singles sideline 30 during singles, or a doubles sideline 46 during doubles is "in" during return play, the absence of area 118 generally means that the ball is deemed to be "in".

Balls will occasionally fully impact the grassy area between each VC OB baseline-adjacent SF zone and closest baseline 28 so that the balls are "out" with no print area 118 being generated because the balls do not impact that VC OB baseline-adjacent SF zone. Balls will also occasionally fully impact the grassy area between each VC sideline-adjacent SF zone and closest sideline 30 or 46 so that the balls are "out" with no area 118 being generated because the balls do not impact that VC sideline-adjacent SF zone. Such balls may erroneously be deemed to be "in". While this is disadvantageous, the disadvantage is well more than overcome by the advantages described in the previous paragraph.

The VC OB BLA or baseline-adjacent SF zones are permanent parts of the grass tennis court. The VC singles SLA or singles sideline-adjacent SF zones are permanent parts of the court especially if it lacks alleys 48 and is thereby used only for singles. If the court has alleys 48 and is used for both singles and doubles, the VC singles SLA or singles sideline-adjacent SF zones can be SF zones of removable VC singles SLA or singles sideline-adjacent regions which are installed in the court for singles and can be readily (or easily) removed for doubles and rapidly replaced with corresponding FC regions. The removable VC singles SLA or singles sideline-adjacent regions are reinstalled in the court for later singles play. As one alternative to using removable VC singles SLA or singles sideline-adjacent regions, the IP structure containing the court can include a capability for activating the VC singles SLA or singles sideline-adjacent regions for singles and deactivating them for doubles even though they are still physically present in doubles IB area 42 during doubles. As another alternative to using removable VC singles SLA or singles sideline-adjacent regions, the IP structure can include a capability for deactivating, during doubles, the parts of the VC singles SLA or singles sideline-adjacent regions whose SF zones extend from the imaginary extended servicelines to baselines 28 even though the inactivated parts are still physically present in doubles IB area 42. In this case, the activated parts of the VC singles SLA or singles sideline-adjacent regions can be used in determining whether served balls impacting surface 102 close to the parts of singles sidelines 30 lying between servicelines 34 are "in" or "out" in doubles play.

The VC doubles SLA or doubles sideline-adjacent SF zones can be permanent parts of the grass tennis court and thus be present during both singles and doubles. Alternatively, the VC doubles SLA or doubles sideline-adjacent SF zones can be SF zones of removable or deactivatable VC doubles SLA or doubles sideline-adjacent regions handled in a complementary way to the removable or deactivatable VC singles SLA or singles sideline-adjacent SF regions. However, the presence of the VC doubles SLA or doubles sideline-adjacent regions in OB area 24 during singles will usually have little effect on singles play because the players will only occasionally step on the doubles-SLA or doubles-sideline-adjacent SF zones.

Each of the preceding ways and indicated alternatives is, of course, only a partial solution for using the present CC capability to assist in making rapid accurate in/out calls in play on grass tennis courts. Aside from served balls that impact close to singles sidelines 30, these ways and indicated alternatives for employing the CC capability in grass courts do not provide assistance in determining whether served balls are "in" or "out". However, in/out decisions on returned balls impacting surface 102 close to baselines 28, singles sidelines 30 during singles, and doubles sidelines 46 during doubles are often the most difficult determinations to make. The preceding ways and indicated alternatives for utilizing the CC capability in grass courts provide a substantial advancement in making rapid accurate in/out calls.

The preceding description of ways to incorporate the CC capability into a grass tennis court assumes that the ball-bounce and player shoe-traction characteristics should be constant across surface 102. However, the conditions and rules for sports change for various reasons including technology advances. Improved accuracy in making in/out determinations on grass courts may be deemed more important than having the ball-bounce and player shoe-traction characteristics be constant across surface 102, especially since conventional grass courts have somewhat unpredictable ball-bounce characteristics compared to those of hard-surface and clay tennis courts. It may be acceptable to implement the CC capability into a grass court without significant regard to the ball-bounce and player shoe-traction characteristics.

A tennis IP structure according to the invention may have less CC capability than what occurs in either of IP structures 1230 and 1260 and their above-described variations. That is, one or more, but not all, of the VC LA SC, singles or doubles LA BC, doubles or singles OB LA, LA HA, and doubles or singles line structures may be absent depending on whether the IP structure is for singles only or singles and doubles. In general, a singles-only tennis IP structure according to the invention selectively contains one or more of the VC LA SC, singles LA BC, singles OB LA, and singles line structures where the VC singles line structure may consist of less VC singles line structure than the VC singles line structure described above for structure 1230 or 1260. Similarly, a singles/doubles tennis IP structure according to the invention selectively contains one or more of the VC LA SC, doubles LA BC, alley, doubles OB LA, and singles/doubles line structures where the VC doubles line structure may consist of less VC doubles line structure than what extends to surface 102 at VC line area 1232T or 1262T. In one embodiment of a singles-only or singles/doubles IP structure, the CC capability is provided only along the outsides of servicelines 34 and thus is used only in making serviceline in/out determinations on served balls. That is, units of SF zone 112 are embodied only with BC portions 1272 extending along servicelines 34. This embodiment can be extended to embody units of SF zone 892 with serviceline parts 1262S.

Other Sports Implementations

In the following material, a description of three consecutively adjoining VC regions as being respectively embodied (or formed) with (units of) PP VC region 106, AD VC region 886, and FR VC region 906 covers the situation in which the three regions are respectively embodied with regions 906, 886, and 106 because reference symbols "106", "886", and "906" and the adjective terms "PP", "AD", and "FR" for "principal", "additional", and further are arbitrary designators and do not affect the substance of the embodiments. A description of the SF zones of the three VC regions as being respectively embodied with (units of) PP SF zone 112, AD SF zone 892, and FR SF zone 912 thus covers the situation in which the three zones are respectively embodied with zones 912, 892, and 112. A description of two adjoining VC regions as being respectively embodied with (units of) PP region 106 and AD region 886 covers the situation in which the two regions are respectively embodied with regions 906 and 886. A description of the VC SF zones of the two VC regions as being respectively embodied with (units of) PP zone 112 and AD zone 892 covers the situation in which the two zones are respectively embodied with zones 912 and 892.

The adjectives "AD" and "FR" are interchangeable as applied to VC regions 886 and 906 and elements of those regions such as SF zones 892 and 912. That is, "AD" region 886 and "AD" zone 892 are alternatively describable as "FR" region 886 and "FR" zone 892, and vice versa. "LA", "ALA", "BLA", "ELA", and "SLA" hereafter respectively mean line-adjoining, attack-line-adjoining, baseline-adjoining, endline-adjoining or end-line-adjoining, and sideline-adjoining or side-line-adjoining. "BV" hereafter means boundary-vicinity.

Instances occur below in which colors in different sports IP structure are identified with the same names because the lines and LA area portions have the same, or substantially the same, names. In such situations, the name for each such color used in a sports IP structure only applies to that sport structure except as otherwise indicated. All parts of each closed boundary line are usually of the same normal-state color. Each pair of mirror-image regions typically employ normal-state color A, B, or C and changed-state color X, Y, or Z in the same way but can use different embodiments of normal-state color A, B, or C and changed-state color X, Y, or Z. The same applies to regions which are in opposite locations relative to a centerline but are not exactly mirror images as arises in the baseball/softball IP structure of FIG. 101, described below, if the outfield area is not symmetrical about the field centerline through the centers of home plate and second base.

The FC structures or structure portions that laterally adjoin VC structures or structure portions in the sports IP structures are not expressly described below in order to shorten the description. However, for each recited FC area or area portion in a sports IP structure, the sports structure contains a corresponding FC structure or structure portion consisting of one or more units of FC region 108, 888, or 908 extending to surface 102 at the FC area or area portion.

The core of each of the sports-playing IP structures of FIGS. 98-101 described below is a general sports-playing OI structure implemented with OI structure 900 (sometimes just OI structure 880) or, preferably, cell-containing OI structure 1100 (sometimes just OI structure 1080). Surface 102 of the general sports-playing OI structure includes at least one finite-width line at or/and directly along which the present CC capability is provided. Each such line, termed an object-related line, has opposite first and second edges. For each object-related line, the general OI structure contains one or more of (a) a VC first-edge LA structure part formed with at least one unit of VC region 106 extending to surface 102 at a VC first-edge LA area part that adjoins the first edge of the line at least partly along its length and normally appearing along the first-edge LA area part as PP color A, (b) a VC line structure part formed with at least one unit of VC region 886 extending to surface 102 at a VC line part extending between the edges of the line at least partly along its length and normally appearing along the line part as AD color B, and (c) a VC second-edge LA structure part formed with a least one unit of VC region 906 extending to surface 102 at a VC second-edge LA area part that adjoins the second edge of the line at least partly along its length and normally appearing along the second-edge LA area part as FR color C.

The following operational explanation applies to one object-related line for which its VC line structure part and both of its VC LA structure parts are present in the general OI structure. In the absence of intelligent control provided by controller 1114/1134, IDVC portion 138 of the first-edge structure part responds to object 104 impacting the first-edge area part at OC area 116 by temporarily appearing as changed color X if the impact meets PP basic TH impact criteria of that first-edge structure part. The first-edge structure part preferably includes components 182 and 184 typically implemented as in OI structure 200. IS segment 192 provides the PP general impact effect in response to the impact if it meets the PP basic TH impact criteria. CC segment 194 responds to the PP impact effect, if provided, by causing portion 138 to temporarily appear as color X.

Absent intelligent control, IDVC portion 926 of the line structure part responds to object 104 impacting the line structure part at OC area 896 by temporarily appearing as altered color Y if the impact meets AD basic TH impact criteria of the line structure part. The line structure part preferably includes IS component 932 and CC component 934 typically implemented as in OI structure 930. The ID segment of IS component 932 provides the AD general impact effect in response to the impact if it meets the AD basic TH impact criteria. The ID segment of CC component 934 responds to the AD impact effect, if provided, by causing portion 926 to temporarily appear as color Y.

An FR IDVC portion of the second-edge structure part responds, absent intelligent control, to object 104 impacting the second-edge area part at OC area 916 by temporarily appearing as modified color Z if the impact meets FR basic TH impact criteria of the second-edge structure part. The second-edge structure part preferably includes an IS component and a CC component typically implemented the same as CC component 184 in OI structure 200. An ID segment of the IS component provides an FR general impact effect in response to the impact if it meets the FR basic TH impact criteria. An ID segment of the CC component responds to the FR impact effect, if provided, by causing the FR IDVC portion to temporarily appear as color Z.

Each of these sports-playing IP structures usually contains CC controller 1114 either for implementing IP structure 1110 or 1130 that includes OI structure 900 or 1100 or for implementing IP structure 1170 or 1200 that includes OI structure 900 or 1100 and IG system 1152 or 1182. The following specifically occurs when controller 1114 is implemented as an intelligent controller for assistance in making specified impact determinations for the object-related line.

IDVC portion 138 of the first-edge structure part responds to object 104 impacting the first-edge area part at OC area 116 by providing the PP general CI impact signal if the impact meets the PP basic TH impact criteria of the first-edge structure part. The impact signal identifies an expected location of print area 118 in the first-edge area part and PP supplemental impact information for the impact. Controller 1114 responds to the impact signal by determining whether the PP supplemental impact information meets PP supplemental impact criteria of the first-edge structure part and, if so, provides a PP general CC initiation signal to which portion 138 responds by temporarily appearing as changed color X. When the VC first-edge structure part includes components 182 and 184, IS segment 192 provides an impact signal in response to the impact if it meets the PP basic TH impact criteria. CC segment 194 responds to the initiation signal, if provided, by causing that portion 138 of to temporarily appear as color X.

IDVC portion 926 of the VC line structure part responds to object 104 impacting the line area part at OC area 896 by providing the AD general CI impact signal if the impact meets the AD basic TH impact criteria of the line structure part. The impact signal identifies an expected location of print area 898 in the line and AD supplemental impact information for the impact. Controller 1114 responds to the impact signal by determining whether the AD supplemental impact information meets AD supplemental impact criteria of the line structure part and, if so, provides the AD general CC initiation signal to which portion 926 responds by temporarily appearing as altered color Y. When the line structure part includes components 932 and 934, the ID segment of IS component 932 provides an impact signal in response to the impact if it meets the basic TH impact criteria. The ID segment of CC component 934 responds to the initiation signal, if provided, by causing portion 926 to temporarily appear as color Y.

The FR IDVC portion of the second-edge structure part responds to object 104 impacting the second-edge area part at OC area 916 by providing the FR general CI impact signal if the impact meets the FR basic TH impact criteria of the second-edge structure part. The impact signal identifies an expected location of print area 918 in the second-edge area part and FR supplemental impact information for the impact. Controller 1114 responds to the impact signal by determining whether the FR supplemental impact information meets FR supplemental impact criteria of the second-edge structure part and, if so, provides the FR general CC initiation signal to which the FR IDVC portion responds by temporarily appearing as modified color Z. When the second-edge structure part includes IS and CC components, an ID segment of the IS component provides an impact signal in response to the impact if it meets the basic TH impact criteria. An ID segment of the CC component responds to the initiation signal, if provided, by causing the FR IDVC portion to temporarily appear as color Z.

The operation is basically the same when each sports-playing IP structure contains controller 1134 implemented as an intelligent controller for assistance in making the specified impact determinations. The PP, AD, or FR cellular CI impact signals provided from all TH CM cells 404, 1084, or 1104 to controller 1134 form the PP, AD, or FR general CI impact signal. The PP, AD, or FR cellular CC initiation signals provided by controller 1134 to all full CM cells 404, 1084, or 1104 form the PP general CC initiation signal. Additionally, simultaneous impact on the line and first-edge area part or/and the second-edge area part is handled as described above for simultaneous impact on SF zones 892 and 112 or/and 912.

Controller 1114/1134 may use the location-dependent version of the CC capability to control the color changing so that IDVC portion 138 of the first-edge structure part appears as one of p changed colors $XJ_1, XJ_2, \ldots XJ_p$ dependent on where print area 118 occurs in SF zone 112 or/and the FR IDVC portion of the second-edge structure part appears as one of r modified colors $ZL_1, ZL_2, \ldots ZL_r$ dependent on where print area 918 occurs in SF zone 912. That is, changed color X is specific changed color $XJ_i$ when area 118 satisfies location criterion $LJ_i$ of p location criteria $LJ_1, LJ_2, \ldots LJ_p$ or/and modified color Z is specific modified color $ZL_i$ when area 918 satisfies location criterion $LL_i$ of r location criteria $LL_1, LL_2, \ldots LL_r$. The location-dependent CC capability can be performed by having controller 1114 respond to the LI or CI general impact signal in the rudimentary or advanced general embodiment described above or by having controller 1134 respond to the LI or CI cellular impact signals in the rudimentary or advanced cellular embodiment described above. Changed color X is typically (i) changed color $XJ_1$ if area 118 adjoins the line and (ii) changed color $XJ_2$ if area 118 is spaced apart from the line. Modified color Z is typically (i) modified color $ZL_1$ if area 918 adjoins the line and (ii) modified color $ZL_2$ if area 918 is spaced apart from the line.

Figure 98:
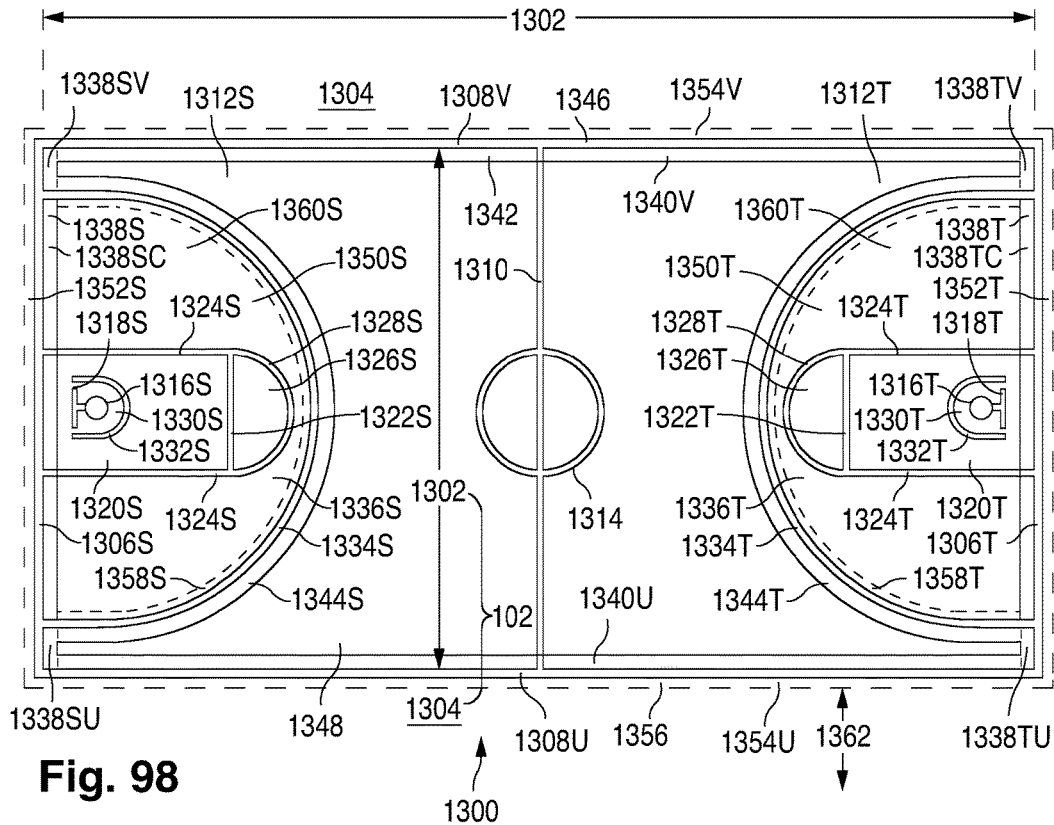
FIGS. 98-100 are layout views of exemplary embodiments of an IP structure respectively implemented into a basketball court, a volleyball court, and a football field according to the invention.

FIG. 98 illustrates a basketball IP structure 1300 containing OI structure 900 or, preferably, cell-containing OI structure 1100 incorporated into a U.S collegiate basketball court to form a basketball-playing structure that provides assistance in making OB and three-point-shot eligibility determinations. Surface 102 consists of a rectangular IB area 1302 and an annular OB area 1304 directly surrounding IB area 1302. IB area 1302 is defined inwardly by the inside edges of two opposite equal-width parallel straight baselines 1306S and 1306T (collectively "1306") and the inside edges of two opposite equal-width parallel straight sidelines 1308U and 1308V (collectively "1308") extending between baselines 1306. Each line 1306 or 1308 is an open boundary line. Lines 1306 and 1308 together form a rectangular closed boundary line 1306/1308 whose inside edge is a closed boundary for area 1302.

A straight midcourt line 1310 divides IB area 1302 into two equal-size rectangular half courts 1312S and 1312T. A center circle 1314 is concentric with the center of area 1302. The basketball-playing structure includes two baskets 1316S and 1316T respectively attached to two backboards 1318S and 1318T situated above area 1302 respectively near baselines 1306S and 1306T and spaced equally apart from sidelines 1308.

Each half court 1312S or 1312T has (a) a rectangular free-throw lane 1320S or 1320T located midway between sidelines 1308 and defined by baseline 1306S or 1306T, a straight free-throw line 1322S or 1322T parallel to line 1306S or 1306T, and two straight parallel lane lines 1324S or 1324T extending between, and perpendicular to, lines 1306S and 1322S or 1306T and 1322T, basket 1316S or 1316T being located above part of free-throw lane 1320S or 1320T near baseline 1306S or 1306T, (b) a semicircular free-throw shooting area 1326S or 1326T extending away from lane 1320S or 1320T and defined by line 1322S or 1322T and a semicircular back line 1328S or 1328T, (c) a restricted area 1330S or 1330T located within lane 1320S or 1320T below basket 1316S or 1316T and defined by a curved restricted-area line 1332S or 1332T and a straight line located largely below backboard 1318S or 1318T, and (d) a curved three-point ("3P") line 1334S or 1334T located outside lane 1320S or 1320T and free-throw area 1326S or 1326T and extending to baseline 1306S or 1306T at two locations spaced equally apart from sidelines 1308. Restricted-area line 1332S or 1332T and 3P line 1334S or 1334T each have a semicircular portion whose vertex is approximately concentric with the center of a vertical projection of basket 1316S or 1316T onto surface 102. All finite-width lines, including boundary lines 1306 and 1308, restricted-area lines 1332S and 1332T (collectively "1332"), and 3P lines 1334S and 1334T (collectively "1334"), are usually approximately 5 cm wide.

A basketball goes out of bounds if it impacts any of boundary lines 1306 and 1308. The same applies to a basketball player. Hence, lines 1306 and 1308 are parts of OB area 1304. The inside edge of each of lines 1306 and 1308 is its critical edge for determining whether object 104 embodied with a basketball or part, such as a shoe, of a basketball player impacting surface 102 at/near any of lines 1306 and 1308 is in or out of bounds. Each 3P line 1334S or 1334T has near (or inside) and far (or outside) edges respectively nearest to and farthest from its basket 1316S or 1316T. Two points are awarded for a basket made on a shot taken inside each 3P line 1334S and 1334T, i.e., in a two-point area 1336S or 1336T between line 1334S or 1334T and baseline 1306S or 1306T, at basket 1316S or 1316T. Three points are awarded for a basket made on an IB shot taken outside each line 1334S or 1334T at basket 1316S or 1316T provided that at least one shoe of the player shooting the basketball (or foot if the player is bare-footed) contacts the court behind line 1334S or 1334T immediately prior to the shot. Also, a shot at basket 1316S or 1316T is ineligible for three points, and is thus eligible only for two points, if any part, e.g., either shoe, of the shooter contacts line 1334S or 1334T or/and impacts surface 102 inside line 1334S or 1334T during the shot. For object 104 embodied with a shoe of a player, the far edge of each line 1334 is its critical edge for determining whether a shot qualifies as a 3P shot.

A narrow elongated straight part 1338S or 1338T of IB area 1302 directly along the inside edge of each baseline 1306S or 1306T forms, as highest CC location priority for lines 1306, a composite VC inside-edge BLA area part. Each composite VC inside-edge BLA part 1338S or 1338T discontinuously consists of (a) a first end VC inside-edge BLA area part (or subpart) 1338SU or 1338TU lying fully along the part of baseline 1306S or 1306T extending between sideline 1308U and the nearest end of 3P line 1334S or 1334T, (b) a central VC inside-edge BLA area part (or subpart) 1338SC or 1338TC lying fully along the part of baseline 1306S or 1306T extending between the opposite ends of 3P line 1334S or 1334T, and (c) a second end VC inside-edge BLA area part (or subpart) 1338SV or 1338TV lying fully along the part of baseline 1306S or 1306T extending between sideline 1308V and the nearest end of 3P line 1334S or 1334T. Each VC inside-edge BLA part 1338SU, 1338SC, 1338SV, 1338TU, 1338TC, or 1338TV embodies a unit of SF zone 112. A narrow elongated straight part 1340U or 1340V of area 1302 lying fully along the inside edge of each sideline 1308U or 1308V forms, as highest CC location priority for lines 1308, a VC inside-edge SLA area part embodying a unit of zone 112. VC inside-edge LA parts 1338S and 1338T (collectively "1338") and 1340U and 1340V (collectively "1340") form a rectangular annular VC inside-edge BV LA area portion 1342. As highest CC location priority for 3P lines 1334, a narrow curved part 1344S or 1344T of area 1302 lying fully along the far (or outside) edge of each line 1334S or 1334T, i.e., the edge farthest from basket 1316S or 1316T, forms a VC far-edge 3P LA area part embodying a unit of zone 112.

Each baseline 1306 is, as next highest CC location priority for lines 1306, a VC baseline area part embodying a unit of SF zone 892. Each sideline 1308 is, as next highest CC location priority for lines 1308, a VC sideline area part embodying a unit of zone 892. Boundary lines 1306 and 1308 form a rectangular annular VC boundary line area 1346. As next highest CC location priority for 3P lines 1334, each line 1334 is a VC three-point-line ("3PL") area part embodying a unit of zone 892.

The FC part 1348 of IB area 1302 bounded by LA parts 1344S, 1344T, 1338SU, 1338SV, 1338TU, 1338TV, and 1340 embodies a unit of SF zone 114. OB area 1304 is an FC area part embodying a unit of SF zone 894. The FC remainder 1350S or 1350T of each two-point area 1336S or 1336T bounded by BLA part 1338SC or 1338TC and 3P line 1334S or 1334T embodies both (a) a unit of zone 114 for the unit of SF zone 112 embodied with part 1338SC or 1338TC and (b) a unit of zone 894 for the unit of SF zone 892 embodied with line 1334S or 1334T. These units of zones 114 and 894 embody the same FC SF zone.

A narrow elongated straight part 1352S or 1352T of OB area 1304 lying fully along the outside edge of each baseline 1306S or 1306T optionally forms a VC outside-edge BLA area part embodying a unit of SF zone 912. A narrow elongated straight part 1354U or 1354V of area 1304 lying fully along the outside edge of each sideline 1308U or 1308V optionally forms a VC outside-edge SLA area part embodying a unit of zone 912. VC outside-edge LA parts 1352S and 1352T (collectively "1352") and 1354U and 1354V (collectively "1354") form a rectangular annular VC outside-edge BV LA area portion 1356. A narrow curved elongated part 1358S or 1358T of IB area 1302 lying fully along the near (or inside) edge of each 3P line 1334S or 1334T, i.e., the edge nearest basket 1316S or 1316T, optionally forms a VC near-edge 3P LA area part embodying a unit of zone 912.

For the preceding options, the resultant smaller FC remainder 1360S or 1360T of each two-point area 1336S or 1336T, i.e., the part bounded by BLA part 1338SC or 1338TC and 3P LA part 1358S or 1358T, embodies both (a) a unit of SF zone 114 for the unit of SF zone 112 embodied with BLA part 1338SC or 1338TC and (b) a unit of SF zone 914 for the unit of SF zone 912 embodied with 3P LA part 1358S or 1358T. These units of zones 114 and 914 embody the same FC SF zone. The annular FC remainder 1362 of OB area 1304 bounded by LA area portion 1356 embodies a unit of zone 914.

A VC structure part of IP structure 1300 extends to surface 102 at each of lines 1306, 1308, and 1334 and VC LA area parts 1338, 1340, 1344S and 1344T (collectively "1344"), 1352, 1354, and 1358S and 1358T (collectively "1358"). In particular, IP structure 1300 includes (a) composite VC inside-edge BLA structure consisting of two composite VC inside-edge BLA structure parts extending to surface 102 respectively at composite inside-edge BLA area parts 1338, (b) VC inside-edge SLA structure consisting of two VC inside-edge SLA structure parts respectively formed with two units of VC region 106 and extending to surface 102 respectively at inside-edge SLA area parts 1340, (c) VC baseline structure consisting of two VC baseline structure parts respectively formed with two units of VC region 886 and extending to surface 102 respectively at baselines 1306, (d) VC sideline structure consisting of two VC sideline structure parts respectively formed with two units of region 886 and extending to surface 102 respectively at sidelines 1308, (e) VC outside-edge BLA structure consisting of two VC outside-edge BLA structure parts respectively formed with two units of VC region 906 and extending to surface 102 respectively at outside-edge BLA area parts 1352, (f) VC outside-edge SLA structure consisting of two VC outside-edge SLA structure parts respectively formed with two units of region 906 and extending to surface 102 respectively at outside-edge SLA area parts 1354, (g) VC far-edge 3P LA structure consisting of two VC far-edge 3P LA structure parts respectively formed with two units of region 106 and extending to surface 102 respectively at far-edge 3P LA area parts 1344, (h) VC 3PL structure consisting of two VC 3PL structure parts respectively formed with two units of region 886 and extending to surface 102 respectively at 3P lines 1334, and (i) VC near-edge 3P LA structure consisting of two VC near-edge 3P LA structure parts respectively formed with two units of region 906 and extending to surface 102 respectively at near-edge 3P LA area parts 1358.

The composite VC inside-edge BLA structure consists of (i) two first end VC inside-edge BLA structure parts (or subparts) respectively formed with two units of VC region 106 and extending to surface 102 respectively at first end inside-edge BLA area parts 1338SU and 1338TU, (i) two central VC inside-edge BLA structure parts (or subparts) respectively formed with two units of region 106 and extending to surface 102 respectively at central inside-edge BLA area parts 1338SC and 1338TC, and (iii) two second end VC inside-edge BLA structure parts (or subparts) respectively formed with two units of region 106 and extending to surface 102 respectively at second end inside-edge BLA area parts 1338SV and 1338TV.

Each VC inside-edge BLA structure part normally appears along its BLA area part 1338S or 1338T as a PP BV color AIS or AIT embodying PP color A. Each VC inside-edge SLA structure part normally appears along its SLA area part 1340U or 1340V as a PP BV color AIU or AIV embodying color A. Each VC inside-edge BLA or SLA structure part is thus a VC inside-edge BV LA structure part normally appearing along its LA area part 1338S, 1338T, 1340U, or 1340V as color AIS, AIT, AIU, or AIV. Each VC baseline structure part normally appears along its baseline 1306S or 1306T as an AD BV color BBS or BBT embodying AD color B. Each VC sideline structure part normally appears along its sideline 1308U or 1308V as an AD BV color BBU or BBV embodying color B. Hence, each VC baseline or sideline structure part is a VC BV line structure part normally appearing along its boundary line 1306S, 1306T, 1308U, or 1308V as color BBS, BBT, BBU, or BBV. Each VC outside-edge BLA structure part normally appears along its BLA area part 1352S or 1352T as an FR BV color COS or COT embodying FR color C. Each VC outside-edge SLA structure part normally appears along its SLA area part 1354U or 1354V as an FR BV color COU or COV embodying color C. Each VC outside-edge BLA or SLA structure part is therefore a VC outside-edge BV LA structure part normally appearing along its LA area part 1352S, 1352T, 1354U, or 1354V as color COS, COT, COU, or COV.

IDVC portion 138 of each VC inside-edge BV LA structure part responds to object 104 impacting LA area part 1338S, 1338T, 1340U, or 1340V of that structure part at OC area 116 as described above for the general OI structure without intelligent control with changed color X embodied as a changed BV color XIS, XIT, XIU, or XIV materially different from PP BV color AIS, AIT, AIU, or AIV. IDVC portion 926 of each VC BV line structure part responds to object 104 impacting boundary line 1306S, 1306T, 1308U, or 1308V of that structure part at OC area 896 as prescribed for the general OI structure without intelligent control with altered color Y embodied as an altered BV color YBS, YBT, YBU, or YBV materially different from AD BV color BBS, BBT, BBU, or BBV. An FR IDVC portion of each VC outside-edge BV LA structure part responds to object 104 impacting LA area part 1352S, 1352T, 1354U, or 1354V at OC area 916 of that structure part as prescribed for the general OI structure without intelligent control with modified color Z embodied as a modified BV color ZOS, ZOT, ZOU, or ZOV materially different from FR BV color COS, COT, COU, or COV.

Each VC far-edge 3P LA structure part normally appears along its LA area part 1344S or 1344T as a PP three-point-line-vicinity ("3PLV") color A3S or A3T embodying PP color A. Each VC 3PL structure part normally appears along its 3P line 1334S or 1334T as an AD 3PLV color B3S or B3T embodying AD color B. Each VC near-edge 3P LA structure part normally appears along its LA area part 1358S or 1358T as an FR 3PLV color C3S or C3T embodying FR color C.

IDVC portion 138 of each VC far-edge 3P LA structure part can respond to object 104 impacting LA area part 1344S or 1344T of that structure part at OC area 116 as described above for the general OI structure without intelligent control with changed color X embodied as a changed 3PLV color X3S or X3T materially different from PP 3PLV color A3S or A3T. IDVC portion 926 of each VC 3PL structure part can respond to object 104 impacting 3P line 1334S or 1334T of that structure part at OC area 896 as prescribed for the general OI structure without intelligent control with altered color Y embodied as an altered 3PLV color Y3S or Y3T materially different from AD 3PLV color B3S or B3T. An FR IDVC portion of each VC near-edge 3P LA structure part can respond to object 104 impacting LA area part 1358S or 1358T of that structure part at OC area 916 as prescribed for the general OI structure without intelligent control with modified color Z embodied as a modified 3PLV color Z3S or Z3T materially different from FR 3PLV color C3S or C3T.

IP structure 1300 usually contains CC controller 1114 for implementing one of IP structures 1110 and 1170 or CC controller 1134 for implementing one of IP structure 1130 and 1200. Controller 1114/1134 operates as an intelligent controller for making 3P-shot qualification determinations. If an impact at or near either 3P line 1334 meets the PP, AD, FR, or CP TH impact criteria, controller 1114/1134 determines whether the PP, AD, FR, or CP supplemental impact information meets the PP, AD, FR, or CP supplemental impact criteria for surface 102 being impacted by a person's shoe, specifically a basketball shoe, embodying object 104. Color change occurs along one or more of lines 1334, far-edge 3P LA parts 1344, and near-edge 3P LA parts 1358 only when the impact characteristics meet the PP, AD, FR, or CP expanded impact criteria for a person's shoe impacting surface 102. Impact of a basketball on either of lines 1334 or any of adjoining parts 1344 and 1358 usually does not cause a color change.

3P shots in each half court 1312S or 1312T are almost always taken with the shooter generally facing basket 1316S or 1316T and with the shooter's shoes generally pointed toward basket 1316S or 1316T. Taking this into account, the PP, AD, FR, or CP supplemental impact criteria can require that each shoe be generally pointed toward basket 1316S or 1316T. No color change occurs if at least one shoe is pointing away from basket 1316S or 1316T, thereby largely avoiding color undesired changes due to non-shooting activities when a shoe is pointed away from basket 1316S or 1316T. More particularly, letting the contact area for a shoe on surface 102 have a longitudinal axis defined, e.g., as a straight line extending between the area's two most distant points so as to match a straight line extending between the shoe's two most distant points, the PP, AD, FR, or CP supplemental impact criteria for 3P shot attempts can require that the angle between the longitudinal axis of the shoe's contact area and a radial line extending from the vertex of associated 3P line 1334S or 1334T be no more than a selected value, usually 30°, potentially 20° or even 15°, with the shoe pointed toward basket 1316S or 1316T. Implementing the PP, AD, FR, and CP supplemental impact criteria in this way substantially reduces the occurrences of unneeded/unwanted color changes when a shoe of a player not shooting the basketball impacts any of 3P lines 1334 and 3P LA parts 1344 and 1358.

The following specifically occurs when controller 1114/1134 is implemented as an intelligent controller for assistance in making 3P-shot qualification determinations. Controller 1114/1134 and IDVC portion 138 of each VC far-edge 3P LA structure part respond to object 104 impacting LA area part 1344S or 1344T of that structure part at OC area 116 as described above for the general OI structure with intelligent control with changed color X embodied as changed 3PLV color X3S or X3T. Controller 1114/1134 and IDVC portion 926 of each VC 3PL structure part respond to object 104 impacting 3P line 1334S or 1334T of that structure part at OC area 896 as prescribed for the general OI structure with intelligent control with altered color Y embodied as altered 3PLV color Y3S or Y3T. Controller 1114/1134 and an FR IDVC portion of each VC near-edge 3P LA structure part respond to object 104 impacting LA area part 1358S or 1358T of that structure part at OC area 916 as prescribed for the general OI structure with intelligent control with modified color Z embodied as modified 3PLV color Z3S or Z3T.

Controller 1114/1134 preferably uses the location-dependent version of the CC capability to control the color changing so that IDVC portion 138 of the VC far-edge 3P LA structure part for each 3P line 1334S or 1334T appears as (i) a first changed color $X3S_1$ or $X3T_1$ if print area 118 of VC far-edge 3P LA part 1344S or 1344T adjoins line 1334S or 1334T and (ii) a second changed color $X3S_2$ or $X3T_2$ different from color $X3S_1$ or $X3T_1$ if area 118 of part 1344S or 1344T is spaced apart from line 1334S or 1334T. During a shot, the appearance of area 118 of the far-edge 3P LA structure part for each line 1334S or 1334T as color $X3S_1$ or $X3T_1$, preferably the same color $X_1$, indicates that the shot fails to qualify as a 3P shot attempt because having area 118 of part 1344S or 1344T adjoin line 1334S or 1334T means that a shoe of the shooter impacted line 1334S or 1334T whereas the appearance of that LA structure part as color $X3S_2$ or $X3T_2$, preferably the same color $X_2$, indicates that the shot qualifies as a 3P shot because having area 118 of part 1344S or 1344T be spaced apart from line 1334S or 1334T means that the shooter's shoe was suitably behind line 1334S or 1334T at the beginning of the shot. A viewer, e.g., an official, can nearly always determine whether a shot qualifies as a 3P shot by simply examining the color of area 118.

It is usually sufficient for controller 1114/1134 to operate as a duration controller for making OB determinations in IP structure 1300. If controller 1114/1134 is to operate as an intelligent controller for making OB determinations, the inside-edge BV LA structure parts, their area parts 1338 and 1340, the BV line structure parts, their lines 1306 and 1308, the outside-edge BV LA structure parts, and their area parts 1352 and 1354 interact with controller 1114/1134 the same as the VC far-edge 3P LA structure parts, their area parts 1344, the 3PL structure parts, their lines 1334, the near-edge 3P LA structure parts, and their area parts 1358 respectively interact with controller 1114/1134 operating as an intelligent controller subject to the PP, AD, FR, and CP supplemental impact criteria being criteria for a basketball and/or a person's shoe, specifically a basketball shoe, impacting surface 102.

The invention's CC capability can be implemented along each restricted-area line 1332S or 1332T to assist in determining whether both shoes of a defensive player are outside restricted area 1330S or 1330T so that the player is eligible for taking a charge by an offensive player. Inasmuch as having either shoe on or inside line 1332S or 1332T for the defensive player makes that player ineligible to take a charge, a narrow curved part of IB area 1302 extending fully along the far (or outside) edge of each line 1332S or 1332T, i.e., the edge farthest from basket 1316S or 1316T, embodies a unit of SF zone 112. Each line 1332S or 1332T preferably embodies a unit of SF zone 892. A narrow curved part of area 1302 extending fully along the near (or inside) edge of each line 1332S or 1332T, i.e., the edge nearest basket 1316S or 1316T, optionally embodies a unit of SF zone 912. Controller 1114/1134 preferably operates as an intelligent controller in regard to lines 1332 so that color change along one or more of each line 1332 and the adjoining area portions occurs only when the impact characteristics meet the PP, AD, FR, or CP expanded impact criteria for a shoe.

Instead of having color change occur automatically when the PP, AD, FR, or CP expanded impact criteria are met, color change can be delayed to occur only in response to external instruction provided, e.g., by a basketball official. In this way, a non-shooting or non-charging activity that meets the PP, AD, FR, or CP expanded impact criteria can be prevented from causing a color change.

Figure 99:
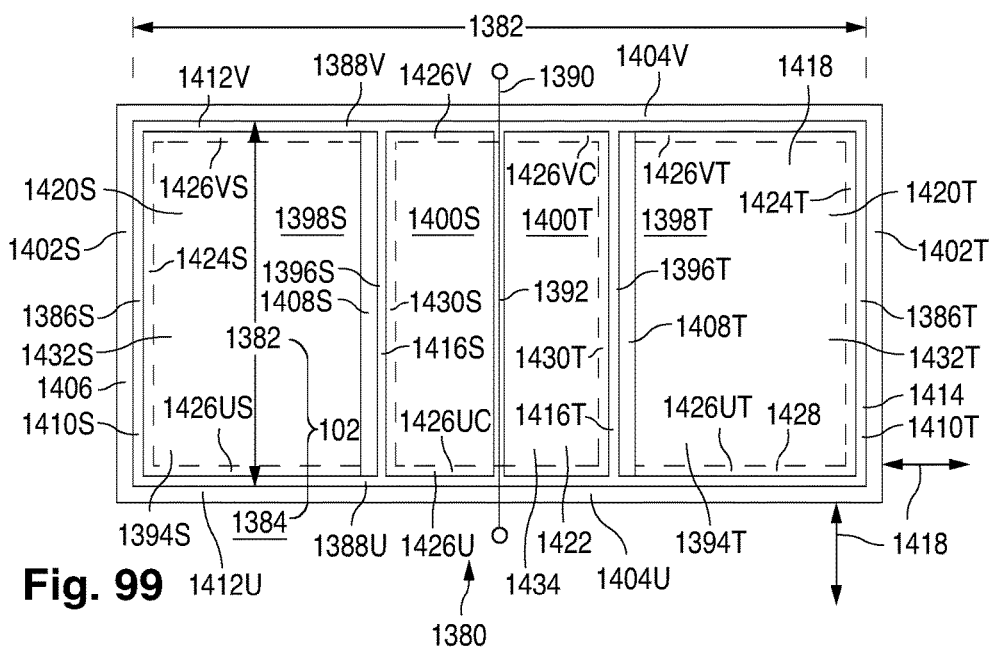

FIG. 99 illustrates a volleyball IP structure 1380 containing OI structure 900 or, preferably, cell-containing OI structure 1100, incorporated into a U.S. collegiate volleyball court to form a volleyball-playing structure that provides assistance in making service end-line violation, OB, and attack-line violation determinations. Surface 102 consists of a rectangular IB area 1382 and an annular OB area 1384 directly surrounding IB area 1382. IB area 1382 is defined inwardly by the outside edges of two opposite equal-width parallel straight end lines 1386S and 1386T (collectively "1386") and the outside edges of two opposite equal-width parallel straight side lines 1388U and 1388V (collectively "1388") extending between end lines 1386. Each line 1386 or 1388 is an open boundary line. Lines 1386 and 1388 together form a rectangular closed boundary line 1386/1388 whose outside edge is a closed boundary for area 1382.

IP structure 1380 further includes an elevated volleyball net 1390 situated above a straight centerline 1392 extending parallel to end lines 1386 and spaced equally apart from them to divide IB area 1382 into two rectangular half courts 1394S and 1394T. Each half court 1394S or 1394T has a straight attack line 1396S or 1396T extending between side lines 1388 parallel to end lines 1386. Each attack line 1396S or 1396T is located between centerline 1392 and end line 1386S or 1386T for dividing half court 1394S or 1394T into (a) a rectangular back court 1398S or 1398T extending to end line 1386S or 1386T and (b) a rectangular front court 1400S or 1400T extending to centerline 1392. All finite-width lines, including boundary lines 1386 and 1388 and attack lines 1396S and 1396T (collectively "1396"), are usually approximately 5 cm wide. Each attack line 1396 has near and far edges respectively nearest to and farthest from centerline 1392.

A volleyball point begins with an effort by a player, the server, positioned in a service zone behind end line 1386 to hit a volleyball over net 1390 using one hand or arm. A service end-line violation occurs if either foot, i.e., either shoe of the server, impacts back court 1398S or 1398T, including end line 1386S or 1386T, before the volleyball leaves the server's hand or arm. For object 104 embodied with a shoe of a player, the outside edge of each line 1386 is its critical edge for determining whether a service end-line violation has occurred. A volleyball is "in" if it contacts any of boundary lines 1386 and 1388 and is "out" only if it contacts surface 102 fully outside lines 1386 and 1388. Accordingly, lines 1386 and 1388 are parts of IB area 1382. The outside edge of each of lines 1386 and 1388 is its critical edge for determining whether object 104 embodied with a volleyball impacting surface 102 at/near any of lines 1386 and 1388 is "in" or "out".

Each team playing volleyball consists of six players, three of which are designated as back-court players for each volleyball point. A back-court player in half court 1394S or 1394T is permitted to attack (hit forward) a volleyball fully above the net height at the instant of contact only if both of the player's feet, specifically both shoes, are behind attack line 1396S or 1396T immediately prior to attacking the volleyball. The back-court player may be elevated above surface 102, including above front court 1400S or 1400T, during the attack provided that neither foot, i.e., neither shoe, impacts front court 1400S or 1400T before the attack is completed. For object 104 embodied with a shoe of a player, the far edge of each attack line 1396 is its critical edge for determining whether an attack-line violation has occurred.

A narrow elongated straight part 1402S or 1402T of OB area 1384 lying fully along the outside edge of each end line 1386S or 1386T forms, as highest CC location priority for determining service end-line violations and making OB determinations for lines 1386, a VC outside-edge ELA area part embodying a unit of SF zone 112. A narrow elongated straight part 1404U or 1404V of area 1384 lying fully along the outside edge of each side line 1388U or 1388V forms, as highest CC location priority for making OB determinations for lines 1388, a VC outside-edge SLA area part embodying a unit of zone 112. VC outside-edge LA parts 1402S and 1402T (collectively "1402") and 1404U and 1404V (collectively "1404") form a VC outside-edge BV LA area portion 1406. As highest CC location priority for attack lines 1396, a narrow elongated straight part 1408S or 1408T of IB area 1382 lying fully along the far edge of each line 1396S or 1396T, i.e., the edge farthest from centerline 1392, forms a VC far-edge ALA area part embodying a unit of zone 112.

Each end line 1386S or 1386T forms, as next highest CC location priority for determining service end-line violations and making OB determinations for lines 1386, a VC end-line area part 1410S or 1410T embodying a unit of SF zone 892. Each side line 1388U or 1388V forms, as next highest CC location priority for making OB determinations for lines 1388, a VC side-line area part 1412U or 1412V embodying a unit of zone 892. Boundary-line parts 1410S and 1410T (collectively "1410") and 1412U and 1412V (collectively "1412") form a rectangular annular VC boundary line area 1414. As next highest CC location priority for attack lines 1396, each line 1396S or 1396T is a VC attack-line area part 1416S or 1416T embodying a unit of zone 892.

The annular FC remainder 1418 of OB area 1384 beyond boundary line area 1414 embodies a unit of SF zone 114. The rectangular FC remainder 1420S or 1420T of back court 1398S or 1398T bounded by end line 1386S or 1386T, ALA part 1408S or 1408T, and the intervening parts of side lines 1388 embodies both (a) a unit of zone 114 for the unit of SF zone 112 embodied with part 1408S or 1408T and (b) a unit of SF zone 894 for the units of SF zone 892 embodied with end line 1386S or 1386T and side lines 1388. Each pair of units of zones 114 and 894 embody the same FC SF zone. The rectangular FC remainder 1422 of front courts 1400S and 1400T bounded by attack lines 1396 and the intervening parts of side lines 1388 embodies a unit of zone 894.

A narrow elongated straight part 1424S or 1424T of back court 1398S or 1398T lying fully along the inside edge of each end line 1386S or 1386T optionally forms, for determining service end-line violations and making OB determinations for lines 1386, a VC inside-edge ELA area part embodying a unit of SF zone 912. A narrow elongated straight part 1426U or 1426V of IB area 1382 directly along the inside edge of each side line 1388U or 1388V optionally forms, for making OB determinations for lines 1388, a composite VC inside-edge SLA area part. Each composite VC inside-edge SLA part 1426U or 1426V discontinuously consists of (a) a first end VC inside-edge SLA area part (or subpart) 1426US or 1426VS lying fully along the part of side line 1388U or 1388V between inside-edge ELA part 1424S and far-edge ALA part 1408S, (b) a central VC inside-edge SLA area part (or subpart) 1426UC or 1426VC lying fully along the part of side line 1388U or 1388V between attack lines 1396, and (c) a second end VC inside-edge SLA area part (or subpart) 1426UT or 1426VT lying fully along the part of side line 1388U or 1388V between inside-edge ELA part 1424T and far-edge ALA part 1408T. Each VC inside-edge SLA part 1426US, 1426UC, 1426UT, 1426VS, 1426VC, or 1426VT embodies a unit of zone 912. Inside-edge LA parts 1424S and 1424T (collectively "1424") and 1426U and 1426V (collectively "1426") discontinuously form a rectangular annular VC inside-edge BV LA area portion 1428. A narrow elongated straight part 1430S or 1430T of front court 1400S or 1400T lying fully along the near edge of each attack line 1396S or 1396T optionally forms a VC near-edge ALA area part embodying a unit of zone 912.

For the preceding options, the resultant smaller rectangular FC remainder 1432S or 1432T of each back court 1398S or 1398T, i.e., the part bounded by ALA part 1408S or 1408T, ELA part 1424S or 1424T, and SLA parts 1426US and 1426VS or 1426UT and 1426VT, embodies both (a) a unit of SF zone 114 for the unit of SF zone 112 embodied with ALA part 1408S or 1408T and (b) a unit of SF zone 914 for the units of SF zone 912 embodied with ELA part 1424S or 1424T and SLA parts 1426US and 1426VS or 1426UT and 1426VT. These units of zones 114 and 914 embody the same FC SF zone. The resultant smaller rectangular FC remainder 1434 of front courts 1400S and 1400T, i.e., the part bounded by LA parts 1430S, 1430T, 1426UC, and 1426VC, embodies a unit of zone 914.

Similar to VC singles HA area portions 1274 in tennis IP structure 1260, VC outside-edge SLA parts 1404 may extend only partway, usually at least three fourths of the way, from each end line 1386 to centerline 1392. In particular, each part 1404 splits into two parts (or subparts) each extending from an end line 1386 past closest attack line 1396 partway to centerline 1392. Each VC side-line part 1412 continues to lie fully along its SLA part 1404 and likewise splits into two parts each extending from an end line 1386 past closest attack line 1396 partway to centerline 1392. The same applies to each VC inside-edge SLA part 1426. Each VC outside-edge BV LA area portion 1406, VC boundary line area 1414, or VC inside-edge BV LA area portion 1428 correspondingly splits into two ⌒-shaped portions each extending partway from an end line 1386 past closest attack line 1396 to centerline 1392.

A VC structure part of IP structure 1380 extends to surface 102 at each of VC line area parts 1410, 1412, and 1416S and 1416T (collectively "1416") and VC LA area parts 1402, 1404, 1408S and 1408T (collectively "1408"), 1424, 1426, and 1430S and 1430T (collectively "1430"). Structure 1380 specifically includes (a) VC outside-edge ELA structure consisting of two VC outside-edge ELA structure parts respectively formed with two units of VC region 106 and extending to surface 102 respectively at outside-edge ELA area parts 1402, (b) VC outside-edge SLA structure consisting of two VC outside-edge SLA structure parts extending to surface 102 respectively at outside-edge SLA area parts 1404, (c) VC end-line structure consisting of two VC end-line structure parts respectively formed with two units of VC region 886 and extending to surface 102 respectively at end-line area parts 1410 or, equivalently, end lines 1386, (d) VC side-line structure consisting of two VC side-line structure parts extending to surface 102 respectively at side-line area parts 1412 or, equivalently, side lines 1388 at least partly along their lengths, (e) VC inside-edge ELA structure consisting of two VC inside-edge ELA structure parts respectively formed with two units of VC region 906 and extending to surface 102 respectively at inside-edge ELA area parts 1424, (f) composite VC inside-edge SLA structure consisting of two VC inside-edge SLA structure parts extending to surface 102 respectively at inside-edge SLA area parts 1426, (g) VC far-edge ALA structure consisting of two VC far-edge ALA structure parts respectively formed with two units of region 106 and extending to surface 102 respectively at far-edge ALA area parts 1408, (h) VC attack-line structure consisting of two VC attack-line structure parts respectively formed with two units of region 886 and extending to surface 102 respectively at VC attack-line area parts 1416 or, equivalently, attack lines 1396, and (i) VC near-edge ALA structure consisting of two VC near-edge ALA structure parts respectively formed with two units of region 906 and extending to surface 102 respectively at near-edge ALA area parts 1430.

Each VC outside-edge SLA structure part is formed with a unit of VC region 106 if each outside-edge SLA area part 1404 is continuous (one piece). If each area part 1404 is split into two parts, each VC outside-edge SLA structure part splits into two structure parts (or subparts) each formed with a unit of region 106. Each VC side-line structure part is formed with a unit of VC region 886 if each side-line area part 1412 is continuous. If each area part 1412 is split into two parts, each VC side-line structure part splits into two structure parts (or subparts) each formed with a unit of region 886. The composite VC inside-edge SLA structure consists of (i) two first end VC inside-edge SLA structure parts (or subparts) respectively formed with two units of VC region 906 and extending to surface 102 respectively at first end inside-edge SLA area parts 1426US and 1426VS, (ii) two central VC inside-edge SLA structure parts (or subparts) extending to surface 102 respectively at central inside-edge SLA area parts 1426UC and 1426VC, and (iii) two second end VC inside-edge SLA structure parts (or subparts) respectively formed with two units of region 906 and extending to surface 102 respectively at second end inside-edge SLA area parts 1426UT and 1426VT. Each central VC inside-edge SLA structure part is formed with a unit of region 906 if each central inside-edge SLA area part 1426UC or 1426VC is continuous. If each area part 1426UC or 1426VC is split into two parts, each central inside-edge SLA structure part splits into two structure parts (or subparts) each formed with a unit of region 906.

Each VC outside-edge ELA structure part normally appears along its ELA area part 1402S or 1402T as a PP BV color AOS or AOT embodying PP color A. Each VC outside-edge SLA structure part normally appears along its SLA area part 1404U or 1404V as a PP BV color AOU or AOV embodying color A. Hence, each VC outside-edge ELA or SLA structure part is a VC outside-edge BV LA structure part normally appearing along its LA area part 1402S, 1402T, 1404U, or 1404V as color AOS, AOT, AOU, or AOV. Each VC end-line structure part normally appears along its area part 1410S or 1410T or, equivalently, end line 1386S or 1386T as an AD BV color BBS or BBT embodying AD color B. Each VC side-line structure part normally appears along its area part 1412U or 1412V or, equivalently, its side line 1388U or 1388V as an AD BV color BBU or BBV embodying color B. Hence, each VC end-line or side-line structure part is a VC BV line structure part normally appearing along its area part 1410S, 1410T, 1412U, or 1412V or, equivalently, boundary line 1386S, 1386T, 1388U or 1388V as color BBS, BBT, BBU, or BBV. Each VC inside-edge ELA structure part normally appears along its ELA area part 1424S or 1424T as an FR BV color CIS or CIT embodying FR color C. Each VC inside-edge SLA structure part normally appears along its SLA area part 1426U or 1426V as an FR BV color CIU or CIV embodying color C. Each VC inside-edge ELA or SLA structure part is thus a VC inside-edge BV LA structure part normally appearing along its LA area part 1424S, 1424T, 1426U, or 1426V as FR BV color CIS, CIT, CIU, or CIV.

IDVC portion 138 of each VC outside-edge BV LA structure part responds to object 104 impacting LA area part 1402S, 1402T, 1404U, or 1404V of that structure part at OC area 116 as described above for the general OI structure without intelligent control with changed color X embodied as a changed BV color XOS, XOT, XOU, or XOV materially different from PP BV color AOS, AOT, AOU, or AOV. IDVC portion 926 of each VC BV line structure part responds to object 104 impacting line area part 1410S, 1410T, 1412U, or 1412V or, equivalently, boundary line 1386S, 1386T, 1388U, or 1388V of that structure part at OC area 896 as prescribed for the general OI structure without intelligent control with altered color Y embodied as an altered BV color YBS, YBT, YBU, or YBV materially different from AD BV color BBS, BBT, BBU, or BBV. An FR IDVC portion of each VC inside-edge BV LA structure part responds to object 104 impacting LA area part 1424S, 1424T, 1426U, or 1426V of that structure part at OC area 916 as prescribed for the general OI structure without intelligent control with modified color Z embodied as a modified BV color ZIS, ZIT, ZIU, or ZIV materially different from FR BV color CIS, CIT, CIU, or CIV.

Each VC far-edge ALA structure part normally appears along its LA area part 1408S or 1408T as a PP attack-line-vicinity ("ALV") color AAS or AAT embodying PP color A. Each VC attack-line structure part normally appears along its area part 1416S or 1416T or, equivalently, attack line 1396S or 1396T as an AD ALV color BAS or BAT embodying AD color B. Each VC near-edge ALA structure part normally appears along its LA area part 1430S or 1430T as an FR ALV color CAS or CAT embodying FR color C.

IDVC portion 138 of each VC far-edge ALA structure part can respond to object 104 impacting ALA area part 1408S or 1408T of that structure part at OC area 116 as described above for the general OI structure without intelligent control with changed color X embodied as a changed ALV color XAS or XAT materially different from PP ALV color AAS or AAT. IDVC portion 926 of each VC attack-line structure part can respond to object 104 impacting attack-line area part 1416S or 1416T of that structure part at OC area 896 as prescribed for the general OI structure without intelligent control with altered color Y embodied as an altered ALV color YAS or YAT materially different from AD ALV color BAS or BAT. An FR IDVC portion of each VC near-edge ALA structure part can respond to object 104 impacting ALA area part 1430S or 1430T of that structure part at OC area 916 as prescribed for the general OI structure without intelligent control with modified color Z embodied as a modified ALV color ZAS or ZAT materially different from FR ALV color CAS or CAT.

IP structure 1380 usually contains CC controller 1114 for implementing one of IP structures 1110 and 1170 or CC controller 1134 for implementing one of IP structures 1130 and 1200. Controller 1114/1134 operates as an intelligent controller for making attack-line violation determinations. If an impact at or near either attack line 1396 meets the PP, AD, FR, or CP TH impact criteria, controller 1114/1134 determines whether the PP, AD, FR, or CP supplemental impact information meets the PP, AD, FR, or CP supplemental impact criteria for surface 102 being impacted by a person's shoe, specifically a volleyball shoe, embodying object 104. Color change occurs along one or more of attack lines 1396, far-edge ALA parts 1408, and near-edge ALA parts 1430 only when the impact characteristics meet the PP, AD, FR, or CP expanded impact criteria for a person's shoe impacting surface 102. Impact of a volleyball on any of lines 1396 and adjoining parts 1408 and 1430 usually does not cause a color change.

Similar to 3P shots in basketball, attacks by a back-court player almost always occur with the back-court attacker generally facing net 1390 and with the attacker's shoes generally pointed toward net 1390. Taking this into account, the PP, AD, FR, or CP supplemental impact criteria can require that each shoe be generally pointed toward net 1390. No color change occurs if at least one shoe is pointing away from net 1390, thereby largely avoiding color undesired changes due to non-attacking activities when a shoe is pointed away from net 1390. More particularly, letting the contact area for a shoe on surface 102 have a longitudinal axis defined, e.g., as a straight line extending between the area's two most distant points so as to match a straight line extending between the shoe's two most distant points, the PP, AD, FR, or CP supplemental impact criteria for back-court attacks can require that the angle between the longitudinal axis of the shoe's contact area and a line extending perpendicular to net 1390 be no more than a selected value, usually 40°, potentially 30° or even 20°, with the shoe pointed toward net 1390. Implementing the PP, AD, FR, and CP supplemental impact criteria in this way substantially reduces the occurrences of unneeded/unwanted color changes when a shoe of a player not attacking the volleyball, e.g., a player whose back is temporarily facing net 1390, impacts any of attack lines 1396 and ALA parts 1408 and 1424.

The following specifically occurs when controller 1114/1134 is implemented as an intelligent controller for assistance in determining attack-line violations. Controller 1114/1134 and IDVC portion 138 of each VC far-edge ALA structure part respond to object 104 impacting ALA area part 1408S or 1408T of that structure part at OC area 116 as described above for the general OI structure with intelligent control with changed color X embodied as changed ALV color XAS or XAT. Controller 1114/1134 and IDVC portion 926 of each VC attack-line structure part respond to object 104 impacting attack-line area part 1416S or 1416T of that structure part at OC area 896 as prescribed for the general OI structure with intelligent control with altered color Y embodied as altered ALV color YAS or YAT. Controller 1114/1134 and an FR IDVC portion of each VC near-edge ALA structure part respond to object 104 impacting ALA area part 1430S or 1430T of that structure part at OC area 916 as prescribed for the general OI structure with intelligent control with modified color Z embodied as modified ALV color ZAS or ZAT.

Controller 1114/1134 preferably uses the location-dependent version of the CC capability to control the color changing so that IDVC portion 138 of the VC far-edge ALA structure part for each attack line 1396S or 1396T appears as (i) a first changed color $XAS_1$ or $XAT_1$ if print area 118 of VC far-edge ALA part 1408S or 1408T adjoins line 1396S or 1396T and (ii) a second changed color $XAS_2$ or $XAT_2$ different from color $XAS_1$ or $XAT_1$ if area 118 of part 1408S or 1408T is spaced apart from line 1396S or 1396T. During a back-court attack, the appearance of area 118 of the far-edge ALA structure part for each line 1396S or 1396T as color $XAS_1$ or $XAT_1$, preferably the same color $X_1$, indicates an attack-line violation because having area 118 of area part 1408S or 1408T adjoin line 1396S or 1396T means that a shoe of the attacker improperly impacted line 1396S or 1396T whereas the appearance of that LA structure part as color $XAS_2$ or $XAT_2$, preferably the same color $X_2$, indicates that the absence of an attack-line violation because having area 118 of part 1408S or 1408T be spaced apart from line 1396S or 1396T means that the attacker's shoe was suitably behind line 1396S or 1396T at the beginning of the attack. A viewer, e.g., an official, can nearly always determine whether an attack-line violation occurred by simply examining the color of area 118.

It is usually sufficient for controller 1114/1134 to operate as a duration controller for making service end-line violation and OB determinations in IP structure 1380. If controller 1114/1134 is to operate as an intelligent controller for making service end-line violation and OB determinations, the outside-edge BV LA structure parts, their area parts 1402 and 1404, the BV line structure parts, their area parts 1410 and 1412, the inside-edge BV LA structure parts, and their area parts 1424 and 1426 interact with controller 1114/1134 the same as the far-edge ALA structure parts, their area parts 1408, the attack-line structure parts, their lines 1416, the near-edge ALA structure parts, and their area parts 1430 respectively interact with controller 1114/1134 operating as an intelligent controller subject to the PP, AD, FR, and CP supplemental impact criteria being criteria for a volleyball impacting surface 102. This includes using the location-dependent version of the CC capability for controlling the color changing in OB determinations.

Each FC area part adjoining a non-line VC area portion in IP structures 1300 and 1380 of FIGS. 98 and 99 is usually the same color as the normal-state color of the VC area portion, at least along the interface between the FC and VC area portions. If an FC area part adjoins two adjoining VC non-line area portions, the VC non-line area portions are usually the same normal-state color which is the color of the FC area part, at least along the interface between the FC area part and each VC non-line area portion.

Figure 100:
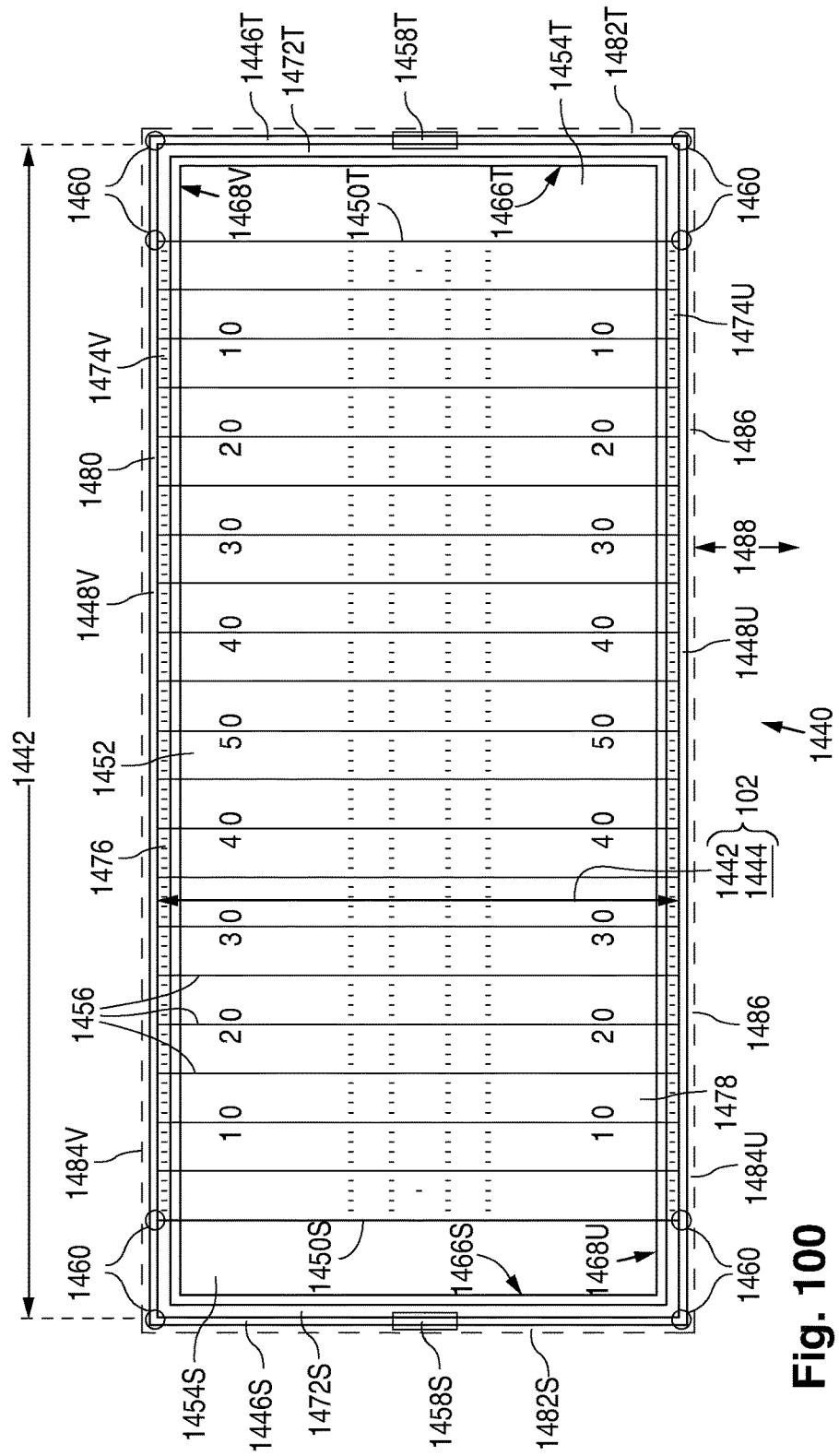

FIG. 100 illustrates an IP structure 1440 containing OI structure 900 or, preferably, cell-containing OI structure 1100, incorporated into a field used for U.S football to form a football-playing structure that provides assistance in determining where a football or a football player impacts the football field at/near its boundary. Object 104 is usually a football or a shoe of a football player but can be other parts of the player's body, including the clothes typically a football uniform worn by the player. Football IP structure 1440 applies to Canadian football by increasing the goal-line-to-goal-line dimension by 10% and doubling the end-zone width.

Surface 102 consists of a rectangular grass IB area 1442 and an annular OB area 1444 directly surrounding grass IB area 1442 and defined with grass or/and hard material. Grass can be natural or artificial. Area 1442 is defined inwardly by the inside edges of two opposite equal-width parallel straight end lines 1446S and 1446T (collectively "1446") and the inside edges of two opposite equal-width parallel straight side lines 1448U and 1448V (collectively "1448") extending between end lines 1446. Each line 1446 or 1448 is an open boundary line. Lines 1446 and 1448, usually approximately 10 cm wide, together form a rectangular closed boundary line 1446/1448 whose inside edge is a closed boundary for area 1442.

Two goal lines 1450S and 1450T (collectively "1450") extend between side lines 1448 parallel to end lines 1446 so that each goal line 1450 is 9.14 m (10 yd) away from nearest end line 1446. Goal lines 1450 divide IB area 1442 into a playing field 1452 and two end zones 1454S and 1454T. Playing field 1452 extends between goal lines 1450. End zone 1454S or 1454T extends between end line 1446S or 1446T and nearest goal line 1450S or 1450T.

Playing field 1452 has nineteen equal-width parallel straight yard lines 1456 extending between side lines 1448 parallel to goal lines 1450. Consecutive ones of goal lines 1450 and yard lines 1456 are spaced 4.57 m (5 yd) apart. Yard line 1456 at the longitudinal middle of field 1452 is marked "50". Alternate yard lines 1456 moving from center yard line 1456 toward each goal line 1450 are respectively marked "40", "30", "20", and "10". The football-playing structure has two pairs 1458S and 1458T of goal posts. A crossbar of each goal-post pair 1458S or 1458T is situated above, and spaced vertically apart from, part of end line 1446S or 1446T. Each crossbar is centered above its end line 1446 and is usually centrally supported by a curved support post mounted in OB area 1444. Two upright bars extend vertically upward from the ends of each crossbar. Flexible vertical posts 1460, commonly denominated pylons, are respectively situated at the intersections of side lines 1448 with lines 1446 and 1450.

Football is actively played only in IB area 1442. The players must be fully in area 1442 to actively participate in football. Special consequences such as penalties or play stoppages occur when the football or certain players, particularly a player in possession of the football, leave area 1442 during active play. In particular, a football player goes out of bounds during a football play when any part of the player's body or clothes, e.g., either of the player's shoes, contacts any of boundary lines 1446 and 1448. Play is briefly suspended when any part of the body or clothes of the player in possession of the football contacts any of lines 1446 and 1448. Similarly, a football goes out of bounds when it contacts any boundary line 1446 or 1448, likewise resulting in a brief suspension of play. Hence, lines 1446 and 1448 are parts of OB area 1444. The inside edge of each of lines 1446 and 1448 is its critical edge for determining whether object 104 embodied with a football or (any part of) a person including the person's shoes and other clothing is in or out of bounds.

A straight end-line path 1466S or 1466T defined with hard material is provided in the grass fully along each end line 1446S or 1446T such that it is fully situated in end-line path 1466S or 1466T. A straight side-line path 1468U or 1468V defined with hard material is provided in the grass fully along each side line 1448U or 1448V such that it is fully situated in side-line path 1468U or 1468V. End-line paths 1466S and 1466T (collectively "1466") and side-line paths 1468U and 1468V (collectively "1468") may be the bottoms of channels in grass if OB area 1444 is grass fully along IB area 1442. If area 1444 is defined with hard material along boundary lines 1446 or 1448, boundary-line (end-line and side-line) paths 1466 or 1468 merge into the hard material of area 1444.

Each boundary-line path 1466 or 1468 preferably includes a narrow elongated straight part, termed an inside-edge path part, extending fully along the inside edge of that path's boundary line 1446 or 1448. The inside-edge path part of each path 1466 or 1468 is usually no more than twice as wide as, preferably no wider than, its line 1446 or 1448. If OB area 1444 is grass fully along the outside edges of lines 1446 or 1448, each path 1466 or 1468 optionally includes a path part, termed an outside-edge path part, extending fully along the outside edge of that path's line 1446 or 1448. Because football is actively played only in IB area 1442, the presence of paths 1466 and 1468 along lines 1446 and 1448 generally has little effect on football play.

A narrow elongated straight part 1472S or 1472T of IB area 1442 lying fully along the inside edge of each end line 1446S or 1446T forms, as highest CC location priority for lines 1446, a VC inside-edge ELA area part embodying a unit of SF zone 112. A narrow elongated straight part 1474U or 1474V of area 1442 lying fully along the inside edge of each side line 1448U or 1448V forms, as highest CC location priority for lines 1448, a VC inside-edge SLA area part embodying a unit of zone 112. Each VC inside-edge LA part 1472S, 1472T, 1474U, or 1474V is located at the inside-edge path part of path 1466S, 1466T, 1468U, or 1468V so as to at least partly occupy that path part's width. Inside-edge LA parts 1472S and 1472T (collectively "1472") and 1474U and 1474V (collectively "1474") form a rectangular annular VC inside-edge BV LA area portion 1476. The rectangular FC remainder 1478 of area 1442 bounded by LA area portion 1476 embodies a unit of FC SF zone 114.

Each end line 1446S or 1446T is, as next highest CC location priority for lines 1446, a VC end-line area part embodying a unit of SF zone 892 at end-line path 1466S or 1466T. Each side line 1448U or 1448V is, as next highest CC location priority for lines 1448, a VC side-line area part embodying a unit of zone 892 at side-line path 1468U or 1468V. Boundary lines 1446 and 1448 form a rectangular annular VC boundary line area 1480. OB area 1444 is an FC area part embodying a unit of SF zone 894.

A narrow elongated straight part 1482S or 1482T of OB area 1444 lying fully along the outside edge of each end line 1446S or 1446T optionally forms a VC outside-edge ELA area part embodying a unit of SF zone 912. A narrow elongated straight part 1484U or 1484V of area 1444 lying fully along the outside edge of each side line 1448U or 1448V optionally forms a VC outside-edge SLA area part embodying a unit of zone 912. If area 1444 is grass fully along the outside edge of each boundary line 1446S, 1446T, 1448U, or 1448V, VC outside-edge LA part 1482S, 1482T, 1484U, or 1484V is located at the outside-edge path part of path 1466S, 1466T, 1468U, or 1468V so as to at least partly occupy that path part's width. Outside-edge LA parts 1482S and 1482T (collectively "1482") and 1484U and 1484V (collectively "1484") form a rectangular annular VC outside-edge BV LA area portion 1486. For these options, the annular FC remainder 1488 of area 1444 bounded by LA area portion 1486 embodies a unit of SF zone 914.

A VC structure part of IP structure 1440 extends to surface 102 at each of lines 1446 and 1448 and VC LA area parts 1472, 1474, 1482, and 1484. In particular, structure 1440 includes (a) VC inside-edge ELA structure consisting of two VC inside-edge ELA structure parts respectively formed with two units of VC region 106 and extending to surface 102 respectively at inside-edge ELA area parts 1472, (b) VC inside-edge SLA structure consisting of two VC inside-edge SLA structure parts respectively formed with two units of region 106 and extending to surface 102 respectively at inside-edge SLA area parts 1474, (c) VC end-line structure consisting of two VC end-line structure parts respectively formed with two units of VC region 886 and extending to surface 102 respectively at end lines 1446, (d) VC side-line structure consisting of two VC side-line structure parts respectively formed with two units of region 886 and extending to zone 112 respectively at side lines 1448, (e) VC outside-edge ELA structure consisting of two VC outside-edge ELA structure parts respectively formed with two units of VC region 906 and extending to surface 102 respectively at outside-edge ELA area parts 1482, and (f) VC outside-edge SLA structure consisting of two VC outside-edge SLA structure parts respectively formed with two units of region 906 and extending to surface 102 respectively at outside-edge SLA area parts 1484.

Each VC inside-edge ELA structure part normally appears along its ELA area part 1472S or 1472T as a PP BV color AIS or AIT embodying PP color A. Each VC inside-edge SLA structure part normally appears along its SLA area part 1474U or 1474V as a PP BV color AIU or AIV embodying color A. Each VC inside-edge ELA or SLA structure part is therefore a VC inside-edge BV LA structure part normally appearing along its LA area part 1472S, 1472T, 1474U, or 1474V as color AIS, AIT, AIU, or AIV. Each VC end-line structure part normally appears along its end line 1446S or 1446T as an AD BV color BBS or BBT embodying AD color B. Each VC side-line structure normally appears along its side line 1448U or 1448V as an AD BV color BBU or BBV embodying color B. Consequently, each VC end-line or side-line structure part is a VC BV line structure part normally appearing along its boundary line 1446S, 1446T, 1448U, or 1448V as color BBS, BBT, BBU, or BBV. Each VC outside-edge ELA structure part normally appears along its ELA area part 1482S or 1482T as an FR BV color COS or COT embodying FR color C. Each VC outside-edge SLA structure part normally appears along its SLA area part 1484U or 1484V as an FR BV color COU or COV embodying color C. Each VC outside-edge ELA or SLA structure part is thus a VC outside-edge BV LA structure part normally appearing along its LA area part 1482S, 1482T, 1484U, or 1484V as color COS, COT, COU, or COV.

IDVC portion 138 of each VC inside-edge BV LA structure part responds to object 104 impacting LA area part 1472S, 1472T, 1474U, or 1474V of that structure part at OC area 116 as described above for the general OI structure without intelligent control with changed color X embodied as a changed BV color XIS, XIT, XIU, or XIV materially different from PP BV color AIS, AIT, AIU, or AIV. IDVC portion 926 of each VC BV line structure part responds to object 104 impacting boundary line 1446S, 1446T, 1448U, or 1448V of that structure part at OC area 896 as prescribed for the general OI structure without intelligent control with altered color Y embodied as an altered BV color YBS, YBT, YBU, or YBV materially different from AD BV color BBS, BBT, BBU, or BBV. An FR IDVC portion of each VC outside-edge BV LA structure part responds to object 104 impacting LA area part 1482S, 1482T, 1484U or 1484V of that structure part at OC area 916 as prescribed for the general OI structure without intelligent control with modified color Z embodied as a modified BV color ZOS, ZOT, ZOU, or ZOV materially different from FR BV color COS, COT, COU, or COV.

IP structure 1440 preferably contains CC controller 1114 for implementing one of IP structures 1110 and 1170 or CC controller 1134 for implementing one of IP structure 1130 and 1200. It is usually sufficient for controller 1114/1134 to operate as a duration controller for making OB determinations in IP structure 1440. If controller 1114/1134 is to operate as an intelligent controller for making OB determinations, the inside-edge BV LA structure parts, their area parts 1472 and 1474, the BV line structure parts, their lines 1446 and 1448, the outside-edge BV LA structure parts, and their area parts 1482 and 1484 interact with controller 1114/1134 the same as the far-edge 3P LA structure parts, their area parts 1344, the 3PL structure parts, their lines 1334, the near-edge 3P LA structure parts, and their area parts 1358 respectively interact with controller 1114/1134 operating as an intelligent controller in basketball IP structure 1300 subject to the PP, AD, FR, and CP supplemental impact criteria being criteria for a football and/or a person's shoe, specifically a football shoe, impacting surface 102. This includes using the location-dependent version of the CC capability to control the color changing in OB determinations.

As exemplified by FIGS. 98-100 for basketball, volleyball, and football along with FIGS. 96 and 97 for tennis, a general sports-playing IP structure employs the above-mentioned general sports-playing OI structure having surface 102 for being impacted by object 104 embodied as a sports instrument or a person, typically a player, including any clothing worn by the person. Surface 102 has (a) an IB area, exemplified by IB area 42, 1302, 1382, or 1442, defined by a closed boundary and (b) an OB area, exemplified by OB area 44, 1304, 1384, or 1444, surrounding the IB area and adjoining it along the closed boundary. A finite-width closed boundary line, exemplified by closed boundary line 28/46, 1306/1308, 1386/1388, or 1446/1448, extends fully along the closed boundary and has opposite inside and outside edges respectively nearest to and farthest from the center of the IB area. One of the line's inside and outside edges lies in one of the IB and OB areas. The other of the line's inside and outside edges meets the other of the IB and OB areas.

Let LA area parts 1242E, 1244E, and 1244D along the inside edge of closed boundary line 28/46 in tennis IP structure 1230 be collectively termed inside-edge BV LA area portion 1242E/1244I. The closed boundary line is an object-related line of the general OI structure. The associated VC first-edge and second-edge structure parts for the boundary line are then respectively directly or inversely (a) VC inside-edge BV LA structure that extends to surface 102 at VC inside-edge BV LA area lying in the IB area, adjoining the inside edge of the line along at least part of the line's length, and exemplified by sometimes-discontinuous VC inside-edge BV LA area portion 1242E/1244I, 1342, 1428, or 1476 and (b) VC outside-edge BV LA structure that extends to surface 102 at VC outside-edge BV LA area lying in the OB area, adjoining the outside edge of the line along at least part of the line's length, and exemplified by sometimes-discontinuous VC outside-edge BV LA area portion 1246T, 1276T, 1356, 1406, or 1486.

The outside-edge BV LA structure is the first-edge structure part and constitutes the highest CC location priority for the boundary line if it, including its inside edge, lies in the IB area. PP color A and changed color X of the first-edge structure part are then respectively a normal-state outside-edge BV LA color and a changed-state outside-edge BV LA color exemplified by the normal-state and changed-state colors of outside-edge LA area portion 1246T, 1276T, or 1406. The inside-edge BV LA structure is the second-edge structure part for which its FR color C and modified color Z are respectively a normal-state inside-edge BV LA color and a changed-state inside-edge BV LA color exemplified by the normal-state and changed-state colors of inside-edge LA area portion 1242E/1244I or 1428.

The inside-edge BV LA structure is the VC first-edge structure part and constitutes the highest CC location priority for the boundary line if it, including its outside edge, lies in the OB area. In that case, colors A and X of the first-edge structure part are respectively a normal-state inside-edge BV LA color and a changed-state inside-edge BV LA color exemplified by the normal-state and changed-state colors of inside-edge LA area portion 1342 or 1476. The outside-edge BV LA structure is the VC second-edge structure part for which its colors C and color Z are respectively a normal-state outside-edge BV LA color and a changed-state outside-edge BV LA color exemplified by the normal-state and changed-state colors of outside-edge LA area portion 1356 or 1486.

In either case, the VC line structure of the general OI structure constitutes, as the next highest CC location priority for the boundary line, VC boundary-line structure extending to surface 102 at the line along at least part of its length. AD color B and altered color Y of the line structure are respectively a normal-state BV line color and a changed-state BV line color exemplified by the normal-state and changed-state line color(s) of the VC area of closed boundary line 28/46, 1306/1308, 1386/1388, or 1446/1448.

An internal line different from the closed boundary line and exemplified by any of servicelines 34, 3P lines 1334, and attack lines 1396 is another object-related line of the general OI structure. The general sports-playing IP structure sometimes has one or more score-achieving structures, exemplified by baskets 1316S and 1316T, situated on or near surface 102. If so, one or more of the object-related internal lines, exemplified by internal 3P lines 1334, may be pertinent to scoring accomplished with the one or more score-achieving structures. A selected one of the edges of each object-related internal line is its critical edge for determining how impact of object 104 on or near that line affects play. The selected edge of each internal line is, for convenience, arbitrarily deemed to be its first edge.

The VC first-edge structure part for each such internal line is, as its highest CC location priority, VC first-edge internal LA structure extending to surface 102 at VC first-edge internal LA area adjoining the first edge of that line and exemplified by each VC internal LA area part/portion 1242S, 1272, 1344, or 1408. Colors A and X of the first-edge structure part are then respectively a normal-state first-edge internal LA color and a changed-state first-edge internal LA color exemplified by the normal-state and changed-state colors of each part/portion 1242S, 1272, 1344, or 1408.

The VC line structure part for each such internal line is, as its next highest CC location priority, VC internal-line structure extending to surface 102 at that line along at least part of the line's length. Colors B and Y of the line structure are respectively a normal-state internal-line color and a changed-state internal-line color exemplified by the normal-state line and changed-state colors of the VC area of each internal line 34, 1334, or 1396.

The VC second-edge structure part for each such internal line is VC second-edge internal LA structure extending to surface 102 at VC second-edge internal LA area adjoining the second edge of that line and exemplified by each VC internal LA area part 1240S, 1358, or 1430. Color C and Z of the second-edge structure part are then respectively a normal-state second-edge internal LA color and a changed-state second-edge internal LA color exemplified by the normal-state and changed-state colors of each part 1240S, 1358, or 1430.

Figure 101:
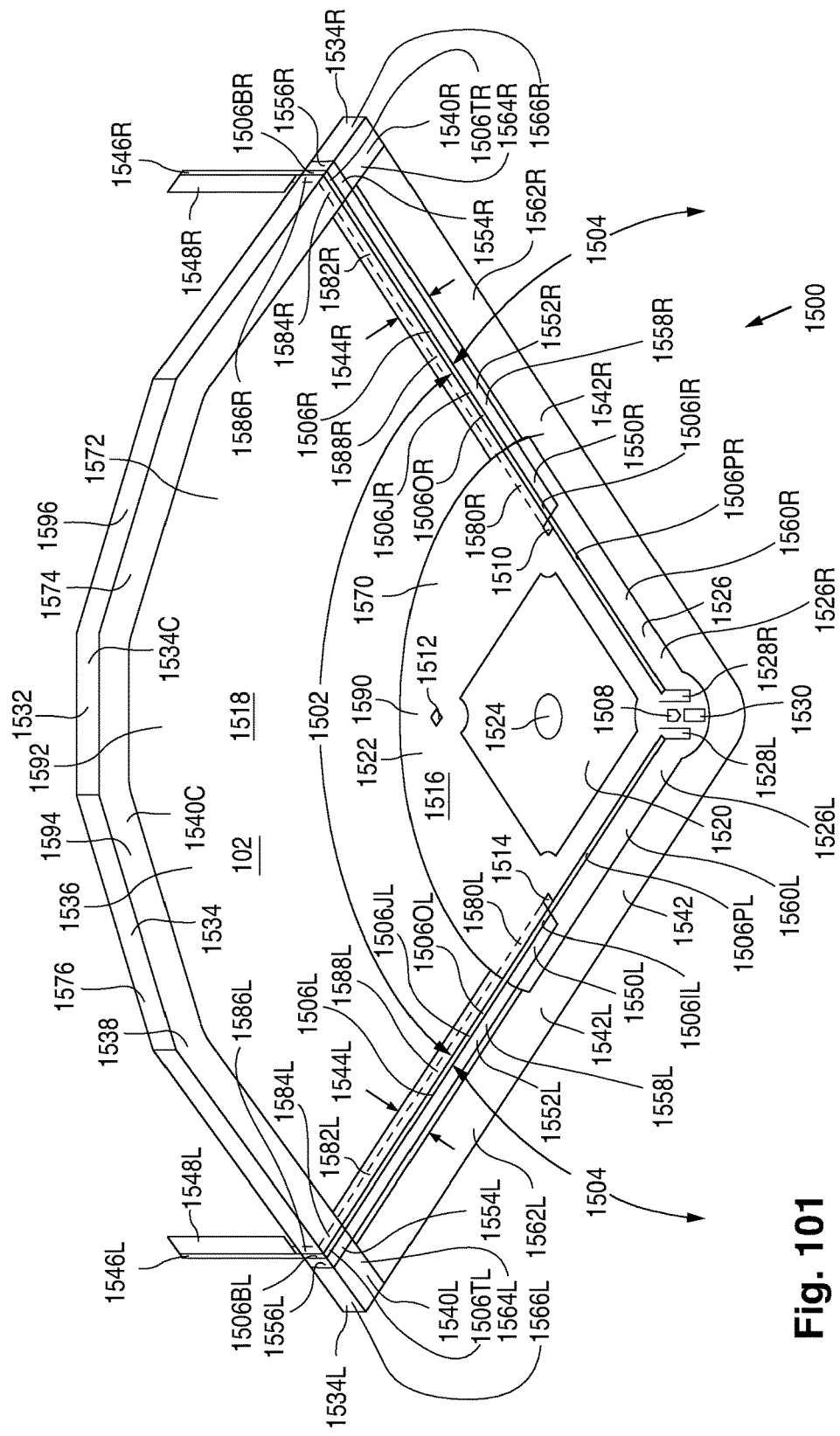
FIG. 101 is a perspective view of an exemplary embodiment of an IP structure implemented into a baseball or softball field according to the invention.

FIG. 101 illustrates an IP structure 1500 containing OI structure 900 or, preferably, cell-containing OI structure 1100, incorporated into a baseball or softball field to form a ball-playing structure that provides assistance in making decisions on where a batted baseball or softball impacts certain parts of the field. Surface 102 includes an IB ground area 1502, termed fair area, having a perimeter shaped roughly like a quarter circle, and an OB ground area 1504, termed foul area, that adjoins fair area 1502 along left and right foul lines 1506L and 1506R (collectively "1506"). Fair territory and foul territory respectively go vertically upward from areas 1502 and 1504. Foul lines 1506, typically 5-8 cm wide, are parts of fair territory and have straight fair-area portions extending perpendicular to each other in fair area 1502 so as to essentially meet each other. Each foul line 1506 has an outside (or foul-area) edge meeting foul area 1504 and an inside (or fair-area) edge lying in fair area 1502.

A batted baseball or softball embodying object 104 for IP structure 1500 is termed batted ball 104, sometimes simply ball 104. Batted ball 104 is fair, in bounds, whenever it impacts anywhere in fair territory including either foul line 1506. Ball 104 simultaneously impacting a foul line 1506 and a tangible part of foul territory is fair. Ball 104 solely impacting a tangible part of foul territory is foul, out of bounds. The outside edge of each foul line 1506 is thus its critical edge for determining whether ball 104 is fair or foul.

Fair area 1502 further includes a home plate 1508 constituting the meeting location of foul lines 1506, a first base 1510 along right foul line 1506R, a second base 1512 between foul lines 1506 generally opposite home plate 1508, and a third base 1514 along left foul line 1506L. Plate 1508 and bases 1510, 1512, and 1514 lie at the corners of an imaginary square. Area 1502 is divided into general infield and outfield areas 1516 and 1518. General infield area 1516 consists of a grass area 1520 and a dirt area 1522 which surrounds grass infield area 1520 and in which bases 1510, 1512, and 1514 are located. Grass can again be natural or artificial. Grass infield area 1520 surrounds a dirt pitcher's mound 1524 whose central point lies at the centroid of plate 1508 and bases 1510, 1512, and 1514. Dirt infield area 1522 extends along parts of foul lines 1506 to plate 1508.

Dirt infield area 1522 adjoins a foul-territory dirt area 1526 lying in foul area 1504. "FLT" hereafter means foul-territory. FLT dirt area 1526 extends along foul lines 1506 respectively beyond bases 1514 and 1510. In particular, dirt area 1526 includes (i) a left FLT dirt area section 1526L extending from home plate 1508 along the outside edge of left foul line 1506L beyond third base 1514 and (ii) a right FLT dirt area section 1526R extending from plate 1508 along the outside edge of right foul line 1506R beyond first base 1510. Batters' boxes 1528L and 1528R are situated respectively to the left and right of plate 1508 partly in infield area 1522 and partly in FLT dirt area 1526. A baseball or softball is batted ball 104 when a player, the batter, standing in either of batters' boxes 1528L and 1528R hits the ball with a bat after a player, the pitcher, standing on pitcher's mound 1524 throws the ball toward plate 1508. A catcher's box 1530 lies in area 1526 behind plate 1508.

General outfield area 1518 extends to an upward-extending outfield barrier 1532 commonly termed a "fence" but often including one or more walls. Outfield barrier 1532 has an inside barrier area 1534 facing fair area 1502 so as to meet it and foul area 1504. The fair-area portions of foul lines 1506 substantially meet barrier 1532. Foul lines 1506 have substantially-straight barrier portions extending up inside barrier area 1534. The longitudinal centerlines of lines 1506 lie respectively in perpendicularly intersecting vertical planes. Barrier area 1534 constitutes part of surface 102 so that it is non-flat here.

Letting "FRT" hereafter mean fair-territory, barrier area 1534 consists of (i) a central FRT inside barrier area section 1534C which meets fair area 1502, (ii) a left FLT inside barrier area section 1534L which meets foul area 1504 and is continuous with FRT inside barrier area section 1534C along left foul line 1506L, and (iii) a right FLT inside barrier area section 1534R which meets area 1504 and is continuous with FRT barrier section 1534C along right foul line 1506R. Barrier 1532, specifically the bottom edge of FRT barrier section 1534C, and lines 1506, specifically their lateral portions, inwardly define fair area 1502.

A grass area 1536 of outfield area 1518 adjoins dirt infield area 1522. Although grass outfield area 1536 sometimes extends to barrier 1532, a warning track 1538 defined with dirt or other hard material is often situated between barrier 1532 and outfield area 1536. Warning track 1538 has a warning track area consisting of (i) a central FRT track area section 1540C extending along barrier 1532 between foul lines 1506, (ii) a left FLT track area section 1540L lying in foul area 1504 along left foul line 1506L, and (iii) a right FLT track area section 1540R lying in area 1504 along right foul line 1506R. Item 1542 indicates an FLT grass area lying in foul area 1504, adjoining grass outfield area 1536, and adjoining FLT dirt area 1526 so as to be spaced apart from batters' boxes 1528L and 1528R and catcher's box 1530. FLT grass area 1542 includes (i) a left FLT grass area section 1542L lying along left FLT dirt area section 1526L and the outside edge of left foul line 1506L beyond dirt section 1526L and (ii) a right FLT grass area section 1542R lying along right FLT dirt area section 1526R and the outside edge of right foul line 1506R beyond dirt section 1526R. Although not indicated in FIG. 101, FLT track area sections 1540L and 1540R often extend continuously along FLT grass area 1542 to form a composite FLT track area.

A straight channel 1544L or 1544R extending down to hard material is provided in the grass along foul line 1506L or 1506R from infield area 1516, specifically dirt area 1522, either to barrier 1532 or, if present, to track 1538. The part 1506OL or 1506OR, termed a main outfield foul-line area part, of each foul line 1506L or 1506R extending from dirt infield area 1522 through grass outfield area 1536 either to barrier 1532 or, if present, to track 1538 lies in foul-line channel 1544L or 1544R along its hard material. Foul-line channel 1544L or 1544R is usually wider than main outfield foul-line area part 1506OL or 1506OR so as to include two elongated straight portions respectively lying in areas 1502 and 1504 and extending fully along both edges of outfield foul-line part 1506OL or 1506OR. Channels 1544L and 1544R (collectively "1544") can, for example, be 0.5-1 m wide.

In addition to outfield foul-line part 1506OL or 1506OR, each foul line 1506L or 1506R includes (a) an infield-path (or base-path) foul-line area part 1506PL or 1506PR extending essentially from home plate 1508 to base 1514 or 1510, (b) a beyond-path ("BP") infield foul-line area part 1506IL or 1506IR extending from base 1514 or 1510 along dirt infield area 1522 to grass outfield area 1536, (c) a track foul-line area part 1506TL or 1506TR extending from outfield area 1536 along track 1538 substantially to barrier 1532 if track 1538 is present, and (d) a barrier foul-line area part 1506BL or 1506BR extending substantially from the bottom of barrier 1532 up central FRT inside barrier area section 1534C substantially to the top of barrier 1532. If track 1538 is absent, outfield foul-line part 1506OL or 1506OR extends from infield area 1522 through outfield area 1536 to barrier 1532.

Left and right foul poles 1546L and 1546R are situated closely behind barrier 1532 and extend vertically upward beyond barrier 1532. The longitudinal centerlines of foul poles 1546L and 1546R, both straight, respectively lie largely in the intersecting vertical planes of the longitudinal centerlines of foul lines 1506L and 1506R. Left-pole and right-pole screens 1548L and 1548R respectively often extend along the FRT sides of foul poles 1546L and 1546R. Foul poles 1546L and 1546R are deemed to be respective extensions of foul lines 1506L and 1506R and parts of fair territory. Batted ball 104 is fair, a home run, if it impacts either foul pole 1546L or 1546R, including screen 1548L or 1548R.

A narrow elongated straight part 1550L or 1550R of each FLT dirt area section 1526L or 1526R lying fully along the outside, i.e., FLT, edge of BP infield foul-line part 1506IL or 1506IR forms, as highest CC location priority for BP infield foul-line line parts 1506IL and 1506IR (collectively "1506I"), a VC BP infield-adjoining FLT LA part embodying a unit of SF zone 112. A narrow elongated straight part 1552L or 1552R of FLT grass area section 1542L or 1542R lying fully along the outside, or FLT, edge of outfield foul-line part 1506OL or 1506OR forms, as highest CC location priority for outfield foul-line line parts 1506OL and 1506OR (collectively "1506O"), a VC main outfield-adjoining FLT LA area part lying in foul-line channel 1544L or 1544R along its hard material and embodying a unit of zone 112. If track 1538 is present, a narrow elongated straight part 1554L or 1554R of FLT track area section 1540L or 1540R lying fully along the outside, or FLT, edge of track foul-line part 1506TL or 1506TR forms, as highest CC location priority for track foul-line parts 1506TL and 1506TR (collectively "1506T"), a VC track FLT LA area part embodying a unit of zone 112. A narrow elongated straight part 1556L or 1556R of FLT barrier area section 1534L or 1534R lying fully along the outside, or FLT, edge of barrier foul-line part 1506BL or 1506BR forms, as highest CC priority for barrier foul-line line parts 1506BL and 1506BR (collectively "1506B"), a VC barrier FLT LA area part embodying a unit of zone 112. VC FLT LA parts 1550L, 1552L, and 1556L or 1550R, 1552R, and 1556R and, if present, VC track FLT LA part 1554L or 1554R are usually continuous with one another to form a VC BP joint FLT LA area portion 1558L or 1558R extending from base 1514 or 1510 to barrier area section 1534L or 1534R and then vertically up it. There may be a small gap between barrier FLT LA part 1556L or 1556R and the remainder of BP joint FLT LA area portion 1558L or 1558R at the bottom of barrier 1532.

Each foul-line part 1506I, 1506O, or 1506B constitutes, as next highest CC location priorities for foul-line parts 1506I, 1506O, or 1506B, a VC foul-line area part embodying a unit of SF zone 892. If track 1538 is present, each track foul-line part 1506T is, as next highest CC location priority for track foul-line line parts 1506T, a VC foul-line area part embodying a unit of zone 892. VC foul-line parts 1506IL, 1506OL, and 1506BL or 1506IR, 1506OR, and 1506BR and, if present, VC track foul-line part 1506TL or 1506TR are usually continuous with one another to form a VC BP joint foul-line area portion 1506JL or 1506JR extending from base 1514 or 1510 to barrier 1532 and then vertically up FRT barrier area section 1534C. There may be a small gap between barrier foul-line part 1506BL or 1506BR and the remainder of BP joint foul-line area portion 1506JL or 1506JR at the bottom of barrier 1532.

Each of (a) the FC remainder 1560L or 1560R of FLT dirt area section 1526L or 1526R, (b) the FC remainder 1562L or 1562R of FLT grass area section 1542L or 1542R, (c) the FC remainder 1564L or 1564R of FLT track area section 1540L or 1540R if track 1538 is present, and (d) the FC remainder 1566L or 1566R of FLT barrier area section 1534L or 1534R embodies a unit of SF zone 114. Each of (a) the FC remainder 1570 of dirt infield area 1522, i.e., the part outside foul-line parts 1506I, (b) the FC remainder 1572 of grass outfield area 1536, i.e., the part outside foul-line parts 1506O, (c) the FC remainder 1574 of FRT track area section 1540C, i.e., the part outside foul-line parts 1506T, if track 1538 is present and (d) the FC remainder 1576 of FRT barrier area section 1534C, i.e., the part outside foul-line parts 1506B, embodies a unit of SF zone 894.

A narrow elongated straight part 1580L or 1580R of dirt infield area 1522 lying fully along the inside, i.e., FRT, edge of each BP infield foul-line part 1506IL or 1506IR optionally forms a VC BP infield FRT LA area part embodying a unit of SF zone 912. If foul-line channels 1544 are provided along foul lines 1506, a narrow elongated straight part 1582L or 1582R of grass outfield area 1536 lying fully along the inside, or FRT, edge of each outfield foul-line part 1506OL or 1506OR optionally forms a VC main outfield FRT LA area part lying in channel 1544L or 1544R and embodying a unit of zone 912. If track 1538 is present, a narrow elongated straight part 1584L or 1584R of FRT track area section 1540C lying fully along the inside, or FRT, edge of each track foul-line part 1506TL or 1506TR optionally forms a VC track FRT LA area part embodying a unit of zone 912. A narrow elongated straight part 1586L or 1586R of FRT inside barrier area section 1534C lying fully along the inside, or FRT, edge of each barrier foul-line part 1506BL or 1506BR optionally forms a VC barrier FRT LA area part embodying a unit of zone 912. VC FRT LA parts 1580L, 1582L, and 1586L or 1580R, 1582R, and 1586R and (if present) VC track FRT LA part 1584L or 1584R are usually continuous with one another to form a VC BP joint FRT LA area portion 1588L or 1588R extending from base 1514 or 1510 to barrier 1532 and then vertically up barrier area section 1534C. There may be a small gap between barrier LA part 1586L or 1586R and the remainder of BP joint FRT LA area portion 1588L or 1588R at the bottom of barrier 1532.

Each of (a) the FC part 1590 of dirt infield area 1522 outside foul-line parts 1506I and LA parts 1580L and 1580R, (b) the FC part 1592 of grass outfield area 1536 outside foul-line parts 1506O and LA parts 1582L and 1582R, (c) the FC part 1594 of FRT track area section 1540C outside foul-line parts 1506T and LA parts 1584L and 1584R if track 1538 is present, and (d) the FC part 1596 of barrier FRT area section 1534C outside foul-line parts 1506B and LA parts 1586L and 1586R embodies a unit of SF zone 914 in the preceding options.

A VC structure portion of IP structure 1500 extends to surface 102 at each of VC BP joint foul-line area portions 1506JL and 1506JR (collectively "1506J") and VC BP joint LA area portions 1558L and 1558R (collectively "1558") and 1588L and 1588R (collectively "1588"). Structure 1500 specifically includes (i) VC BP joint FLT LA structure consisting of two VC BP joint FLT LA structure portions extending to surface 102 respectively at joint FLT LA area portions 1558, (ii) VC BP joint foul-line structure consisting of two VC BP joint foul-line structure portions extending to surface 102 respectively at joint foul-line area portions 1506J, and (iii) VC BP joint FRT LA structure consisting of two VC BP joint FRT LA structure portions extending to surface 102 respectively at joint FRT LA area portions 1588.

Each VC BP joint FLT LA structure portion consists of (a) a VC BP infield-adjoining FLT LA structure part formed with a unit of VC region 106 and extending to surface 102 at infield-adjoining FLT LA area part 1550L or 1550R, (b) a VC main outfield-adjoining FLT LA structure part formed with a unit of region 106 and extending to surface 102 at main outfield-adjoining FLT LA area part 1552L or 1552R, (c) a VC track FLT LA structure part formed with a unit of region 106 and extending to surface 102 at track FLT LA area part 1554L or 1554R if track 1538 is present, and (d) a VC barrier FLT LA structure part formed with a unit of region 106 and extending to surface 102 at barrier FLT LA area part 1556L or 1556R. Each VC joint foul-line structure portion consists of (a) a VC BP infield foul-line structure part formed with a unit of VC region 886 and extending to surface 102 at BP infield foul-line area part 1506IL or 1506IR, (b) a VC main outfield foul-line structure part formed with a unit of region 886 and extending to surface 102 at main outfield foul-line area part 1506OL or 1506OR, (c) a VC track foul-line structure part formed with a unit of region 886 and extending to surface 102 at track foul-line area part 1506TL or 1506TR if track 1538 is present, and (d) a VC barrier foul-line structure part formed with a unit of region 886 and extending to surface 102 at barrier foul-line area part 1506BL or 1506BR. Each VC joint FRT LA structure consists of (a) a VC BP infield FRT LA structure part formed with a unit of VC region 906 and extending to surface 102 at infield FRT LA area part 1580L or 1580R, (b) a VC main outfield FRT LA structure part formed with a unit of region 906 and extending to surface 102 at main outfield FRT LA area part 1582L or 1582R, (c) a VC track FRT LA structure part formed with a unit of region 906 and extending to surface 102 at track FRT LA area part 1584L or 1584R if track 1538 is present, and (d) a VC barrier FRT LA structure part formed with a unit of region 906 and extending to surface 102 at barrier FRT LA area part 1586L or 1586R.

Batted ball 104 is fair if it impacts a joint foul-line portion 1506J or/and a joint FRT LA portion 1588. Ball 104 is also fair if it simultaneously impacts a joint foul-line portion 1506J and adjoining joint FLT LA portion 1558. However, ball 104 solely impacting an FLT LA portion 1558 or simultaneously impacting an FLT LA portion 1558 and one or more of an FC FLT dirt part 1560L or 1560R, FC FLT grass part 1562L or 1562R, FC FLT track part 1564L or 1564R if track 1538 is present, and FC FLT barrier part 1566L or 1566R without further simultaneously impacting anywhere in fair area 1502 or FRT barrier section 1534C is foul.

Letting "FLV" mean foul-line vicinity, each VC BP infield-adjoining FLT LA structure part normally appears along its LA area part 1550L or 1550R as a PP infield-vicinity FLV color AIL or AIR. Each VC main outfield-adjoining FLT LA structure part normally appears along its LA area part 1552L or 1552R as a PP outfield FLV color AOL or AOR. If track 1538 is present, each VC track FLT LA structure part normally appears along its LA area part 1554L or 1554R as a PP track FLV color ATL or ATR. Each VC barrier FLT LA structure part normally appears along its LA area part 1556L or 1556R as a PP barrier FLV color ABL or ABR. Normal-state colors AIL, AIR, AOL, AOR, ATL, ATR, ABL, and ABR, each embodying PP color A, are usually the same.

Each VC BP infield foul-line structure part normally appears along its foul-line area part 1506IL or 1506IR as an AD infield-vicinity FLV color BIL or BIR. Each VC main outfield foul-line structure part normally appears along its foul-line area part 1506OL or 1506OR as an AD outfield FLV color BOL or BOR. If track 1538 is present, each VC track foul-line structure part normally appears along its foul-line area part 1506TL or 1506TR as an AD track FLV color BTL or BTR. Each VC barrier foul-line structure part normally appears along its foul-line area part 1506BL or 1506BR as an AD barrier FLV color BBL or BBR. Infield-path foul-line area parts 1506PL and 1506PR are FC line area parts that appear as the same fixed color FL. Normal-state colors BIL, BIR, BOL, BOR, BTL, BTR, BBL, and BBR, each embodying AD color B, are usually largely color FL.

Each VC BP infield FRT LA structure part normally appears along its LA area part 1580L or 1580R as an FR infield-vicinity FLV color CIL or CIR. Each VC main outfield FRT LA structure part normally appears along its LA area part 1582L or 1582R as an FR outfield FLV color COL or COR. If track 1538 is present, each VC track FRT LA structure part normally appears along its LA area part 1584L or 1584R as an FR track FLV color CTL or CTR. Each VC barrier FRT LA structure part normally appears along its LA area part 1586L or 1586R as an FR barrier FLV color CBL or CBR. Normal-state colors CIL, CIR, COL, COR, CTL, CTR, CBL, and CBR, each embodying FR color C, are usually the same.

IDVC portion 138 of each VC FLT LA structure part responds to ball 104 impacting LA area part 1550L, 1550R, 1552L, 1552R, 1554L, 1554R, 1556L, or 1556R of that structure part at OC area 116 as described above for the general OI structure without intelligent control with changed color X embodied as a changed FLV color XIL, XIR, XOL, XOR, XTL, XTR, XBL, or XBR materially different from PP FLV color AIL, AIR, AOL, AOR, ATL, ATR, ABL, or ABR of that structure part. Each color XIL or XIR is a changed infield-vicinity FLV color. Each color XOL or XOR is a changed outfield FLV color. Each color XTL or XTR is a changed track FLV color. Each color XBL or XBR is a changed barrier FLV color. Changed-state colors XIL, XIR, XOL, XOR, XTL, XTR, XBL, and XBR, each embodying changed color X, are usually the same.

IDVC portion 926 of each VC foul-line structure part responds to ball 104 impacting foul-line area part 1506IL, 1506IR, 1506OL, 1506OR, 1506TL, 1506TR, 1506BL, or 1506BR of that structure part at OC area 896 as prescribed for the general OI structure without intelligent control with altered color Y embodied as an altered FLV color YIL, YIR, YOL, YOR, YTL, YTR, YBL, or YBR materially different from AD FLV color BIL, BIR, BOL, BOR, BTL, BTR, BBL, or BBR. Each color YIL or YIR is an altered infield-vicinity FLV color. Each color YOL or YOR is an altered outfield FLV color. Each color YTL or YTR is an altered track FLV color. Each color YBL or YBR is an altered barrier FLV color. Changed-state colors YIL, YIR, YOL, YOR, YTL, YTR, YBL, and YBR, each embodying altered color Y, are usually the same.

An FR IDVC portion of each VC FRT LA structure part responds to ball 104 impacting LA area part 1580L, 1580R, 1582L, 1582R, 1584L, 1584R, 1586L, or 1586R of that structure part at an OC area 916 as prescribed for the general OI structure without intelligent control with modified color Z embodied as a modified FLV color ZIL, ZIR, ZOL, ZOR, ZTL, ZTR, ZBL, or ZBR materially different from FR FLV color CIL, CIR, COL, COR, CTL, CTR, CBL, or CBR. Each color ZIL or ZIR is a modified infield-vicinity FLV color. Each color ZOL or ZOR is a modified outfield FLV color. Each color ZTL or ZTR is a modified track FLV color. Each color ZBL or ZBR is a modified barrier FLV color. Changed-state colors ZIL, ZIR, ZOL, ZOR, ZTL, ZTR, ZBL, and ZBR, each embodying modified color Z, are usually the same.

IP structure 1500 preferably contains CC controller 1114 for implementing one of IP structures 1110 and 1170 or CC controller 1134 for implementing one of IP structure 1130 and 1200. It is usually sufficient for controller 1114/1134 to operate as a duration controller for making fair/foul determinations. If controller 1114/1134 is to operate as an intelligent controller for making fair/foul determinations, the BP infield-adjoining FLT LA structure parts, their area parts 1550L and 1550R, the VC BP infield foul-line structure parts, their area parts 1506I, the BP infield FRT LA structure parts, and their area parts 1580L and 1580R interact with controller 1114/1134 the same as the VC far-edge 3P LA structure parts, their area parts 1344, the 3PL structure parts, their lines 1334, the near-edge 3P LA structure parts, and their area parts 1358 respectively interact with controller 1114/1134 operating as an intelligent controller in basketball IP structure 1300 subject to the PP, AD, FR, and CP supplemental impact criteria being criteria for a baseball/softball impacting surface 102. The same applies to (a) the main outfield-adjoining FLT LA structure parts, their area parts 1552L and 1552R, the main outfield foul-line structure parts, their area parts 1506O, the main outfield FRT LA structure parts, and their area parts 1582L and 1582R, (b) the track FLT LA structure parts, their area parts 1554L and 1554R, the track foul-line structure parts, their area parts 1506T, the track FRT LA structure parts, and their area parts 1584L and 1584R if track 1538 is present, and (c) the barrier FLT LA structure parts, their area parts 1556L and 1556R, the barrier foul-line structure parts, their area parts 1506B, the barrier FRT LA structure parts, and their area parts 1586L and 1586R.

Depending on the configuration of the ballpark especially for professional baseball, the CC capability can be utilized near the top of selected area of barrier 1532 to determine whether batted ball 104 impacting that area is, or is not, a home run.

A basketball, volleyball, football, or baseball/softball IP structure according to the invention may have less CC capability than what occurs in IP structure 1300, 1380, 1440, or 1500. In general, a basketball, volleyball, football, or baseball/softball IP structure according to the invention selectively contains one or more of the VC structures parts or portions described above for structure 1300, 1380, 1440, or 1500 generally provided that the basketball, volleyball, football, or baseball/softball IP structure usually contains both of each pair of symmetrically situated VC structure parts or portions. When the CC capability is provided at elongated area directly along the non-critical edge of a line, the elongated area along the critical edge of the line is usually at least as wide as, preferably wider than, the elongated area along the non-critical edge of the line. The width of the elongated area along the critical edge usually exceeds the width of the elongated area along the non-critical edge by approximately the width of that line.

The present CC capability can be used in numerous other sports, especially where a penalty is assessed or a reward is made or/and active play is temporarily stopped if an object, such as a ball, impacts certain areas. Other sports suitable for the CC capability include squash, racketball, racquetball, handball (American), team handball (European), jai alai, platform tennis, paddle tennis, Basque pelota, padel, paleta fronton, real tennis, soft tennis, and squash tennis. In each of these other sports, each location having the CC capability contains at least one unit of VC region 106, typically at or directly along a finite-width line where a penalty/reward/play-stoppage decision needs to be made. SF zone 112 of each unit of region 106 can be the line or an area, usually elongated, extending along the line so as to adjoin it on one edge (or side) or the other depending on the rules of the sport.

Preferably, the CC capability is embodied with units of both VC regions 106 and 886 similar to what occurs in tennis IP structure 1260. One of SF zones 112 and 892 is then embodied with the line. The other of zones 112 and 892 is embodied with an area, again usually elongated, extending directly along the line so as to adjoin it on one edge or the other depending on the sport's rules. The CC capability can be embodied with units of VC regions 106, 886, and 906 similar to what occurs in tennis IP structure 1230. If so, zone 892 is embodied with the line. Zones 112 and 892 are then respectively embodied with a pair of areas, likewise usually elongated, adjoining the line along both edges.

Each unit of VC region 106 preferably includes components 182 and 184 typically implemented as in OI structure 200. Each unit of VC region 886 preferably includes components 932 and 934 typically implemented as in OI structure 930. Each unit of VC region 906 preferably includes an IS component and a CC component typically implemented the same as CC component 184 in structure 200.

Squash played inside a hollow rectangular court similar to a shoe box but potentially open at the top has a floor, a front wall, two parallel sidewalls, a back wall, and usually a ceiling. The top surface of the floor, the inside surfaces of the walls, and the bottom surface of the ceiling (when present) embody surface 102. A squash court employs lines on the insides of the walls and the top of the floor. An out line is formed by a straight front-wall line extending parallel to the floor, a straight back-wall line extending parallel to the floor at a lower height above the floor than the front-wall line, and two straight side-wall lines extended slantedly from the front-wall line to the back-wall line. The front wall has a straight service line extending parallel to the floor. A rectangular metal plate, usually substantially tin, extends from the floor partway up the front wall and ends below the service line. Lines on the floor include a short line extending parallel to the front (or back) wall and a half-court line extending perpendicular to the short line. The short and half-court lines in conjunction with the side and back walls define inwardly two quarter courts. Each quarter court has a service box spaced apart from the half-court line and extending to the closest sidewall.

A served ball embodying object 104 in squash is served with the server's feet/shoes positioned in the service box of one of the quarter courts. The ball must impact the front wall above the top edge of the service line and below the bottom edge of the front-wall line, i.e., the part of the out line on the front wall, and then impact the floor fully in the other (or opposite) quarter court, i.e., beyond the outside edge of the short line, where "outside" is again relative to the front wall, and inside the inside edge of the half-court line, where "inside" is relative to that other quarter court, in order to be "in". A returned ball embodying object 104 must impact the front wall above the tin plate and, in impacting the front wall or any other wall, must impact each wall below the out line in order to be "in".

The top edge of the service line, the bottom edge of the out line, and the outside edge of the short line constitute the critical edges of those lines. Hence, the CC capability is preferably at least provided as three units of SF zone 112 respectively in three elongated areas, usually straight, directly along the top edge of the service line, the bottom edge of the out line, and the outside edge of the short line. The server can be positioned in the service box of either quarter court depending on the play status so that each edge of the half-court line constitutes its critical edge at some point. The CC capability is then preferably at least provided as units of SF zones 112 and 912 in elongated areas, usually straight, directly along both edges of the half-court line. The CC capability can also be provided as a unit of SF zone 892 at each service, out, short, or half-court line.

The top of the tin plate forms a straight zero-width line extending parallel to the floor and essentially having a critical edge along the front wall. Inasmuch as a returned ball impacting the tin plate is "out", the CC capability is preferably at least provided as a unit of SF zone 112 in elongated front-wall area, usually straight, directly along, and extending upward from, the top edge of the tin plate. The CC capability can also be provided as a unit of SF zone 892 in an elongated cover plate, usually largely rectangular, situated over the tin plate directly along, and extending downward from, its top edge partway to the floor. Alternatively, the tin plate can be replaced with CC capability provided as a unit of zone 892 in elongated front-wall area, usually largely straight, extending downward from the prior location of the top of the tin plate partway to the floor. A narrower tin plate can extend from that unit of zone 892 in the elongated front-wall area down to the floor.

Racketball uses the same court as squash. The ball in/out rules during service and return play in racketball are the same as in squash except that racketball apparently does not use the parts of the out line along the side and back walls. The locations provided with CC capability for squash are adequate for racketball.

Racquetball, different from racketball, is played inside a rectangular court similar to a shoebox having a floor, a front wall, two sidewalls, a back wall, and a ceiling. Handball (American) is played both indoors in a rectangular court having a floor, a front wall, two sidewalls, a back wall, and a ceiling and outdoors in a rectangular court having a floor, a front wall, and two parallel sidewalls but no back wall or ceiling. In both racquetball and handball, the top surface of the floor, the adjoining surfaces of the walls, and the bottom surface of the ceiling (when present) embody surface 102.

Both racquetball and handball employ a short line located on the top of the floor and extending parallel to the front wall. A served ball embodying object 104 must impact surface 102 beyond (or behind) the outside (or back) edge of the straight short line for the ball to be "in" where "outside" (or "back") is relative to the front wall. When the back wall is absent, handball employs a straight long line located on the top of the floor beyond the short line and extending parallel to the front wall. A served or returned ball embodying object 104 is "in" if it impacts the long line but "out" if it impacts surface 102 beyond the outside edge of the long line. The outside edge of the short line or, for handball, the long line is its critical edge. The CC capability is preferably at least provided as a unit of SF zone 112 in elongated area, usually largely straight, lying directly along the outside edge of each short or long line. The CC capability can also be provided as a unit of SF zone 892 at each short or long line.

Handball is also played in a one-wall version in which the top of the floor has two parallel sidelines extending perpendicular to the short and long lines. A served or returned ball embodying object 104 is "in" if it impacts either side line but "out" if it impacts surface 102 beyond the outside edge of either side line. The outside edge of each side line is its critical edge.

Team handball (European) is played between two teams on a court whose top surface embodies surface 102 and consists of a rectangular IB area divided into two half courts and an OB area directly surrounding the IB area. Each half court has a number of lines, including a long curved goal-area line (6-m line) and a short straight goalkeeper's restraining line (4-m line). Neither foot, specifically shoe, of either goalkeeper is permitted to impact surface 102 outside that goalkeeper's restraining line during a 7-m free-throw attempt before the ball has left the hand(s) of the shooter. The critical edge of each goalkeeper's restraining line is its outside edge, i.e., the edge farthest from the nearest goal line, for object 104 embodied with a shoe such as that of either goalkeeper. Either edge of each goal area line can variously act as its critical edge for object 104 similarly embodied with a shoe of a player.

The CC capability is provided for the goal-area lines and/or the goalkeeper restraining lines in an IP structure formed with two team handball goal fixtures and a team handball court configured to implement OI structure 900 or 1100 (a) using CC controller 1114 or 1134 for implementing IP structure 1110 or 1130 or/and (b) IG system 1152 or 1182 implementing IP structure 1170 or 1200 when controller 1114 or 1134 and system 1152 or 1182 are both present. Controller 1114/1134 in the team handball IP structure operates as an intelligent controller for the goalkeeper's restraining lines and the goal area lines. In particular, controller 1114/1134 usually causes color change at elongated area, usually straight, directly along the outside edge of each goalkeeper's restraining line so as to embody a unit of SF zone 112 and at curved elongated area directly along each edge of each goal area line so as likewise to embody a unit of zone 112 only when the supplemental impact characteristics meet the PP or CP expanded impact criteria for impact of a person's shoe. Controller 1114/1134 may cause color change at each goalkeeper's restraining line, or at each goal area line, embodying a unit of SF zone 892 when the supplemental impact characteristics meet the FR or CP expanded impact criteria for impact of a person's shoe. Impact of a ball, such as that used in team handball, on any of the goalkeeper's restraining and goal area lines and adjoining VC area portions usually does not cause a color change.

Jai alai is played on a rectangular court having a floor, a front wall, a left sidewall, a back wall, and sometimes a ceiling but no right sidewall. The top surface of the floor, the inside surfaces of the three walls, and the bottom surface of the ceiling, when present, embody surface 102. The top of the floor has, for regulating certain aspects of jai alai, fourteen straight lines extending parallel to the front wall and numbered 1-14 starting from the front wall. The floor's top also has a straight right sideline extending parallel to the left sidewall. The inside of the front wall is divided into an interior rectangular portion of a first color, termed the interior color, and a ⊐-shaped peripheral portion of a second color, termed the peripheral color, different form the interior color. The peripheral portion adjoins the interior region along its entire top, entire right side, and entire bottom to define three straight zero-width lines respectively extending parallel to the top, right side, and bottom of the front wall.

A served pelota (ball) embodying object 104 in jai alai must impact inside the interior portion of the front wall, i.e., inside the inside edges of the three lines on the front wall, and then rebound so as to impact the floor beyond the inside (or front) edge of line 4, in front of the outside (or back) edge of line 7, and inside the inside (or left) edge of the floor's right sideline where "inside" is relative to the red portion of the front wall for the three front-wall lines, where "inside" (or front) and "outside" (or "back") are relative to the front wall for lines 1-14, and where "inside" (or "left") is relative to the left sidewall for the floor's right sideline. The critical edges for the three front-wall lines are their inside edges. The critical edges for lines 4 and 7 are respectively their inside and outside edges. The critical edge for the floor's right sideline is its inside edge.

The CC capability is preferably at least provided as a unit of SF zone 112 at each of (a) three elongated front-wall areas, usually straight, respectively situated at least directly along the inside edges of the three front-wall lines, (b) two elongated areas, usually straight, respectively extending directly along the inside edge of line 4 and the outside edge of line 7, and (c) elongated area, usually straight, extending directly along the inside edge of the floor's right sideline. The CC capability may also be provided as a unit of SF zone 892 at each of (a) three elongated areas of the peripheral front-wall portion directly along the inside edges of the three front-wall lines, (b) lines 4 and 7, and (c) the floor's right sideline.

Platform tennis is played with paddles and a rubber ball on a wire-mesh enclosed court configured the same as, but smaller than, a regular tennis court. A platform tennis court, which has a net dividing the court into two half courts the same as a regular tennis court, is described in the same terminology as a regular tennis court except as follows. Singles sidelines 30, servicelines 34, centerline 36, service-courts 38, and doubles sidelines 46 are respectively termed alley lines, service lines, center service line, service courts, and sidelines for a platform tennis court. The parts of the alley lines between the net and the service lines are termed service sidelines. The rules regarding the rubber ball being "in" and "out" in platform tennis are the same as for a tennis ball. The highest and next highest priority locations described above for the CC capability in a regular tennis court apply to a platform tennis court subject to the indicated terminology changes.

The CC capability is similarly provided as one or more units of SF zone 112 in area, usually elongated, directly along the critical edge of each of one or more finite-width lines used in many other sports including paddle tennis, Basque pelota, padel, paleta fronton, real tennis, soft tennis, and squash tennis. The CC capability may be provided as a unit of SF zone 892 directly at each of these lines.

As occurs in sports IP structure 1230, 1300, 1380, 1440, and 1500, the CC capability may optionally be provided as VC SF zone 912 (or 112) in area, usually elongated, directly along the edge, termed the non-critical edge, opposite the critical edge of each finite-width line used in squash, racketball, racquetball, handball, team handball, jai alai, platform tennis, paddle tennis, Basque pelota, padel, paleta fronton, real tennis, soft tennis, squash tennis, and many other sports. When the CC capability is provided at elongated area directly along the non-critical edge of any of these lines, the elongated area along the critical edge of each such line is usually at least as wide as, preferably wider than, the elongated area along the non-critical edge of that line. The width of the elongated area along the critical edge of each such line usually exceeds the width of the elongated area along the non-critical edge of that line by approximately the line's width.

The units of VC regions 106, 886, and 906 for the preceding sports, including tennis, can be manufactured (a) as separate unicolor plates, each only having a unit of region 106, 886, or 906 so as to be of only normal-state color A, B, or C or (b) as multicolor plates, each having units of regions 886 and 106 or/and 906. Each multicolor plate is of normal-state colors B and A or/and C depending on whether that plate contains, in addition to a unit of region 886, a unit of only one of regions 106 and 906 or a unit of both of regions 106 and 906. If the multicolor plates contain cells 404 and 1084, the plates can be cell programmed as described above for FIG. 86 to define the location of the boundary of each unit of SF zone 892 with each adjoining unit of SF zone 112 on surface 102. If they contain cells 404, 1084, and 1104, the multicolor plates can be cell programmed as described above for FIG. 87 to define the locations of the boundaries of each unit of zone 892 with the adjoining units of SF zones 112 and 912 on surface 102.

The units of VC regions 106, 886, and 906 for these sports can also be removable VC units, e.g., unicolor or multicolor plates readily installed on, and removed from, substructure 134. The removable VC units are installed on substructure 134 prior to a block of one or more sports activities for which the present CC capability is needed, removed from substructure 134 subsequent to the block of activities usually before surface 102 is used significantly for one or more activities not needing the CC capability, and so on with further installations and removals. The removable units can even be initially installed on substructure 134 as multiple unicolor plates and thereafter so removed and reinstalled as multicolor plates. If the depressions created in surface 102 due to the removal of the removable VC units would significantly affect activities not needing the CC capability, units of removable FC regions are installed on surface 102 at the locations of the removable VC units after their removal and removed from surface 102 before the removable VC regions are reinstalled on surface 102.

Consecutive ones of the removable units meet smoothly along surface 102. SF zones 112, 892, and 912 of the removable VC units are largely coplanar with adjoining parts of surface 102. To facilitate removal, the removable units usually have markings at their boundaries along surface 102. The removable units for an embodiment of the units of VC regions 106, 886, and 906 are usually rectangular in shape when two opposite boundaries of the unit of region 886 are parallel lines along surface 102. Deterioration of the units of regions 106, 886, and 906 is significantly reduced by implementing them as removable VC units used in the preceding way. This implementation and usage of regions 106, 886, and 906 can, of course, be applied to activities other than sports.

Velocity Restitution Matching

The rebound characteristics of object 104 are preferably independent of where it impacts surface 102 in sports such as tennis where object 104 is in play after it initially rebounds off surface 102 during each stroke. In this section, object 104 is again termed ball 104 meaning a largely spherical hollow ball such as a tennis ball. During impact, ball 104 moves with its center of mass at a linear vector velocity $\overline{V}$ defined by (a) a linear scalar velocity (speed) V, (b) an inclination (vertical-plane) angle θ measured along a vertical plane perpendicular to surface 102 at approximately the center of total OC area 124 relative to a fixed reference line extending along that vertical plane and (c) an azimuthal (lateral-plane) angle φ measured along a lateral plane parallel to surface 102 at approximately the center of area 124 relative to a fixed reference line extending along that lateral plane. The reference line for inclination angle θ extends along the lateral plane for azimuthal angle φ. During impact, ball 104 is capable of rotating about its center of mass at an angular vector velocity $\overline{\omega}$ having a scalar magnitude ω. Letting subscript "i" mean incident, ball 104 impacts surface 102 with its center of mass at an incident linear vector velocity $\overline{V_i}$ and an incident angular vector velocity $\overline{\omega_i}$, where incident linear vector velocity $\overline{V_i}$ is defined by an incident linear scalar velocity $V_i$, an incident inclination angle $θ_i$, and an incident azimuthal angle $φ_i$. Letting subscript "r" similarly mean rebound, ball 104 rebounds from surface 102 with its center of mass at a rebound linear vector velocity $\overline{V_r}$ and a rebound angular vector velocity $\overline{\omega_r}$, where rebound linear velocity $\overline{V_r}$ is defined by a rebound linear scalar velocity $V_r$, a rebound inclination angle $θ_r$, and a rebound azimuthal angle $φ_r$.

Figure 102A:
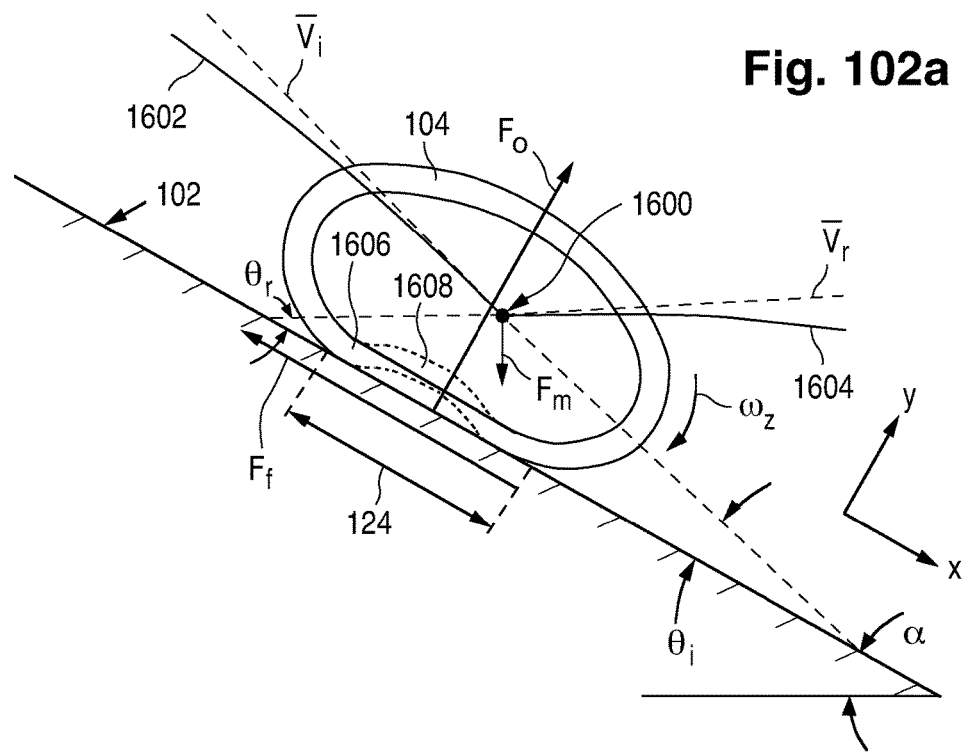
FIGS. 102*a* and 102*b* are cross-sectional views of two models of a hollow ball impacting an inclined surface.

FIG. 102*a* two-dimensionally illustrates how ball 104 deforms in impacting surface 102 here being a plane at an elevation angle α to a tangent to Earth's surface. The center 1600 of mass of ball 104 is located in the open space inside ball 104 since it is hollow. Ball 104, moving from left to right, impacts surface 102 along an incident trajectory 1602 parallel to incident linear velocity $\overline{V_i}$ at impact time $t_{ip}$. Ball 104 rebounds from surface 102 along a rebound trajectory 1604 parallel to rebound linear velocity $\overline{V_r}$ at OS time $t_{os}$. FIG. 102*a* employs a tilted Cartesian xyz coordinate system in which the x and y directions respectively extend parallel and perpendicular to surface 102. The orthogonal direction is they direction. The tangential direction is the direction which azimuthal angle φ defines along the xz plane during impact. Inasmuch as rebound azimuthal angle $φ_r$ may differ from incident azimuthal angle $φ_i$, the rebound tangential direction may differ from the incident tangential direction. The z direction, not indicated in FIG. 102*a*, extends perpendicular to the plane of the figure toward the viewer. Symbol $ω_z$ in FIG. 102*a* indicates the component of angular velocity $\overline{\omega}$ about the z direction, specifically the negative z direction.

The rebound characteristics formed with rebound linear velocity $V_r$, rebound inclination angle $θ_r$, rebound azimuthal angle $φ_r$, and rebound angular velocity $\overline{\omega_r}$ are preferably the same for any given set of incident characteristics formed with incident linear velocity $V_i$, incident inclination angle $θ_i$, incident azimuthal angle $φ_i$, and incident angular velocity $\overline{\omega_i}$ regardless of where ball 104 impacts surface 102. A comparison of the rebound characteristics to the incident characteristics is provided by the coefficient (or ratio) $e_o$ of orthogonal velocity restitution and the ratio $e_t$ of tangential velocity restitution. Coefficient $e_o$ of orthogonal velocity restitution equals $V_{ry}/V_{iy}$ where $V_{ry}$ is the component of rebound linear velocity $\overline{V}_r$ in the positive y direction and $V_{iy}$ is the component of incident linear velocity $\overline{V}_i$ in the negative y direction. Scalar velocities $V_{iy}$ and $V_{ry}$ are both positive here. Orthogonal velocity restitution coefficient $e_o$ is largely a characteristic of the properties of ball 104 and the material forming surface 102 and generally depends only slightly on incident velocities $\overline{V}_i$ and $\overline{\omega}_i$.

Ratio $e_t$ of tangential velocity restitution equals $V_{rt}/V_{it}$ where $V_{rt}$ is the component of rebound linear velocity $\overline{V}_r$ in the rebound tangential direction defined by rebound azimuthal angle $\varphi_r$, and $V_{it}$ is the component of incident linear velocity $\overline{V}_i$ in the incident tangential direction defined by incident azimuthal angle $\varphi_i$. Incident tangential velocity component $V_{it}$ and rebound tangential velocity component $V_{rt}$ are:

$$V_{it} = (V_{ix}^2 + V_{iz}^2)^{1/2} \tag{C1}$$

$$V_{rt} = (V_{rx}^2 + V_{rz}^2)^{1/2} \tag{C2}$$

where $V_{ix}$ and $V_{iz}$ respectively are the components of incident velocity $\overline{V}_i$ in the positive x and z directions, and $V_{rx}$ and $V_{rz}$ respectively are the components of rebound velocity $\overline{V}_r$ in the positive x and z directions.

Rebound linear vector velocity $\overline{V}_r$ at which ball 104 approaches a tennis player in the tangential and orthogonal directions in generally considerably more important than rebound angular vector velocity $\overline{\omega}_r$ in the player's effort to successfully return ball 104. Arranging for restitution parameters $e_o$ and $e_t$ to be independent of where ball 104 impacts surface 102 enables the rebound characteristics to be largely independent of the impact location in a practical sense. In other words, rebound location independence is largely achieved by having orthogonal coefficient $e_o$ be approximately the same across surface 102 for the same conditions of incident vector velocities $\overline{V}_i$ and $\overline{\omega}_i$ and by having tangential ratio $e_t$ be approximately the same across surface 102 for the same $\overline{V}_i$ and $\overline{\omega}_i$ conditions.

The impact causes ball 104 to flatten, i.e., compress in the y direction and usually expand in the x and z directions. A flattened part 1606 of ball 104 contacts surface 102 at total OC area 124. A portion 1608, indicated in dotted line, of flattened ball-contact part 1606 may separate from surface 102 during impact. The forces acting on ball 104 during impact consist of the gravitational force $F_m$ caused by the ball's weight, the frictional force $F_f$ resisting the ball's movement along surface 102 in the x and z directions, and the orthogonal force $F_o$ exerted by surface 102 on ball 104 in they direction. Gravitational force $F_m$ equals mg where m is the mass of ball 104 and g is the acceleration of gravity. Force $F_m$, although distributed throughout the mass of ball 104, effectively acts at its mass center 1600. Frictional force $F_f$ and orthogonal force $F_o$ are both distributed along area 124.

Figure 102B:
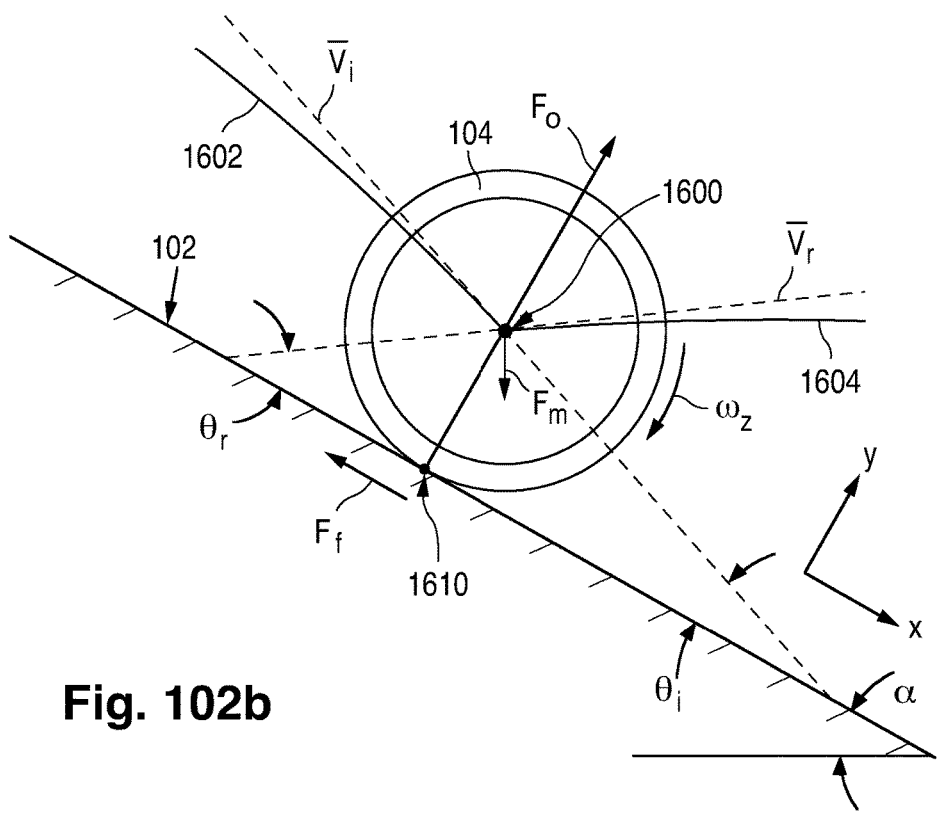

FIG. 102*b* two-dimensionally illustrates a simplified model of ball 104 impacting surface 102 for analyzing the impact dynamics. The following assumptions are made for the model: (a) ball 104 remains spherical during impact so as to contact surface 102 at a single movable point 1610 during OC duration $\Delta t_{oc}$, i.e., total OC area 124 devolves to contact point 1610, (b) ball 104 moves only in the xy plane during impact so that z-direction tangential velocity components $V_{iz}$ and $V_{rz}$ are zero, (c) ball 104 rotates only about the z axis during impact so that angular velocity components in the x and y directions are zero, (d) gravitational force $F_m$ acts through mass center 1600, (e) point 1610 and center 1600 are in a straight line extending perpendicular to surface 102, (f) orthogonal force $F_o$ acts at point 1610 and thus in line with center 1600, and (g) frictional force $F_f$ acts at point 1610 only in the negative x direction. Angular velocity $\overline{\omega}$ of ball 104 is formed solely with scalar angular velocity $\omega_z$ in the negative z direction. Scalar angular velocity $\omega_z$ is positive when ball 104 undergoes forward rotation, termed overspin or topspin, as depicted in the example of FIG. 102*b* (and FIG. 102*a*) and negative when ball 104 undergoes backward rotation, termed underspin or backspin. Angular velocity $\omega_z$ has an incident component $\omega_{iz}$ and a rebound component $\omega_{rz}$. The terminologies used in the references cited below in this section have been converted into the preceding terminology.

Pallis, "Follow The Bouncing Ball Ball/Court Interaction", The Tennis Server, Tennis Set, Part I, www.tennisserver.com/set/set_02_09.html, September 2002, 8 pp., Part II, www.tennisserver.com/set/set_02_10.html, October 2002, 21 pp., and Part III, www.tennisserver.com/set/set_02_11.html, November 2002, 20 pp., contents incorporated by reference herein, presents experimental data on incident velocity $V_i$, incident angle $\theta_i$, rebound velocity $V_r$, and rebound angle $\theta_r$ for tennis balls impacting four different types of tennis court surfaces at six different rates of incident spin, i.e., angular velocity $\omega_{iz}$, on the balls. The four courts respectively had a grass surface, a hard-court (often simply "hard") surface, a red clay service, and a green clay surface. The six $\omega_{iz}$ spin rates were high underspin at roughly −2,500 rev/min, medium underspin at roughly −1,500 rev/min, none (flat) at roughly 0 rev/min, low overspin at roughly 900 rev/min, medium overspin at roughly 1,500 rev/min, and high overspin at roughly 3,000 rev/min. Elevation angle α was presumably largely zero for these courts.

Table 4 below presents the part of Pallis's experimental data on the four types of court surfaces using the same kind of standard tennis balls, namely Wilson U.S. Open tennis balls. Because Pallis presented velocity data in mi/hr, the velocity data has been converted to m/s in Table 4 followed parenthetically by the actual data in mi/hr. Table 4 also presents the values of orthogonal coefficient $e_o$ and tangential ratio et calculated from Pallis's velocity/angle data. Coefficient $e_o$, defined as $V_{ry}/V_{iy}$, was calculated as $V_r \sin \theta_r/V_i \sin \theta_i$. Ratio $e_t$, defined as $V_{rx}/V_{ix}$, was calculated as $V_r \cos \theta_r/V_i \cos \theta_i$. For each court, Table 4 further presents the average value of coefficient $e_o$ for the six $\omega_{iz}$ spin rates and the standard deviation from the average $e_o$ value.

TABLE 4

| Surface | Spin | Incid. Vel. $V_i$ (m/s (mi/hr)) | Incid. Angle $\theta_i$ (°) | Reb'd Vel. $V_r$ (m/s (mi/hr)) | Reb'd Angle $\theta_r$ (°) | Orth. Restit. Coef. $e_o$ | Tang. Restit. Ratio $e_t$ |
|---|---|---|---|---|---|---|---|
| Grass | High under | 14.8 (33) | 23.1 | 7.2 (16) | 29.1 | 0.60 | 0.46 |
|  | Med. under | 16.1 (36) | 21.6 | 8.0 (18) | 24.4 | 0.56 | 0.49 |
|  | None | 15.6 (35) | 24.9 | 8.0 (18) | 29.4 | 0.60 | 0.50 |

TABLE 4-continued

| Surface | Spin | Incid. Vel. $V_i$ (m/s (mi/hr)) | Incid. Angle $\theta_i$ (°) | Reb'd Vel. $V_r$ (m/s (mi/hr)) | Reb'd Angle $\theta_r$ (°) | Orth. Restit. Coef. $e_o$ | Tang. Restit. Ratio $e_t$ |
|---|---|---|---|---|---|---|---|
| | Low over | 17.0 (38) | 25.3 | 9.4 (21) | 28.7 | 0.62 | 0.54 |
| | Med. over | 17.4 (39) | 22.8 | 10.7 (24) | 23.2 | 0.63 | 0.61 |
| | High over | 17.4 (39) | 24.8 | 12.5 (28) | 18.6 | 0.54 | 0.75 |
| | Average | | | | | 0.59 | |
| | Stand. Dev. | | | | | 0.03 | |
| Hard | High under | 12.5 (28) | 20.6 | 7.2 (16) | 29.7 | 0.80 | 0.53 |
| | Med. under | 13.0 (29) | 24.6 | 6.7 (15) | 40.8 | 0.81 | 0.43 |
| | None | 14.3 (32) | 23.9 | 8.9 (20) | 32.9 | 0.84 | 0.57 |
| | Low over | 15.6 (35) | 26.6 | 10.7 (24) | 33.1 | 0.83 | 0.64 |
| | Med. over | 16.5 (37) | 21.9 | 12.5 (28) | 27.4 | 0.93 | 0.72 |
| | High over | 15.6 (35) | 25.1 | 13.9 (31) | 24.8 | 0.88 | 0.89 |
| | Average | | | | | 0.85 | |
| | Stand. Dev. | | | | | 0.05 | |
| Red clay | High under | 13.9 (31) | 20.1 | 8.0 (18) | 30.1 | 0.84 | 0.54 |
| | Med. under | 13.9 (31) | 23.7 | 7.6 (17) | 37.9 | 0.83 | 0.47 |
| | None | 13.0 (29) | 26.5 | 8.0 (18) | 37.5 | 0.85 | 0.55 |
| | Low over | 13.9 (31) | 25.5 | 9.4 (21) | 34.4 | 0.89 | 0.62 |
| | Med. over | 15.6 (35) | 22.8 | 11.6 (26) | 28.3 | 0.90 | 0.71 |
| | High over | 16.1 (36) | 24.1 | 13.4 (30) | 24.5 | 0.84 | 0.83 |
| | Average | | | | | 0.86 | |
| | Stand. Dev. | | | | | 0.03 | |
| Green clay | High under | 10.3 (23) | 20.8 | 5.8 (13) | 31.5 | 0.83 | 0.52 |
| | Med. under | 14.3 (32) | 25.1 | 7.6 (17) | 39.9 | 0.78 | 0.45 |
| | None | 14.8 (33) | 26.8 | 8.9 (20) | 37.5 | 0.82 | 0.54 |
| | Low over | 15.2 (34) | 27.5 | 10.3 (23) | 35.5 | 0.85 | 0.62 |
| | Med. over | NA | NA | NA | NA | NA | NA |
| | High over | 16.5 (37) | 28.0 | 13.9 (31) | 27.7 | 0.83 | 0.84 |
| | Average | | | | | 0.82 | |
| | Stand. Dev. | | | | | 0.03 | |

Examination of the $e_o$ and standard deviation data indicates that the average values of orthogonal coefficients $e_o$ for the grass, hard, red clay, and green clay courts respectively were 0.59, 0.85, 0.86, and 0.82 with respective small standard deviations of 0.03, 0.05, 0.03, and 0.03.

The foregoing average $e_o$ values are consistent with Lindsey, "Follow the Bouncing Ball", Racquet Sports Industry, April 2004, pp. 39-43, which reports orthogonal coefficients $e_o$ of approximately 0.6, 0.83, and 0.85 for grass, hard, and clay tennis courts. Brody et al. ("Brody"), The Physics and Technology of Tennis (Racquet Tech Pub.), 2002, pp. 343-357, reports the same 0.83 and 0.85 $e_o$ values respectively for hard and clay courts. Brody mentions that coefficient $e_o$ decreases slightly with increasing incident orthogonal velocity $V_{iy}$, at least when incident angle $\theta_i$ is approximately 90° and that coefficient $e_o$ mysteriously increases slightly as angle $\theta_i$ decreases. Cross et al. ("Cross"), Technical Tennis (Racquet Tech Pub.), 2005, pp. 90-108, similarly reports $e_o$ values of 0.80 and 0.85 respectively for hard and clay courts.

A composite of the $e_o$ values reported by Lindsey, Brody, and Cross and calculated from Pallis's data indicates that orthogonal coefficient $e_o$ is the same for typical hard and clay courts, namely approximately 0.85, and that coefficient $e_o$ is approximately 0.60 for a typical grass court subject to slight decrease with increasing incident orthogonal linear velocity $V_{iy}$, slight increase with increasing incident angle $\theta_i$, and slight dependence on initial $\omega_{iz}$ spin rate, the $e_o$ values in Table 4 being slightly greater for moderate overspin than for the other spin rates. Percentage variations in coefficient $e_o$ with linear velocity $V_{iy}$, angle $\theta_i$, and initial $\omega_{iz}$ angular velocity are expected to be approximately the same for a grass court as for a hard or clay court. The percentage difference $\Delta e_o/e_{oav}$ between coefficient $e_o$ for a typical hard or clay court and coefficient $e_o$ for a typical grass court is somewhat greater than 30% for the same incident conditions, i.e., the same values of incident linear vector velocity $\overline{V}_i$ and incident angular vector velocity $\overline{\omega}_i$, where $\Delta e_o$ is the actual difference between the two $e_o$ values, and $e_{oav}$ is their average.

Grass, on one hand, and hard surface or clay, on the other hand, represent tennis-court extremes for orthogonal coefficient $e_o$. Coefficient $e_o$ across a court incorporating the present IP technology is preferably approximately fixed at a value ranging from a low of 0.60 for grass to a high of 0.85 for hard surface or clay. For the same incident conditions, the court acts more like grass than hard surface or clay when its $e_o$ value is closer to 0.60 than to 0.85 and more like hard surface or clay than grass when its $e_o$ value is closer to 0.85 than 0.60. In percentage terms at the same incident conditions, the court generally acts more like grass than hard surface or clay when its $e_o$ value is no more than approximately 15% above 0.60 and more like hard surface or clay than grass when its $e_o$ value is no more than approximately 15% below 0.85.

Orthogonal coefficient $e_o$ is usually constant along VC SF zone 112, 892, or 912 depending on which of zones 112, 892, and 912, hereafter simplified to zones 112 and 912 for the reasons given above, are present. Coefficient $e_o$ is likewise usually constant along FC SF zone 114, 894, or 914 depending on which of zones 114, 894, and 914, hereafter simplified to zones 114 and 894 for the above reasons, are present. However, coefficient $e_o$ along zone 112 or 892 can differ from coefficient $e_o$ along zone 114 or 894 because VC region 106 or 886 is constituted differently than FC region 108 or 888. With the $e_o$ data for typical grass, hard, and clay courts in mind, one factor in having the rebound characteristics be independent of the impact location entails having coefficient $e_o$ along zone 112 or 892 differ by no more than 15%, preferably by no more than 10%, more preferably by no more than 5%, even more preferably by no more than 3%, yet even more preferably by no more than 2%, from coefficient $e_o$ along zone 114 or 894 for ball 104 separately impacting zones 112 and 114 or 892 and 894 at identical conditions (values) of incident vector velocities $\overline{V}_i$ and $\overline{\omega}_i$. By meeting this $e_o$ specification, court areas such as VC court portions 1240, 1242, 1244, and 1246 embodying zone 112 in tennis IP structure 1230 avoid approximating the $e_o$ rebound characteristics of a typical grass court when court areas such as FC parts 1250, 1252, 1254, and 1256 embodying zone 114 in structure 1230 have the $e_o$ rebound characteristics of a typical hard or clay court, and vice versa.

Coefficient $e_o$ may be considerably higher than 0.6 for some grass courts, e.g., 0.75 per Cross. By modifying the preceding $e_o$ specification to require that coefficient $e_o$ along VC SF zone 112 or 892 differ by no more than 5%, preferably by no more than 4%, more preferably by no more than 3%, even more preferably by no more than 2%, yet even more preferably by no more than 1%, from coefficient $e_o$ along FC SF zone 114 or 894, the modified $e_o$ specification is applied to avoid having court areas such as VC court portions 1240, 1242, 1244, and 1246 in IP structure 1230 approximate the $e_o$ rebound characteristics of a grass court with an $e_o$ value up to 0.75 when court areas such as FC parts 1250, 1252, 1254, and 1256 in structure 1230 have the $e_o$ rebound characteristics of a typical hard or clay court, and vice versa.

Subject to color B differing from color A, VC regions 106 and 886 are usually constituted the same when both are present. In view of this, orthogonal coefficient $e_o$ along each VC SF zone 112 or 892 differs by no more than 5%, preferably by no more than 3%, more preferably by no more than 2%, even more preferably by no more that 1%, from coefficient $e_o$ along each other zone 112 or 892 for ball 104 separating impacting zones 112 and 892 at identical conditions of vector velocities $\overline{V}_i$ and FC regions 108 and 888 are likewise usually constituted in the same way when both are present. Coefficient $e_o$ along each FC SF zone 114 or 894 differs by no more than 5%, preferably by no more than 3%, more preferably by no more than 2%, even more preferably by no more that 1%, from coefficient $e_o$ along each other zone 114 or 894 for ball 104 separately impacting zones 114 and 894 at identical $\overline{V}_i$ and $\overline{\omega}_i$ conditions.

Ball 104 slides or/and rolls while it contacts surface 102 during an impact. In particular, ball 104 usually begins an impact by sliding and may complete the impact by sliding or rolling. In the model of FIG. 102b, contact point 1610 is instantaneously motionless during rolling as ball 104 rotates around it. Frictional force $F_f$ is much greater during sliding than rolling.

Frictional force $F_f$ insofar as it is directed in the negative x direction causes ball 104 to slow down and thereby causes rebound tangential velocity $V_{rx}$ to decrease. Tangential ratio $e_t$ generally increases as force $F_f$ in the negative x direction decreases and vice versa. Referring again to Table 4, the values of ratio $e_t$ calculated from Pallis's data generally increase as incident angular velocity $\omega_{iz}$ increases, i.e., as the spin goes from high underspin to high overspin. This seemingly occurs because (i) the tennis balls undergo both sliding and rolling during impact at the incident conditions examined in Pallis and (ii) increasing incident angular velocity $\omega_{iz}$ causes rolling to occur progressively earlier during impact so that the total amount of force $F_f$ in the negative x direction progressively decreases.

Grass presents less friction than hard surface or clay. The $e_t$ values in Table 4 show, with a few exceptions, that tangential ratio $e_t$ is considerably lower for grass than for hard surface or clay at any particular $\omega_{iz}$ spin value consistent with frictional force $F_f$ being lower for grass than hard surface or clay. Hence, ratio $e_t$ can be used to distinguish the rebound characteristics of grass from those of hard surface or clay.

Clay courts are generally perceived as being "slower" than hard courts, i.e., frictional force $F_f$ is seemingly greater for clay than hard surface at the same $\overline{V}_i$ and $\overline{\omega}_i$ conditions. Tangential ratio $e_t$ should be lower for clay than hard surface. However, the $e_t$ values in Table 4 at any particular $\omega_{iz}$ spin value are generally not significantly different. The so-calculated et values do not provide a basis for distinguishing between the rebound characteristics of hard surface and clay. This lack of differentiation may arise because rolling occurs much more than sliding during impact at Pallis's incident conditions, especially the values of incident angle $\theta_i$, all 20° or more.

Cross mentions that tennis balls only slide during impact when incident angle $\theta_i$ is sufficiently small, less than 20°, perhaps considerably less than 20°. Consider the dynamics of the sliding-only situation. Frictional force $F_f$ is then the force of sliding friction. The total force $F_x$ in the (positive) x direction is $-F_f + F_m \sin \alpha$. The total force in the (positive) y direction is $F_o - F_m \cos \alpha$. Frictional force $F_f$ and normal force $F_o$ respectively are:

$$F_f = -F_x + F_m \sin \alpha \quad (C3)$$

$$F_o = F_y + F_m \cos \alpha \quad (C4)$$

The average coefficient $\mu_s$ of sliding friction during OC duration $\Delta t_{oc}$ is:

$$\mu_s = \frac{\int_0^{\Delta t_{oc}} F_f dt}{\int_0^{\Delta t_{oc}} F_o dt} \quad (C5)$$

Combining Eqs. C3 and C4 into Eq. C5 leads to:

$$\mu_s = \frac{\int_0^{\Delta t_{oc}} (-F_x + F_m \sin\alpha) dt}{\int_0^{\Delta t_{oc}} (F_y + F_m \cos\alpha) dt} = \frac{-\int_0^{\Delta t_{oc}} F_x dt + F_m \Delta t_{oc} \sin\alpha}{\int_0^{\Delta t_{oc}} F_y dt + F_m \Delta t_{oc} \cos\alpha} \quad (C6)$$

Evaluating the integrals using Newton's second law that force equals the time derivative of momentum and therefore that the time integral of force equals the change in momentum, and substituting mg for gravitational force $F_m$ yields:

$$\mu_s = \frac{-m(V_{rx} - V_{ix}) + mg\Delta t_{oc} \sin\alpha}{m(V_{ry} + V_{iy}) + mg\Delta t_{oc} \cos\alpha} = \frac{V_{ix} - V_{rx} + g\Delta t_{oc} \sin\alpha}{V_{iy} - V_{ry} + g\Delta t_{oc} \cos\alpha} \quad (C7)$$

OC duration $\Delta t_{oc}$ is typically several ms, invariably less than 10 ms, when ball 104 is a tennis ball. The term $g\Delta t_{oc} \cos \alpha$ in the denominator of Eq. C7 is a very small percent, usually considerably less than 1%, of the orthogonal velocity denominator summation term $V_{iy} + V_{ry}$ for $V_{iy}$ and $V_{ry}$ values during a tennis match. Elevation angle $\alpha$ is usually very close to zero for a tennis court. The term $g\Delta t_{oc} \sin \alpha$ in the numerator of Eq. C7 is likewise a very small percent, usually considerably less than 1%, of the tangential velocity numerator difference term $V_{ix} - V_{rx}$ for $V_{ix}$ and $V_{rx}$ values during a tennis match. Sliding friction coefficient $\mu_s$ is then closely approximated as:

$$\mu_s = \frac{V_{ix} - V_{rx}}{V_{iy} + V_{ry}} \quad \text{(C8)}$$

Overall tangential velocity components $V_{it}$ and $V_{rt}$ respectively equal x-direction tangential velocity components $V_{ix}$ and $V_{rx}$ since z-direction tangential velocity components $V_{iz}$ and $V_{rz}$ are assumed to be zero. Tangential ratio et equals $V_{rx}/V_{ix}$. Applying this relationship and the relationship that orthogonal coefficient $e_o$ equals $V_{ry}/V_{iy}$ to Eq. C8 results in:

$$\mu_s = \frac{(1-e_t)V_{ix}}{(1+e_o)V_{iy}} = \left(\frac{1-e_t}{1+e_o}\right)\cot\theta_i \quad \text{(C9)}$$

where the ratio $V_{ix}/V_{iy}$ is the cotangent of incident angle $\theta_i$. Solving Eq. C9 for tangential ratio $e_t$ yields:

$$e_t = 1 - \mu_s(1+e_o)\tan\theta_i \quad \text{(C10)}$$

In addition to the characteristics of the material forming surface 102, sliding friction coefficient $\mu_s$ depends on dynamic factors, including incident vertical velocity $V_{iy}$. Various $\mu_s$ values are reported for grass, hard, and clay court for various incident conditions. For the same incident conditions, the $\mu_s$ value for clay exceeds the $\mu_s$ value for hard surface which exceeds the $\mu_s$ value for grass. Various references, e.g., Brody, report $\mu_s$ values of 0.8, 0.7, and 0.6 respectively for clay, hard, and grass courts, presumably at the same incident conditions.

Table 5 below shows how tangential ratio $e_t$ varies with incident angle $\theta_i$ for grass, hard surface, and clay having the preceding $\mu_s$ values and the preceding respective $e_o$ values of 0.60, 0.85, and 0.85. For comparison purposes, Table 5 also shows how ratio $e_t$ varies with incident angle $\theta_i$ for hard surface having $\mu_s$ and $e_o$ values of 0.7 and 0.80. Three values, 12°, 16°, and 20°, of angle $\theta_i$ are used in Table 5. A tennis ball is generally expected to slide without rolling when angle $\theta_i$ is 12° or 16° and may slide without rolling when angle $\theta_i$ is 20°.

for a clay court and approximately 0.63 or 0.64 for a hard court depending on whether its $e_o$ value is 0.85 or 0.80.

Table 5 presents the percentage difference $\Delta e_t/e_{tav}$ between tangential ratio $e_t$ for a hard court and ratio $e_t$ for a clay court at each $\theta_i$ value where $\Delta e_t$ is the actual difference between the two $e_t$ values, and $e_{tav}$ is their average. Hard-clay percentage difference $\Delta e_t/e_{tav}$ increases with increasing incident angle $\theta_i$. At the 16° $\theta_i$ reference value, hard-clay percentage difference $\Delta e_t/e_{tav}$ is approximately 8% or 10% depending on whether the $e_o$ value for a hard court is 0.85 or 0.80. Ratio $e_t$ is approximately 8-10% higher for a typical hard court than a typical clay court at 16° incidence. For the same incident impact conditions including 16° incidence, a court acts more like hard surface than clay when its $e_t$ value is closer to 0.63 or 0.64 than to 0.58 and more like clay than hard surface when its et value is closer to 0.58 than 0.63 or 0.64. In percentage terms at the same incident conditions including 16° for incident angle $\theta_i$, the court acts more like hard surface than clay when its $e_t$ value is above 0.63-0.64 or no more than 4-5% below 0.63-0.64 and more like clay than hard surface when its $e_t$ value is below 0.58 or no more than 4-5% above 0.58.

The 0.58 and 0.63 or 0.64 $e_t$ values for clay and hard surface at 16° incidence are based on the simplified model of FIG. 102b. While actual et values for clay and hard surface at 16° incidence may respectively differ somewhat from 0.58 and 0.63 or 0.64, tangential ratio $e_t$ is still expected to be approximately 8-10% higher for typical hard surface than typical clay at 16° incidence using the actual $e_t$ values. A court acts more like hard surface than clay when its ratio $e_t$ is above the actual $e_t$ value for hard surface or no more than 4-5% below the actual hard-surface $e_t$ value and more like clay than hard surface when its ratio $e_t$ is below the actual $e_t$ value for clay or no more than 4-5% above the actual clay $e_t$ value.

Tangential ratio et is usually the same along VC SF zone 112 or 892 for any particular $\theta_i$ value, e.g., the 16° reference value, depending on which of zones 112 and 892 are present. Ratio $e_t$ is likewise usually the same along FC SF zone 114 or 894 for any particular $\theta_i$ value depending on which of

TABLE 5

| Surface | Sliding Friction Coefficient $\mu_s$ | Orthogonal Restitution Coefficient $e_o$ | Incident Angle $\theta_i$ (°) | Tangential Restitution Ratio $e_t$ | Percentage Diff. Hard-clay $\Delta e_t/e_{tav}$ |
|---|---|---|---|---|---|
| Clay | 0.8 | 0.85 | 12 | 0.69 | |
| | | | 16 | 0.58 | |
| | | | 20 | 0.46 | |
| Hard | 0.7 | 0.85 | 12 | 0.72 | 4 |
| | | | 16 | 0.63 | 8 |
| | | | 20 | 0.53 | 14 |
| Hard | 0.7 | 0.80 | 12 | 0.73 | 6 |
| | | | 16 | 0.64 | 10 |
| | | | 20 | 0.54 | 16 |
| Grass | 0.6 | 0.60 | 12 | 0.80 | |
| | | | 16 | 0.72 | |
| | | | 20 | 0.65 | |

As Table 5 indicates, tangential ratio $e_t$ varies considerably with incident angle $\theta_i$ for any particular type of court surface. The International Tennis Federation indicates in "ITF Approved Tennis Balls, Classified Surfaces & Recognised Courts, a Guide to Products & Test Methods", part B, sect. 4, www.itftennis.com/media/165935/165935.pdf, 2014, pp. 37-40, that it uses 16° as a reference value of angle $\theta_i$ for assessing court friction and restitution characteristics. At the 16° $\theta_i$ reference value, ratio $e_t$ is approximately 0.58 zones 114 and 894 are present. However, ratio et along zone 112 or 892 can differ from ratio et along zone 114 or 894 for any particular $\theta_i$ value because VC region 106 or 886 is constituted differently than FC region 108 or 888. With the $e_t$ data for typical hard and clay courts in mind, another factor in having the rebound characteristics be independent of the impact location entails having ratio $e_t$ along zone 112 or 892 differ by no more than 5%, preferably by no more than 4%, more preferably by no more than 3%, even more preferably by no more than 2%, yet even more preferably by no more than 1%, from ratio $e_t$ along zone 114 or 894 for ball 104 separately impacting zones 112 and 114 or 892 and 894 at identical conditions (values) of incident vector velocities $\overline{V}_i$ and $\overline{\omega}_i$ at 16° for incident angle $\theta_i$. By meeting this $e_t$ specification, court areas such as VC court portions 1240, 1242, 1244, and 1246 in tennis IP structure 1230 avoid having the $e_t$ rebound characteristics of a typical clay court when court areas such as FC parts 1250, 1252, 1254, and 1256 in structure 1230 have the et rebound characteristics of a typical hard court and vice versa.

A standard clay tennis court is usually largely covered with loose particles whose maximum average diameter is several mm. Some of these particles invariably migrate over the units of SF zones 112 and 912 in a clay tennis court provided with the present CC capability. It is expected that the presence of these particles on the units of VC SF zones 112 and 892 will cause tangential ratio $e_t$ along zone 112 or 892 to approach ratio $e_t$ along FC SF zone 114 or 894.

The characteristics of SF structures 242 and 962 variously in OI structures 240, 260, 270, 320, 330, 440, 450, 460, 490, 500, 960, 980, 990, and 1010 can readily be chosen to achieve the preceding $e_o$ and $e_t$ matching between VC SF zone 112 or 892 and FC SF zone 114 or 894. For instance, the material defining zone 114 or 894 can be an SF layer of the same material and the same thickness, and thus the same sliding friction coefficient $\mu_s$ and light transmissivity, as SF structure 242 or 962. If structure 242 or 962 consists of multiple layers, the material along zone 114 or 894 can consist of multiple layers respectively identical material-wise and thickness-wise to, and in the same order as, the layers of structure 242 or 962. The two or more layers along zone 114 or 894 then have the same sliding friction coefficient $\mu_s$ and light transmissivity, as structure 242 or 962. The presence of structures 242 and 962 thus facilitates having the rebound characteristics of ball 104 be independent of where it impacts surface 102. Also, the layer directly below this SF layer or two or more layers along zone 114 or 894 largely defines color A' or B" that FC region 108 or 888 appears along zone 114 or 894.

Variations

While the invention has been described with reference to particular embodiments, this description is solely for the purpose of illustration and is not to be construed as limiting the scope of the claimed invention. For instance, the above timing and color-difference parameters can be presented in spectral radiance terms in which the wavelength variation of the power present in light is characterized by its spectral radiance $L_{e\lambda}$ instead of its spectral radiosity $J_\lambda$. Subject to replacing maximum value $J_{pmax}$ of radiosity parameter $J_p$ with a corresponding maximum value for a corresponding radiance parameter, the relationships given above for approximate times $t_{fs}$, $t_{fe}$, $t_{rs}$, and $t_{re}$ can be used with spectral radiance $L_{e\lambda}$ replacing spectral radiosity $J_\lambda$. The minimum values presented above for full XN delays $\Delta t_f$ and $\Delta t_r$, CC duration $\Delta t_{dr}$, 50% XN delays $\Delta t_{f50}$ and $\Delta t_{r50}$, 90% XN delays $\Delta t_{f90}$ and $\Delta t_{r90}$, and 10%-to-90% XN delays $\Delta t_{f10\text{-}90}$ and $\Delta t_{r10\text{-}90}$ carry over to the situation where spectral radiance $L_{e\lambda}$ replaces spectral radiosity $J_\lambda$.

If VC region 106 in OI structure 130, 240, 280, or 320 is installed on substructure 134 after being manufactured, region 106 can include an installation/protective layer extending along substructure 134. CC component 184 in OI structure 180 or 260 can include an installation/protective layer, embodied with FA layer 206 in OI structure 200 or 270, extending along substructure 134 if region 106 is separately manufactured. Each installation/protective layer, used for installing region 106 on substructure 134, protects the adjacent ISCC material from damage during the time period between the manufacture of region 106 and its installation on substructure 134. Each of VC regions 886 and 906 in OI structure 920 or 960 can include such an installation/protective layer, embodied with FA layer 946 of region 886 in OI structure 930 or 980, situated along substructure 134.

DE structure 282 in OI structure 280 or 320 can also include an installation/protective layer extending along substructure 134 for installing VC region 106 on substructure 134 if region 106 is separately manufactured. This installation/protective layer protects the DE and ISCC material from damage during the period between the manufacture of region 106 and its installation on substructure 134. If VC regions 886 and 906 in OI structure 990 are separately manufactured, each DE structure 992 or 994 can include such an installation/protective layer situated along substructure 134.

Instead of having PP IDVC portion 138 in OI structure 280 or 300 change color directly in response to the deformation along SF DF area 122 meeting the above-mentioned PP basic SF DF criteria, portion 138 can change color in response to the PP general CC control signal generated in response to the deformation along area 122, specifically print area 118, meeting the basic SF DF criteria sometimes dependent on other impact criteria, typically the PP supplemental impact criteria, also being met. The same applies to portion 138 and, subject to appropriate control signal and criteria changes, AD IDVC portion 926 and the FR IDVC portion in variations of OI structure 990 or 1110 lacking SF structures 242, 962, and 964. Rather than have portion 138 in OI structure 320 or 330 change color directly in response to the deformation along internal DP IF area 256 meeting the above-mentioned PP basic internal DF criteria, portion 138 can change color in response to the PP general CC control signal generated in response to the deformation along area 256, specifically IF segment 256, meeting the basic internal DF criteria sometimes dependent on other impact criteria, again typically the PP supplemental impact criteria, also being met. The same applies to portion 138 and, subject to appropriate control signal and criteria changes, AD IDVC portion 926 and the FR IDVC portion in OI structure 990 or 1110.

Rather than have each CM cell 404 in OI structure 470 or 480 change color directly in response to the deformation along that cell's SF part 406 meeting the above-mentioned PP cellular SF DF criteria, each CM cell 404 can change color in response to its cellular CC control signal generated in response to the deformation its SF part 406 meeting the cellular SF DF criteria sometimes dependent on other impact criteria, typically the PP supplemental impact criteria, also being met. The same applies to CM cells 404 and, subject to appropriate control signal and criteria changes, CM cells 1084 and 1104 in cellular embodiments of variations of OI structure 990 or 1110 lacking SF structures 242, 962, and 964. Instead of having each CM cell 404 in OI structure 490 or 500 change color directly in response to the deformation along that cell's IF part 444 meeting the above-mentioned PP cellular internal DF criteria, each CM cell 404 can change color in response to its cellular CC control signal generated in response to the deformation along its IF part 444 meeting the cellular internal DF criteria sometimes dependent on other impact criteria, likewise typically the PP supplemental impact criteria, also being met. The same applies to CM cells 404 and, subject to appropriate control signal and criteria changes, CM cells 1084 and 1104 in cellular embodiments of OI structure 990 or 1110.

DE structures 282 and 302 can be replaced with structures directly responsive to excess pressure. The same applies to the DE parts of cells 404, 1084, and 1104. If substructure-reflected ARsb or XRsb light exits SF zone 112 in any of the four general embodiments of CC component 184 based on light-reflection changes or in any of the six general embodiments of component 184 based on light-emission changes, ARsb light is included in each total light determination for VC region 106 during the normal state, and XRsb light is included in each total light determination for IDVC portion 138 during the changed state.

The object tracking provided by IG structure 804 can be performed by a non-optical technique, e.g., a Doppler-shift technique such as radar or sonar. Rather than track the movement of object 104 and generate a moving image that follows the movement of object 104, structure 804 can provide an image of surface 102 as object 104 moves over surface 102 and then zoom in on object 104 at OC area 116.

When IG structure 804 generates PP PAV images as described above, CC controller 832 or 852 can sometimes be deleted in a variation of IP structure 830 or 850. IP structure 1150 (or 1170) or 1180 (or 1200) can be modified the same as IP structure 800 (or 830) or 840 (or 850) subject to changing OI structure 100 or 400 to OI structure 900 or 1100, IG controller 806 or 846 to IG controller 1154 or 1184, PP LI impact signals to PP, AD, and FR LI impact signals, print area 118 to print areas 118, 898, and 918, SF zone 112 to SF zones 112, 892, and/or 912, a PP PAV image to a PP, AD, FR, or CP PAV image, and CC controller 832 or 852 to CC controller 1114 or 1134.

The capability to selectively activate and deactivate the VC strips can be extended beyond tennis. In general, each of two or more different VC parcels of the VC structure formed with at least one of VC regions 106, 886, and 906 can be selectively activated and deactivated at selected times. Subject to each VC parcel consisting of material of the VC structure different from each other VC parcel, each VC parcel may include one or more portions of the VC structure present in one or more other VC parcels. One of the VC parcels may consist of the entire VC structure. The time periods during which two or more of the VC parcels are activated may partly or fully overlap.

The selective activation and deactivation of the VC parcels is controlled with a suitable switch located on CC controller 1114/1134 or separate from it for communicating with it remotely via a COM path. A person can operate the switch manually or by voice. IG structure 804, again specifically image-collecting apparatus 808, can provide controller 1114/1134 with images of activities occurring along surface 102. Controller 1114/1134 employs a shape-recognition capability for recognizing shapes present in those images and, when specified shapes are recognized, automatically selectively activates and deactivates the VC parcels at selected times. Apparatus 808 may then include separate components for respectively collecting PAV images and images of other activities occurring along surface 102.

CC controller 1114/1134 may consist of separate units, including one for the (optional) sound-generation capability. CC controller 832, 852, 1114, or 1134 and IG controller 806, 846, 1154, or 1184 can be merged into one controller. OI structure 900 or 1100 can be extended to include more than three VC regions variously laterally adjoining one another.

A particular implementation of intelligent controller 702 or 752 can respond to different embodiments of object 104, e.g., a person's foot and a ball such as a tennis ball, impacting (the same embodiment of) VC SF zone 112 sufficient to cause the PP supplemental impact criteria to be generated by having the supplemental impact criteria formulated as respective different PP supplemental impact criteria groups to which the PP general supplemental impact information is compared to determine if it meets any of these criteria groups and, if so, for providing the PP general CC initiation signal or PP cellular CC initiation signals for causing the PP IDVC portion (138) to temporarily undergo color change at print area 118. Changed color X can be the same for all the criteria groups or different for at least two of the criteria groups. The same applies to CC controller 832 or 852 when it is implemented as controller 702 or 752. A particular implementation of CC controller 1114 or 1134 functioning as an intelligent controller akin to controller 702 or 752 can operate in the same way subject to changing VC SF zone 112, the PP supplemental impact criteria, the different PP supplemental impact criteria groups, the PP general CC initiation signal, the PP cellular CC initiation signals, the PP IDVC portion, and print area 118 respectively to VC SF zones 112, 892, and 912, the PP, AD, FR, and CP supplemental impact criteria, different PP, AD, FR, and CP supplemental impact criteria groups, the PP, AD, and FR general CC initiation signals, the PP, AD, and FR cellular CC initiation signals, the PP, AD, and FR IDVC portions, and print areas 118, 898, and 918.

In tennis matches using linespersons to (initially) decide whether tennis balls are "in" or "out", the most difficult in/out decisions on groundstroked balls are often on balls impacting surface 102 on or close to baselines 28 because the balls are moving roughly perpendicular to the lines of vision of the specific linespersons making the decisions. The present CC capability is limited, in a singles/doubles variation of tennis IP structure 1260, to ⌐-shaped VC OB area portions 1276 or to the parts of portions 1276 along baselines 28. In a singles-only variation of structure 1260 lacking alleys 48, the CC capability is limited to the parts of OB portions 1276 along shortened baselines 28 and potentially also to VC singles HA area portions 1274 that become parts of OB portions 1276 in this variation. Limiting the CC capability to OB area in any of these ways avoids any need for velocity restitution matching. This is especially attractive for grass courts where it may be difficult to achieve good velocity restitution matching between VC IB court portions 1270, 1272, 1274, and 1276, on one hand, and FC IB court parts 1280, 1282, and 1284, on the other hand. Although only a partial solution to improved line calling, limiting the CC capability in any of these ways may be a good compromise between keeping the CC-capability implementation cost down while overcoming a serious line-call problem.

The present CC capability can generally be used in situations (a) where two SF zones of different colors meet to form a zero-width line at their interface and (b) a SF zone is sandwiched between two SF zones of different color than the sandwiched zone. A major example of the sandwiched zone is a finite-width line, such as a line on a sports playing area, which can be straight or curved or various combinations of straight and/or curved lines. The CC capability can be used in numerous non-sports situations, e.g., in a carpet to track and record the path of a person undergoing a drunk-driving walking test. The CC capability is generally best suited for indoor usage to avoid harsh weather conditions but can be used outdoors. Object 104, although usually moving through air, can be employed in situations where it moves through gas whose constituency differs from standard air. Object 104 can move through a substantial vacuum in some situations.

In order to distinguish between impacts by object 104 and impacts by bodies not intended to cause color change, the material forming surface 102 can be of a nature as to cause color change only when the outside surface of an impacting body has the chemical, electrical, or/and intensive physical properties of the outside surface of object 104. Exemplary intensive physical properties include texture and hardness. This characteristic of the material forming surface 102 can, for example, be used to distinguish between impact of a shoe and impact of a ball such as a tennis ball, basketball, or volleyball because a shoe almost invariably has different chemical, electrical, or/and intensive physical properties than a ball.

The words "principal", "additional", and "further" and their acronyms "PP", "AD", and "FR" as used in differentiating VC regions 106, 886, and 906, corresponding SF zones 112, 892, and 912, the TH impact criteria, the supplemental impact criteria, and the expanded impact criteria are arbitrary and can be variously interchanged. The PP, AD, FR, and CP PAV images can be described as close-up images. When OC areas 896 and 116 or/and 916 are continuous with one another, they can be described as a single OC area. When print areas 898 and 118 or/and 918 are continuous with one another, they similarly can be described as a single print area. Various modifications may be made by those skilled in the art without departing from the true scope of the invention as defined by the claims.

I claim:

1. An information-presentation ("IP") structure comprising an object-impact ("OI") structure having an exposed surface for being impacted by an object during an activity, the OI structure comprising a variable-color ("VC") region which extends to the exposed surface at a surface zone, the VC region comprising a multiplicity of VC cells arranged laterally in a layer, each cell extending to a part of the surface zone, the cells normally appearing along their parts of the surface zone largely as a principal color during the activity, each cell that meets cellular threshold impact criteria in response to the object impacting the surface zone at an impact-dependent ("ID") object-contact ("OC") area spanning where the object contacts the surface zone temporarily becoming a criteria-meeting ("CM") cell and temporarily appearing along its part of the surface zone largely as changed color materially different from the principal color, the OC area being capable of being of substantially arbitrary shape, the parts of the surface zone of the CM cells constituting an ID print area of the surface zone, the print area at least partly encompassing, at least mostly outwardly conforming largely to, and being largely concentric with the OC area.

2. An IP structure as in claim 1 wherein an ID group of the cells temporarily constitute CM cells, the ID group being a plurality of less than all the cells.

3. An IP structure as in claim 2 wherein the print area extends inside or/and outside the OC area, the VC region having a total fractional area difference averaging no more than 10%, the total fractional area difference determined as $(A_{pri}+A_{pro})/A_{oc}$ where (a) $A_{pri}$ is the area, if any, by which the print area extends inside the OC area, $A_{pro}$ is the area, if any, by which the print area extends outside the OC area, and $A_{oc}$ is the area of the OC area.

4. An IP structure as in claim 1 wherein each cell comprises an impact-sensitive ("IS") part and a color-change ("CC") part, the IS part of each CM cell responding to the impact by providing a cellular impact effect, the CC part of each CM cell responding to its impact effect by causing that cell to temporarily appear along its part of the surface zone largely as the changed color.

5. An IP structure as in claim 4 wherein the IS part of each cell is situated at least partly between its part of the surface zone and its CC part, the IS part of each cell having a transmissivity of at least 40% at at least one location along the IS part of that cell to light incident largely perpendicularly on the surface zone and at at least wavelengths of (a) at least a majority component of light suitable for forming the principal color and (b) at least a majority component of light suitable for forming the changed color.

6. An IP structure as in claim 4 wherein the IS part of each cell comprises a piezoelectric structure, the IS part of each CM cell providing its impact effect as at least a cellular electrical effect resulting from pressure of the object impacting the OC area.

7. An IP structure as in claim 4 wherein the IS part of each cell comprises a piezoelectric structure and an effect-modifying structure, the piezoelectric structure of each CM cell providing an initial cellular electrical effect resulting from pressure of the object impacting the OC area, the effect-modifying structure of each CM cell modifying its initial electrical effect to produce a modified cellular electrical effect as at least part of its impact effect.

8. An IP structure as in claim 4 wherein the CC part of each cell normally reflects light having at least a majority component of wavelength suitable for forming the principal color so as to cause that cell to normally appear along its part of the surface zone largely as the principal color, the CC part of each CM cell responding to its impact effect by temporarily reflecting light having at least a majority component of wavelength suitable for forming color different from the principal color so as to cause that CM cell to temporarily appear along its part of the surface zone largely as the changed color.

9. An IP structure as in claim 8 wherein the CC part of each cell comprises one of the following light-processing structures: dipolar suspension structure, electrochromic structure, electrofluidic structure, electrophoretic structure, electrowetting structure, photonic crystal structure, and reflective liquid-crystal structure.

10. An IP structure as in claim 4 wherein the CC part of each CM cell responds to its impact effect by temporarily emitting light having at least a majority component of wavelength suitable for forming color different from the principal color so as to cause that cell to temporarily appear along its part of the surface zone largely as the changed color.

11. An IP structure as in claim 10 wherein the CC part of each cell comprises one of the following light-processing structures: backlit liquid-crystal structure, cathodoluminescent structure, digital light processing structure, electrochromic fluorescent structure, electrochromic luminescent structure, electrochromic phosphorescent structure, electroluminescent structure, emissive microelectricalmechanicalsystem structure, field-emission structure, laser phosphor structure, light-emitting diode structure, light-emitting electrochemical cell structure, liquid-crystal-over-silicon structure, organic light-emitting diode structure, organic light-emitting transistor structure, photoluminescent structure, plasma panel structure, quantum-dot light-emitting diode structure, surface-conduction-emission structure, telescopic pixel structure, and vacuum fluorescent structure.

12. An IP structure as in claim 4 wherein the CC part of each cell comprises (a) a near electrode, (b) a far electrode situated generally opposite to, spaced apart from, and situated farther from that cell's part of the surface zone than, the near electrode, and (c) a core section situated at least partly between the electrodes, light having at least a majority component of wavelength suitable for forming the principal color normally leaving the core section along the near electrode so as to enable that cell to normally appear along its part of the surface zone largely as the principal color, a cellular CC voltage being applied between the electrodes of each CM cell in response to its impact effect, the core section of each CM cell responding to its CC voltage by causing light having at least a majority component of wavelength suitable for forming color different from the principal color to temporarily leave that CM cell along its near electrode so as to enable that CM cell to temporarily appear along its part of the surface zone largely as the changed color.

13. An IP structure as in claim 12 wherein one or both of the core section and far electrode of each cell normally reflects light having at least a majority component of wavelength suitable for forming the principal color so as to enable that cell to normally appear along its part of the surface zone largely as the principal color, one or both of the core section and far electrode of each CM cell responding to its CC voltage by temporarily reflecting light having at least a majority component of wavelength suitable for forming color different from the principal color so as to enable that CM cell to temporarily appear along its part of the surface zone largely as the changed color.

14. An IP structure as in claim 12 wherein:
the core section of each cell comprises a supporting medium and a multiplicity of particles distributed in the medium;
the particles in each cell are normally distributed or/and oriented in the medium so as to cause one or both of the core section and far electrode of that cell to normally reflect light which has at least a majority component of wavelength suitable for forming the principal color and which leaves the core section of that cell along its near electrode; and
the particles in each CM cell respond to its CC voltage by translating or/and rotating for enabling one or both of its core section and far electrode to temporarily reflect light having at least a majority component of wavelength suitable for forming color materially different from the principal color such that light temporarily leaving the core section of that CM cell along its near electrode consists mostly of this temporarily reflected light.

15. An IP structure as in claim 12 wherein:
the core section of each cell comprises a liquid;
the liquid in each cell is normally in a first cell liquid shape for causing one or both of the core section and far electrode of that cell to reflect light having at least a majority component of wavelength suitable for forming the principal color such that light normally leaving the core section of that cell along its near electrode consists mostly of this normally reflected light; and
the liquid in each CM cell responds to its CC voltage by changing to a second cell-liquid shape materially different from its first cell-liquid shape so as to cause one or both of its core section and far electrode to temporarily reflect light having at least a majority component of wavelength suitable for forming color materially different from the principal color such that light temporarily leaving the core section of that CM cell along its near electrode consists mostly of this temporarily reflected light.

16. An IP structure as in claim 12 wherein the near electrode in each cell comprises graphene-containing material.

17. An IP structure as in claim 1 wherein the OI structure is incorporated into a tennis court for which the exposed surface has (a) two opposite baselines, (b) two opposite sidelines extending between the baselines to define inwardly an in-bounds playing area, (c) two opposite servicelines situated between the baselines and extending lengthwise between the sidelines, and (d) a centerline situated between the sidelines and extending lengthwise between the servicelines, a backcourt of the in-bounds area defined by each baseline, the sidelines, and the serviceline closest to that baseline so as to establish two backcourts, the object being a tennis ball, the surface zone comprising VC backcourt area which comprises two VC backcourt area portions respectively partly occupying the backcourts and respectively adjoining the servicelines along largely their entire lengths.

18. An IP structure as in claim 1 wherein the cells are laterally arranged in a two-dimensional array of rows and columns of the cells.

19. An IP structure as in claim 1 wherein the OI structure further includes an additional VC region extending to the exposed surface at an additional surface zone and laterally adjoining the other VC region so that the surface zones adjoin each other, the additional VC region comprising a multiplicity of additional VC cells arranged laterally in a layer, each additional VC cell extending to a part of the additional surface zone, the additional VC cells normally appearing along their parts of the additional surface zone largely as an additional color different from the principal color during the activity, each additional cell that meets additional cellular threshold impact criteria in response to the object impacting the additional surface zone at an ID OC area spanning where the object contacts the additional surface zone temporarily becoming an additional CM cell and temporarily appearing along its part of the additional surface zone largely as altered color materially different from the additional color, the OC area of the additional surface zone being capable of being of substantially arbitrary shape, the parts of the additional surface zone of the additional CM cells constituting an ID print area of the additional surface zone, the print area of the additional surface zone at least partly encompassing, at least mostly outwardly conforming largely to, and being largely concentric with its OC area.

20. An information-presentation ("IP") structure comprising:
an object-impact ("OI") structure having an exposed surface for being impacted by an object during an activity, the OI structure comprising a variable-color ("VC") region which extends to the exposed surface at a surface zone, the VC region comprising a multiplicity of VC cells arranged laterally in a layer, each cell extending to a part of the surface zone, the cells normally appearing along their parts of the surface zone largely as a principal color during the activity, each cell that meets cellular threshold impact criteria in response to the object impacting the surface zone at an impact-dependent ("ID") object-contact ("OC") area spanning where the object contacts the surface zone temporarily becoming a threshold criteria-meeting ("CM") cell, each threshold CM cell providing a cellular characteristics-identifying impact signal that identifies cellular supplemental impact information for the object impacting the OC area as experienced at that threshold CM cell; and a color-change ("CC") controller responsive to the impact signal of each threshold CM cell for combining the cellular supplemental impact information of that threshold CM cell with the cellular supplemental impact information of any other threshold CM cell to form general supplemental impact information, for deter mining whether the general supplemental impact information meets supplemental impact criteria, and, if so, for providing a cellular CC initiation signal to each threshold CM cell so as to cause it to temporarily become a full CM cell and temporarily appear along its part of the surface zone largely as changed color materially different from the principal color, the parts of the surface zone of the full CM cells constituting an ID print area of the surface zone, the print area at least partly encompassing, at least mostly outwardly conforming largely to, and being largely concentric with the OC area.

21. An IP structure as in claim 20 wherein each cell comprises an impact-sensitive ("IS") part and a CC part, the IS part of each threshold CM cell providing its cellular impact signal, the CC part of each full CM cell responding to its initiation signal by causing that full CM cell to temporarily appear along its part of the surface zone largely as the changed color.

22. An IP structure as in claim 21 wherein the CC part of each cell normally reflects light having at least a majority component of wavelength suitable for forming the principal color so as to cause that cell to normally appear along its part of the surface zone largely as the principal color, the CC part of each full CM cell responding to its initiation signal by temporarily reflecting light having at least a majority component of wavelength suitable for forming color different from the principal color so as to cause that full CM cell to temporarily appear along its part of the surface zone largely as the changed color.

23. An IP structure as in claim 21 wherein the CC part of each full CM cell responds to its initiation signal by temporarily emitting light having at least a majority component of wavelength suitable for forming color different from the principal color so as to cause that full CM cell to temporarily appear along its part of the surface zone largely as the changed color.

24. An IP structure as in claim 20 wherein the OI structure is incorporated into a tennis court for which the exposed surface has (a) two opposite baselines, (b) two opposite sidelines extending between the baselines to define inwardly an in-bounds playing area, (c) two opposite servicelines situated between the baselines and extending lengthwise between the sidelines, and (d) a centerline situated between the sidelines and extending lengthwise between the servicelines, a backcourt of the in-bounds area defined by each baseline, the sidelines, and the serviceline closest to that baseline so as to establish two backcourts, the object being a tennis ball, the surface zone comprising VC backcourt area which comprises two VC backcourt area portions respectively partly occupying the backcourts and respectively adjoining the servicelines along largely their entire lengths.

25. An IP structure as in claim 20 wherein an ID group of the cells temporarily constitute full CM cells, the ID group being a plurality of less than all the cells.

26. An IP structure as in claim 20 wherein the supplemental impact criteria include size and/or shape criteria for the print area.

27. An IP structure as in claim 20 wherein (a) the supplemental impact information includes time duration of the object in contact with the OC area and (b) the supplemental impact criteria include OC time duration criteria.

28. An IP structure as in claim 20 wherein the cells are laterally arranged in a two-dimensional array of rows and columns of the cells.

29. An IP structure as in claim 20 wherein:
the OI structure further includes an additional VC region extending to the exposed surface at an additional surface zone and laterally adjoining the other VC region so that the surface zones adjoin each other, the additional VC region comprising a multiplicity of additional VC cells arranged laterally in a layer, each additional VC cell extending to a part of the additional surface zone, the additional VC cells normally appearing along their parts of the additional surface zone largely as an additional color different from the principal color during the activity, each additional cell that meets additional cellular threshold impact criteria in response to the object impacting the additional surface zone at an ID OC area spanning where the object contacts the additional surface zone temporarily becoming an additional threshold CM cell, each additional threshold CM cell providing an additional cellular characteristics-identifying impact signal that identifies additional cellular supplemental impact information for the object impacting the OC area of the additional surface zone as experienced at that additional threshold CM cell; and
the controller responds to the additional impact signal of each additional threshold CM cell by combining the additional cellular supplemental impact information of that additional threshold CM cell with the additional cellular supplemental impact information of any other additional threshold CM cell to form additional general supplemental impact information, for determining whether the additional general supplemental impact information meets additional supplemental impact criteria, and, if so, for providing an additional cellular CC initiation signal to each additional threshold CM cell so as to cause it to temporarily become an additional full CM cell and temporarily appear along its part of the additional surface zone largely as altered color materially different from the additional color, the parts of the additional surface zone of the additional CM cells constituting an ID print area of the additional surface zone, the print area of the additional surface zone at least partly encompassing, at least mostly outwardly conforming largely to, and being largely concentric with its OC area.

* * * * *